(12) United States Patent
Page et al.

(10) Patent No.: US 12,486,341 B2
(45) Date of Patent: Dec. 2, 2025

(54) PHOTOCURABLE COMPOSITIONS AND METHODS OF USE THEREOF

(71) Applicant: BOARD OF REGENTS, THE UNIVERSITY OF TEXAS SYSTEM, Austin, TX (US)

(72) Inventors: Zachariah A. Page, Austin, TX (US); Dowon Ahn, Austin, TX (US); Alex Stafford, Austin, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 361 days.

(21) Appl. No.: 18/013,386

(22) PCT Filed: Jun. 28, 2021

(86) PCT No.: PCT/US2021/039331
§ 371 (c)(1),
(2) Date: Dec. 28, 2022

(87) PCT Pub. No.: WO2022/005947
PCT Pub. Date: Jan. 6, 2022

(65) Prior Publication Data
US 2023/0357453 A1 Nov. 9, 2023

Related U.S. Application Data

(60) Provisional application No. 63/172,157, filed on Apr. 8, 2021, provisional application No. 63/045,248, filed on Jun. 29, 2020.

(51) Int. Cl.
| | |
|---|---|
| C08F 2/46 | (2006.01) |
| B29C 64/129 | (2017.01) |
| C08F 2/50 | (2006.01) |
| C08F 220/20 | (2006.01) |
| C08F 220/56 | (2006.01) |
| C08F 222/10 | (2006.01) |
| C08G 61/04 | (2006.01) |
| B33Y 10/00 | (2015.01) |
| B33Y 70/00 | (2020.01) |
| B33Y 80/00 | (2015.01) |

(52) U.S. Cl.
CPC ............. C08F 2/50 (2013.01); B29C 64/129 (2017.08); C08F 220/20 (2013.01); C08F 220/56 (2013.01); C08F 222/102 (2020.02); C08F 222/103 (2020.02); B33Y 10/00 (2014.12); B33Y 70/00 (2014.12); B33Y 80/00 (2014.12)

(58) Field of Classification Search
CPC .... C08F 220/54; C08F 220/20; C08F 220/18; C08F 220/56; C08F 2/48; C08F 2/50; C08F 222/103; C08F 222/102; B33Y 10/00; B33Y 70/00; B33Y 80/00

USPC .......... 522/9, 8, 7, 6, 189, 184, 71, 1; 520/1
See application file for complete search history.

(56) References Cited

U.S. PATENT DOCUMENTS

| | | | |
|---|---|---|---|
| 5,395,862 | A | 3/1995 | Neckers et al. |
| 5,514,519 | A | 5/1996 | Neckers |
| 5,629,354 | A * | 5/1997 | West ........................ C08F 2/50 |
| | | | 522/182 |
| 5,677,107 | A | 10/1997 | Neckers |
| 5,807,905 | A | 9/1998 | Cunningham et al. |
| 5,952,152 | A | 9/1999 | Cunningham et al. |
| 5,998,496 | A | 12/1999 | Hassoon et al. |
| 6,096,794 | A | 8/2000 | Cunningham et al. |
| 6,200,646 | B1 | 3/2001 | Neckers et al. |
| 6,210,863 | B1 | 4/2001 | Cunningham et al. |
| 6,309,797 | B1 | 10/2001 | Grinevich et al. |
| 6,433,035 | B1 | 8/2002 | Grinevich et al. |

(Continued)

FOREIGN PATENT DOCUMENTS

| | | |
|---|---|---|
| EP | 3572210 A1 | 7/2021 |
| EP | 3575062 A1 | 11/2021 |

(Continued)

OTHER PUBLICATIONS

Ahn et al, Rapid high-resolution visible light 3D printing, ACS Cent. Sci., 2020, 6, 1555-1563 (Year: 2020).*

(Continued)

*Primary Examiner* — Jessica Whiteley
(74) *Attorney, Agent, or Firm* — Meunier Carlin & Curfman LLC

(57) ABSTRACT

Disclosed herein are photocurable compositions and methods of use thereof. The photocurable compositions comprise: a (co)monomer; a photosensitizer having an absorption hand, wherein at least a portion of the absorption band is located at one or more wavelength from 400 nm to 1400 nm, and wherein the photosensitizer comprises a xanthene, a squaraine, a boron-dipyrromethene, a cyanine, a porphyrin, or a combination thereof; an acceptor co-initiator comprising a diphenyliodonium salt; and a donor co-initiator comprising a borate salt. The photocurable compositions optionally further comprise a crosslinker, an opacifier, a solvent, an oxygen scavenger, a radical scavenger, or a combination thereof. Also disclosed herein are methods of forming a (co)polymer from the photocurable compositions disclosed herein, methods of forming an object via additive manufacturing using the photocurable compositions disclosed herein, articles of manufacture comprising a cured product of the photocurable compositions disclosed herein, and methods of use thereof.

20 Claims, 135 Drawing Sheets

(56) References Cited

U.S. PATENT DOCUMENTS

| | | | |
|---|---|---|---|
| 6,486,225 | B1 | 11/2002 | Kamata et al. |
| 7,101,918 | B2 | 9/2006 | Ishihara et al. |
| 2004/0042937 | A1 | 3/2004 | Bentsen et al. |
| 2004/0219458 | A1 | 11/2004 | Holt et al. |
| 2020/0047407 | A1 | 2/2020 | Holt et al. |

FOREIGN PATENT DOCUMENTS

| | | |
|---|---|---|
| GB | 2451431 A | 2/2009 |
| GB | 2538333 A | 12/2017 |
| WO | 2007138356 A1 | 12/2007 |
| WO | 2011075553 A1 | 6/2011 |
| WO | 2017051182 A1 | 3/2017 |
| WO | 2017077319 A1 | 5/2017 |
| WO | 2019/030631 A1 | 2/2019 |

OTHER PUBLICATIONS

International Preliminary Report on Patentability issued for Application No. PCT/US2021/039331, dated Jan. 12, 2023.
Adarsh N et al. Tuning Photosensitized Singlet Oxygen Generation Efficiency of Novel Aza-BODIPY Dyes. Org. Lett. 2010, 12 (24), 5720-5723.
Aguado BA et al. Engineering Precision Biomaterials for Personalized Medicine. Sci. Transl. Med 2018, 10, 8645.
Ahn, Dowon, et al. Rapid high-resolution visible light 3D printing. ACS central science 6.9 (2020): 1555-1563.
Allen MJ et al. Tracking Photocuring via ATR-FT-IR with Illumination through the ATR Element. Spectrosc. Appl. Noteb. 2020, 35 (2), 78-78.
Allen, Norman S. Photoinitiators for UV and visible curing of coatings: mechanisms and properties. Journal of Photochemistry and Photobiology A: chemistry 100.1-3 (1996): 101-107.
Anastasio R et al. Characterization of Ultraviolet-Cured Methacrylate Networks: From Photopolymerization to Ultimate Mechanical Properties. Macromolecules 2019, 52 (23), 9220-9231.
Arias-Rotondo, Daniela M., and James K. McCusker. The photophysics of photoredox catalysis: a roadmap for catalyst design. Chemical Society Reviews 45.21 (2016): 5803-5820.
Bagheri A et al. Oxygen Tolerant PET-RAFT Facilitated 3D Printing of Polymeric Materials under Visible LEDs. ACS Appl. Polym. Mater. 2020, 2 (2), 782-790.
Bagheri A et al. Photopolymerization in 3D Printing. ACS Appl. Polym. Mater. 2019, 1 (4), 593-611.
Bagheri A et al. Visible Light-Induced Transformation of Polymer Networks. ACS Appl. Polym. Mater. 2019, 1 (7), 1896-1904.
Bialas S et al. Access to Disparate Soft Matter Materials by Curing with Two Colors of Light. Adv. Mater. 2019, 31 (8), 1807288.
Blasco E et al. Photochemically Driven Polymeric Network Formation: Synthesis and Applications. Adv. Mater. 2017, 29 (15), 1604005.
Boaz et al. The Quenching of Fluorescence. Deviations from the Stern-Volmer LawJ. Am. Chem. Soc. 1950, 72 (8), 3435-3443.
Boens N et al. Synthesis of BODIPY Dyes through Postfunctionalization of the Boron Dipyrromethene Core. Coord. Chem. Rev. 2019, 399, 213024.
Bonardi A et al. Different NIR Dye Scaffolds for Polymerization Reactions under NIR Light. Polym. Chem. 2019, 10 (47), 6505-6514.
Bonardi AH et al. High Performance Near-Infrared (NIR) Photoinitiating Systems Operating under Low Light Intensity and in the Presence of Oxygen. Macromolecules 2018, 51 (4), 1314-1324.
Camposeo A et al. Additive Manufacturing: Applications and Directions in Photonics and Optoelectronics. Adv. Opt. Mater. 2019, 7 (1), 1800419.
Capaldo, Luca, and Davide Ravelli. "Hydrogen atom transfer (HAT): a versatile strategy for substrate activation in photocatalyzed organic synthesis." European Journal of Organic Chemistry 2017.15 (2017): 2056-2071.
Chatani S et al. The Power of Light in Polymer Science: Photochemical Processes to Manipulate Polymer Formation, Structure, and Properties. Polym. Chem. 2014, 5 (7), 2187-2201.
Chatani, Shunsuke, et al. "Visible-light initiated thiol-Michael addition photopolymerization reactions." ACS Macro Letters 3.4 (2014): 315-318.
Chen M et al. Light-Controlled Radical Polymerization: Mechanisms, Methods, and Applications. Chem. Rev. 2016, 116 (17), 10167-10211.
Chen, Li, et al. "Highly stable thiol-ene systems: from their structure-property relationship to DLP 3D printing." Journal of Materials Chemistry C 6.43 (2018): 11561-11568.
Cook, Caitlyn C., et al. "Highly tunable thiol-ene photoresins for volumetric additive manufacturing." Advanced Materials 32.47 (2020): 2003376.
Corrigan et al. A Photoinitiation System for Conventional and Controlled Radical Polymerization at Visible and NIR Wavelengths, Macromolecules, 2016, 49, 3274-3285.
Corrigan et al. Seeing the Light: Advancing Materials Chemistry through Photopolymerization. Angew. Chemie—Int. Ed. 2019, 58 (16), 5170-5189.
Corrigan N et al. Photocatalysis in Organic and Polymer Synthesis. Chem. Soc. Rev. 2016, 45 (22), 6165-6212.
Costa P et al. Real-Time Fluorescence Imaging of a Heterogeneously Catalysed Suzuki-Miyaura Reaction. Nat. Catal. 2020, 3, 427-437.
Cui, Ganglong, Pei-Jie Guan, and Wei-Hai Fang. "Photoinduced proton transfer and isomerization in a hydrogen-bonded aromatic azo compound: a CASPT2//CASSCF study." The Journal of Physical Chemistry A 118.26 (2014): 4732-4739.
Dadashi-Silab S et al. Photoinduced Electron Transfer Reactions for Macromolecular Syntheses. Chem. Rev. 2016, 116 (17), 10212-10275.
De Beer, Martin P., et al. "Rapid, continuous additive manufacturing by volumetric polymerization inhibition patterning." Science Advances 5.1 (2019): eaau8723.
Del Barrio J et al. Light to Shape the Future: From Photolithography to 4D Printing. Adv. Opt. Mater. 2019, 7 (16), 1900598.
Denes, Fabrice, et al. "Thiyl radicals in organic synthesis." Chemical reviews 114.5 (2014): 2587-2693.
Dizon JRC et al. Mechanical Characterization of 3D-Printed Polymers. Addit. Manuf. 2018, 20, 44-67.
Dolinski ND et al.. Solution Mask Liquid Lithography (SMALL) for One-Step, Multimaterial 3D Printing. Adv. Mater. 2018, 30 (31), 1800364.
Dumur F. Recent Advances on Visible Light Metal-Based Photocatalysts for Polymerization under Low Light Intensity. Catalysts 2019, 9, 736.
Garra P et al. Redox Two-Component Initiated Free Radical and Cationic Polymerizations: Concepts, Reactions and Applications. Prog. Polym. Sci. 2019, 94, 33-56.
Guerrero-Corella, Andrea, et al. "Thiol-ene/oxidation tandem reaction under visible light photocatalysis: synthesis of alkyl sulfoxides." Chemical Communications 53.75 (2017): 10463-10466.
Haas M et al. Recent Advances in Germanium-Based Photoinitiator Chemistry. Chem.—A Eur. J. 2018, 24 (33), 8258-8267.
Hahn, Vincent, et al. "Rapid assembly of small materials building blocks (voxels) into large functional 3D metamaterials." Advanced Functional Materials 30.26 (2020): 1907795.
Haldar U et al. BODIPY-Derived Polymeric Chemosensor Appended with Thiosemicarbazone Units for the Simultaneous Detection and Separation of Hg(II) Ions in Pure Aqueous Media. ACS Appl. Mater. Interfaces 2019, 11 (14), 13685-13693.
Herzberger J et al. Polymer Design for 3D Printing Elastomers: Recent Advances in Structure, Properties, and Printing. Prog. Polym. Sci. 2019, 97.
Hoyle, C. E., Lee, T. Y., & Roper, T. (2004). Thiol-enes: Chemistry of the past with promise for the future. Journal of Polymer Science Part A: Polymer Chemistry, 42(21), 5301-5338. doi:10.1002/pola. 20366.
Husár B et al. The formulator's guide to anti-oxygen inhibition additives. Progress in Organic Coatings, 2014, 77(11), 1789-1798.

(56) References Cited

OTHER PUBLICATIONS

Ito H et al. New UV Resists with Negative or Positive Tone. In Digest of Technical Papers—Symposium on VLSI Technology; 1982; pp. 86-87. Conference Paper.
Jung K et al. Designing with Light: Advanced 2D, 3D, and 4D Materials. Adv. Mater. 2019, 1903850.
Kabatc et al. Visible light photoinitiating systems based on squaraine dye: kinetic, mechanistic and laser flash photolysis studies, RSC Advances, 2016, 6, 103851.
Kabatc J et al. Hemicyanine N-Butyltriphenylborate Salts as Effective Initiators of Free-Radical Polymerization Photoinitiated via Photoinduced Electron-Transfer Process. J. Polym. Sci. Part A Polym. Chem. 2003, 41 (19), 3017-3026.
Kamkaew A et al. BODIPY Dyes in Photodynamic Therapy. Chem. Soc. Rev. 2013, 42 (1), 77-88.
Kelly BE et al. Volumetric Additive Manufacturing via Tomographic Reconstruction. Science (80-.). 2019, 363 (6431), 1075-1079.
Kottisch V et al. Photocontrolled Interconversion of Cationic and Radical Polymerizations. J. Am. Chem. Soc. 2017, 139 (31), 10665-10668.
Kozawa T et al. Relationship between Resolution Blur and Stochastic Defect of Chemically Amplified Resists Used for Extreme Ultraviolet Lithography. J. Photopolym. Sci. Technol. 2019, 32 (1), 161-167.
Koziar JC et al. Photochemical Heavy-Atom Effects. Acc. Chem. Res. 1977, 11, 334-341.
Lalavée et al. Recent Developments of Versatile Photoinitiating Systems for Cationic Ring Opening Polymerization Operating at Any Wavelengths and under Low Light Intensity Sources, Molecules, 2015, 20, 7201-7221.
Lambert CR et al. Electron Transfer Quenching of the Rose Bengal Triplet State. Photochem. Photobiol. 1997, 66 (1), 15-25.
Lee Y et al. Halogen Bonding Facilitates Intersystem Crossing in Iodo-BODIPY Chromophores. J. Phys. Chem. Lett. 2020, 11 (3), 877-884.
Ligon SC et al. Polymers for 3D Printing and Customized Additive Manufacturing. Chem. Rev. 2017, 117 (15), 10212-10290.
Ligon SC et al. Strategies to Reduce Oxygen Inhibition in Photoinduced Polymerization. Chem. Rev. 2014, 114 (1), 577-589.
Lim KS et al. Fundamentals and Applications of Photo-Cross-Linking in Bioprinting. Chem. Rev. 2020, 120(19), 10662-10694.
Loudet A et al. BODIPY Dyes and Their Derivatives: Syntheses and Spectroscopic Properties. Chem. Rev. 2007, 107 (11), 4891-4932.
Lovell LG et al. Understanding the Kinetics and Network Formation of Dimethacrylate Dental Resins. Polym. Adv. Technol. 2001, 12 (6), 335-345.
Lu H et al. Structural Modification Strategies for the Rational Design of Red/NIR Region BODIPYs. Chem. Soc. Rev. 2014, 43 (13), 4778-4823.
Lu, Pengtao, et al. "Boron dipyrromethene (BODIPY) in polymer chemistry." Polymer Chemistry 12.3 (2021): 327-348.
MacDonald SA et al. Advances in the Design of Organic Resist Materials. Microelectron. Eng. 1983, 1 (4), 269-293.
Marenich et al. The Journal of Physical Chemistry B. 2009 113 (18), 6378-6396.
Matsui JK et al. Photoredox-Mediated Routes to Radicals: The Value of Catalytic Radical Generation in Synthetic Methods Development. ACS Catal. 2017, 7 (4), 2563-2575.
Miao X et al. Deciphering the Intersystem Crossing in Near-Infrared BODIPY Photosensitizers for Highly Efficient Photodynamic Therapy. Chem. Sci. 2019, 10 (10), 3096-3102.
Michalek, Lukas, et al. "2D fabrication of tunable responsive interpenetrating polymer networks from a single photoresist." Advanced Functional Materials 30.48 (2020): 2005328.
Monzón M et al. Anisotropy of Photopolymer Parts Made by Digital Light Processing. Materials (Basel). 2017, 10 (1), 64.
Moore, D. G., Barbera, L., Masania, K., & Studart, A. R. (2019). Three-dimensional printing of multicomponent glasses using phase-separating resins. Nature Materials. doi: 10.1038/s41563-019-0525-y.
Nan et al. Efficient visible photoinitiator containing linked dye-coinitiator and iodonium salt for free radical polymerization, Process in Organic Coatings, 2015, 81, 11-18.
Narupai B et al. 100th Anniversary of Macromolecular Science Viewpoint: Macromolecular Materials for Additive Manufacturing. ACS Macro Lett. 2020, 627-638.
Nepomnyashchii, Alexander B., et al. "Synthesis, photophysical, electrochemical, and electrogenerated chemiluminescence studies. Multiple sequential electron transfers in BODIPY monomers, dimers, trimers, and polymer." Journal of the American Chemical Society 133.22 (2011): 8633-8645.
Park HY et al. Stress Relaxation of Trithiocarbonate-Dimethacrylate-Based Dental Composites. Dent. Mater. 2012, 28 (8), 888-893.
Patel DK et al. Highly Stretchable and UV Curable Elastomers for Digital Light Processing Based 3D Printing. Adv. Mater. 2017, 29 (15).
Penney, D. P., et al. "Analysis and testing of biological stains—the Biological Stain Commission Procedures." Biotechnic & histochemistry 77.5-6 (2002): 237-275.
Peterson BM et al. On Demand Switching of Polymerization Mechanism and Monomer Selectivity with Orthogonal Stimuli. ACS Cent. Sci. 2018, 4 (9), 1228-1234.
Polykarpov AY et al. Tetramethylammonium Phenyltrialkylborates in the Photoinduced Electron Transfer Reaction with Benzophenone. Generation of Alkyl Radicals and Their Addition to Activated Alkenes. Tetrahedron Lett. 1995, 36 (31), 5483-5486.
Pritchard ZD et al. Modeling and Correcting Cure-Through in Continuous Stereolithographic 3D Printing. Adv. Mater. Technol. 2019, 1900700.
Qiu H et al. Uniform Patchy and Hollow Rectangular Platelet Micelles from Crystallizable Polymer Blends. Science (80-.). 2016, 352 (6286), 697-701.
Rachford AA et al. Boron Dipyrromethene (Bodipy) Phosphorescence Revealed in [Ir(Ppy) 2(Bpy-C—C-Bodipy)]+. Inorg. Chem. 2010, 49 (8), 3730-3736.
Romańczyk PP et al. Reliable Reduction Potentials of Diaryliodonium Cations and Aryl Radicals in Acetonitrile from High-Level Ab Initio Computations. Electrochim. Acta 2020, 351, 136404.
Romańczyk PP et al. The Reduction Potential of Diphenyliodonium Polymerisation Photoinitiator Is Not -0.2 V vs. SCE. A Computational Study. Electrochim. Acta 2017, 255, 482-485.
Sabatini RP et al. Intersystem Crossing in Halogenated Bodipy Chromophores Used for Solar Hydrogen Production. J. Phys. Chem. Lett. 2011, 2 (3), 223-227.
Saha, Sourabh K., et al. "Scalable submicrometer additive manufacturing." Science 366.6461 (2019): 105-109.
Sahin M et al. Thiol-Ene versus Binary Thiol-Acrylate Chemistry: Material Properties and Network Characteristics of Photopolymers, Advanced Engineering Materials, 2017, 19(4), 1600620.
Schmitz C et al. New High-Power LEDs Open Photochemistry for Near-Infrared-Sensitized Radical and Cationic Photopolymerization. Angew. Chemie 2019, 131 (13), 4445-4450.
Schmitz C et al. NIR-Sensitized Photoinitiated Radical Polymerization and Proton Generation with Cyanines and LED Arrays. Prog. Org. Coatings 2016, 100, 32-46.
Schroeder WF et al. Effect of Different Photoinitiator Systems on Conversion Profiles of a Model Unfilled Light-Cured Resin. Dent. Mater. 2007, 23 (10), 1313-1321.
Schwartz JJ et al. Multimaterial Actinic Spatial Control 3D and 4D Printing. Nat. Commun. 2019, 10 (1), 791.
Shanmugam S et al. Exploiting Metalloporphyrins for Selective Living Radical Polymerization Tunable over Visible Wavelengths. J. Am. Chem. Soc. 2015, 137 (28), 9174-9185.
Sheng W et al. Synthesis, Crystal Structure, and the Deep Near-Infrared Absorption/Emission of Bright AzaBODIPY-Based Organic Fluorophores. Org. Lett. 2018, 20 (9), 2620-2623.

(56) References Cited

OTHER PUBLICATIONS

Shiraishi A et al. Comparison between NIR and UV-Sensitized Radical and Cationic Reactivity of Iodonium Salts Comprising Anions with Different Coordination Behavior. J. Photopolym. Sci. Technol. 2017, 30 (6), 633-638.
Song, Jianan, Caibao Chen, and Yong Zhang. "High thermal conductivity and stretchability of layer-by-layer assembled silicone rubber/graphene nanosheets multilayered films." Composites Part A: Applied Science and Manufacturing 105 (2018): 1-8.
Stafford, Alex, et al. "Catalyst halogenation enables rapid and efficient polymerizations with visible to far-red light." Journal of the American Chemical Society 142.34 (2020): 14733-14742.
Strehmel B et al. Advances of near Infrared Sensitized Radical and Cationic Photopolymerization: From Graphic Industry to Traditional Coatings. J. Photopolym. Sci. Technol. 2016, 29 (1), 111-121.
Strehmel B et al. Photochemistry with Cyanines in the Near Infrared: A Step to Chemistry 4.0 Technologies. Chem.—A Eur. J. 2019, 25 (56), 12855-12864.
Telitel S et al. BODIPY Derivatives and Boranil as New Photoinitiating Systems of Cationic Polymerization Exhibiting a Tunable Absorption in the 400-600 Nm Spectral Range. Polymer (Guildf). 2013, 54 (8), 2071-2076.
Telitel S et al. Photopolymerization of Cationic Monomers and Acrylate/Divinylether Blends under Visible Light Using Pyrromethene Dyes. Macromolecules 2012, 45 (17), 6864-6868.
Thermal Transitions of Homopolymers: Glass Transition & Melting Point https://www.sigmaaldrich.com/technical-documents/articles/materials-science/polymer-science/thermal-transitions-of-homopolymers.html.
Thompson L et al. BODIPY Dyes—A Privilege Molecular Scaffold with Tunable Properties; 2019; Chapter 4—Redox Chemistry of BODIPY Dyes, 20 pages.
Thorat, Kishor G., et al. "Novel pyrromethene dyes with N-ethyl carbazole at the meso position: a comprehensive photophysical, lasing, photostability and TD-DFT study." Physical Chemistry Chemical Physics 17.26 (2015): 17221-17236.
Thrasher CJ et al. Modular Elastomer Photoresins for Digital Light Processing Additive Manufacturing. ACS Appl. Mater. Interfaces 2017, 9 (45), 39708-39716.
Truby RL et al. Printing Soft Matter in Three Dimensions. Nature 2016, 540 (7633), 371-378.
Tumbleston JR et al. Continuous Liquid Interface Production of 3D Objects. Science (80-.). 2015, 347 (6228), 1349-1352.
Vyatskikh, Andrey, et al. "Additive manufacturing of 3D nano-architected metals." Nature communications 9.1 (2018): 593. DOI 10.1038/s41467-018-03071-9.
Walker DA et al. Rapid, Large-Volume Thermally Controlled 3D Printing Using a Mobile Liquid Interface. Science (80-.). 2019, 366 (6463), 360-364.
Wallin TJ et al. 3D Printing of Soft Robotic Systems. Nat. Rev. Mater. 2018, 3 (6), 84-100.
Wang XF et al. BODIPY Catalyzed Amide Synthesis Promoted by BHT and Air under Visible Light. Org. Biomol. Chem. 2016, 14 (29), 7028-7037.
Whited MT et al. Singlet and Triplet Excitation Management in a Bichromophoric Near-Infrared-Phosphorescent BODIPY-Benzoporphyrin Platinum Complex. J. Am. Chem. Soc. 2011, 133 (1), 88-96.
Willson CG et al. Photoresist Materials: A Historical Perspective. In Advances in Resist Technology and Processing XIV; SPIE, 1997; vol. 3049, p. 28-41.
Würth, Christian, et al. "Relative and absolute determination of fluorescence quantum yields of transparent samples." Nature protocols 8.8 (2013): 1535-1550.
Xiao P et al. Visible Light Sensitive Photoinitiating Systems: Recent Progress in Cationic and Radical Photopolymerization Reactions under Soft Conditions. Prog. Polym. Sci. 2015, 41 (C), 32-66.
Yoon et al. The heavy-atom effect on xanthene dyes for photopolymerization by visible light, Polymer Chemistry, 2019, 10, 5737-5742.
Yu C et al. Photopolymerizable Biomaterials and Light-Based 3D Printing Strategies for Biomedical Applications. Chem. Rev. 2020, 120(19), 10695-10743.
Zhang et al. Photopolymerization under various monochromatic UV/visible LEDs and IR lamp: Diamino-anthraquinone derivatives as versatile multicolor photoinitiators, European Polymer Journal, 2019, 112, 591-600.
Zhang J et al. 3D Printing of Photopolymers. Polym. Chem. 2018, 9 (13), 1530-1540.
Zhang X et al. Wavelength-Selective Sequential Polymer Network Formation Controlled with a Two-Color Responsive Initiation System. Macromolecules 2017, 50 (15), 5652-5660.
Zhang Z et al. A Versatile 3D and 4D Printing System through Photocontrolled RAFT Polymerization. Angew. Chemie—Int. Ed. 2019, 58 (50), 17954-17963.
Zhang, Liwen, et al. "Porphyrinic Zirconium Metal-Organic Frameworks (MOFs) as Heterogeneous Photocatalysts for PET-RAFT Polymerization and Stereolithography." Angewandte Chemie International Edition 60.10 (2021): 5489-5496.
Zhao J et al. The Triplet Excited State of Bodipy: Formation, Modulation and Application. Chem. Soc. Rev. 2015, 44 (24), 8904-8939.
International Search Report and Written Opinion received in PCT/US2021/039331 mailed Oct. 4, 2021, 11 pages.
Kabatc et al. "Two-cationic 2-methylbenzothiazole derivatives as green light absorbed sensitizers in initiation of free radical polymerization" Colloid Polymer Science. Apr. 3, 2015 (Apr. 3, 2015), vol. 293, p. 1865-1876; entire document.

* cited by examiner

PHOTOCURABLE COMPOSITIONS AND METHODS OF USE THEREOF

CROSS-REFERENCE TO RELATED APPLICATIONS

This application is a U.S. National Stage application filed under 35 U.S.C. § 371 of PCT/US2021/039331 filed Jun. 28, 2021, which claims the benefit of priority to U.S. Provisional Application No. 63/045,248 filed Jun. 29, 2020 and U.S. Provisional Application No. 63/172,157 filed Apr. 8, 2021, each of which are hereby incorporated herein by reference in their entireties.

STATEMENT OF GOVERNMENT SUPPORT

This invention was made with government support under Grant No. W911 NF-19-1-0310 awarded by the Army Research Office. The government has certain rights in the invention.

BACKGROUND 3D printing has revolutionized the way the world creates, influencing nearly every aspect of modern society—from the consumer market to aerospace and medical technologies. With the help of computer-aided design, digital objects with customized form factors are generated and realized through successive layering of material (i.e., additive manufacturing).

There exist a number of elegant 3D printing methods including stereolithography and digital light processing, which utilize light to transform matter from liquid resins to solid objects (i.e., photocuring). Contemporary photocuring processes in 3D printing are initiated by high energy ultraviolet (UV) light, which provides rapid polymerization and correspondingly short build times (~seconds). As an alternative, visible light offers numerous benefits, including reduced cost and energy of irradiation from readily available and modular light emitting diodes (LEDs), improved biocompatibility and functional group tolerance, greater depth of penetration, and reduced scattering. As such, visible light photocuring has the potential to enable next generation designer material fabrication. Nonetheless, the utility of low energy visible LEDs (>420 nm) has never been demonstrated for stereolithography- or digital light processing-based 3D printing. The compositions and methods discussed herein addresses this and other needs.

SUMMARY

In accordance with the purposes of the disclosed compositions and methods, as embodied and broadly described herein, the disclosed subject matter relates to photocurable compositions and methods of use thereof.

For example, disclosed herein are photocurable compositions comprising: a (co)monomer, a photosensitizer having an absorption band, wherein at least a portion of the absorption band is located at one or more wavelength from 400 nm to 1400 nm, and wherein the photosensitizer comprises a xanthene, a squaraine, a boron-dipyrromethene, a cyanine, a porphyrin, or a combination thereof; an acceptor co-initiator comprising a diphenyliodonium salt of Formula I:

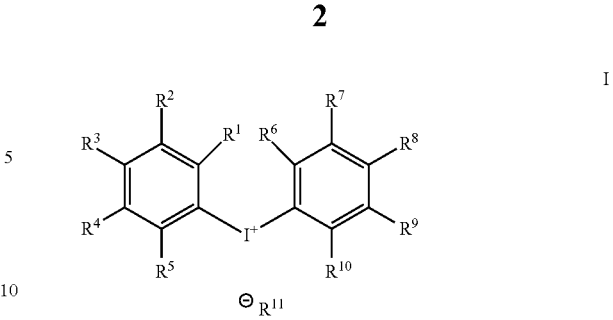

wherein $R^1$, $R^2$, $R^3$, $R^4$, $R^5$, $R^6$, $R^7$, $R^8$, $R^9$, and $R^{10}$ are each independently H, OH, halogen, alkyl, alkenyl, alkynyl, cycloalkyl, aryl, alkylaryl, or heteroaryl, any of which is optionally substituted with halide, hydroxy, thiol, carbonyl, alkoxy, alkylhydroxy, carboxyl, amino, amido, alkyl, alkenyl, alkynyl, cycloalkyl, aryl, $-NR^xR^y$, $-C(O)NR^xR^y$, or a combination thereof, or wherein, as valence permits, two or more of $R^1$-$R^{10}$, together with the atoms to which they are attached, form a 3-10 membered cyclic moiety, wherein any of the additional atoms are optionally heteroatoms and the 3-10 membered cyclic moiety is optionally substituted with halide, hydroxy, thioether, carbonyl, alkoxy, alkylhydroxy, carboxyl, amino, amido, alkyl, alkenyl, alkynyl, aryl, $-NR^xR^y$, $-C(O)NR^xR^y$, or a combination thereof; $R^x$ and $R^y$ are independently H, OH, alkyl, alkenyl, alkynyl, cycloalkyl, aryl, alkylaryl, or heteroaryl; and $R^{11}$ is a hydroxyl anion, halide anion, nitrate anion, carboxylate anion, sulfonate anion, phosphate anion, borate anion, tetrafluoride anion, or hexafluoride anion, any of which is optionally substituted; and a donor co-initiator comprising a borate salt of Formula II:

wherein $R^{12}$, $R^{13}$, $R^{14}$, and $R^{15}$ are each independently H, OH, halogen, alkyl, alkenyl, alkynyl, cycloalkyl, aryl, alkylaryl, or heteroaryl, any of which is optionally substituted with halide, hydroxy, thiol, carbonyl, alkoxy, alkylhydroxy, carboxyl, amino, amido, alkyl, alkenyl, alkynyl, cycloalkyl, aryl, $-NR^xR^y$, $-C(O)NR^xR^y$, or a combination thereof; $R^{16}$ is an ammonium cation, a phosphonium cation, a sulphonium cation, or a heteroaryl cation, any of which is optionally substituted with halide, hydroxy, thiol, carbonyl, alkoxy, alkylhydroxy, carboxyl, amino, amido, alkyl, alkenyl, alkynyl, cycloalkyl, aryl, $-NR^xR^y$, $-C(O)NR^xR^y$, or a combination thereof; and $R^x$ and $R^y$ are independently H, OH, alkyl, alkenyl, alkynyl, cycloalkyl, aryl, alkylaryl, or heteroaryl.

In some examples, the (co)monomer comprises an ethylenically unsaturated monomer. In some examples, the (co)monomer comprises at least one acrylate end group. In some examples, the (co)monomer comprises a (meth)acrylate monomer, a (meth)acrylamide monomer, a vinyl acetate monomer, a styrenic monomer, or a combination thereof. In some examples, the (co)monomer comprises an acrylate monomer. In some examples, the (co)monomer comprises a urethane-(meth)acrylate monomer. In some examples, the (co)monomer comprises N,N-Dimethylacrylamide (DMA); trimethylolpropane triacrylate (TMPTA); 2-hydroxyethyl acrylate (HEA); 2-hydroxyethyl methacrylate (HEMA); isobornyl acrylate (iBoA); tri(propylene glycol) diacrylate (TPGDA); an oligourethane di(meth)acrylate; or a combination thereof. In some examples, the (co)monomer comprises isobornyl acrylate; N,N-dimethylacrylamide; 2-hydroxy ethylacrylate; or a combination thereof.

In some examples, the photosensitizer comprises a xanthene of Formula III:

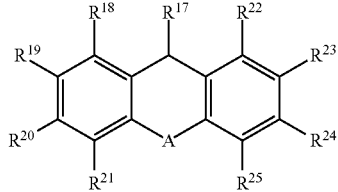

III wherein A is O, S, Se, Te, $NR^x$, $CR^xR^y$, $SiR^xR^y$, or $GeR^xR^y$; $R^{17}$, $R^{18}$, $R^{19}$, $R^{20}$, $R^{21}$, $R^{22}$, $R^{23}$, $R^{24}$, and $R^{25}$ are each independently H, OH, halogen, alkyl, alkenyl, alkynyl, cycloalkyl, aryl, alkylaryl, or heteroaryl, any of which is optionally substituted with halide, hydroxy, thiol, carbonyl, alkoxy, alkylhydroxy, carboxyl, amino, amido, alkyl, alkenyl, alkynyl, cycloalkyl, aryl, $-NR^xR^y$, $-C(O)NR^xR^y$, or a combination thereof, or wherein, as valence permits, two or more of $R^{17}$-$R^{25}$, together with the atoms to which they are attached, form a 3-10 membered cyclic moiety, wherein any of the additional atoms are optionally heteroatoms and the 3-10 membered cyclic moiety is optionally substituted with halide, hydroxy, thioether, carbonyl, alkoxy, alkylhydroxy, carboxyl, amino, amido, alkyl, alkenyl, alkynyl, aryl, $-NR^xR^y$, $-C(O)NR^xR^y$, or a combination thereof; and $R^x$ and $R^y$ are independently H, OH, alkyl, alkenyl, alkynyl, cycloalkyl, aryl, alkylaryl, or heteroaryl.

In some examples of Formula III, A is O.

In some examples, the photosensitizer comprises 4,5,6,7-tetrachloro-2',4',5',7'-tetraiodofluorescein; 6-butoxy-2,4-diiodo-3H-xanthen-3-one; or a combination thereof.

In some examples, the photosensitizer comprises a boron-dipyrromethene of Formula IV:

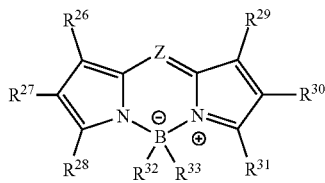

IV wherein Z is N, $SiR^x$, or $CR^x$; $R^{26}$, $R^{27}$, $R^{28}$, $R^{29}$, $R^{30}$, $R^{31}$, $R^{32}$, and $R^{33}$ are each independently H, OH, halogen, alkyl, alkenyl, alkynyl, cycloalkyl, aryl, alkylaryl, or heteroaryl, any of which is optionally substituted with halide, hydroxy, thiol, carbonyl, alkoxy, alkylhydroxy, carboxyl, amino, amido, alkyl, alkenyl, alkynyl, cycloalkyl, aryl, $-NR^xR^y$, $-C(O)NR^xR^y$, or a combination thereof, or wherein, as valence permits, two or more of $R^{26}$-$R^{33}$, together with the atoms to which they are attached, form a 3-10 membered cyclic moiety, wherein any of the additional atoms are optionally heteroatoms and the 3-10 membered cyclic moiety is optionally substituted with halide, hydroxy, thioether, carbonyl, alkoxy, alkylhydroxy, carboxyl, amino, amido, alkyl, alkenyl, alkynyl, aryl, $-NR^xR^y$, $-C(O)NR^xR^y$, or a combination thereof; and $R^x$ and $R^y$ are independently H, OH, alkyl, alkenyl, alkynyl, cycloalkyl, aryl, alkylaryl, or heteroaryl.

In some examples, the photosensitizer comprises a boron-dipyrromethene of Formula IVa:

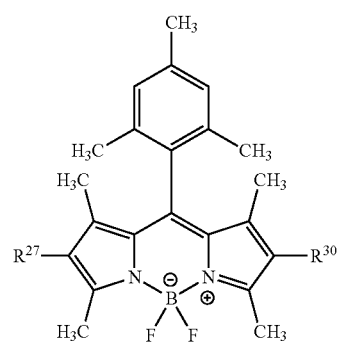

IVa wherein $R^{27}$ and $R^{30}$ are each independently H, Cl, Br, or I.

In some examples of Formula IVa, $R^{27}$ and $R^{30}$ are the same.

In some examples, the photosensitizer is selected from the group consisting of:

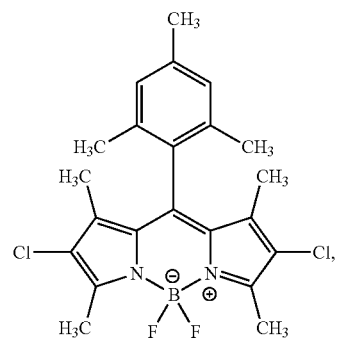

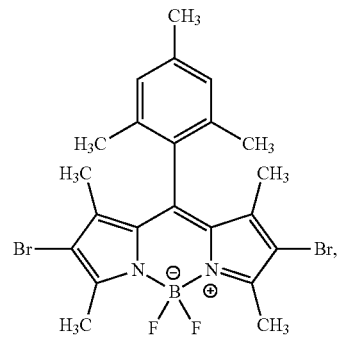

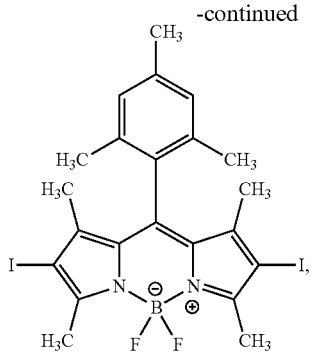

and combinations thereof.

In some examples, the photosensitizer comprises a boron-dipyrromethene of Formula IVb:

IVb

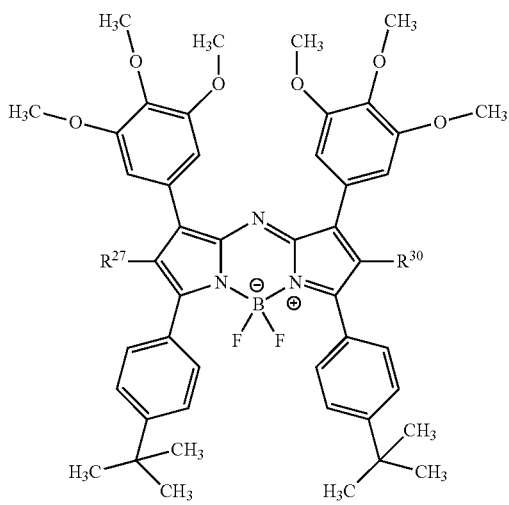

wherein $R^{27}$ and $R^{30}$ are each independently H, Cl, Br, or I.

In some examples of Formula IVb, $R^{27}$ and $R^{30}$ are the same.

In some examples, the photosensitizer is selected from the group consisting of:

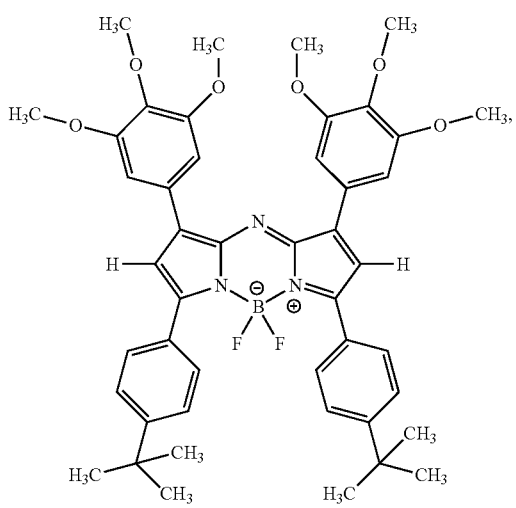

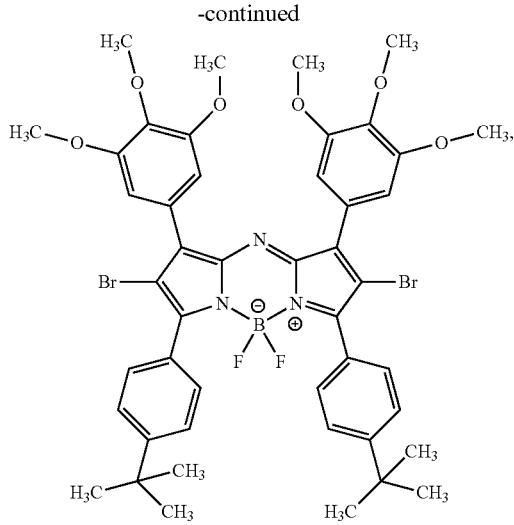

and combinations thereof.

In some examples, the photosensitizer is selected from the group consisting of:

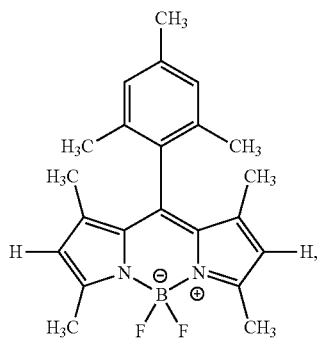

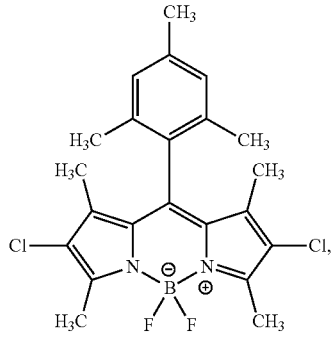

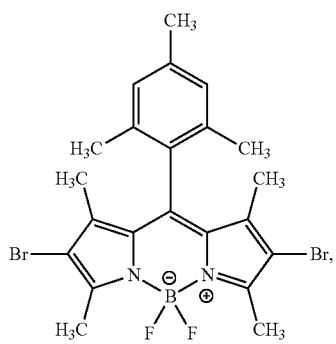

-continued

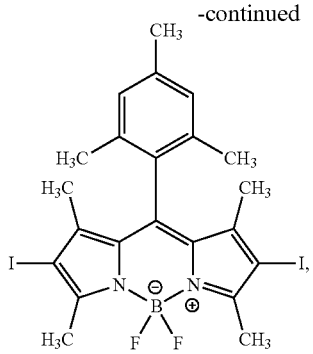

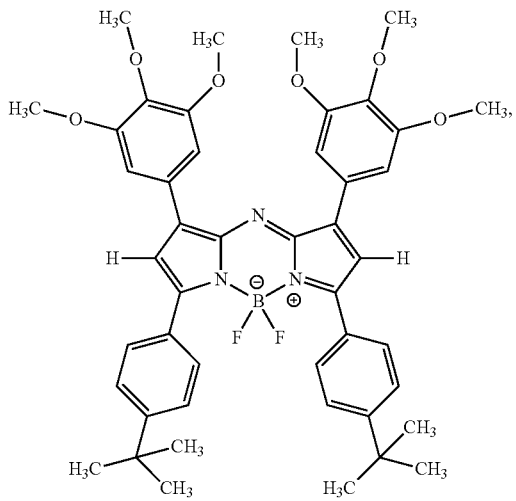

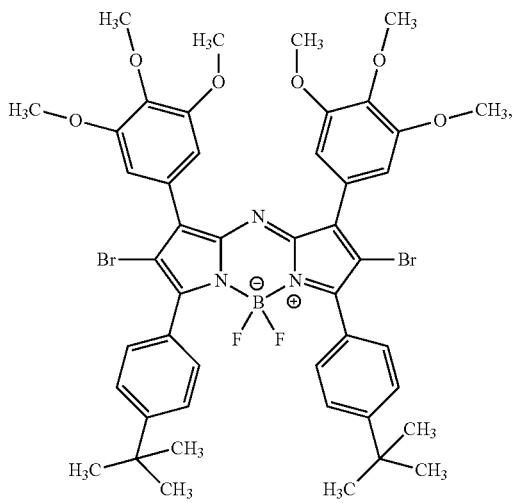

and combinations thereof.

In some examples, the photosensitizer comprises a porphyrin of Formula V:

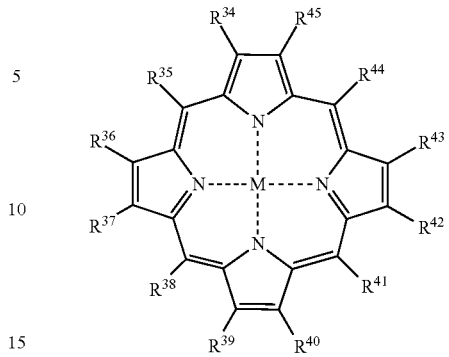

wherein M is null, Zn, Mn, Fe, Co, Ti, Cr, Ni, or Cu; $R^{34}$, $R^{35}$, $R^{36}$, $R^{37}$, $R^{38}$, $R^{39}$, $R^{40}$, $R^{41}$, $R^{42}$, $R^{43}$, $R^{44}$, and $R^{45}$ are each independently H, OH, halogen, alkyl, alkenyl, alkynyl, cycloalkyl, aryl, alkylaryl, or heteroaryl, any of which is optionally substituted with halide, hydroxy, thiol, carbonyl, alkoxy, alkylhydroxy, carboxyl, amino, amido, alkyl, alkenyl, alkynyl, cycloalkyl, aryl, —$NR^xR^y$, —$C(O)NR^xR^y$, or a combination thereof, or wherein, as valence permits, two or more of $R^{34}$-$R^{45}$, together with the atoms to which they are attached, form a 3-10 membered cyclic moiety, wherein any of the additional atoms are optionally heteroatoms and the 3-10 membered cyclic moiety is optionally substituted with halide, hydroxy, thioether, carbonyl, alkoxy, alkylhydroxy, carboxyl, amino, amido, alkyl, alkenyl, alkynyl, aryl, —$NR^xR^y$, —$C(O)NR^xR^y$, or a combination thereof; and $R^x$ and $R^y$ are independently H, OH, alkyl, alkenyl, alkynyl, cycloalkyl, aryl, alkylaryl, or heteroaryl.

In some examples, the photosensitizer comprises zinc tetraphenylporphyrin (ZnTPP).

In some examples, the photosensitizer comprises a xanthene, a boron-dipyrromethene, a porphyrin, or a combination thereof.

In some examples, the photosensitizer comprises a squaraine of Formula VI:

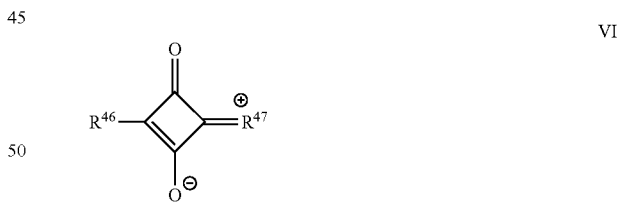

wherein $R^{46}$ and $R^{47}$ are each independently H, OH, halogen, alkyl, alkenyl, alkynyl, cycloalkyl, aryl, alkylaryl, or heteroaryl, any of which is optionally substituted with halide, hydroxy, thiol, carbonyl, alkoxy, alkylhydroxy, carboxyl, amino, amido, alkyl, alkenyl, alkynyl, cycloalkyl, aryl, —$NR^xR^y$, —$C(O)NR^xR^y$, or a combination thereof; and $R^x$ and $R^y$ are independently H, OH, alkyl, alkenyl, alkynyl, cycloalkyl, aryl, alkylaryl, or heteroaryl.

In some examples, the photosensitizer comprises a xanthene, a squaraine, a boron-dipyrromethene, a porphyrin, or a combination thereof.

In some examples, the photosensitizer comprises a cyanine of Formula VII:

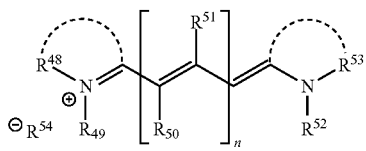

wherein n is from 0 to 10; $R^{48}$, $R^{49}$, $R^{50}$, $R^{51}$, $R^{52}$, $R^{53}$ each independently H, OH, halogen, alkyl, alkenyl, alkynyl, cycloalkyl, aryl, alkylaryl, or heteroaryl, any of which is optionally substituted with halide, hydroxy, thiol, carbonyl, alkoxy, alkylhydroxy, carboxyl, amino, amido, alkyl, alkenyl, alkynyl, cycloalkyl, aryl, —$NR^xR^y$, —$C(O)NR^xR^y$, or a combination thereof; the dotted line to $R^a$ indicates that, as valence permits, Re, together with the atoms to which it is attached, can optionally form a 3-10 membered cyclic moiety with the backbone of the cyanine, wherein any of the additional atoms are optionally heteroatoms and the 3-10 membered cyclic moiety is optionally substituted with halide, hydroxy, thioether, carbonyl, alkoxy, alkylhydroxy, carboxyl, amino, amido, alkyl, alkenyl, alkynyl, aryl, —$NR^xR^y$, —$C(O)NR^xR^y$, or a combination thereof; the dotted line to $R^{53}$ indicates that, as valence permits, $R^{53}$, together with the atoms to which it is attached, can optionally form a 3-10 membered cyclic moiety with the backbone of the cyanine, wherein any of the additional atoms are optionally heteroatoms and the 3-10 membered cyclic moiety is optionally substituted with halide, hydroxy, thioether, carbonyl, alkoxy, alkylhydroxy, carboxyl, amino, amido, alkyl, alkenyl, alkynyl, aryl, —$NR^xR^y$, —$C(O)NR^xR^y$, or a combination thereof; $R^x$ and $R^y$ are independently H, OH, alkyl, alkenyl, alkynyl, cycloalkyl, aryl, alkylaryl, or heteroaryl; and $R^{54}$ a hydroxyl anion, halide anion, nitrate anion, carboxylate anion, sulfonate anion, phosphate anion, borate anion, tetrafluoride anion, or hexafluoride anion, any of which is optionally substituted.

In some examples, the photosensitizer is present in an amount of from 0.00001 to 5 wt %, from 0.01 to 1 wt %, or from 0.05 to 0.5 wt % relative to the total amount of (co)monomer in the photocurable composition. In some examples, the photosensitizer is present in an amount of from 0.1 wt % to 0.3 wt % relative to the total amount of (co)monomer in the photocurable composition.

In some examples, the donor co-initiator comprises a borate salt of Formula II and $R^{12}$, $R^{13}$, $R^{14}$, and $R^{15}$ are each independently alkyl, alkenyl, alkynyl, cycloalkyl, aryl, or alkylaryl, any of which is optionally substituted. In some examples, the donor co-initiator comprises a borate salt of Formula II and $R^{12}$, $R^{13}$, $R^{14}$, and $R^{15}$ are each independently alkyl, cycloalkyl, aryl, or alkylaryl, any of which is optionally substituted. In some examples, the donor co-initiator comprises a borate salt of Formula II and $R^{12}$, $R^{13}$, $R^{14}$, and $R^{15}$ are each independently unsubstituted alkyl, unsubstituted cycloalkyl, unsubstituted aryl, or unsubstituted alkylaryl. In some examples, the donor co-initiator comprises a borate salt of Formula II and $R^{12}$, $R^{13}$, $R^{14}$, and $R^{15}$ are each independently unsubstituted alkyl, or unsubstituted aryl.

In some examples of Formula II, $R^{16}$ is a quaternary ammonium cation having a formula of $NR^aR^bR^cR^d$ wherein $R^a$, $R^b$, $R^c$, and $R^d$ are each independently alkyl, alkenyl, alkynyl, cycloalkyl, aryl, or alkylaryl, any of which is optionally substituted with halide, hydroxy, thiol, carbonyl, alkoxy, alkylhydroxy, carboxyl, amino, amido, alkyl, alkenyl, alkynyl, cycloalkyl, aryl, —$NR^xR^y$, —$C(O)NR^xR^y$, or a combination thereof; and $R^x$ and $R^y$ are independently H, OH, alkyl, alkenyl, alkynyl, cycloalkyl, aryl, alkylaryl, or heteroaryl. In some examples, $R^a$, $R^b$, $R^c$, and $R^d$ are each independently alkyl, alkenyl, alkynyl, cycloalkyl, aryl, or alkylaryl, any of which is optionally substituted. In some examples, $R^a$, $R^b$, $R^c$, and $R^d$ are each independently alkyl, cycloalkyl, aryl, or alkylaryl, any of which is optionally substituted.

In some examples, the donor co-initiator comprises 2-(butyryloxy)-N,N,N-trimethylethan-1-aminium butyltriphenylborate.

In some examples, the donor co-initiator is present in an amount of from 0.001 to 5 wt %, from 0.05 to 1 wt %, or from 0.1 to 0.3 wt % relative to the total amount of (co)monomer in the photocurable composition. In some examples, the donor co-initiator is present in an amount of 0.2 wt % relative to the total amount of (co)monomer in the photocurable composition.

In some examples, the acceptor co-initiator comprises a diphenyliodonium salt of Formula I and $R^1$-$R^{10}$ are each independently H, OH, halogen, or alkyl, any of which is optionally substituted. In some examples, the acceptor co-initiator comprises a diphenyliodonium salt of Formula I and $R^1$-$R^{10}$ are each independently H or alkyl, any of which is optionally substituted. In some examples, the acceptor co-initiator comprises a diphenyliodonium salt of Formula I and $R^{11}$ is a hexafluoride. In some examples, the acceptor co-initiator comprises a diphenyliodonium salt of Formula I and $R^{11}$ is hexafluoroantimonate.

In some examples, the acceptor co-initiator comprises [4-(octyloxy)phenyl](phenyl)iodonium hexafluoroantimonate.

In some examples, the acceptor co-initiator is present in an amount of from 0.001 to 5 wt %, from 0.1 to 3 wt %, or from 1 to 3 wt % relative to the total amount of (co)monomer in the photocurable composition. In some examples, the acceptor co-initiator is present in an amount of 2 wt % relative to the total amount of (co)monomer in the photocurable composition.

In some examples, the photocurable composition further comprises a crosslinker. In some examples, the crosslinker comprises a vinylic crosslinker, a multifunctional thiol crosslinker, an alkynyl crosslinker, or a combination thereof. In some examples, the crosslinker comprises a di(meth)acrylate crosslinker, a tri(meth)acrylate crosslinker, a bis(meth)acrylamide crosslinker, a trithiol crosslinker, a tetrathiol crosslinker, or a combination thereof. In some examples, the crosslinker comprises a di(meth)acrylate crosslinker, a tri(meth)acrylate crosslinker, or a combination thereof. In some examples, the crosslinker comprises a diacrylate crosslinker, a triacrylate crosslinker, or a combination thereof. In some examples, the crosslinker comprises trimethylolpropane triacrylate, tetraethylene glycol diacrylate, or a combination thereof.

In some examples, the photocurable composition further comprises an opacifier. In some examples, the opacifier comprises an azo-dye. In some examples, the opacifier comprises Sudan I, Sudan IV, Sudan black B, or a combination thereof. In some examples, the opacifier is present in an amount of from 0.00001 to 10 wt %, from 0.00001 to 5 wt %, from 0.001 wt % to 1 wt %, or from 0.01 to 0.5 wt % relative to the total amount of (co)monomer in the photocurable composition. In some examples, the opacifier is present in an amount of 0.05 wt % or less relative to the total amount of (co)monomer in the photocurable composition.

In some examples, the photocurable composition further comprises a solvent.

In some examples, the photocurable composition further comprises an oxygen scavenger. In some examples, the oxygen scavenger comprises a hydrogen donor, an n-vinyl amide, a reducing agent, a singlet oxygen scavenger, or a combination thereof. In some examples, the oxygen scavenger comprises a hydrogen donor comprising a thiol, an amine, a hydrogen phosphite, a silane, a stannane, a benzaldehyde, or a combination thereof. In some examples, the oxygen scavenger comprises a hydrogen donor comprising methyl diethanolamine (MDEA); 1,4-diazabicyclo[2.2.2]octane (DABCO); tribenzylamine; trimethylolpropane tris(3-mercaptopropionate) (TMPMP); pentaerythritol tetrakis(3-mercaptopropionate) (PETMP); dioleyl hydrogen phosphite; tris(trimethylsilyl)silane; tributyltin hydride; 4-anisaldehyde; or a combination thereof. In some examples, the oxygen scavenger comprises an N-vinyl amide comprising n-vinylpyrrolidone; n-methyl-2-pyrrolidone; or a combination thereof. In some examples, the oxygen scavenger comprises a reducing comprising a phosphine, a phosphite, a sulphite, a borane-amine complex, or a combination thereof. In some examples, the oxygen scavenger comprises a reducing agent comprising triphenyl phosphone ($PPh_3$); trioctyl phosphine; triphenyl phosphite; tetraphenyldipropyleneglycoldiphosphite; poly(dipropyleneglycol)phenylphosphite; alkyl ($C_{12}$-$C_{15}$) bisphenol A phosphite; tris(tridecyl)phosphite; 3,9-bis(octadecyloxy)-2,4,8,10-tetraoxa-3,9-diphosphaspiro[5.5]undecane; ethylene sulphite; dimethylamine-borane complex; or a combination thereof. In some examples, the oxygen scavenger comprises a singlet oxygen scavenger and the singlet oxygen scavenger comprises a diphenyl furan, an anthracene, or a combination thereof. In some examples, the oxygen scavenger comprises a singlet oxygen scavenger comprising 2,5-diphenyl furan; 9,10-dibutyl anthracene; or a combination thereof. In some examples, the oxygen scavenger comprises a thiol. In some examples, the oxygen scavenger comprises a multifunctional thiol. In some examples, the oxygen scavenger comprises a dithiol, a trithiol, a tetrathiol, or a combination thereof. In some examples, the oxygen scavenger comprises a tetrathiol. In some examples, the oxygen scavenger comprises pentaerythritol tetrakis(3-mercaptopropionate) (PETMP); benzene-1,4-dithiol; trithiocyanuric acid; 1,3,4-thiadiazole-2,5-dithiol; 4,4'-thiobisbenzenethiol; triphenylphosphine ($PPh_3$); 1,3-diphenylisobenzofuran (DPBF); (2,2,6,6-1,4-dithiothreitol (DTT); ascorbic acid (AA); or a combination thereof. In some examples, the oxygen scavenger comprises pentaerythritol tetrakis(3-mercaptopropionate) (PETMP); benzene-1,4-dithiol; trithiocyanuric acid; 1,3,4-thiadiazole-2,5-dithiol; 4,4'-thiobisbenzenethiol; or a combination thereof. In some examples, the oxygen scavenger comprises pentaerythritol tetrakis(3-mercaptopropionate) (PETMP). In some examples, the oxygen scavenger is present in an amount of from 0.001 to 10 wt %, from 0.001 to 5 wt %, or from 0.001 wt % to 1 wt % relative to the total amount of (co)monomer in the photocurable composition.

In some examples, the photocurable composition further comprises a radical scavenger. In some examples, the radical scavenger comprises tetramethylpiperidin-1-yl)oxyl (TEMPO). In some examples, the radical scavenger is present in an amount of from 0.00001 to 5 wt %, from 0.001 wt % to 1 wt %, or from 0.001 to 0.5 wt % relative to the total amount of (co)monomer in the photocurable composition.

In some examples, when the photocurable composition is irradiated with light that has an energy that at least partially overlaps with the absorption band of the photosensitizer, then the photosensitizer absorbs at least a portion of the light to become excited and thereby form an excited photosensitizer, and the excited photosensitizer either: accepts an electron from the donor co-initiator to generate a photosensitizer radical anion and a donor radical, the photosensitizer radical anion then donates an electron to the acceptor co-initiator to regenerate the photosensitizer and generate an acceptor radical; or donates an electron to the acceptor co-initiator to generate a photosensitizer radical cation and an acceptor radical, the photosensitizer radical cation then accepts an electron from the donor co-initiator to regenerate the photosensitizer and generate a donor radical; and thereby induces polymerization of the (co)monomer with the donor radical and the acceptor radical.

Also disclosed herein are methods of forming a (co)polymer from the photocurable compositions disclosed herein, the methods comprising: irradiating the photocurable composition with light, wherein the light irradiating the photocurable composition has an energy that at least partially overlaps with the absorption band of the photosensitizer, thereby inducing polymerization of the (co)monomer.

In some examples, the light comprises one or more wavelengths from 400 nm to 1400 nm. In some examples, the light comprises visible light. In some examples, the light comprises one or more wavelengths from 400 nm to 740 nm. In some examples, the light comprises red light, green light, or blue light. In some examples, the light comprises one of more wavelengths from 450 nm to 740 nm. In some examples, the light comprises green light, red light, or NIR light. In some examples, the light comprises one or more wavelengths from 500 nm to 1400 nm. In some examples, the light has an intensity of from 0.01 $mW/cm^2$ to 100 $mW/cm^2$. In some examples, the light has an intensity of 50 $mW/cm^2$ or less, 20 $mW/cm^2$ or less, 10 $mW/cm^2$ or less, 5 $mW/cm^2$ or less, 1 $mW/cm^2$ or less, 0.5 $mW/cm^2$ or less, 0.1 $mW/cm^2$ or less. In some examples, the light is provided by a light source comprising a light emitting diode.

In some examples, the methods further comprise depleting oxygen from the photocurable composition prior to irradiation. In some examples, depleting oxygen from the polymerizable composition comprises bubble degassing the polymerizable composition with an inert gas, using a freeze-pump-thaw method, contacting the polymerizable composition with an oxygen scavenger, or a combination thereof.

In some examples, the (co)polymer is photocured in an amount of time of 1 minute or less, 30 seconds or less, 20 seconds or less, or 10 seconds or less. In some examples, the (co)polymer is photocured in an amount of time of 1 minute or less and the light has an intensity of 10 $mW/cm^2$ or less.

In some examples, when the photosensitizer absorbs at least a portion of the light to become excited and thereby form an excited photosensitizer, and the excited photosensitizer either: accepts an electron from the donor co-initiator to generate a photosensitizer radical anion and a donor radical, the photosensitizer radical anion then donates an electron to the acceptor co-initiator to regenerate the photosensitizer and generate an acceptor radical; or donates an electron to the acceptor co-initiator to generate a photosensitizer radical cation and an acceptor radical, the photosensitizer radical cation then accepts an electron from the donor co-initiator to regenerate the photosensitizer and generate a donor radical; and thereby induces polymerization of the (co)monomer with the donor radical and the acceptor radical to form the (co)polymer.

Also disclosed herein are methods of forming an object via additive manufacturing, the methods comprising: irradiating a first quantity of the photocurable composition on a substrate to induce polymerization of the monomer into a first layer on the substrate using the methods disclosed herein; and forming at least one additional layer on the first layer by irradiating at least a second quantity of the photocurable composition to induce polymerization of the monomer into the at least one additional layer on the first layer using the methods disclosed herein; thereby forming the object. Also disclosed herein are methods of producing a three-dimensional structure using additive manufacturing, the method comprising forming the three-dimensional structure on a layer-by-layer basis using the methods disclosed herein. In some examples, the method comprises stereolithography, digital light processing, or a combination thereof. In some examples, the method has a print rate of 30 seconds/layer or less, 15 seconds/layer or less, or 10 seconds/layer or less. In some examples, the method has a build rate of 5 mm/hour or more, 10 mm/hour or more, 20 mm/hour or more, 30 mm/hour or more, 40 mm/hour or more, 50 mm/hour or more, or 100 mm/hour or more.

Also disclosed herein are articles of manufacture comprising a (co)polymer, object, or three-dimensional structure formed using the methods disclosed herein. Also disclosed herein are articles of manufacture comprising a cured product of the photocurable compositions disclosed herein. In some examples, the article of manufacture comprises a dental (co)polymer, an adhesive, an automotive part, plastic flooring, a thin film coating, a disposable syringe, an intravenous bag, sterile packaging for a medical instrument, a joint replacement, a tissue scaffold, a contact lens, a fiber optic, a transdermal patch, a microneedle array, a hydrogel, a wavelength-selective multi-material structure, a structural plastic, an opaque composite, a microelectronic component, a soft robotic component, or a combination thereof.

Also disclosed herein are methods of use of a (co)polymer, object, or three-dimensional structure formed from the photocurable compositions disclosed herein and/or formed using the methods disclosed herein, the method comprising using the (co)polymer, object, or three-dimensional structure as a biocompatible material, a coating, an adhesive, a structural plastic, or a combination thereof.

Also disclosed herein are methods of use of a (co)polymer, object, or three-dimensional structure formed from the photocurable compositions disclosed herein and/or formed using the methods disclosed herein, the method comprising using the (co)polymer, object, or three-dimensional structure in a medical or dental application, an automotive application, a robotic application, a microelectronic application, an imaging application, or a combination thereof.

Additional advantages of the disclosed compositions and methods will be set forth in part in the description which follows, and in part will be obvious from the description. The advantages of the disclosed compositions and methods will be realized and attained by means of the elements and combinations particularly pointed out in the appended claims. It is to be understood that both the foregoing general description and the following detailed description are exemplary and explanatory only and are not restrictive of the disclosed devices and methods, as claimed.

The details of one or more embodiments of the invention are set forth in the accompanying drawings and the description below. Other features, objects, and advantages of the invention will be apparent from the description and drawings, and from the claims.

BRIEF DESCRIPTION OF THE FIGURES

The accompanying figures, which are incorporated in and constitute a part of this specification, illustrate several aspects of the disclosure, and together with the description, serve to explain the principles of the disclosure.

FIG. 2. Photo-ATR FTIR Setup (1) Argon/Nitrogen gas line (2) Custom glass top with O-ring to create oxygen free atmosphere (3) LED and liquid light guide. Close-up image of custom ATR accessory with green LED on.

Figure 123:
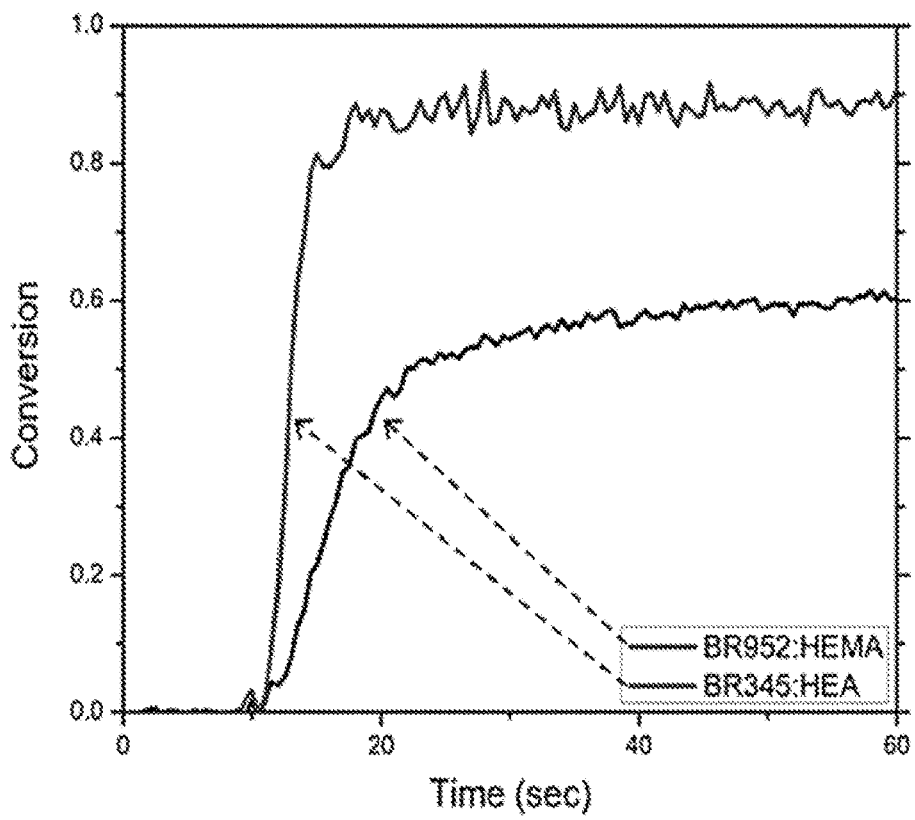

FIG. 123. RT FTIR spectroscopy, monitoring photopolymerizations for resins comprising either BR-952:HEMA:PETMP (in 70/29/1 wt % ratio) or BR-345:HEA:PETMP (in 50/49/1 wt % ratio). 0.3 wt % ZnTPP, 0.2 wt % Borate V, 2 wt % HNu-254, 0.01 wt % TEMPO were added as photoinitiating components. Resins were photopolymerized under ambient conditions. Red LED (617 nm) was turned on at ~10 sec. The lower maximum conversion for the samples containing methacrylate functionality may arise from reduced mobility in the more glass matrix that is formed.

Figure 124:
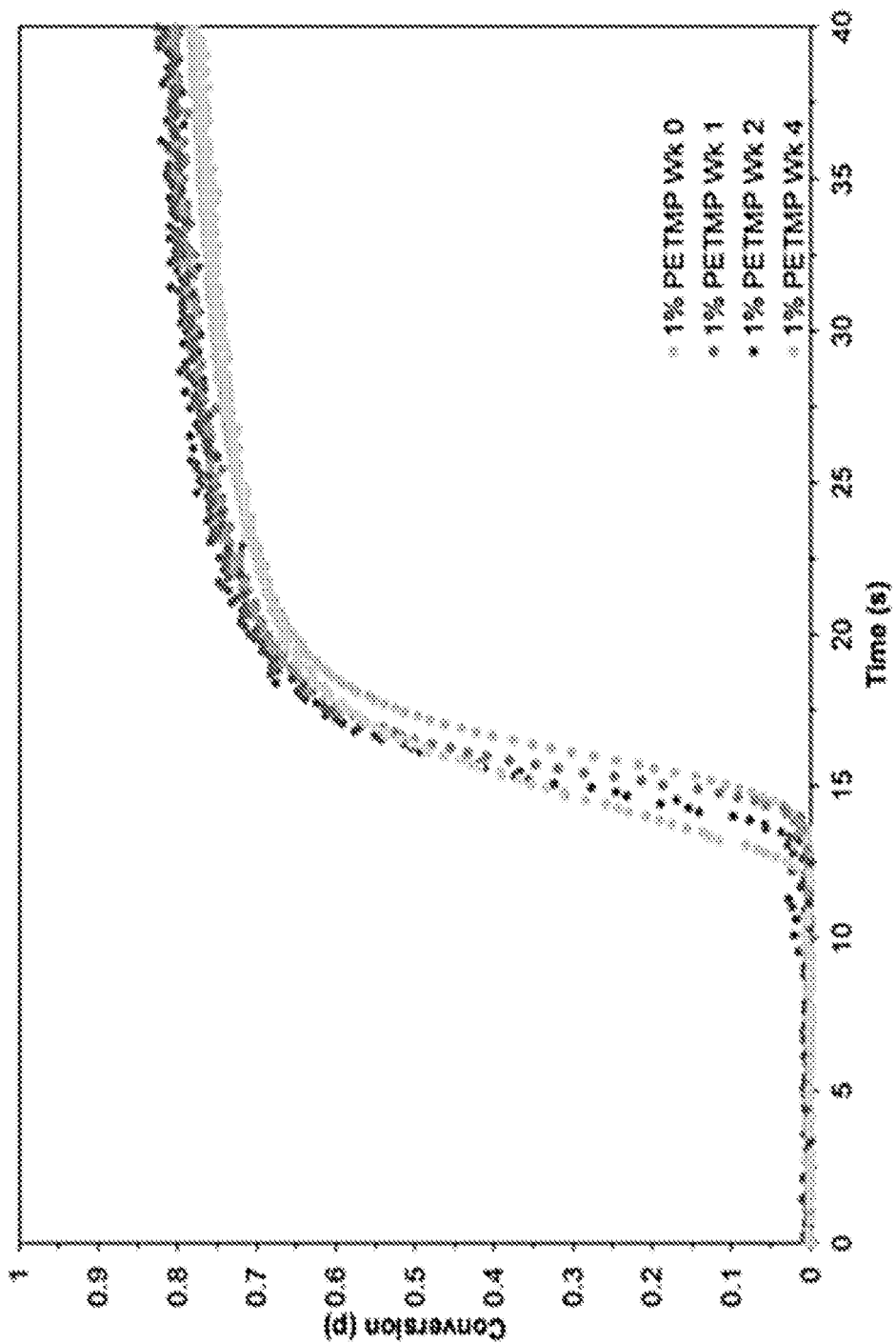

FIG. 124. Stability test. RT FTIR spectroscopy of the representative stiff acrylate Dymax® resin (0.3 wt % ZnTPP, 0.2 wt % Borate V, 2 wt % HNu-254, 0.002 wt % Sudan black, 0.01 wt % TEMPO in BR-741:TPGDA:PETMP=50:49:1, by weight) over time. Exposed to red LED after 10 seconds (617 nm, 2.5 mW/cm$^2$).

Figure 125:
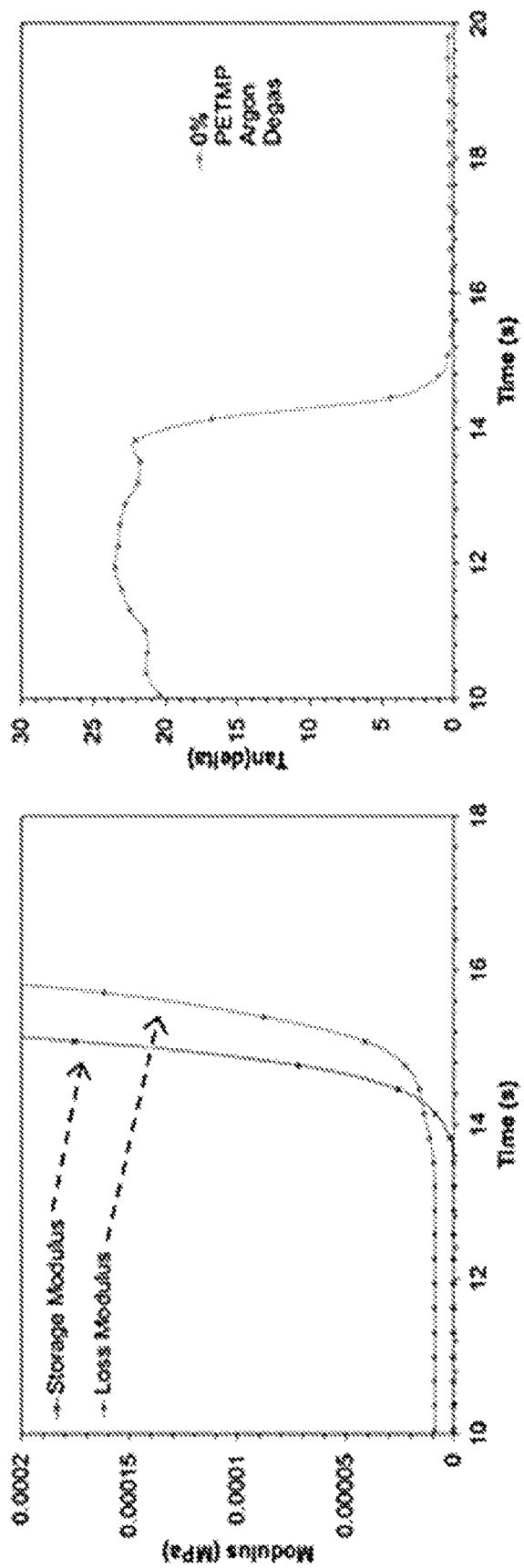

FIG. 125. 0% PETMP with argon degassing and argon flow over the sample during rheology experimentation. 617 nm LED was turned on at 10 seconds.

Figure 126:
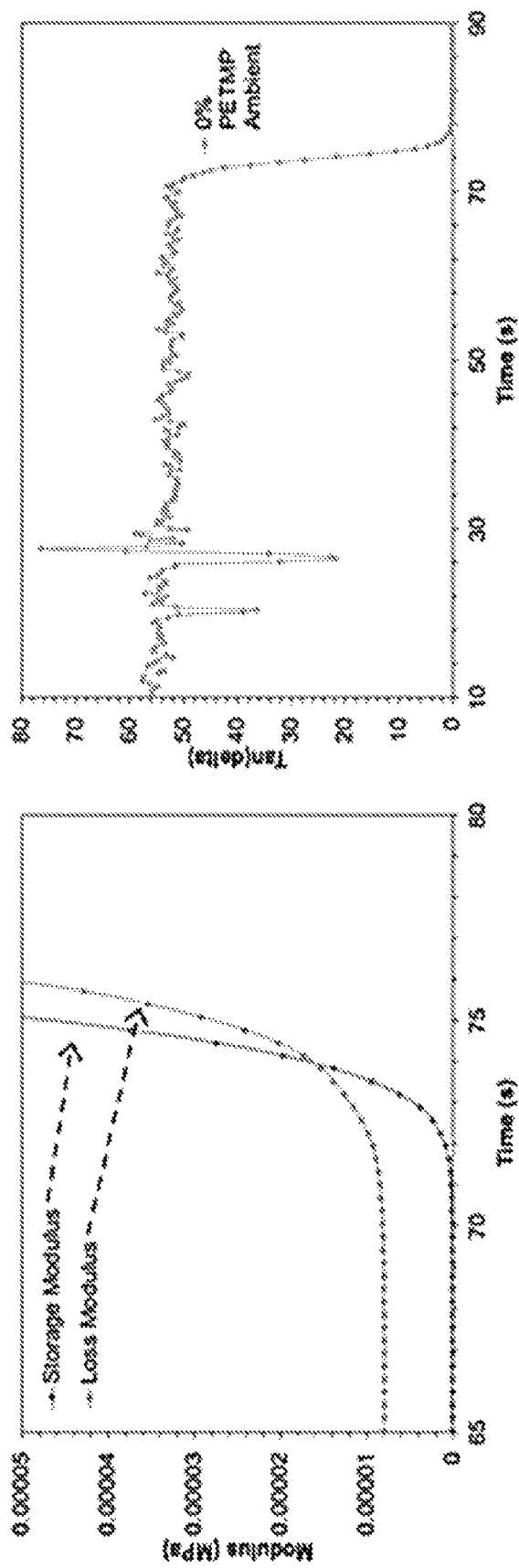

FIG. 126. 0% PETMP without argon degassing or argon flow (ambient conditions). 617 nm LED was turned on at 10 seconds.

Figure 127:
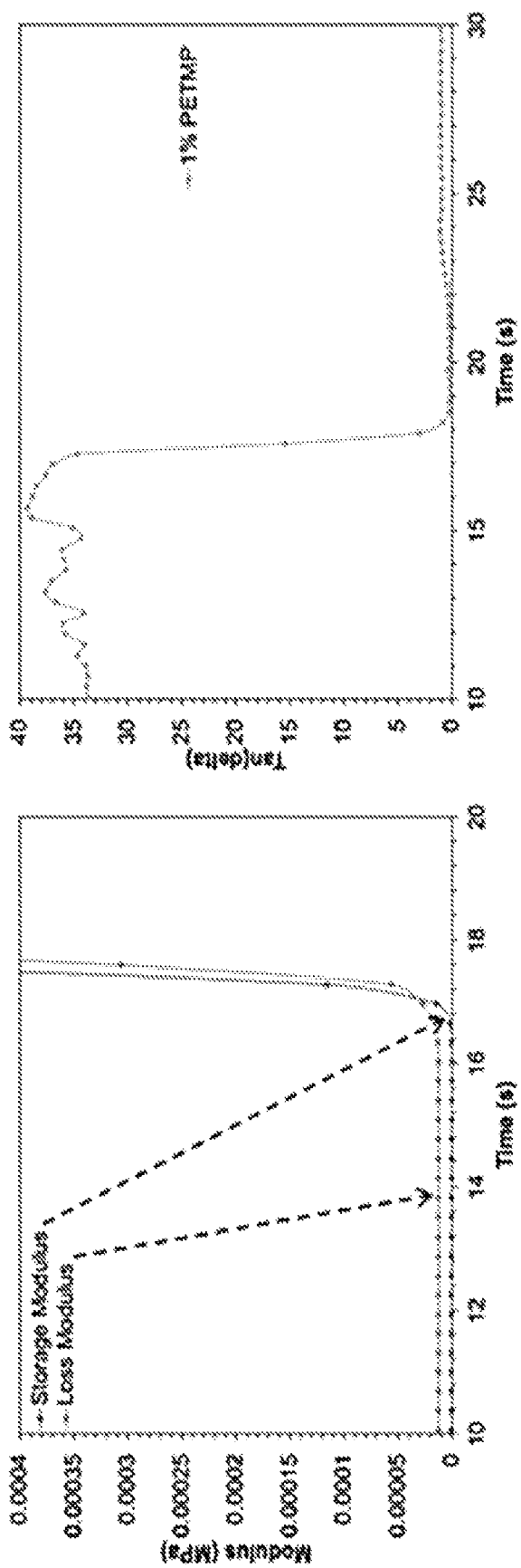

FIG. 127. 1% PETMP without argon degassing or argon flow (ambient conditions). 617 nm LED was turned on at 10 seconds.

Figure 128:
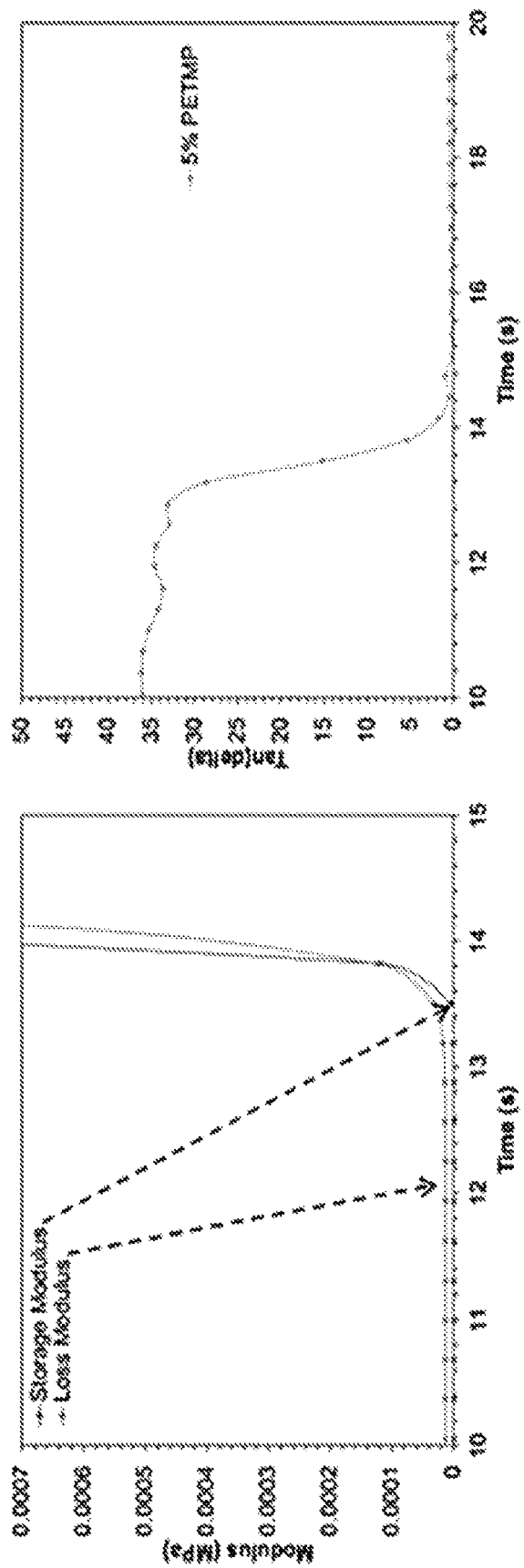

FIG. 128. 5% PETMP without argon degassing or argon flow (ambient conditions). 617 nm LED was turned on at 10 seconds.

Figure 129:
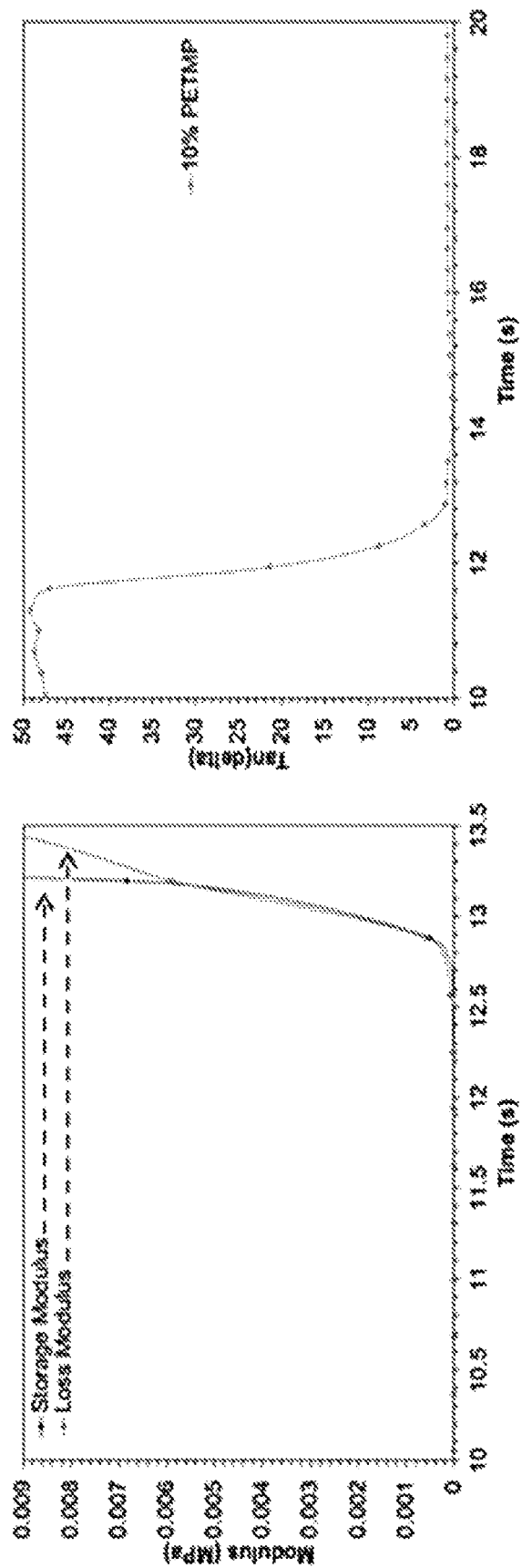

FIG. 129. 10% PETMP without argon degassing or argon flow (ambient conditions). 617 nm LED was turned on at 10 seconds.

Figure 130:
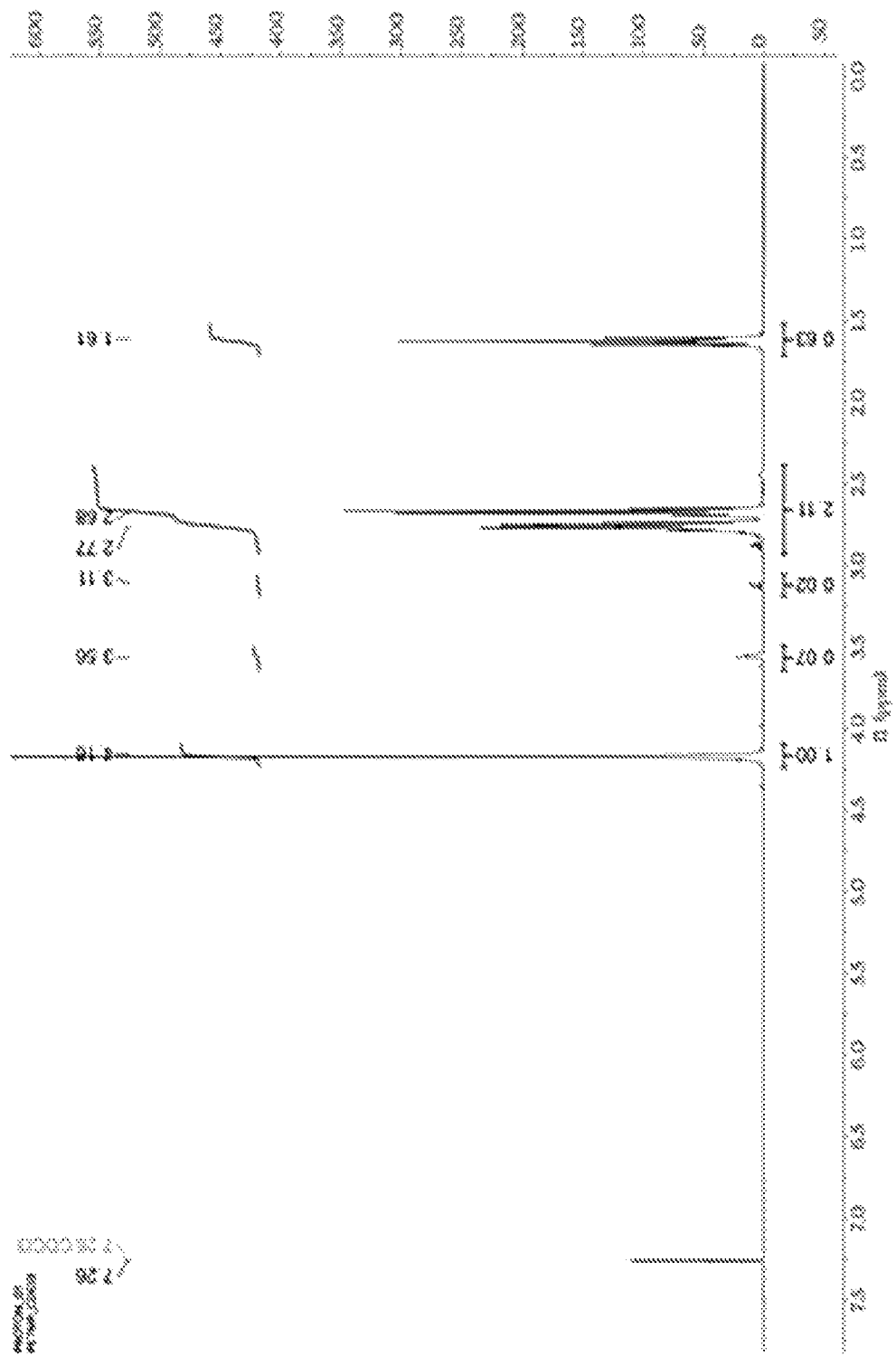

FIG. 130. $^1$H NMR spectrum (CDCl$_3$, 400 MHz) of PETMP.

Figure 131:
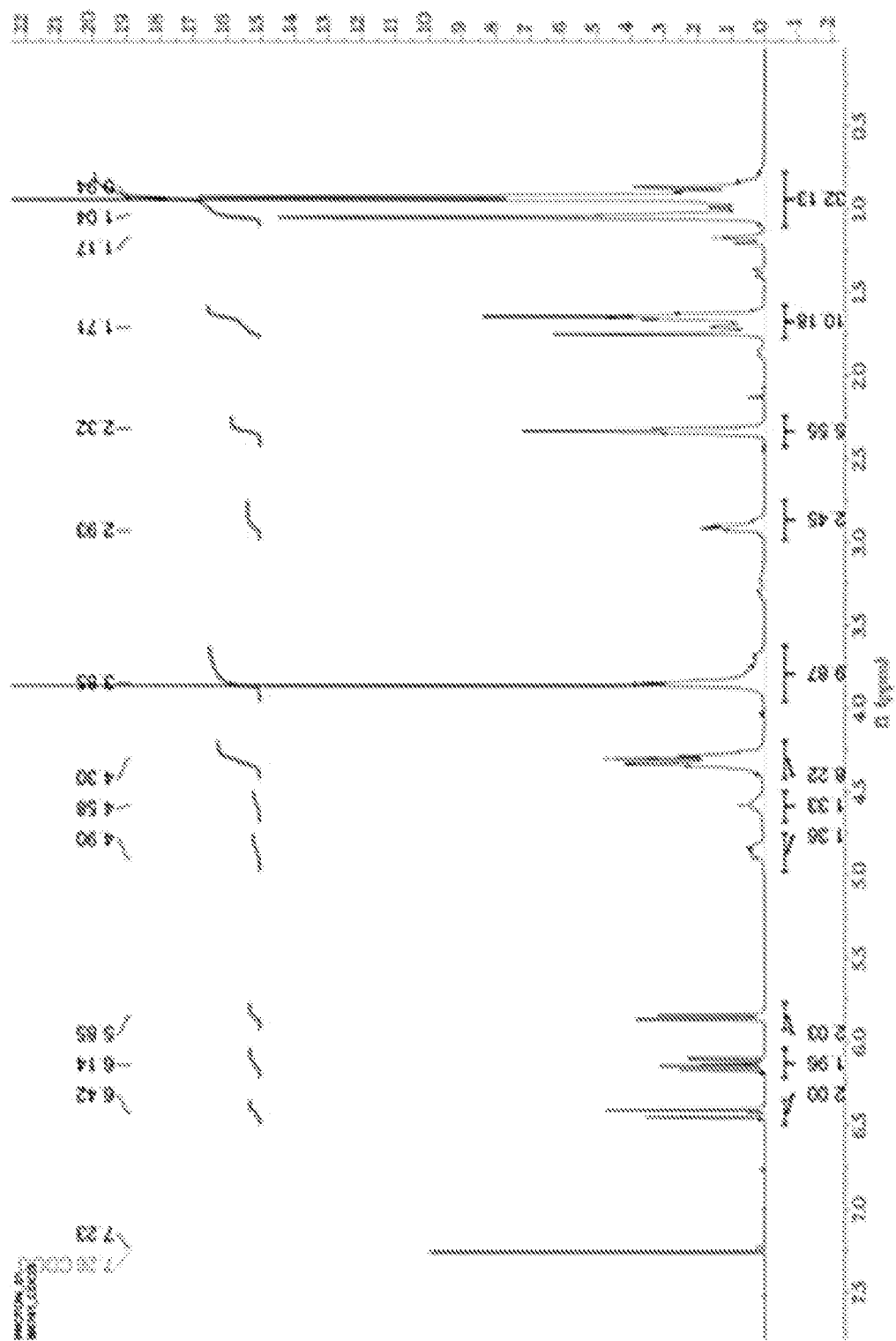

FIG. 131. $^1$H NMR spectrum (CDCl$_3$, 400 MHz) of stiff acrylate Dymax® resin (BR-741).

Figure 132:
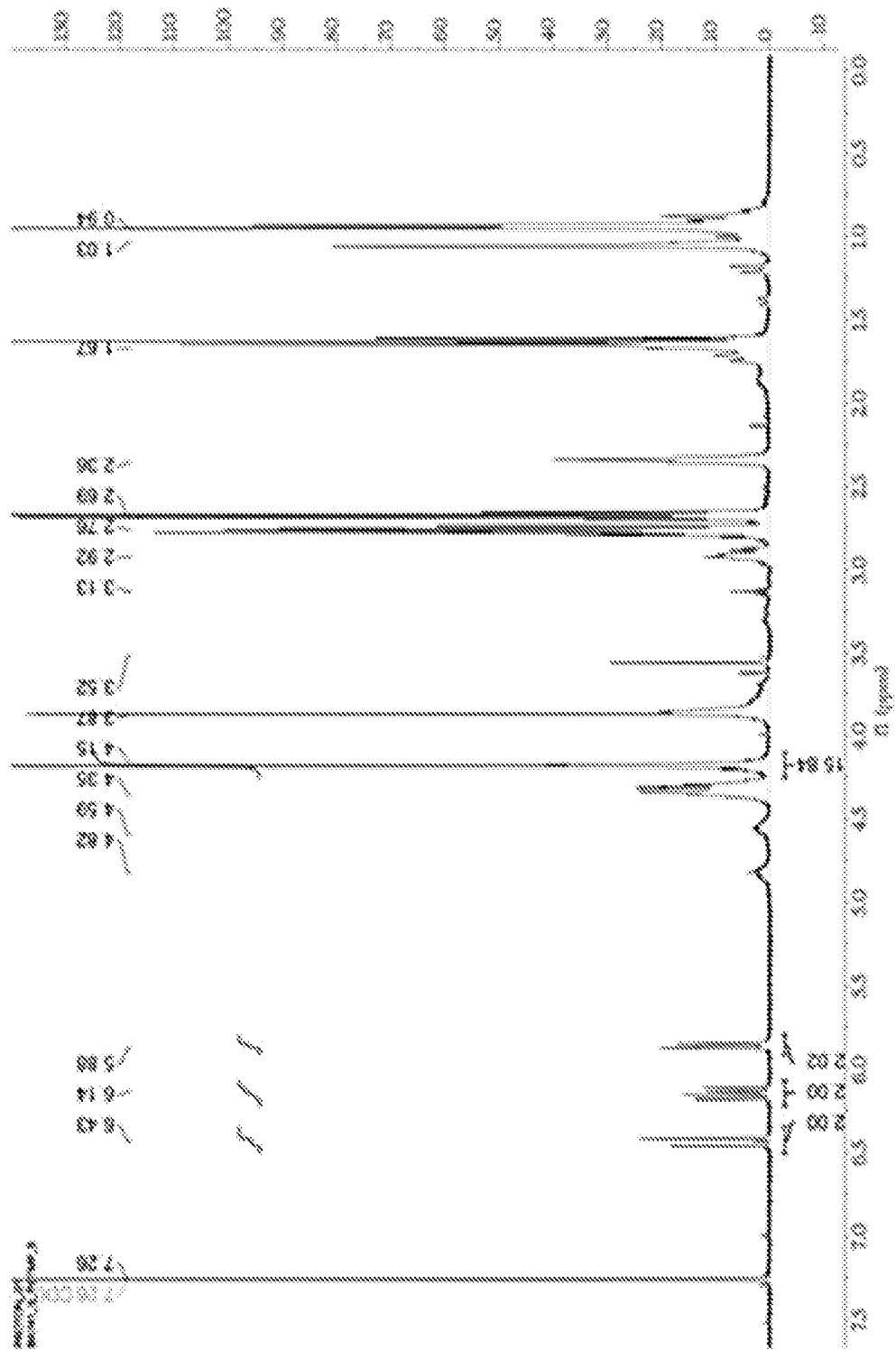

FIG. 132. $^1$H NMR spectrum (CDCl$_3$, 400 MHz) of BR-741 and PETMP in a 1:1 ratio (by weight).

Figure 133:
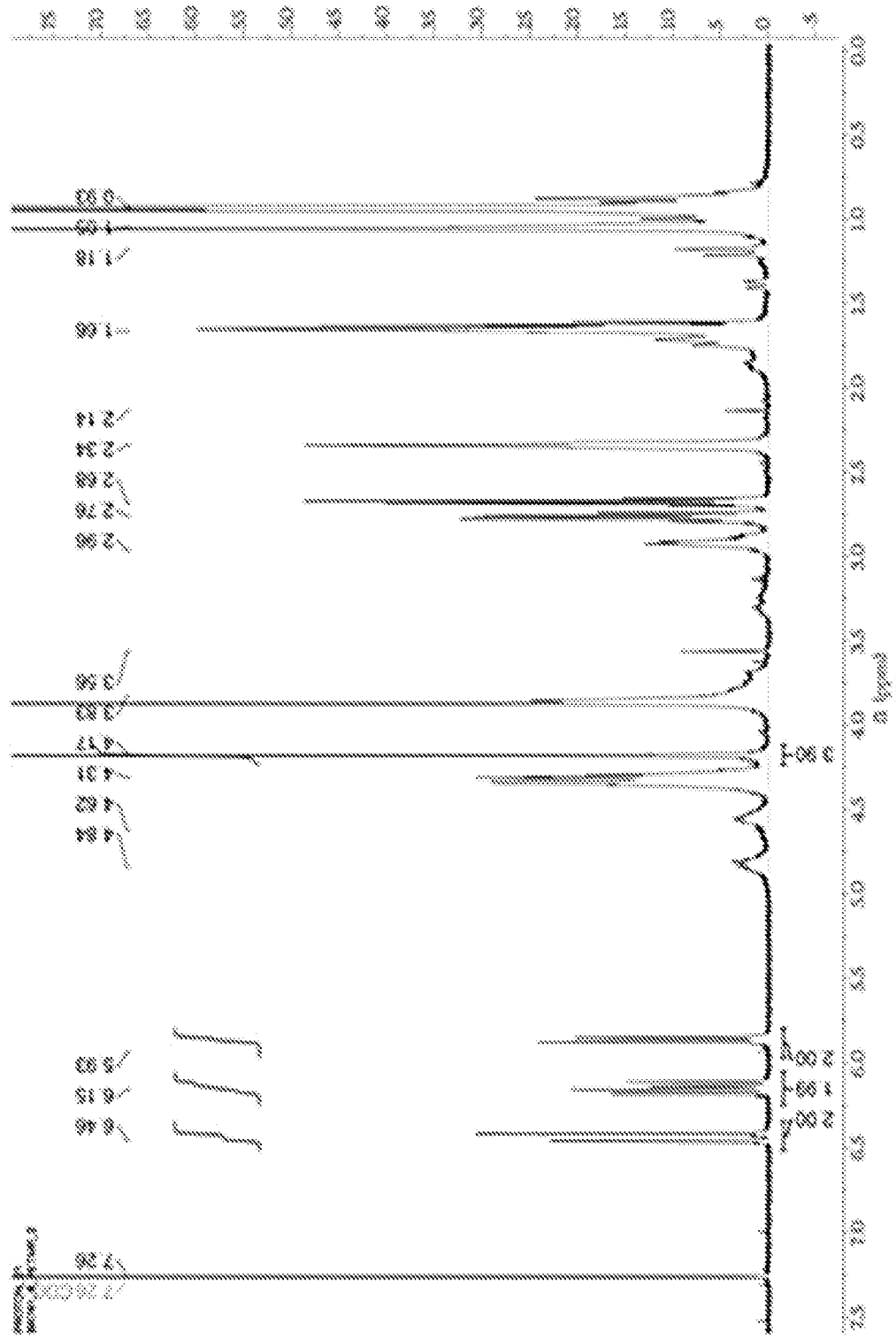

FIG. 133. $^1$H NMR spectrum (CDCl$_3$, 400 MHz) of BR-741 and PETMP in a 4:1 ratio (by weight).

Figure 134:
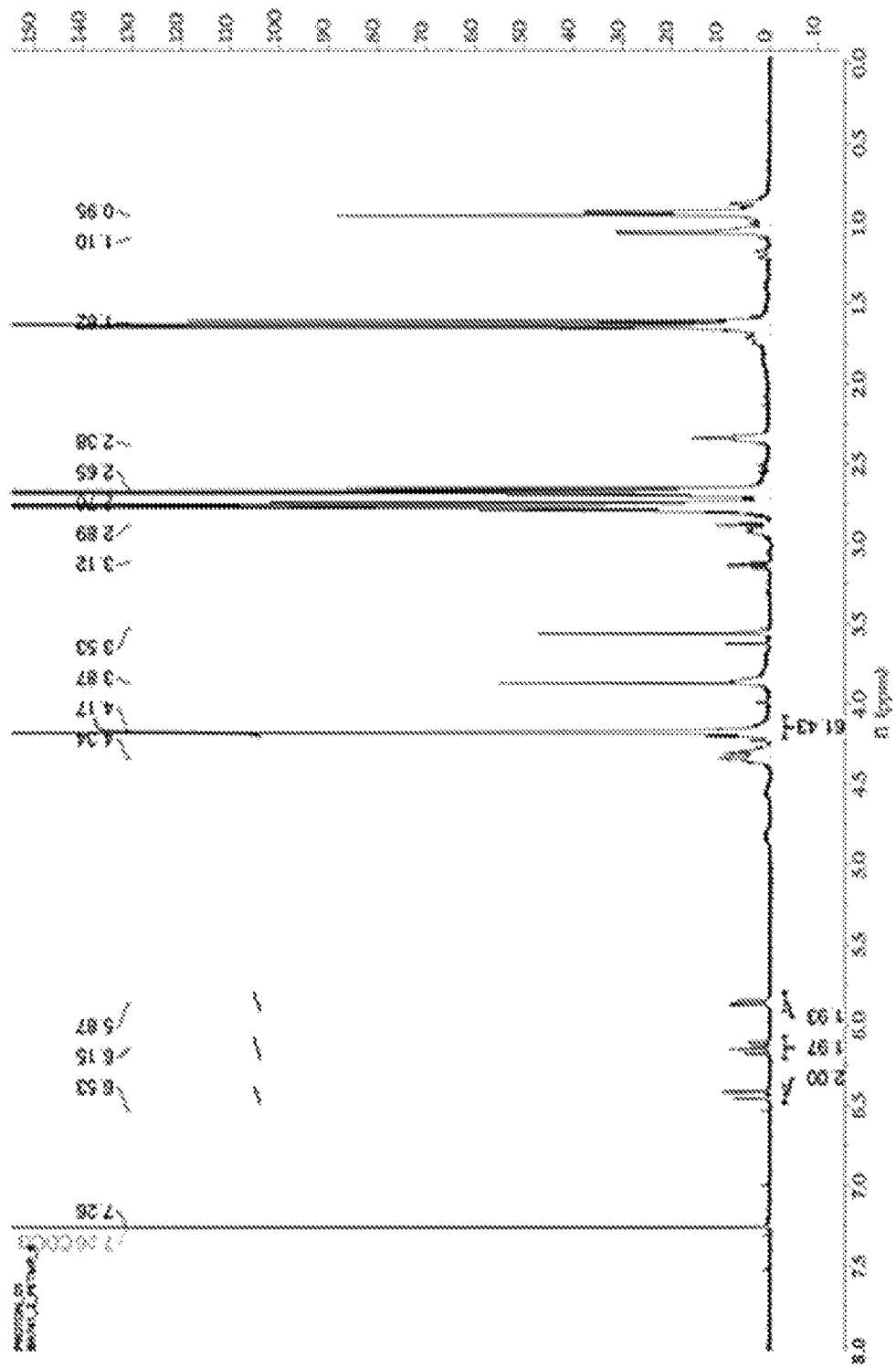

FIG. 134. $^1$H NMR spectrum (CDCl$_3$, 400 MHz) of BR-741 and PETMP in a 1:4 ratio (by weight).

Figure 135:
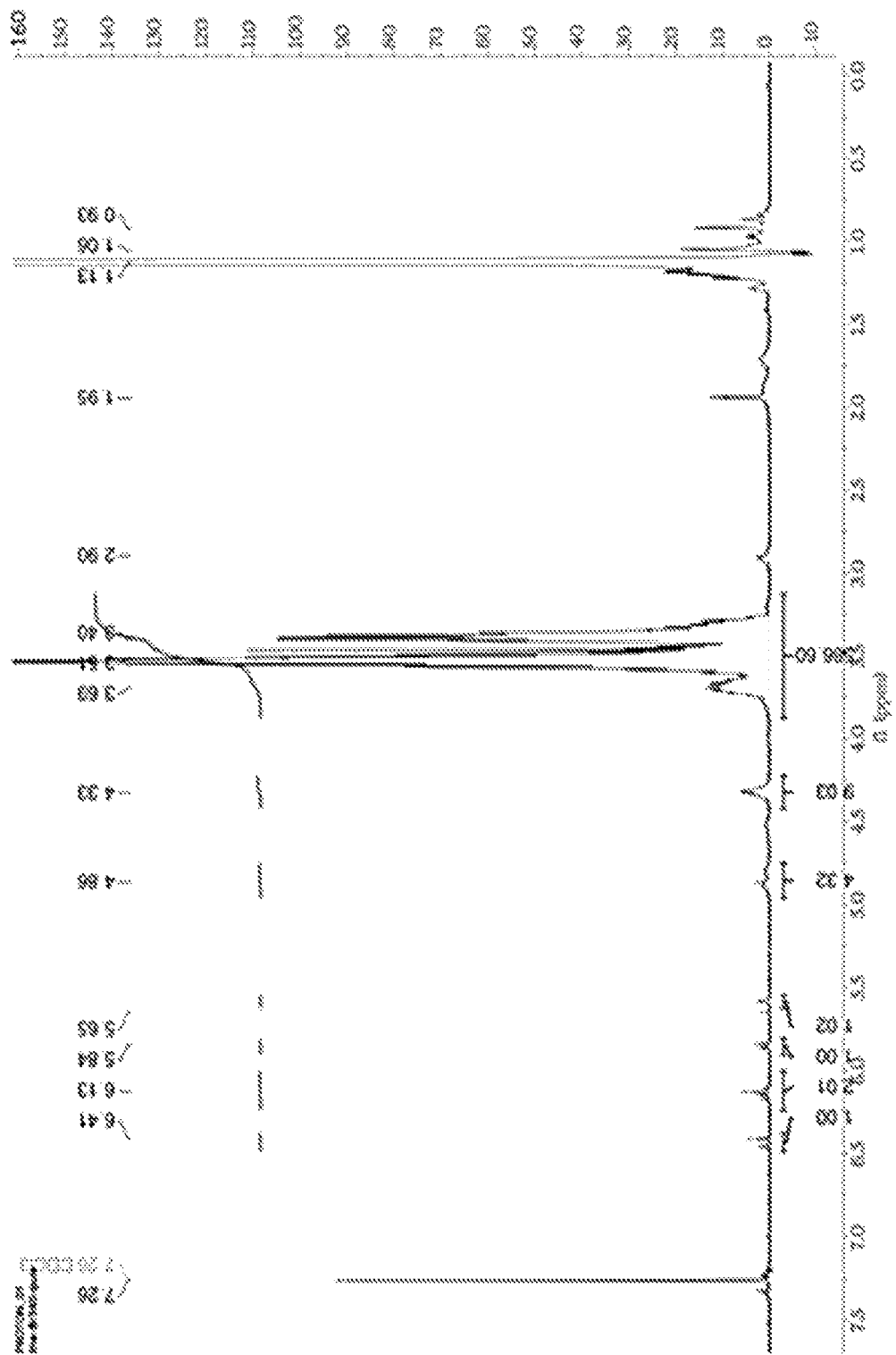

FIG. 135. $^1$H NMR spectrum (CDCl$_3$, 400 MHz) of soft acrylate Dymax® resin (BR-345).

Figure 136:
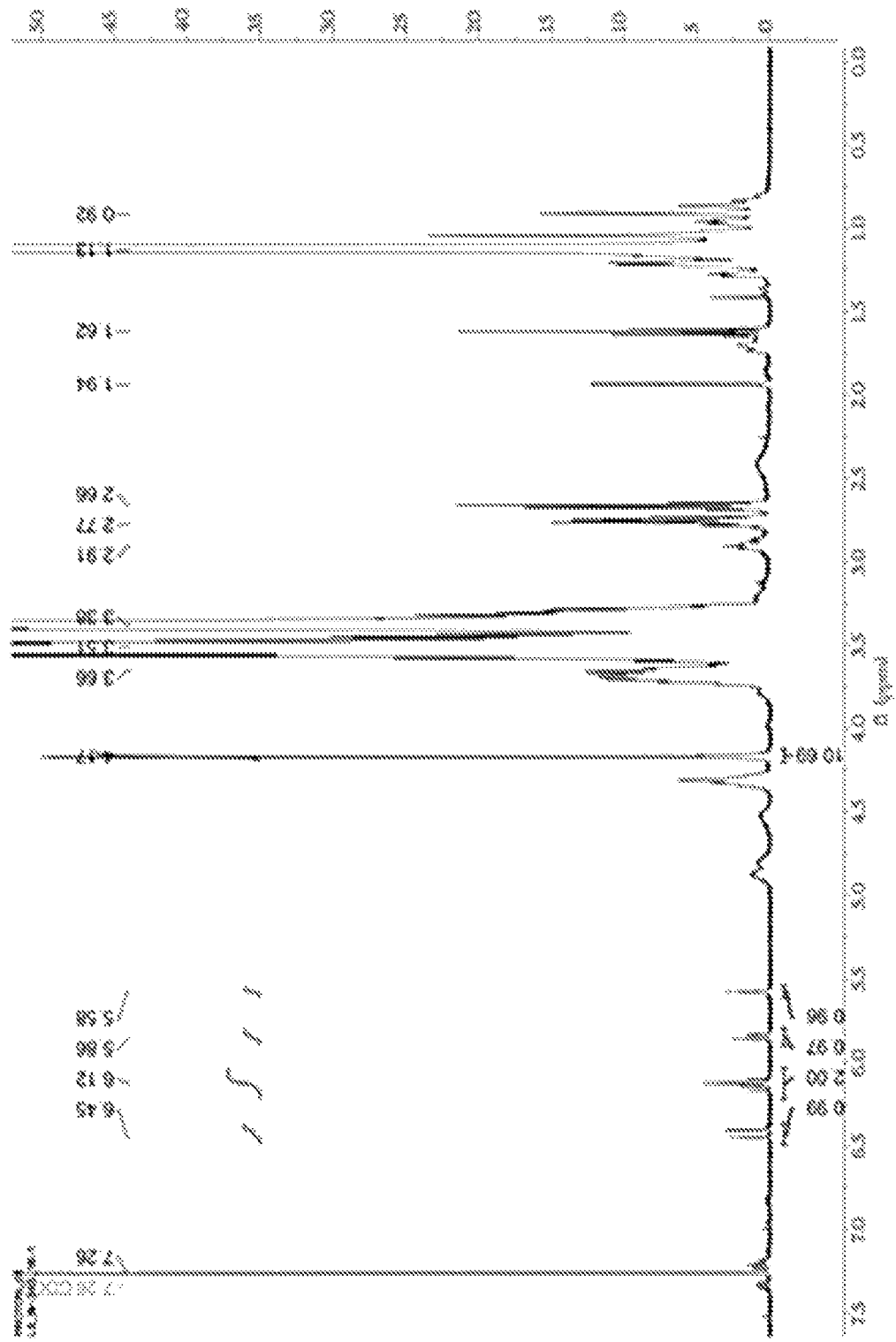

FIG. 136. $^1$H NMR spectrum (CDCl$_3$, 400 MHz) of BR-345 and PETMP in a 16:1 ratio (by weight).

Figure 137:
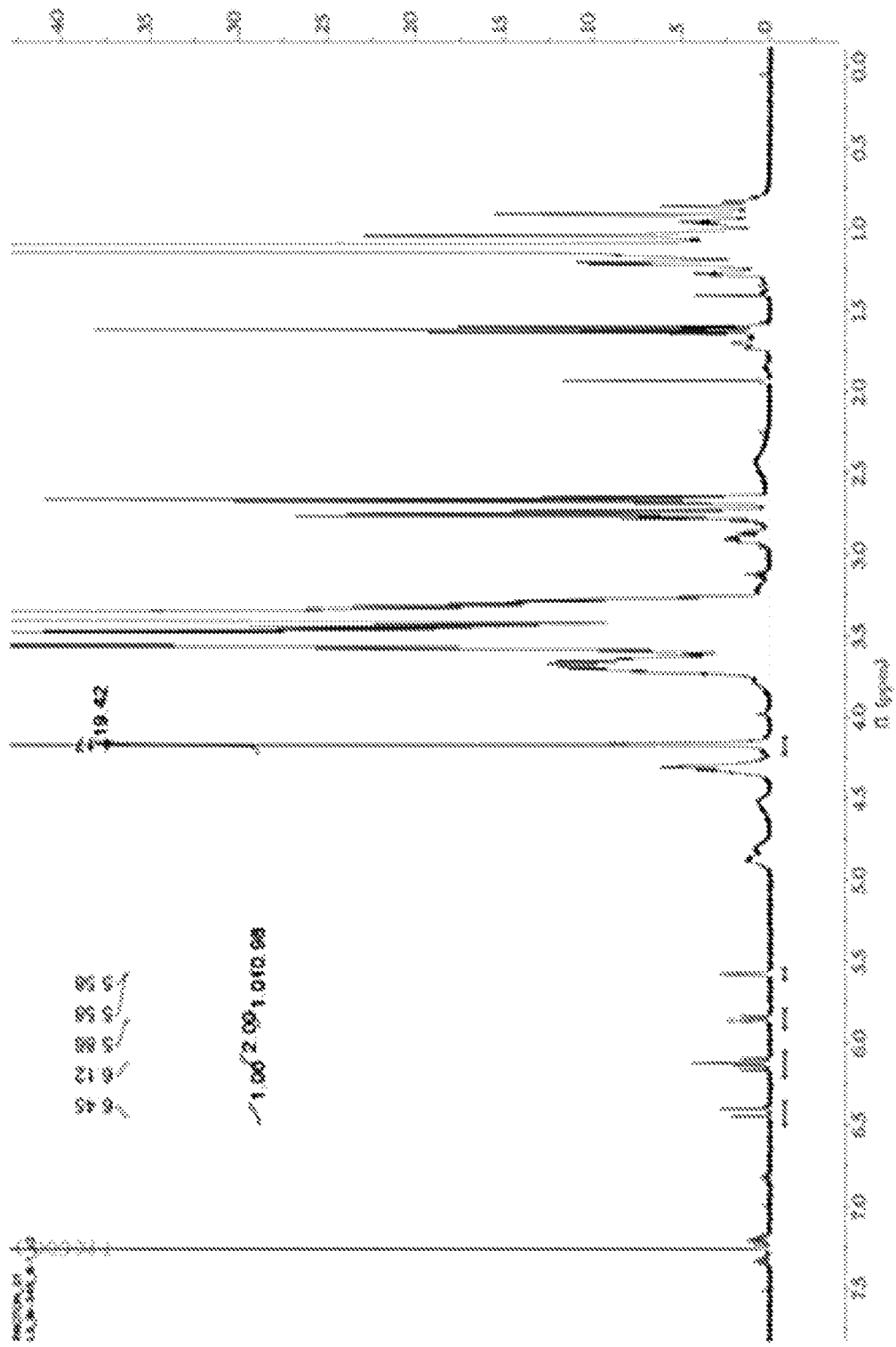

FIG. 137. $^1$H NMR spectrum (CDCl$_3$, 400 MHz) of BR-345 and PETMP in a 8:1 ratio (by weight).

Figure 138:
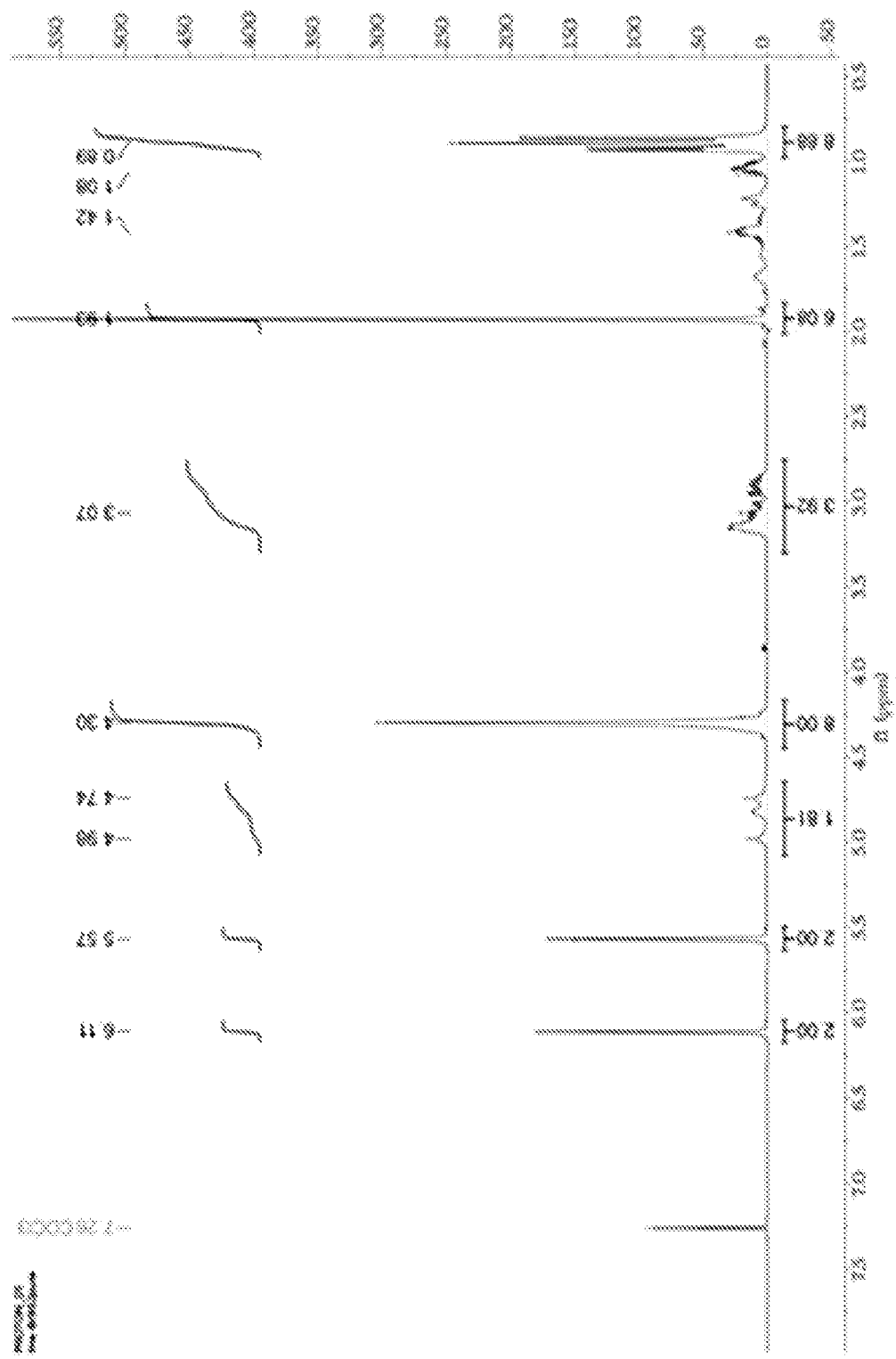

FIG. 138. $^1$H NMR spectrum (CDCl$_3$, 400 MHz) of stiff methacrylate Dymax® resin (BR-952).

Figure 139:
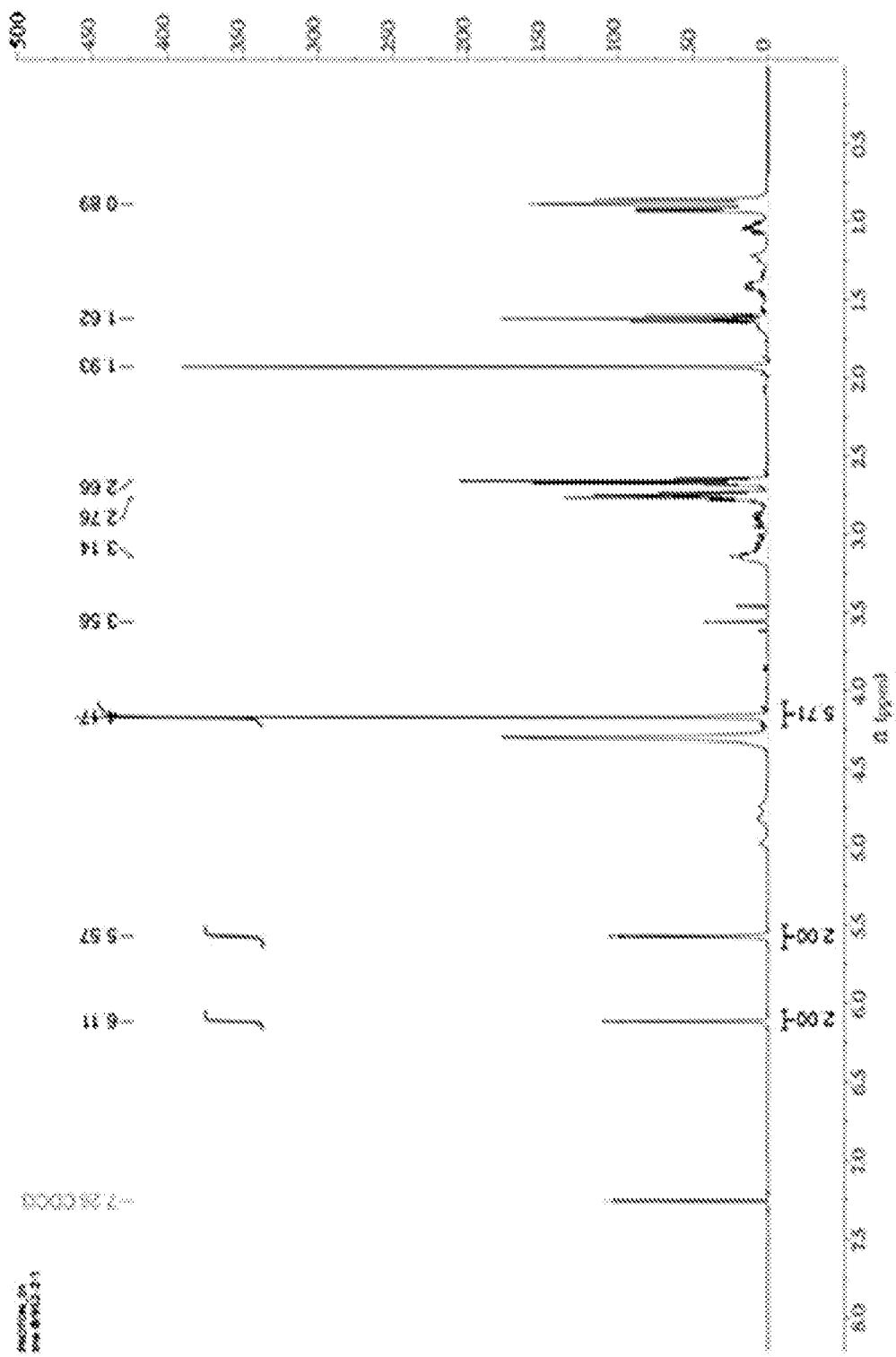

FIG. 139. $^1$H NMR spectrum (CDCl$_3$, 400 MHz) of BR-952 and PETMP in a 2:1 ratio (by weight).

Figure 140:
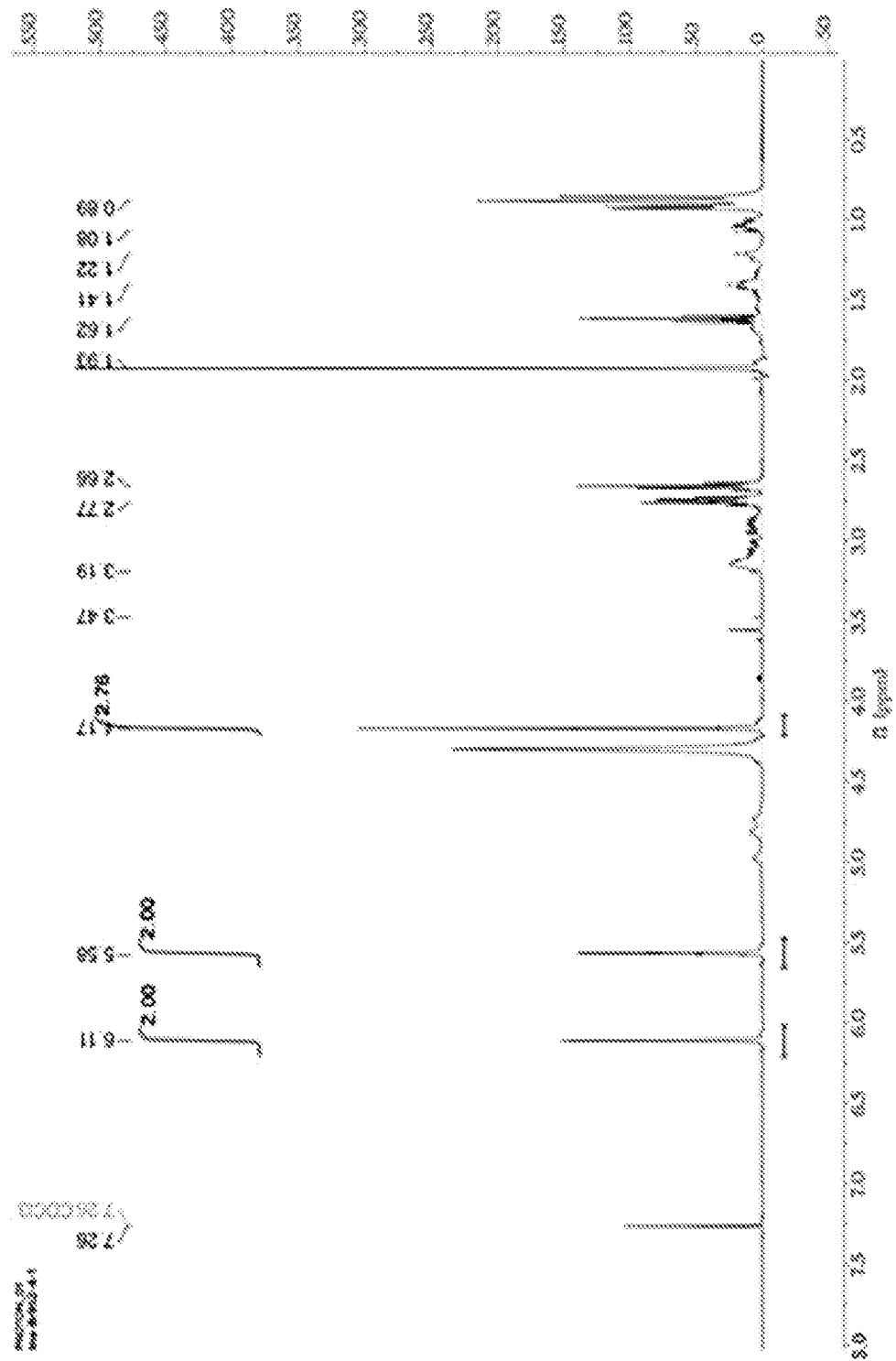

FIG. 140. $^1$H NMR spectrum (CDCl$_3$, 400 MHz) of BR-952 and PETMP in a 4:1 ratio (by weight).

Figure 141:
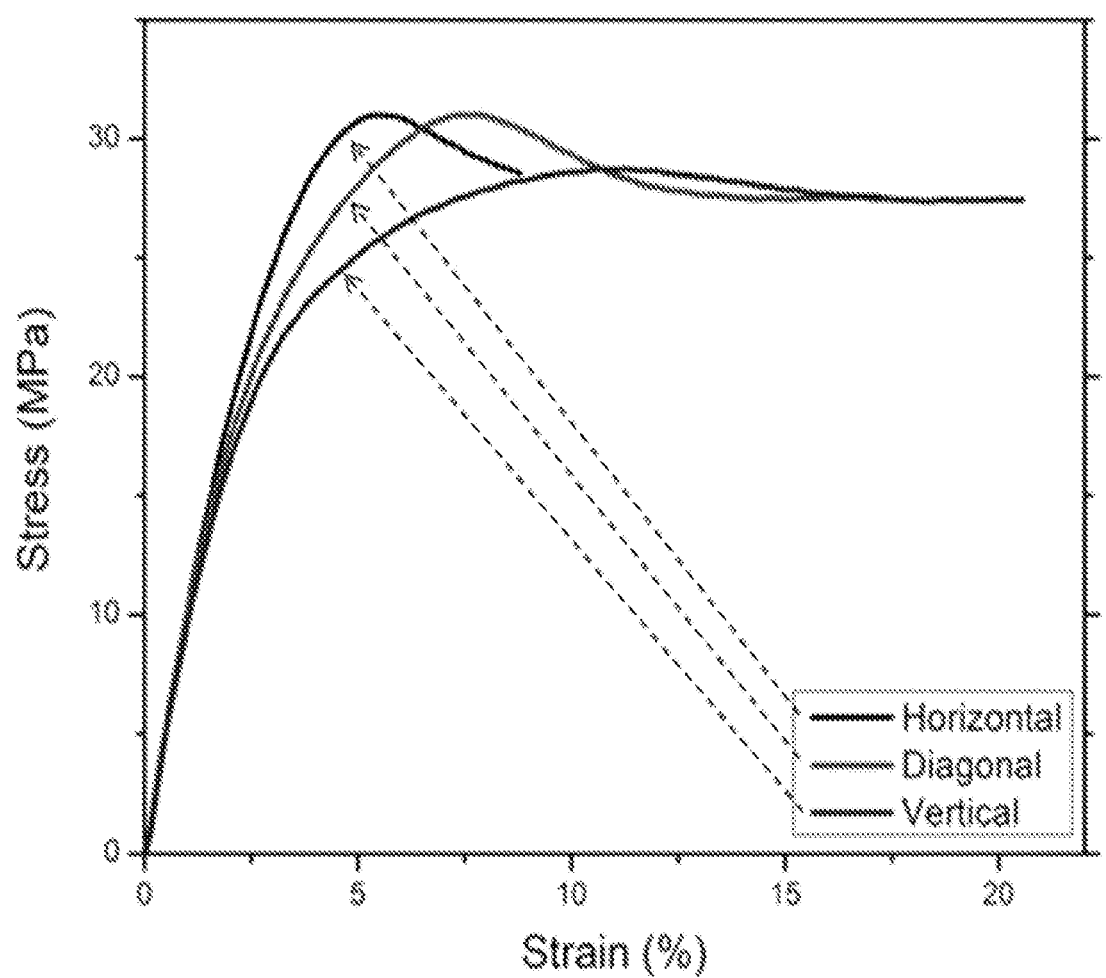

FIG. 141. Mechanical testing of 3D printed dogbones, printed at 3 edge-on angles—horizontal, diagonal, vertical—from stiff acrylate Dymax® resin (0.3 wt % ZnTPP, 0.2 wt % Borate V, 2 wt % HNu-254, 0.002 wt % Sudan black, 0.01 wt % TEMPO in BR-741:TPGDA:PETMP=50:49:1, by weight). Prints were accomplished using a red LED (617 nm, 2.5 mW/cm$^2$) and an exposure time of 14 seconds per 25 μm layer.

Figure 142:
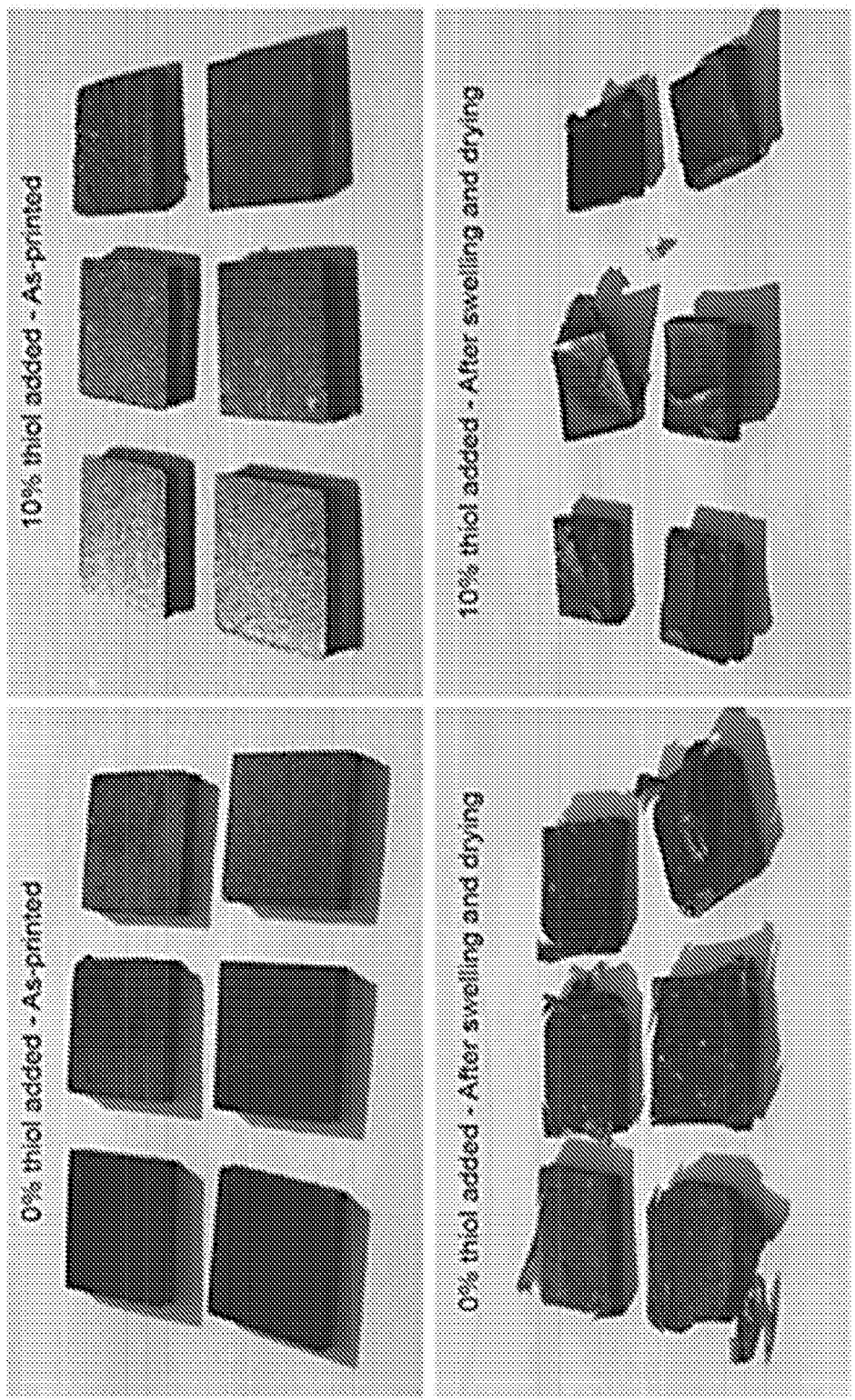

FIG. 142. Photographs of 3D prints before (top) and after (bottom) swelling with acetone and drying.

Figure 143:
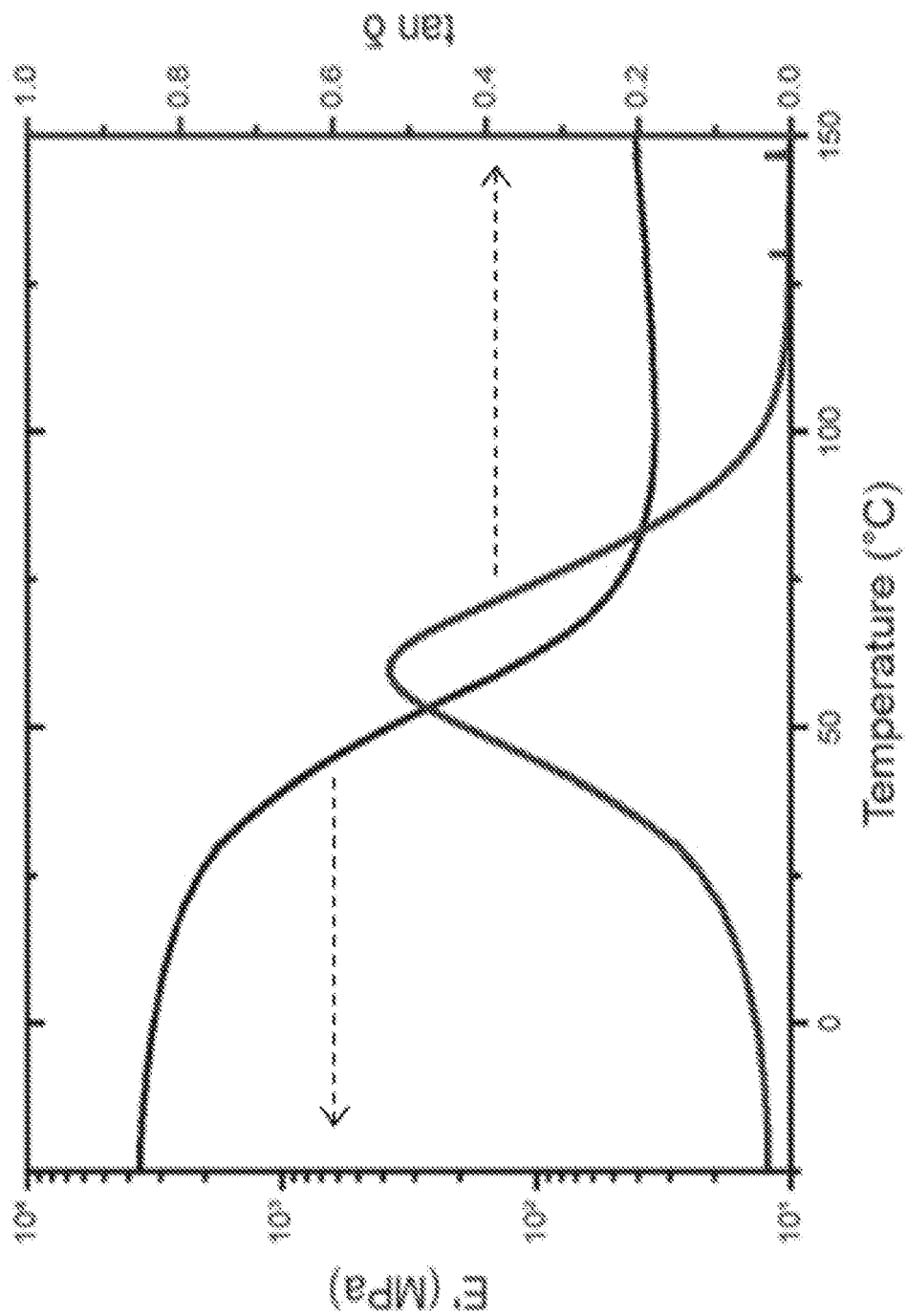

FIG. 143. Storage modulus and tan δ versus time for 3D printed objects containing 0% PETMP.

Figure 144:
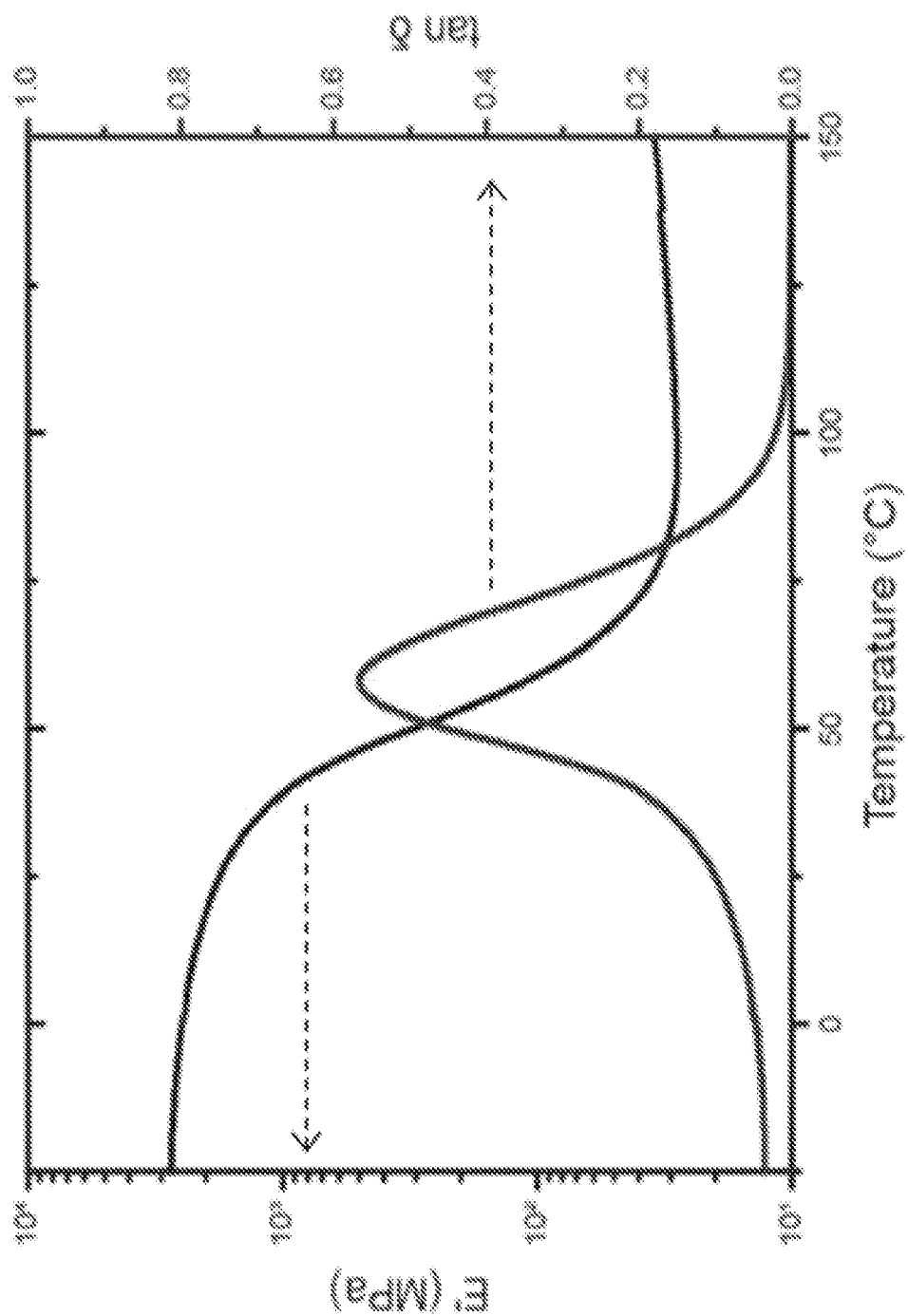

FIG. 144. Storage modulus and tan δ versus time for 3D printed objects containing 1% PETMP.

Figure 145:
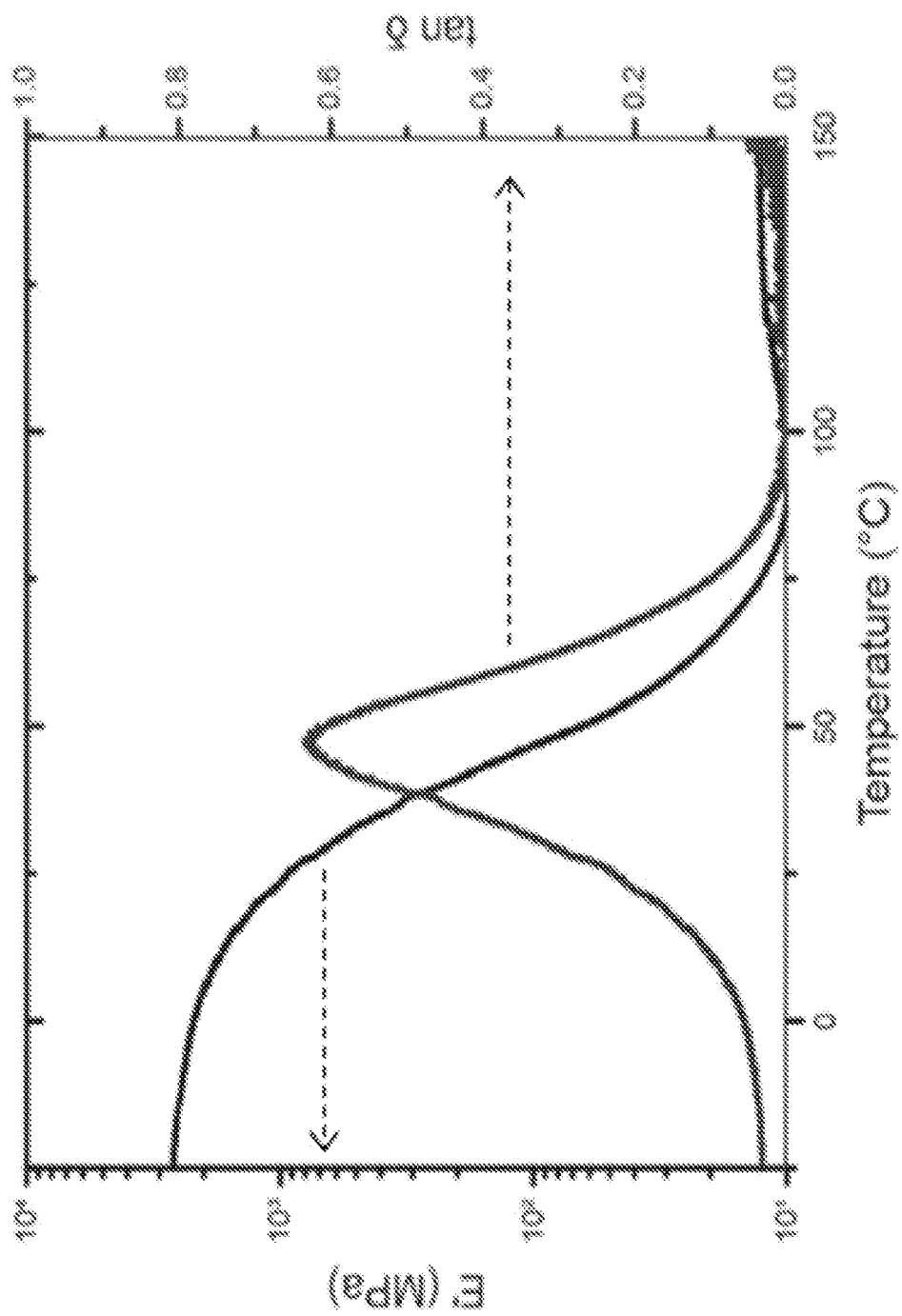

FIG. 145. Storage modulus and tan δ versus time for 3D printed objects containing 5% PETMP.

Figure 146:
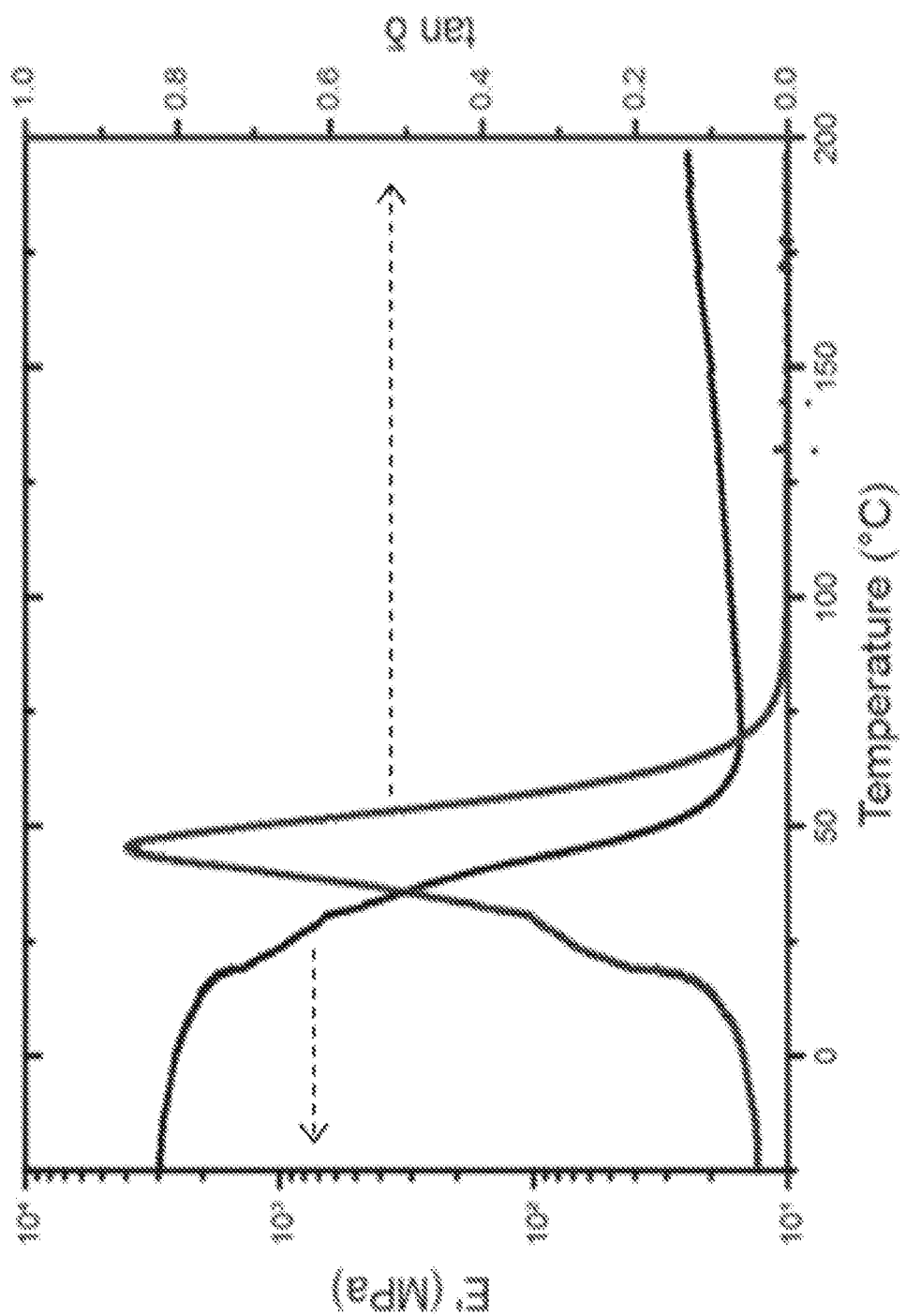

FIG. 146. Storage modulus and tan δ versus time for 3D printed objects containing 10% PETMP.

Figure 147:
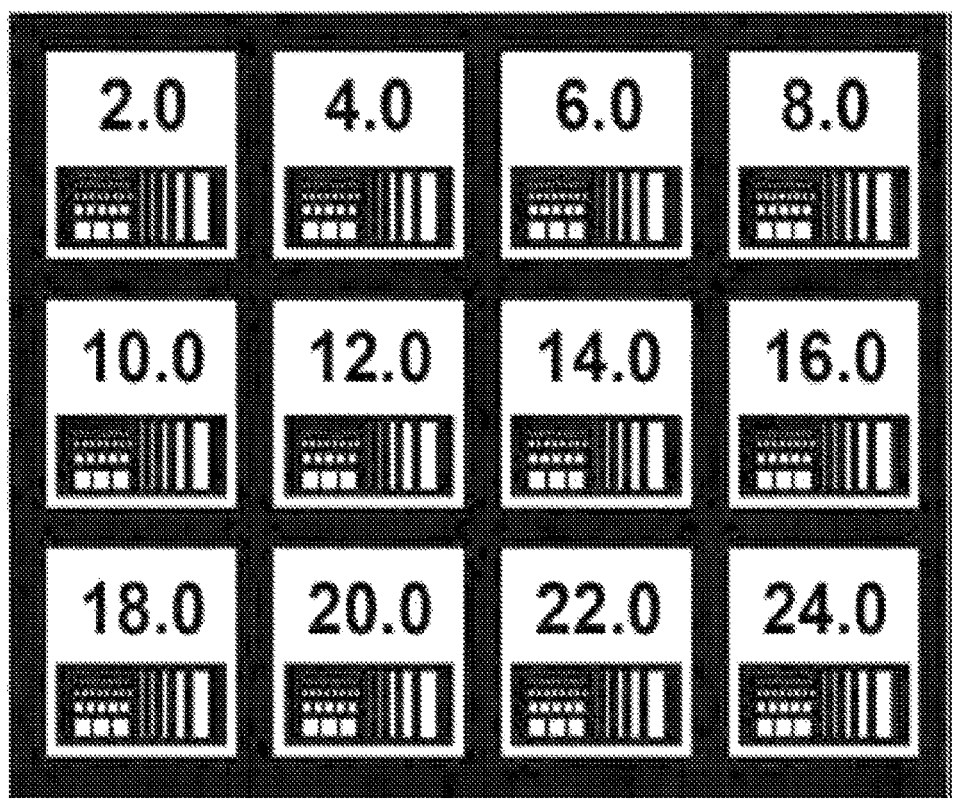

FIG. 147. Digital image of the "resolution print" method. A single layer has 12 squares and iterates exposure at 2 second increments from 2 to 24 sec/layer.

Figure 148:
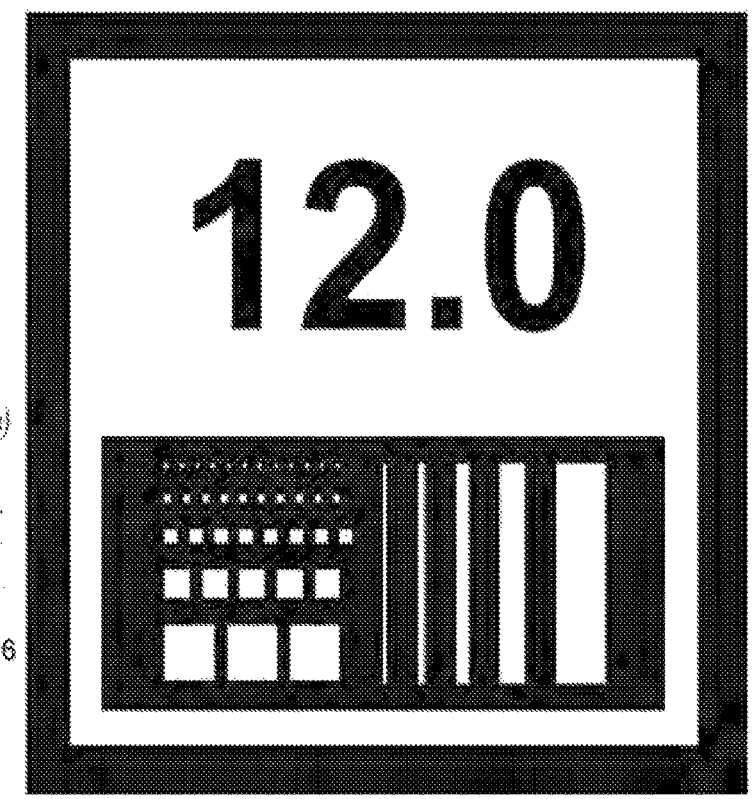

FIG. 148. Magnified digital image of one of the squares used in the "resolution print" method, specifically the 12 sec/layer square. In the bottom half of the square, there is an array of square pillars and an array of line patterns (1, 2, 4, 8, and 16 pixels wide). l×w=length by width.

Figure 149:
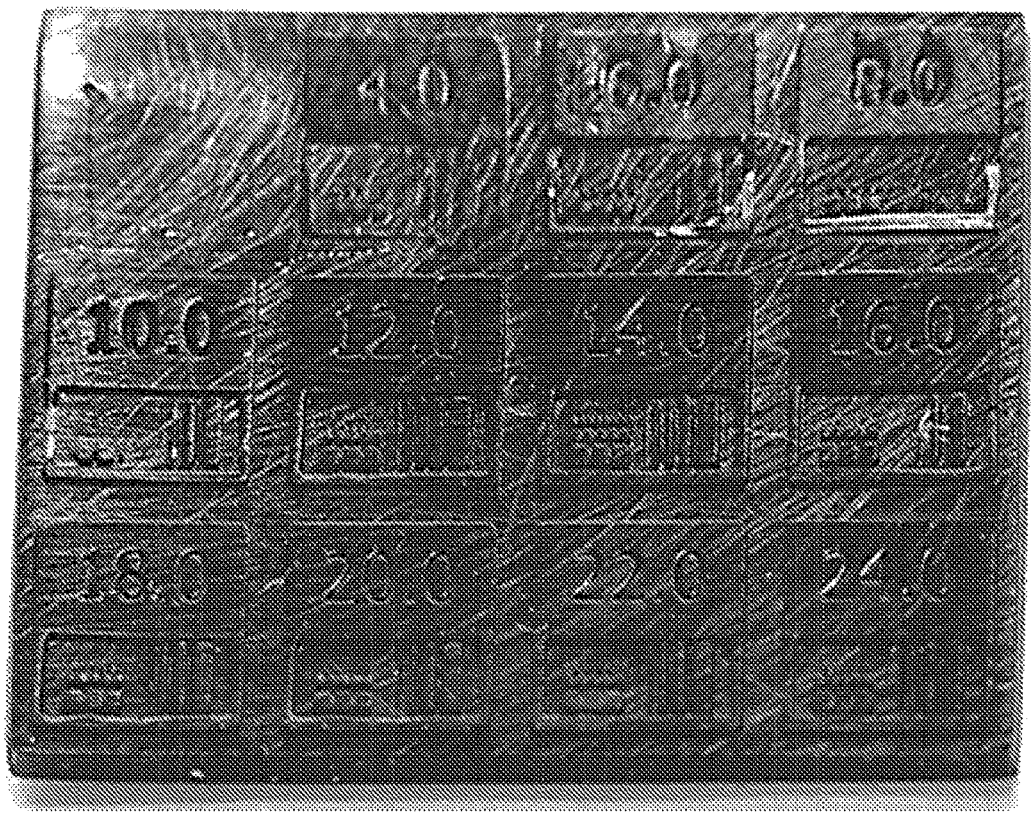

FIG. 149. Photograph of resolution print obtained from stiff Dymax resin (0.3 wt % ZnTPP, 0.2 wt % Borate V, 2 wt % HNu-254, 0.01 wt % TEMPO, and 0.002 wt % Sudan black in mixture of BR-741, TPGDA, and PETMP (in 50:50-x,x wt % ratio), where X is 0 wt %. Red LED (617 nm) at 2.5 mW/cm$^2$ were used for printing. For ease of handling, the square arrays were printed on a rectangular base (48 layers at 30 sec/layer).

Figure 150:
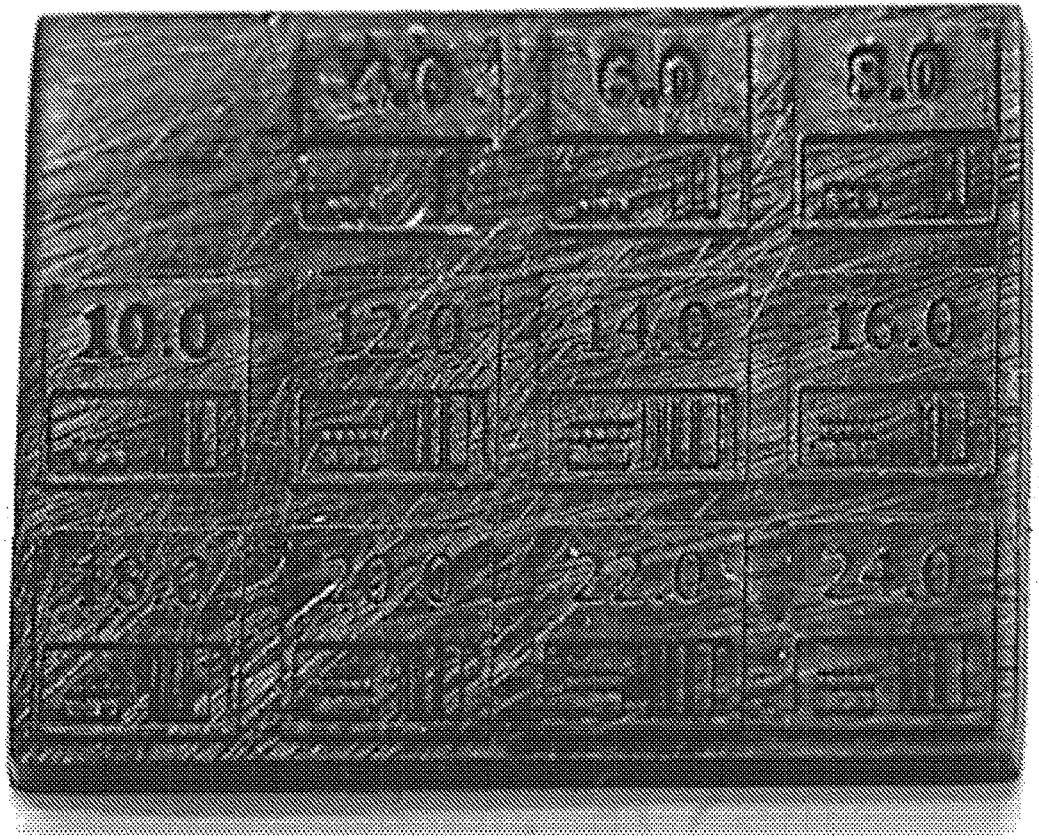

FIG. 150. Photograph of resolution print obtained from stiff Dymax resin (0.3 wt % ZnTPP, 0.2 wt % Borate V, 2 wt % HNu-254, 0.01 wt % TEMPO, and 0.002 wt % Sudan black in mixture of BR-741, TPGDA, and PETMP (in 50:50-x,x wt % ratio), where X is 1 wt %. Red LED (617 nm) at 2.5 mW/cm$^2$ were used for printing. For ease of handling, the square arrays were printed on a rectangular base (48 layers at 30 sec/layer).

Figure 151:
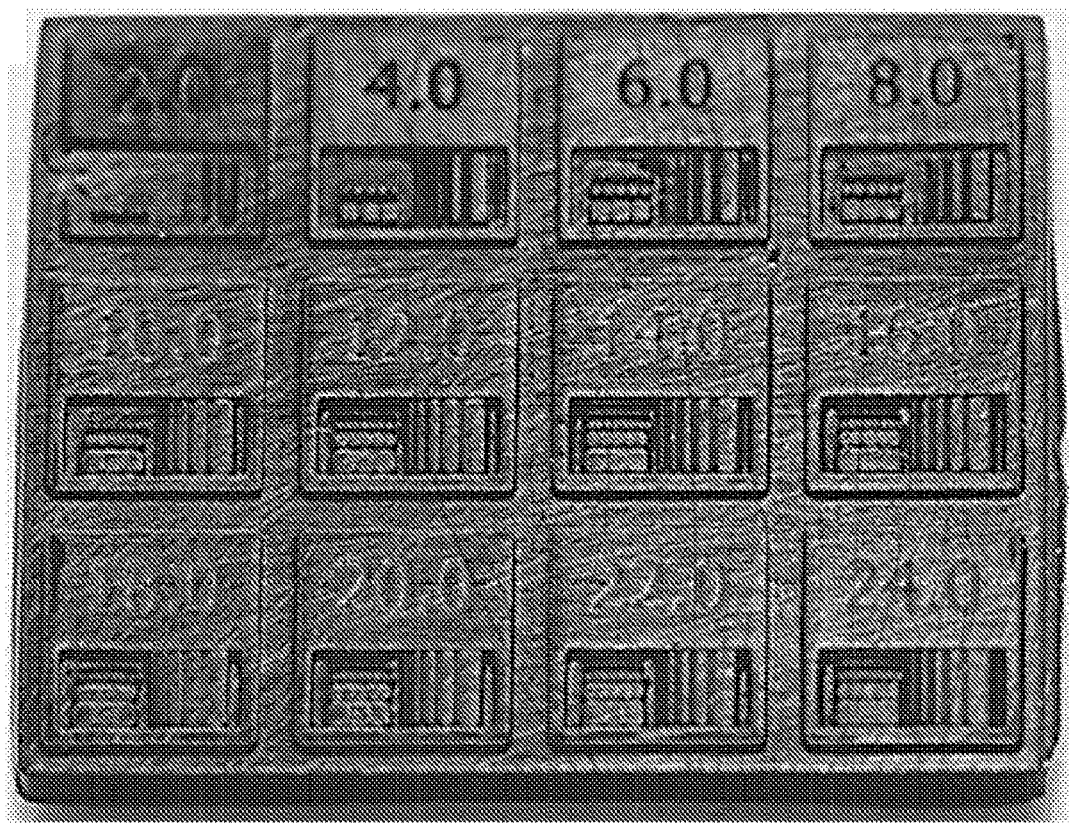

FIG. 151. Photograph of resolution print obtained from stiff Dymax resin (0.3 wt % ZnTPP, 0.2 wt % Borate V, 2 wt % HNu-254, 0.01 wt % TEMPO, and 0.002 wt % Sudan black in mixture of BR-741, TPGDA, and PETMP (in 50:50-x,x wt % ratio), were X is 5 wt %. Red LED (617 nm) at 2.5 mW/cm$^2$ were used for printing. For ease of handling, the square arrays were printed on a rectangular base (48 layers at 30 sec/layer).

Figure 152:
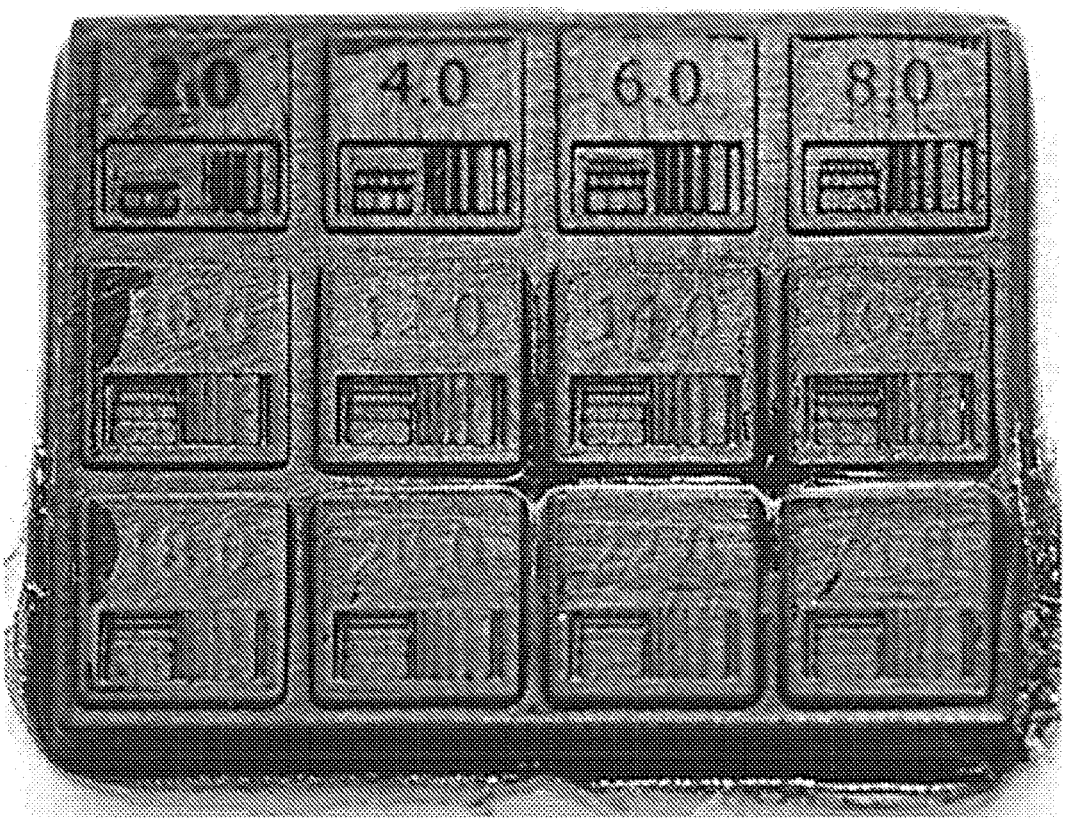

FIG. 152. Photograph of resolution print obtained from stiff Dymax resin (0.3 wt % ZnTPP, 0.2 wt % Borate V, 2 wt % HNu-254, 0.01 wt % TEMPO, and 0.002 wt % Sudan black in mixture of BR-741, TPGDA, and PETMP (in 50:50-x,x wt % ratio), where X is 10 wt %. Red LED (617 nm) at 2.5 mW/cm$^2$ were used for printing. For ease of handling, the square arrays were printed on a rectangular base (48 layers at 30 sec/layer).

Figure 153:
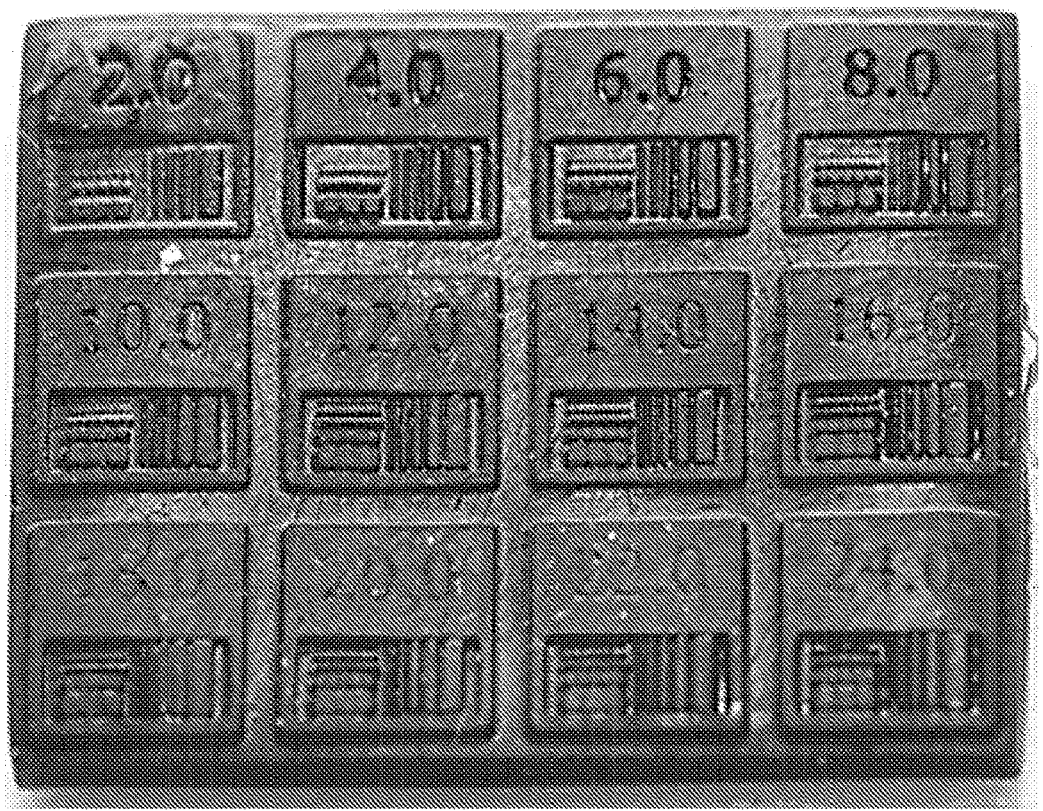

FIG. 153. Resolution print from soft Dymax resin (0.3 wt % ZnTPP, 0.2 wt % Borate V, 2 wt % HNu-254, 0.002 wt % Sudan black, 0.01 wt % TEMPO in BR-345:HEA:PETMP=50:49:1, by weight).

Figure 154:
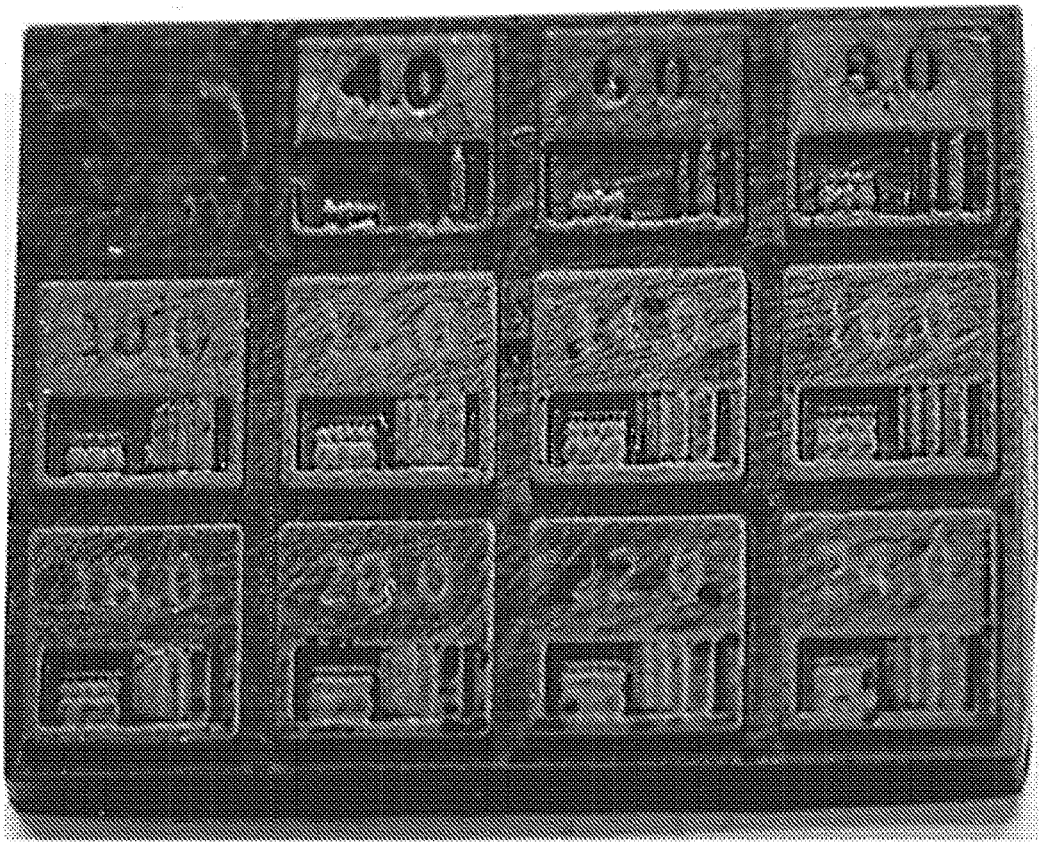

FIG. 154. Resolution print from stiff methacrylate Dymax resin (0.3 wt % ZnTPP, 0.2 wt % Borate V, 2 wt % HNu-254, 0.002 wt % Sudan black, 0.01 wt % TEMPO in BR-952:HEMA:PETMP=70:29:1, by weight).

Figure 155:
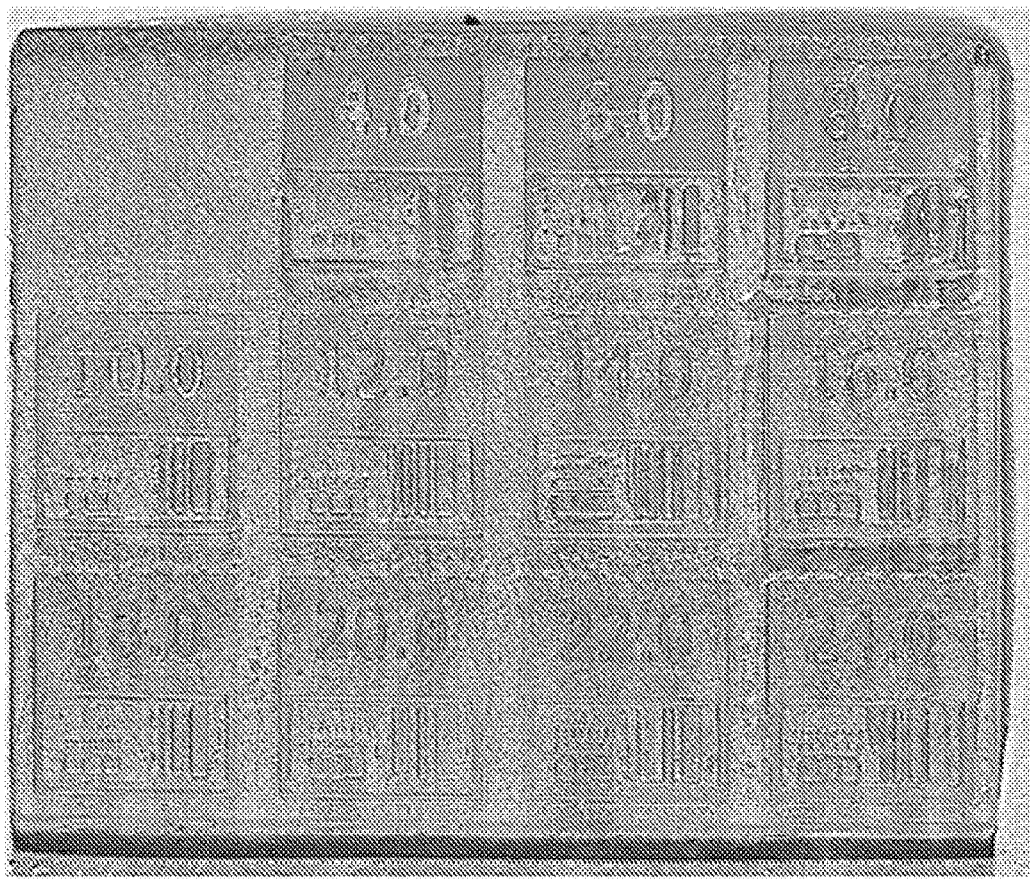

FIG. 155. Resolution print from violet resin with 0% PETMP.

Figure 156:
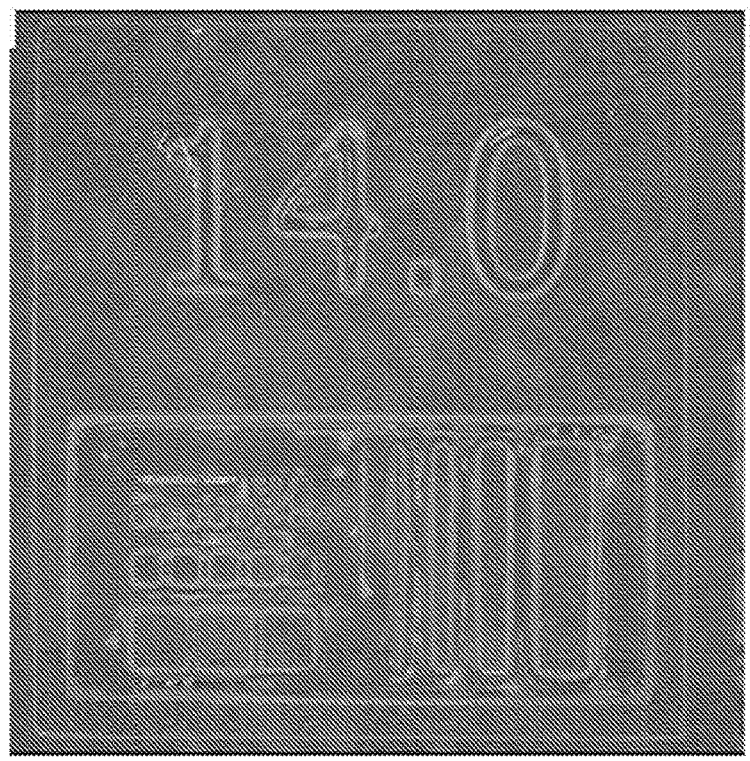

FIG. 156. Image of 14 s exposure time/layer from violet resin with 0% PETMP corresponding to that of the resolution print shown in FIG. 155.

Figure 157:
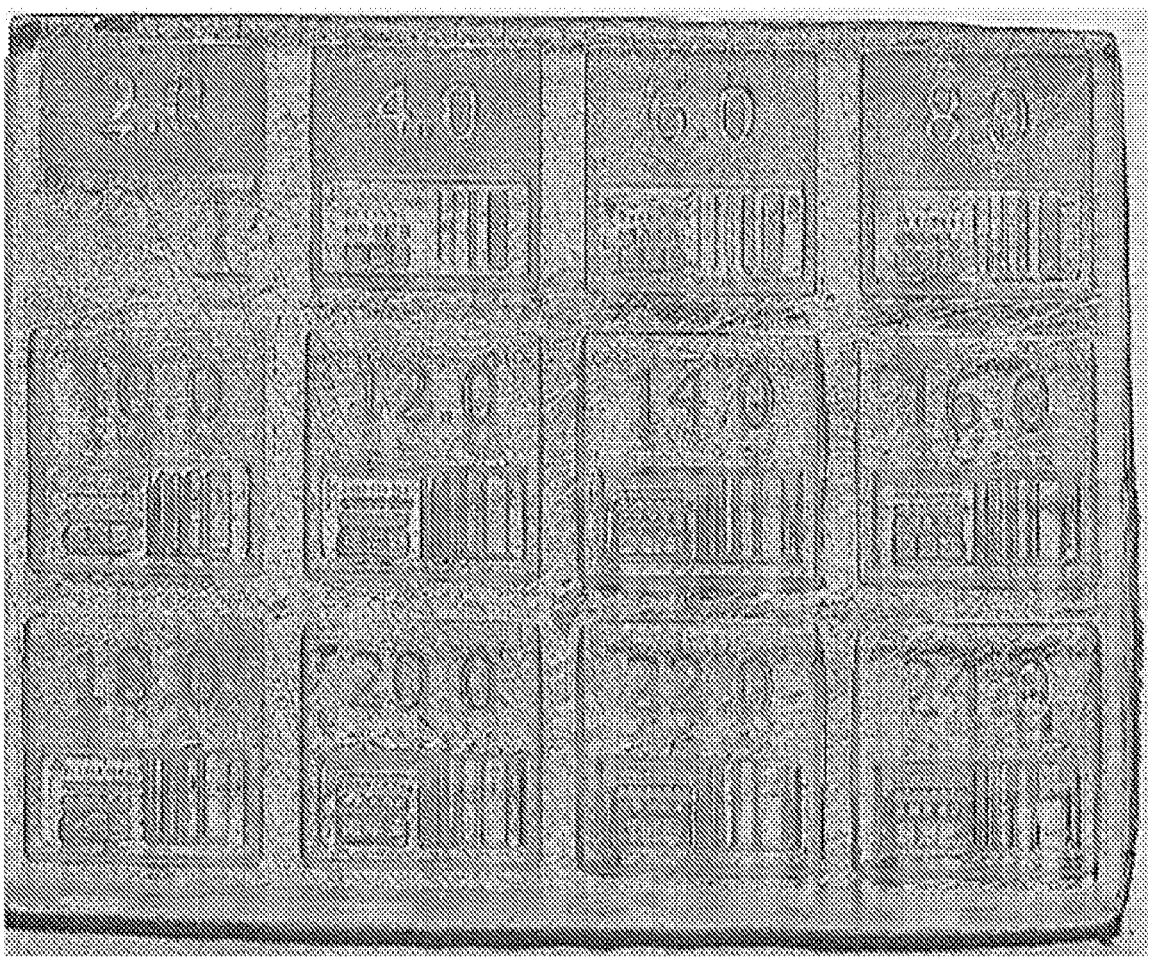

FIG. 157. Resolution print from violet resin with 1% PETMP. Effect of 1 wt % thiol addition on violet resin can be seen by comparing with the resolution print from violet resin with 0% PETMP shown in FIG. 155.

Figure 158:
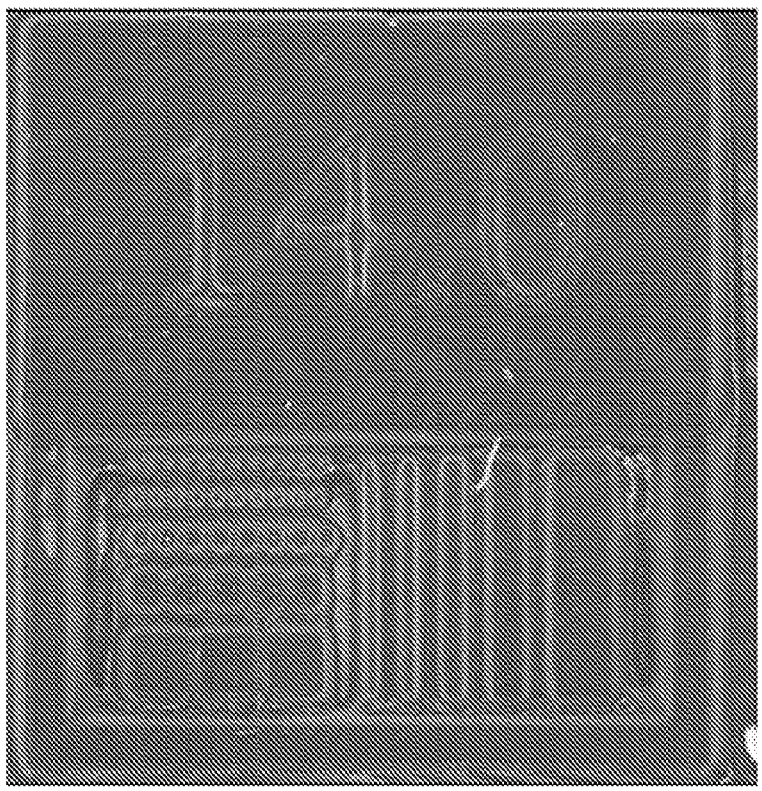

FIG. 158. Image of 14 s exposure time/layer from violet resin with 1% PETMP corresponding to that of the resolution print shown in FIG. 157. Effect of 1 wt % thiol addition on violet resin can be seen by comparing with the 14 s exposure time/layer from violet resin with 0% PETMP shown in FIG. 156.

Figure 159:
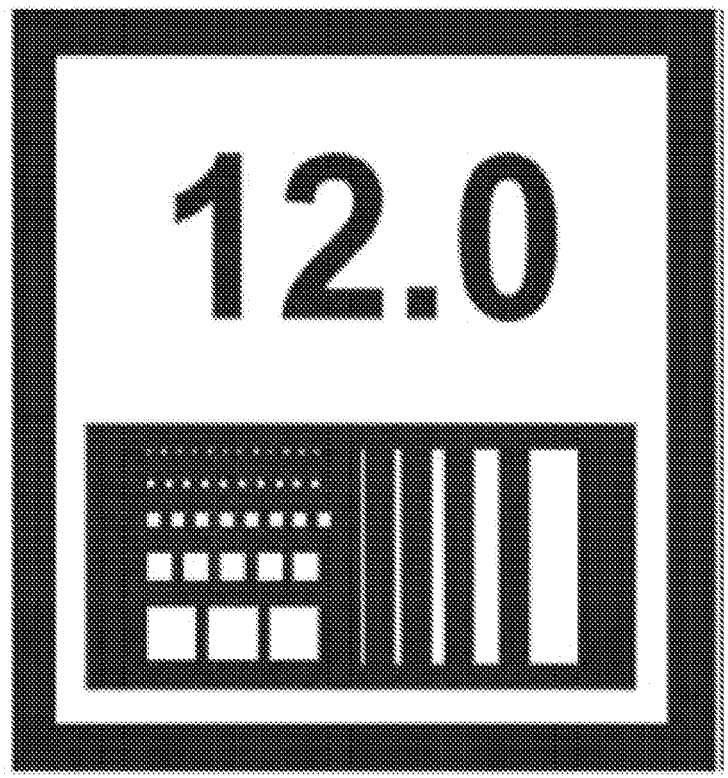

FIG. 159. Digital image of square for 12 sec/layer.

Figure 160:
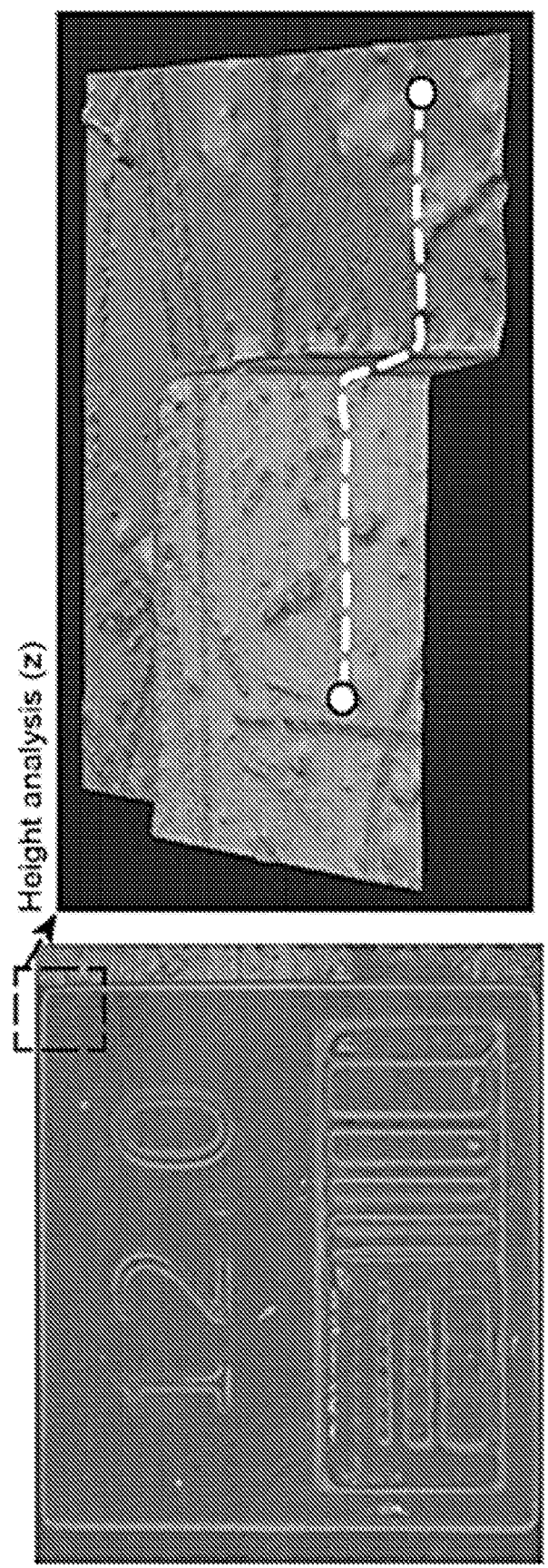

FIG. 160. Optical profilometer image taken for the square at 12 sec exposure/layer. Representative 3D image (right) of the corner outlined in a box. Height and sidewall angle (SWA) values were determined for characterization of the vertical resolution.

Figure 161:
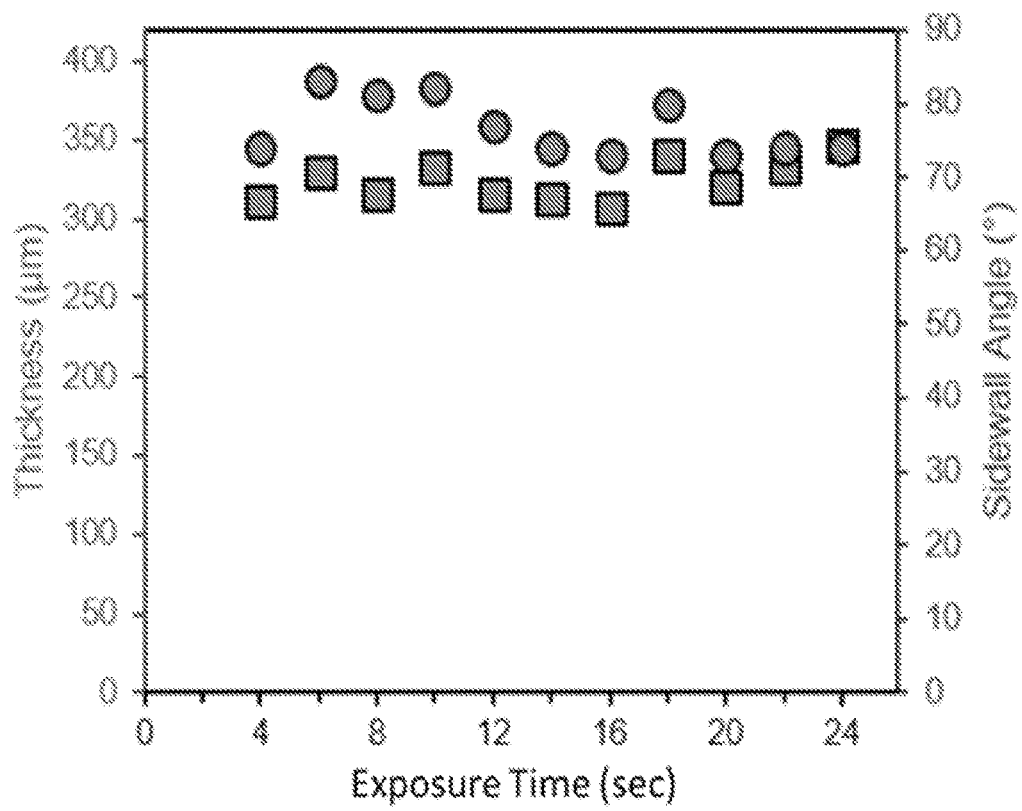

FIG. 161. Height (square date points, left axis) and sidewall angle (round data points, right axis) analysis for red resin containing 0 wt % (argon degassed) PETMP. Each square pattern had 16 layers (theoretical height=400 μm). Resin composition: stiff Dymax (0.3 wt % ZnTPP, 0.2 wt % Borate V, 2 wt % HNu-254, 0.002 wt % Sudan black, 0.01 wt % TEMPO in BR-741:TPGDA:PETMP=50:50-x:x, by weight, where x=0 wt %).

Figure 162:
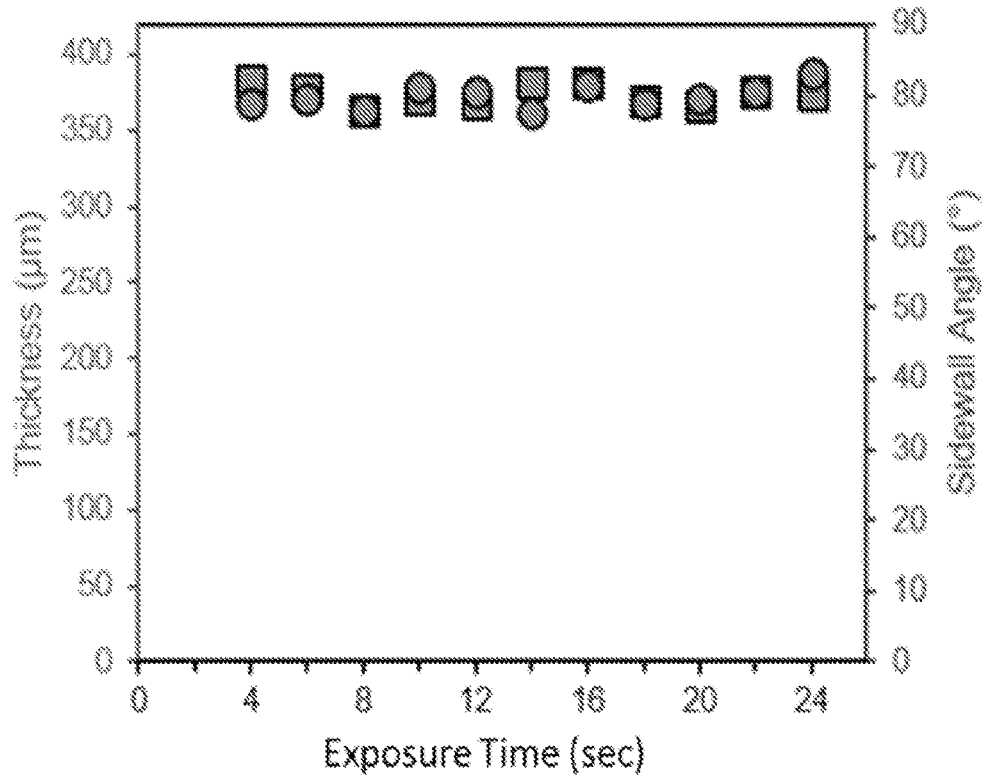

FIG. 162. Height (square date points, left axis) and sidewall angle (round data points, right axis) analysis for red resin containing 1 wt % PETMP. Each square pattern had 16 layers (theoretical height=400 μm). Resin composition: stiff Dymax (0.3 wt % ZnTPP, 0.2 wt % Borate V, 2 wt % HNu-254, 0.002 wt % Sudan black, 0.01 wt % TEMPO in BR-741:TPGDA:PETMP=50:50-x:x, by weight, where x=1 wt %).

Figure 163:
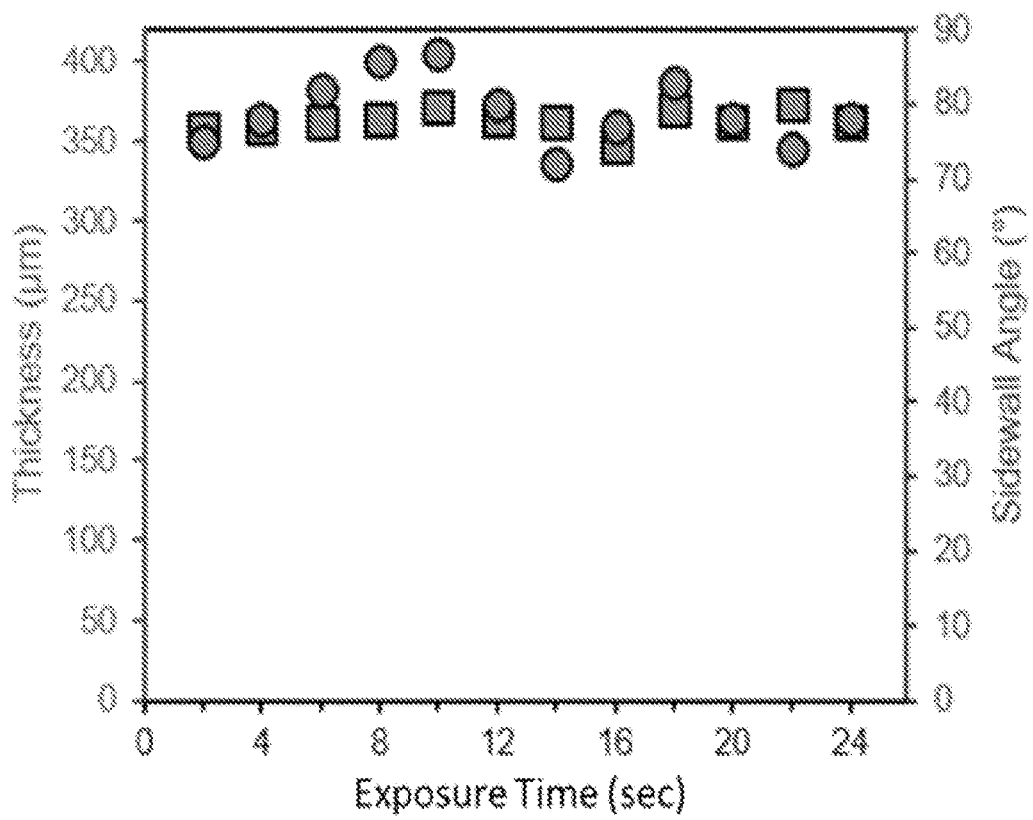

FIG. 163. Height (square date points, left axis) and sidewall angle (round data points, right axis) analysis for red resin containing 5 wt % PETMP. Each square pattern had 16 layers (theoretical height=400 μm). Resin composition: stiff Dymax (0.3 wt % ZnTPP, 0.2 wt % Borate V, 2 wt % HNu-254, 0.002 wt % Sudan black, 0.01 wt % TEMPO in BR-741:TPGDA:PETMP=50:50-x:x, by weight, where x=5 wt %).

Figure 164:
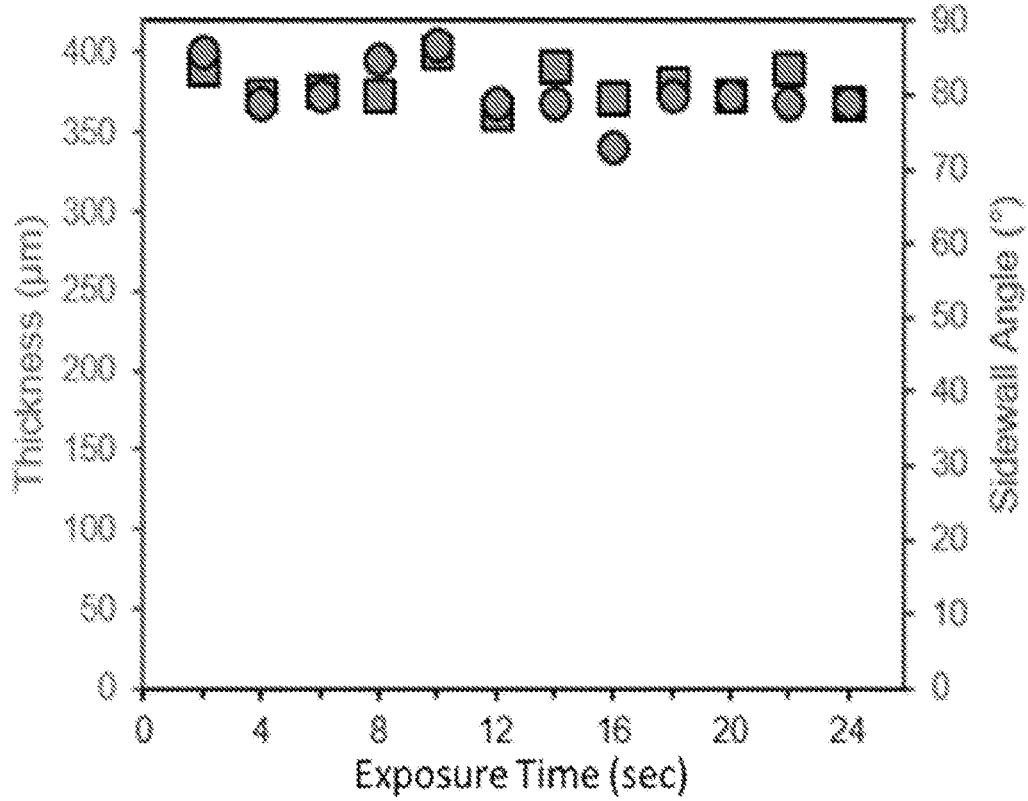

FIG. 164. Height (square date points, left axis) and sidewall angle (round data points, right axis) analysis for red resin containing 10 wt % PETMP. Each square pattern had 16 layers (theoretical height=400 μm). Resin composition: stiff Dymax (0.3 wt % ZnTPP, 0.2 wt % Borate V, 2 wt % HNu-254, 0.002 wt % Sudan black, 0.01 wt % TEMPO in BR-741:TPGDA:PETMP=50:50-x:x, by weight, where x=10 wt %).

Figure 165:
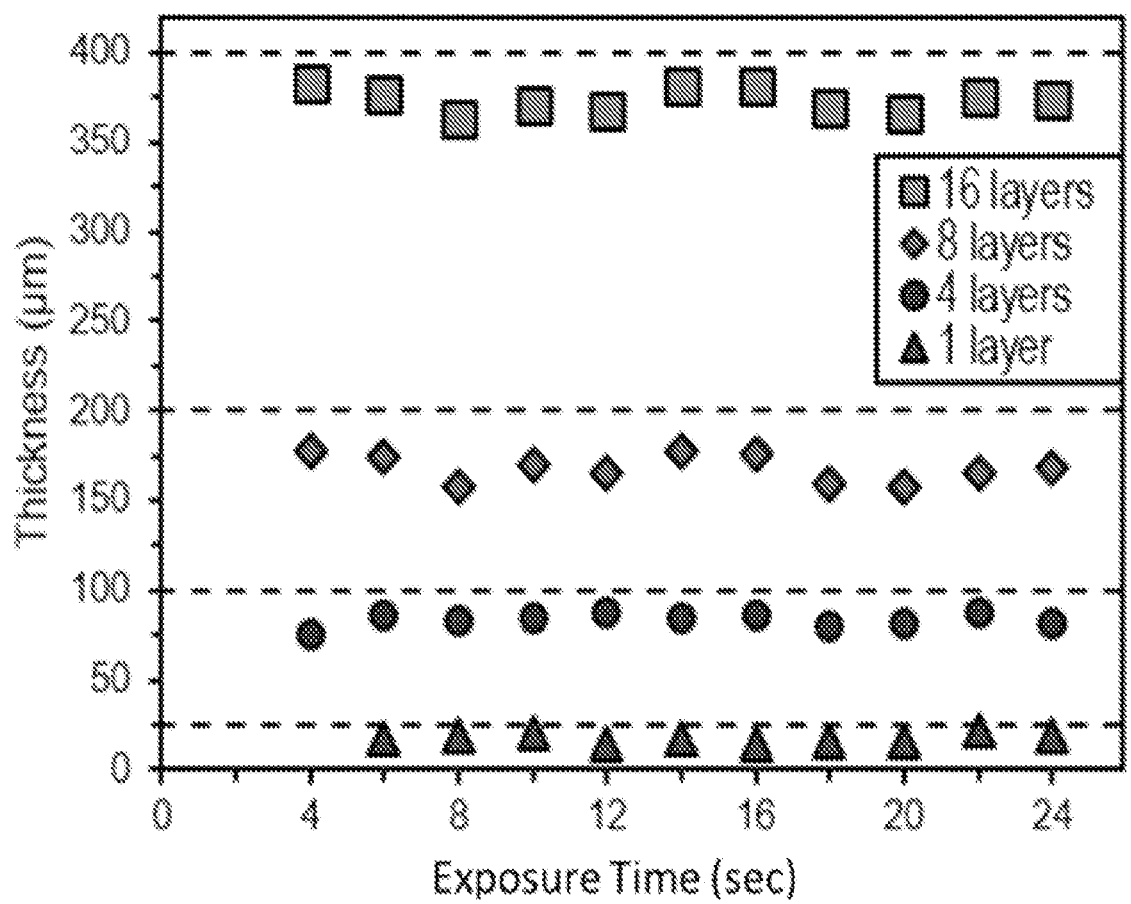

FIG. 165. Height and sidewall angle analysis as a function of the number of layers and exposure time/layer. Dashed lines represent theoretical thickness given the number of layers with a layer thickness of 25 μm. Resin composition: stiff Dymax (0.3 wt % ZnTPP, 0.2 wt % Borate V, 2 wt % HNu-254, 0.002 wt % Sudan black, 0.01 wt % TEMPO in BR-741:TPGDA:PETMP=50:49:1, by weight).

Figure 166:
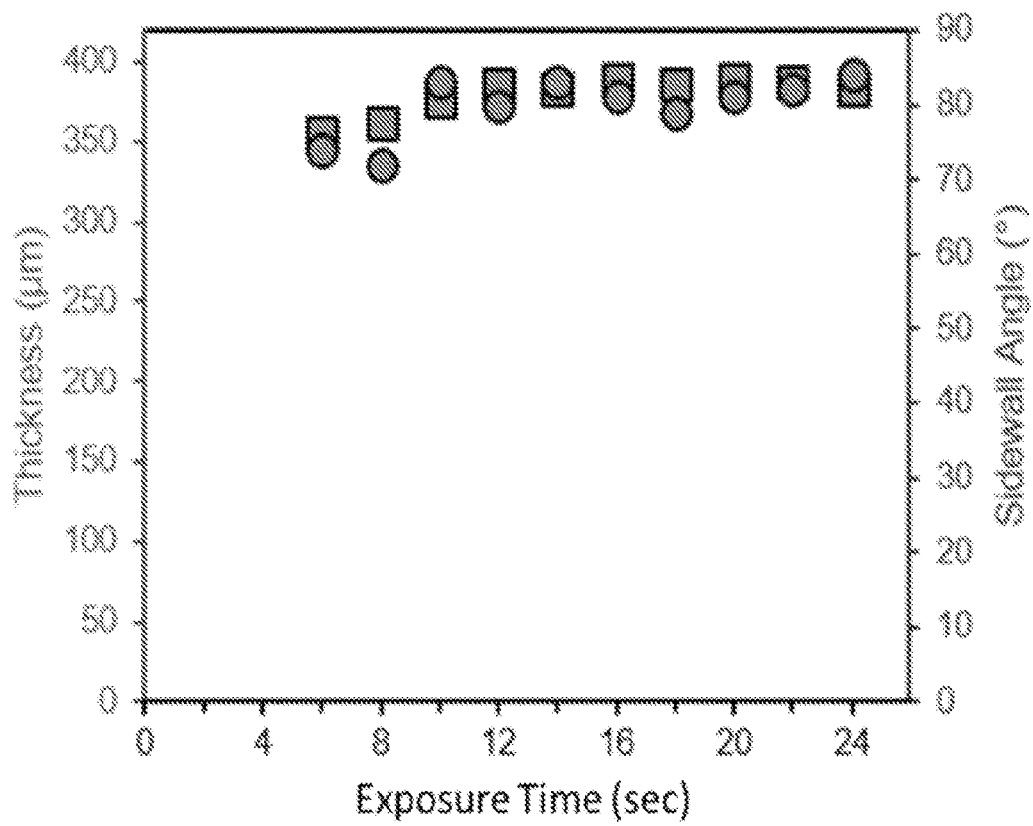

FIG. 166. Height (square data points, left axis) and sidewall angle (round data points, right axis) analysis for violet resin containing 0 wt % PETMP (not degassed). Resin composition: stiff Dymax (0.5 wt % BAPO, 0.04 wt % Sudan I, 0.01 wt % TEMPO in BR-741:TPGDA:PETMP=50:50-x:x, by weight, where x=0 wt %).

Figure 167:
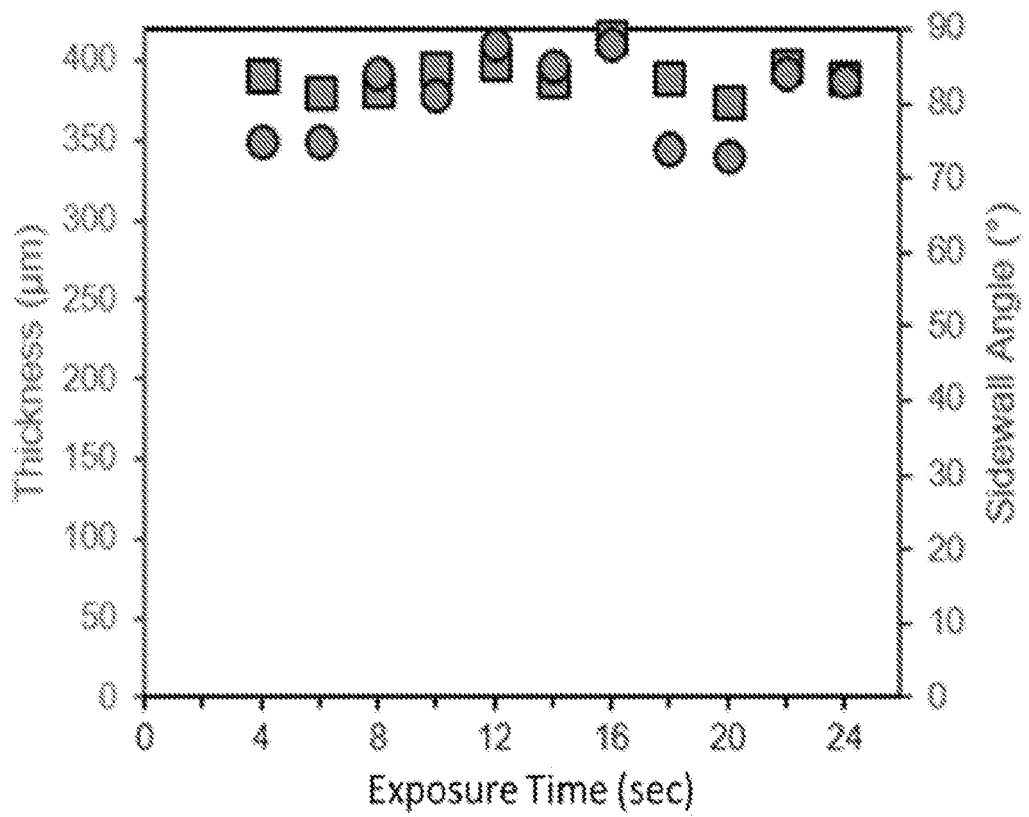

FIG. 167. Height (square data points, left axis) and sidewall angle (round data points, right axis) analysis for violet resin containing 1 wt % PETMP. Resin composition: stiff Dymax (0.5 wt % BAPO, 0.04 wt % Sudan I, 0.01 wt % TEMPO in BR-741:TPGDA:PETMP=50:50-x:x, by weight, where x=1 wt %).

Figure 168:
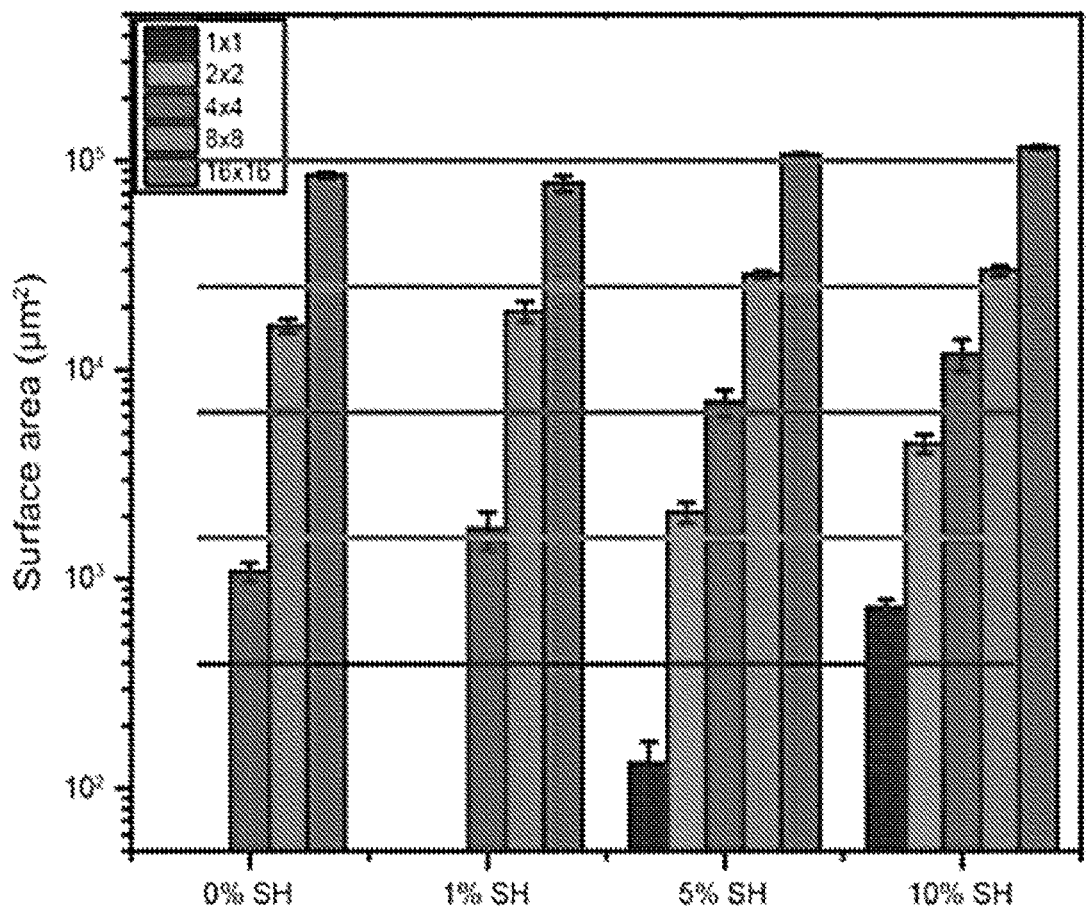

FIG. 168. Surface area analysis for resolution print from the stiff Dymax resin (0.3 wt % ZnTPP, 0.2 wt % Borate V, 2 wt % HNu-254, 0.002 wt % Sudan black, 0.01 wt % TEMPO in BR-741:TPGDA:PETMP=50:50-x:x, by weight, where x=0, 1, 5, 10 wt %). Within each group (e.g., each X % SH), the bars represent (from left to right): 1×1; 2×2; 4×4; 8×8; and 16×16 pixel arrays. The lxi and 2×2 pixel arrays from 0% SH and 1% SH containing resins were not formed.

Figure 169:
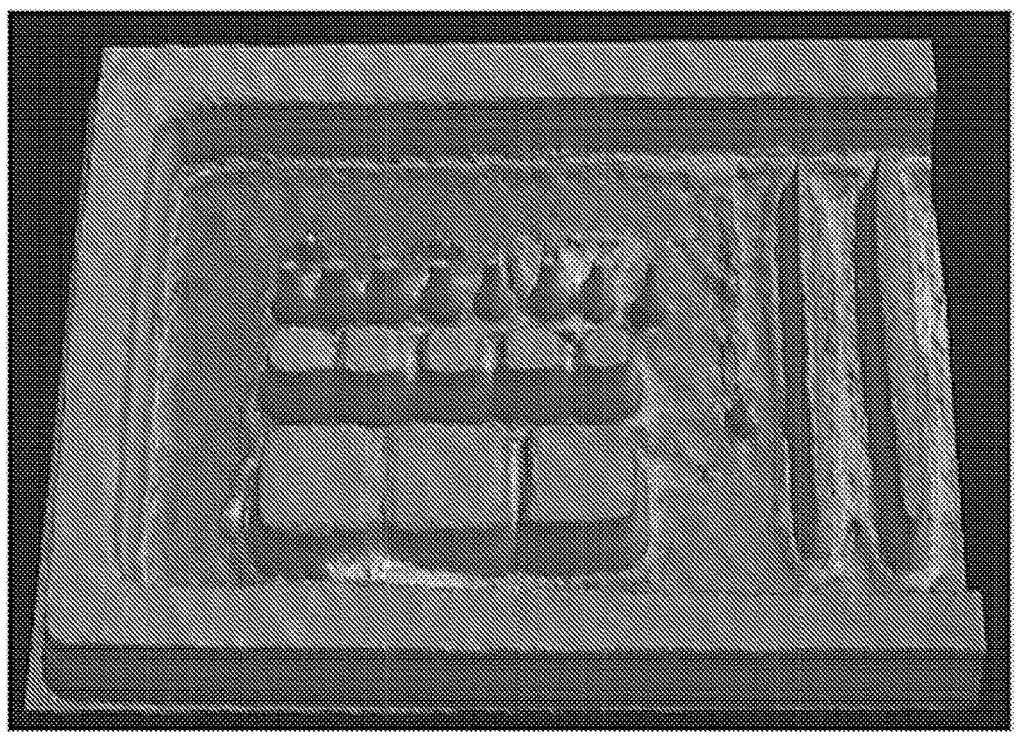

FIG. 169. 3D image of control (violet LED) resolution prints taken using an optical profilometer. Resolution prints were printed from stiff Dymax resin (0.5 wt % BAPO, 0.04 wt % Sudan I, 0.01 wt % TEMPO in BR-741:TPGDA:PETMP=50:50-x:x, by weight, where x=0 wt %). Prints were accomplished using a violet LED (405 nm, 3.3 mW/cm$^2$) and an exposure time of 14 seconds (for 0% PETMP-containing resin) per 25 μm layer.

Figure 170:
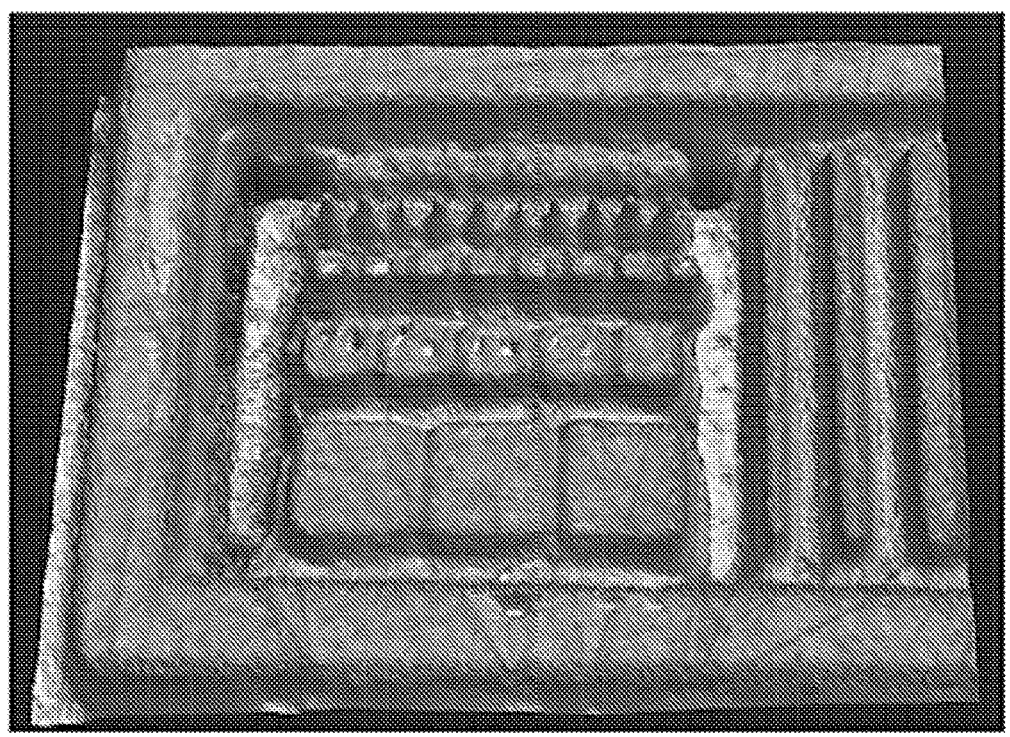

FIG. 170. 3D image of control (violet LED) resolution prints taken using an optical profilometer. Resolution prints were printed from stiff Dymax resin (0.5 wt % BAPO, 0.04 wt % Sudan I, 0.01 wt % TEMPO in BR-741:TPGDA:PETMP=50:50-x:x, by weight, where x=1 wt %). Prints were accomplished using a violet LED (405 nm, 3.3 mW/cm$^2$) and an exposure time of 12 seconds (for 1% PETMP-containing resin) per 25 μm layer.

Figure 171:
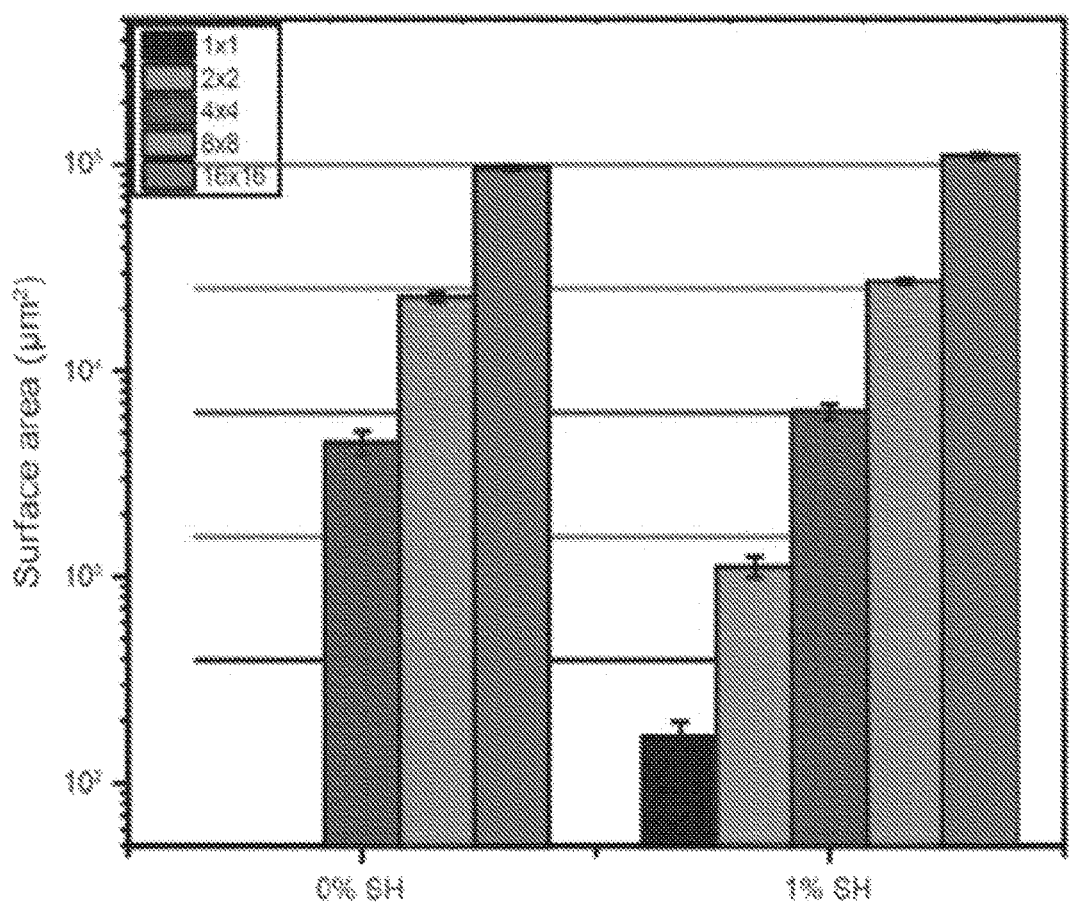

FIG. 171. Surface area analysis for resolution prints, from stiff Dymax resin (0.5 wt % BAPO, 0.04 wt % Sudan I, 0.01 wt % TEMPO in BR-741:TPGDA:PETMP=50:50-x:x, by weight, where x=0 or 1 wt %). Prints were accomplished using a violet LED (405 nm, 3.3 mW/cm$^2$) and an exposure time of 14 and 12 seconds (for 0% and 1% PETMP-containing resins, respectively) per 25 μm layer. Within each group, the bars represent (from left to right): 1×1; 2×2; 4×4; 8×8; and 16×16 pixel arrays. The lxi and 2×2 pixel arrays from 0% PETMP-containing resin were not formed owing to the incomplete curing.

Figure 172:
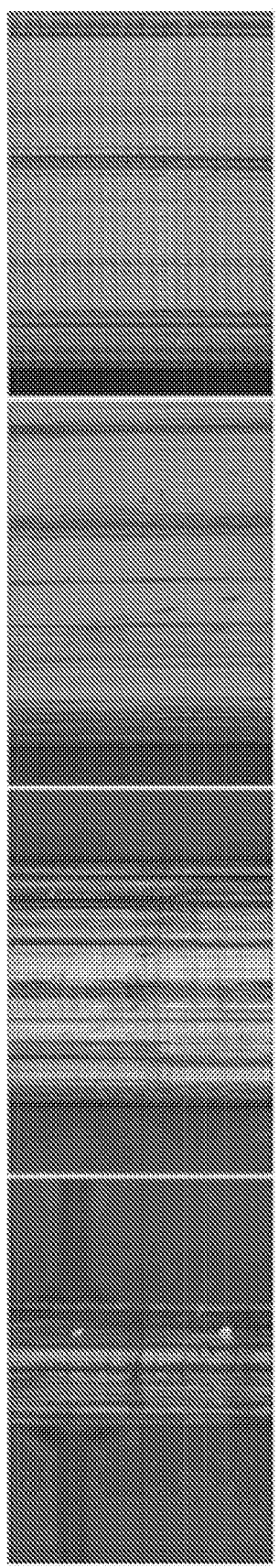

FIG. 172. Optical profilometry images of 3D printed dogbone specimens, printed at a vertical edge-on angle from stiff acrylate Dymax® resin (0.3 wt % ZnTPP, 0.2 wt % Borate V, 2 wt % HNu-254, 0.002 wt % Sudan black, 0.01 wt % TEMPO in BR-741:TPGDA:PETMP=50:49:1, by weight). Prints were accomplished using a red LED (617 nm, 2.5 mW/cm$^2$) and an exposure time of 14 seconds per 25 μm layer. Different magnifications are shown (from left to right, ×2.5, ×5, ×10, ×20, respectively).

Figure 173:
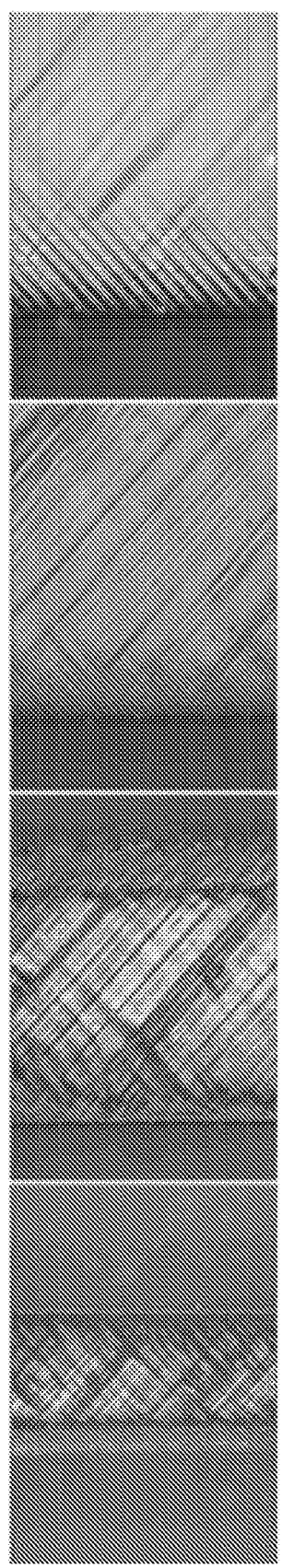

FIG. 173. Optical profilometry images of 3D printed dogbone specimens, printed at a diagonal edge-on angle from stiff acrylate Dymax® resin (0.3 wt % ZnTPP, 0.2 wt % Borate V, 2 wt % HNu-254, 0.002 wt % Sudan black, 0.01 wt % TEMPO in BR-741:TPGDA:PETMP=50:49:1, by weight). Prints were accomplished using a red LED (617 nm, 2.5 mW/cm$^2$) and an exposure time of 14 seconds per 25 μm layer. Different magnifications are shown (from left to right, ×2.5, ×5, ×10, ×20, respectively).

Figure 174:

FIG. 174. Optical profilometry images of 3D printed dogbone specimens, printed at a horizontal edge-on angle from stiff acrylate Dymax® resin (0.3 wt % ZnTPP, 0.2 wt % Borate V, 2 wt % HNu-254, 0.002 wt % Sudan black, 0.01 wt % TEMPO in BR-741:TPGDA:PETMP=50:49:1, by weight). Prints were accomplished using a red LED (617 nm, 2.5 mW/cm$^2$) and an exposure time of 14 seconds per 25 μm layer. Different magnifications are shown (from left to right, ×2.5, ×5, ×10, ×20, respectively).

Figure 175:
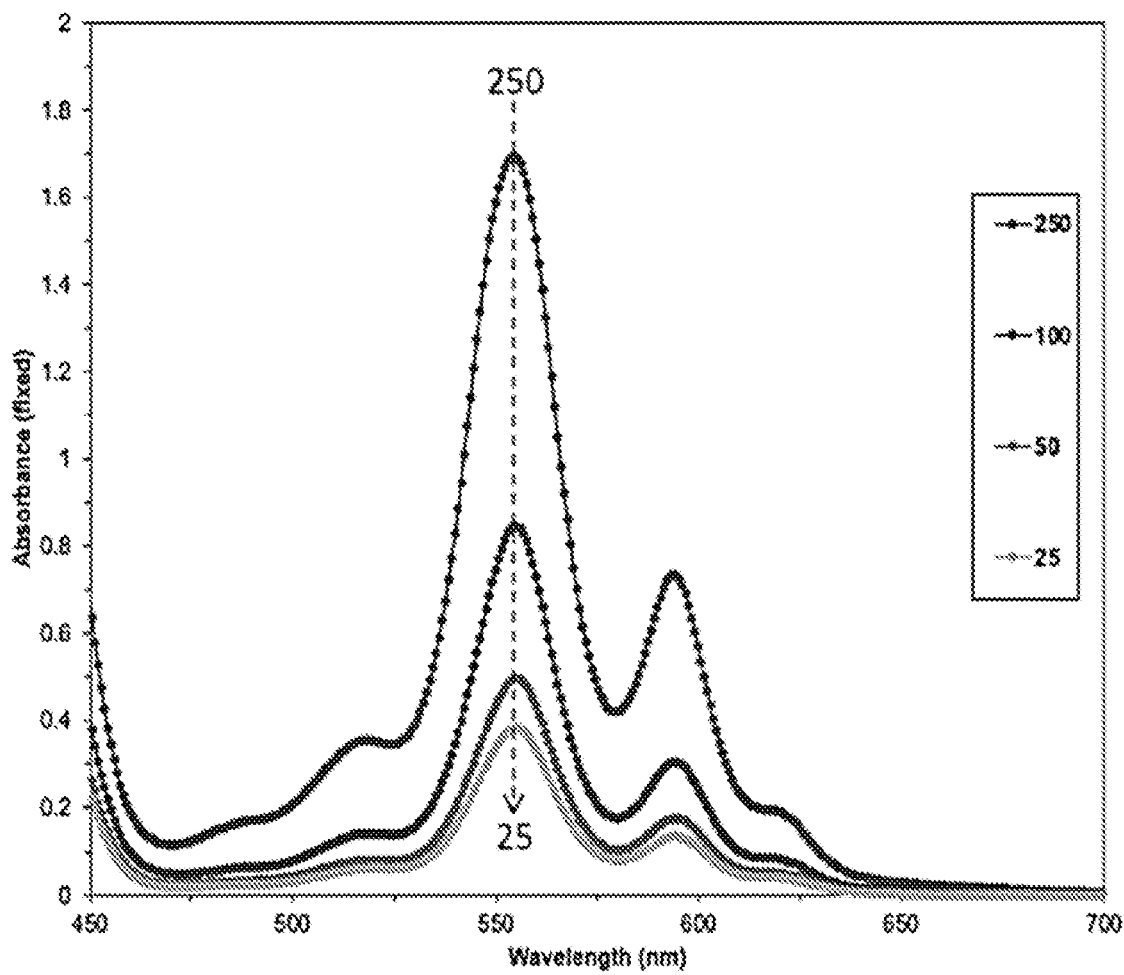

FIG. 175. UV-vis absorption data at different sample thicknesses: 250 μm, 100 μm, 50 μm, and 25 μm. Each sample was measured in triplicate and averaged.

Figure 176:
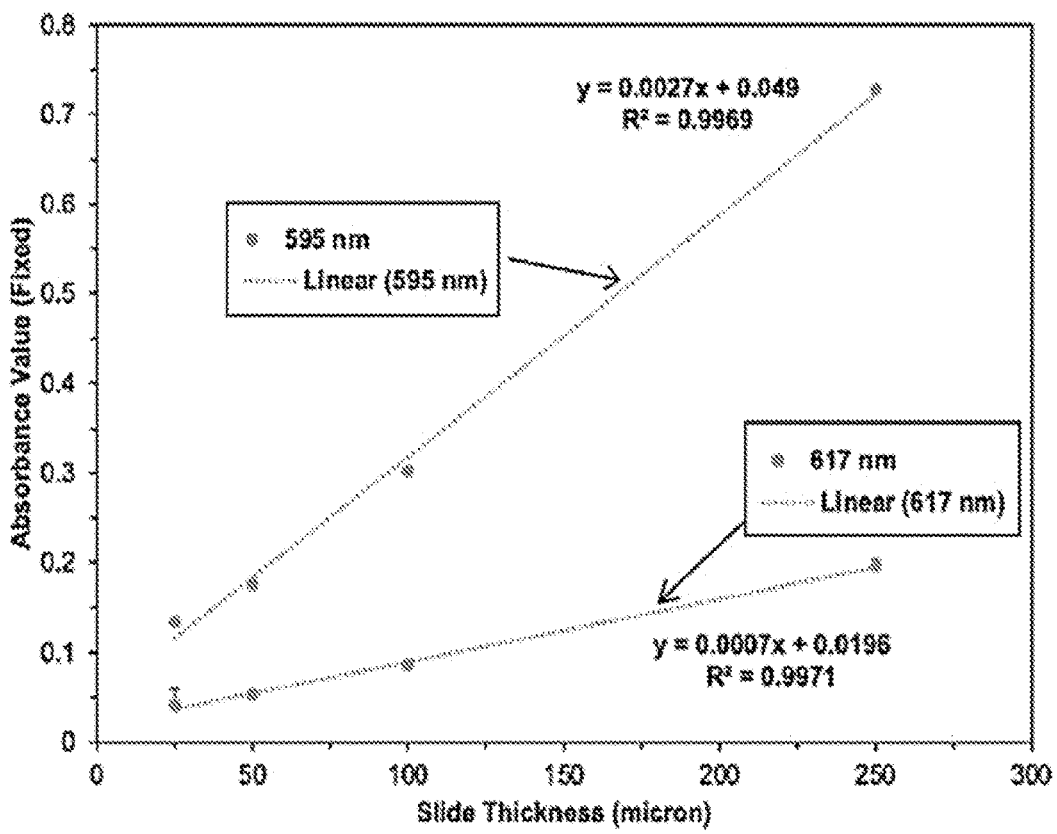

FIG. 176. Beer-Lambert plot for slide thickness versus absorbance at two different wavelengths (595 nm and 617 nm). Equation for fit and $R^2$ value displayed on chart. Samples completed in triplicate and averaged to get point values. Error bars represent 1 standard deviation at each point.

Figure 177:
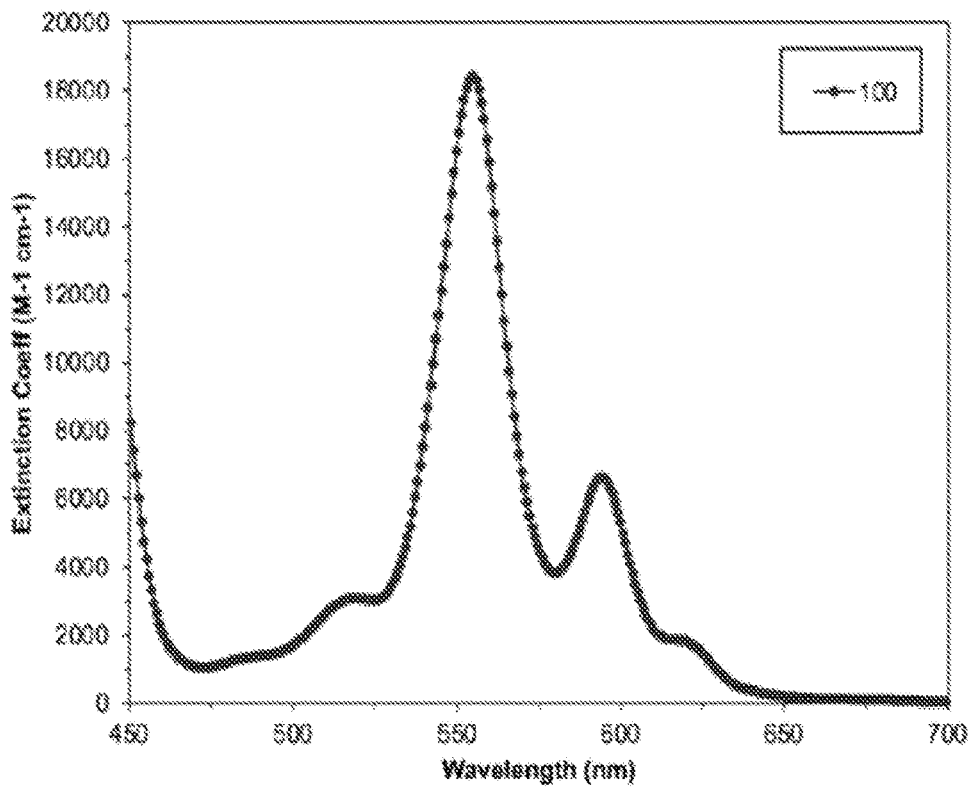

FIG. 177. UV-Vis extinction coefficient data calculated and fitted for 100 μm thickness sample (measured in triplicate and averaged to get data). Extinction was calculated using Beer's Law and the concentration of ZnTPP in the sample was [4.59 mM].

Figure 178:
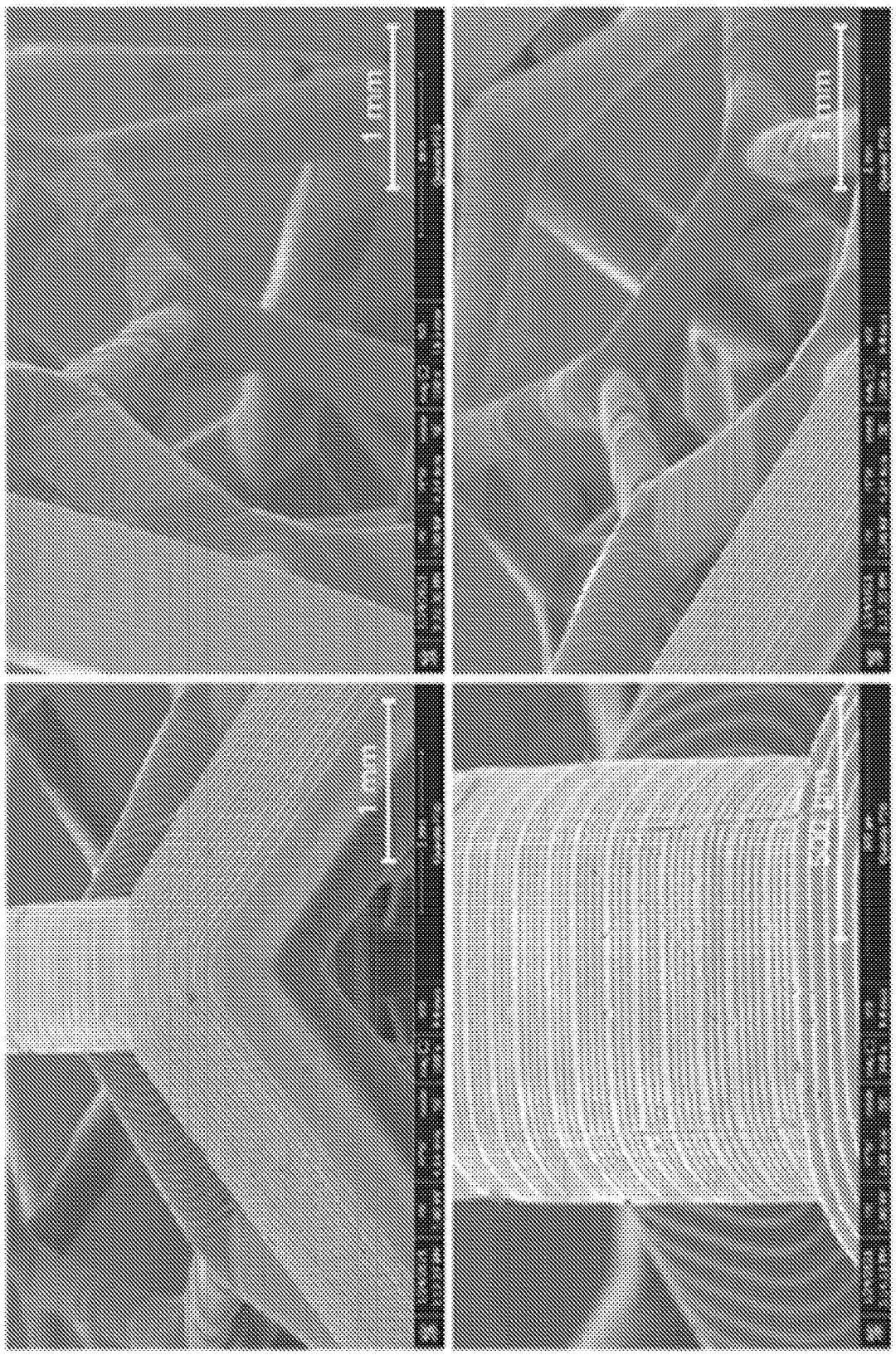

FIG. 178. SEM images of 3D printed 120-cell.

Figure 179:
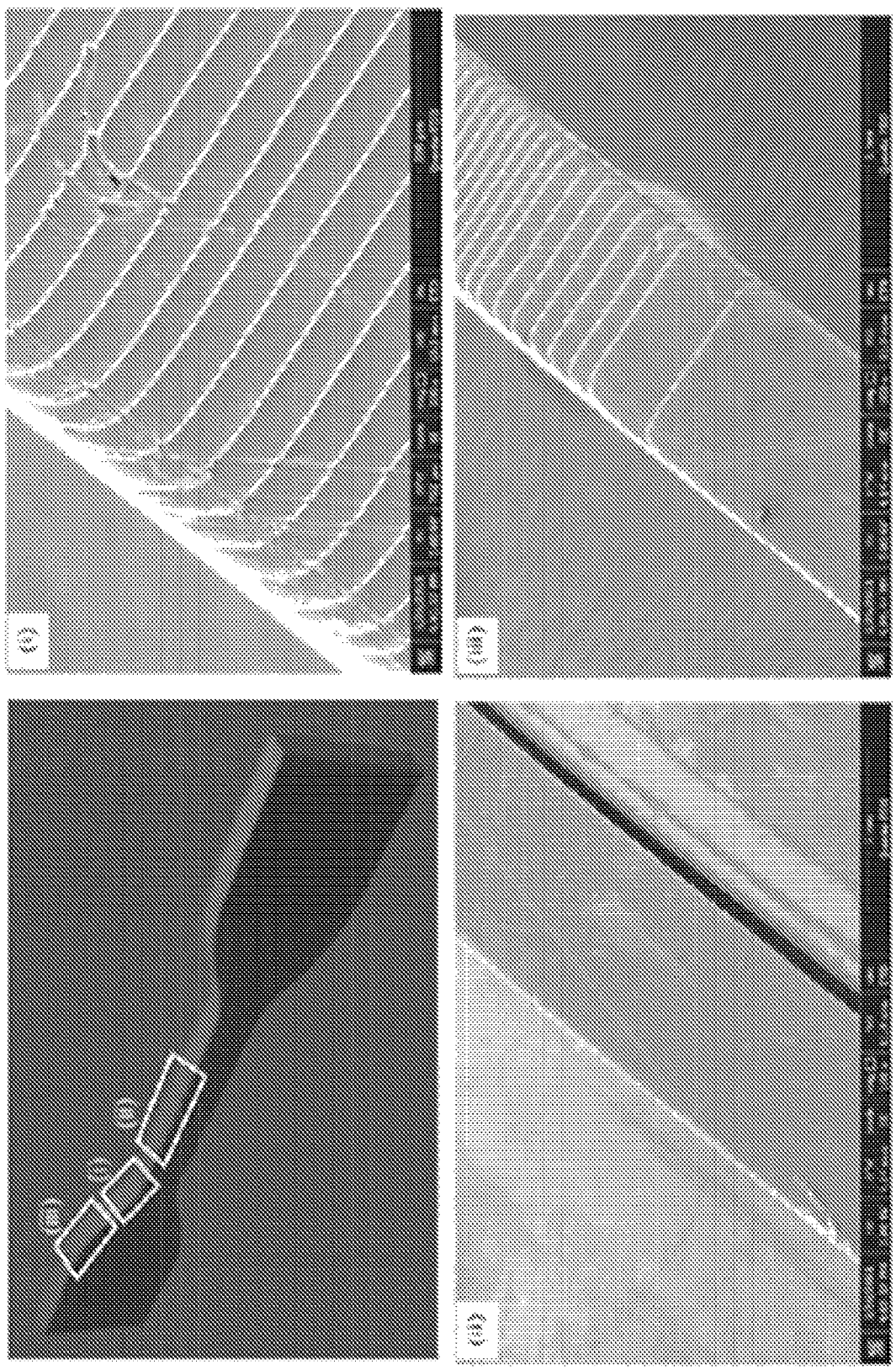

FIG. 179. SEM images of 3D printed dogbones, printed at a horizontal edge-on angle from stiff acrylate Dymax® resin (0.3 wt % ZnTPP, 0.2 wt % Borate V, 2 wt % HNu-254, 0.002 wt % Sudan black, 0.01 wt % TEMPO in BR-741: TPGDA:PETMP=50:49:1, by weight). Prints were accomplished using a red LED (617 nm, 2.5 mW/cm$^2$) and an exposure time of 14 seconds per 25 µm layer. Note that the variation in apparent layer "thickness" arises from layers that are stacked at different x,y positions relative to the layers directly underneath, creating a "stair-like" appearance.

Figure 180:
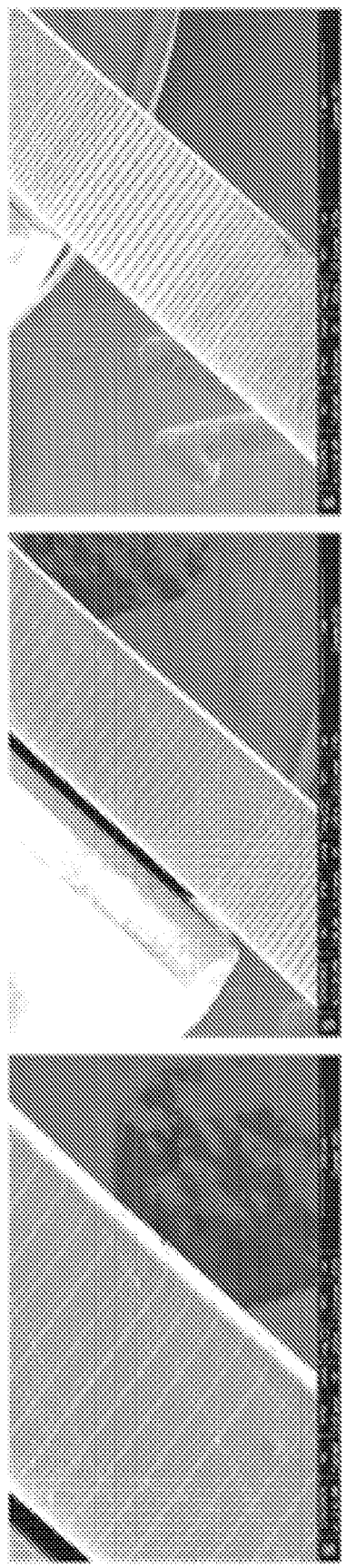

FIG. 180. SEM images of 3D printed dogbones, printed at a diagonal edge-on angle from stiff acrylate Dymax® resin (0.3 wt % ZnTPP, 0.2 wt % Borate V, 2 wt % HNu-254, 0.002 wt % Sudan black, 0.01 wt % TEMPO in BR-741: TPGDA:PETMP=50:49:1, by weight). Prints were accomplished using a red LED (617 nm, 2.5 mW/cm$^2$) and an exposure time of 14 seconds per 25 µm layer. Note that the variation in apparent layer "thickness" arises from layers that are stacked at different x,y positions relative to the layers directly underneath, creating a "stair-like" appearance.

Figure 181:
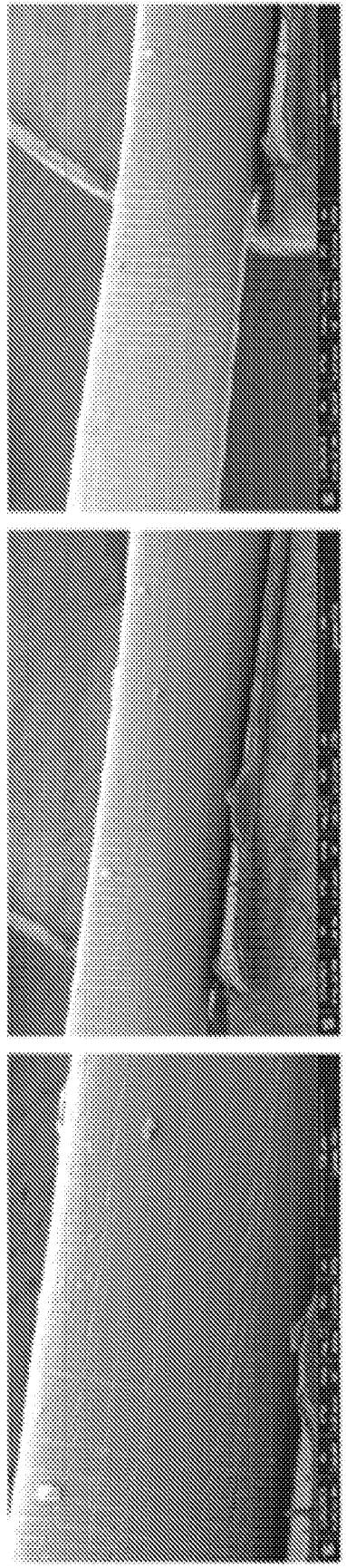

FIG. 181. SEM images of 3D printed dogbones, printed at a vertical edge-on angle from stiff acrylate Dymax® resin (0.3 wt % ZnTPP, 0.2 wt % Borate V, 2 wt % HNu-254, 0.002 wt % Sudan black, 0.01 wt % TEMPO in BR-741: TPGDA:PETMP=50:49:1, by weight). Prints were accomplished using a red LED (617 nm, 2.5 mW/cm$^2$) and an exposure time of 14 seconds per 25 µm layer. Note that the variation in apparent layer "thickness" arises from layers that are stacked at different x,y positions relative to the layers directly underneath, creating a "stair-like" appearance.

Figure 182:
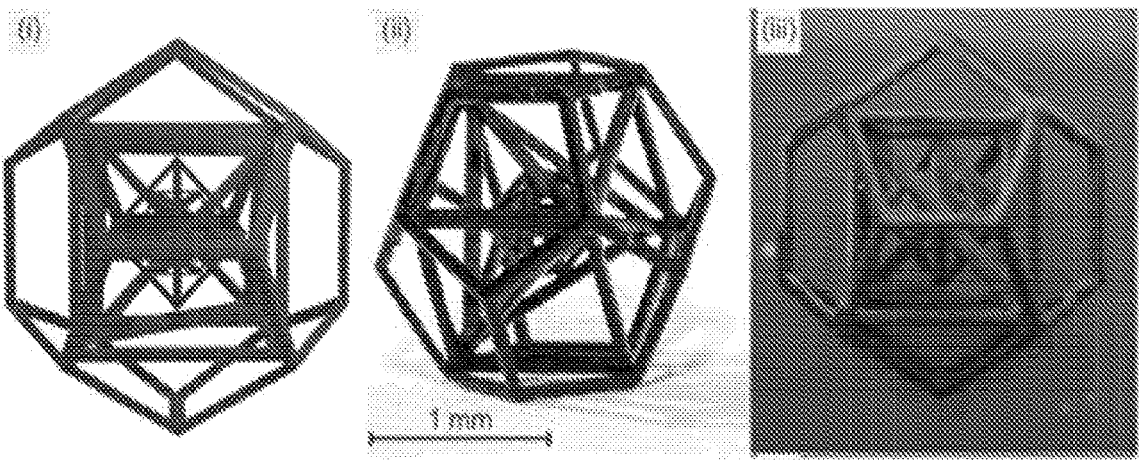

FIG. 182. 3D printed high resolution Leonardo cosmogram. (i) Digital rendering, (ii) photograph of 3D printed object, and (iii) digital photograph under handheld UV lamp (~365 nm).

Figure 183:
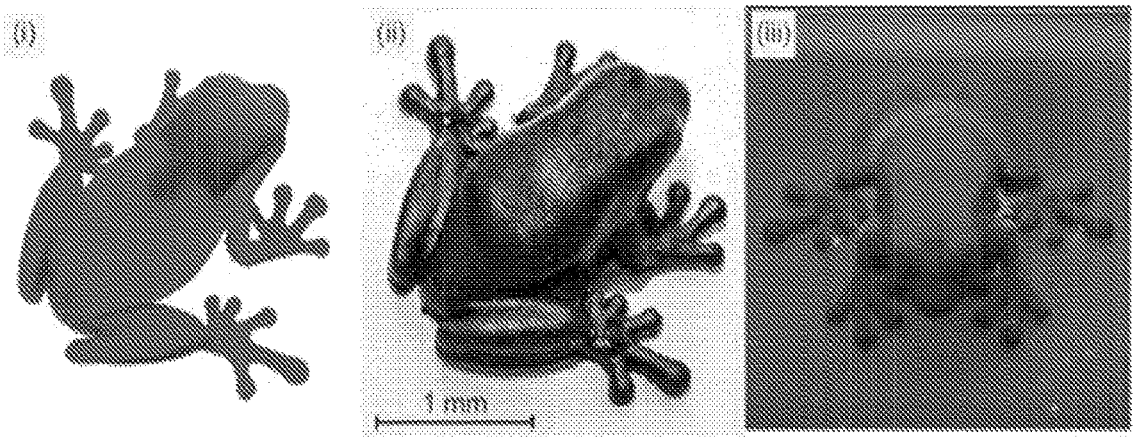

FIG. 183. 3D printed high resolution frog. (i) Digital rendering, (ii) photograph of 3D printed object, and (iii) digital photograph under handheld UV lamp (~365 nm).

Figure 184:
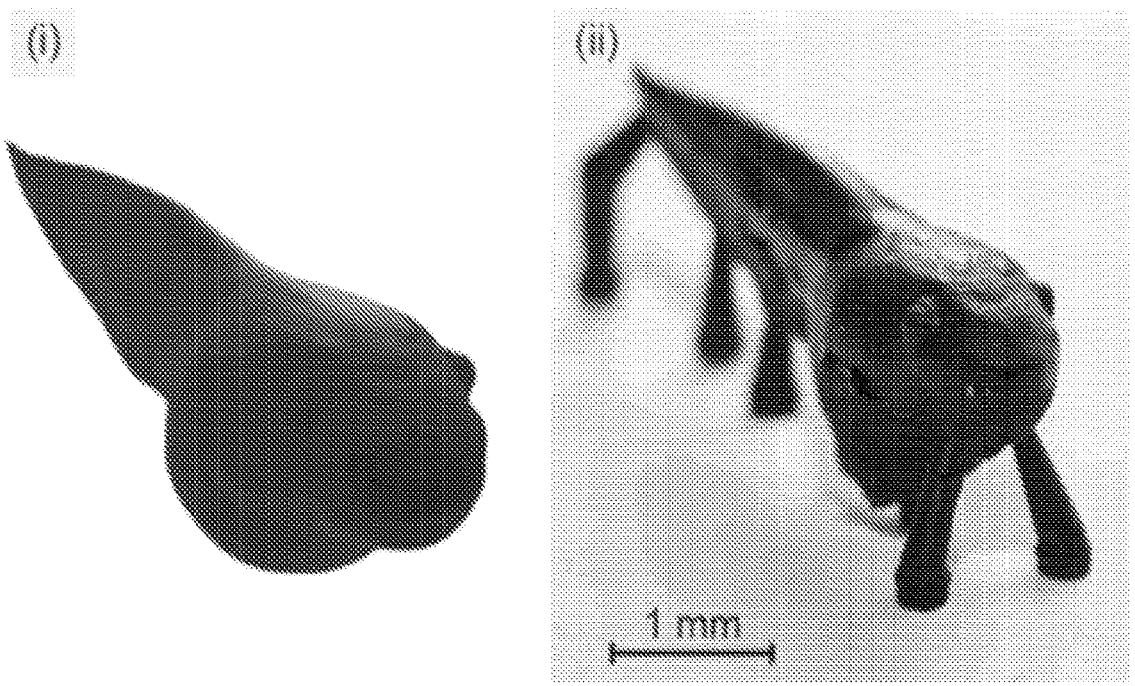

FIG. 184. 3D printed high resolution tadpole. (i) Digital rendering, and (ii) photograph of 3D printed object.

Figure 185:
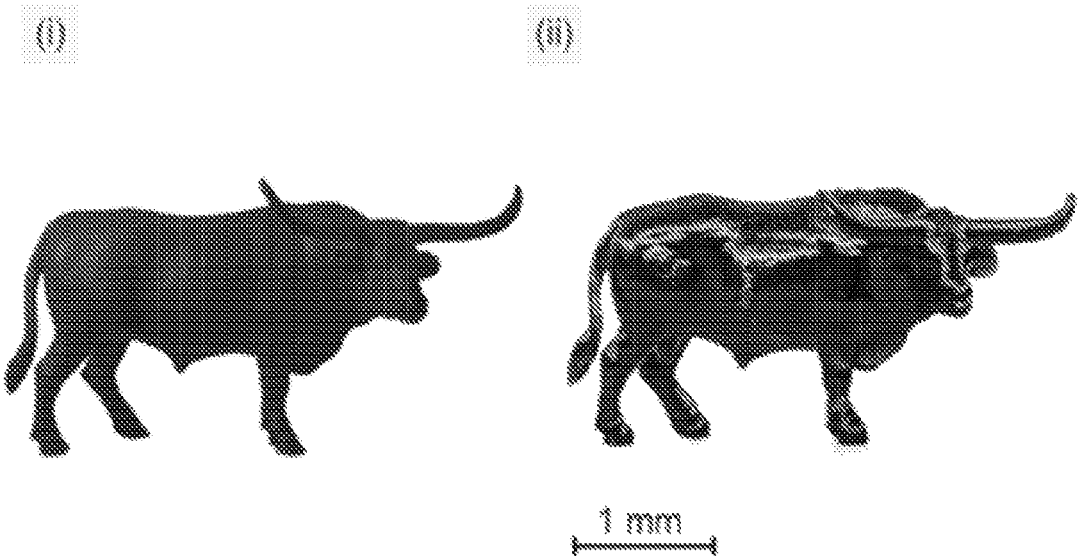

FIG. 185. 3D printed high resolution longhorn. (i) Digital rendering, and (ii) photograph of 3D printed object.

Figure 186:
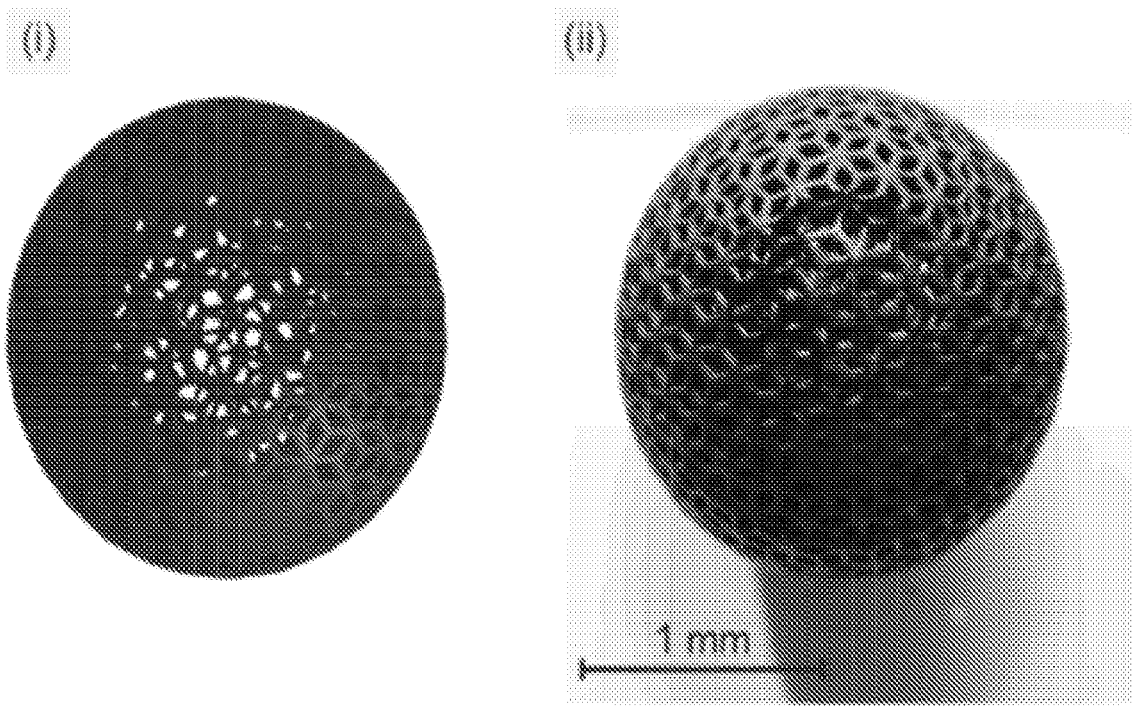

FIG. 186. 3D printed high resolution rhomball. (i) Digital rendering, and (ii) photograph of 3D printed object.

DETAILED DESCRIPTION

The compositions and methods described herein may be understood more readily by reference to the following detailed description of specific aspects of the disclosed subject matter and the Examples included therein.

Before the present compositions and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

General Definitions

In this specification and in the claims that follow, reference will be made to a number of terms, which shall be defined to have the following meanings:

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "the compound" includes mixtures of two or more such compounds, reference to "an agent" includes mixture of two or more such agents, and the like.

"Exemplary" means "an example of" and is not intended to convey an indication of a preferred or ideal embodiment. "Such as" is not used in a restrictive sense, but for explanatory purposes.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. By "about" is meant within 5% of the value, e.g., within 4, 3, 2, or 1% of the value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

It is understood that throughout this specification the identifiers "first" and "second" are used solely to aid in distinguishing the various components and steps of the disclosed subject matter. The identifiers "first" and "second" are not intended to imply any particular order, amount, preference, or importance to the components or steps modified by these terms.

Chemical Definitions

Unless otherwise defined, all technical and scientific terms used herein have the same meaning as commonly understood by one of ordinary skill in the art to which this invention belongs.

The organic moieties mentioned when defining variable positions within the general formulae described herein (e.g., the term "halogen") are collective terms for the individual substituents encompassed by the organic moiety. The prefix $C_n$-$C_m$ preceding a group or moiety indicates, in each case, the possible number of carbon atoms in the group or moiety that follows.

References in the specification and concluding claims to parts by weight of a particular element or component in a composition denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent (wt. %) of a component, unless specifically stated to the contrary, is based on the total weight of the formulation or composition in which the component is included.

The term "ion," as used herein, refers to any molecule, portion of a molecule, cluster of molecules, molecular complex, moiety, or atom that contains a charge (positive, negative, or both at the same time within one molecule, cluster of molecules, molecular complex, or moiety (e.g., zwitterions)) or that can be made to contain a charge. Methods for producing a charge in a molecule, portion of a molecule, cluster of molecules, molecular complex, moiety, or atom are disclosed herein and can be accomplished by methods known in the art, e.g., protonation, deprotonation, oxidation, reduction, alkylation, acetylation, esterification, de-esterification, hydrolysis, etc.

The term "anion" is a type of ion and is included within the meaning of the term "ion." An "anion" is any molecule, portion of a molecule (e.g., zwitterion), cluster of molecules, molecular complex, moiety, or atom that contains a net negative charge or that can be made to contain a net negative charge. The term "anion precursor" is used herein to specifically refer to a molecule that can be converted to an anion via a chemical reaction (e.g., deprotonation).

The term "cation" is a type of ion and is included within the meaning of the term "ion." A "cation" is any molecule, portion of a molecule (e.g., zwitterion), cluster of molecules, molecular complex, moiety, or atom, that contains a net positive charge or that can be made to contain a net positive charge. The term "cation precursor" is used herein to specifically refer to a molecule that can be converted to a cation via a chemical reaction (e.g., protonation or alkylation).

As used herein, the term "substituted" is contemplated to include all permissible substituents of organic compounds. In a broad aspect, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, the heteroatoms, such as nitrogen, can have hydrogen substituents and/or any permissible substituents of organic compounds described herein which satisfy the valencies of the heteroatoms. This disclosure is not intended to be limited in any manner by the permissible substituents of organic compounds. Also, the terms "substitution" or "substituted with" include the implicit proviso that such substitution is in accordance with permitted valence of the substituted atom and the substituent, and that the substitution results in a stable compound, e.g., a compound that does not spontaneously undergo transformation such as by rearrangement, cyclization, elimination, etc.

"$Z^1$," "$Z^2$," "$Z^3$," and "$Z^4$" are used herein as generic symbols to represent various specific substituents. These symbols can be any substituent, not limited to those disclosed herein, and when they are defined to be certain substituents in one instance, they can, in another instance, be defined as some other substituents.

The term "aliphatic" as used herein refers to a non-aromatic hydrocarbon group and includes branched and unbranched, alkyl, alkenyl, or alkynyl groups.

As used herein, the term "alkyl" refers to saturated, straight-chained or branched saturated hydrocarbon moieties. Unless otherwise specified, $C_1$-$C_{24}$ (e.g., $C_1$-$C_{22}$, $C_1$-$C_{20}$, $C_1$-$C_{18}$, $C_1$-$C_{16}$, $C_1$-$C_{14}$, $C_1$-$C_{12}$, $C_1$-$C_{10}$, $C_1$-$C_8$, $C_1$-$C_6$, or $C_1$-$C_4$) alkyl groups are intended. Examples of alkyl groups include methyl, ethyl, propyl, 1-methyl-ethyl, butyl, 1-methyl-propyl, 2-methyl-propyl, 1,1-dimethyl-ethyl, pentyl, 1-methyl-butyl, 2-methyl-butyl, 3-methyl-butyl, 2,2-dimethyl-propyl, 1-ethyl-propyl, hexyl, 1,1-dimethyl-propyl, 1,2-dimethyl-propyl, 1-methyl-pentyl, 2-methyl-pentyl, 3-methyl-pentyl, 4-methyl-pentyl, 1,1-dimethyl-butyl, 1,2-dimethyl-butyl, 1,3-dimethyl-butyl, 2,2-dimethyl-butyl, 2,3-dimethyl-butyl, 3,3-dimethyl-butyl, 1-ethyl-butyl, 2-ethyl-butyl, 1,1,2-trimethyl-propyl, 1,2,2-trimethyl-propyl, 1-ethyl-1-methyl-propyl, 1-ethyl-2-methyl-propyl, heptyl, octyl, nonyl, decyl, dodecyl, tetradecyl, hexadecyl, eicosyl, tetracosyl, and the like. Alkyl substituents may be unsubstituted or substituted with one or more chemical moieties. The alkyl group can be substituted with one or more groups including, but not limited to, hydroxyl, halogen, acyl, alkyl, alkoxy, alkenyl, alkynyl, aryl, heteroaryl, aldehyde, amino, cyano, carboxylic acid, ester, ether, ketone, nitro, phosphonyl, silyl, sulfo-oxo, sulfonyl, sulfone, sulfoxide, or thiol, as described below, provided that the substituents are sterically compatible and the rules of chemical bonding and strain energy are satisfied.

Throughout the specification "alkyl" is generally used to refer to both unsubstituted alkyl groups and substituted alkyl groups; however, substituted alkyl groups are also specifically referred to herein by identifying the specific substituent (s) on the alkyl group. For example, the term "halogenated alkyl" specifically refers to an alkyl group that is substituted with one or more halides (halogens; e.g., fluorine, chlorine, bromine, or iodine). The term "alkoxyalkyl" specifically refers to an alkyl group that is substituted with one or more alkoxy groups, as described below. The term "alkylamino" specifically refers to an alkyl group that is substituted with one or more amino groups, as described below, and the like. When "alkyl" is used in one instance and a specific term such as "alkylalcohol" is used in another, it is not meant to imply that the term "alkyl" does not also refer to specific terms such as "alkylalcohol" and the like.

This practice is also used for other groups described herein. That is, while a term such as "cycloalkyl" refers to both unsubstituted and substituted cycloalkyl moieties, the substituted moieties can, in addition, be specifically identified herein; for example, a particular substituted cycloalkyl can be referred to as, e.g., an "alkylcycloalkyl." Similarly, a substituted alkoxy can be specifically referred to as, e.g., a "halogenated alkoxy," a particular substituted alkenyl can be, e.g., an "alkenylalcohol," and the like. Again, the practice of using a general term, such as "cycloalkyl," and a specific term, such as "alkylcycloalkyl," is not meant to imply that the general term does not also include the specific term.

As used herein, the term "alkenyl" refers to unsaturated, straight-chained, or branched hydrocarbon moieties containing a double bond. Unless otherwise specified, $C_2$-$C_{24}$ (e.g., $C_2$-$C_{22}$, $C_2$-$C_{20}$, $C_2$-$C_{18}$, $C_2$-$C_{16}$, $C_2$-$C_{14}$, $C_2$-$C_{12}$, $C_2$-$C_{10}$, $C_2$-$C_8$, $C_2$-$C_6$, or $C_2$-$C_4$) alkenyl groups are intended. Alkenyl groups may contain more than one unsaturated bond. Examples include ethenyl, 1-propenyl, 2-propenyl, 1-methylethenyl, 1-butenyl, 2-butenyl, 3-butenyl, 1-methyl-1-propenyl, 2-methyl-1-propenyl, 1-methyl-2-propenyl, 2-methyl-2-propenyl, 1-pentenyl, 2-pentenyl, 3-pentenyl, 4-pentenyl, 1-methyl-1-butenyl, 2-methyl-1-butenyl, 3-methyl-1-butenyl, 1-methyl-2-butenyl, 2-methyl-2-butenyl, 3-methyl-2-butenyl, 1-methyl-3-butenyl, 2-methyl-3-butenyl, 3-methyl-3-butenyl, 1,1-dimethyl-2-propenyl, 1,2-dimethyl-1-propenyl, 1,2-dimethyl-2-propenyl, 1-ethyl-1-propenyl, 1-ethyl-2-propenyl, 1-hexenyl, 2-hexenyl, 3-hexenyl, 4-hexenyl, 5-hexenyl, 1-methyl-1-pentenyl, 2-methyl-1-pentenyl, 3-methyl-1-pentenyl, 4-methyl-1-pentenyl, 1-methyl-2-pentenyl, 2-methyl-2-pentenyl, 3-methyl-2-pentenyl, 4-methyl-2-pentenyl, 1-methyl-3-pentenyl, 2-methyl-3-pentenyl, 3-methyl-3-pentenyl, 4-methyl-3-pentenyl, 1-methyl-4-pentenyl, 2-methyl-4-pentenyl, 3-methyl-4-pentenyl, 4-methyl-4-pentenyl, 1,1-dimethyl-2-butenyl, 1,1-dimethyl-3-butenyl, 1,2-dimethyl-1-butenyl, 1,2-dimethyl-2-butenyl, 1,2-dimethyl-3-butenyl, 1,3-dimethyl-1-butenyl, 1,3-dimethyl-2-butenyl, 1,3-dimethyl-3-butenyl, 2,2-dimethyl-3-butenyl, 2,3-dimethyl-1-butenyl, 2,3-dimethyl-2-butenyl, 2,3-dimethyl-3-butenyl, 3,3-dimethyl-1-butenyl, 3,3-dimethyl-2-butenyl, 1-ethyl-1-butenyl, 1-ethyl-2-butenyl, 1-ethyl-3-butenyl, 2-ethyl-1-butenyl, 2-ethyl-2-butenyl, 2-ethyl-3-butenyl, 1,1,2-trimethyl-2-propenyl, 1-ethyl-1-methyl-2-propenyl, 1-ethyl-2-methyl-1-propenyl, and 1-ethyl-2-methyl-2-propenyl. The term "vinyl" refers to a group having the structure —CH=CH$_2$; 1-propenyl refers to a group with the structure —CH=CH—CH$_3$; and 2-propenyl refers to a group with the structure —CH$_2$—CH=CH$_2$. Asymmetric structures such as $(Z^1Z^2)C=C(Z^3Z^4)$ are intended to include both the E and Z isomers. This can be presumed in structural formulae herein wherein an asymmetric alkene is present, or it can be explicitly indicated by the bond symbol C=C. Alkenyl substituents may be unsubstituted or substituted with one or more chemical moieties. Examples of suitable substituents include, for example, alkyl, alkoxy, alkenyl, alkynyl, aryl, heteroaryl, acyl, aldehyde, amino, cyano, carboxylic acid, ester, ether, halide, hydroxyl, ketone, nitro, phosphonyl, silyl, sulfo-oxo, sulfonyl, sulfone, sulfoxide, or thiol, as described below, provided that the substituents are sterically compatible and the rules of chemical bonding and strain energy are satisfied.

As used herein, the term "alkynyl" represents straight-chained or branched hydrocarbon moieties containing a triple bond. Unless otherwise specified, $C_2$-$C_{24}$ (e.g., $C_2$-$C_{24}$, $C_2$-$C_{20}$, $C_2$-$C_{18}$, $C_2$-$C_{16}$, $C_2$-$C_{14}$, $C_2$-$C_{12}$, $C_2$-$C_{10}$, $C_2$-$C_8$, $C_2$-$C_6$, or $C_2$-$C_4$) alkynyl groups are intended. Alkynyl groups may contain more than one unsaturated bond. Examples include $C_2$-$C_6$-alkynyl, such as ethynyl, 1-propynyl, 2-propynyl (or propargyl), 1-butynyl, 2-butynyl, 3-butynyl, 1-methyl-2-propynyl, 1-pentynyl, 2-pentynyl, 3-pentynyl, 4-pentynyl, 3-methyl-1-butynyl, 1-methyl-2-butynyl, 1-methyl-3-butynyl, 2-methyl-3-butynyl, 1,1-dimethyl-2-propynyl, 1-ethyl-2-propynyl, 1-hexynyl, 2-hexynyl, 3-hexynyl, 4-hexynyl, 5-hexynyl, 3-methyl-1-pentynyl, 4-methyl-1-pentynyl, 1-methyl-2-pentynyl, 4-methyl-2-pentynyl, 1-methyl-3-pentynyl, 2-methyl-3-pentynyl, 1-methyl-4-pentynyl, 2-methyl-4-pentynyl, 3-methyl-4-pentynyl, 1,1-dimethyl-2-butynyl, 1,1-dimethyl-3-butynyl, 1,2-dimethyl-3-butynyl, 2,2-dimethyl-3-butynyl, 3,3-dimethyl-1-butynyl, 1-ethyl-2-butynyl, 1-ethyl-3-butynyl, 2-ethyl-3-butynyl, and 1-ethyl-1-methyl-2-propynyl. Alkynyl substituents may be unsubstituted or substituted with one or more chemical moieties. Examples of suitable substituents include, for example, alkyl, alkoxy, alkenyl, alkynyl, aryl, heteroaryl, acyl, aldehyde, amino, cyano, carboxylic acid, ester, ether, halide, hydroxyl, ketone, nitro, phosphonyl, silyl, sulfo-oxo, sulfonyl, sulfone, sulfoxide, or thiol, as described below.

As used herein, the term "aryl," as well as derivative terms such as aryloxy, refers to groups that include a monovalent aromatic carbocyclic group of from 3 to 50 carbon atoms. Aryl groups can include a single ring or multiple condensed rings. In some embodiments, aryl groups include $C_6$-$C_{10}$ aryl groups. Examples of aryl groups include, but are not limited to, benzene, phenyl, biphenyl, naphthyl, tetrahydronaphthyl, phenylcyclopropyl, phenoxy-benzene, and indanyl. The term "aryl" also includes "heteroaryl," which is defined as a group that contains an aromatic group that has at least one heteroatom incorporated within the ring of the aromatic group. Examples of heteroatoms include, but are not limited to, nitrogen, oxygen, sulfur, and phosphorus. The term "non-heteroaryl," which is also included in the term "aryl," defines a group that contains an aromatic group that does not contain a heteroatom. The aryl substituents may be unsubstituted or substituted with one or more chemical moieties. Examples of suitable substituents include, for example, alkyl, alkoxy, alkenyl, alkynyl, aryl, heteroaryl, acyl, aldehyde, amino, cyano, carboxylic acid, ester, ether, halide, hydroxyl, ketone, nitro, phosphonyl, silyl, sulfo-oxo, sulfonyl, sulfone, sulfoxide, or thiol as described herein. The term "biaryl" is a specific type of aryl group and is included in the definition of aryl. Biaryl refers to two aryl groups that are bound together via a fused ring structure, as in naphthalene, or are attached via one or more carbon-carbon bonds, as in biphenyl.

The term "cycloalkyl" as used herein is a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl" is a cycloalkyl group as defined above where at least one of the carbon atoms of the ring is substituted with a heteroatom such as, but not limited to, nitrogen, oxygen, sulfur, or phosphorus. The cycloalkyl group and heterocycloalkyl group can be substituted or unsubstituted. The cycloalkyl group and heterocycloalkyl group can be substituted with one or more groups including, but not limited to, alkyl, alkoxy, alkenyl, alkynyl, aryl, heteroaryl, acyl, aldehyde, amino, cyano, carboxylic acid, ester, ether, halide, hydroxyl, ketone, nitro, phosphonyl, silyl, sulfo-oxo, sulfonyl, sulfone, sulfoxide, or thiol as described herein.

The term "cycloalkenyl" as used herein is a non-aromatic carbon-based ring composed of at least three carbon atoms and containing at least one double bound, i.e., C=C. Examples of cycloalkenyl groups include, but are not limited to, cyclopropenyl, cyclobutenyl, cyclopentenyl, cyclopentadienyl, cyclohexenyl, cyclohexadienyl, and the like. The term "heterocycloalkenyl" is a type of cycloalkenyl group as defined above and is included within the meaning of the term "cycloalkenyl," where at least one of the carbon atoms of the ring is substituted with a heteroatom such as, but not limited to, nitrogen, oxygen, sulfur, or phosphorus. The cycloalkenyl group and heterocycloalkenyl group can be substituted or unsubstituted. The cycloalkenyl group and heterocycloalkenyl group can be substituted with one or more groups including, but not limited to, alkyl, alkoxy, alkenyl, alkynyl, aryl, heteroaryl, acyl, aldehyde, amino, cyano, carboxylic acid, ester, ether, halide, hydroxyl, ketone, nitro, phosphonyl, silyl, sulfo-oxo, sulfonyl, sulfone, sulfoxide, or thiol as described herein.

The term "cyclic group" is used herein to refer to either aryl groups, non-aryl groups (i.e., cycloalkyl, heterocycloalkyl, cycloalkenyl, and heterocycloalkenyl groups), or both.

Cyclic groups have one or more ring systems that can be substituted or unsubstituted. A cyclic group can contain one or more aryl groups, one or more non-aryl groups, or one or more aryl groups and one or more non-aryl groups.

The term "acyl" as used herein is represented by the formula —C(O)$Z^1$ where $Z^1$ can be a hydrogen, hydroxyl, alkoxy, alkyl, alkenyl, alkynyl, aryl, heteroaryl, cycloalkyl, cycloalkenyl, heterocycloalkyl, or heterocycloalkenyl group described above. As used herein, the term "acyl" can be used interchangeably with "carbonyl." Throughout this specification "C(O)" or "CO" is a shorthand notation for C=O.

The term "acetal" as used herein is represented by the formula ($Z^1Z^2$)C(=$OZ^3$)(=$OZ^4$), where $Z^1$, $Z^2$, $Z^3$, and $Z°$ can be, independently, a hydrogen, halogen, hydroxyl, alkyl, alkenyl, alkynyl, aryl, heteroaryl, cycloalkyl, cycloalkenyl, heterocycloalkyl, or heterocycloalkenyl group described above.

The term "alkanol" as used herein is represented by the formula $Z^1$OH, where $Z^1$ can be an alkyl, alkenyl, alkynyl, aryl, heteroaryl, cycloalkyl, cycloalkenyl, heterocycloalkyl, or heterocycloalkenyl group described above.

As used herein, the term "alkoxy" as used herein is an alkyl group bound through a single, terminal ether linkage; that is, an "alkoxy" group can be defined as to a group of the formula $Z^1$—O—, where $Z^1$ is unsubstituted or substituted alkyl as defined above. Unless otherwise specified, alkoxy groups wherein $Z^1$ is a $C_1$-$C_{24}$ (e.g., $C_1$-$C_{22}$, $C_1$-$C_{20}$, $C_1$-$C_{18}$, $C_1$-$C_{16}$, $C_1$-$C_{14}$, $C_1$-$C_{12}$, $C_1$-$C_{10}$, $C_1$-$C_8$, $C_1$-$C_6$, or $C_1$-$C_4$) alkyl group are intended. Examples include methoxy, ethoxy, propoxy, 1-methyl-ethoxy, butoxy, 1-methyl-propoxy, 2-methyl-propoxy, 1,1-dimethyl-ethoxy, pentoxy, 1-methyl-butyloxy, 2-methyl-butoxy, 3-methyl-butoxy, 2,2-di-methyl-propoxy, 1-ethyl-propoxy, hexoxy, 1,1-dimethyl-propoxy, 1,2-dimethyl-propoxy, 1-methyl-pentoxy, 2-methyl-pentoxy, 3-methyl-pentoxy, 4-methyl-penoxy, 1,1-dimethyl-butoxy, 1,2-dimethyl-butoxy, 1,3-dimethyl-butoxy, 2,2-dimethyl-butoxy, 2,3-dimethyl-butoxy, 3,3-dimethyl-butoxy, 1-ethyl-butoxy, 2-ethylbutoxy, 1,1,2-trimethyl-propoxy, 1,2,2-trimethyl-propoxy, 1-ethyl-1-methyl-propoxy, and 1-ethyl-2-methyl-propoxy.

The term "aldehyde" as used herein is represented by the formula —C(O)H. Throughout this specification "C(O)" is a shorthand notation for C=O.

The terms "amine" or "amino" as used herein are represented by the formula —N$Z^1Z^2Z^3$, where $Z^1$, $Z^2$, and $Z^3$ can each be substitution group as described herein, such as hydrogen, an alkyl, alkenyl, alkynyl, aryl, heteroaryl, cycloalkyl, cycloalkenyl, heterocycloalkyl, or heterocycloalkenyl group described above.

The terms "amide" or "amido" as used herein are represented by the formula —C(O)N$Z^1Z^2$, where $Z^1$ and $Z^2$ can each be substitution group as described herein, such as hydrogen, an alkyl, alkenyl, alkynyl, aryl, heteroaryl, cycloalkyl, cycloalkenyl, heterocycloalkyl, or heterocycloalkenyl group described above.

The term "anhydride" as used herein is represented by the formula $Z^1$C(O)OC(O)$Z^2$ where $Z^1$ and $Z^2$, independently, can be an alkyl, alkenyl, alkynyl, aryl, heteroaryl, cycloalkyl, cycloalkenyl, heterocycloalkyl, or heterocycloalkenyl group described above.

The term "cyclic anhydride" as used herein is represented by the formula:

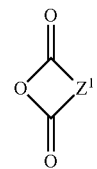

where $Z^1$ can be an alkyl, alkenyl, alkynyl, aryl, heteroaryl, cycloalkyl, cycloalkenyl, heterocycloalkyl, or heterocycloalkenyl group described above.

The term "azide" as used herein is represented by the formula —N=N=N.

The term "carboxylic acid" as used herein is represented by the formula —C(O)OH.

A "carboxylate" or "carboxyl" group as used herein is represented by the formula —C(O)O$^-$.

The term "cyano" as used herein is represented by the formula —CN.

The term "ester" as used herein is represented by the formula —OC(O)$Z^1$ or —C(O)O$Z^1$, where $Z^1$ can be an alkyl, alkenyl, alkynyl, aryl, heteroaryl, cycloalkyl, cycloalkenyl, heterocycloalkyl, or heterocycloalkenyl group described above.

The term "ether" as used herein is represented by the formula $Z^1$O$Z^2$, where $Z^1$ and $Z^2$ can be, independently, an alkyl, alkenyl, alkynyl, aryl, heteroaryl, cycloalkyl, cycloalkenyl, heterocycloalkyl, or heterocycloalkenyl group described above.

The term "epoxy" or "epoxide" as used herein refers to a cyclic ether with a three atom ring and can represented by the formula:

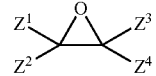

where $Z^1$, $Z^2$, $Z^3$, and $Z°$ can be, independently, an alkyl, alkenyl, alkynyl, aryl, heteroaryl, cycloalkyl, cycloalkenyl, heterocycloalkyl, or heterocycloalkenyl group described above The term "ketone" as used herein is represented by the formula $Z^1$C(O)$Z^2$, where $Z^1$ and $Z^2$ can be, independently, an alkyl, alkenyl, alkynyl, aryl, heteroaryl, cycloalkyl, cycloalkenyl, heterocycloalkyl, or heterocycloalkenyl group described above.

The term "halide" or "halogen" or "halo" as used herein refers to fluorine, chlorine, bromine, and iodine.

The term "hydroxyl" as used herein is represented by the formula —OH.

The term "nitro" as used herein is represented by the formula —$NO_2$.

The term "phosphonyl" is used herein to refer to the phospho-oxo group represented by the formula —P(O)(O$Z^1$)$_2$, where $Z^1$ can be hydrogen, an alkyl, alkenyl, alkynyl, aryl, heteroaryl, cycloalkyl, cycloalkenyl, heterocycloalkyl, or heterocycloalkenyl group described above.

The term "silyl" as used herein is represented by the formula —Si$Z^1Z^2Z^3$, where $Z^1$, $Z^2$, and $Z^3$ can be, independently, hydrogen, alkyl, alkoxy, alkenyl, alkynyl, aryl, heteroaryl, cycloalkyl, cycloalkenyl, heterocycloalkyl, or heterocycloalkenyl group described above.

The term "sulfonyl" or "sulfone" is used herein to refer to the sulfo-oxo group represented by the formula —S(O)$_2Z^1$, where $Z^1$ can be hydrogen, an alkyl, alkenyl, alkynyl, aryl, heteroaryl, cycloalkyl, cycloalkenyl, heterocycloalkyl, or heterocycloalkenyl group described above.

The term "sulfide" as used herein is comprises the formula —S—.

The term "thiol" as used herein is represented by the formula —SH.

"$R^1$," "$R^2$," "$R^3$," "$R^n$," etc., where n is some integer, as used herein can, independently, possess one or more of the groups listed above. For example, if $R^1$ is a straight chain alkyl group, one of the hydrogen atoms of the alkyl group can optionally be substituted with a hydroxyl group, an alkoxy group, an amine group, an alkyl group, a halide, and the like. Depending upon the groups that are selected, a first group can be incorporated within second group or, alternatively, the first group can be pendant (i.e., attached) to the second group. For example, with the phrase "an alkyl group comprising an amino group," the amino group can be incorporated within the backbone of the alkyl group. Alternatively, the amino group can be attached to the backbone of the alkyl group. The nature of the group(s) that is (are) selected will determine if the first group is embedded or attached to the second group.

Unless stated to the contrary, a formula with chemical bonds shown only as solid lines and not as wedges or dashed lines contemplates each possible stereoisomer or mixture of stereoisomer (e.g., each enantiomer, each diastereomer, each meso compound, a racemic mixture, or scalemic mixture).

The term "olefinically unsaturated group" or "ethylenically unsaturated group" is employed herein in a broad sense and is intended to encompass any groups containing a carbon-carbon double bonded group (>C=C< group). Exemplary ethylenically unsaturated groups include, but are not limited to, (meth)acrylate, (meth)acrylamide, (meth)acryloyl, allyl, vinyl, styrenyl, or other >C=C< containing groups.

"Polymer" means a material formed by polymerizing one or more monomers.

The term "(co)polymer" includes homopolymers, copolymers, or mixtures thereof.

The term "(meth)acryl . . . " includes "acryl . . . ," "methacryl . . . ," or mixtures thereof.

Gelation as used herein refers to a stage in a chemical reaction at which a polymer is no longer able to flow. In a theoretical sense, gelation is characterized by interconnected polymers chains (Network Structure) forming an infinitely large molecule which is not able to flow. Crosslinking reactions can continue to occur beyond the point of gelation, thereby increasing the degree of rigidity of the polymer network.

Compositions

Disclosed herein are photocurable compositions comprising: a (co)monomer; a photosensitizer having an absorption band, wherein at least a portion of the absorption band is located at one or more wavelength from 400 nm to 1400 nm, and wherein the photosensitizer comprises a xanthene, a squaraine, a boron-dipyrromethene, a cyanine, a porphyrin, or a combination thereof; an acceptor co-initiator comprising a diphenyliodonium salt; and a donor co-initiator comprising a borate salt. As used herein, a "photocurable" composition is a composition that undergoes polymerization when exposed to light (e.g., photopolymerization). For example, when the photocurable compositions described herein are irradiated with light that has an energy that at least partially overlaps with the absorption band of the photosensitizer, then the photosensitizer absorbs at least a portion of the light to become excited and thereby form an excited photosensitizer. The excited photosensitizer can then accept an electron from the donor co-initiator to generate a photosensitizer radical anion and a donor radical, and the photosensitizer radical anion then donates an electron to the acceptor co-initiator to regenerate the photosensitizer and generate an acceptor radical. Alternatively, the excited photosensitizer can donate an electron to the acceptor co-initiator to generate a photosensitizer radical cation and an acceptor radical, and the photosensitizer radical cation then accepts an electron from the donor co-initiator to regenerate the photosensitizer and generate a donor radical. Irradiating the photocurable composition with light that has an energy that at least partially overlaps with the absorption band of the photosensitizer thereby induces polymerization of the (co)monomer with the donor radical and the acceptor radical.

In some examples, at least a portion of the absorption band is located at one or more wavelengths of 400 nm or more (e.g., 425 nm or more, 450 nm or more, 475 nm or more, 500 nm or more, 525 nm or more, 550 nm or more, 575 nm or more, 600 nm or more, 625 nm or more, 650 nm or more, 675 nm or more, 700 nm or more, 725 nm or more, 750 nm or more, 800 nm or more, 850 nm or more, 900 nm or more, 950 nm or more, 1000 nm or more, 1100 nm or more, 1200 nm or more, or 1300 nm or more). In some examples, at least a portion of the absorption band is located at one or more wavelengths of 1400 nm or less (e.g., 1300 nm or less, 1200 nm or less, 1100 nm or less, 1000 nm or less, 950 nm or less, 900 nm or less, 850 nm or less, 800 nm or less, 750 nm or less, 725 nm or less, 700 nm or less, 675 nm or less, 650 nm or less, 625 nm or less, 600 nm or less, 575 nm or less, 550 nm or less, 525 nm or less, 500 nm or less, 475 nm or less, or 450 nm or less). The one or more wavelengths of at least a portion of the absorption band can range from any of the minimum values described above to any of the maximum values described above. For example, at least a portion of the absorption band is located at one or more wavelengths from 400 nm to 1400 nm (e.g., from 400 nm to 900 nm, from 900 nm to 1400 nm, from 400 nm to 600 nm, from 600 nm to 800 nm, from 800 nm to 1000 nm, from 1000 nm to 1200 nm, from 1200 nm to 1400 nm, from 400 nm to 740 nm, 450 nm to 740 nm, or 500 nm to 1400 nm).

In some examples, the acceptor co-initiator comprises a diphenyliodonium salt of Formula I:

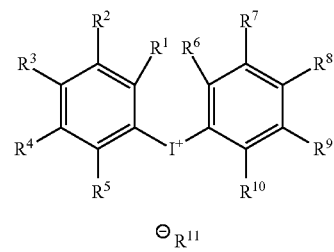

I wherein $R^1$, $R^2$, $R^3$, $R^4$, $R^5$, $R^6$, $R^7$, $R^8$, $R^9$, and $R^{10}$ are each independently H, OH, halogen, alkyl, alkenyl, alkynyl, cycloalkyl, aryl, alkylaryl, or heteroaryl, any of which is optionally substituted with halide, hydroxy, thiol, carbonyl, alkoxy, alkylhydroxy, carboxyl, amino, amido, alkyl, alkenyl, alkynyl, cycloalkyl, aryl, —NR$^x$R$^y$, —C(O)NR$^x$R$^y$, or a combination thereof, or wherein, as valence permits, two or more of $R^1$-$R^{10}$, together with the atoms to which they are attached, form a 3-10 membered cyclic moiety, wherein any of the additional atoms are optionally heteroatoms and the 3-10 membered cyclic moiety is optionally substituted with halide, hydroxy, thioether, carbonyl, alkoxy, alkylhydroxy, carboxyl, amino, amido, alkyl, alkenyl, alkynyl, aryl, —NR$^x$R$^y$, —C(O)NR$^x$R$^y$, or a combination thereof;

R$^x$ and R$^y$ are independently H, OH, alkyl, alkenyl, alkynyl, cycloalkyl, aryl, alkylaryl, or heteroaryl; and R$^{11}$ is a hydroxyl anion, halide anion, nitrate anion, carboxylate anion, sulfonate anion (e.g., triflate), phosphate anion, borate anion (e.g., tetra(alkyl)borate, tetra(aryl)borate, and/or tetra(alkyl/aryl)borate), tetrafluoride anion (e.g., tetrafluoroborate), or hexafluoride anion (e.g., hexafluoroantimonate, hexafluorophosphate), any of which is optionally substituted.

In some examples, the acceptor co-initiator comprises a diphenyliodonium salt of Formula I and R$^1$-R$^{10}$ are each independently H, OH, halogen, or alkyl, any of which is optionally substituted. In some examples, the acceptor co-initiator comprises a diphenyliodonium salt of Formula I and R$^1$-R$^{10}$ are each independently H or alkyl, any of which is optionally substituted. In some examples, the acceptor co-initiator comprises a diphenyliodonium salt of Formula I and R$^{11}$ is a hexafluoride. In some examples, the acceptor co-initiator comprises a diphenyliodonium salt of Formula I and R$^{11}$ is hexafluoroantimonate. In some examples, the acceptor co-initiator comprises [4-(octyloxy)phenyl](phenyl)iodonium hexafluoroantimonate.

The acceptor co-initiator can, for example, be present in an amount of 0.001 wt % or more relative to the total amount of (co)monomer in the photocurable composition (e.g., 0.005 wt % or more, 0.01 wt % or more, 0.05 wt % or more, 0.1 wt % or more, 0.2 wt % or more, 0.3 wt % or more, 0.4 wt % or more, 0.5 wt % or more, 0.6 wt % or more, 0.7 wt % or more, 0.8 wt % or more, 0.9 wt % or more, 1 wt % or more, 1.25 wt % or more, 1.5 wt % or more, 1.75 wt % or more, 2 wt % or more, 2.25 wt % or more, 2.5 wt % or more, 2.75 wt % or more, 3 wt % or more, 3.25 wt % or more, 3.5 wt % or more, 3.75 wt % or more, 4 wt % or more, 4.25 wt % or more, or 4.5 wt % or more). In some examples, the acceptor co-initiator can be present in an amount of 5 wt % or less relative to the total amount of (co)monomer in the photocurable composition (e.g., 4.75 wt % or less, 4.5 wt % or less, 4.25 wt % or less, 4 wt % or less, 3.75 wt % or less, 3.5 wt % or less, 3.25 wt % or less, 3 wt % or less, 2.75 wt % or less, 2.5 wt % or less, 2.25 wt % or less, 2 wt % or less, 1.75 wt % or less, 1.5 wt % or less, 1.25 wt % or less, 1 wt % or less, 0.9 wt % or less, 0.8 wt % or less, 0.7 wt % or less, 0.6 wt % or less, 0.5 wt % or less, 0.4 wt % or less, 0.3 wt % or less, 0.2 wt % or less, 0.1 wt % or less, 0.05 wt % or less, or 0.01 wt % or less). The amount of acceptor co-initiator present in the photocurable composition can range from any of the minimum values described above to any of the maximum values described above. For examples, the acceptor co-initiator can be present in an amount of from 0.001 to 5 wt % relative to the total amount of (co)monomer in the photocurable composition (e.g., from 0.001 wt % to 2.5 wt %, from 2.5 wt % to 5 wt %, from 0.001 wt % to 0.1 wt %, from 0.1 wt % to 1 wt %, from 1 wt % to 5 wt %, from 0.001 wt % to 4 wt %, from 0.01 wt % to 5 wt %, from 0.01 wt % to 4 wt %, from 0.1 wt % to 3 wt %, or from 1 wt % to 3 wt %). In some examples, the acceptor co-initiator is present in an amount of 2 wt % relative to the total amount of (co)monomer in the photocurable composition.

In some examples, the donor co-initiator comprises a borate salt of Formula II:

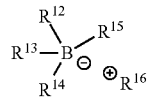

wherein

R$^{12}$, R$^{13}$, R$^{14}$, and R$^{15}$ are each independently H, OH, halogen, alkyl, alkenyl, alkynyl, cycloalkyl, aryl, alkylaryl, or heteroaryl, any of which is optionally substituted with halide, hydroxy, thiol, carbonyl, alkoxy, alkylhydroxy, carboxyl, amino, amido, alkyl, alkenyl, alkynyl, cycloalkyl, aryl, —NR$^x$R$^y$, —C(O)NR$^x$R$^y$, or a combination thereof;

R$^{16}$ is an ammonium cation, a phosphonium cation, a sulphonium cation, or a heteroaryl cation, any of which is optionally substituted with halide, hydroxy, thiol, carbonyl, alkoxy, alkylhydroxy, carboxyl, amino, amido, alkyl, alkenyl, alkynyl, cycloalkyl, aryl, —NR$^x$R$^y$, —C(O)NR$^x$R$^y$, or a combination thereof; and R$^x$ and R$^y$ are independently H, OH, alkyl, alkenyl, alkynyl, cycloalkyl, aryl, alkylaryl, or heteroaryl.

In some examples, the donor co-initiator comprises a borate salt of Formula II and R$^{12}$, R$^{13}$, R$^{14}$, and R$^{15}$ are each independently alkyl, alkenyl, alkynyl, cycloalkyl, aryl, or alkylaryl, any of which is optionally substituted. In some examples, the donor co-initiator comprises a borate salt of Formula II and R$^{12}$, R$^{13}$, R$^{14}$, and R$^{15}$ are each independently alkyl, cycloalkyl, aryl, or alkylaryl, any of which is optionally substituted. In some examples, the donor co-initiator comprises a borate salt of Formula II and R$^{12}$, R$^{13}$, R$^{14}$, and R$^{15}$ are each independently unsubstituted alkyl, unsubstituted cycloalkyl, unsubstituted aryl, or unsubstituted alkylaryl. In some examples, the donor co-initiator comprises a borate salt of Formula II and R$^{12}$, R$^{13}$, R$^{14}$, and R$^{15}$ are each independently unsubstituted alkyl, or unsubstituted aryl.

In some examples, the donor co-initiator comprises a borate salt of Formula II and R$^{16}$ is a quaternary ammonium cation having a formula of NR$^a$R$^b$R$^c$R$^d$ wherein R$^a$, R$^b$, R$^c$, and R$^d$ are each independently alkyl, alkenyl, alkynyl, cycloalkyl, aryl, or alkylaryl, any of which is optionally substituted with halide, hydroxy, thiol, carbonyl, alkoxy, alkylhydroxy, carboxyl, amino, amido, alkyl, alkenyl, alkynyl, cycloalkyl, aryl, —NR$^x$R$^y$, —C(O)NR$^x$R$^y$, or a combination thereof; and R$^x$ and R$^y$ are independently H, OH, alkyl, alkenyl, alkynyl, cycloalkyl, aryl, alkylaryl, or heteroaryl. In some examples, the donor co-initiator comprises a borate salt of Formula II and R$^{16}$ is a quaternary ammonium cation having a formula of NR$^a$R$^b$R$^c$R$^d$ wherein R$^a$, R$^b$, R$^c$, and R$^d$ are each independently alkyl, alkenyl, alkynyl, cycloalkyl, aryl, or alkylaryl, any of which is optionally substituted. In some examples, the donor co-initiator comprises a borate salt of Formula II and R$^{16}$ is a quaternary ammonium cation having a formula of NR$^a$R$^b$R$^c$R$^d$ wherein R$^a$, R$^b$, R$^c$, and R$^d$ are each independently alkyl, cycloalkyl, aryl, or alkylaryl, any of which is optionally substituted.

In some examples, the donor co-initiator comprises 2-(butyryloxy)-N,N,N-trimethylethan-1-aminium butyltriphenylborate.

The donor co-initiator can, for example, be present in an amount of 0.001 wt % or more relative to the total amount of (co)monomer in the photocurable composition (e.g., 0.005 wt % or more, 0.01 wt % or more, 0.05 wt % or more, 0.1 wt % or more, 0.2 wt % or more, 0.3 wt % or more, 0.4 wt % or more, 0.5 wt % or more, 0.6 wt % or more, 0.7 wt % or more, 0.8 wt % or more, 0.9 wt % or more, 1 wt % or more, 1.25 wt % or more, 1.5 wt % or more, 1.75 wt % or more, 2 wt % or more, 2.25 wt % or more, 2.5 wt % or more, 2.75 wt % or more, 3 wt % or more, 3.25 wt % or more, 3.5 wt % or more, 3.75 wt % or more, 4 wt % or more, 4.25 wt % or more, or 4.5 wt % or more). In some examples, the donor co-initiator can be present in an amount of 5 wt % or less relative to the total amount of (co)monomer in the photocurable composition (e.g., 4.75 wt % or less, 4.5 wt % or less, 4.25 wt % or less, 4 wt % or less, 3.75 wt % or less, 3.5 wt % or less, 3.25 wt % or less, 3 wt % or less, 2.75 wt % or less, 2.5 wt % or less, 2.25 wt % or less, 2 wt % or less, 1.75 wt % or less, 1.5 wt % or less, 1.25 wt % or less, 1 wt % or less, 0.9 wt % or less, 0.8 wt % or less, 0.7 wt % or less, 0.6 wt % or less, 0.5 wt % or less, 0.4 wt % or less, 0.3 wt % or less, 0.2 wt % or less, 0.1 wt % or less, 0.05 wt % or less, or 0.01 wt % or less). The amount of donor co-initiator present in the photocurable composition can range from any of the minimum values described above to any of the maximum values described above. For examples, the donor co-initiator can be present in an amount of from 0.001 to 5 wt % relative to the total amount of (co)monomer in the photocurable composition (e.g., from 0.001 wt % to 2.5 wt %, from 2.5 wt % to 5 wt %, from 0.001 wt % to 0.1 wt %, from 0.1 wt % to 1 wt %, from 1 wt % to 5 wt %, from 0.001 wt % to 4 wt %, from 0.01 wt % to 5 wt %, from 0.01 wt % to 4 wt %, 0.05 wt % to 1 wt %, or from 0.1 wt % to 0.3 wt %). In some examples, the donor co-initiator is present in an amount of 0.2 wt % relative to the total amount of (co)monomer in the photocurable composition.

The (co)monomer can comprise any suitable monomer, comonomer, or combination thereof. In some examples, the (co)monomer comprises an ethylenically unsaturated monomer. In some examples, the (co)monomer comprises at least one acrylate end group. In some examples, the (co)monomer comprises a (meth)acryl group, (meth)acrylamide, an allyl group, a vinyl group, a styrenyl group, or a combination thereof. In some examples, the (co)monomer comprises a (meth)acrylate monomer, a (meth)acrylamide monomer, a vinyl acetate monomer, a styrenic monomer, or a combination thereof. In some examples, the (co)monomer comprises a (meth)acrylate monomer, a (meth)acrylamide monomer, or a combination thereof. In some examples, the (co)monomer comprises an acrylate monomer. In some examples, the (co)monomer comprises a urethane-(meth)acrylate monomer. In some examples, the (co)monomer comprises N,N-Dimethylacrylamide (DMA); trimethylolpropane triacrylate (TMPTA); 2-hydroxyethyl acrylate (HEA); 2-hydroxyethyl methacrylate (HEMA); isobornyl acrylate (iBoA); tri(propylene glycol) diacrylate (TPGDA); oligourethane di(meth)acrylate; or a combination thereof. In some examples, the (co)monomer comprises isobornyl acrylate; N,N-dimethylacrylamide; 2-hydroxy ethylacrylate; or a combination thereof.

In some examples, the photosensitizer can comprise a xanthene of Formula III:

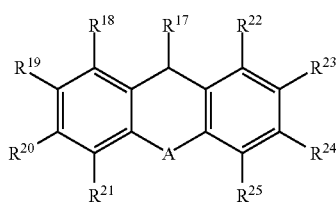

wherein

A is O, S, Se, Te, $NR^x$, $CR^xR^y$, $SiR^xR^y$, or $GeR^xR^y$;

$R^{17}$, $R^{18}$, $R^{19}$, $R^{20}$, $R^{21}$, $R^{22}$, $R^{23}$, $R^{24}$, and $R^{25}$ are each independently H, OH, halogen, alkyl, alkenyl, alkynyl, cycloalkyl, aryl, alkylaryl, or heteroaryl, any of which is optionally substituted with halide, hydroxy, thiol, carbonyl, alkoxy, alkylhydroxy, carboxyl, amino, amido, alkyl, alkenyl, alkynyl, cycloalkyl, aryl, —$NR^xR^y$, —$C(O)NR^xR^y$, or a combination thereof, or wherein, as valence permits, two or more of $R^{17}$-$R^{25}$, together with the atoms to which they are attached, form a 3-10 membered cyclic moiety, wherein any of the additional atoms are optionally heteroatoms and the 3-10 membered cyclic moiety is optionally substituted with halide, hydroxy, thioether, carbonyl, alkoxy, alkylhydroxy, carboxyl, amino, amido, alkyl, alkenyl, alkynyl, aryl, —$NR^xR^y$, —$C(O)NR^xR^y$, or a combination thereof; and $R^x$ and $R^y$ are independently H, OH, alkyl, alkenyl, alkynyl, cycloalkyl, aryl, alkylaryl, or heteroaryl.

In some examples of Formula III, A is O.

In some examples, the photosensitizer comprises 4,5,6,7-tetrachloro-2',4',5',7'-tetraiodofluorescein; 6-butoxy-2,4-diiodo-3H-xanthen-3-one; or a combination thereof.

In some examples, the photosensitizer comprises a boron-dipyrromethene (BODIPY) of Formula IV:

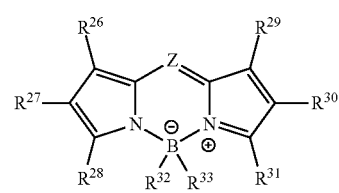

wherein

Z is N, $SiR^x$, or $CR^x$;

$R^{26}$, $R^{27}$, $R^{28}$, $R^{29}$, $R^{30}$, $R^{31}$, $R^{32}$, and $R^{33}$ are each independently H, OH, halogen, alkyl, alkenyl, alkynyl, cycloalkyl, aryl, alkylaryl, or heteroaryl, any of which is optionally substituted with halide, hydroxy, thiol, carbonyl, alkoxy, alkylhydroxy, carboxyl, amino, amido, alkyl, alkenyl, alkynyl, cycloalkyl, aryl, —$NR^xR^y$, —$C(O)NR^xR^y$, or a combination thereof, or wherein, as valence permits, two or more of $R^{26}$-$R^{33}$, together with the atoms to which they are attached, form a 3-10 membered cyclic moiety, wherein any of the additional atoms are optionally heteroatoms and the 3-10 membered cyclic moiety is optionally substituted with halide, hydroxy, thioether, carbonyl, alkoxy, alkylhydroxy, carboxyl, amino, amido, alkyl, alkenyl, alkynyl, aryl, —$NR^xR^y$, —$C(O)NR^xR^y$, or a combination thereof; and $R^x$ and $R^y$ are independently H, OH, alkyl, alkenyl, alkynyl, cycloalkyl, aryl, alkylaryl, or heteroaryl.

In some examples, the photosensitizer comprises a boron-dipyrromethene of Formula IVa:

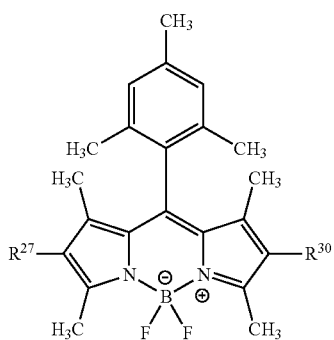

IVa wherein $R^{27}$ and $R^{30}$ are each independently H, Cl, Br, or I.

In some examples of Formula IVa, $R^{27}$ and $R^{30}$ are the same.

In some examples, the photosensitizer can be selected from the group consisting of:

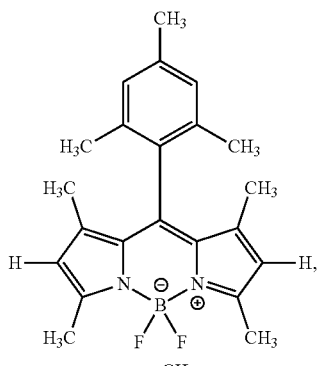

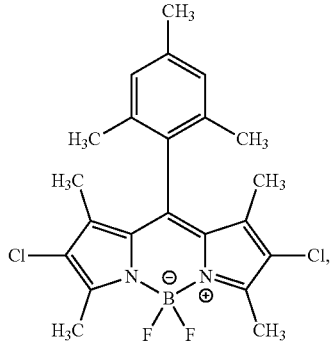

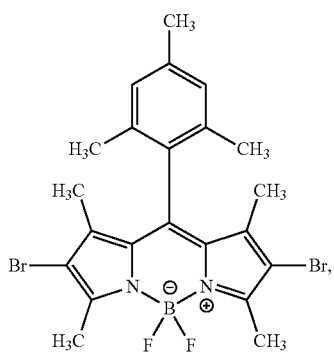

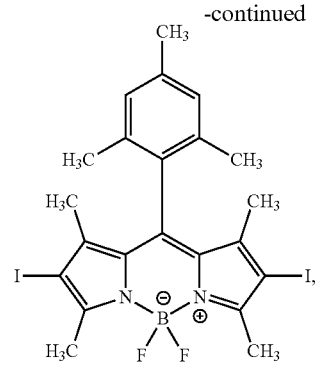

and combinations thereof.

In some examples, the photosensitizer comprises a boron-dipyrromethene of Formula IVb:

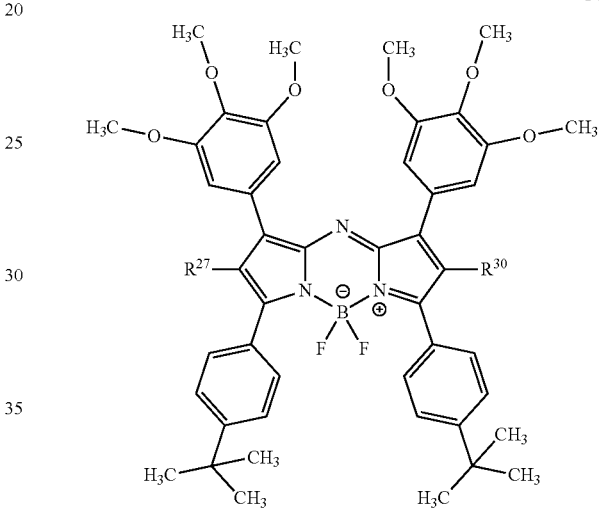

IVb wherein $R^{27}$ and $R^{30}$ are each independently H, Cl, Br, or I.

In some examples of Formula IVb, $R^{27}$ and $R^{30}$ are the same.

In some examples, the photosensitizer is selected from the group consisting of:

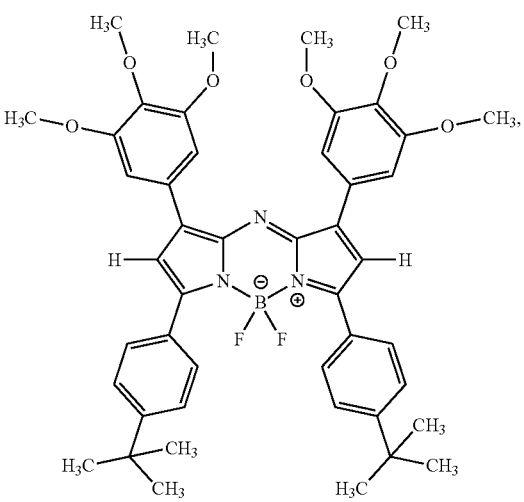

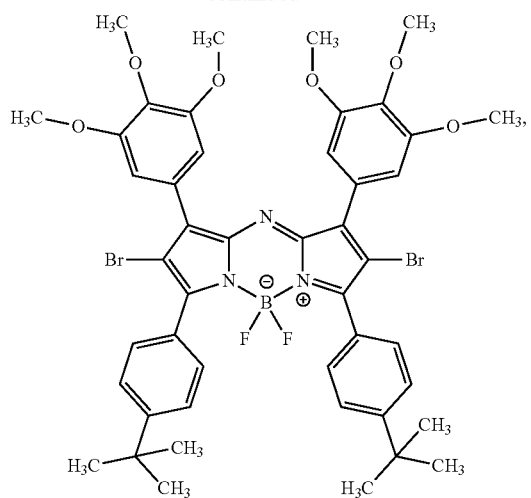
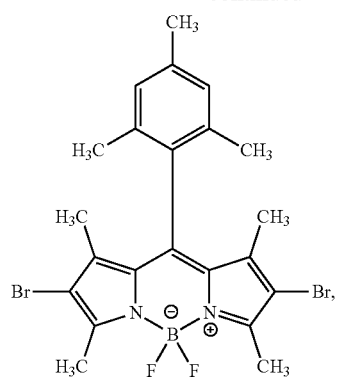
and combinations thereof.
In some examples, the photosensitizer is selected from the group consisting of:
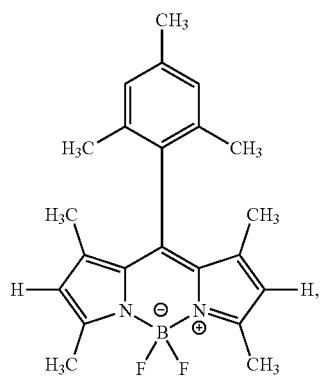
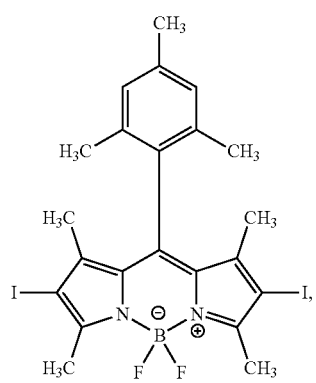
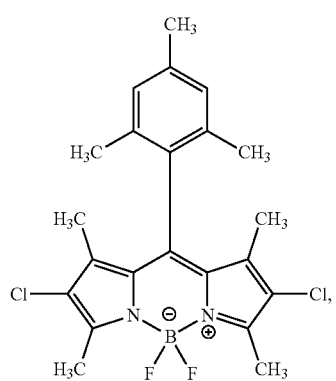
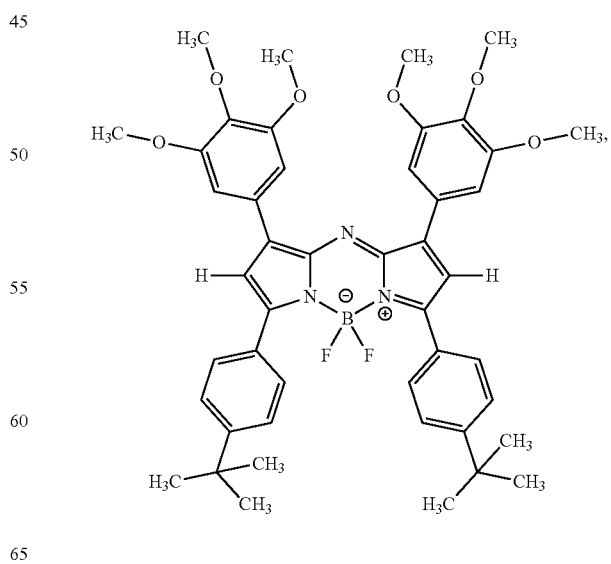

-continued

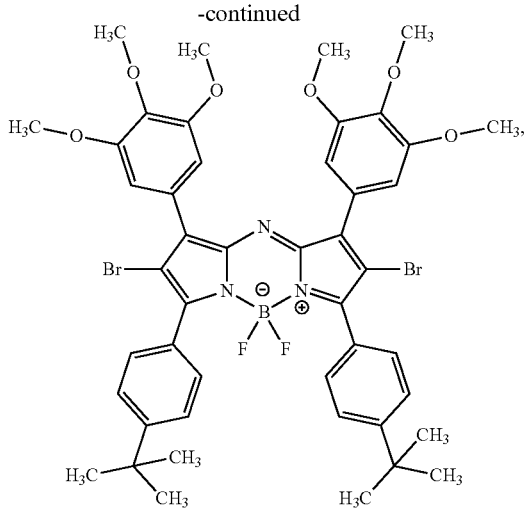

and combinations thereof.

In some examples, the photosensitizer comprises a porphyrin of Formula V:

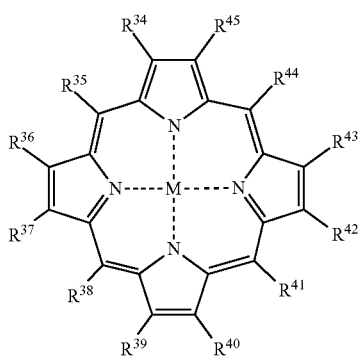

wherein

M is null, Zn, Mn, Fe, Co, Ti, Cr, Ni, or Cu;

$R^{34}$, $R^{35}$, $R^{36}$, $R^{37}$, $R^{38}$, $R^{39}$, $R^{40}$, $R^{41}$, $R^{42}$, $R^{43}$, $R^{44}$, and $R^{45}$ are each independently H, OH, halogen, alkyl, alkenyl, alkynyl, cycloalkyl, aryl, alkylaryl, or heteroaryl, any of which is optionally substituted with halide, hydroxy, thiol, carbonyl, alkoxy, alkylhydroxy, carboxyl, amino, amido, alkyl, alkenyl, alkynyl, cycloalkyl, aryl, —$NR^xR^y$, —$C(O)NR^xR^y$, or a combination thereof, or wherein, as valence permits, two or more of $R^{34}$-$R^{45}$, together with the atoms to which they are attached, form a 3-10 membered cyclic moiety, wherein any of the additional atoms are optionally heteroatoms and the 3-10 membered cyclic moiety is optionally substituted with halide, hydroxy, thioether, carbonyl, alkoxy, alkylhydroxy, carboxyl, amino, amido, alkyl, alkenyl, alkynyl, aryl, —$NR^xR^y$, —$C(O)NR^xR^y$, or a combination thereof; and $R^x$ and $R^y$ are independently H, OH, alkyl, alkenyl, alkynyl, cycloalkyl, aryl, alkylaryl, or heteroaryl.

In some examples, the photosensitizer comprises zinc tetraphenylporphyrin (ZnTPP).

In some examples, the photosensitizer comprises a squaraine of Formula VI:

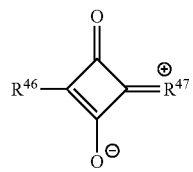

wherein $R^{46}$ and $R^{47}$ are each independently H, OH, halogen, alkyl, alkenyl, alkynyl, cycloalkyl, aryl, alkylaryl, or heteroaryl, any of which is optionally substituted with halide, hydroxy, thiol, carbonyl, alkoxy, alkylhydroxy, carboxyl, amino, amido, alkyl, alkenyl, alkynyl, cycloalkyl, aryl, —$NR^xR^y$, —$C(O)NR^xR^y$, or a combination thereof; and $R^x$ and $R^y$ are independently H, OH, alkyl, alkenyl, alkynyl, cycloalkyl, aryl, alkylaryl, or heteroaryl.

In some examples, the photosensitizer comprises a cyanine of Formula VII:

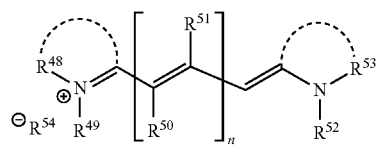

wherein n is from 0 to 10 (e.g., 0, 1, 2, 3, 4, 5, 6, 7, 8, 9, or 10);

$R^{48}$, $R^{49}$, $R^{50}$, $R^{51}$, $R^{52}$, $R^{53}$ each independently H, OH, halogen, alkyl, alkenyl, alkynyl, cycloalkyl, aryl, alkylaryl, or heteroaryl, any of which is optionally substituted with halide, hydroxy, thiol, carbonyl, alkoxy, alkylhydroxy, carboxyl, amino, amido, alkyl, alkenyl, alkynyl, cycloalkyl, aryl, —$NR^xR^y$, —$C(O)NR^xR^y$, or a combination thereof;

the dotted line to $R^{48}$ indicates that, as valence permits, $R^{48}$, together with the atoms to which it is attached, can optionally form a 3-10 membered cyclic moiety with the backbone of the cyanine, wherein any of the additional atoms are optionally heteroatoms and the 3-10 membered cyclic moiety is optionally substituted with halide, hydroxy, thioether, carbonyl, alkoxy, alkylhydroxy, carboxyl, amino, amido, alkyl, alkenyl, alkynyl, aryl, —$NR^xR^y$, —$C(O)NR^xR^y$, or a combination thereof;

the dotted line to $R^{53}$ indicates that, as valence permits, $R^{53}$, together with the atoms to which it is attached, can optionally form a 3-10 membered cyclic moiety with the backbone of the cyanine, wherein any of the additional atoms are optionally heteroatoms and the 3-10 membered cyclic moiety is optionally substituted with halide, hydroxy, thioether, carbonyl, alkoxy, alkylhydroxy, carboxyl, amino, amido, alkyl, alkenyl, alkynyl, aryl, —$NR^xR^y$, —$C(O)NR^xR^y$, or a combination thereof;

$R^x$ and $R^y$ are independently H, OH, alkyl, alkenyl, alkynyl, cycloalkyl, aryl, alkylaryl, or heteroaryl; and $R^{54}$ a hydroxyl anion, halide anion, nitrate anion, carboxylate anion, sulfonate anion (e.g., triflate), phosphate anion, borate anion (e.g., tetra(alkyl)borate, tetra(aryl)borate, and/or tetra(alkyl/aryl)borate), tetrafluoride anion (e.g., tetrafluoroborate), or hexafluoride anion (e.g., hexafluoroantimonate, hexafluorophosphate), any of which is optionally substituted.

In some examples, the photosensitizer comprises a xanthene, a squaraine, a boron-dipyrromethene, a porphyrin, or a combination thereof. In some examples, the photosensitizer comprises a xanthene, a boron-dipyrromethene, a porphyrin, or a combination thereof. In some examples, the photosensitizer does not include a cyanine.

The photosensitizer can, for example, be present in an amount of 0.00001 wt % or more relative to the total amount of (co)monomer in the photocurable composition (e.g., 0.00005 wt % or more, 0.0001 wt % or more, 0.0005 wt % or more, 0.001 wt % or more, 0.005 wt % or more, 0.01 wt % or more, 0.05 wt % or more, 0.1 wt % or more, 0.2 wt % or more, 0.3 wt % or more, 0.4 wt % or more, 0.5 wt % or more, 0.6 wt % or more, 0.7 wt % or more, 0.8 wt % or more, 0.9 wt % or more, 1 wt % or more, 1.25 wt % or more, 1.5 wt % or more, 1.75 wt % or more, 2 wt % or more, 2.25 wt % or more, 2.5 wt % or more, 2.75 wt % or more, 3 wt % or more, 3.25 wt % or more, 3.5 wt % or more, 3.75 wt % or more, 4 wt % or more, 4.25 wt % or more, or 4.5 wt % or more). In some examples, the photosensitizer can be present in an amount of 5 wt % or less relative to the total amount of (co)monomer in the photocurable composition (e.g., 4.75 wt % or less, 4.5 wt % or less, 4.25 wt % or less, 4 wt % or less, 3.75 wt % or less, 3.5 wt % or less, 3.25 wt % or less, 3 wt % or less, 2.75 wt % or less, 2.5 wt % or less, 2.25 wt % or less, 2 wt % or less, 1.75 wt % or less, 1.5 wt % or less, 1.25 wt % or less, 1 wt % or less, 0.9 wt % or less, 0.8 wt % or less, 0.7 wt % or less, 0.6 wt % or less, 0.5 wt % or less, 0.4 wt % or less, 0.3 wt % or less, 0.2 wt % or less, 0.1 wt % or less, 0.05 wt % or less, 0.01 wt % or less, 0.005 wt % or less, 0.001 wt % or less, 0.0005 wt % or less, or 0.0001 wt % or less). The amount of photosensitizer present in the photocurable composition can range from any of the minimum values described above to any of the maximum values described above. For examples, the photosensitizer can be present in an amount of from 0.00001 to 5 wt % relative to the total amount of (co)monomer in the photocurable composition (e.g., from 0.00001 wt % to 2.5 wt %, from 2.5 wt % to 5 wt %, from 0.00001 wt % to 0.001 wt %, from 0.001 wt % to 0.1 wt %, from 0.1 wt % to 1 wt %, from 1 wt % to 5 wt %, from 0.00001 wt % to 4 wt %, from 0.001 wt % to 5 wt %, from 0.001 wt % to 4 wt %, from 0.01 wt % to 1 wt %, from 0.05 wt % to 0.5 wt %, or from 0.1 wt % to 0.3 wt %). In some examples, the photosensitizer is present in an amount of from 0.1 wt % to 0.3 wt % relative to the total amount of (co)monomer in the photocurable composition.

In some examples, the photocurable composition further comprises a crosslinker. The crosslinker can comprise any suitable crosslinker. Crosslinkers include, for example, vinylic crosslinkers, difunctional isocyanate crosslinkers, difunctional epoxide crosslinkers, difunctional alkyl halides (e.g., difunctional acid halides), difunctional-anhydrides, bis-halo-alkyl derivatives, activated esters, or any number of difunctional reagents capable for forming chemical bonds.

In some examples, the crosslinker comprises a vinylic crosslinker, a multifunctional thiol crosslinker, an alkynyl crosslinker, or a combination thereof.

In some examples, the crosslinker comprises a di(meth)acrylate crosslinker, a tri(meth)acrylate crosslinker, a bis(meth)acrylamide crosslinker, a trithiol crosslinker, a tetrathiol crosslinker, or a combination thereof. In some examples, the crosslinker comprises a di(meth)acrylate crosslinker, a tri(meth)acrylate crosslinker, or a combination thereof. In some examples, the crosslinker comprises a diacrylate crosslinker, a triacrylate crosslinker, or a combination thereof. In some examples, the crosslinker comprises trimethylolpropane triacrylate, tetraethylene glycol diacrylate, or a combination thereof.

The crosslinker can, for example, be present in any suitable amount (e.g., from 0 to 100 wt. % relative to the total amount of (co)monomer in the photocurable composition). In some examples, the crosslinker is present in an amount of 0.1 wt % relative to the total amount of (co)monomer in the photocurable composition.

The (co)monomer and the crosslinker can be present in any suitable ratio (e.g., from 1:100 to 100:1, w/w). In some examples, the (co)monomer and the crosslinker are present in a ratio of 4:1 (w/w). In some examples, the photocurable compositions can further comprise an opacifier. The opacifier can, for example comprise a dyes and/or a pigments. In some examples, the opacifier can absorb light in the same region as the photosensitizer, followed by rapid excited state relaxation prior to electron/energy transfer. The opacifier can, for example, thereby reduce the penetration depth of light and mitigate cure through (i.e., curing unwanted regions within previous layers of a print).

In some example, the opacifier comprises an azo-dye. In some examples, the opacifier comprises Sudan I, Sudan IV, Sudan black B, or a combination thereof.

The opacifier can, for example, be present in an amount of 0.00001 wt % or more relative to the total amount of (co)monomer in the photocurable composition (e.g., 0.00005 wt % or more, 0.0001 wt % or more, 0.0005 wt % or more, 0.001 wt % or more, 0.005 wt % or more, 0.01 wt % or more, 0.05 wt % or more, 0.1 wt % or more, 0.2 wt % or more, 0.3 wt % or more, 0.4 wt % or more, 0.5 wt % or more, 0.6 wt % or more, 0.7 wt % or more, 0.8 wt % or more, 0.9 wt % or more, 1 wt % or more, 1.25 wt % or more, 1.5 wt % or more, 1.75 wt % or more, 2 wt % or more, 2.25 wt % or more, 2.5 wt % or more, 2.75 wt % or more, 3 wt % or more, 3.25 wt % or more, 3.5 wt % or more, 3.75 wt % or more, 4 wt % or more, 4.25 wt % or more, 4.5 wt % or more, 5 wt % or more, 5.5 wt % or more, 6 wt % or more, 6.5 wt % or more, 7 wt % or more, 7.5 wt % or more, 8 wt % or more, 8.5 wt % or more, or 9 wt % or more). In some examples, the opacifier can be present in an amount of 10 wt % or less relative to the total amount of (co)monomer in the photocurable composition (e.g., 9.5 wt % or less, 9 wt % or less, 8.5 wt % or less, 8 wt % or less, 7.5 wt % or less, 7 wt % or less, 6.5 wt % or less, 6 wt % or less, 5.5 wt % or less, 5 wt % or less, 4.5 wt % or less, 4.25 wt % or less, 4 wt % or less, 3.75 wt % or less, 3.5 wt % or less, 3.25 wt % or less, 3 wt % or less, 2.75 wt % or less, 2.5 wt % or less, 2.25 wt % or less, 2 wt % or less, 1.75 wt % or less, 1.5 wt % or less, 1.25 wt % or less, 1 wt % or less, 0.9 wt % or less, 0.8 wt % or less, 0.7 wt % or less, 0.6 wt % or less, 0.5 wt % or less, 0.4 wt % or less, 0.3 wt % or less, 0.2 wt % or less, 0.1 wt % or less, 0.05 wt % or less, 0.01 wt % or less, 0.005 wt % or less, 0.001 wt % or less, 0.0005 wt % or less, or 0.0001 wt % or less). The amount of opacifier present in the photocurable composition can range from any of the minimum values described above to any of the maximum values described above. For examples, the opacifier can be present in an amount of from 0.00001 to 10 wt % relative to the total amount of (co)monomer in the photocurable composition (e.g., from 0.00001 wt % to 0.001 wt %, from 0.001 wt % to 0.1 wt %, from 0.1 wt % to 1 wt %, from 1 wt % to 10 wt %, from 0.00001 wt % to 8 wt %, from 0.00001 wt % to 5 wt %, from 0.0001 wt % to 1 wt %, from 0.001 wt % to 1 wt %, or from 0.01 wt % to 0.5 wt %). In some examples, the opacifier is present in an amount of 0.05 wt % or less relative to the total amount of (co)monomer in the photocurable composition.

In some examples, the photocurable compositions can further comprise a solvent. Examples of solvents include, but are not limited to, tetrahydrofuran (THF), dimethylformamide (DMF), N-methylformamide, formamide, acetonitrile, dimethylacetamide, propylene carbonate, ethylene carbonate, n-methylpyrrolidone, dimethylsulfoxide, and combinations thereof.

In some examples, the photocurable compositions can further comprise an oxygen scavenger. Examples of oxygen scavengers are described, for example, in Husár et al. Progress in Organic Coatings, 2014, 77, 1789-1798. Examples of oxygen scavengers include, but are not limited to, hydrogen donors (e.g., thiols, amines, hydrogen phosphites, silanes, stannanes, benzaldehydes); n-vinyl amides; reducing agents (e.g., phosphines, phosphites, sulphites, borane-amine complexes); singlet oxygen scavengers (e.g., diphenyl furans, anthracene derivatives); and combinations thereof.

In some examples, the oxygen scavenger can comprise a hydrogen donor (e.g., thiols, amines, hydrogen phosphites, silanes, stannanes, benzaldehydes). Examples of hydrogen donors include, but are not limited to, methyl diethanolamine (MDEA); 1,4-diazabicyclo[2.2.2]octane (DABCO); tribenzylamine; trimethylolpropane tris(3-mercaptopropionate) (TMPMP); pentaerythritol tetrakis(3-mercaptopropionate) (PETMP); dioleyl hydrogen phosphite; tris(trimethylsilyl)silane; tributyltin hydride; 4-anisaldehyde; and combinations thereof.

In some examples, the oxygen scavenger can comprise an n-vinyl amide. Examples of n-vinyl amides include, but are not limited to, n-vinylpyrrolidone; n-methyl-2-pyrrolidone; and combinations thereof.

In some examples, the oxygen scavenger can comprise a reducing agent (e.g., phosphines, phosphites, sulphites, borane-amine complexes). Examples of reducing agents include, but are not limited to, triphenyl phosphone ($PPh_3$); trioctyl phosphine; triphenyl phosphite; tetraphenyldipropyleneglycoldiphosphite; poly(dipropyleneglycol)phenylphosphite; alkyl ($C_{12}$-$C_{15}$) bisphenol A phosphite; tris(tridecyl)phosphite; 3,9-bis(octadecyloxy)-2,4,8,10-tetraoxa-3,9-diphosphaspiro[5.5]undecane; ethylene sulphite; dimethylamine-borane complexes; and combinations thereof.

In some examples, the oxygen scavenger can comprise a singlet oxygen scavenger (e.g., diphenyl furans, anthracene derivatives). Examples of singlet oxygen scavengers include, but are not limited to, 2,5-diphenyl furan; 9,10-dibutyl anthracene; and combinations thereof.

In some examples, the oxygen scavenger can comprise a thiol, an amine, a hydrogen phosphite, a silane, a stannane, a benzaldehyde, an N-vinyl amide, a phosphine, a phosphite, a sulphite, a borane-amine complex, a diphenyl furan, an anthracene, or a combination thereof.

In some examples, the oxygen scavenger can comprise a thiol, such as a multifunctional thiol (e.g., a dithiol, a trithiol, a tetrathiol, etc.). In some examples, the oxygen scavenger can comprise a tetrathiol.

In some examples, the oxygen scavenger can comprise methyl diethanolamine (MDEA); 1,4-diazabicyclo[2.2.2]octane (DABCO); tribenzylamine; trimethylolpropane tris(3-mercaptopropionate) (TMPMP); pentaerythritol tetrakis(3-mercaptopropionate) (PETMP); dioleyl hydrogen phosphite; tris(trimethylsilyl)silane; tributyltin hydride; 4-anisaldehyde; n-vinylpyrrolidone; n-methyl-2-pyrrolidone; triphenyl phosphone ($PPh_3$); trioctyl phosphine; triphenyl phosphite; tetraphenyldipropyleneglycoldiphosphite; poly(dipropyleneglycol)phenylphosphite; alkyl ($C_{12}$-$C_{15}$) bisphenol A phosphite; tris(tridecyl)phosphite; 3,9-bis(octadecyloxy)-2,4,8,10-tetraoxa-3,9-diphosphaspiro[5.5]undecane; ethylene sulphite; dimethylamine-borane complexes; 2,5-diphenyl furan; 9,10-dibutyl anthracene; pentaerythritol tetrakis(3-mercaptopropionate) (PETMP); benzene-1,4-dithiol; trithiocyanuric acid; 1,3,4-thiadiazole-2,5-dithiol; 4,4'-thiobisbenzenethiol; triphenylphosphine ($PPh_3$); 1,3-diphenylisobenzofuran (DPBF); (2,2,6,6-1,4-dithiothreitol (DTT); ascorbic acid (AA); or a combination thereof. In some examples, the oxygen scavenger can comprise pentaerythritol tetrakis(3-mercaptopropionate) (PETMP); benzene-1,4-dithiol; trithiocyanuric acid; 1,3,4-thiadiazole-2,5-dithiol; 4,4'-thiobisbenzenethiol; triphenylphosphine ($PPh_3$); 1,3-diphenylisobenzofuran (DPBF); (2,2,6,6-1,4-dithiothreitol (DTT); ascorbic acid (AA); or a combination thereof. In some examples, the oxygen scavenger can comprise pentaerythritol tetrakis(3-mercaptopropionate) (PETMP); benzene-1,4-dithiol; trithiocyanuric acid; 1,3,4-thiadiazole-2,5-dithiol; 4,4'-thiobisbenzenethiol; or a combination thereof. In some examples, the oxygen scavenger can comprise pentaerythritol tetrakis(3-mercaptopropionate) (PETMP).

The oxygen scavenger can, for example, be present in an amount of 0.001 wt % or more relative to the total amount of (co)monomer in the photocurable composition (e.g., 0.005 wt % or more, 0.01 wt % or more, 0.05 wt % or more, 0.1 wt % or more, 0.2 wt % or more, 0.3 wt % or more, 0.4 wt % or more, 0.5 wt % or more, 0.6 wt % or more, 0.7 wt % or more, 0.8 wt % or more, 0.9 wt % or more, 1 wt % or more, 1.25 wt % or more, 1.5 wt % or more, 1.75 wt % or more, 2 wt % or more, 2.25 wt % or more, 2.5 wt % or more, 2.75 wt % or more, 3 wt % or more, 3.25 wt % or more, 3.5 wt % or more, 3.75 wt % or more, 4 wt % or more, 4.25 wt % or more, 4.5 wt % or more, 5 wt % or more, 5.5 wt % or more, 6 wt % or more, 6.5 wt % or more, 7 wt % or more, 7.5 wt % or more, 8 wt % or more, 8.5 wt % or more, or 9 wt % or more). In some examples, the oxygen scavenger can be present in an amount of 10 wt % or less relative to the total amount of (co)monomer in the photocurable composition (e.g., 9.5 wt % or less, 9 wt % or less, 8.5 wt % or less, 8 wt % or less, 7.5 wt % or less, 7 wt % or less, 6.5 wt % or less, 6 wt % or less, 5.5 wt % or less, 5 wt % or less, 4.5 wt % or less, 4.25 wt % or less, 4 wt % or less, 3.75 wt % or less, 3.5 wt % or less, 3.25 wt % or less, 3 wt % or less, 2.75 wt % or less, 2.5 wt % or less, 2.25 wt % or less, 2 wt % or less, 1.75 wt % or less, 1.5 wt % or less, 1.25 wt % or less, 1 wt % or less, 0.9 wt % or less, 0.8 wt % or less, 0.7 wt % or less, 0.6 wt % or less, 0.5 wt % or less, 0.4 wt % or less, 0.3 wt % or less, 0.2 wt % or less, 0.1 wt % or less, 0.05 wt % or less, 0.01 wt % or less, or 0.005 wt % or less).

The amount of oxygen scavenger present in the photocurable composition can range from any of the minimum values described above to any of the maximum values described above. For example, the oxygen scavenger can be present in an amount of from 0.001 to 10 wt % relative to the total amount of (co)monomer in the photocurable composition (e.g., from 0.001 wt % to 0.1 wt %, from 0.1 wt % to 1 wt %, from 1 wt % to 10 wt %, from 0.001 to 8 wt %, from 0.001 to 5 wt %, from 0.001 to 3 wt %, from 0.001 to 2 wt %, or from 0.001 wt % to 1 wt %). In some examples, the opacifier is present in an amount of 1 wt % or less relative to the total amount of (co)monomer in the photocurable composition.

In some examples, the photocurable compositions can further comprise a radical scavenger. Examples of radical scavengers include, but are not limited to, tetramethylpiperidin-1-yl)oxyl (TEMPO), N-(2-methylpropyl)-N-(1-diethylphosphono-2,2-dimethylpropyl)-N-oxyl (SG1), 2,2-diphenyl-3-phenylimino-2,3-dihydroindole-N-oxyl (DPAIO), 2,2,5-tri-methyl-4-phenyl-3-azahexane-3-nitroxide (TIPNO), 2,2',5,5'-tetramethyl-4-oxoimidazolidine-N-oxyl (TEMIO), (2,2',5,5'-tetramethylpyrrolidine-N-oxyl (PROXYL), 1,1',3,3'-tetramethylisoindoline-N-oxyl) (TMIO), and combinations thereof.

The radical scavenger can, for example, be present in an amount of 0.00001 wt % or more relative to the total amount of (co)monomer in the photocurable composition (e.g., 0.00005 wt % or more, 0.0001 wt % or more, 0.0005 wt % or more, 0.001 wt % or more, 0.005 wt % or more, 0.01 wt % or more, 0.05 wt % or more, 0.1 wt % or more, 0.2 wt % or more, 0.3 wt % or more, 0.4 wt % or more, 0.5 wt % or more, 0.6 wt % or more, 0.7 wt % or more, 0.8 wt % or more, 0.9 wt % or more, 1 wt % or more, 1.25 wt % or more, 1.5 wt % or more, 1.75 wt % or more, 2 wt % or more, 2.25 wt % or more, 2.5 wt % or more, 2.75 wt % or more, 3 wt % or more, 3.25 wt % or more, 3.5 wt % or more, 3.75 wt % or more, 4 wt % or more, 4.25 wt % or more, or 4.5 wt % or more). In some examples, the radical scavenger can be present in an amount of 5 wt % or less relative to the total amount of (co)monomer in the photocurable composition (e.g., 4.75 wt % or less, 4.5 wt % or less, 4.25 wt % or less, 4 wt % or less, 3.75 wt % or less, 3.5 wt % or less, 3.25 wt % or less, 3 wt % or less, 2.75 wt % or less, 2.5 wt % or less, 2.25 wt % or less, 2 wt % or less, 1.75 wt % or less, 1.5 wt % or less, 1.25 wt % or less, 1 wt % or less, 0.9 wt % or less, 0.8 wt % or less, 0.7 wt % or less, 0.6 wt % or less, 0.5 wt % or less, 0.4 wt % or less, 0.3 wt % or less, 0.2 wt % or less, 0.1 wt % or less, 0.05 wt % or less, 0.01 wt % or less, 0.005 wt % or less, 0.001 wt % or less, 0.0005 wt % or less, or 0.0001 wt % or less). The amount of radical scavenger present in the photocurable composition can range from any of the minimum values described above to any of the maximum values described above. For example, the radical scavenger can be present in an amount of from 0.00001 to 5 wt % relative to the total amount of (co)monomer in the photocurable composition (e.g., from 0.00001 wt % to 0.001 wt %, from 0.001 wt % to 0.1 wt %, from 0.1 wt % to 1 wt %, from 1 wt % to 5 wt %, from 0.0001 wt % to 1 wt %, from 0.001 wt % to 1 wt %, from 0.001 to 0.5 wt %, or from 0.001 to 0.05 wt %). In some examples, the radical scavenger is present in an amount of 0.05 wt % or less relative to the total amount of (co)monomer in the photocurable composition.

METHODS OF USE

Also provided herein are methods of use of any of the photocurable compositions described herein. For example, also described herein are methods of forming a (co)polymer from any of the photocurable compositions described herein, the methods comprising: irradiating the photocurable composition with light, wherein the light irradiating the photocurable composition has an energy that at least partially overlaps with the absorption band of the photosensitizer, such that: the photosensitizer absorbs at least a portion of the light to become excited and thereby form an excited photosensitizer, and the excited photosensitizer either: accepts an electron from the donor co-initiator to generate a photosensitizer radical anion and a donor radical, the photosensitizer radical anion then donates an electron to the acceptor co-initiator to regenerate the photosensitizer and generate an acceptor radical; or donates an electron to the acceptor co-initiator to generate a photosensitizer radical cation and an acceptor radical, the photosensitizer radical cation then accepts an electron from the donor co-initiator to regenerate the photosensitizer and generate a donor radical; and thereby induces polymerization of the (co)monomer with the donor radical and the acceptor radical to form the (co)polymer.

The light can be provided by a light source, such as a light emitting diode. The light can, for example, comprise one or more wavelengths of 400 nm or more (e.g., 425 nm or more, 450 nm or more, 475 nm or more, 500 nm or more, 525 nm or more, 550 nm or more, 575 nm or more, 600 nm or more, 625 nm or more, 650 nm or more, 675 nm or more, 700 nm or more, 725 nm or more, 750 nm or more, 800 nm or more, 850 nm or more, 900 nm or more, 950 nm or more, 1000 nm or more, 1100 nm or more, 1200 nm or more, or 1300 nm or more). In some examples, the light can comprise one or more wavelengths of 1400 nm or less (e.g., 1300 nm or less, 1200 nm or less, 1100 nm or less, 1000 nm or less, 950 nm or less, 900 nm or less, 850 nm or less, 800 nm or less, 750 nm or less, 725 nm or less, 700 nm or less, 675 nm or less, 650 nm or less, 625 nm or less, 600 nm or less, 575 nm or less, 550 nm or less, 525 nm or less, 500 nm or less, 475 nm or less, or 450 nm or less). The one or more wavelengths of light can range from any of the minimum values described above to any of the maximum values described above. For example, the light can comprise one or more wavelengths from 400 nm to 1400 nm (e.g., from 400 nm to 900 nm, from 900 nm to 1400 nm, from 400 nm to 600 nm, from 600 nm to 800 nm, from 800 nm to 1000 nm, from 1000 nm to 1200 nm, from 1200 nm to 1400 nm, from 400 nm to 740 nm, 450 nm to 740 nm, or 500 nm to 1400 nm).

In some examples, the light can comprise visible light. In some examples, the light comprises red light, green light, or blue light. In some examples, the light comprises green light, red light, or NIR light.

The light can, for example, have an intensity of 0.01 mW/cm$^2$ or more (e.g., 0.05 mW/cm$^2$ or more, 0.1 mW/cm$^2$ or more, 0.5 mW/cm$^2$ or more, 1 mW/cm$^2$ or more, 1.5 mW/cm$^2$ or more, 2 mW/cm$^2$ or more, 2.5 mW/cm$^2$ or more, 3 mW/cm$^2$ or more, 3.5 mW/cm$^2$ or more, 4 mW/cm$^2$ or more, 4.5 mW/cm$^2$ or more, 5 mW/cm$^2$ or more, 6 mW/cm$^2$ or more, 7 mW/cm$^2$ or more, 8 mW/cm$^2$ or more, 9 mW/cm$^2$ or more, 10 mW/cm$^2$ or more, 15 mW/cm$^2$ or more, 20 mW/cm$^2$ or more, 25 mW/cm$^2$ or more, 30 mW/cm$^2$ or more, 35 mW/cm$^2$ or more, 40 mW/cm$^2$ or more, 45 mW/cm$^2$ or more, 50 mW/cm$^2$ or more, 60 mW/cm$^2$ or more, 70 mW/cm$^2$ or more, 80 mW/cm$^2$ or more, or 90 mW/cm$^2$ or more). In some examples, the light can have an intensity of 100 mW/cm$^2$ or less (e.g., 90 mW/cm$^2$ or less, 80 mW/cm$^2$ or less, 70 mW/cm$^2$ or less, 60 mW/cm$^2$ or less, 50 mW/cm$^2$ or less, 45 mW/cm$^2$ or less, 40 mW/cm$^2$ or less, 35 mW/cm$^2$ or less, 30 mW/cm$^2$ or less, 25 mW/cm$^2$ or less, 20 mW/cm$^2$ or less, 15 mW/cm$^2$ or less, 10 mW/cm$^2$ or less, 9 mW/cm$^2$ or less, 8 mW/cm$^2$ or less, 7 mW/cm$^2$ or less, 6 mW/cm$^2$ or less, 5 mW/cm$^2$ or less, 4.5 mW/cm$^2$ or less, 4 mW/cm$^2$ or less, 3.5 mW/cm$^2$ or less, 3 mW/cm$^2$ or less, 2.5 mW/cm$^2$ or less, 2 mW/cm$^2$ or less, 1.5 mW/cm$^2$ or less, 1 mW/cm$^2$ or less, 0.5 mW/cm$^2$ or less, 0.1 mW/cm$^2$ or less, or 0.05 mW/cm$^2$ or less). The intensity of the light can range from any of the minimum values described above to any of the maximum values described above. For example, the light can have an intensity of from 0.01 mW/cm$^2$ to 100 mW/cm$^2$ (e.g., from 0.01 mW/cm$^2$ to 50 mW/cm$^2$, from 0.01 mW/cm$^2$ to 20 mW/cm$^2$, from 0.01 mW/cm$^2$ to 10 mW/cm$^2$, from 0.01 mW/cm² to 5 mW/cm², from 0.01 mW/cm² to 1 mW/cm², from 0.01 mW/cm² to 0.5 mW/cm², or from 0.01 mW/cm² to 0.1 mW/cm²).

In some examples, the methods can further comprise depleting oxygen from the photocurable composition prior to irradiation. Depleting oxygen from the polymerizable composition can, for example, comprise bubble degassing the polymerizable composition with an inert gas, using a freeze-pump-thaw method, contacting the polymerizable composition with an oxygen scavenger, or a combination thereof.

In some examples, the (co)polymer is photocured in an amount of time of 1 minute or less (e.g., 55 seconds or less, 50 seconds or less, 45 seconds or less, 40 seconds or less, 35 seconds or less, 30 seconds or less, 25 seconds or less, 20 seconds or less, 15 seconds or less, 10 seconds or less, 9 seconds or less, 8 seconds or less, 7 seconds or less, 6 seconds or less, 5 seconds or less, 4 seconds or less, 3 seconds or less, 2 seconds or less, or 1 second or less). In some examples, the (co)polymer is photocured in an amount of time of 1 minute or less and the light has an intensity of 10 mW/cm² or less.

Also disclosed herein are methods of forming an object via additive manufacturing, the method comprising: irradiating a first quantity of any of the photocurable compositions described herein on a substrate to induce polymerization of the (co)monomer into a first layer on the substrate using any of the methods described herein; and forming at least one additional layer on the first layer by irradiating at least a second quantity of any of the photocurable compositions described herein to induce polymerization of the (co)monomer into the at least one additional layer on the first layer using any of the methods described herein; thereby forming the object. Also disclosed herein are methods of producing a three-dimensional structure using additive manufacturing, the methods comprising forming the three-dimensional structure on a layer-by-layer basis using any of the methods described herein. In some examples, the method comprises stereolithography, digital light processing, or a combination thereof.

In some examples, the method has a print rate of 30 seconds/layer or less (e.g., 25 seconds/layer or less, 20 seconds/layer or less, 15 seconds/layer or less, 10 seconds/layer or less, seconds/layer or less, or 1 seconds/layer or less). In some examples, the method has a print rate of 1 millisecond/layer or more (e.g., 50 milliseconds/layer or more, 1 second/layer or more, 5 seconds/layer or more, 10 seconds/layer or more, 15 seconds/layer or more, 20 seconds/layer or more, or 25 seconds/layer or more). The print rate can range from any of the minimum values described above to any of the maximum values described above. For example, the method can have a print rate of from 1 millisecond/layer to 30 seconds/layer (e.g., from 1 millisecond/layer to 25 seconds/layer, from 1 millisecond/layer to 20 seconds/layer, from 1 millisecond/layer to 15 seconds/layer, from 1 millisecond/layer to 10 seconds/layer, or from 1 millisecond/layer to 5 seconds/layer).

In some examples, the method has a build rate of 5 millimeters per hour (mm/hour) or more (e.g., 6 mm/hour or more, 7 mm/hour or more, 8 mm/hour or more, 9 mm/hour or more, 10 mm/hour or more, 15 mm/hour or more, 20 mm/hour or more, 25 mm/hour or more, 30 mm/hour or more, 35 mm/hour or more, 40 mm/hour or more, 45 mm/hour or more, 50 mm/hour or more, 60 mm/hour or more, 70 mm/hour or more, 80 mm/hour or more, 90 mm/hour or more, 100 mm/hour or more, 125 mm/hour or more, 150 mm/hour or more, 175 mm/hour or more, 200 mm/hour or more, 225 mm/hour or more, 250 mm/hour or more, 300 mm/hour or more, 350 mm/hour or more, 400 mm/hour or more, or 450 mm/hour or more). In some examples, the method has a build rate of 500 mm/hour or less (e.g., 450 mm/hour or less, 400 mm/hour or less, 350 mm/hour or less, 300 mm/hour or less, 250 mm/hour or less, 200 mm/hour or less, 225 mm/hour or less, 200 mm/hour or less, 175 mm/hour or less, 150 mm/hour or less, 100 mm/hour or less, 90 mm/hour or less, 80 mm/hour or less, 70 mm/hour or less, 60 mm/hour or less, 50 mm/hour or less, 45 mm/hour or less, 40 mm/hour or less, 35 mm/hour or less, 30 mm/hour or less, 25 mm/hour or less, 20 mm/hour or less, 15 mm/hour or less, or 10 mm/hour or less). The build rate can range from any of the minimum values described above to any of the maximum values described above. For example, the method can have a build rate of from 5 mm/hour to 500 mm/hour (e.g. from 5 mm/hour to 250 mm/hour, from 250 mm/hour to 500 mm/hour, from 5 mm/hour to 100 mm/hour, from 100 mm/hour to 500 mm/hour, from 5 mm/hour to 50 mm/hour, or from 50 mm/hour to 500 mm/hour). In some examples, the method can have a build rate of from 10 mm/hour to 500 mm/hour (e.g. from 10 mm/hour to 250 mm/hour, from 250 mm/hour to 500 mm/hour, from 10 mm/hour to 100 mm/hour, from 100 mm/hour to 500 mm/hour, from 10 mm/hour to 50 mm/hour, or from 50 mm/hour to 500 mm/hour).

Also disclosed herein are articles (e.g., articles of manufacture) comprising a cured product of any of the photocurable compositions described herein. Also disclosed herein are articles of manufacture comprising any of the (co)polymers, objects, or three-dimensional structures formed using any of the methods described herein. The article of manufacture of can, for example, comprise a dental (co)polymer, an adhesive, an automotive part, plastic flooring, a thin film coating, a disposable syringe, an intravenous bag, sterile packaging for a medical instrument, a joint replacement, a tissue scaffold, a contact lens, a fiber optic, a transdermal patch, a microneedle array, a hydrogel, a wavelength-selective multi-material structure, a structural plastic, an opaque composite, a microelectronic component, a soft robotic component, or a combination thereof Also described herein are methods of use of any of the (co)polymers, objects, or three-dimensional structures formed using any of the methods described herein, the methods comprising using the (co)polymer, object, or three-dimensional structure as a biocompatible material, a coating, an adhesive, a structural plastic, or a combination thereof.

Also disclosed herein are methods of use of any of the (co)polymers, objects, or three-dimensional structures formed using any of the methods described herein, the methods comprising using the (co)polymer, object, or three-dimensional structure in a medical or dental application, an automotive application, a robotic application, a microelectronic application, an imaging application, or a combination thereof.

The examples below are intended to further illustrate certain aspects of the methods and compounds described herein and are not intended to limit the scope of the claims.

EXAMPLES

The following examples are set forth below to illustrate the methods and results according to the disclosed subject matter. These examples are not intended to be inclusive of all aspects of the subject matter disclosed herein, but rather to illustrate representative methods, compositions, and results.

These examples are not intended to exclude equivalents and variations of the present invention, which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, temperatures, pressures, and other reaction ranges and conditions that can be used to optimize the product purity and yield obtained from the described process. Only reasonable and routine experimentation will be required to optimize such process conditions.

Example 1—Catalyst Halogenation Enables Rapid and Efficient Polymerizations with Visible to Near Infrared Light Abstract. Driving rapid polymerizations with visible to near-infrared (NIR) light can enable nascent technologies in the emerging fields of bio- and composite-printing. However, current photopolymerization strategies are limited by long reaction times, high light intensities, and/or large catalyst loadings. Improving efficiency remains elusive without a comprehensive mechanistic evaluation of photocatalysis to better understand how composition relates to polymerization metrics. With this objective in mind, a series of methine- and aza-bridged boron dipyrromethene (BODIPY) derivatives were synthesized and systematically characterized to elucidate structure-property relationships that facilitate efficient photopolymerization driven by visible to NIR light. For both BODIPY scaffolds, halogenation was shown as a general method to increase polymerization rate, quantitatively characterized using a custom real-time infrared spectroscopy setup. Furthermore, a combination of steady-state emission quenching experiments, electronic structure calculations, and ultrafast transient absorption revealed that efficient intersystem crossing to the lowest excited triplet state upon halogenation was a key mechanistic step to achieving rapid photopolymerization reactions. Unprecedented polymerization rates were achieved with low light intensities (<1 mW/cm$^2$) and catalyst loadings (<50 µM), exemplified by reaction completion within 10 seconds of irradiation using green, red, and NIR light-emitting diodes. Halogenated BODIPY photocatalysts were additionally employed to produce complex 3D structures using high-resolution visible light 3D printing, demonstrating the broad utility of these catalysts in additive manufacturing.

Introduction. Light has been used to rapidly convert liquid resins (i.e., photopolymers) into solid objects in a process known as photocuring. This process provides control over when and where a reaction occurs (i.e., spatiotemporal control) and has enabled transformative technological advancements in imaging, photolithography, adhesives, coatings, and, most recently, stereolithographic 3D printing (Aguado B A et al. *Sci. Transl. Med* 2018, 10, 8645; Camposeo A et al. *Adv. Opt. Mater.* 2019, 7 (1), 1800419; Wallin T J et al. *Nat. Rev. Mater.* 2018, 3 (6), 84-100; Zhang J et al. *Polym. Chem.* 2018, 9 (13), 1530-1540; Jung K et al. *Adv. Mater.* 2019, 1903850; Lim K S et al. *Chem. Rev.* 2020, 120(19), 10662-10694; Yu C et al. *Chem. Rev.* 2020, 120 (19), 10695-10743). In particular, enormous growth of the field came at the advent of photolithography, which today has been widely adopted to manufacture modern microelectronics, such as microprocessors and memory chips, ubiquitous in computers, phones, and cars (Willson C G et al. *Advances in Resist Technology and Processing XIV*; SPIE, 1997, 3049, 28; Kozawa T et al. *J. Photopolym. Sci. Technol.* 2019, 32 (1), 161-167; MacDonald S A et al. *Microelectron. Eng.* 1983, 1 (4), 269-293; Ito H et al. *Digest of Technical Papers—Symposium on VLSI Technology;* 1982; 86-87). In contemporary photolithography, high energy UV light (<400 nm) is used to prepare 2D polymer patterns on surfaces. Facilitated by the digital revolution, lessons learned from 2D photopatterning have been effectively extended to the rapid preparation of 3D objects with customized form factors via additive manufacturing (i.e., 3D printing). Operating by successive photocuring of individual layers, stereolithography takes a computer-aided design from the screen to the hands of the user (Wallin T J et al. *Nat. Rev. Mater.* 2018, 3 (6), 84-100). As with photolithography, current stereolithographic techniques rely on UV/violet light (<420 nm) for photocuring, which limits material compatibility due to degradation and attenuation by absorption or scattering of high energy photons.

The recent widespread availability of inexpensive visible light emitting diodes (LEDs) offers an alternative method to UV photocuring that provides 1) milder and more cost-effective reaction conditions, 2) larger penetration depths due to reduced scattering and background absorption, and 3) wavelength-selectivity (i.e., the ability to activate different chemical pathways with individual wavelengths/colors of electromagnetic radiation) (Dumur F et al. *Catalysts* 2019, 9, 736; Bagheri A et al. *ACS Appl. Polym. Mater.* 2019, 1 (4), 593-611; Corrigan N et al. *Angew. Chemie—Int. Ed.* 2019, 58 (16), 5170-5189; Strehmel B et al. *Chem.—A Eur. J.* 2019, 25 (56), 12855-12864; Xiao P et al. *Prog. Polym. Sci.* 2015, 41 (C), 32-66; Chatani S et al. *Polym. Chem.* 2014, 5 (7), 2187-2201). As such, visible light photocuring holds the potential to promote the preparation of, inter alia, biocompatible materials containing UV-absorbing or -sensitive components, strong and lightweight composite structures, and multi-material objects having predefined functionality embedded in discrete domains. For example, dentistry photocurable coatings have shifted to blue irradiation to mitigate risks associated with UV exposure by employing visible light absorbing photocatalysts (e.g., camphorquinone and acylgermanes) (Haas M et al. *Chem.—A Eur. J.* 2018, 24 (33), 8258-8267; Schroeder W F et al. *Dent. Mater.* 2007, 23 (10), 1313-1321). However, photocuring with longer wavelengths of light (green to near infrared, NIR) is an ongoing challenge that, to date, has been restricted to long exposure times (>60 s) and/or high intensity irradiation (>50 mW/cm$^2$), precluding their utility in photocuring applications, such as stereolithography (Dumur F et al. *Catalysts* 2019, 9, 736; Bagheri A et al. *ACS Appl. Polym. Mater.* 2019, 1 (4), 593-611; Corrigan N et al. *Angew. Chemie—Int. Ed.* 2019, 58 (16), 5170-5189; Strehmel B et al. *Chem.—A Eur. J.* 2019, 25 (56), 12855-12864; Xiao P et al. *Prog. Polym. Sci.* 2015, 41 (C), 32-66; Chatani S et al. *Polym. Chem.* 2014, 5 (7), 2187-2201).

To address the grand challenge of efficient photocuring with visible to NIR light, a number of metal and metal-free photocatalysts have been examined for their ability to induce polymerization (Dumur F et al. *Catalysts* 2019, 9, 736; Xiao P et al. *Prog. Polym. Sci.* 2015, 41 (C), 32-66). These photocatalysts fall into one of two categories: Type I or Type II. Type I photosystems include only a photoinitiator (PI) that degrades upon the absorption of light to yield reactive fragments capable of initiating polymerization (e.g., radicals, cations, or anions). Type II systems on the other hand, include at least two components, an initiator and either a hydrogen donor or a photosensitizer (PS), to produce reactive compounds capable of initiating polymerization (Kozawa T et al. *J. Photopolym. Sci. Technol.* 2019, 32 (1), 161-167). While Type I systems rely on a "forbidden" n→π* transition, Type II systems operate through π→π* excitation with characteristically stronger molar absorptivity values at longer wavelengths of light (>500 nm, green to NIR). Attractive traits accompanying Type II systems that activate with lower energy light include being environmentally benign, having minimal side reactions, and not releasing volatile organic compounds (Corrigan N et al. *Chem. Soc. Rev.* 2016, 45 (22), 6165-6212; Dadashi-Silab S et al. *Chem. Rev.* 2016, 116 (17), 10212-10275). However, reactions are often slower for Type II systems in comparison to Type I due to a rate-limiting intermediate atom- or electron-transfer step that relies on an effective collision between an initiator and excited photosensitizer to ultimately produce the requisite reactive units. Therefore, it is hypothesized that the efficiency of a Type II photosystem can be improved by increasing the excited state lifetime of a photosensitizer, which in turn can increase the number of initiator collisions that occur per photo absorbed.

Xanthenes and cyanines have received considerable attention as Type II photosensitizer compounds, with demonstrated photocuring under visible and NIR light, respectively (Dadashi-Silab S et al. *Chem. Rev.* 2016, 116 (17), 10212-10275; Strehmel B et al. *J. Photopolym. Sci. Technol.* 2016, 29 (1), 111-121). Both Lalevée (Xiao P et al. *Prog. Polym. Sci.* 2015, 41 (C), 32-66; Bonardi A H et al. *Macromolecules* 2018, 51 (4), 1314-1324; Bonardi A et al. *Polym. Chem.* 2019, 10 (47), 6505-6514) and Strehmel (Shiraishi A et al. *J. Photopolym. Sci. Technol.* 2017, 30 (6), 633-638; Schmitz C et al. *Prog. Org. Coatings* 2016, 100, 32-46; Schmitz C et al. *Angew. Chemie* 2019, 131 (13), 4445-4450) and their coworkers have shown visible to NIR photocuring of acrylates and epoxies using Type II photosystems. Recent reports have shown that NIR polymerization chemistry can be either rapid (<60 s) when using a high intensity (>400 mW/cm$^2$) laser diode at 785 nm (Bonardi A H et al. *Macromolecules* 2018, 51(4), 1314-1324), or reactive under low intensity (~30 mW/cm$^2$) LED light centered at ~790 nm, yet requiring longer exposure times (>100 s) (Shiraishi A et al. *J. Photopolym. Sci. Technol.* 2017, (6), 633-638). This apparent tradeoff between reaction rate and incident light intensity necessitates a closer examination of visible to NIR photosystems to advance state-of-the-art photocuring. To this end, an opportunity remains to simultaneously examine critical facets of photocuring by: 1) quantifying apparent polymerization rate under normalized irradiation conditions; and 2) identifying a modular synthetic photocatalyst to facilitate a systematic structure-property study.

Figure 1:
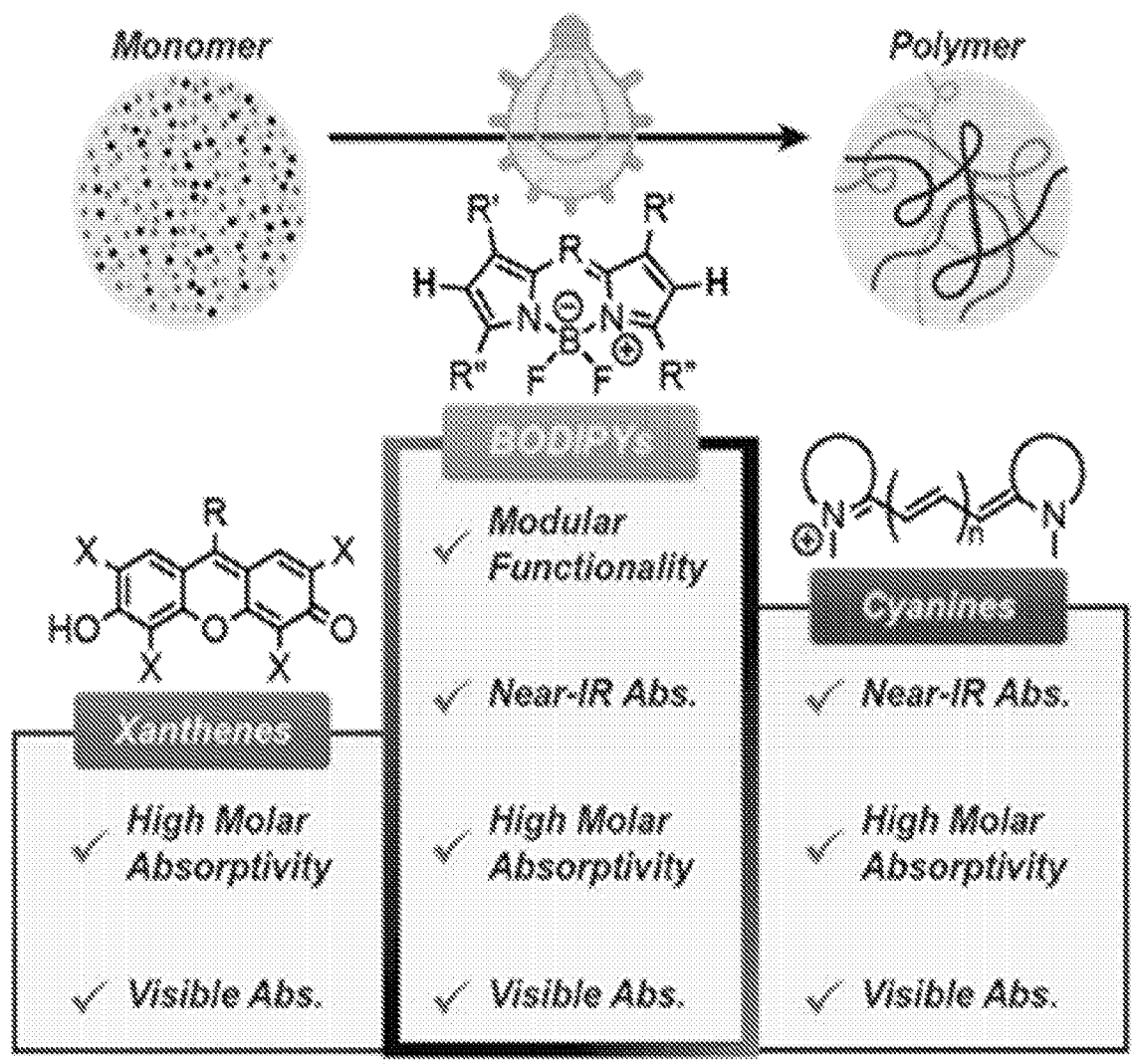
FIG. 1. Boron dipyrromethene (BODIPY) as an attractive photocatalyst platform in place of traditional xanthenes and cyanines for efficient visible to NIR photopolymerizations.

A series of boron-dipyrromethene (BODIPY) dyes were selected to address these photopolymerization challenges. Despite the attractive traits of BODIPYs, including tunable optoelectronic properties, high molar extinction, and facile and modular syntheses (Lovell L G et al. *Polym. Adv. Technol.* 2001, 12 (6), 335-345; Telitel S et al. *Polymer (Guildf)*. 2013, 54 (8), 2071-2076; Telitel S et al. *Macromolecules* 2012, 45 (17), 6864-6868), they have received far less attention as photopolymer catalysts (Bonardi A et al. *Polym. Chem.* 2019, 10 (47), 6505-6514; Telitel S et al. *Polymer (Guildf)*. 2013, 54 (8), 2071-2076; Telitel S et al. *Macromolecules* 2012, 45 (17), 6864-6868) in comparison to their xanthene and cyanine counterparts (FIG. 1). However, the BODIPY platform has been heavily examined for imaging (Costa P et al. *Nat. Catal.* 2020, 3, 427-437; Qiu H et al. Science (80-.). 2016, 352 (6286), 697-701), sensing (Haldar U et al. *ACS Appl. Mater. Interfaces* 2019, 11(14), 13685-13693), and photodynamic therapy (Kamkaew A et al. *Chem. Soc. Rev.* 2013, 42 (1), 77-88; Miao X et al. *Chem. Sci.* 2019, (10), 3096-3102) applications. These extensive studies have unveiled a remarkable range of optoelectronic properties for compounds bearing a BODIPY scaffold, showing peak absorption values from 500-900 nm (blue/green-NIR), extinction coefficients exceeding $5 \times 10^4$ M$^{-1}$ cm$^{-2}$, reduction potentials from −2.40 V to −0.35 V, and oxidation potentials from 1.55 V to 0.18 V (vs. Cp$_2$Fe/Cp$_2$Fe$^+$) (Lu H et al. *Chem. Soc. Rev.* 2014, 43 (13), 4778-4823; Loudet A et al. *Chem. Rev.* 2007, 107 (11), 4891-4932; Thompson B et al. *BODIPY Dyes—A Privilege Molecular Scaffold with Tunable Properties;* 2019; Chapter 4—Redox Chemistry of BODIPY Dyes). Moreover, efficient intersystem crossing (ISC) to long-lived triplet excited states have been observed for various BODIPY derivatives. Previously, these triplet excited states have played an important role in photodynamic therapy by generating reactive singlet (Zhao J et al. *Chem. Soc. Rev.* 2015, 44 (24), 8904-8939), and are presented here for utility in photocuring applications. A common method to increase the intersystem crossing rate in BODIPYs has been halogenation, which relies on the so called "heavy atom effect" (Koziar J C et al. *Acc. Chem. Res.* 1977, 11, 334-341) where spin-orbit coupling is enhanced through incorporation of elements with high atomic number. This impressive versatility in absorption, redox potentials, and excited state dynamics make BODIPY dyes attractive candidates for visible to NIR photocuring.

Herein, a library of BODIPYs were synthesized and quantitatively examined using a custom FTIR setup (Allen M J et al. *Spectrosc. Appl. Noteb.* 2020, 35 (2), 78) to systematically unveil design parameters that can serve as a guide to advance photopolymer development and associated technologies. Specifically, halogenation was comprehensively examined as a method to improve photocuring efficiency, which builds off the hypothesis that longer lived excited states can increase the probability of a successful collision in a Type II initiation process.

Materials. Chemicals: 2,4-Dimethyl-1H-pyrrole 97%, 1-Chloropyrrolidine-2,5-dione (NCS) 97% were purchased from Ark Pharm. 2,4,6-trimethyl-benzaldehyde 97%, dichloromethane (DCM) 99.9%, Extra Dry, anhydrous, Potassium Hydroxide (KOH) (Certified ACS), Methanol (MeOH) (Certified ACS), Toluene (Certified ACS) were purchased from Fisher Scientific. Trifluoroacetic acid (TFA) >99.9%, 2,3-Dichloro-5,6-dicyano-1,4-benzoquinone (DDQ) 99.15%, N-Bromosuccinimide (NBS) 99.98% were purchased from Chem-Impex. Triethylamine ≥99.5%, 3,4,5-Trimethoxybenzaldehyde 98% were purchased from Sigma-Aldrich. Boron trifluoride diethyl etherate 98% was purchased from Oakwood Chemical. N-Iodosuccinimide (NIS) was purchased from Combi-Blocks. 4'-tert-Butylacetophenone 95% was purchased from Matrix Scientific. Nitromethane >98% was purchased from TCI Chemicals. Ammonium acetate ≥97.0% was purchased from Alfa Aesar. Uvasol® Acetonitrile for Spectroscopy was purchased from Sigma Aldrich. Rhodamine 6G, 99%, pure, laser grade, was purchased from ACROS Organics. H-Nu 254, Onium Salt and Borate V were purchased from Spectra Group Limited, Inc. CDCl$_3$ 99.8% was purchased from Cambridge Isotope Laboratories. All chemicals were used as received without additional purification, unless otherwise noted.

Instrumentation

Nuclear magnetic Resonance (NMR). Nuclear magnetic resonance spectra were recorded on an Agilent MR 400 MHz spectrometer utilizing CDCl$_3$ as the solvent. $^1$H NMR were carried out coupled and referenced to the CDCl$_3$ chemical shift at 7.26 ppm. $^{13}$C NMR were carried out decoupled and referenced to the CDCl$_3$ chemical shift at 77.16 ppm.

High Resolution Mass Spectrometry (HRMS). HRMS was performed on an Agilent Technologies 6530 Accurate-Mass Q-TOF LC/MS using ESI and the data subsequently analyzed using Agilent MassHunter Qualitative Analysis Software.

Steady-State Optical Characterization. UV-Visible absorption spectra were recorded on an Ocean Optics QE PRO-ABS Fiber Optic Spectrometer utilizing deuterium-tungsten halogen light sources (DH-2000-BAL). Six hundred micron fiber optics cables (QP600-025-SR) were used to attach to the detector with a slit width of 5 µm. Dilute absorption data was collected in acetonitrile utilizing quartz cuvettes and qpod sample holder (QNW qpod2e) and thin-film absorption data was collected in the resin formulation (see photopolymerization conditions) utilizing the Ocean Optics Stage RTL-T.

Figure 2:
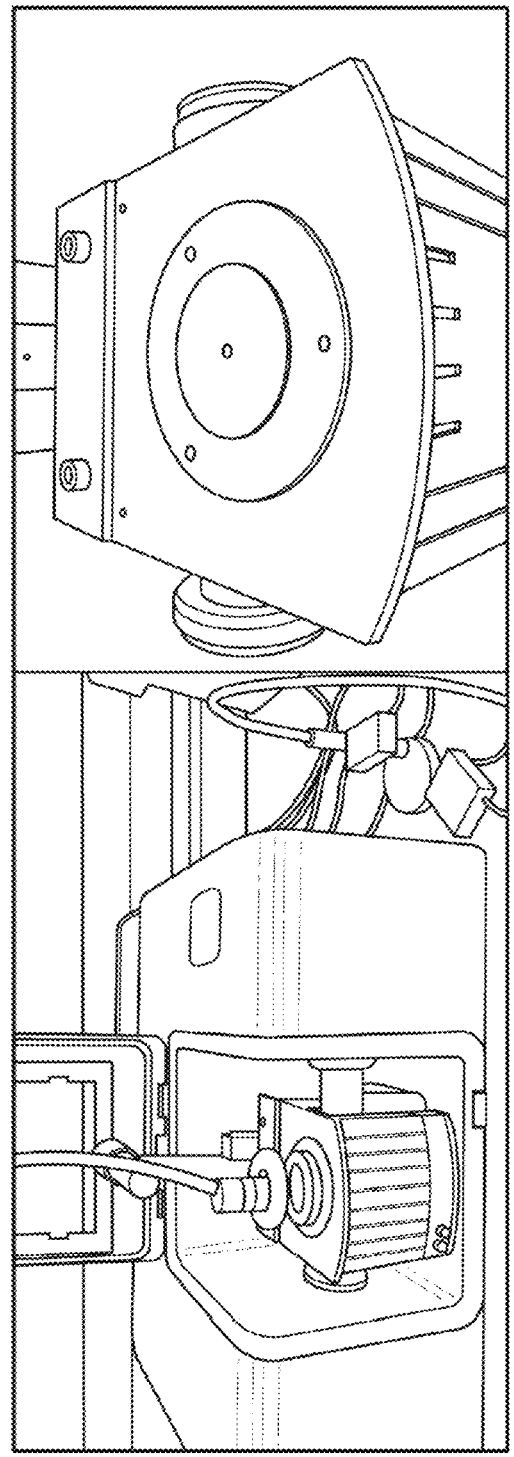

Real-Time Fourier Transform Infrared Spectroscopy (RT-FTIR). Real-Time Fourier-Transform Infrared (RT-FTIR) spectroscopy was recorded utilizing an INVENIO FT-IR Spectrometer from Bruker and controlled via OPUS Spectroscopy Software using an LN-MCT Mid detector. A modifier GladiATR Illuminate ATR accessory (Allen et al. *Spectrosc. Appl. Noteb.* 2020, 35(2), 78) from PIKE Technologies was used to analyze the photocuring of liquid resins upon exposure to light (FIG. 2). Collimated LED light sources (530 nm-P/N LCS-0530-15-22, 656 nm-P/N LCS-0656-07-22, and 740 nm-P/N LCS-0740-10-22) from Mightex Systems along with Lightguide Adapters were utilized to irradiate resins with visible light (see photopolymerization procedure for more details). LED Controller M/N SLC-MA02-U was used with a 3 mm fiber optics cable LLG-3-4H.

Fluorescence Measurements. All fluorescence measurements were recorded by the Agilent Cary Eclipse Fluorescence Spectrophotometer. The fluorometer is equipped with Unique Agilent Xenon flash lamp (190 nm-1100 nm) as the light source, and high performance R928 photomultiplier (PMT) (200 nm-900 nm) as the detector. The sensitivity of this system is >4000:1 RMS (350 nm) and >1400:1 RMS (500 nm) after the calibration.

Emission Quantum Yield Measurements (Wirth et al. *Nat Protoc.* 2013, 8, 1535-1550)

The emission quantum yields for all BODIPY derivatives were calculated based on the equation, $$\Phi_{f,x} = \Phi_{f,R} \cdot \frac{A_R}{A_x} \cdot \frac{I_x}{I_R} \cdot \frac{n_x^2}{n_R^2}$$

where the index R denotes the reference dye and the x denotes the sample, $\Phi_f$ is the emission quantum yield, A is the absorption, I is the integrated emission intensity, and n is the refractive index of the solvent being used.

Figure 3:
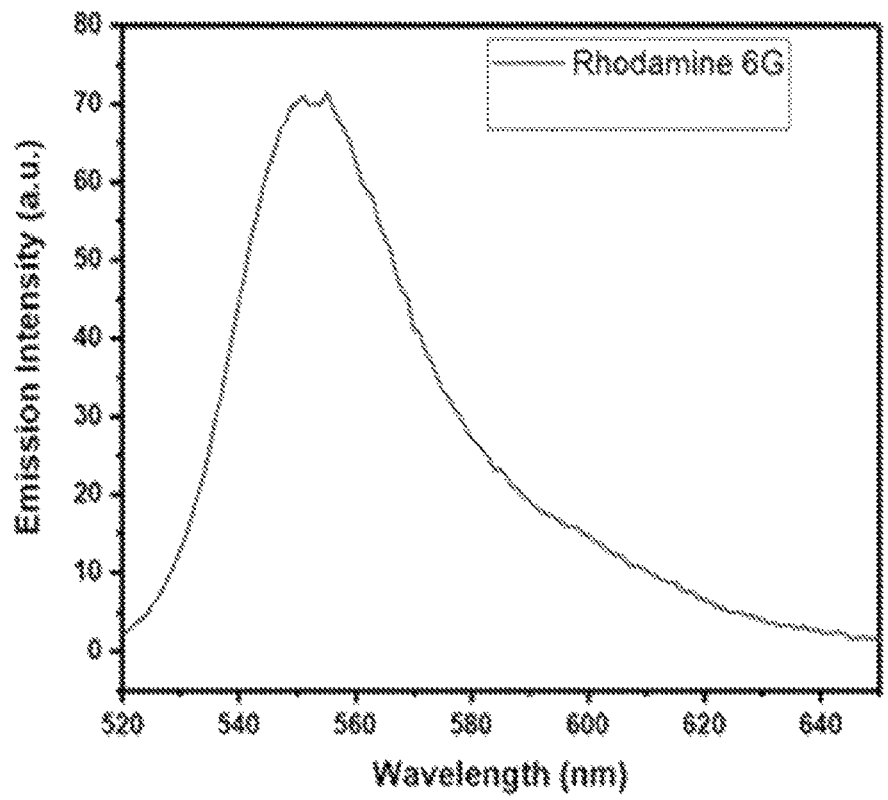
FIG. 3. The emission spectrum of R6G in ethanol.

For simplicity, the absorption for all samples (in acetonitrile) including the reference dye, rhodamine 6G ($\Phi_f$=0.91 in ethanol; FIG. 3) was kept in the dilute condition (abs=0.1) to ensure no aggregation would occur. After recording all the emission spectrum for each sample and R6G, the area under the emission curve was integrated to calculate the I. The refractive indices for acetonitrile and ethanol are 1.344 and 1.361, respectively. Following the equation, the $\Phi_f$ was calculated for all samples.

Stern-Volmer Plot (Boaz et al. *J. Am. Chem. Soc.* 1950, 72 (8), 3435-3443)

The Stern-Volmer experiments were conducted in acetonitrile solutions by gradually increasing the quencher (the iodonium salt or the borate salt) concentration in the presence of BODIPY derivatives (1 mM) and recording the fluorescence spectrum for each quencher concentration. The total emission intensity of each quencher concentration was fitted to the equation, $$\frac{I_f^0}{I_f} = 1 + k_Q \tau_0 [Q]$$

where $I_f^0$ is the emission intensity without quenchers, $I_f$ is the emission intensity for the solution with quenchers, $k_Q$ is the rate constant of the quenching process, to is the excited-state lifetime of the fluorophore without quenchers, and [Q] is the quencher concentration.

Electronic Characterization.

Cyclic voltammetry (CV) was performed in an argon-filled MBraun glovebox using the CHI 660D Electrochemistry Workstation. A single-compartment three-electrode cell was used with glassy carbon as the working electrode, a platinum wire as the counter electrode, and an Ag/AgNO$_3$ (0.01 M) non-aqueous reference electrode calibrated versus Fc/Fc+ in 0.1 M tetrabutylammonium hexafluorophosphate (TBAPF$_6$) acetonitrile solutions ($E_{1/2}$(Fc/Fc+)=0.1 V vs Ag/Ag+) with a 0.1 V/s scan rate. Oxidation onsets were utilized to calculate the HOMO energy levels –(4.8 eV–$E_{ox\text{-}Ferrocene}$+$E_{ox}$). Reduction onsets were utilized to calculate the LUMO energy levels –(4.8 eV–$E_{oxFerrocene}$+$E_{red}$) (Thorat et al. *Phys. Chem. Chem. Phys.* 2015, 17, 17221-17236).

Figure 4:
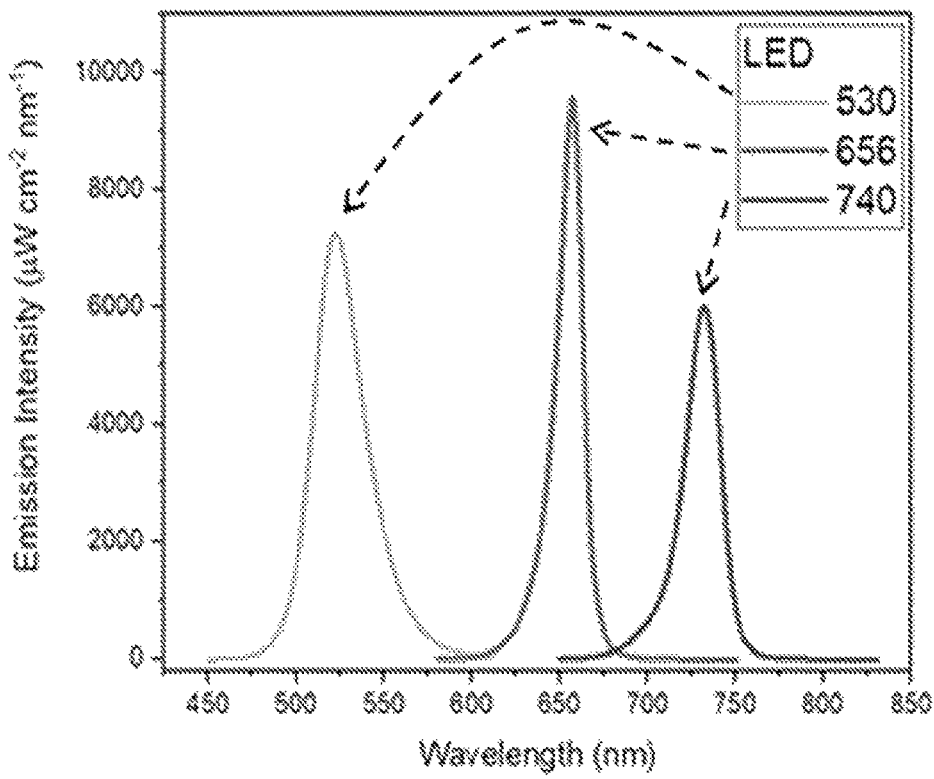
FIG. 4. Emission intensity profiles of the three LEDs. The input current for all three LEDs was 50 mA.

LED Light Sources. All the LEDs used were purchased from the Mightex Systems. The product numbers for the three LEDs listed are LCS-530-15-xx, LCS-656-07-xx, and LCS-740-10-xx. The emission intensity profile for each LED was measured using the UV-Vis Ocean Insight system after the standard calibration. The intensity measurements were recorded by the QE pro spectrometer, in which the LED was connected to the fiber optic system using a 3 mm liquid lightguide purchased from the Mightex Systems (serial #: LLG-03-59-340-0800-1). The emission intensity profiles of the three LEDs are shown in FIG. 4.

Normalizing Photons Absorbed. The photon flux was calculated based on the following equations:

$$E = hc/\lambda \quad \quad \quad 1$$

$$W = n \times \left(\frac{E}{s}\right) \quad \quad \quad 2$$

$$-\log T = A = \varepsilon bc \quad \quad \quad 3$$

Figure 5:
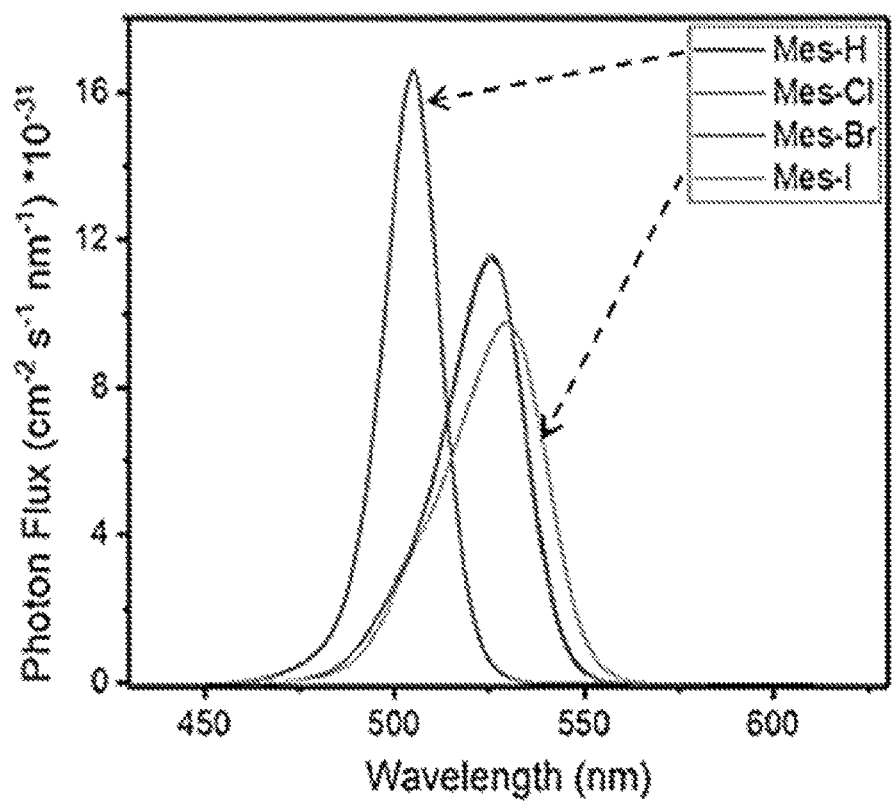
FIG. 5. Normalized photons absorbed for Mes-X BODIPY ($\sim 9.7 \times 10^{13}$ cm$^{-2}$ s$^{-1}$) derivatives under green LED irradiation.
Figure 6:
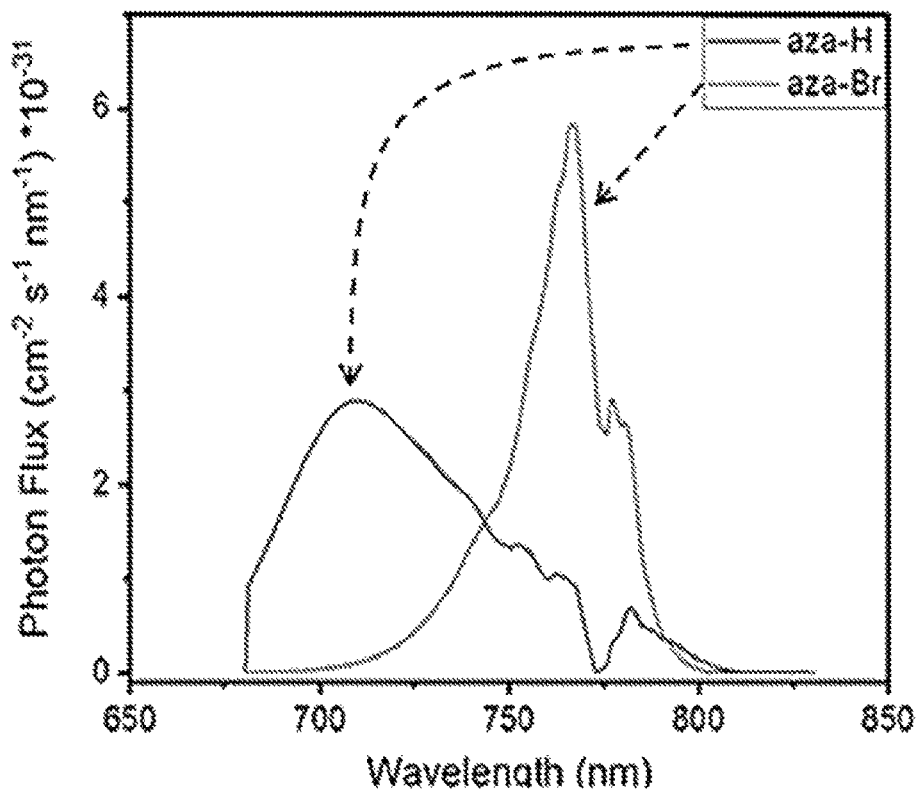
FIG. 6. Normalized photons absorbed for aza-BODIPY derivatives ($\sim 2.6 \times 10^{14}$ cm$^{-2}$ s$^{-1}$) derivatives under NIR LED irradiation.

Equation 1 and Equation 2 are used to convert the intensity output of the LED from (mW/cm$^2$ nm) into (# of photons/cm$^2$ s nm). Transmission (T) was calculated from Equation 3, followed by the portion of photons absorbed as (1-T). Multiplying the light intensity by (1-T) provides the photon flux for each wavelength that's being absorbed by the sample. Finally, integrating each curve provided the total photon flux (or number of photons absorbed) for each sample. The normalized photons absorbed for Mes-X BODIPY (~9.7×10$^{13}$ cm$^{-2}$ s$^{-1}$) derivatives under green LED irradiation are shown in FIG. 5. The normalized photons absorbed for aza-BODIPY derivatives (~2.6×10$^{14}$ cm$^{-2}$ s$^{-1}$) derivatives under NIR LED irradiation are shown in FIG. 6.

Synthesis of Mes-BODIPYs. The syntheses of Mes-BODIPY derivatives were accomplished in an analogous fashion to that previously reported in literature (Nepomnyashchii et al. *J. Am. Chem. Soc.* 2011, 133 (22), 8633-8645; Wang et al. *Org. Biomol. Chem.* 2016, 14, 7028-7037) (Scheme 1).

Scheme 1. Synthesis of BODIPY dyes (1A, 1B, 1C, 1D) containing a mesityl group at the bridgehead position along with 4 methyl substitutions.

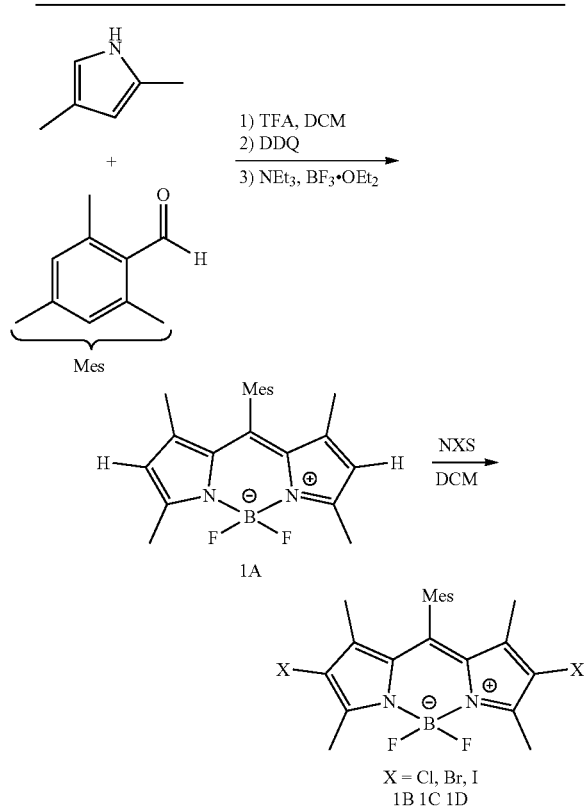

Figure 7:
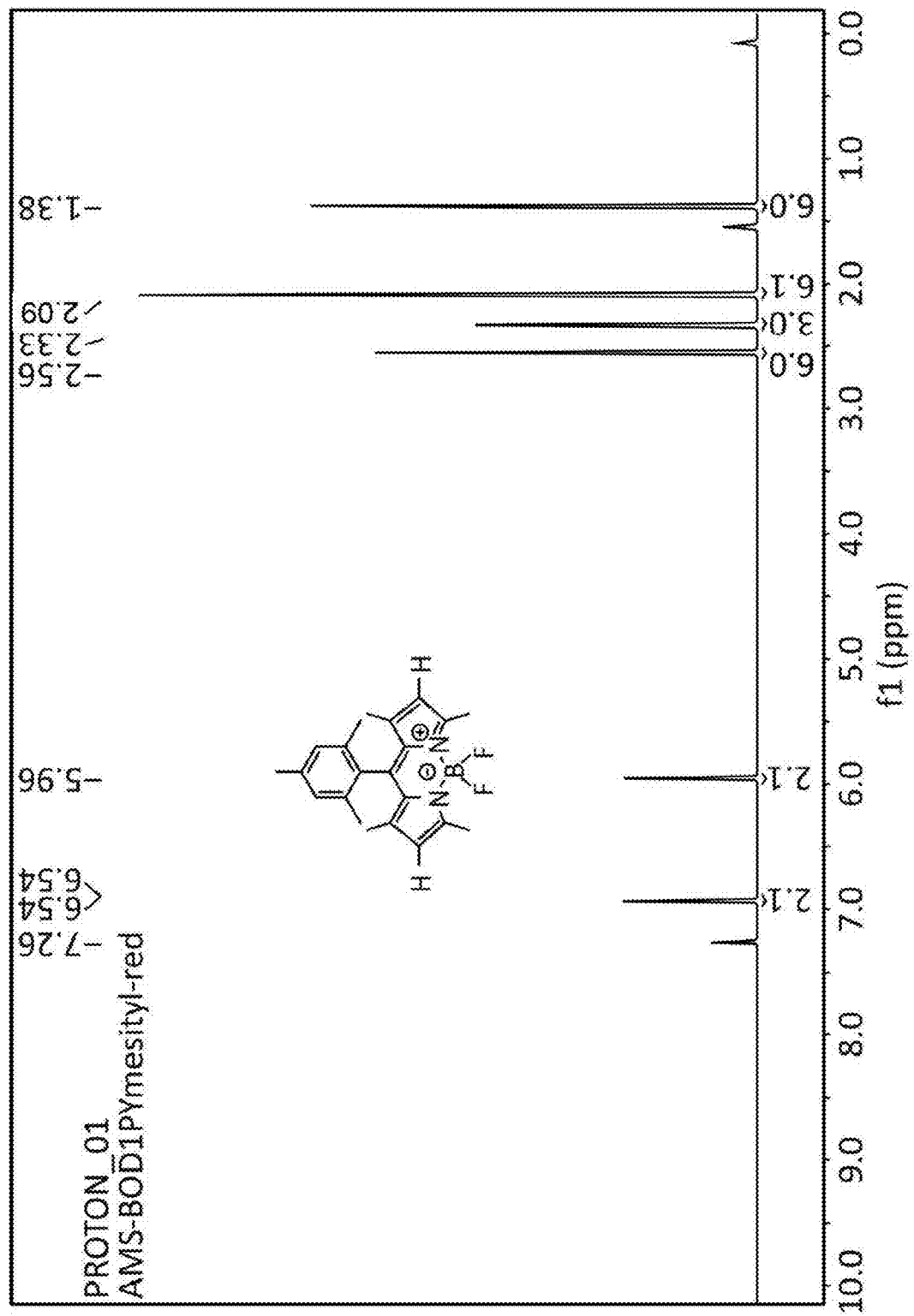
FIG. 7. $^1$H NMR of Mes-H BODIPY in CDCl$_3$.

5,5-difluoro-10-mesityl-1,3,7,9-tetramethyl-5H-414,514-dipyrrolo[1,2-c:2',1'-f][1,3,2]diazaborinine (1A). First, 2,4-dimethyl-1H-pyrrole (1.18 g, 1.28 mL, 1 Eq, 12.4 mmol) was added to 250 mL of dichloromethane (DCM) in a dry 500 mL 2-neck round bottom flask in a glovebox. Next, 2,4,6-trimethylbenzaldehyde (0.73 g, 0.73 mL, 0.40 Eq, 5.0 mmol) was added to the solution. The round bottom flask was then removed from the glovebox and placed under N$_2$. Next, 50 µL of trifluoroacetic acid (TFA) in 2.5 mL of dry DCM was added slowly to the round bottom flask while stirring. The reaction was stirred for 3 hr and monitored via thin layer chromatography (TLC) (1:1 DCM:hexane) until completion. After reaction completion, the round bottom was placed in an ice bath and 1.13 g of 2,3-dichloro-5,6-dicyano-p-benzoquinone (DDQ) (0.40 Eq, 5.0 mmol) was added to the flask and stirred for 10 min in an ice bath and then stirred for 1 hr at room temperature (20° C.-23° C.). Next, 10 mL of triethylamine (NEt$_3$) (5.8 Eq., 72 mmol) was added to the reaction mixture and stirred for 10 min. Then, 10 mL of boron trifluoride diethyl etherate (BF$_3$·OEt$_2$) (6.5 Eq., 81 mmol) was added slowly to the reaction flask and stirred for 2 hr. The crude product was washed with saturated Na$_2$CO$_3$ (3×50 mL) and the organic layer subsequently dried with MgSO$_4$. The organic layer volume was then reduced using a rotary evaporator (rotavap) and purified via column chromatography (1:1 DCM:hexane) to yield an orange solid (1.170 g, 65%). $^1$H NMR (400 MHz, CDCl$_3$) δ 6.94 (s, 2H), 5.96 (s, 2H), 2.56 (s, 6H), 2.33 (s, 3H), 2.09 (s, 6H), 1.38 (s, 6H) (FIG. 7); $^{13}$C NMR (100 MHz, CDCl$_3$) δ 155.0, 142.3, 141.6, 138.5, 134.9, 131.1, 130.6, 128.9, 120.8, 21.2, 19.5, 14.6, 13.4; IR (ATR): 2950, 2918, 2858, 1537, 1501, 1463, 1435, 1406, 1362, 1303, 1187, 1152, 1122, 1103, 1083, 1061, 1046, 970, 702 cm$^{-1}$; HRMS (ESI): exact mass calculated for C$_{22}$H$_{25}$BF$_2$N$_2$ [M+Na]$^+$ 389.1976, found 389.1980.

Figure 8:
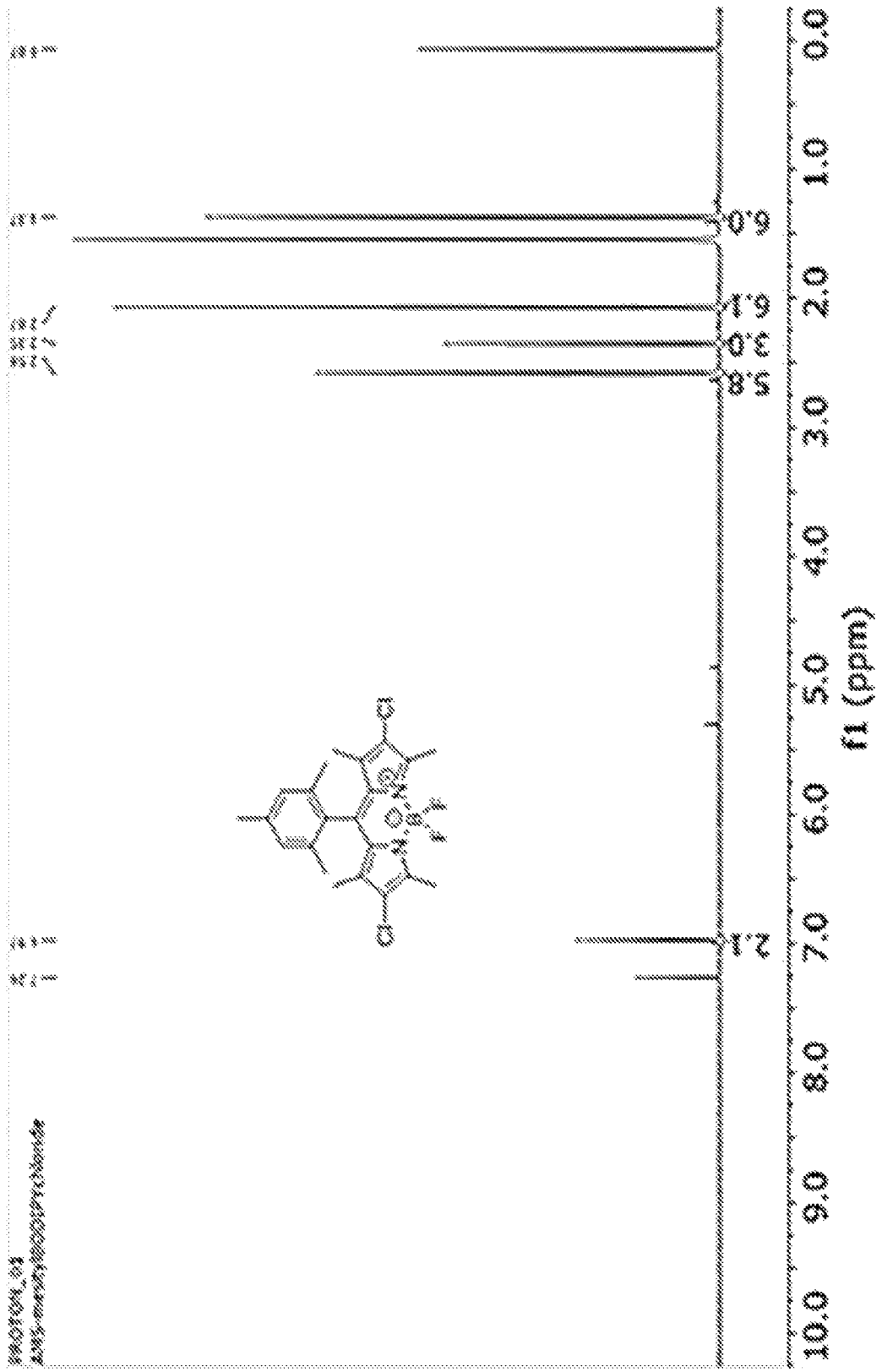
FIG. 8. $^1$H NMR of Mes-Cl BODIPY in CDCl$_3$.

2,8-dichloro-5,5-difluoro-10-mesityl-1,3,7,9-tetramethyl-5H-414,514-dipyrrolo[1,2-c:2',1'-f][1,3,2]diazaborinine (1B). First, 5,5-difluoro-10-mesityl-1,3,7,9-tetramethyl-5H-414,514-dipyrrolo[1,2-c:2',1'-f][1,3,2]diazaborinine (1A) (100 mg, 1 Eq, 273 µmol) was dissolved in 10 mL of dry DCM in a 100 mL 2-neck round bottom. Next, 1-chloropyrrolidine-2,5-dione (80.2 mg, 2.2 Eq, 601 µmol) in 5 mL of DCM was added to the flask under N$_2$ at room temperature. The reaction was monitored via TLC (1:1 DCM:hexane) until completion. The crude product was washed with 1 M NaOH (3×10 mL). The organic layer was subsequently dried with MgSO$_4$, filtered, volume reduced via rotavap, and purified via column chromatography (1:1 DCM:hexane) to yield a red-orange solid (69 mg, 58%). $^1$H NMR (400 MHz, CDCl$_3$) δ 6.97 (s, 2H), 2.58 (s, 6H), 2.35 (s, 3H), 2.07 (s, 6H), 1.37 (s, 6H) (FIG. 8); $^{13}$C NMR (100 MHz, CDCl$_3$) δ 152.3, 142.8, 139.4, 137.3, 134.9, 130.4, 129.4, 129.0, 122.3, 21.4, 19.6, 12.6, 11.0; IR (ATR): 2962, 2922, 2852, 1531, 1500, 1466, 1405, 1382, 1350, 1309, 1166, 1122, 1085, 1062, 994, 923, 774, 702, 604 cm$^{-1}$; HRMS (ESI): exact mass calculated for C$_{22}$H$_{23}$BCl$_2$F$_2$N$_2$ [M+Na]$^+$ 457.1196, found 457.1202.

Figure 9:
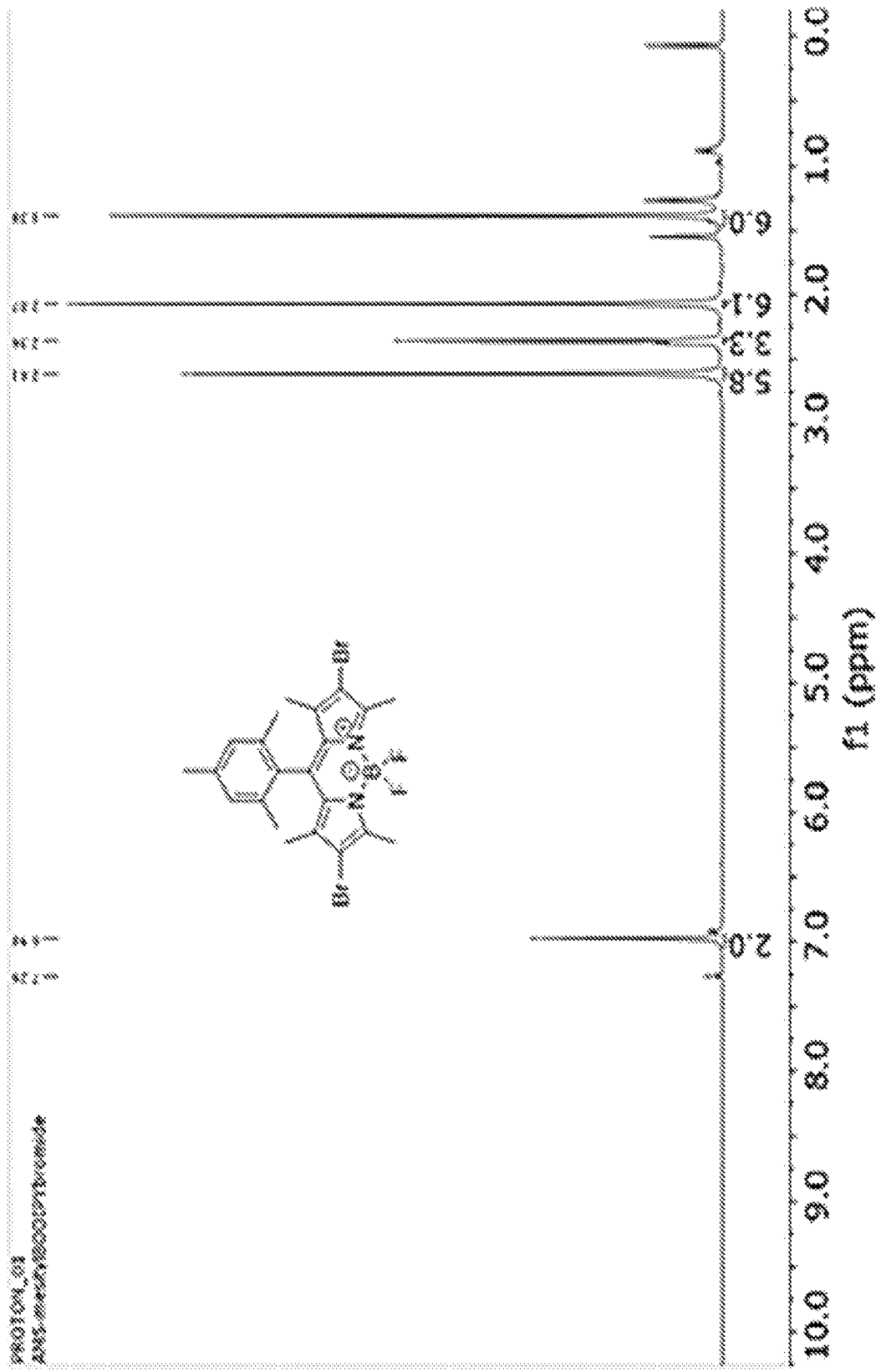
FIG. 9. $^1$H NMR of Mes-Br BODIPY in CDCl$_3$.

2,8-dibromo-5,5-difluoro-10-mesityl-1,3,7,9-tetramethyl-5H-414,514-dipyrrolo[1,2-c:2',1'-f][1,3,2]diazaborinine (1C). First, 5,5-difluoro-10-mesityl-1,3,7,9-tetramethyl-5H-414,514-dipyrrolo[1,2-c:2',1'-f][1,3,2]diazaborinine (1A) (200 mg, 1 Eq, 0.27 mmol) was dissolved in 10 mL of dry DCM in a 100 mL 2-neck round bottom. N-boromosuccinimide (NBS) (214 mg, 2.2 Eq, 1.20 mmol) in 5 mL of dry DCM was added to the flask under N$_2$ at room temperature. The reaction was monitored via TLC (1:1 DCM:hexane) until completion. The crude product was washed with 1 M NaOH (3×10 mL). The organic layer was dried with MgSO$_4$, volume reduced via rotavap, and purified via column chromatography (1:1 DCM:hexane) to yield a red solid (150 mg, 52%). $^1$H NMR (400 MHz, CDCl$_3$) δ 6.98 (s, 2H), 2.61 (s, 6H), 2.36 (s, 3H), 2.07 (s, 6H), 1.38 (s, 6H) (FIG. 9); $^{13}$C NMR (100 MHz, CDCl$_3$) δ 153.6, 142.4, 139.8, 139.3, 134.8, 130.5, 129.6, 129.3, 111.4, 21.2, 19.5, 13.7, 12.6; IR (ATR): 2956, 2919, 2854, 1529, 1462, 1400, 1383, 1345, 1314, 1175, 1118, 1099, 1084, 1060, 996, 851, 774, 701, 592 cm$^{-1}$; HRMS (ESI): exact mass calculated for C$_{22}$H$_{23}$BBr$_2$F$_2$N$_2$ [M+Na]$^+$ 545.0186, found 545.0189.

5,5-difluoro-2,8-diiodo-10-mesityl-1,3,7,9-tetramethyl-5H-414,514-dipyrrolo[1,2-c:2',1'-f][1,3,2]diazaborinine (1D). First, 5,5-difluoro-10-mesityl-1,3,7,9-tetramethyl-5H-414,514-dipyrrolo[1,2-c:2',1'-f][1,3,2]diazaborinine (1A) (100 mg, 1 Eq, 273 µmol) was dissolved in 10 mL of DCM in a 100 mL 2-neck round bottom. N-iodosuccinimide (NIS) (135 mg, 2.2 Eq, 601 µmol) in 10 mL of methanol was added to the flask under N$_2$ at room temperature. The reaction was monitored via TLC (1:1 DCM:hexane) until completion. The crude product was washed with 1 M NaOH (3×10 mL).

Figure 10:
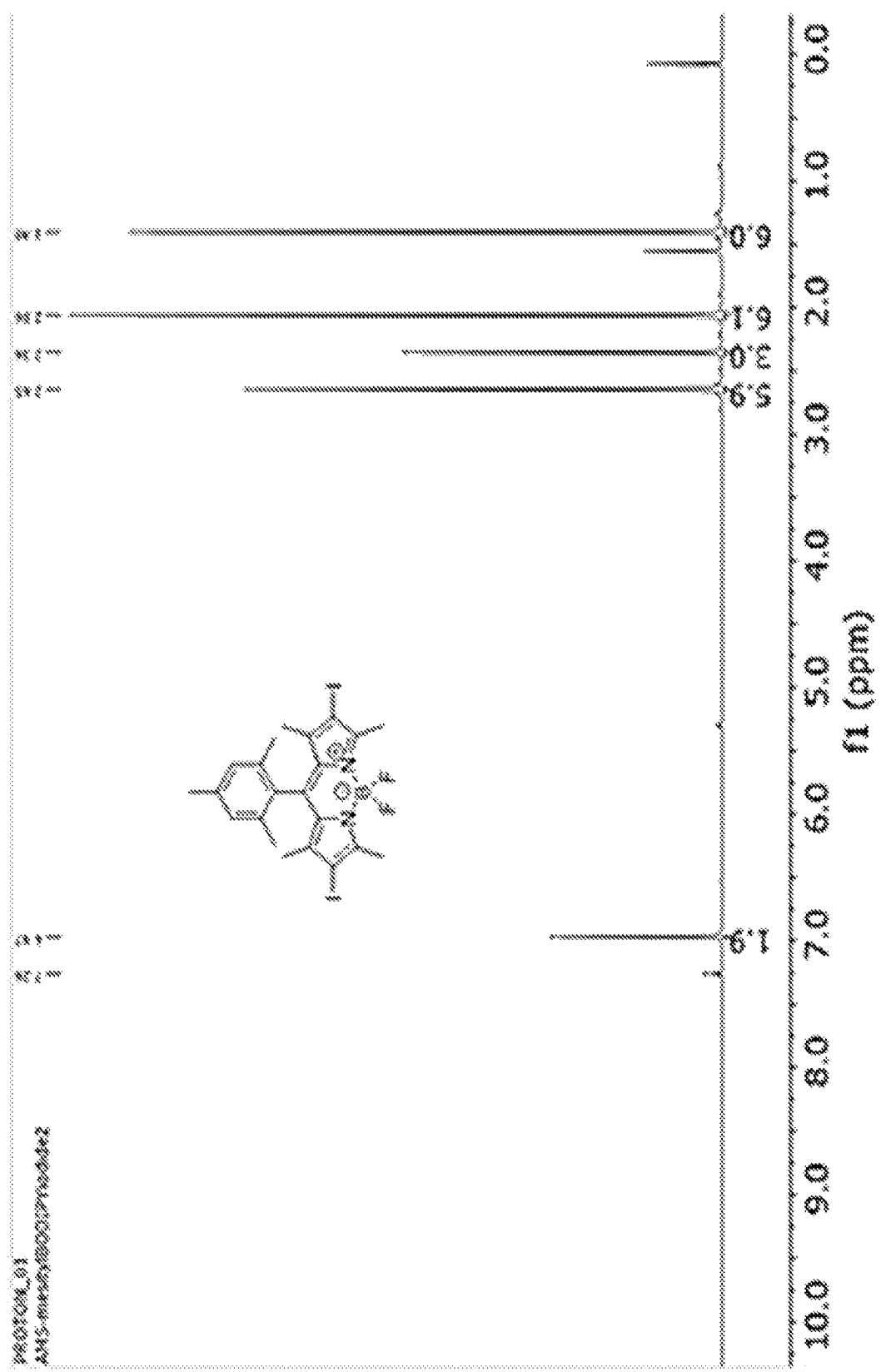
FIG. 10. $^1$H NMR of Mes-I BODIPY in CDCl$_3$.

The organic layer was dried, volume reduced via rotavap, and purified via column chromatography (1:1 DCM:hexane) to yield a purple solid (110 mg, 65%). $^1$H NMR (400 MHz, CDCl$_3$) δ 6.97 (s, 2H), 2.65 (s, 6H), 2.36 (s, 3H), 2.06 (s, 6H), 1.40 (s, 6H) (FIG. 10); $^{13}$C NMR (100 MHz, CDCl$_3$) δ 156.4, 144.6, 141.7, 139.3, 134.8, 130.8, 130.5, 129.3, 85.3, 21.2, 19.5, 16.0, 15.8; IR (ATR): 2953, 2917, 2852, 1519, 1475, 1455, 1397, 1340, 1308, 1176, 1135, 1115, 1092, 1080, 993, 850, 775, 701, 586 cm$^{-1}$; HRMS (ESI): exact mass calculated for C$_{22}$H$_{23}$BF$_2$I$_2$N$_2$ [M+Na]$^+$ 640.9909, found 640.9908.

Synthesis of aza-BODIPYs. The syntheses of aza-BODIPY derivatives were accomplished in an analogous fashion to that previously reported in literature (Sheng et al. *Org. Lett.* 2018, 20 (9), 2620-2623; Adarsh et al. *Org. Lett.* 2010, 12 (24), 5720-5723) (Scheme 2).

Scheme 2. Synthesis of BODIPY dyes (2, 3, 4, 5, 6, 7) where the mesityl group at the meso bridgehead position was replaced with nitrogen.

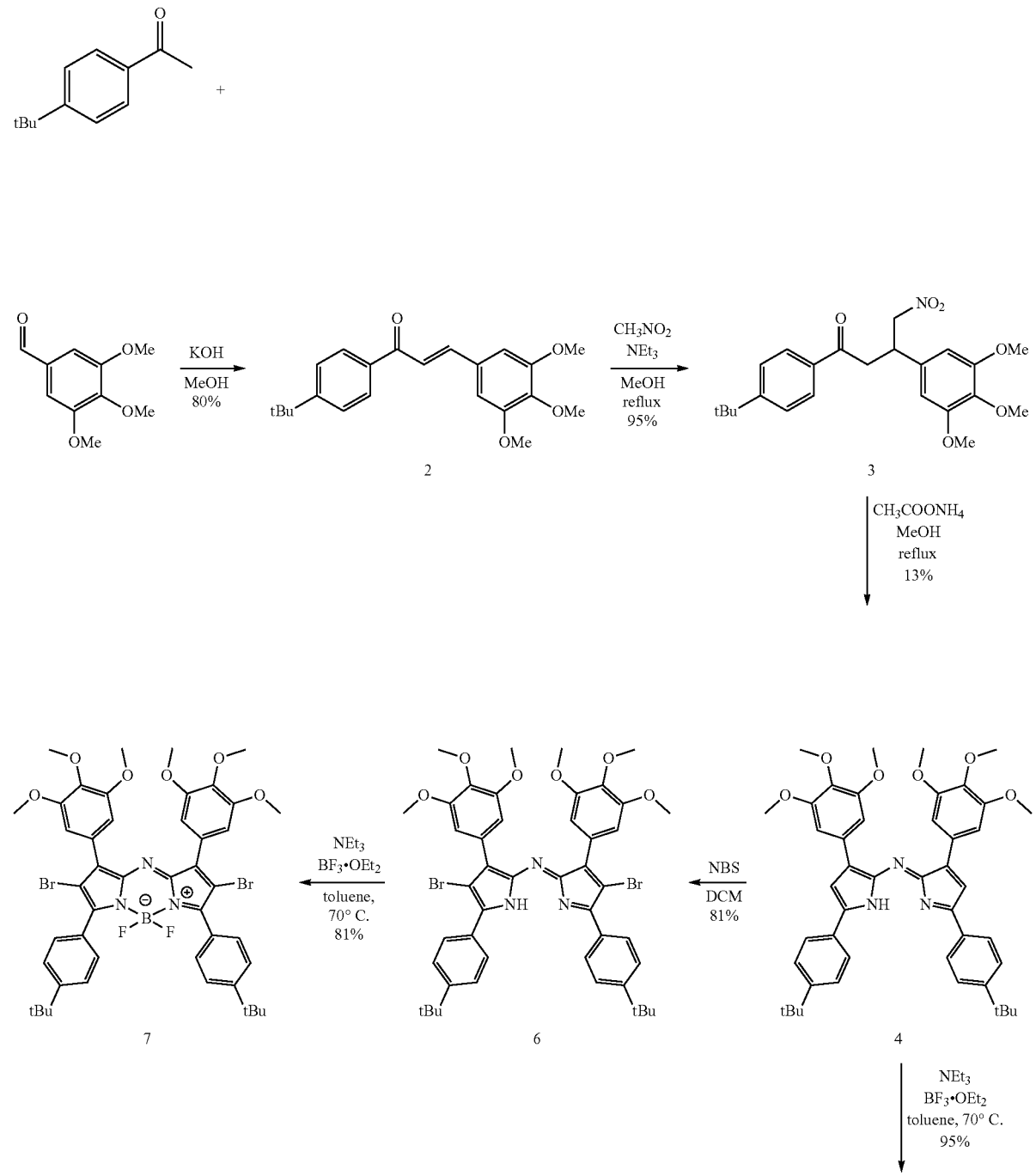

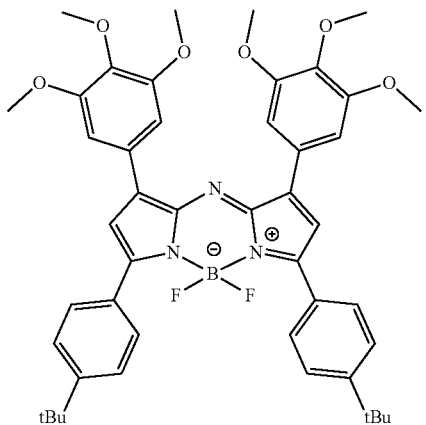

5

Figure 11:
FIG. 11. $^1$H NMR of aldol intermediate in CDCl$_3$.

(E)-1-(4-(tert-butyl)phenyl)-3-(3,4,5-trimethoxyphenyl)prop-2-en-1-one (2). First, 1-(4-(tert-butyl)phenyl)ethan-1-one (8.00 g, 8.30 mL, 1 Eq, 45.4 mmol) and potassium hydroxide (9.00 g, 3.53 Eq, 160 mmol) in 30 mL of methanol were slowly added to 3,4,5-trimethoxybenzaldehyde (8.00 g, 0.898 Eq, 40.8 mmol) in 20 mL of methanol. The mixture was stirred at room temperature for 1 h and filtered under vacuum. The resultant faint yellow solid was collected and washed twice with methanol and water to yield 12.880 g (89%). $^1$H NMR (400 MHz, CDCl$_3$) δ 7.95-7.98 (d, J=8.8 Hz, 2H), 7.69-7.73 (d, J=15.6 Hz, 1H), 7.51-7.53 (d, J=8.8 Hz, 2H), 7.39-7.43 (d, J=15.6 Hz, 1H), 6.86 (s, 2H), 3.92 (s, 6H), 3.90 (s, 3H), 1.36 (s, 9H) (FIG. 11); $^{13}$C NMR (100 MHz, CDCl$_3$) δ 190.1, 156.5, 153.4, 144.5, 140.3, 135.6, 130.5, 128.5, 125.6, 121.6, 105.6, 60.9, 56.2, 35.1, 31.1; IR (ATR): 2962, 2938, 2905, 1651, 1580, 1501, 1451, 1417, 1327, 1318, 1278, 1245, 1218, 1191, 1153, 1004, 825, 525, 516 cm$^{-1}$; HRMS (EI): exact mass calculated for $C_{22}H_{26}O_4$ [M+H]$^+$ 355.1909, found 355.1904.

Figure 12:
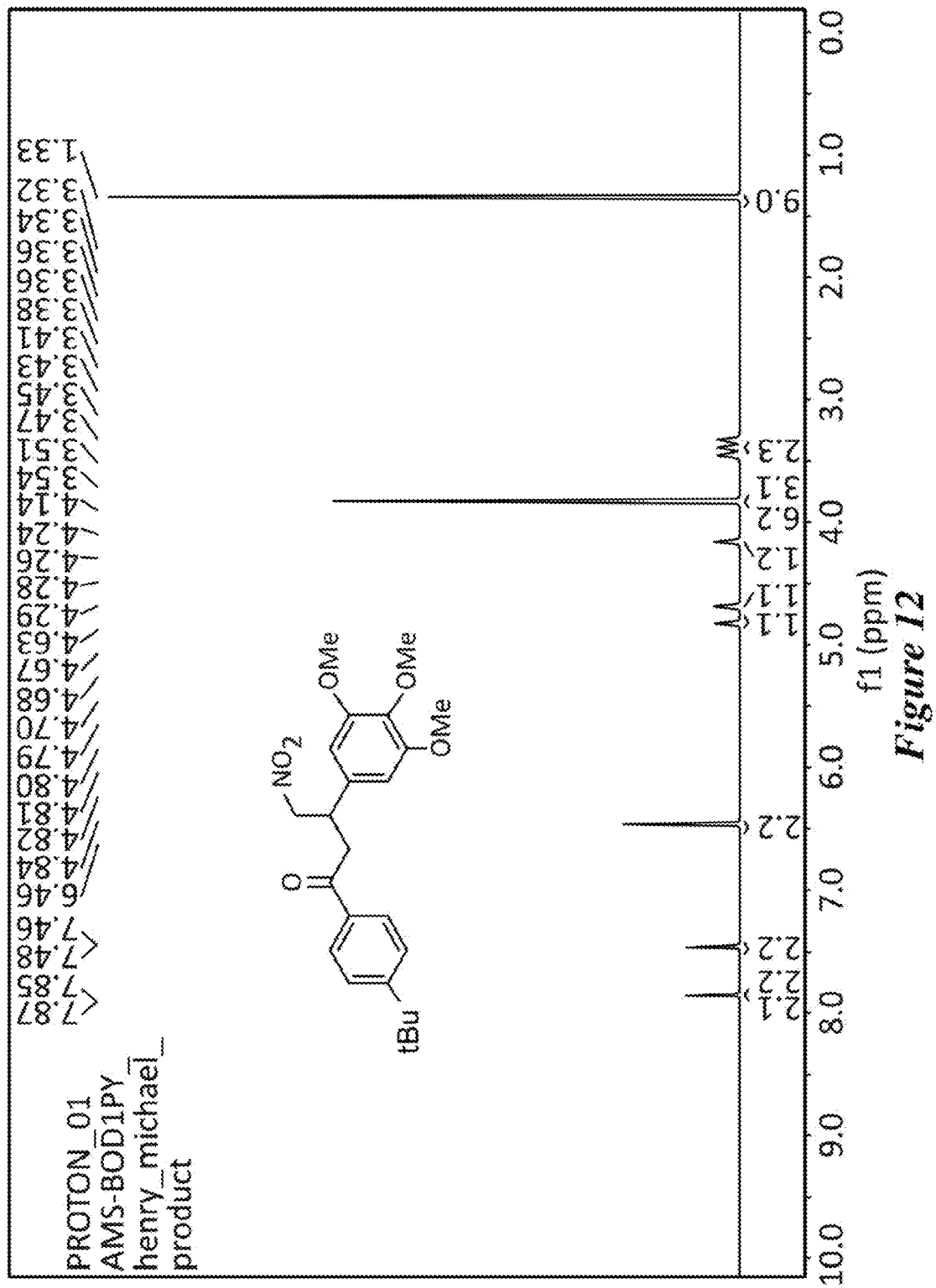
FIG. 12. $^1$H NMR of Henry-Michael intermediate in CDCl$_3$.

1-(4-(tert-butyl)phenyl)-4-nitro-3-(3,4,5-trimethoxyphenyl)butan-1-one (3). First, (E)-1-(4-(tert-butyl)phenyl)-3-(3,4,5-trimethoxyphenyl)prop-2-en-1-one (10.796 g, 1 Eq, 30.458 mmol), triethylamine (13 g, 18 mL, 4.2 Eq, 0.13 mol), and nitromethane (11 g, 10 mL, 6.1 Eq, 0.19 mol) were dissolved in 80 mL of MeOH. The reaction mixture was refluxed at 65° C. overnight. Next, the solvent was removed via rotavap and the crude solid product was recrystallized in MeOH to yield a white solid (12.035 g, 95%). $^1$H NMR (400 MHz, CDCl$_3$) δ 7.85-7.87 (d, J=8.8 Hz, 2H), 7.46-7.48 (d, J=8.8 Hz, 2H), 6.46 (s, 2H), 4.79-4.84 (dd, J=12.5, 6.6 Hz, 1H), 4.65-4.70 (dd, J=12.5, 8.1 Hz, 1H), 4.12-4.21 (m, 1H), 3.84 (s, 6H), 3.81 (s, 3H), 3.32-3.47 (qd, J=17.5, 6.9 Hz, 2H), 1.33 (s, 9H) (FIG. 12); $^{13}$C NMR (100 MHz, CDCl$_3$) δ 196.9, 157.6, 153.5, 137.5, 134.9, 133.9, 128.1, 125.8, 104.6, 79.5, 60.8, 56.2, 50.6, 41.6, 39.8, 35.2, 31.0; IR (ATR): 2959, 2841, 1681, 1592, 1545, 1513, 1462, 1427, 1406, 1378, 1358, 1321, 1272, 1251, 1236, 1159, 993, 826, 658 cm$^{-1}$; HRMS (EI): exact mass calculated for $C_{23}H_{29}NO_6$ [M+Na]$^+$ 438.1892, found 438.1894.

Figure 13:
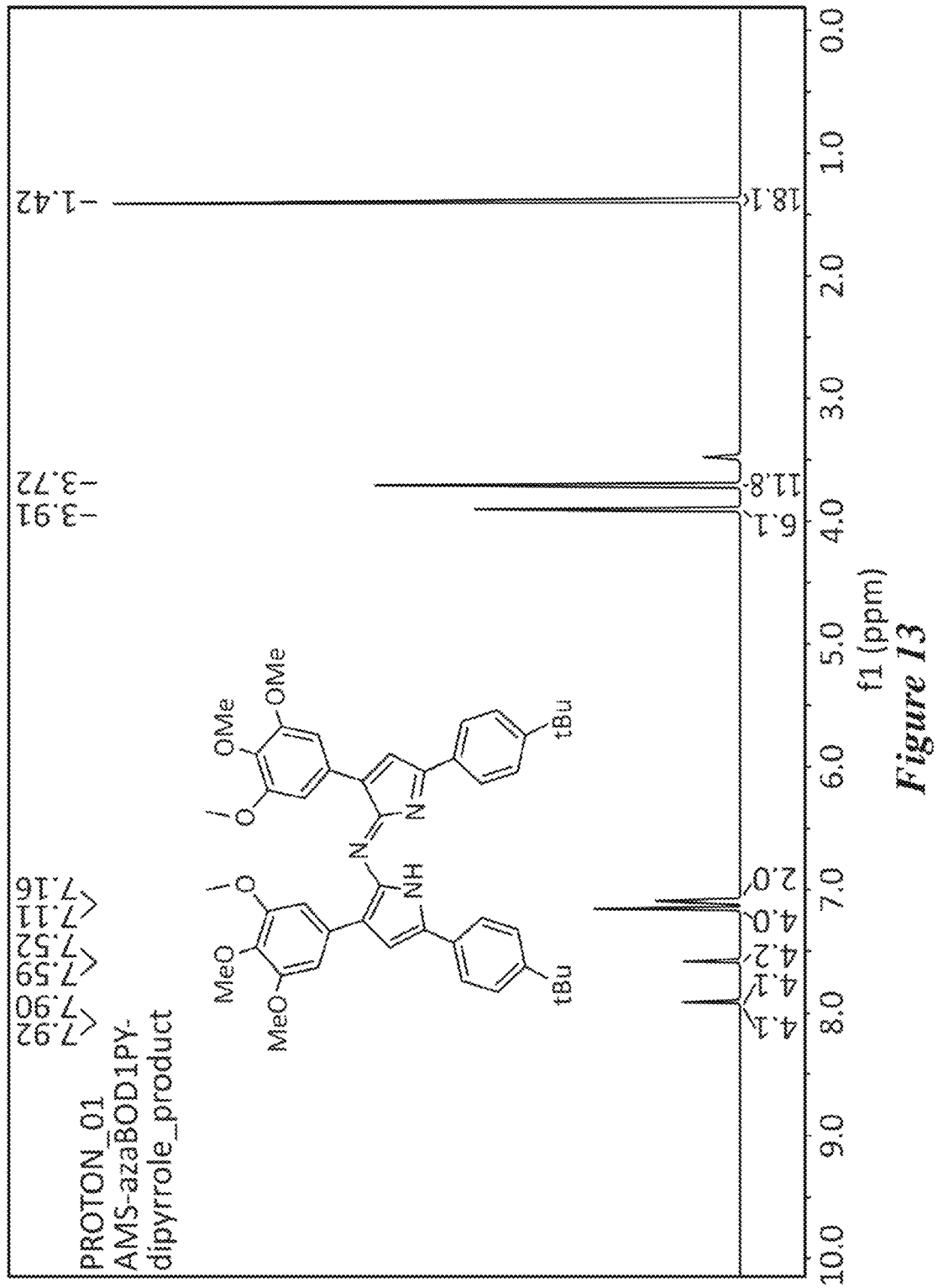
FIG. 13. $^1$H NMR of aza-dipyrrole Intermediate in CDCl$_3$.

(Z)-5-(4-(tert-butyl)phenyl)-N-(5-(4-(tert-butyl)phenyl)-3-(3,4,5-trimethoxyphenyl)-1H-pyrrol-2-yl)-3-(3,4,5-trimethoxyphenyl)-2H-pyrrol-2-imine (4). First, 1-(4-(tert-butyl)phenyl)-4-nitro-3-(3,4,5-trimethoxyphenyl)butan-1-one (2.00 g, 1 Eq, 4.81 mmol) and ammonium acetate (5.94 g, 16 Eq, 77.0 mmol) were dissolved in 100 mL of methanol and refluxed for 24 h. After cooling down to room temperature, the reaction mixture was filtered under vacuum to give a metallic dark black solid, which was washed with methanol followed by water to yield 422 mg (12%). $^1$H NMR (400 MHz, CDCl$_3$) δ 7.90-7.92 (d, J=8.5 Hz, 4H), 7.57-7.59 (d, J=8.5 Hz, 4H), 7.16 (s, 4H), 7.11 (s, 2H), 3.91 (s, 6H), 3.72 (s, 12H), 1.42 (s, 18H) (FIG. 13); $^{13}$C NMR (100 MHz, CDCl$_3$) δ 154.9, 153.8, 153.1, 149.4, 142.7, 138.1, 129.7, 129.4, 126.5, 126.3, 114.9, 106.4, 61.0, 56.0, 35.1, 31.3; IR (ATR): 2998, 2962, 2825, 1567, 1545, 1493, 1461, 1411, 1363, 1321, 1306, 1281, 1264, 1239, 1186, 1031, 796, 713, 650 cm$^{-1}$; HRMS (EI): exact mass calculated for $C_{46}H_{51}N_3O_6$[M+H]$^+$ 742.3856, found 742.3854.

Figure 14:
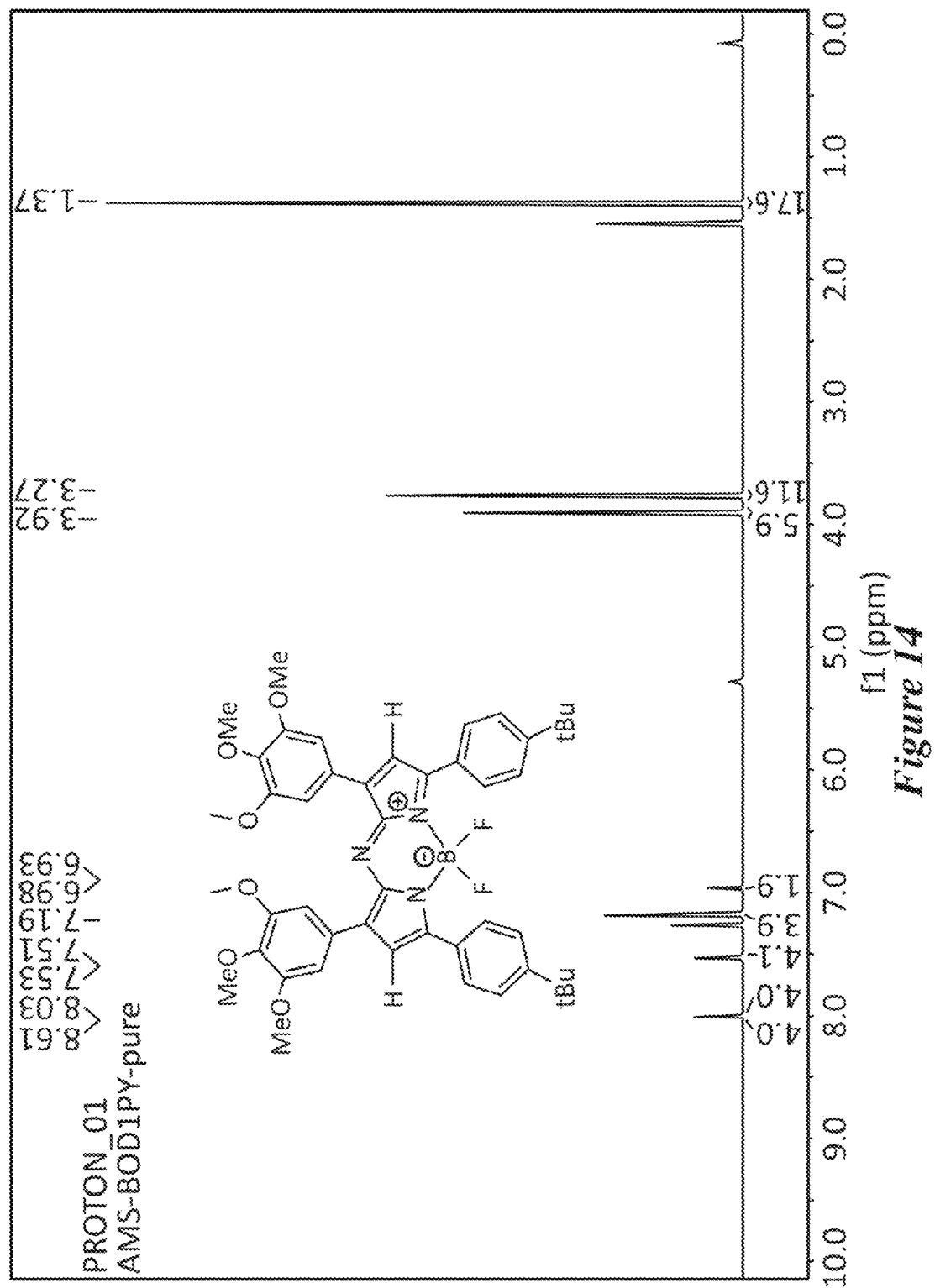
FIG. 14. $^1$H NMR of aza-H BODIPY in CDCl$_3$.

3,7-bis(4-(tert-butyl)phenyl)-5,5-difluoro-1,9-bis(3,4,5-trimethoxyphenyl)-5H-44,514-dipyrrolo[1,2-c:2',1'-f][1,3,5,2]triazaborinine (5). First, (Z)-5-(4-(tert-butyl)phenyl)-N-(5-(4-(tert-butyl)phenyl)-3-(3,4,5-trimethoxyphenyl)-1H-pyrrol-2-yl)-3-(3,4,5-trimethoxyphenyl)-2H-pyrrol-2-imine (250 mg, 1 Eq, 337 µmol) was dissolved in 20 mL of toluene in a 100 mL two neck round bottom flask under N$_2$. Triethylamine (6.82 g, 9.40 mL, 200 Eq, 67.4 mmol) was added to the reaction mixture followed by dropwise addition of boron trifluoride diethyl etherate (11.0 g, 9.56 mL, 230 Eq, 77.5 mmol). The reaction mixture was then heated to 70° C. for 2 hrs. The reaction was monitored via TLC (100% DCM) until completion. The solvent was then reduced via rotavap and the crude product was purified via column chromatography (100% DCM) to yield 252 mg (95%). $^1$H NMR (400 MHz, CDCl$_3$) δ 8.03-8.05 (d, J=8.9 Hz, 4H), 7.51-7.53 (d, J=8.8 Hz, 4H), 7.19 (s, 4H), 6.98 (s, 2H), 3.92 (s, 6H), 3.77 (s, 12H), 1.37 (s, 18H) (FIG. 14); $^{13}$C NMR (100 MHz, CDCl$_3$) δ 158.9, 154.6, 153.4, 145.6, 143.9, 139.6, 129.6, 128.8, 128.3, 125.9, 119.0, 106.8, 61.2, 56.1, 35.2, 31.3; IR (ATR): 2950, 2904, 2868, 2830, 1605, 1578, 1492, 1464, 1415, 1385, 1337, 1311, 1270, 1242, 1208, 1085, 1005, 810, 717 cm$^{-1}$; HRMS (EI): exact mass calculated for $C_{46}H_{50}BF_2N_3O_6$ [M+Na]$^+$ 812.3658, found 812.3666.

Figure 15:
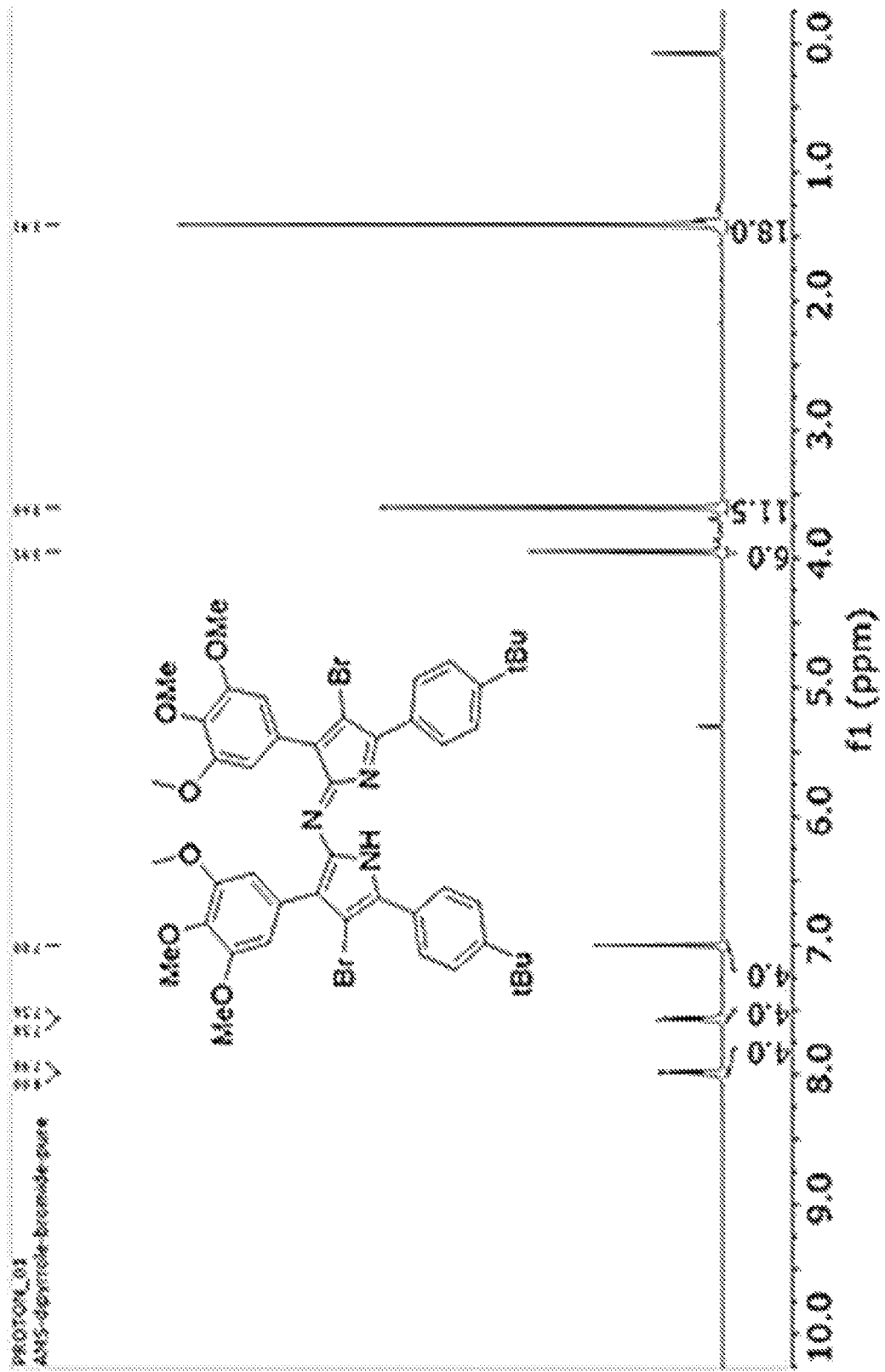
FIG. 15. $^1$H NMR of aza-Br-dipyrrole Intermediate in CDCl$_3$.

(Z)-4-bromo-N-(4-bromo-5-(4-(tert-butyl)phenyl)-3-(3,4,5-trimethoxyphenyl)-1H-pyrrol-2-yl)-5-(4-(tert-butyl)phenyl)-3-(3,4,5-trimethoxyphenyl)-2H-pyrrol-2-imine (6). First, (Z)-5-(4-(tert-butyl)phenyl)-N-(5-(4-(tert-butyl)phenyl)-3-(3,4,5-trimethoxyphenyl)-1H-pyrrol-2-yl)-3-(3,4,5-trimethoxyphenyl)-2H-pyrrol-2-imine (150 mg, 1 Eq, 202 µmol) was dissolved in 20 mL of dry DCM in a 100 mL two neck round bottom flask. Next, N-bromosuccinimide (72.0 mg, 2 Eq, 404 µmol) in 5 mL of dry DCM was added to the flask under $N_2$ at room temperature. The reaction was monitored via TLC (DCM) until completion. The crude reaction mixture was then washed with DI water (3×20 mL). The organic layer was then dried, volume reduced via rotavap, and purified via column chromatography (DCM) to yield 147 mg (81%). $^1$H NMR (400 MHz, CDCl$_3$) δ 7.98-8.00 (d, J=8.1 Hz, 4H), 7.56-7.58 (d, J=8.0 Hz, 4H), 7.00 (s, 4H), 3.95 (s, 6H), 3.60 (s, 12H), 1.41 (s, 18H) (FIG. 15); $^{13}$C NMR (100 MHz, CDCl$_3$) δ 153.9, 152.9, 152.4, 147.6, 140.4, 138.1, 128.9, 128.5, 127.1, 125.7, 108.3, 106.9, 60.8, 55.8, 35.0, 31.2; IR (ATR): 2956, 2902, 2866, 2829, 1578, 1546, 1498, 1451, 1411, 1322, 1260, 1230, 1186, 1161, 1122, 975, 877, 760, 666 cm$^{-1}$; HRMS (EI): exact mass calculated for $C_{46}H_{49}Br_2N_3O_6$ [M+H]$^+$ 898.2066, found 898.2056.

Figure 16:
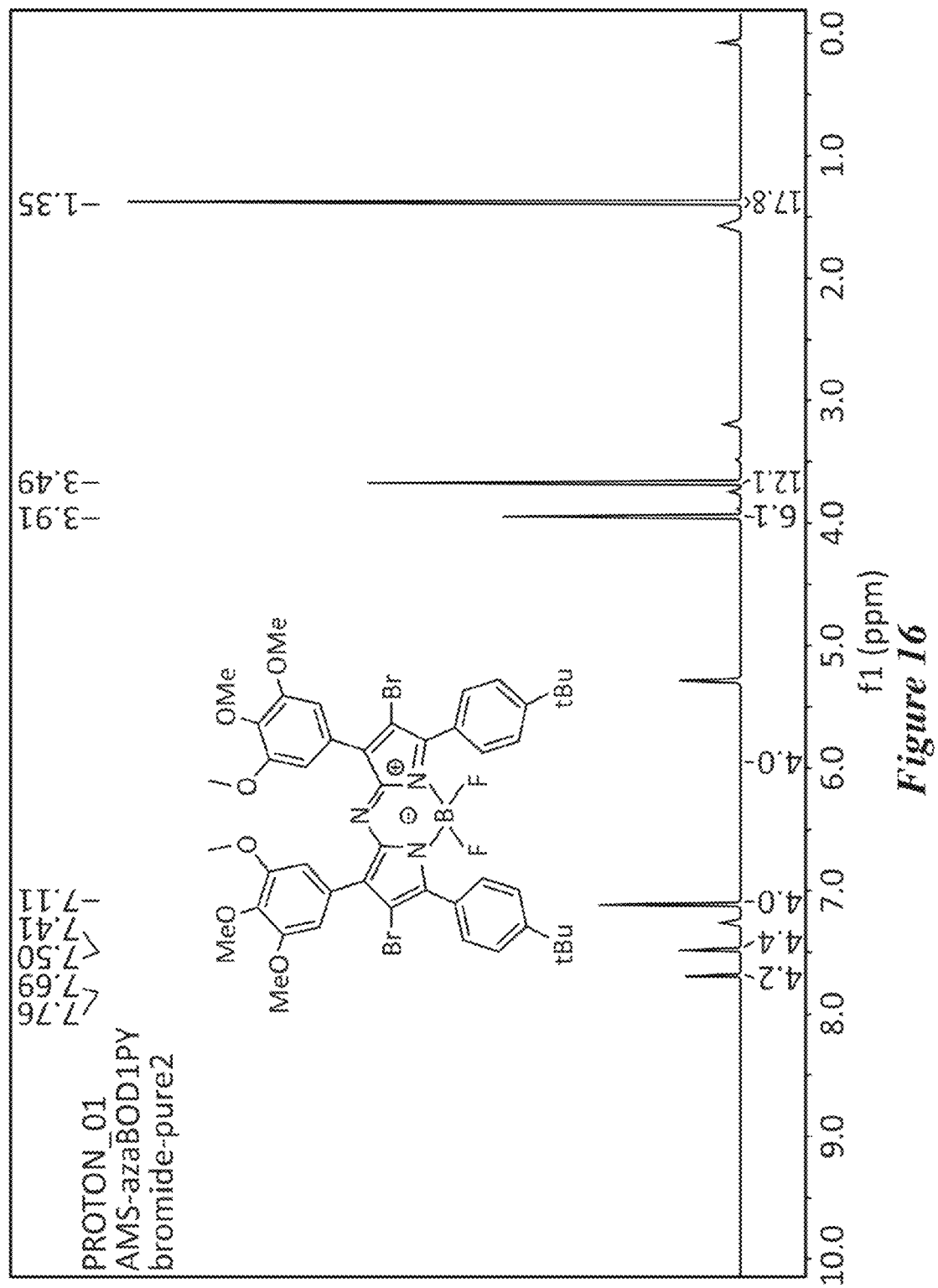
FIG. 16. $^1$H NMR of aza-Br BODIPY in CDCl$_3$.

2,8-dibromo-3,7-bis(4-(tert-butyl)phenyl)-5,5-difluoro-1,9-bis(3,4,5-trimethoxyphenyl)-5H-414,514-dipyrrolo[1,2-c:2',1'-f][1,3,5,2]triazaborinine (7). First, (Z)-4-bromo-N-(4-bromo-5-(4-(tert-butyl)phenyl)-3-(3,4,5-trimethoxyphenyl)-1H-pyrrol-2-yl)-5-(4-(tert-butyl)phenyl)-3-(3,4,5-trimethoxyphenyl)-2H-pyrrol-2-imine (250 mg, 1 Eq, 278 µmol) was dissolved in 20 mL of toluene in a 100 mL two neck round bottom flask under $N_2$. Triethylamine (5.62 g, 7.75 mL, 200 Eq, 55.6 mmol) was added to the reaction mixture followed by dropwise addition of boron trifluoride diethyl etherate (9.07 g, 7.89 mL, 230 Eq, 63.9 mmol). The reaction mixture was then heated to 70° C. for 2 hrs. The reaction was monitored via TLC (100% DCM) until completion. Then, the solvent was reduced via rotavap and the crude product was purified via column chromatography (100% DCM) to yield 214 mg (81%). $^1$H NMR (400 MHz, CDCl$_3$) δ 7.68-7.70 (d, J=8.4 Hz, 4H), 7.48-7.50 (d, J=8.5 Hz, 4H), 7.11 (s, 4H), 3.94 (s, 6H), 3.69 (s, 12H), 1.35 (s, 18H) (FIG. 16); $^{13}$C NMR (100 MHz, CDCl$_3$) δ 158.4, 154.3, 152.8, 144.2, 142.2, 139.6, 130.3, 126.6, 126.2, 125.1, 109.9, 108.5, 61.1, 56.1, 35.1, 31.3; IR (ATR): 2958, 2905, 2867, 2833, 1579, 1491, 1464, 1411, 1377, 1336, 1290, 1269, 1240, 1168, 1121, 1063, 1015, 837, 713 cm$^{-1}$; HRMS (EI): exact mass calculated for $C_{46}H_{48}BBr_2F_2N_3O_6$ [M+Na]$^+$ 968.1868, found 968.1868.

Figure 17:
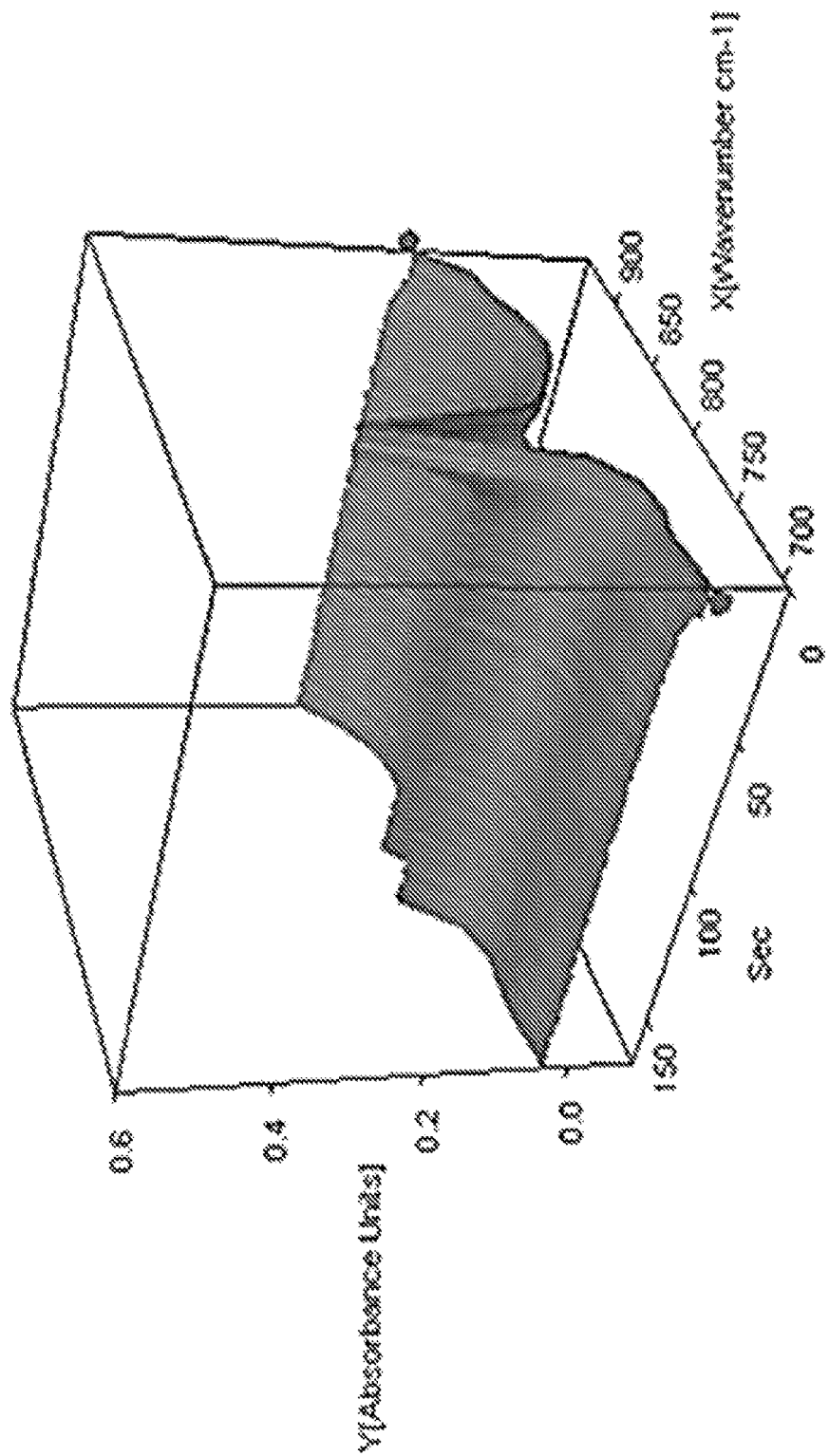
FIG. 17. Real-Time FTIR data of isobornyl acrylate photopolymerization using a 530 nm LED at 16 mW/cm$^2$ (resin formulation: 0.1 mol % Mes-I, 0.1 mol % Donor, 1.0 mol % Acceptor).
Figure 18:
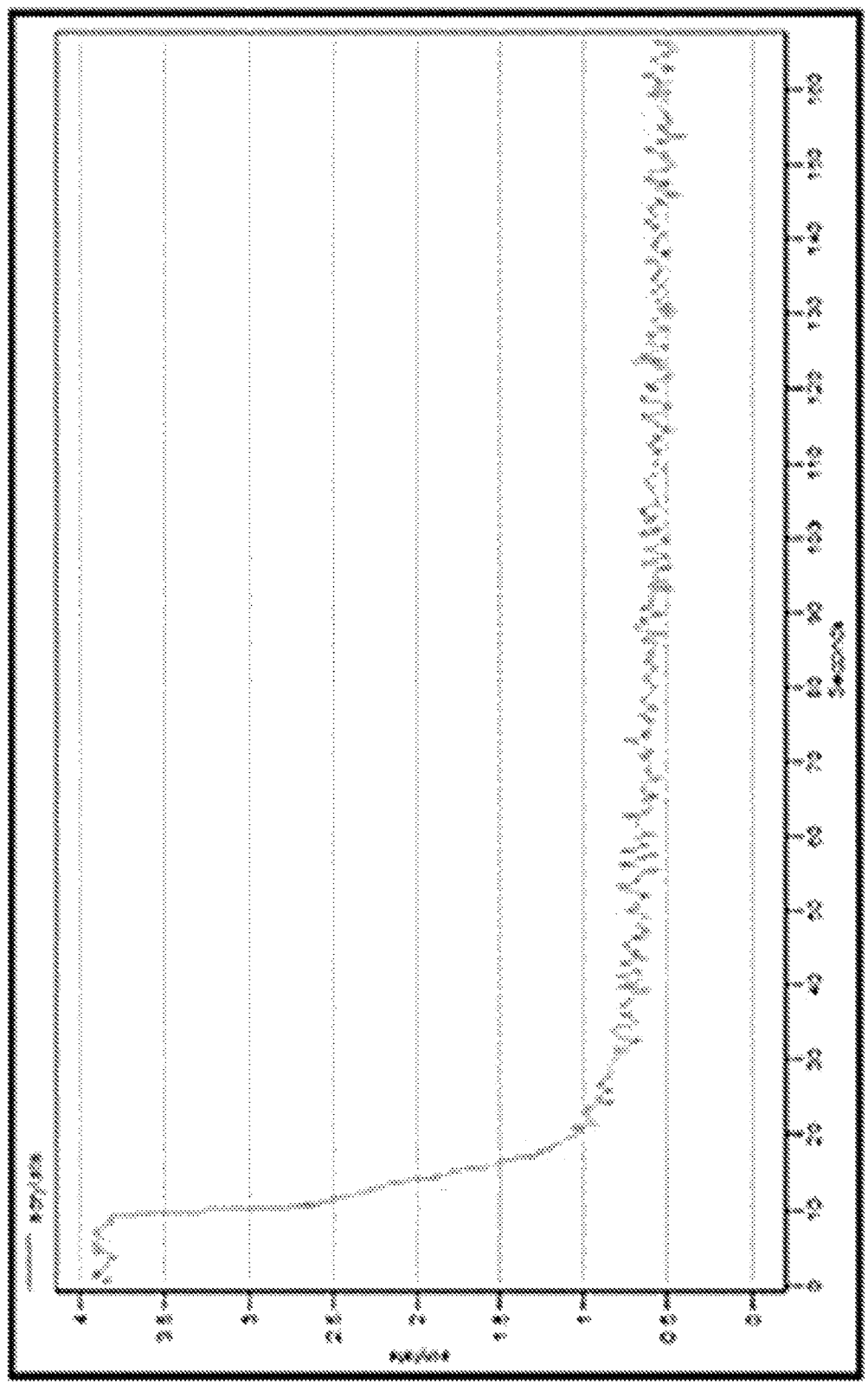
FIG. 18. Absorbance vs. Time Plot of isobornyl acrylate photopolymerization.

Photopolymerization at Different LED Intensities. The photopolymerizations were tested in triplicate at varying LED intensities with the 530, 656, and 740 nm LEDs utilizing the resin formulation: 0.1 mol % BODIPY, 0.1 mol % Borate V (donor), and 1.0 mol % Iodonium salt (acceptor) on the photoATR-FTIR. The components were fully dissolved in the monomer and subsequently degassed with nitrogen or argon (~3 min). The tip of an Air-Tite Hypodermic Needle: size 22G (gauge)×4 in. (length) was filled with the resin and dropped onto the center of the ATR crystal purged with nitrogen or argon for ~5 minutes prior to the measurement. Resolution was set at 2 cm$^{-1}$. Sample scanner velocity of 80 kHz was used and sample scan time was set at 50 scans. IR data was collected from 7000-400 cm$^{-1}$. Conversion data was determined by integrating the peak at 808 cm$^{-1}$ from 770-831 cm$^{-1}$ correlating to the C=C vinylic stretch on the acrylic monomers (Lovell et al. *Polym. Adv. Technol.* 2001, 12 (6), 335-345) (FIG. 17 and FIG. 18). Polymerization rates were calculated from the initial slopes of the data after the LED was turned on and polymerization was observed. LEDs were turned on after 10 seconds.

Figure 19:
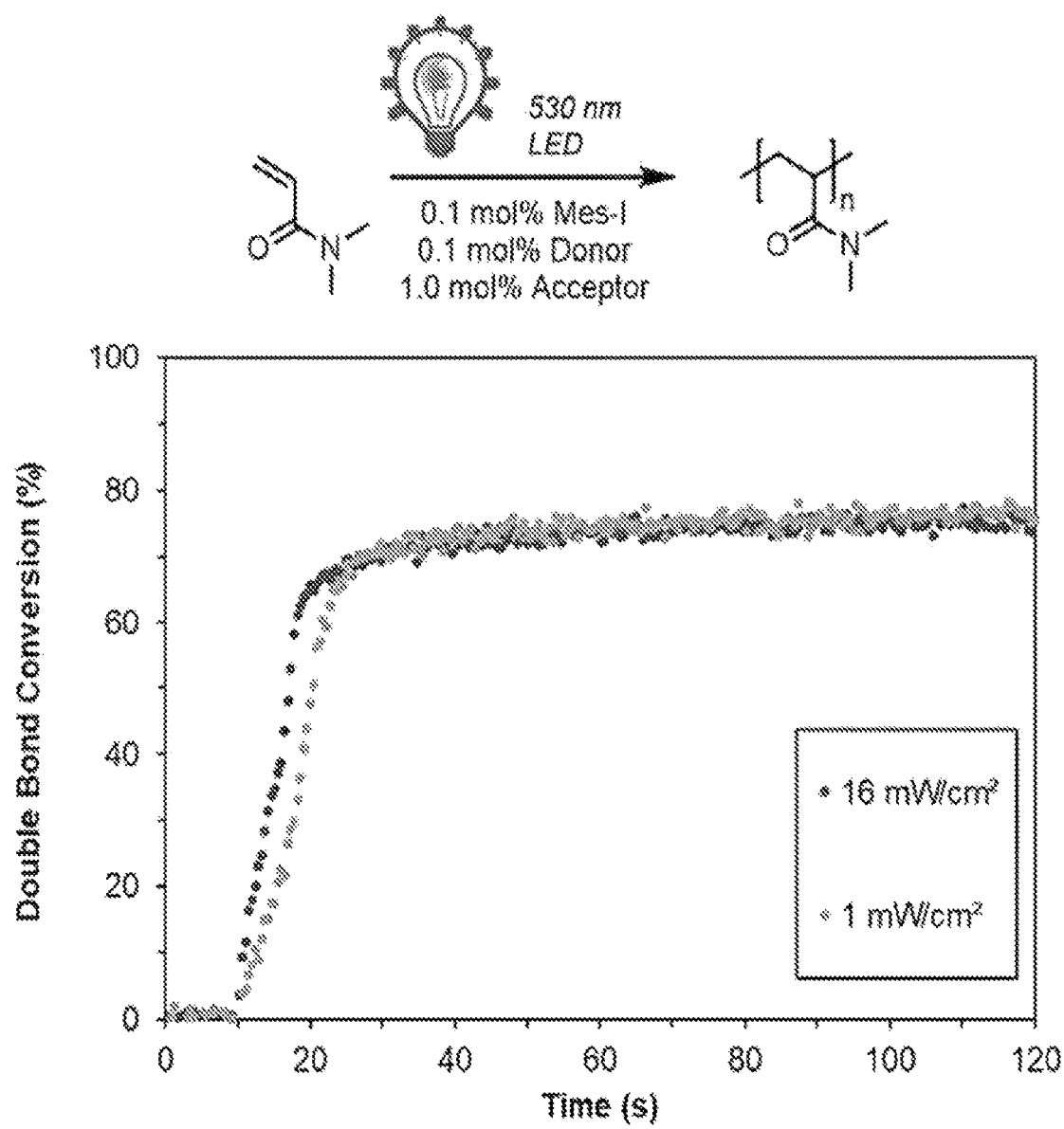
FIG. 19. DMA photopolymerization with Mes-I BODIPY using resin formulation: 0.1 mol % BODIPY, 0.1 mol % Borate V (Donor), and 1.0 mol % H-Nu 254 (Acceptor). Irradiated with a 530 nm LED at 16 mW/cm$^2$ (Polymerization Rate: 5.7±0.2% Conv/s) and 1 mW/cm$^2$ (Polymerization Rate: 3.1±0.4% Conv/s).

BODIPY Thin-Film Absorption. The absorption data for the BODIPY dyes was measured in the resin formulation: 0.1 mol % BODIPY, 0.1 mol % Borate V (Donor), and 1.0 mol % H-Nu 254 (Acceptor) in order to more accurately represent the conditions used during photopolymerization measurements (FIG. 19). Due to the high extinction coefficient of BODIPYs, the samples were taken at different thicknesses ranging from 13-100 µm utilizing the Ocean Optics Stage RTL-T to acquire absorption data within the limits of Beer's Law at the max emission for each corresponding LED. The extinction coefficient values calculated from this data was utilized to normalize the number of photons absorbed between the different BODIPY samples (see "normalizing photons absorbed" section for more details).

Figure 20:
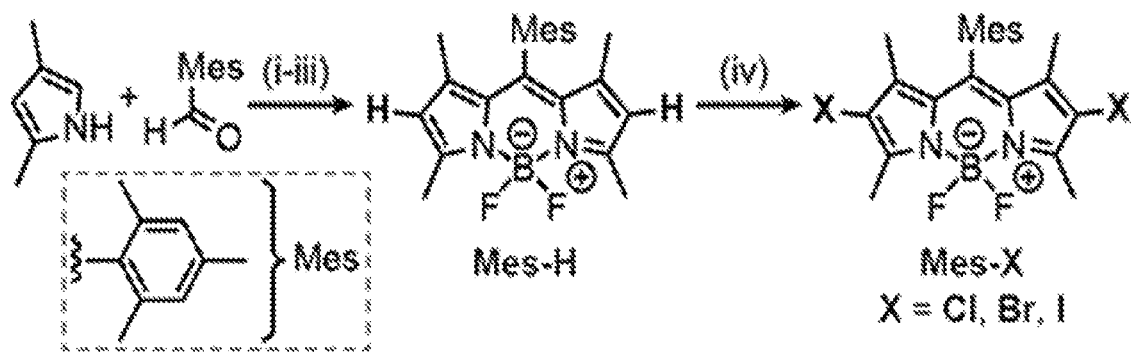
FIG. 20. Synthetic procedure for synthesizing mesityl functionalized BODIPY dyes, showing modularity in obtaining four different derivatives. Reagents and conditions: (i) trifluoroacetic acid (TFA), dichloromethane (DCM), 3 hrs.; (ii) 2,3-dichloro-5,6-dicyano-p-benzoquinone (DDQ), 1 hr.; (iii) triethylamine (NEt$_3$), boron trifluoride diethyl etherate (BF$_3$·OEt$_2$), 2 hrs. 65%; (iv) 1-Chloropyrrolidine-2,5-dione (NCS), DCM (58%) (X=Cl); N-bromosuccinimide (NBS), DCM (50%) (X=Br); N-iodosuccinimide (NIS), DCM:MeOH (65%) (X=I).
Figure 21:
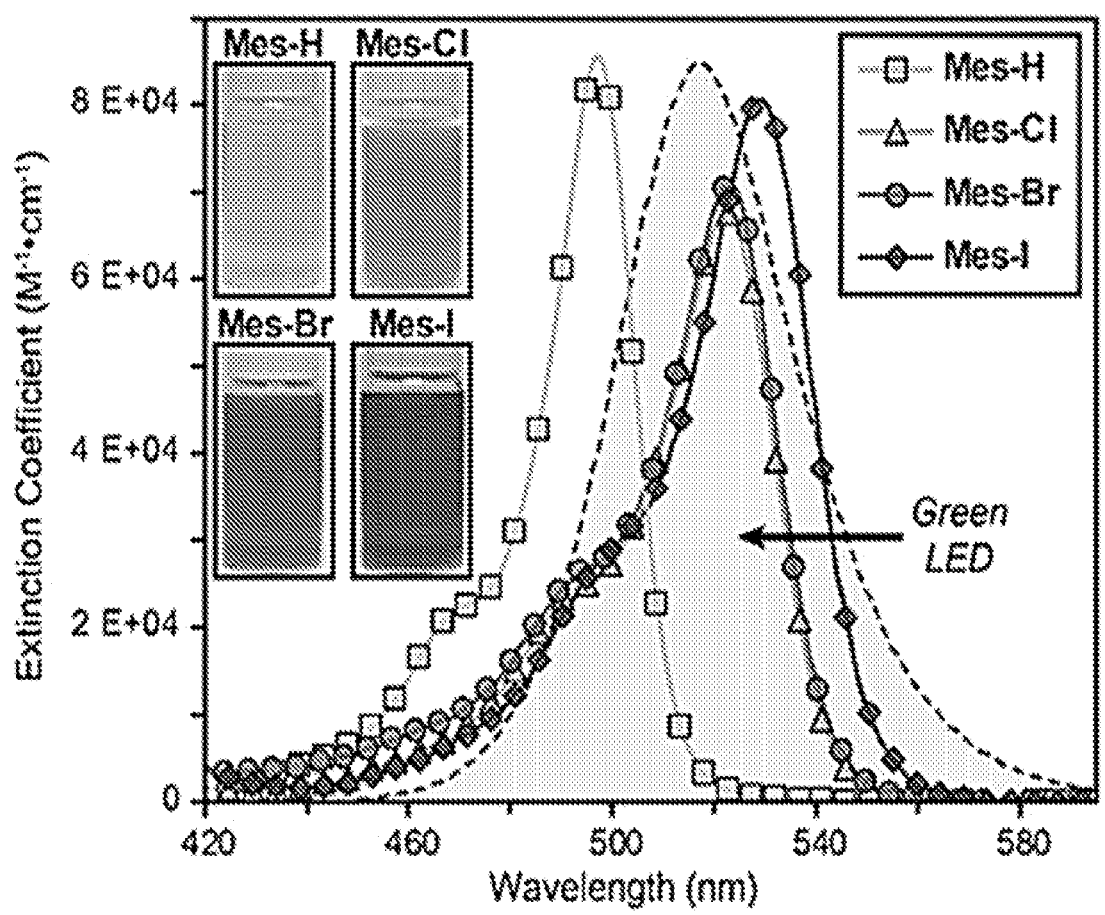
FIG. 21. UV-vis absorption spectroscopy of mesityl functionalized BODIPY dyes (5-10 µM in acetonitrile). A normalized green LED emission profile is underlaid with the UV-vis absorption spectra, showing good overlap. Inset—photographs of each mes-X BODIPY derivative in solution showing distinct colors.
Figure 22:
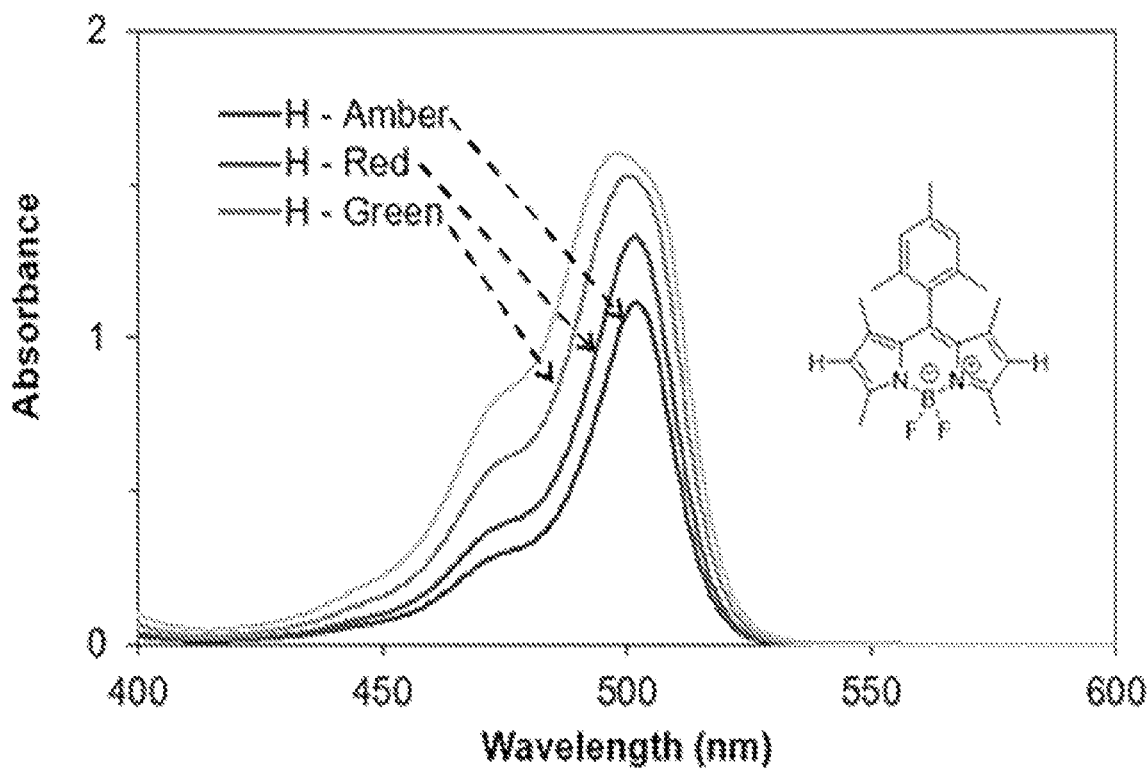
FIG. 22. UV-Vis absorption spectra for Mes-H.
Figure 23:
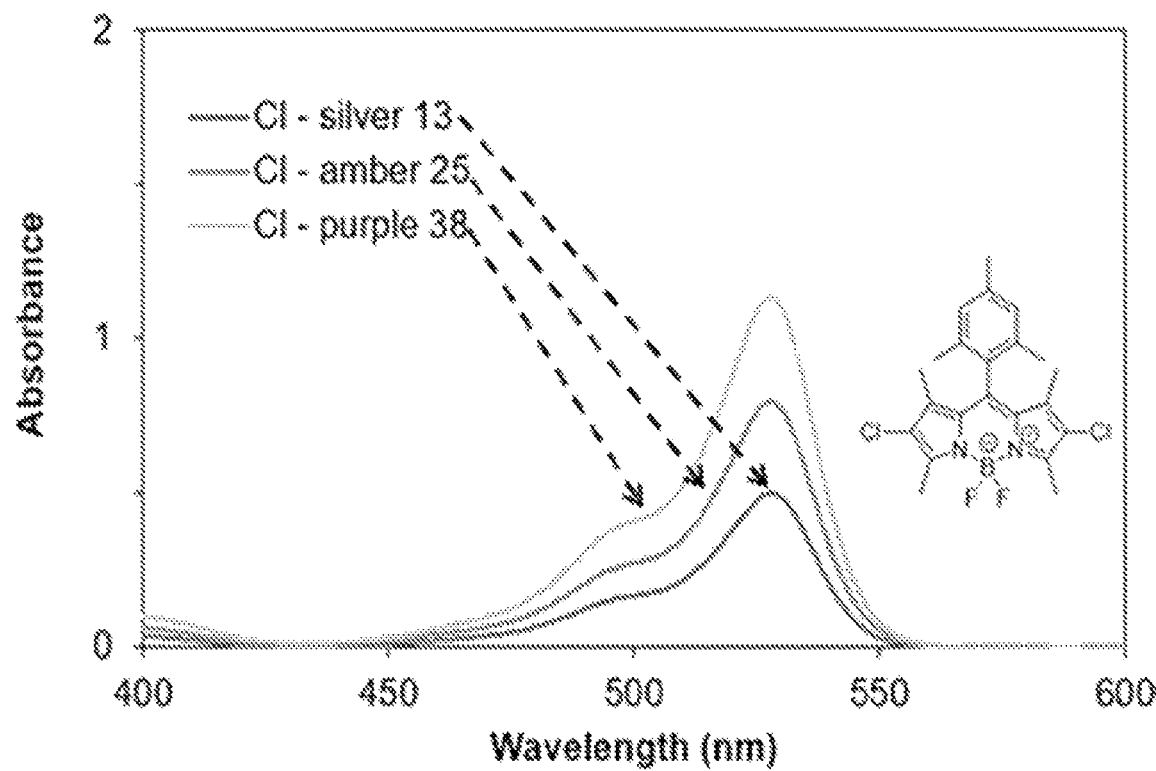
FIG. 23. UV-Vis absorption spectra for Mes-Cl.
Figure 24:
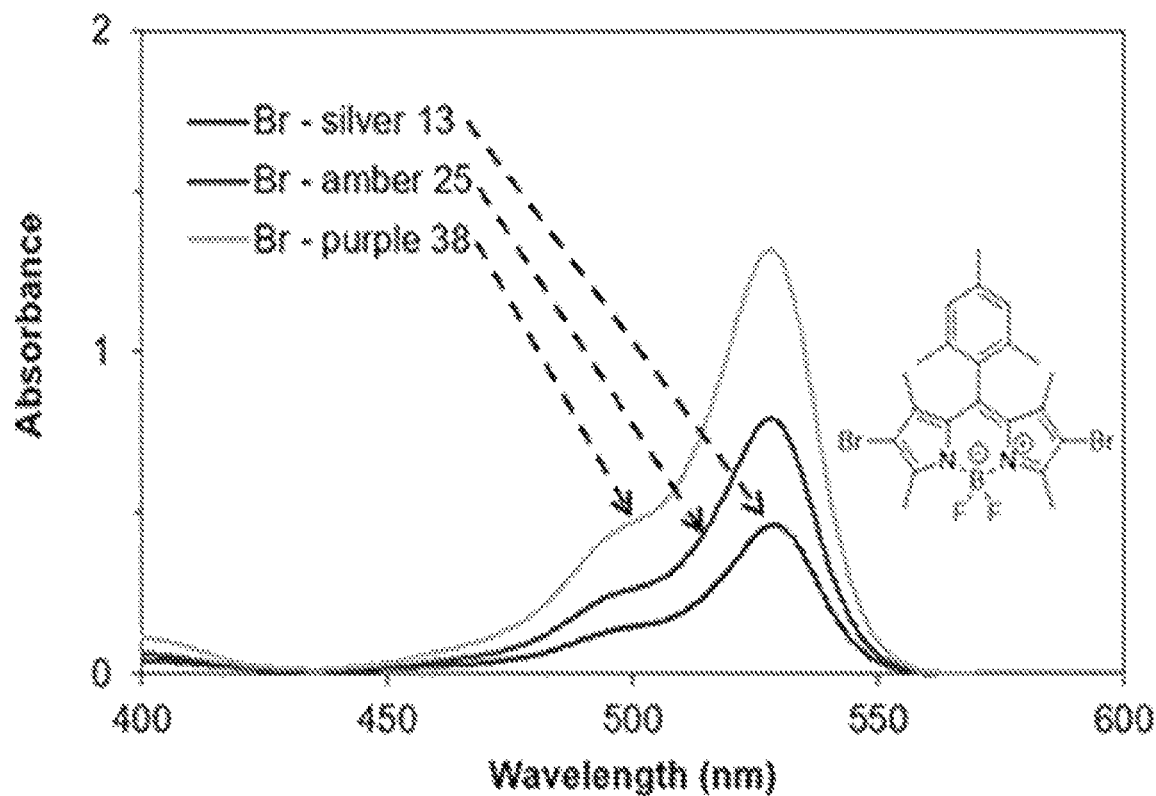
FIG. 24. UV-Vis absorption spectra for Mes-Br.
Figure 25:
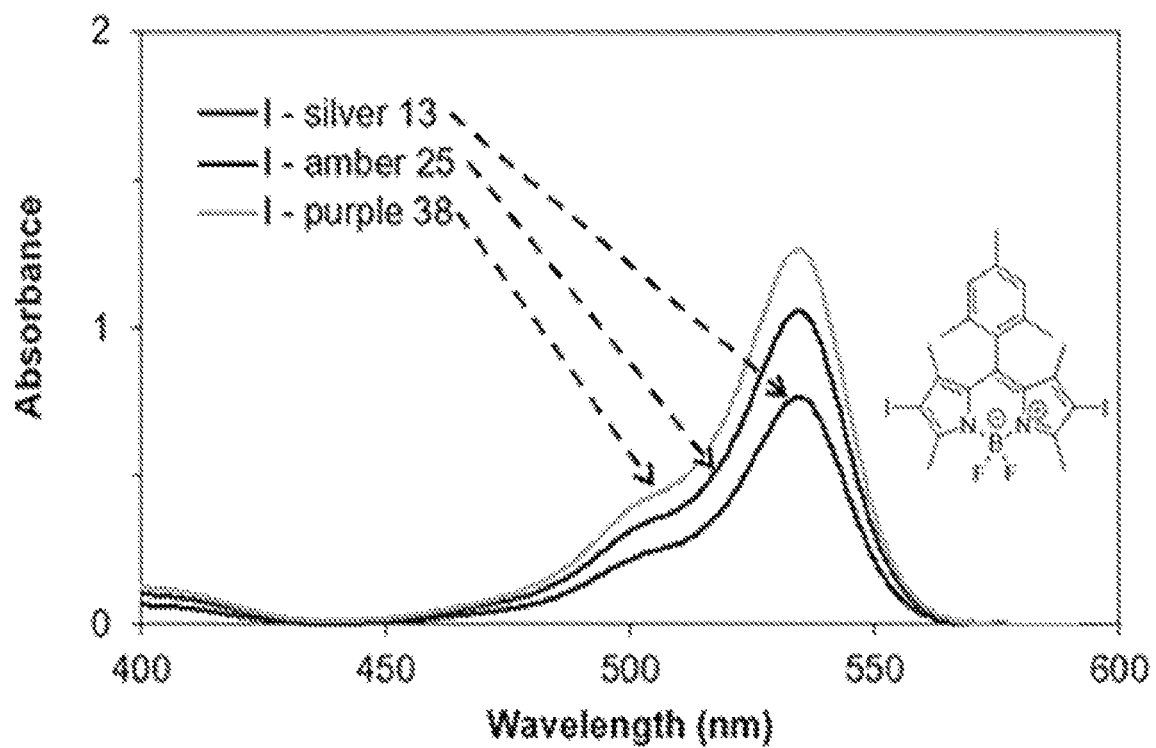
FIG. 25. UV-Vis absorption spectra for Mes-I.

Results and Discussion. The first set of BODIPY dyes were synthesized to contain a mesityl group at the bridgehead position along with 4 methyl substitutions on the periphery (Scheme 1), providing both solubility and stability against nucleophilic attack (Boens N et al. *Coord. Chem. Rev.* 2019, 399, 213024). As shown in FIG. 20 and Scheme 1, the synthesis of the hydrogen functionalized derivative (Mes-H) was accomplished via reductive coupling between commercially available 2,4-dimethylpyrrole and mesitaldehyde in a facile one pot approach (Wang X F et al. *Org. Biomol. Chem.* 2016, 14 (29), 7028-7037). The resulting modular Mes-H derivative served as a framework to study the heavy atom effect with respect to photopolymer catalysis. Subsequent halogenation of Mes-H with the respective N-halosuccinimide derivative yielded the desired chloro-(Mes-Cl), bromo- (Mes-Br), and iodo-(Mes-I) substituted BODIPY dyes (Scheme 1). Upon isolation it was immediately apparent to the eye that each compound had a distinct color in solution, ranging from green to deep red (FIG. 21, inset).

To quantitatively compare the photocatalytic activity between the different BODIPY derivatives, their optical properties (e.g., absorption profiles and corresponding extinction coefficients) were first characterized. UV-vis absorption spectroscopy in dilute solution revealed that halogenation resulted in a ~30 nm red-shift of the peak absorption wavelength ($\lambda_{max}$) (FIG. 21). Specifically, the $\lambda_{max}$ values were 497, 523, 523, and 529 nm for Mes-H, —Cl, —Br, and —I derivatives, respectively (Table 1). Extinction coefficients were determined using Beer's law with a calibration curve generated from solutions containing different concentrations of each Mes-X BODIPY derivative (X=H, Cl, Br, I) (FIG. 22, FIG. 23, FIG. 24, FIG. 25). As is typical for BODIPY's, the extinction coefficients at $\lambda_{max}$ were quite high, ranging from ~67,000-86,000 M$^{-1}$ cm$^{-1}$ (Table 1). The strong absorption cross section with respect to the green LED, shown in FIG. 21, for the present Mes-X BODIPY derivatives is beneficial for photopolymers as it can facilitate the use of lower catalyst loadings and/or light intensities.

photon flux from a calibrated green LED after integrating the area of overlap between the absorption profile for each BODIPY derivative with the emission profile of the LED

TABLE 1

Optoelectronic properties of the photosystem components.

| Compound | $\lambda_{max}$ (nm) | $\varepsilon$ ($\times 10^4$ M$^{-1}$ cm$^{-1}$) | Polym. Rate (M/s) | Quantum Yield | HOMO (eV)† | LUMO (eV)† | $\tau_{ISC}$ (ns) | Triplet Yield | Triplet Lifetime (ns) |
|---|---|---|---|---|---|---|---|---|---|
| Mes-H | 497 | 8.6 ± 0.2 | 0.24 ± 0.02 | 0.94 ± 0.06 | −5.64 (−5.42) | −3.16 (−3.06) | | | 1.6‡ |
| Mes-Cl | 523 | 6.7 ± 0.2 | 0.43 ± 0.03 | 0.70 ± 0.05 | −5.81 (−5.59) | −3.41 (−3.25) | 7.8 | 0.17 | 370 |
| Mes-Br | 523 | 6.9 ± 0.3 | 0.91 ± 0.02 | 0.19 ± 0.02 | −5.81 (−5.60) | −3.41 (−3.23) | 2.9 | 0.35 | 370 |
| Mes-I | 529 | 7.9 ± 0.3 | 0.95 ± 0.03 | 0.03 ± 0.01 | −5.71 (−5.54) | −3.48 (−3.29) | 0.2 | 0.88 | 370 |
| Aza-H | ~675 | | 0.08 ± 0.02 | | −5.57 | −3.96 | | | |
| Aza-Br | ~660 | | 0.66 ± 0.03 | | −5.97 | −4.03 | | | |
| Donor | | | | | −5.14 | | | | |
| Acceptor | | | | | | −3.51 | | | |

Figure 26:
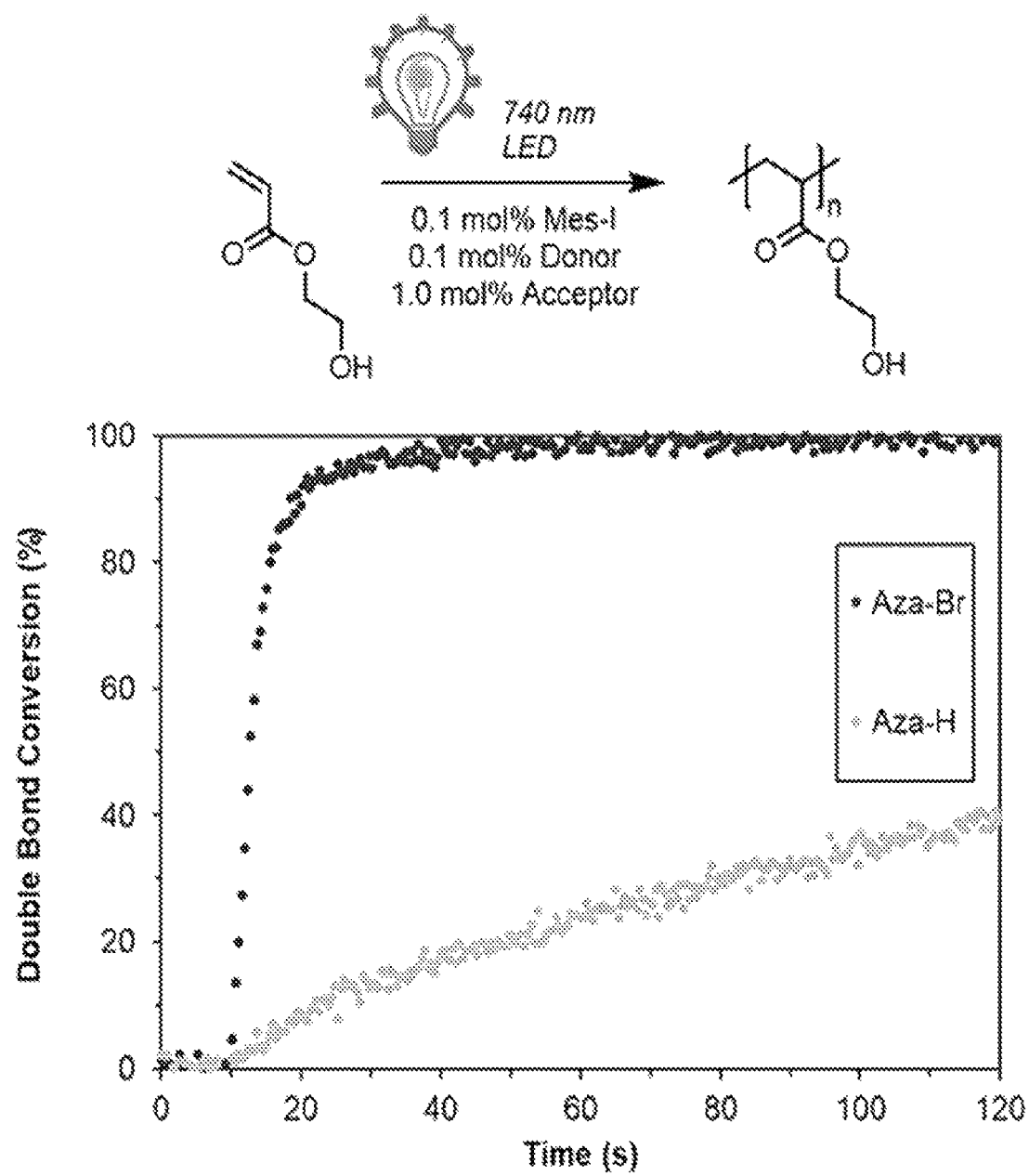
FIG. 26. HEA photopolymerization with aza-H & aza-Br using resin formulation: 0.1 mol % BODIPY, 0.1 mol % Borate V (Donor) and 1.0 mol % H-Nu 254 (Acceptor). Irradiated with a 740 nm LED at 16 mW/cm$^2$. Aza-H (Polymerization Rate: 1.2±0.1% Conv/s) Aza-Br (Polymerization Rate: 16.2±1.1% Conv/s).
Figure 27:
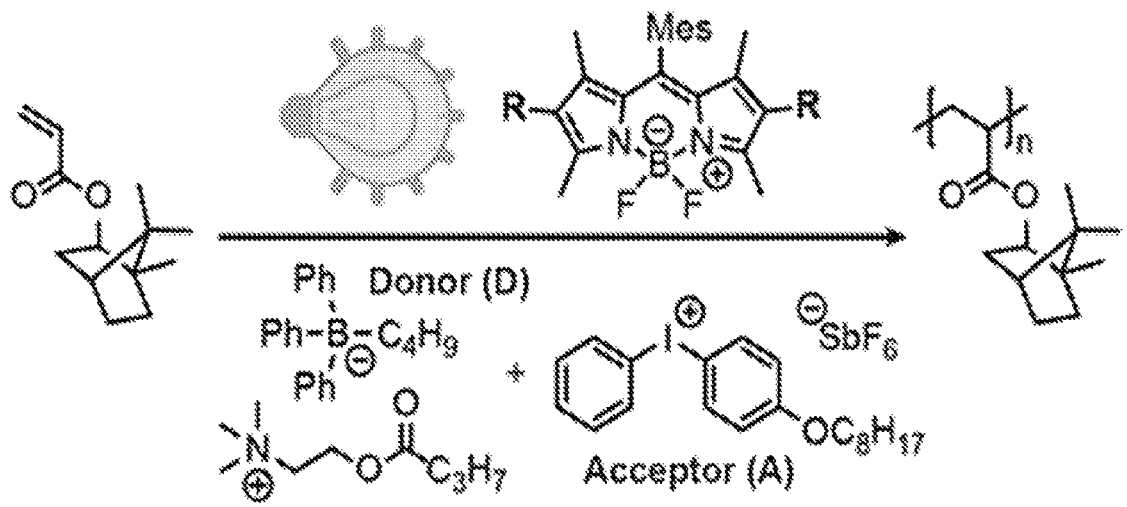
FIG. 27. Chemical structures for the different components within the resin formulation: isobornyl acrylate as monomer, butyltriphenylborate salt as donor, and diphenyl iodonium as acceptor.
Figure 28:
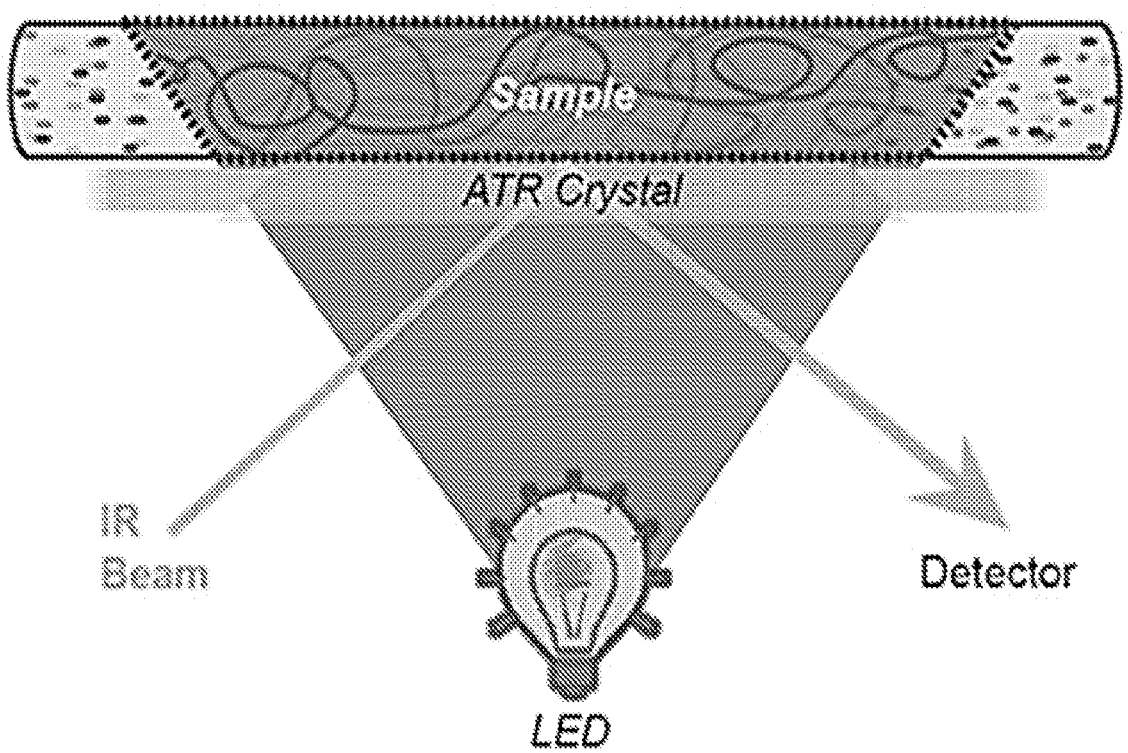
FIG. 28. Schematic illustration for custom real time ATR-FTIR setup with bottom-up irradiation.

†Values in parentheses are computed energy levels using a def2-tzvp basis set and cam-b3lyp functional
‡Singlet lifetime After isolating the four BODIPY derivatives, their utility as photosensitizers to induce polymerization was evaluated. The polymerizations were carried out using neat isobornyl acrylate as the monomer, selected for its low volatility and commercial viability. As testament to the versatility of the present photosystem, 2-hydroxy ethyl acrylate and N·N-dimethyl acrylamide were also examined and provided similar photopolymerization results to those described below with isobornyl acrylate (FIG. 26). The initiator concentrations used were akin to those reported by Lalevée and coworkers (Telitel S et al. *Macromolecules* 2012, 45 (17), 6864-6868), however reported as mol % in lieu of wt % for direct comparison. Specifically, 0.1 mol % of the BODIPY photosensitizer, 0.1 mol % of the donor (D) initiator 2-(butyryloxy)-N,N,N-trimethylethan-1-aminium butyltriphenylborate, and 1.0 mol % of the acceptor (A) initiator [4-(octyloxy)phenyl](phenyl)iodonium hexafluoroantimonate diphenyliodonium, were fully dissolved in the monomer (FIG. 27). Degassing the mixture with inert gas, e.g., nitrogen or argon, followed by irradiation with a green LED resulted in rapid polymerization, evident by solidification in less than one minute. To quantitatively characterize this polymerization process, a method to monitor reaction kinetics was developed using FTIR spectroscopy. A schematic representation of the attenuated total reflectance (ATR) FTIR setup is shown in FIG. 28. LED and IR irradiation occur from the same face of the ATR crystal (bottom-up). This setup enables precise kinetics data to be rapidly collected for opaque photochemical transformations by providing uniform irradiation and shallow sample measurements. Within the Mid-IR region the depth of measurement ranges from ~0.5-5 μm, depending on the spectral position of the absorption signal. For acrylic polymerizations, the disappearance of the C=C vinylic stretch at 808 cm$^{-1}$ was monitored and used to determine percent double bond conversion, corresponding to a sampling depth of 2.5 μm. Simple glassware was made to encase the sample and purge its surrounding atmosphere with inert gas (e.g., nitrogen) to eliminate oxygen inhibition of the radical polymerization. To directly compare photocuring efficiency between different Mes-X BODIPY dyes which have distinct absorption profiles, the number of photons absorbed by each sample had to be normalized. This was accomplished by varying the (FIG. 21). For example, Mes-H has the smallest absorption cross section with the green LED emission compared to the halogenated BODIPY's, which was compensated by using a 2.2-2.3 times higher photon flux (i.e., light intensity) to equate the number of photons absorbed.

Figure 29:
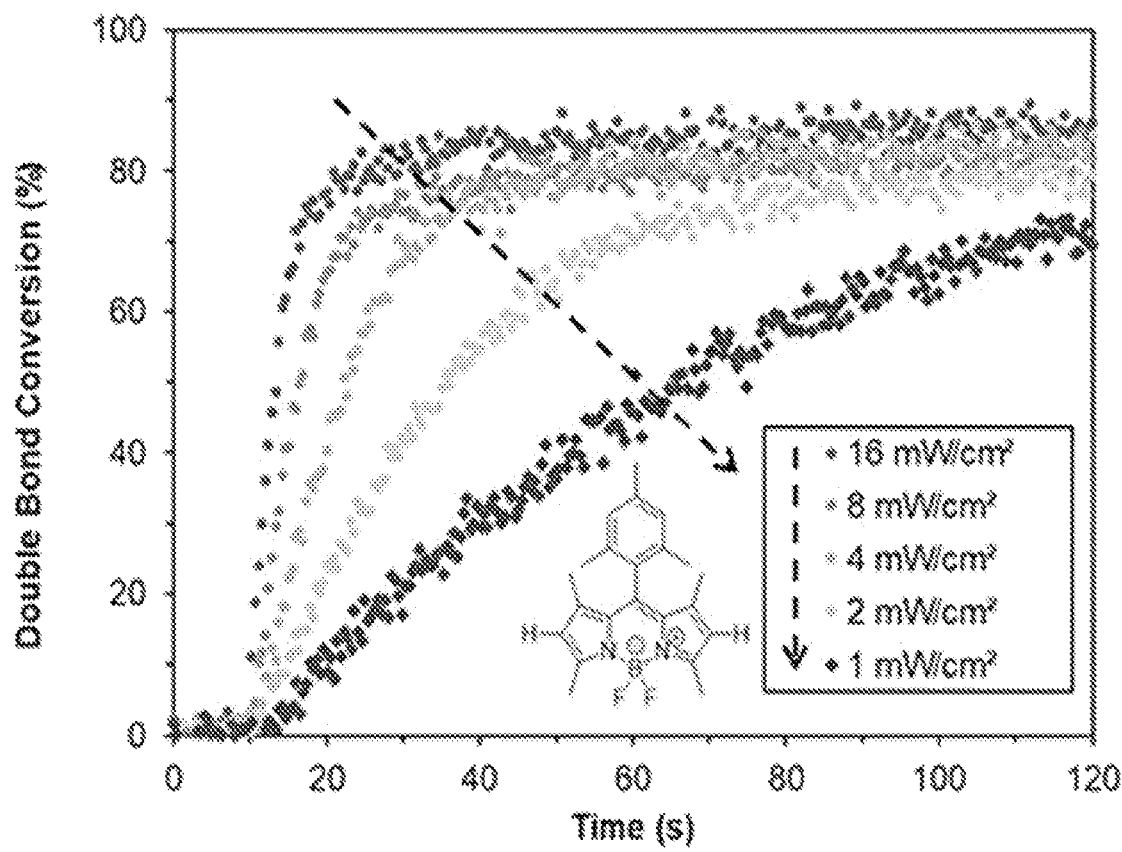
FIG. 29. Percent double bond conversion vs time ATR-FTIR data at various intensities with the 530 nm LED for photopolymerization with Mes-H.
Figure 30:
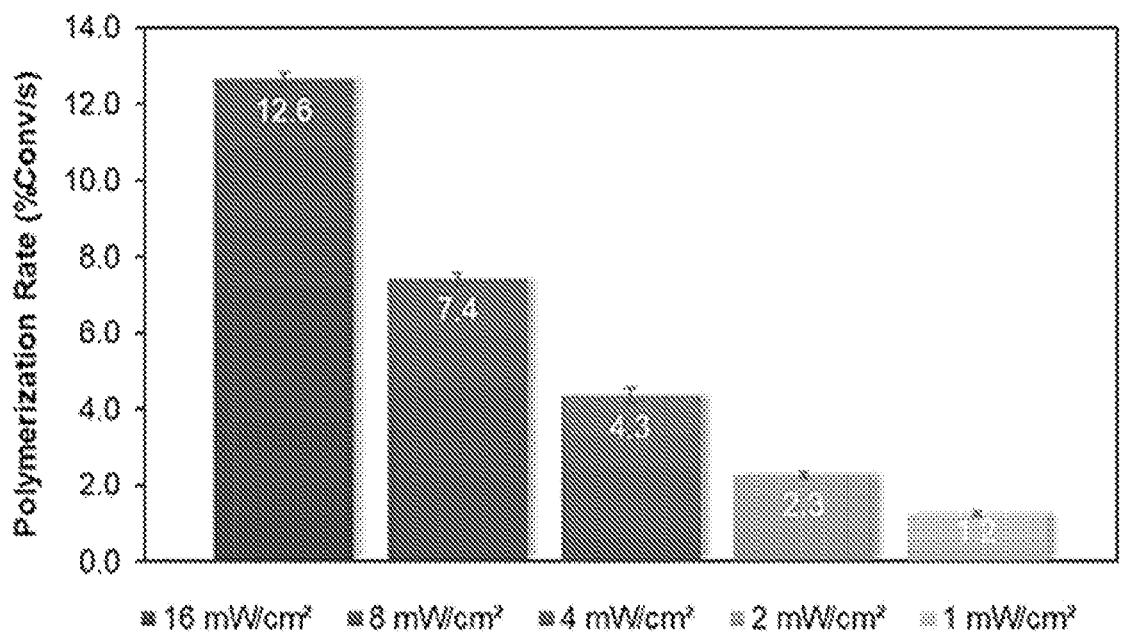
FIG. 30. Data from FIG. 29 plotted as rate of photopolymerization in % conversion/second for Mes-H using various intensities of the 530 nm LED.
Figure 31:
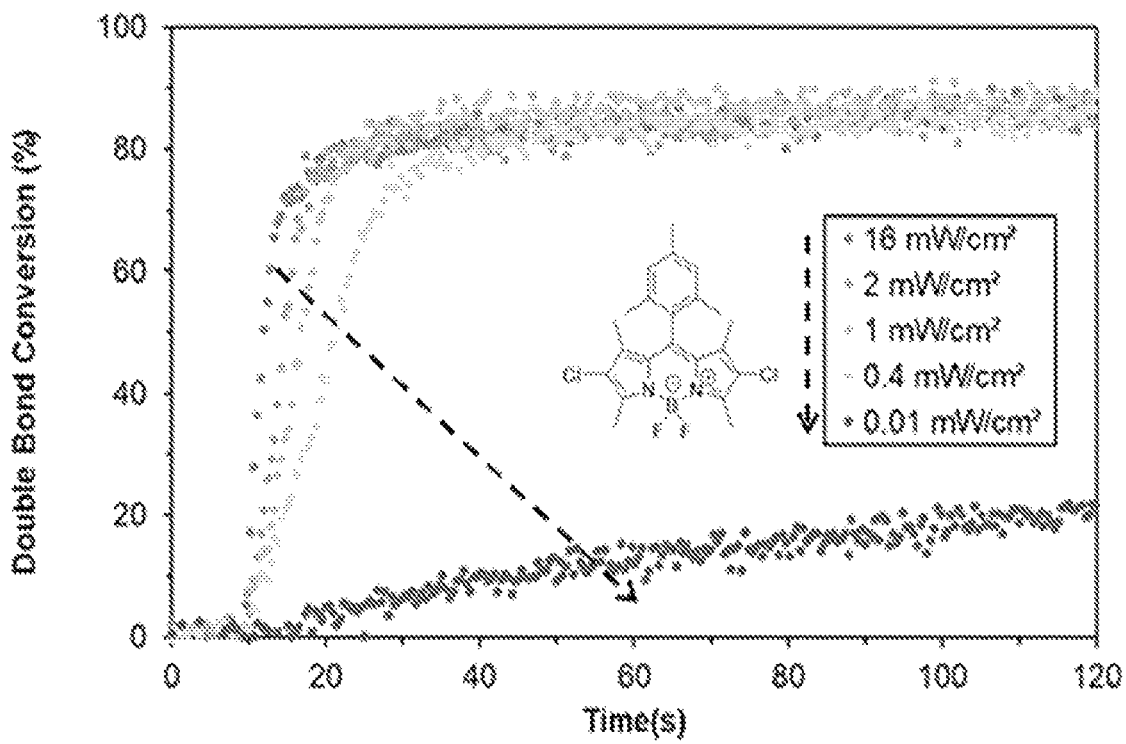
FIG. 31. Percent double bond conversion vs time ATR-FTIR data at various intensities of the 530 nm LED for photopolymerization with Mes-Cl.
Figure 32:
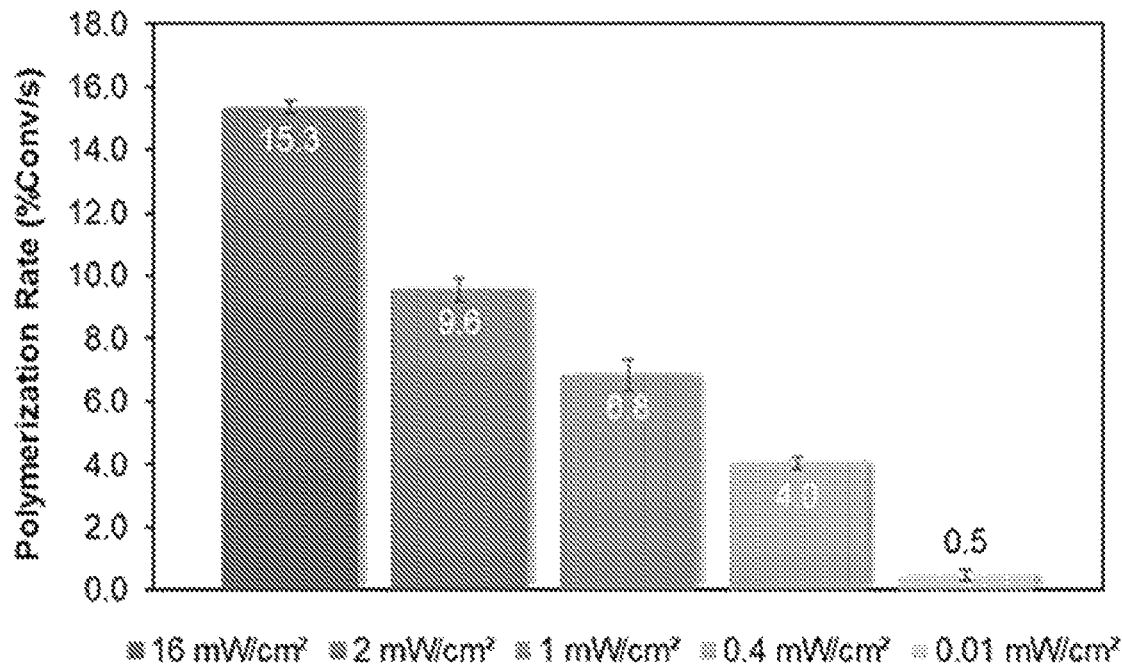
FIG. 32. Data from FIG. 31 plotted as rate of photopolymerization in % conversion/second for Mes-Cl using various intensities of the 530 nm LED.
Figure 33:
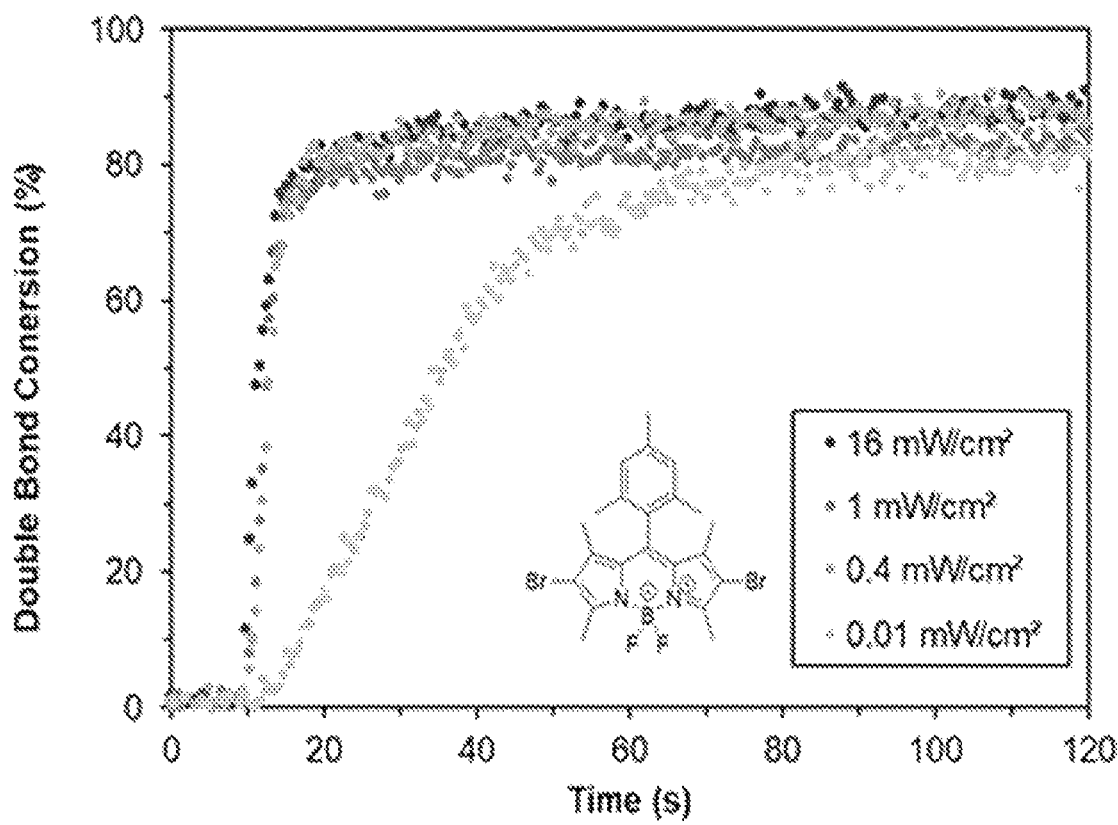
FIG. 33. Percent double bond conversion vs time ATR-FTIR data using various intensities of the 530 nm LED for photopolymerization with Mes-Br.
Figure 34:
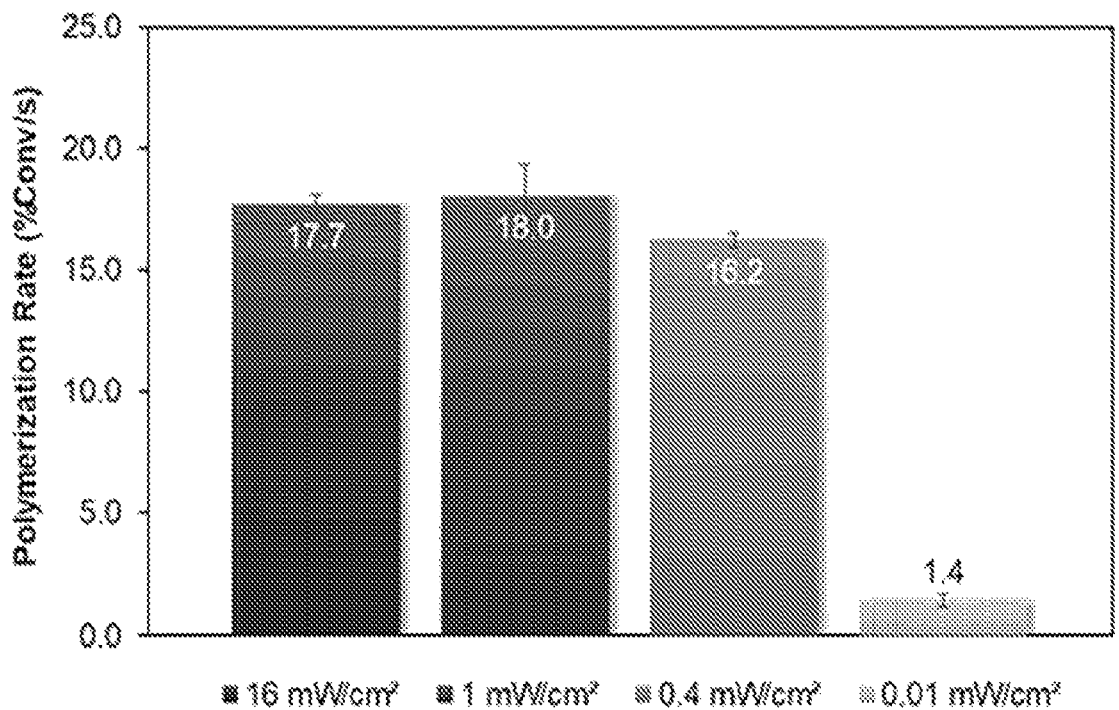
FIG. 34. Data from FIG. 33 plotted as rate of photopolymerization in % conversion/second for Mes-Br using various intensities of the 530 nm LED.
Figure 35:
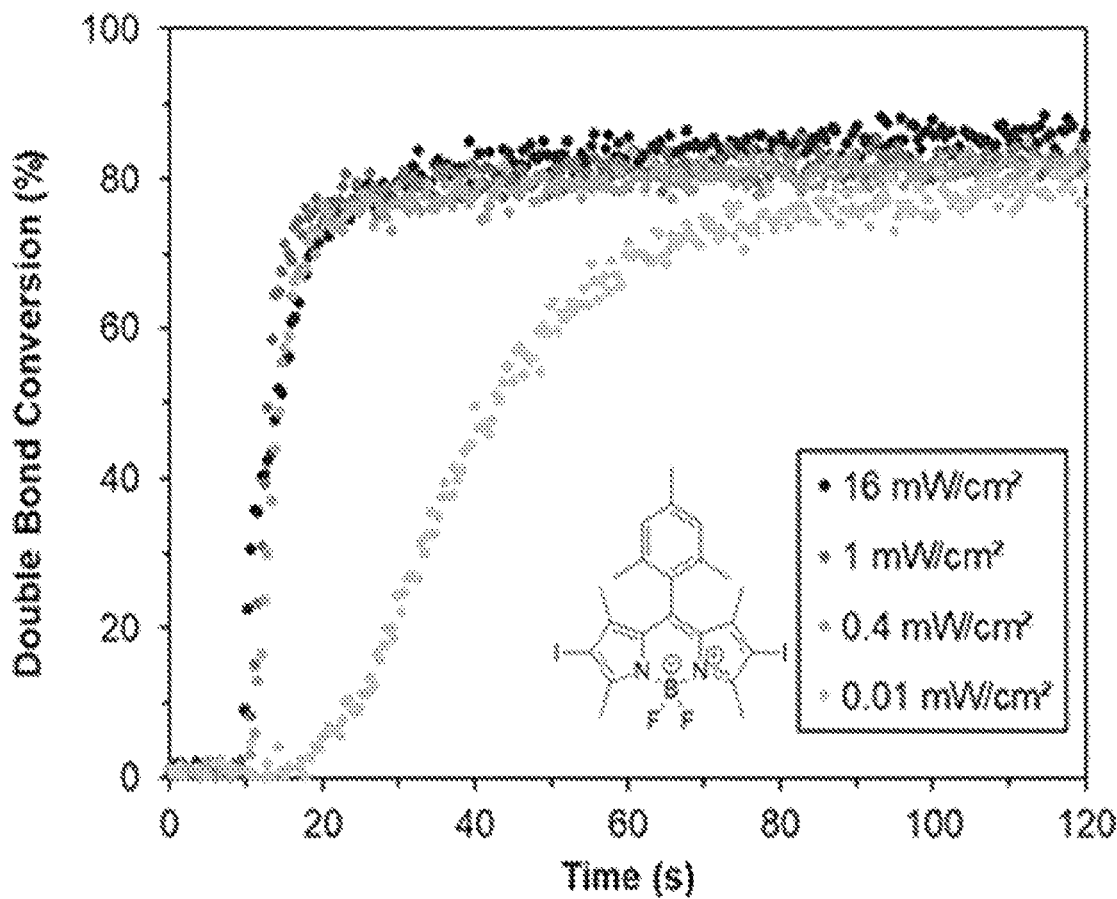
FIG. 35. Percent double bond conversion vs time ATR-FTIR data using various intensities of the 530 nm LED for photopolymerization with Mes-I.
Figure 36:
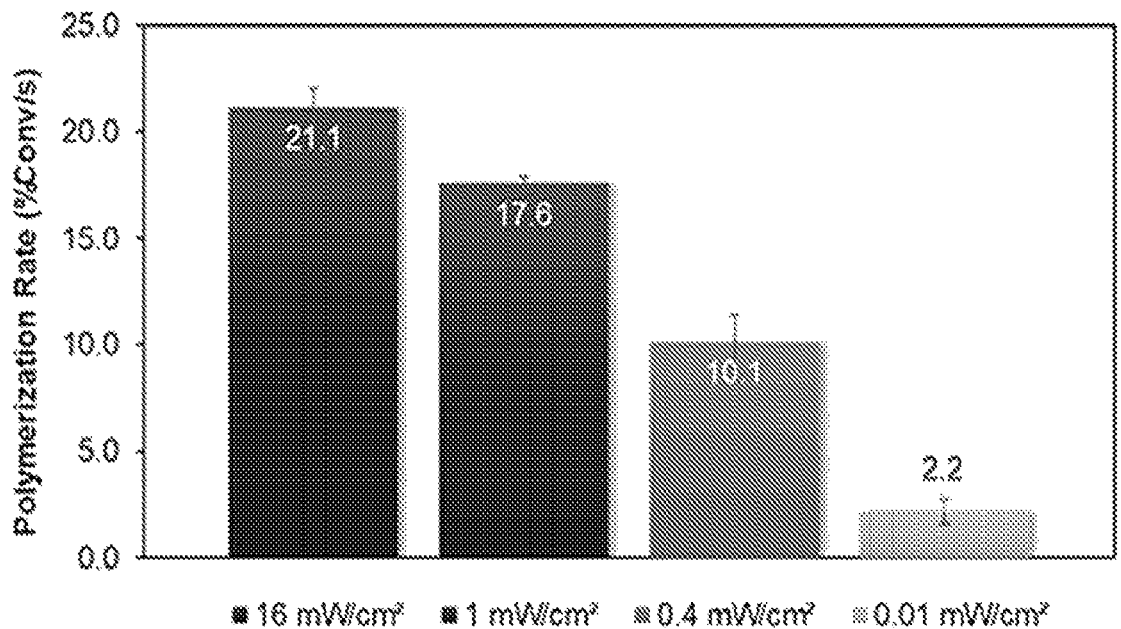
FIG. 36. Data from FIG. 35 plotted as rate of photopolymerization in % conversion/second for Mes-I using various intensities of the 530 nm LED.

Photopolymerizations were tested at varying LED intensities with the 530, 656, and 740 nm LEDs utilizing the resin formulation: 0.1 mol % BODIPY, 0.1 mol % Borate V (donor), and 1.0 mol % Iodonium salt (acceptor) for Mes-H (FIG. 29, FIG. 30), Mes-Cl (FIG. 31, FIG. 32), Mes-Br (FIG. 33, FIG. 34), and Mes-I (FIG. 35, FIG. 36).

Figure 37:
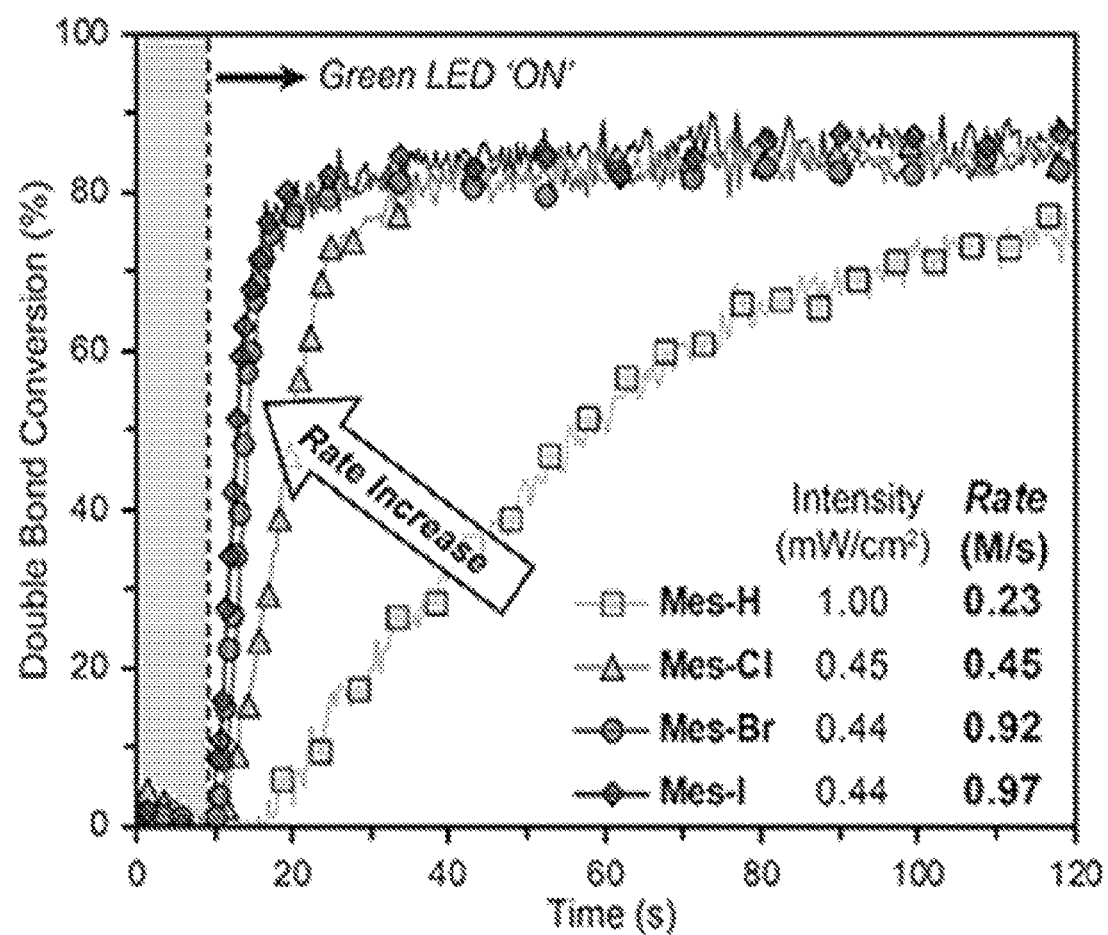
FIG. 37. Photopolymerization kinetics to compare the efficiency of different Mes-BODIPY photosensitizers. Plot of conversion vs time using an intensity that normalizes photons absorbed between the different BODIPY derivatives. No polymerization is observed in the dark and upon irradiation polymerization rates increase in the order of Mes-H, -Cl, -Br, and -I, respectively.

Photopolymerization kinetics were monitored using real time ATR-FTIR to determine the photocatalytic efficiency across the Mes-X BODIPY series (FIG. 37). A dramatic enhancement in the rate of polymerization was observed (>2×) when employing halogenated vs non-halogenated derivatives (Table 1; FIG. 37). Furthermore, a trend in the halogenated series was detected, with increasing maximum polymerization rates (0.43±0.03 to 0.91±0.02 to 0.95±0.03 M/s) correlating to an increase in the atomic number of the heavy atom; —Cl to —Br to —I, respectively. As a negative control, no polymerization was observed within the first 10 s prior to light exposure, indicating light is necessary to drive polymerization. Upon turning the light on, all polymerizations rapidly initiated and reached a maximum monomer to polymer conversion of ~80%. The ~80% conversion is hypothesized to be an upper limit for this particular mixture due to solidification of poly(isobornyl acrylate), a glassy polymer ($T_g \approx 94°$ C.) (Thermal Transitions of Homopolymers: Glass Transition & Melting Point https://www.sigmaaldrich.com/technical-documents/articles/materials-science/polymer-science/thermal-transitions-of-homopolymers.html) that "locks" remaining small molecules into place. For Mes-Br and Mes-I, the time to reach maximum conversion after turning the light on was 8.5±0.9 s and 6.5±0.3 s, respectively. Impressively, this was achieved under very low light intensities, <0.5 mW/cm$^2$, which, for comparison, is ~2 orders of magnitude less intense than an unfocused commercial laser pointer (~10-100 mW/cm$^2$). The ability to react under low light intensity saves energy for photocuring applications in general and can enable 3D printing via digital light processing (DLP), where irradiation at the build plane is typically <20 mW/cm$^2$.

Figure 38:
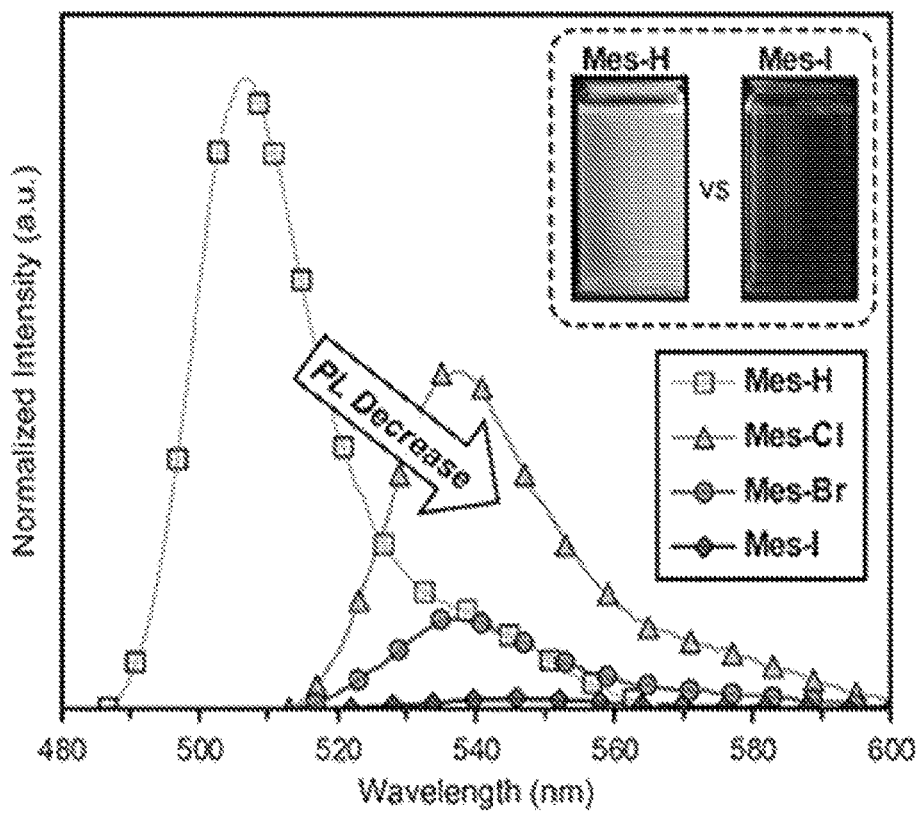
FIG. 38. Fluorescence measurements (2 µM in acetonitrile) for the tricomponent photosystem containing Mes-BODIPY photosensitizer, triphenylalkylborate donor, D, and diphenyliodonium acceptor, A. Photoluminescence of Mes-BODIPY series, showing a decrease and red-shift in emission upon halogenation, suggesting the introduction of a non-radiative intramolecular process.
Figure 39:
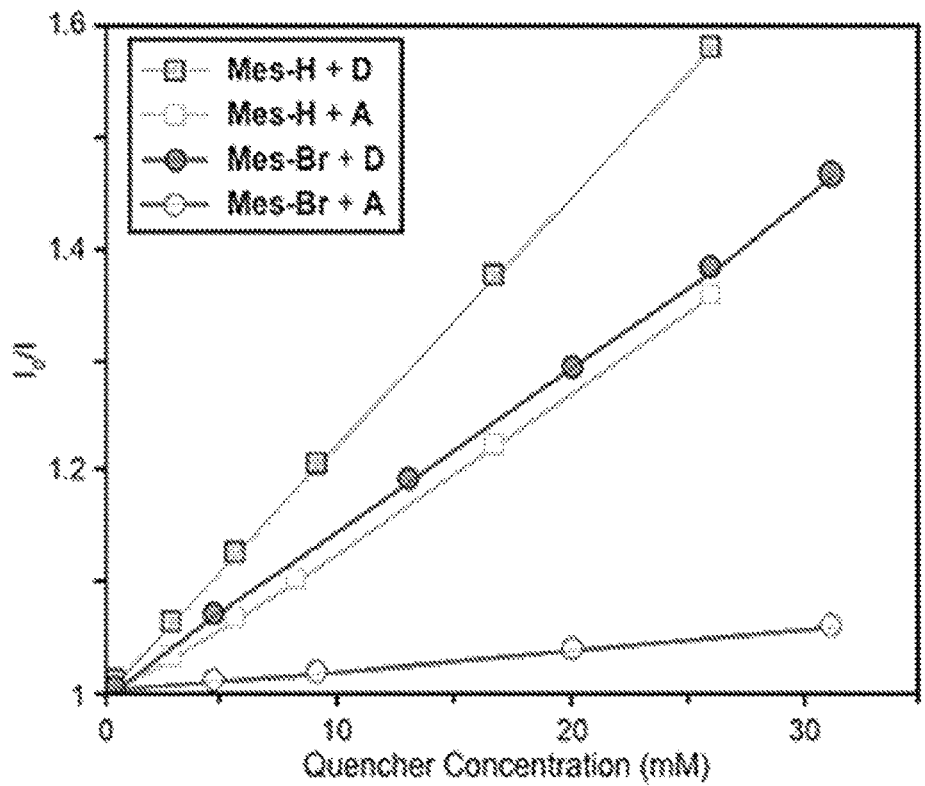
FIG. 39. Stern-Volmer plot of Mes-H and Mes-Br in the presence of D and A, showing that D results in more efficient quenching for both dyes.
Figure 40:
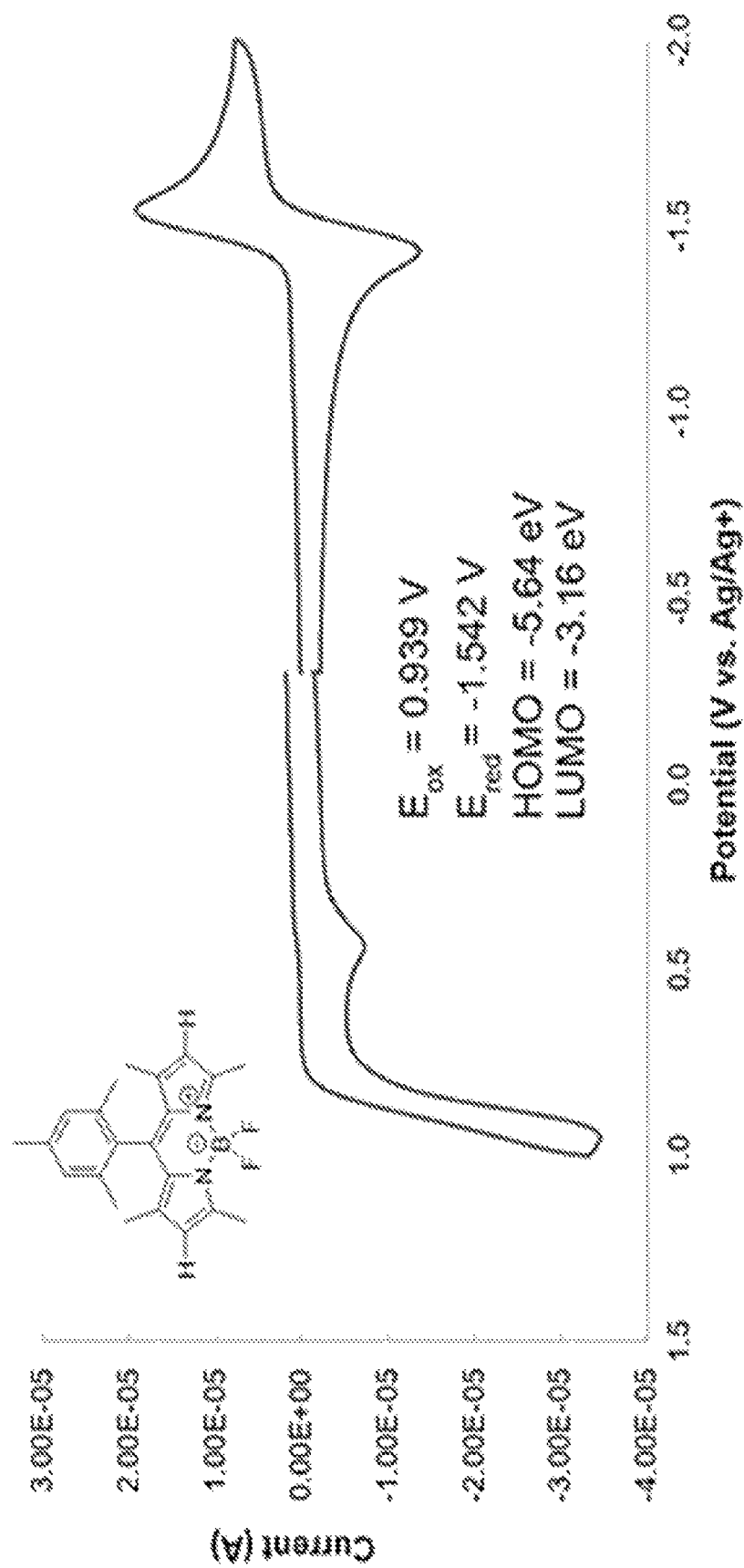
FIG. 40. Cyclic voltammogram of Mes-H in acetonitrile. HOMO-LUMO energy levels calculated using the onset redox potentials.
Figure 41:
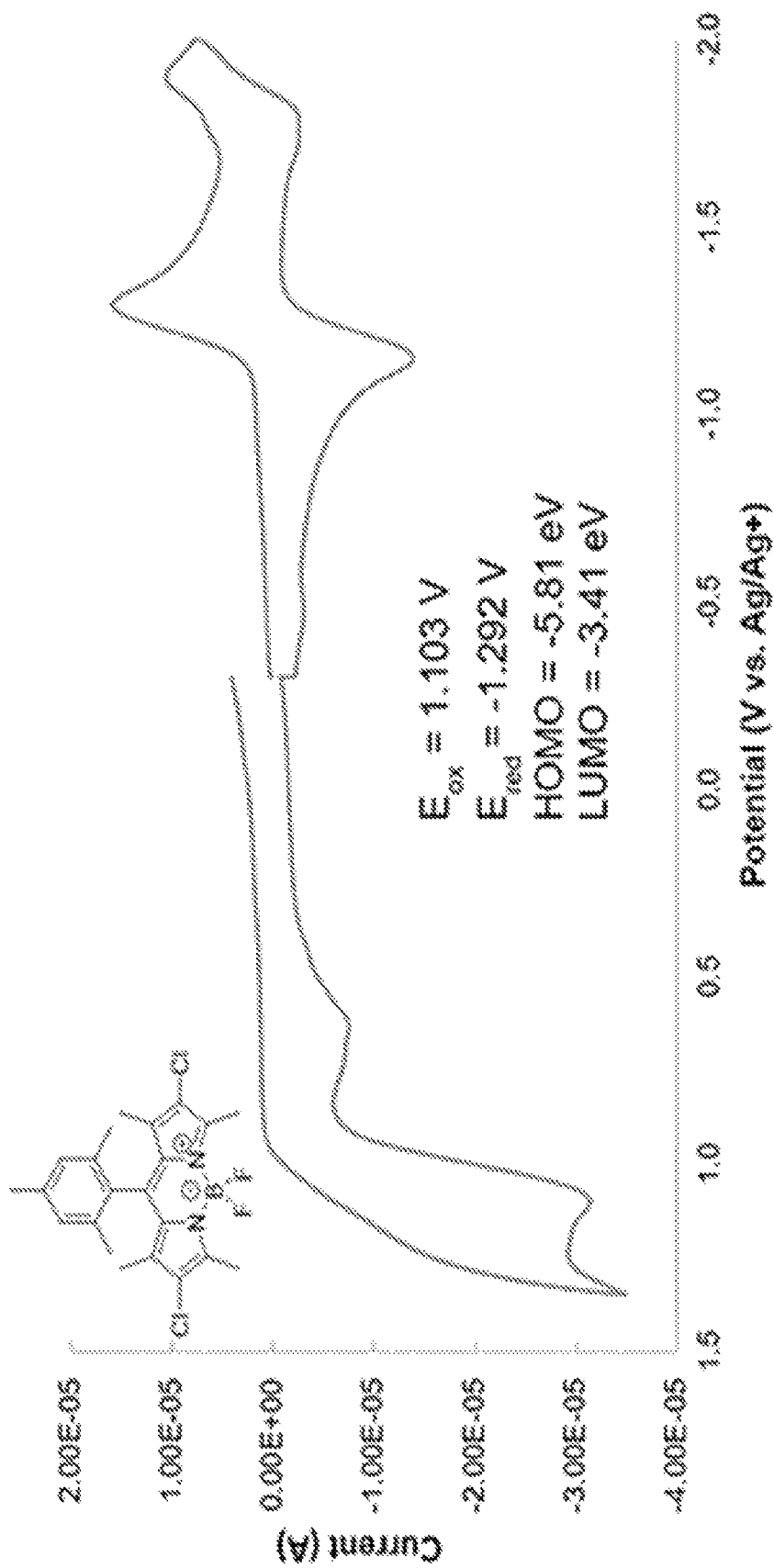
FIG. 41. Cyclic voltammogram of Mes-Cl in acetonitrile. HOMO-LUMO energy levels calculated using the onset redox potentials.
Figure 42:
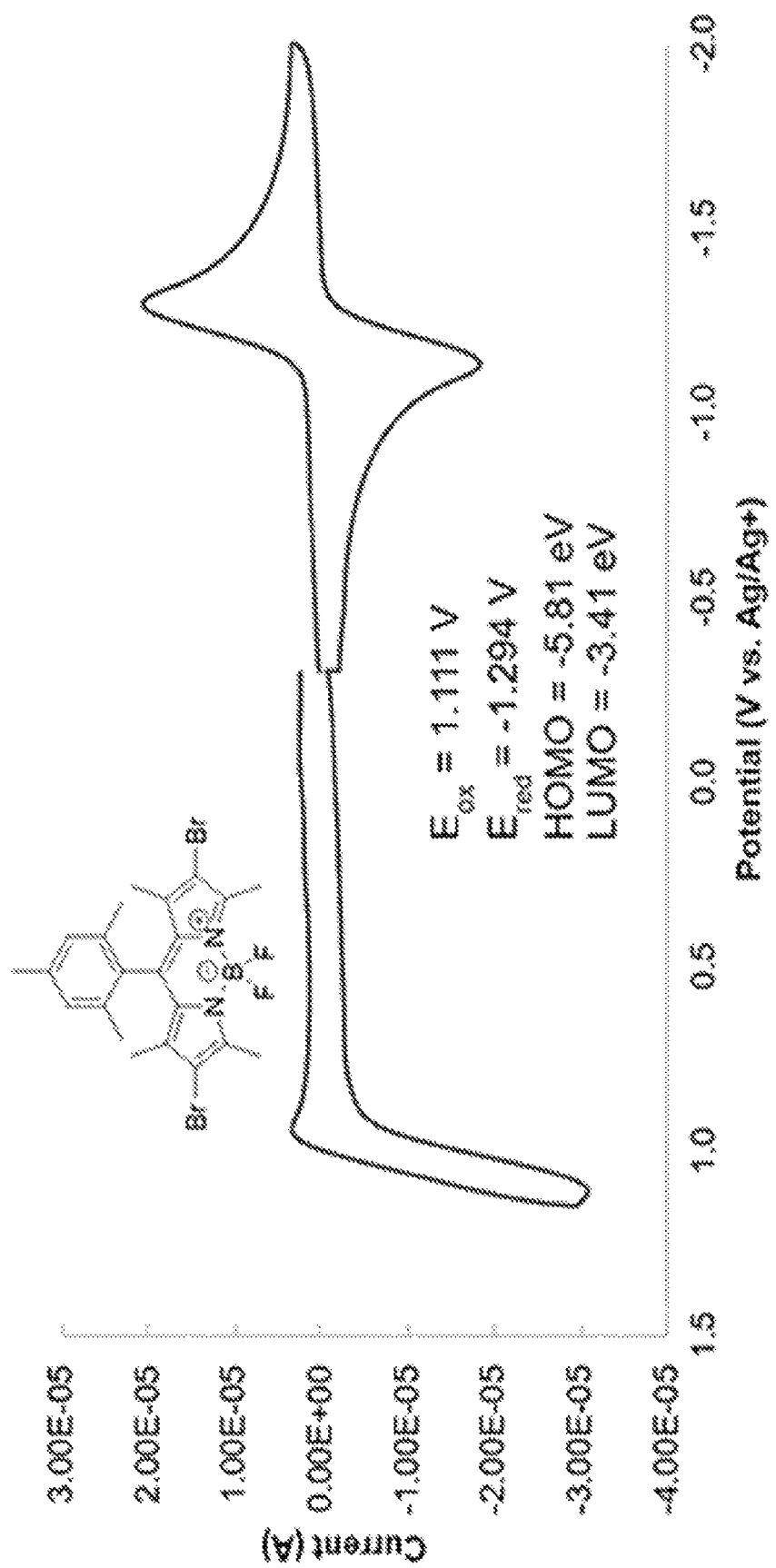
FIG. 42. Cyclic voltammogram of Mes-Br in acetonitrile. HOMO-LUMO energy levels calculated using the onset redox potentials.
Figure 43:
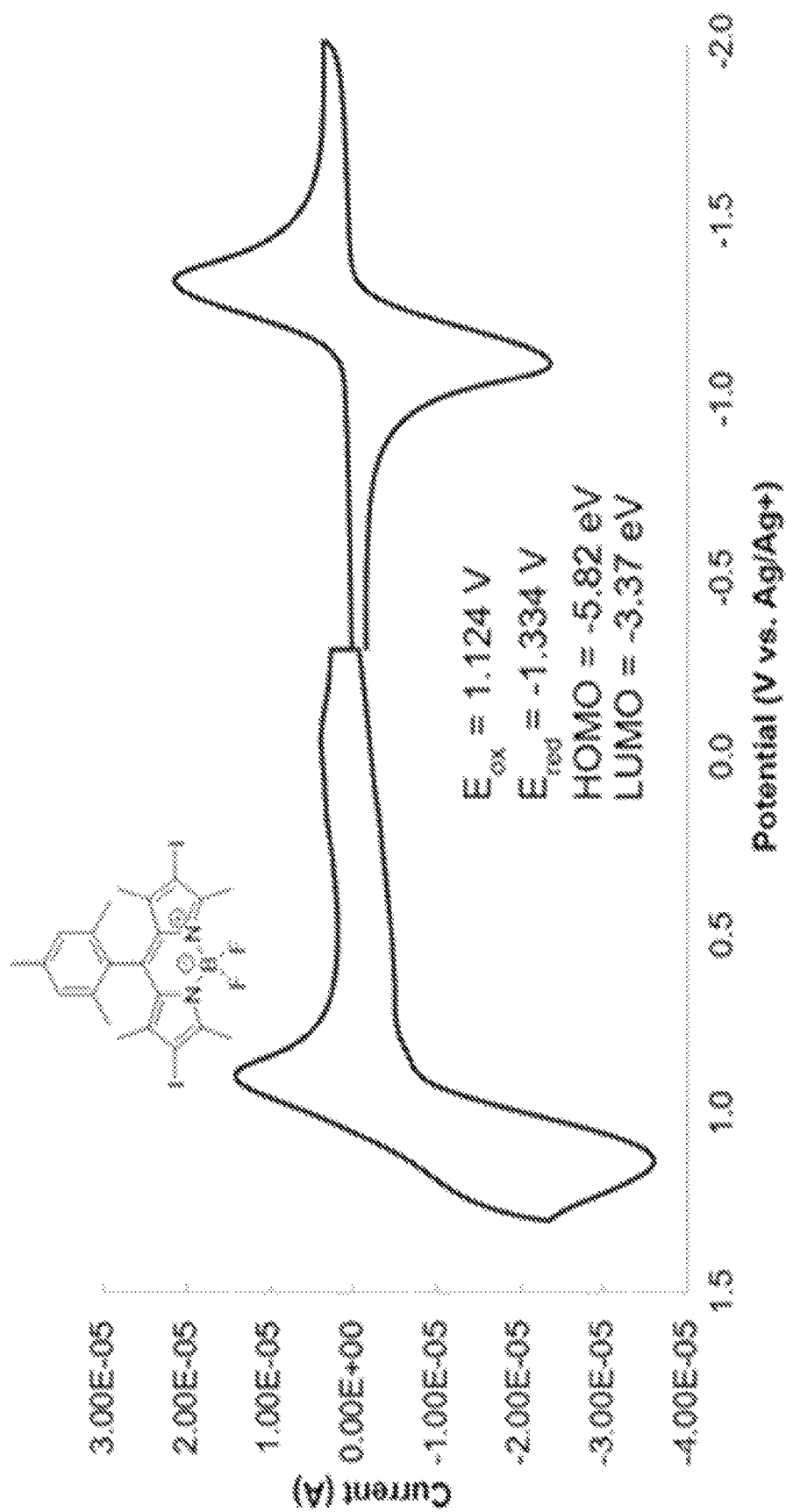
FIG. 43. Cyclic voltammogram of Mes-I in acetonitrile. HOMO-LUMO energy levels calculated using the onset redox potentials.
Figure 44:
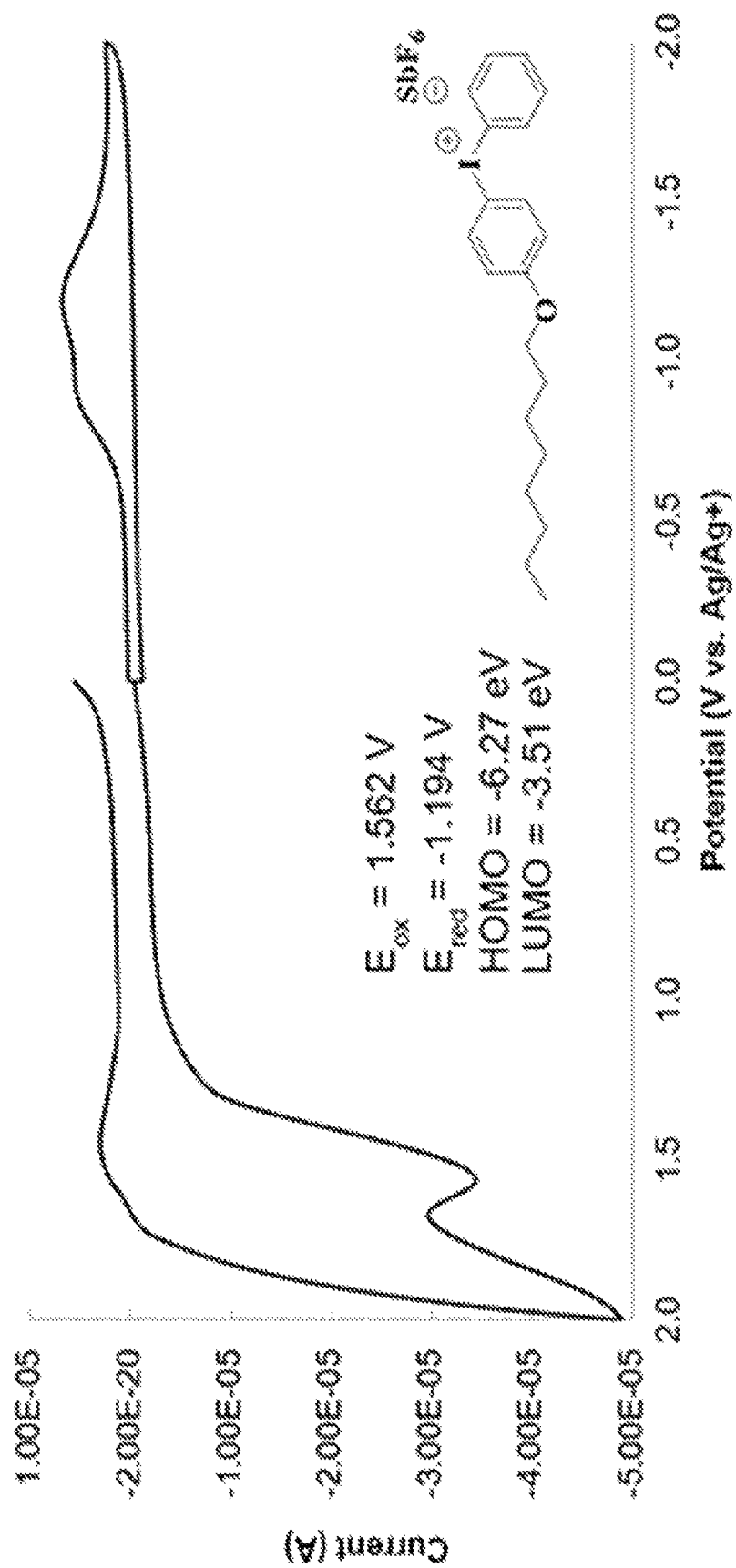
FIG. 44. H-Nu 254 (Acceptor) CV trace. HOMO-LUMO energy levels calculated using the onset redox potentials.
Figure 45:
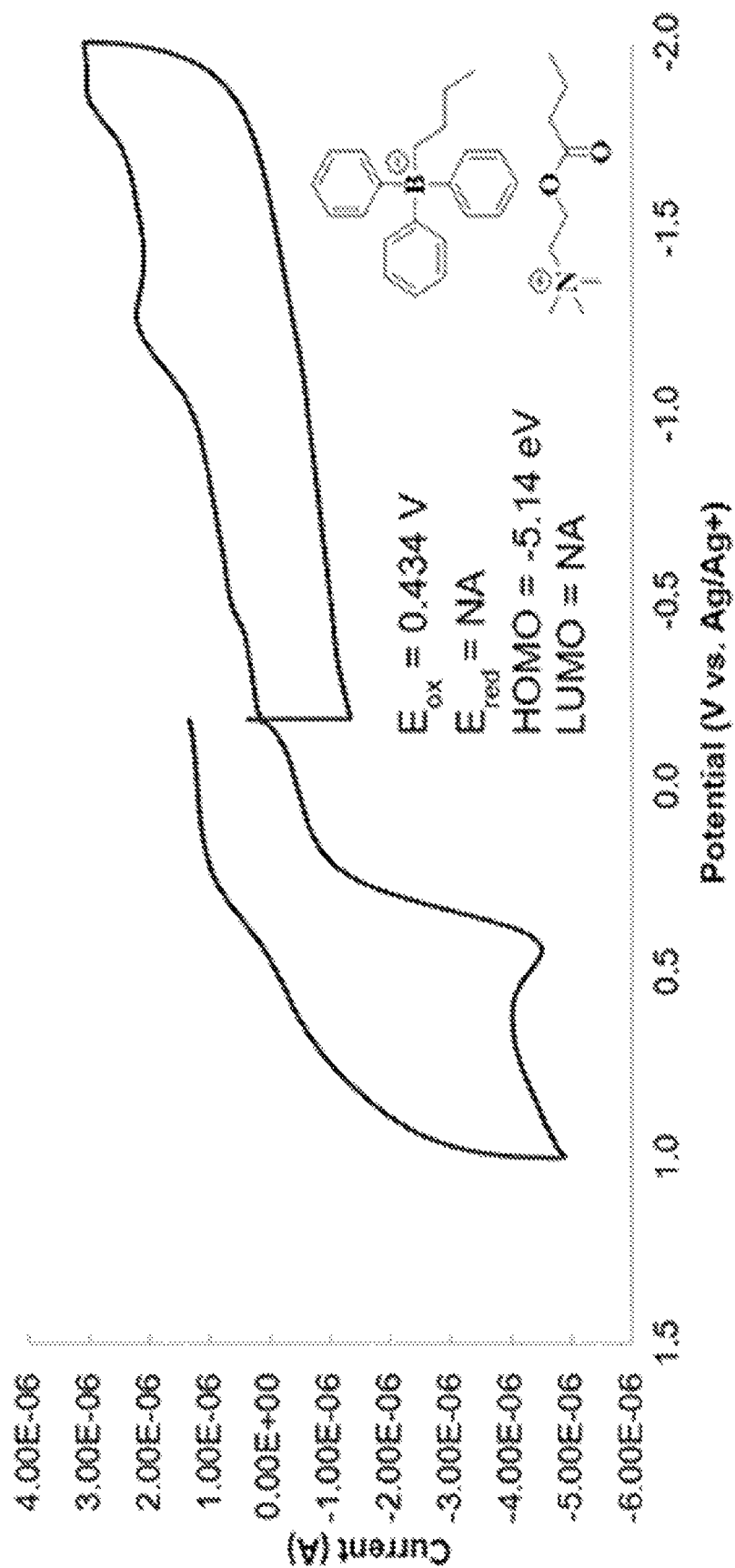
FIG. 45. Borate V (Donor) CV Trace. HOMO-LUMO energy levels calculated using the onset redox potentials.
Figure 46:
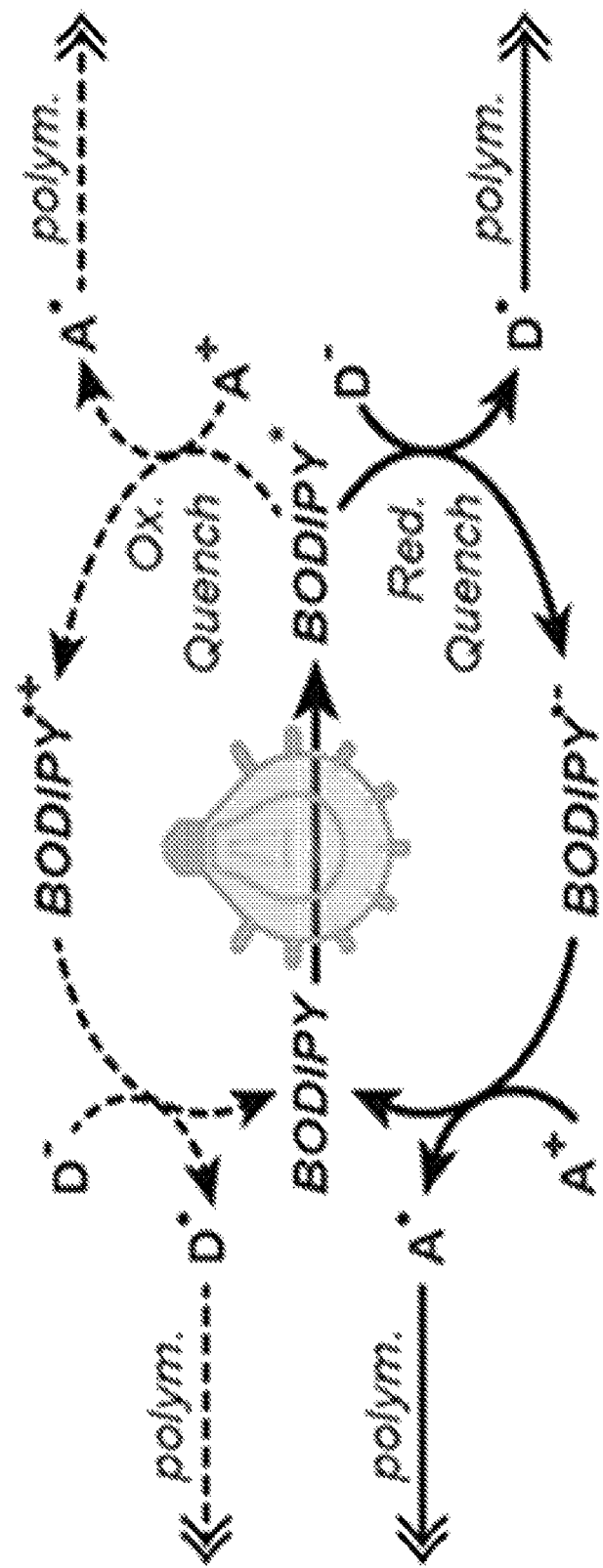
FIG. 46. Mechanistic description for the tricomponent photosystem containing Mes-BODIPY photosensitizer, triphenylalkylborate donor, D, and diphenyliodonium acceptor, A. Proposed photosystem mechanisms with oxidative quenching, top, and reductive quenching (primary pathway), bottom.

Fluorescence spectroscopy was used to probe the basic photophysics for the Mes-BODIPY derivatives and better understand the mechanism(s) that lead to faster polymerization rates. The fluorescence quantum yield (QY) was determined following literature precedent (Boens N et al. *Coord. Chem. Rev.* 2019, 399, 213024) in acetonitrile with Rhodamine 6G as a reference dye (FIG. 38). The fluorescence quantum yield values were inversely related to the polymerization rate, revealing 0.94±0.06, 0.70±0.05, 0.19±0.02, and 0.03±0.01 for Mes-H, -Cl, -Br, and -I derivatives, respectively (Table 1). The decreased quantum yield upon halogenation accompanied by the red-shifted emission in dilute solution suggests that an intramolecular non-radiative quenching pathway outcompetes fluorescence, such as intersystem crossing. Subsequently, intermolecular fluorescence (i.e., singlet) quenching by the donor and acceptor initiators (2-(butyryloxy)-N,N,N-trimethylethan-1-aminium butyltriphenylborate and [4-(octyloxy)phenyl](phenyl)iodonium hexafluoroantimonate diphenyliodonium) was probed in order to elucidate the mechanisms for radical generation (FIG. 39). The Stern-Volmer plot for Mes-H and Mes-Br shows quenching by both the donor initiator and acceptor initiator compounds, represented as an increase in the ratio between initial fluorescence intensity ($I_0$) and intensity (I) at a particular concentration of donor initiator or acceptor initiator (i.e., $I_0/I$) (FIG. 39). This suggests that some contribution towards polymerization derives from the singlet photoexcited state for both Mes-H and Mes-Br, although to a lesser extend for Mes-Br as represented by the weaker quenching. Consecutive additions of the donor initiator results in a steeper slope relative to equimolar additions of the acceptor initiator for both Mes-BODIPY derivatives. This indicates that photoexcited Mes-BODIPY dyes more readily accept an electron from the donor, as opposed to donate an electron to the acceptor. Thus, the major mechanistic pathway for this photosystem can follow reductive quenching, yielding a radical anion of the respective Mes-BODIPY and generating a butyl radical (Polykarpov A Y et al. *Tetrahedron Lett.* 1995, 36 (31), 5483-5486) from the oxidized triphenylalkyl borate salt donor (FIG. 46). While the Mes-Br results in faster polymerization rates, the Stern-Volmer plot suggests that Mes-H reacts faster with both the donor and acceptor, suggesting that a secondary pathway is contributing to the polymerization for Mes-Br (FIG. 39).

Prior to investigating the secondary pathway, cyclic voltammetry (CV) and computational studies were performed to probe the electronic energy states of the different photosystem components to corroborate the mechanistic hypothesis that reductive quenching is favored over oxidative quenching. Cyclic voltammetry data was collected (FIG. 40-FIG. 43) to determine the highest occupied molecular orbital (HOMO) and lowest unoccupied molecular orbital (LUMO) energy levels, as provided in Table 1. It was found that halogenation stabilized both the LUMO (~0.3 eV decrease) and HOMO (≤0.15 eV decrease) energy levels, although to a greater extend for the LUMO. This shift correlates to a decrease in electronic energy gap ($E_g$=HOMO-LUMO), which is consistent with the red-shift in absorption (i.e., decrease in optical energy gap) observed (FIG. 21). The decrease in both HOMO and LUMO energy levels in going from Mes-H to Mes-Br increases the driving force for reductive quenching and decreases it for oxidative quenching (FIG. 46), in support of the Stern-Volmer analysis.

Additionally, density functional theory was used to support the relative electronic energy level trends observed with cyclic voltammetry and demonstrate that computational methods may be used as a predictive tool in the future. Specifically, the def2-tzvp basis set and cam-b3lyp functional were used in an implicit solvation model to compute the HOMO and LUMO energy levels. Following literature precedent for diphenyliodinium (Romanczyk P P et al. *Electrochim. Acta* 2020, 351, 136404; Romanczyk P P et al. *Electrochim. Acta* 2017, 255, 482-485), accurate estimations for the donor and acceptor initiators were achieved by using a concerted ionization and bond cleaving process.

More specifically, the geometries for all molecules were optimized with the 6-31G* basis set and B3LYP functional in the gas phase. All calculations on the Mes-X and aza-X molecules were done with these converged geometries. To compute the HOMO and LUMO levels of the Mes-X and aza-X derivatives the def2-tzvp basis set and cam-b3lyp functional were used. The energies were computed as follows:

$$E_{LUMO} = -(E_{Anion} - E_{Ground}) \quad \text{SE1}$$

$$E_{HOMO} = E_{Cation} - E_{Ground} \quad \text{SE2}$$

where E_Ground is the energy of the neutral ground state, $E_{Anion}$ is the energy of the anion, and $E_{Cation}$ is the energy of the cation. Equation SE1 yields the vertical electron affinity and Equation SE2 yields the vertical ionization potential. For these calculations an implicit solvation model, SMD, was used with acetonitrile as the implicit solvent (Marenich et al. *The Journal of Physical Chemistry B.* 2009 113 (18), 6378-6396). Linear response TDDFT was used to compute the singlet excited state energies, and the triplet excited states were modeled by setting the spin multiplicity to 3 to converge on the lowest triplet state.

For the two co-initiators, the donor D, and the acceptor A, the HOMO and LUMO levels were computed via a concerted electron transfer and bond cleavage mechanism. This mechanism was first used on diphenyliodinium (Romanczyk et al. *Electrochimica Acta.* 2017, 122 (20), 482-485; Romanczyk et al. *Electrochimica Acta.* 2020, 351 (10) 136404). It was found that only with the simultaneous addition of an electron and cleavage of the C—I bond were the experimental observations able to be reproduced (Romanczyk et al. *Electrochimica Acta.* 2017, 122 (20), 482-485; Romanczyk et al. *Electrochimica Acta.* 2020, 351 (10) 136404). As is the case with the two co-initiators studied here. Assuming only an electron transfer event yielded 5.88 and 2.25 eV for the donor HOMO and the acceptor LUMO, respectively. The diabatic electronic transfer event HOMO and LUMO values are off by over 1.0 eV. The equations used for the acceptor LUMO (Equation SE3) and the donor HOMO (Equation SE4) are $$E_{Ar_2I^+/Ar^{\cdot}+ArI} = E_{LUMO,Ad} - E_{BDE} \quad \text{SE3}$$

$$E_{Ar_3RB^-/Ar^{\cdot}+Ar_2RB} = E_{HOMO,Ad} + E_{BDE} \quad \text{SE4}$$

where $E_{BDE}$ is the bond dissociation energy of the C—I or C—B bond. This was computed by optimizing the geometry of the dissociated fragments and computing their energy within the SMD implicit solvent model. The bond dissociation energy was then obtained by $E_{BDE} = E_{frag,1} + E_{frag,2} - E_{mol}$. For both the acceptor and donor there are two unique bonds that can be cleaved. In the case of the acceptor, one of the two aromatic rings has an ether while the other does not. In the case of the donor, there are the aromatic rings (Ar) or the alkane chain (R) that are bonded to the boron.

$E_{HOMO,Ad}$ and $E_{LUMO,Ad}$ are the adiabatic ionization potential and electron affinity, respectively. The adiabatic HOMO and LUMO use the optimized geometry of the iodine fragment or boron fragment after bond cleavage. For example, $E_{LUMO,Ad}$ for the acceptor is the adiabatic electron affinity of the ArI$^+$ fragment. These were computed in the SMD implicit solvation model. An adiabatic ionization potential/electron affinity is computed by taking the difference in energy between the minimized geometry of the ground state and the minimized geometry of the reduced/oxidized state. This is different from the commonly used diabatic ionization potential where only the minimized ground state geometry is used for both electronic states.

In Table 2, there are two values listed for the HOMO and LUMO of the initiators because there are two unique C—I or C—B bonds to cleave. In the case of the borate donor, the C—B bond with the aromatic ring vs alkane has significant differences. The Ar$_3$B fragment has a larger ionization potential, but the R—B bond is significantly weaker than the Ar—B bond. Because of the impact of the bond dissociation energy the cleavage of one of the aromatic groups requires more energy, and thus a larger ionization potential. Interestingly, for diphenyl iodonium acceptor there are significant differences in the electron affinity and bond dissociation energy between the two aromatic groups, but they cancel with each other to yield almost identical electron affinities. In comparison, if equations SE1 and SE2 are used for the co-initiators, values of 5.88 and 2.25 eV were obtained for the donor HOMO and the acceptor LUMO, respectively. This is in agreement with other work on similar co-initiators showing that the electron transfer process occurs with the bond cleavage and not independently of each other.

TABLE 2

Breakdown of the energies involved in the concerted electron attachment/detachment and bond cleavage of the co-initiators.

| HNU-254 | $E_{LUMO,Ad}$ (eV) | $E_{BDE}$ (eV) | $E_{Ar_2I^+/Ar^\bullet+ArI}$ (eV) |
|---|---|---|---|
| Ar$^\bullet$ + ArOI | 5.89 | 1.94 | 3.95 |
| ArO$^\bullet$ + ArI | 6.53 | 2.62 | 3.91 |

| Borate V | $E_{HOMO,Ad}$ (eV) | $E_{BDE}$ (eV) | $E_{Ar_3RB^-/Ar^\bullet+Ar_2RB}$ (eV) |
|---|---|---|---|
| Ar$^\bullet$ + Ar$_2$RB | 2.07 | 3.36 | 5.43 |
| R$^\bullet$ + Ar$_3$B | 2.40 | 2.58 | 4.98 |

The computational and experimental data for the photocatalysts is summarized in Table 3. As can be seen by the computational values for the HOMO and LUMO energies are within 0.2 eV of the experimental values. All values were consistently underestimated by 0.2 eV, suggesting that for future screening a shift of 0.2 eV to the current computational protocol might yield more accurate results.

TABLE 3

Computational and Experimental (right three columns) data for the photocatalysts.

| BODIPY | Computational | | | | Experimental | | |
|---|---|---|---|---|---|---|---|
| | Singlet (eV) | Triplet (eV) | HOMO (eV) | LUMO (eV) | Singlet (eV) | HOMO (eV) | LUMO (eV) |
| aza-H | 2.16 | 0.87 | 5.47 | 3.85 | 1.85 | 5.57 | 3.96 |
| aza-Br | 2.20 | 0.93 | 5.73 | 4.06 | 1.89 | 5.97 | 4.03 |
| Mes-H | 2.98 | 1.60 | 5.42 | 3.06 | 2.49 | 5.64 | 3.16 |
| Mes-Cl | 2.86 | 1.58 | 5.59 | 3.25 | 2.37 | 5.81 | 3.41 |
| Mes-Br | 2.85 | 1.58 | 5.60 | 3.23 | 2.37 | 5.81 | 3.41 |
| Mes-I | 2.83 | 1.59 | 5.54 | 3.29 | 2.34 | 5.82 | 3.37 |
| Donor | | | 4.98 (5.43) | | | 5.14 | |
| Acceptor | | | | 3.95 (3.91) | | | 3.51 |

Figure 47:
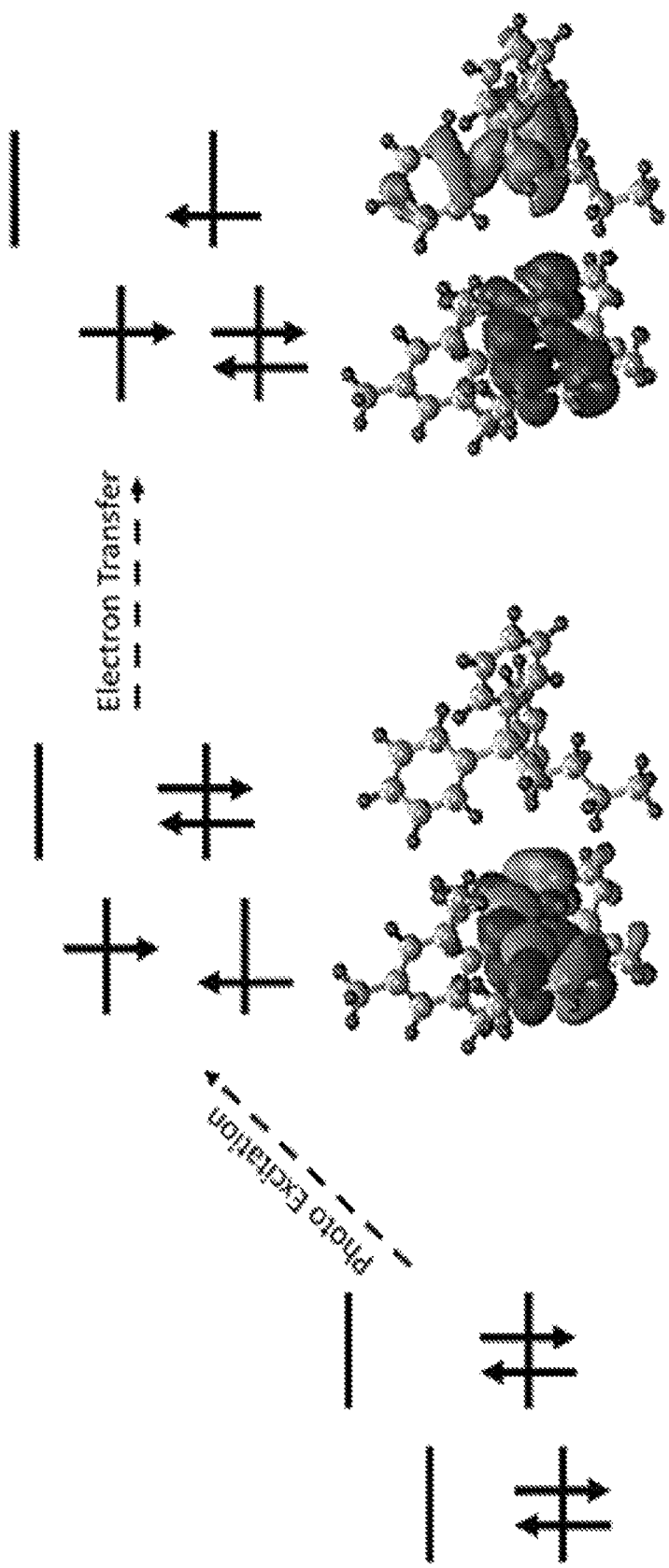
FIG. 47. Rough schematic of the photo-induced electron transfer even that occurs in solution. The orbitals shown are from electron attachment/detachment plots showing where an electron came from (purple) and where it went to (orange). The first plot is the localized singlet excited state and the second is the charge transfer state between the dye and co-initiator.

A rough depiction of the photo-induced electron transfer event that occurs in solution is given in FIG. 47. Based on the computational results electron transfer with the donor from the triplet excited state of Mes-X has a driving force of roughly −0.1 eV. For the aza-X compounds that driving force is uphill by 0.7 eV, indicating that the electron transfer to this co-initiator might not be occurring for the aza-X compounds in the triplet excited state. The electron transfer event with the acceptor from the triplet excited state of Mes-X has a driving force of roughly 1.0 eV. This is too uphill for the triplet state, but from the singlet excited state the electron transfer event is able to occur. For the aza-X compounds the driving force from the triplet excited state to the charge transfer state is 0.05 eV.

Both cyclic voltammetry and computation confirm that there is a larger energetic driving force for reductive over oxidative quenching in the present photosystems, substantiating the preference for electron transfer from the donor to photoexcited Mes-BODIPY. Thus far, optoelectronic characterization has focused on the lowest excited singlet (S$_1$) state of the Mes-BODIPY dyes, but fluorescence quenching experiments suggest that halogenation provides an additional mechanism to facilitate higher polymerization rates.

Figure 48:
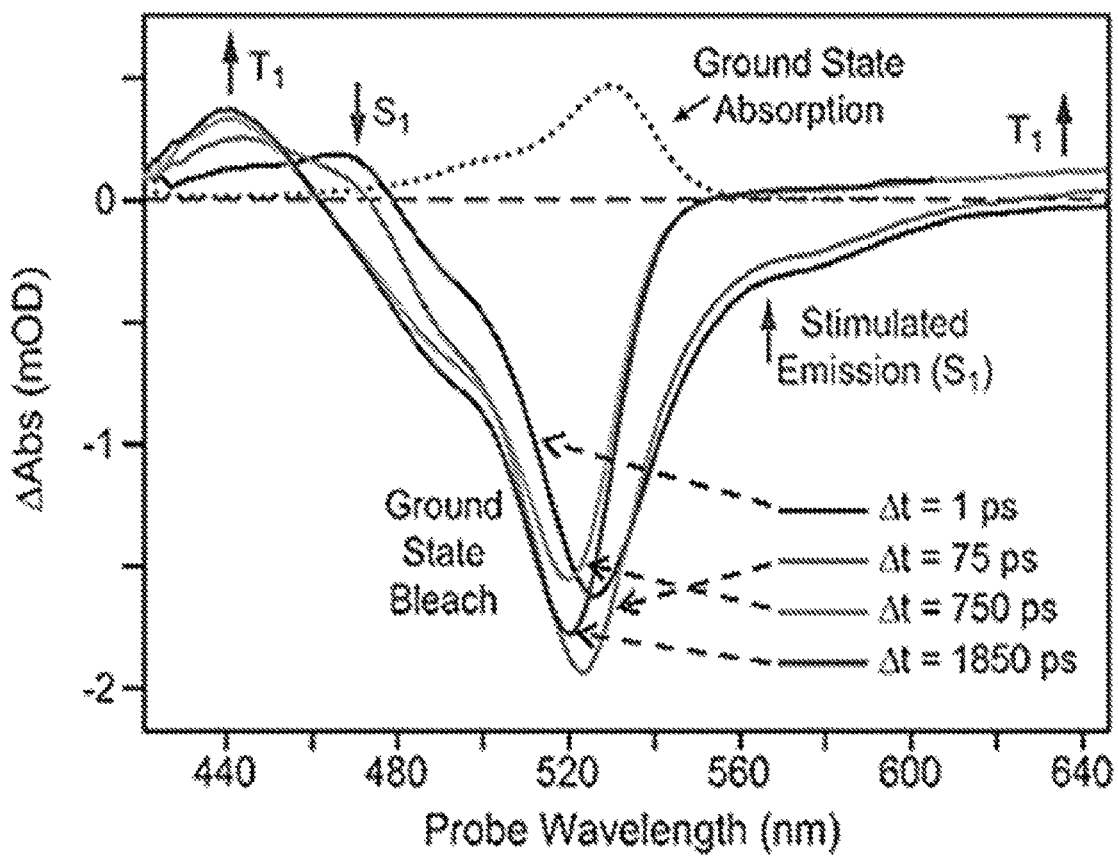
FIG. 48. Transient absorption spectra of Mes-I in acetonitrile indicate intersystem crossing occurs on a 197 ps timescale. Features tied to the Mes-I $S_1$ state are indicated by blue text, while red text denotes features associated with the Mes-I $T_1$ state.
Figure 49:
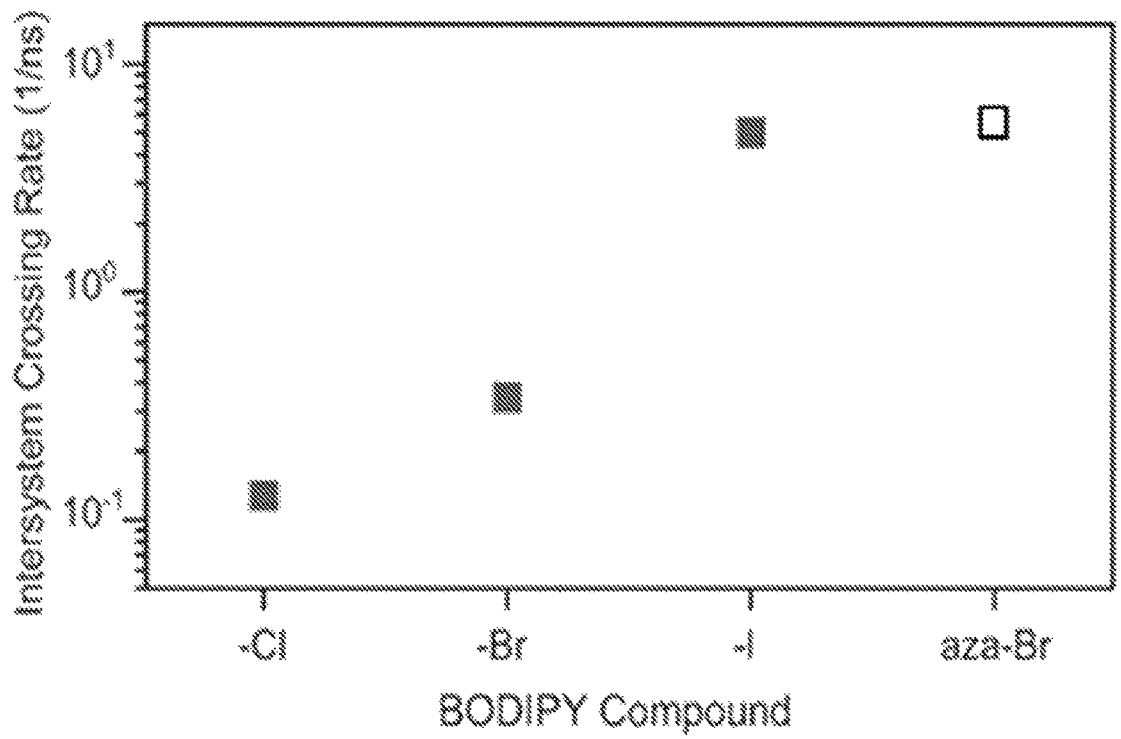
FIG. 49. Intersystem crossing rates for halogenated Mes-BODIPY compounds (grey squares) and aza-Br (white square).

Transient absorption (TA) spectroscopy was employed to better assess the connection between Mes-BODIPY excited state dynamics and photocatalytic efficiency. FIG. 48 plots the transient absorption spectra of Mes-I dissolved in acetonitrile following photoexcitation at 530 nm. Upon photoexcitation of Mes-I, a broad negative signal appears from 480 to 540 nm that corresponds to a bleaching of its ground state absorption while stimulated emission can be seen at longer probe wavelengths that tracks the shape of Mes-I's steady-state emission spectrum. Together, these features indicate excitation of Mes-I to the S$_1$ state. Over time, the stimulated emission feature is gradually replaced by a weak induced absorption band while the ground state bleach shows little evolution, signaling conversion of the S$_1$ state to a new excited state. Concomitant with this change is growth of an induced absorption band centered at 438 nm, which is attributed to the Mes-I's lowest excited triplet (T$_1$) state on the basis of prior photoinduced absorption spectra reported for BODIPY dyes (Sabatini R P et al. *J. Phys. Chem. Lett.* 2011, 2 (3), 223-227; Rachford A A et al. *Inorg. Chem.* 2010, 49 (8), 3730-3736; Whited M T et al. *J. Am. Chem. Soc.* 2011, 133 (1), 88-96; Lee Y et al. *J. Phys. Chem. Lett.* 2020, 11(3), 877-884). Global target analysis of this data is used to extract an intersystem crossing rate of 197 ps ($k_{ISC}$=5×10$^9$ s$^{-1}$). Transient absorption spectra of Mes-Cl and Mes-Br show similar spectral evolution, albeit with lower intersystem crossing rates (FIG. 49, Table 1). Following intersystem crossing, the T$_1$ states of Mes-I, Mes-Br, and Mes-Cl are each found to display similar excited state lifetimes of 370 ns. In contrast, no evidence for T$_1$ state formation is seen for Mes-H, which instead returns directly from the S$_1$ state to its ground state with a time constant of 1.56 ns.

The comparable rates for intersystem and S$_1$ relaxation to the ground state for Mes-Br and Mes-Cl indicate that these two processes compete with one another following photoexcitation. Based on the ratio of time constants measured for these processes, it was estimated that 35% of photoexcited Mes-Br molecules successfully intersystem cross to its T$_1$ state while the triplet yield is even lower for Mes-Cl, 17%. In contrast, the fast intersystem crossing rate of Mes-I ensures that the majority of its photoexcited population (89%) convert to its T$_1$ state. The enhancement in photopolymerization rate observed in moving from Mes-H to Mes-I can be ascribed to this difference in triplet production yield. As photopolymerization requires the diffusive encounter of a photoexcited Mes-BODIPY molecule and an electron donor or acceptor, the longer lifetime of the Mes-BODIPY T$_1$ state increases the likelihood that a photoexcited molecules will encounter a suitable partner before it deactivates to the ground state. The increased yield of triplet production for Mes-I over Mes-Cl and Mes-Br ensures that more photoexcitation events will result in triplet formation, thereby increasing measured photopolymerization rates.

Figure 50:
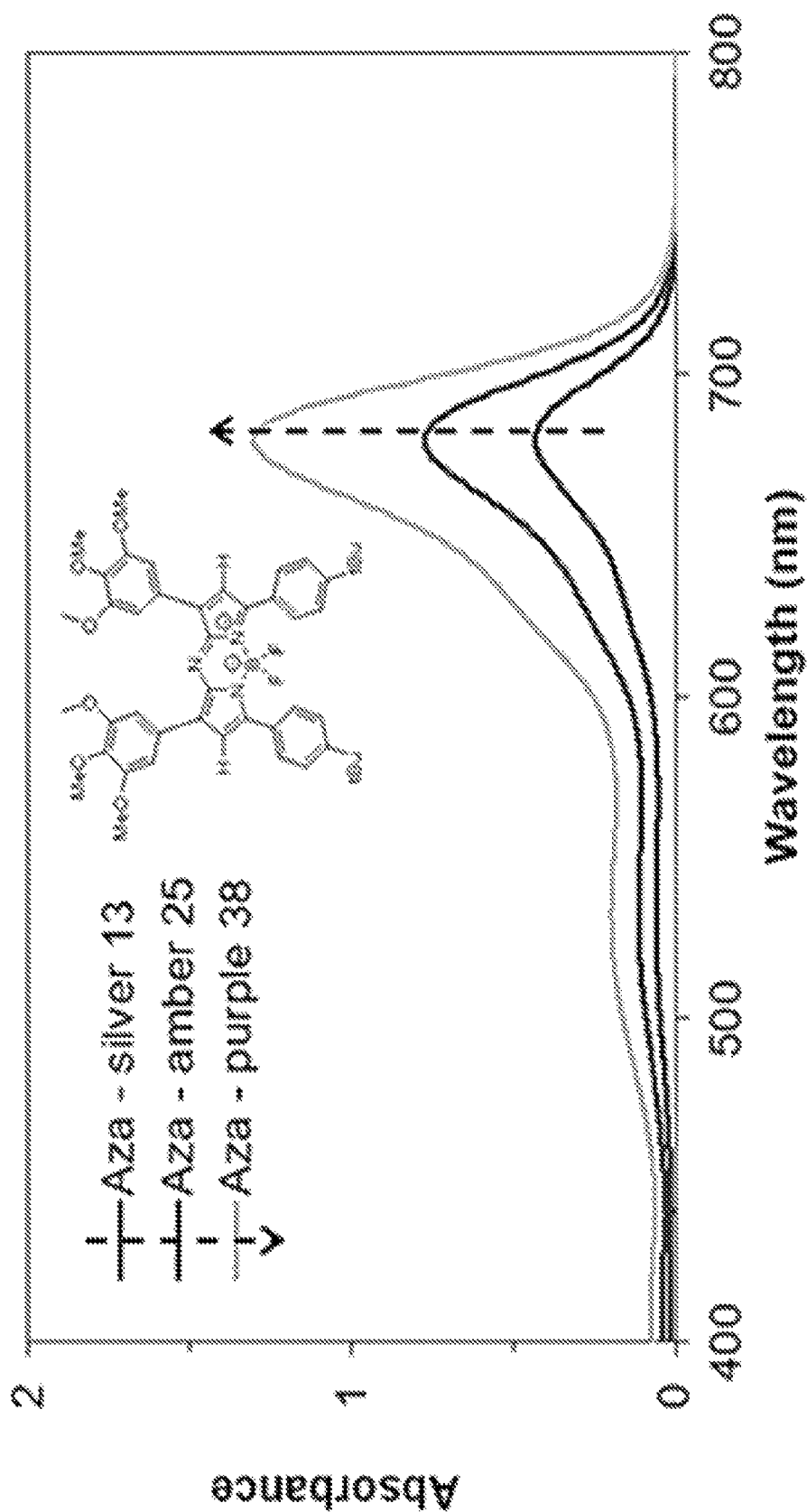
FIG. 50. UV-Vis absorption spectra for aza-H.
Figure 51:
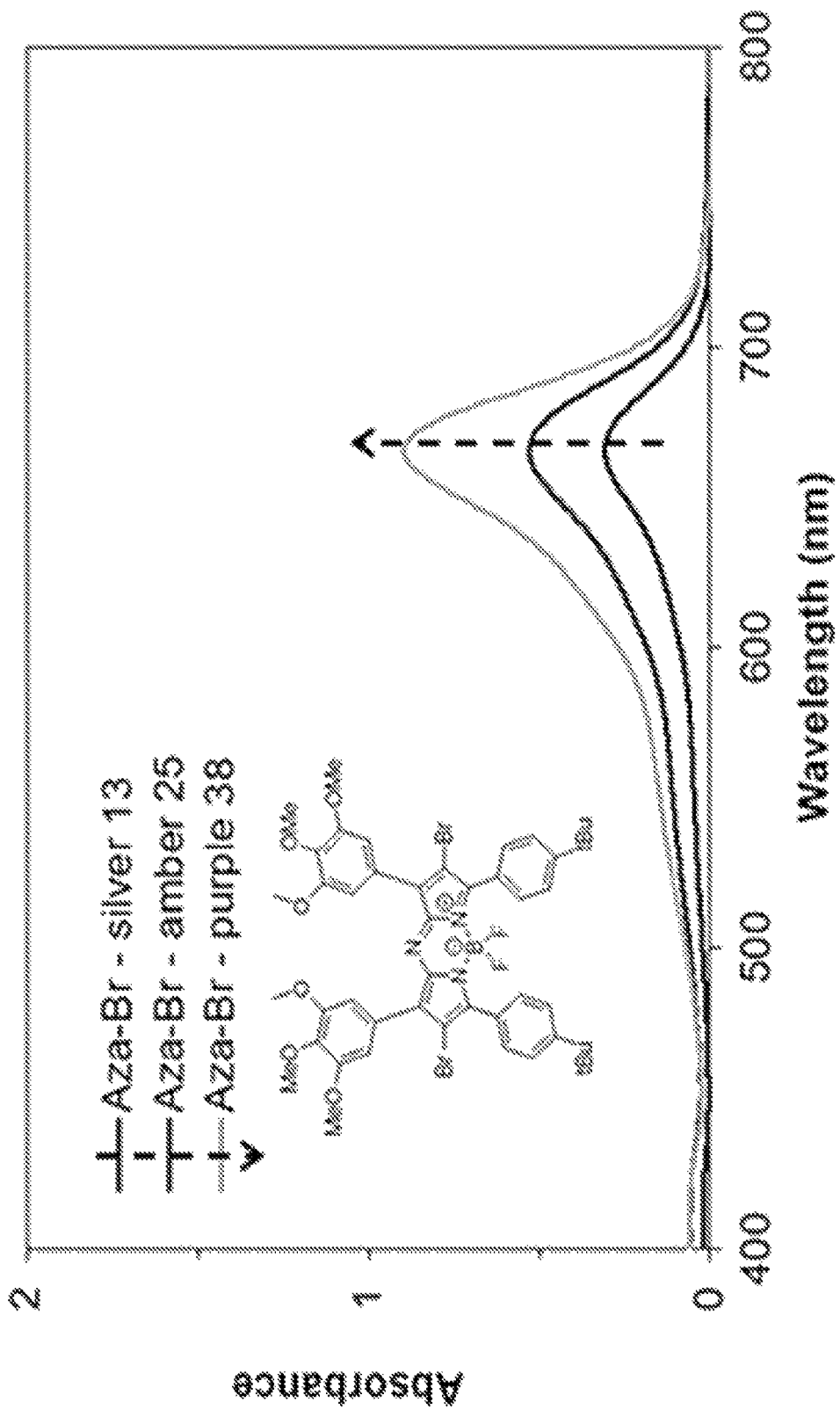
FIG. 51. UV-Vis absorption spectra for aza-Br.
Figure 52:
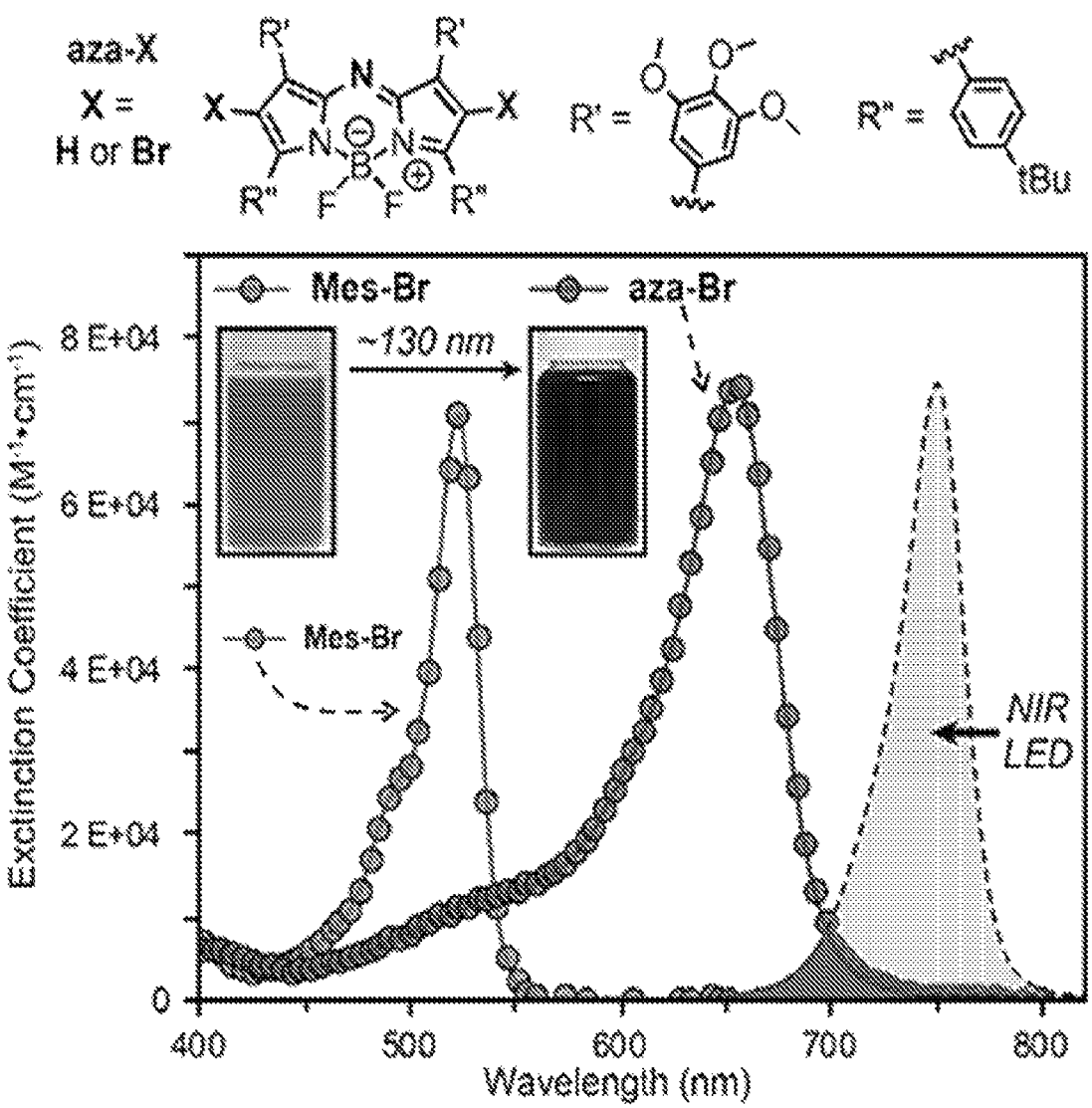
FIG. 52. Chemical structures for aza-H and aza-Br and UV-vis absorption spectra for Mes-Br and aza-Br (4-6 µM in acetonitrile). Inset shows corresponding photographs in solution to highlight the notable color difference.
Figure 53:
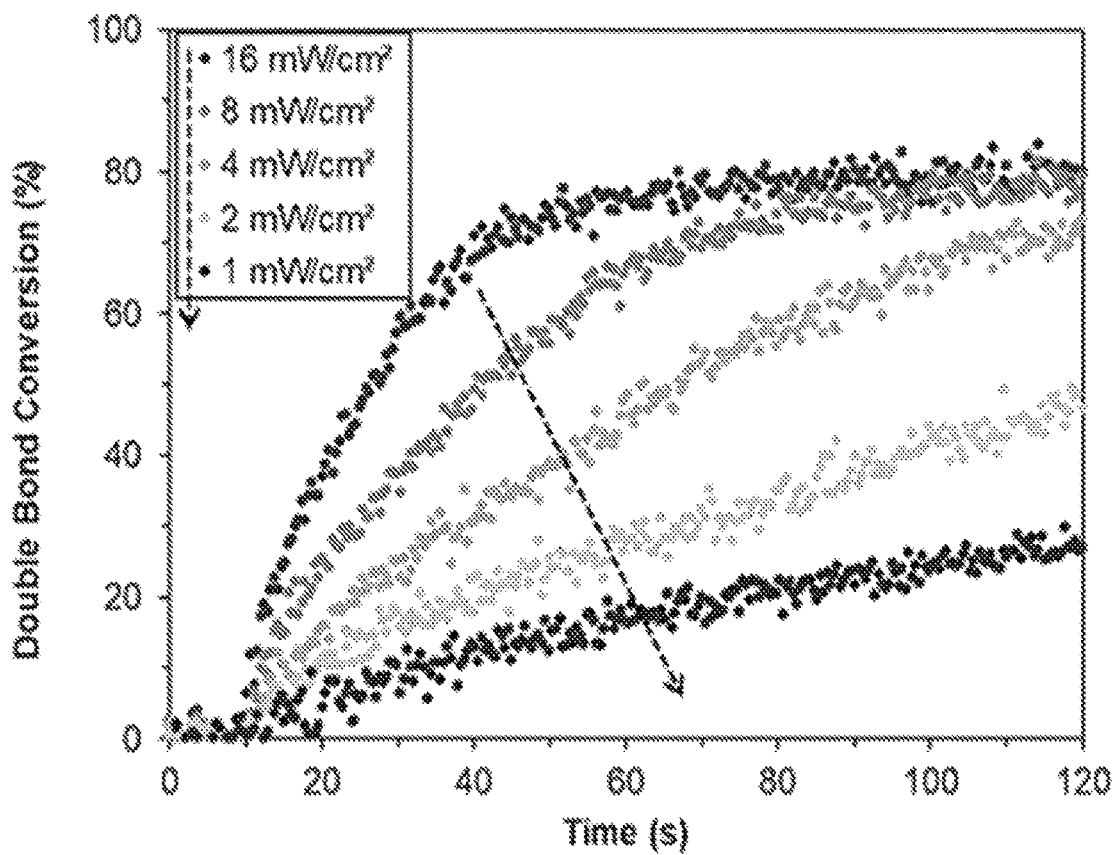
FIG. 53. Double bond conversion vs time ATR-FTIR data using various intensities of the 656 nm LED for photopolymerization with aza-H.
Figure 54:
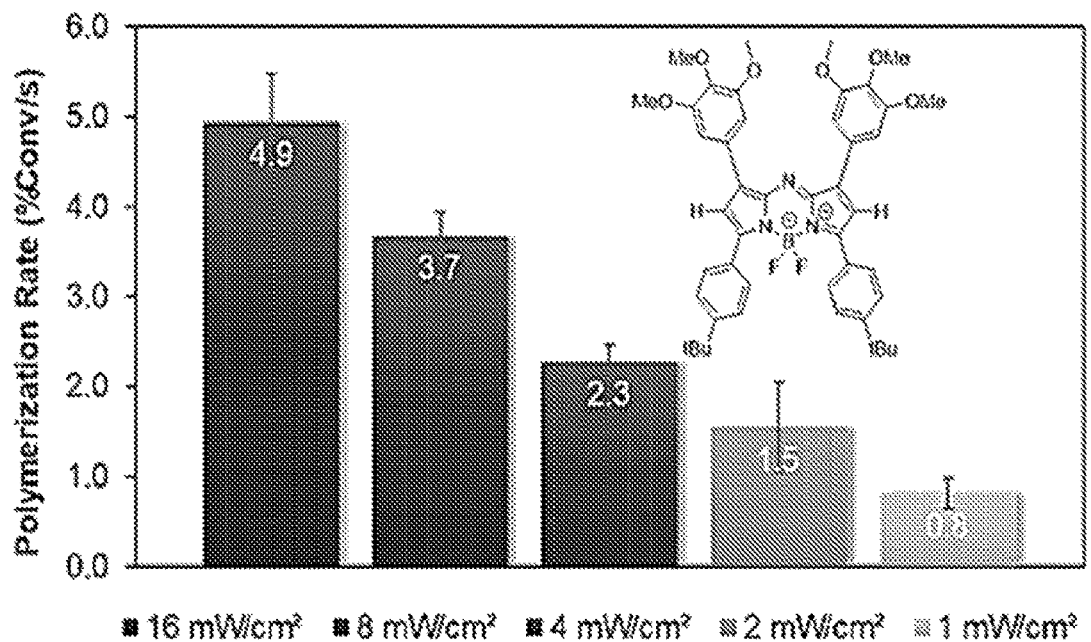
FIG. 54. Plot of data from FIG. 53 as rate of photopolymerization in % conversion/second for aza-H using various intensities of the 656 nm LED.
Figure 55:
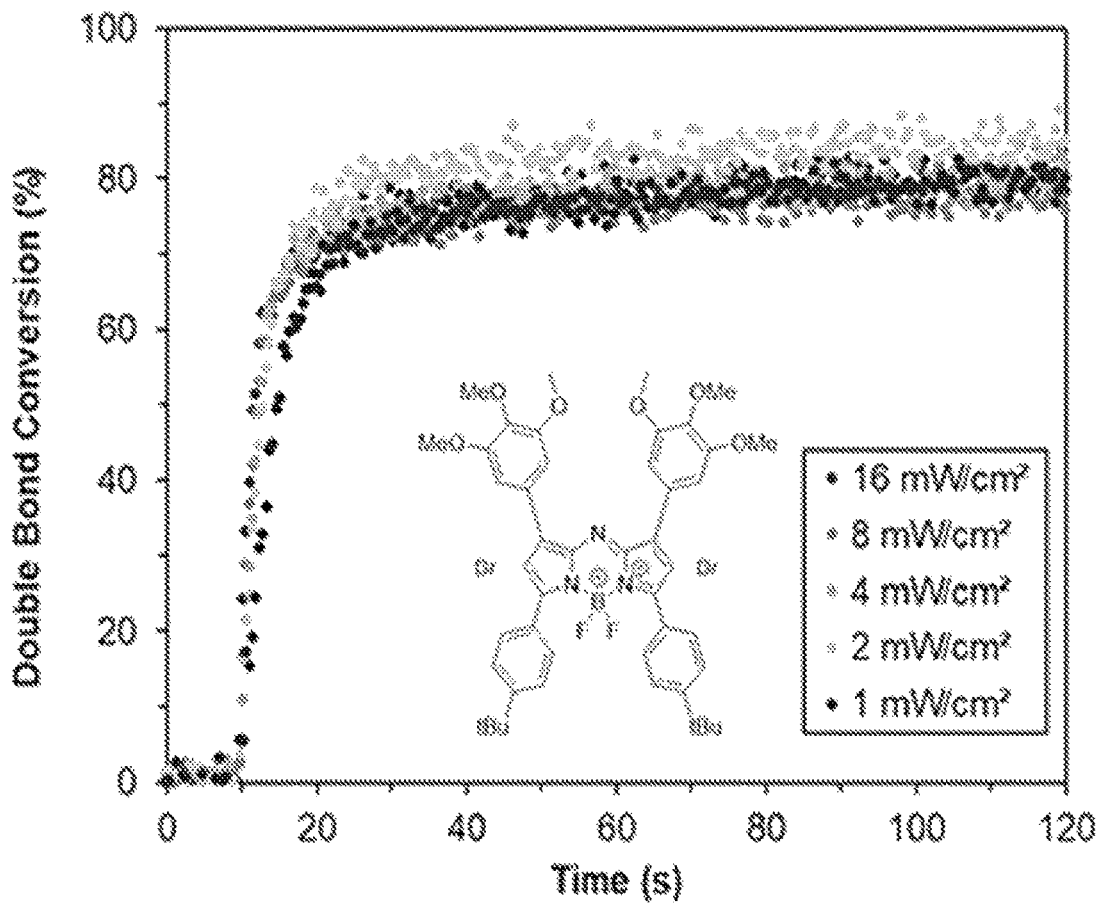
FIG. 55. Double bond conversion vs time ATR-FTIR data using various intensities of the 656 nm LED for photopolymerization with aza-Br.
Figure 56:
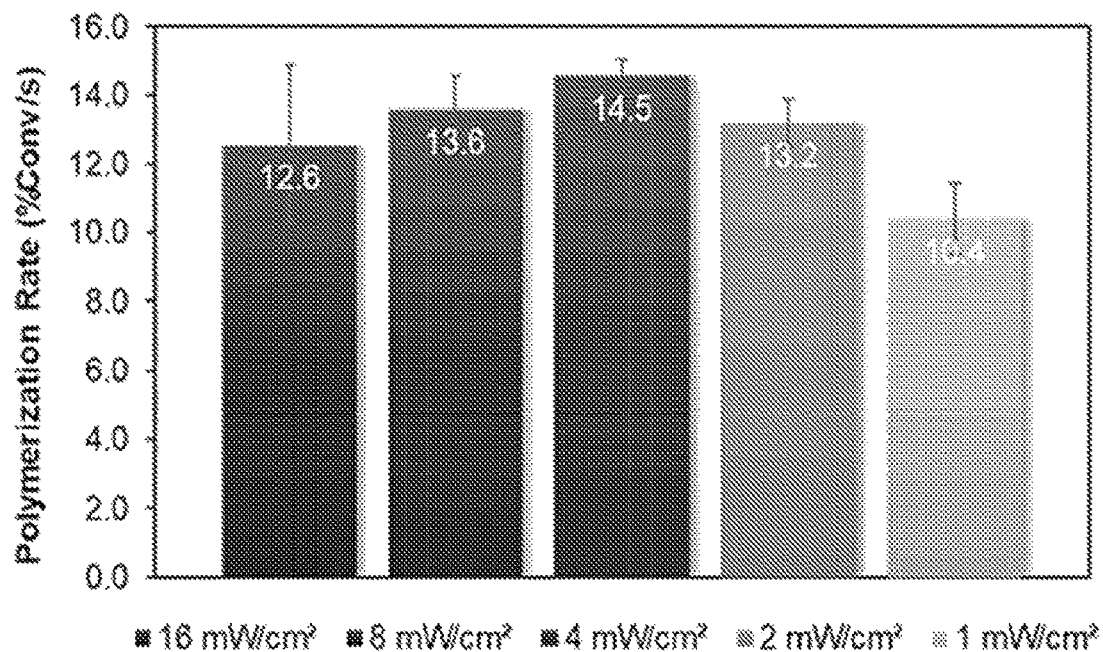
FIG. 56. Plot of data from FIG. 55 as rate of photopolymerization in % conversion/second for aza-Br using various intensities of the 656 nm LED.
Figure 57:
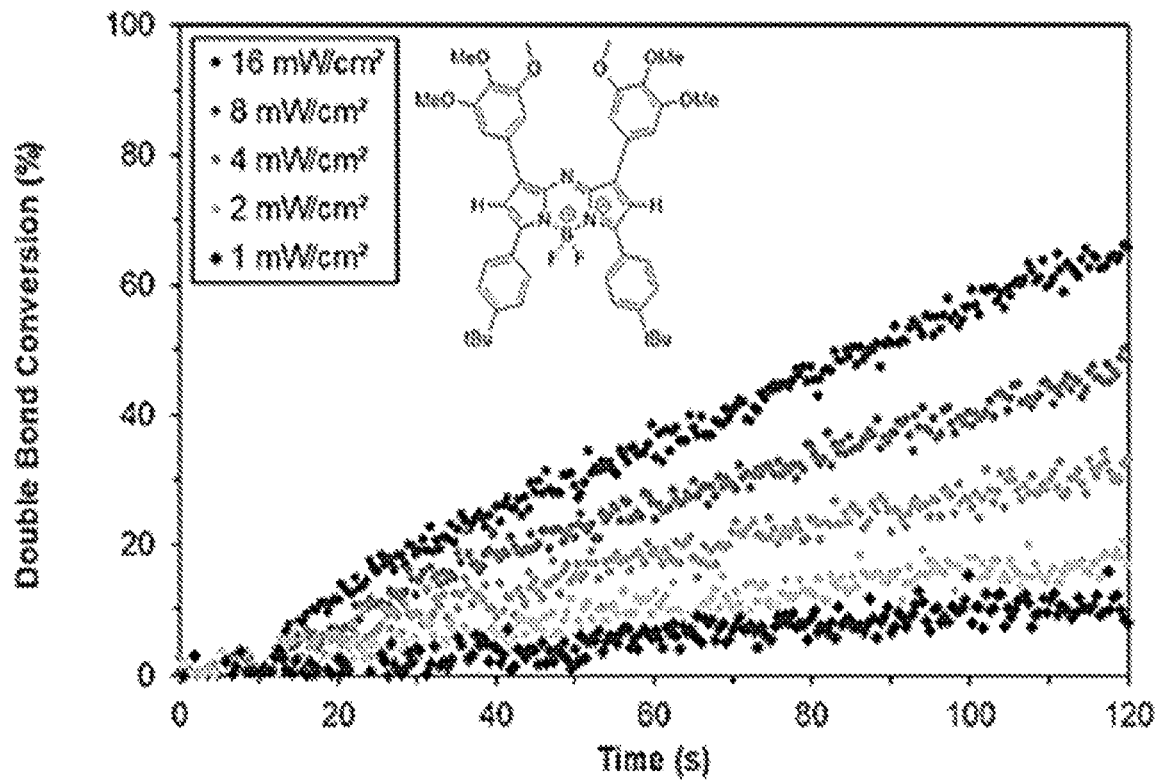
FIG. 57. Double bond conversion vs time ATR-FTIR data using various intensities of the 740 nm LED for photopolymerization with aza-H.
Figure 58:
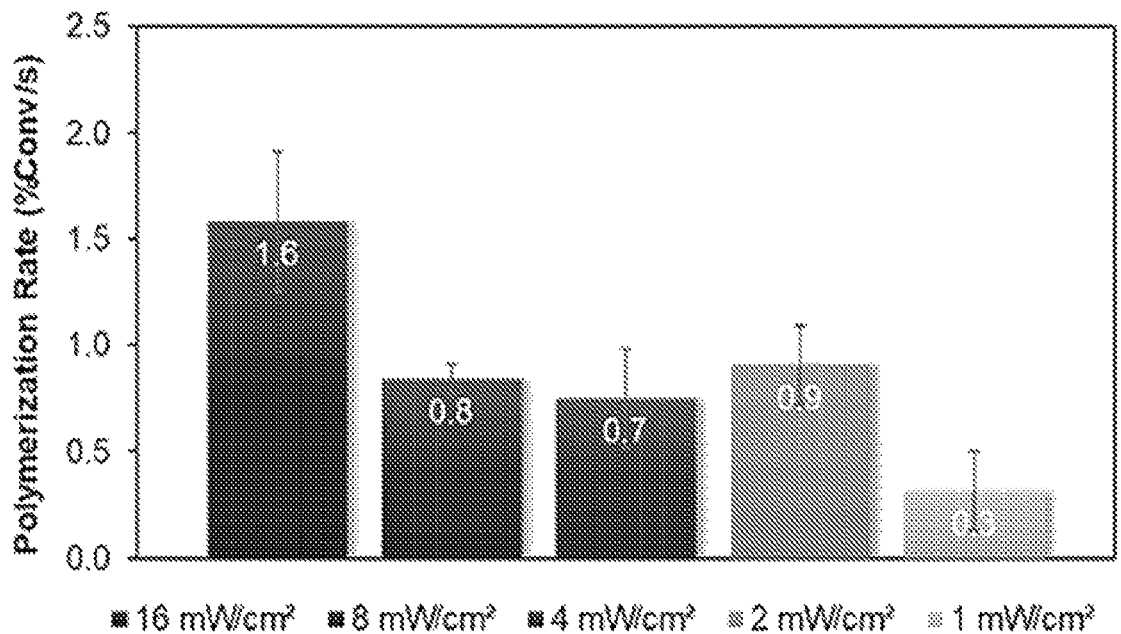
FIG. 58. Plot of data from FIG. 57 as rate of photopolymerization in % conversion/second for aza-H using various intensities of the 740 nm LED.
Figure 59:
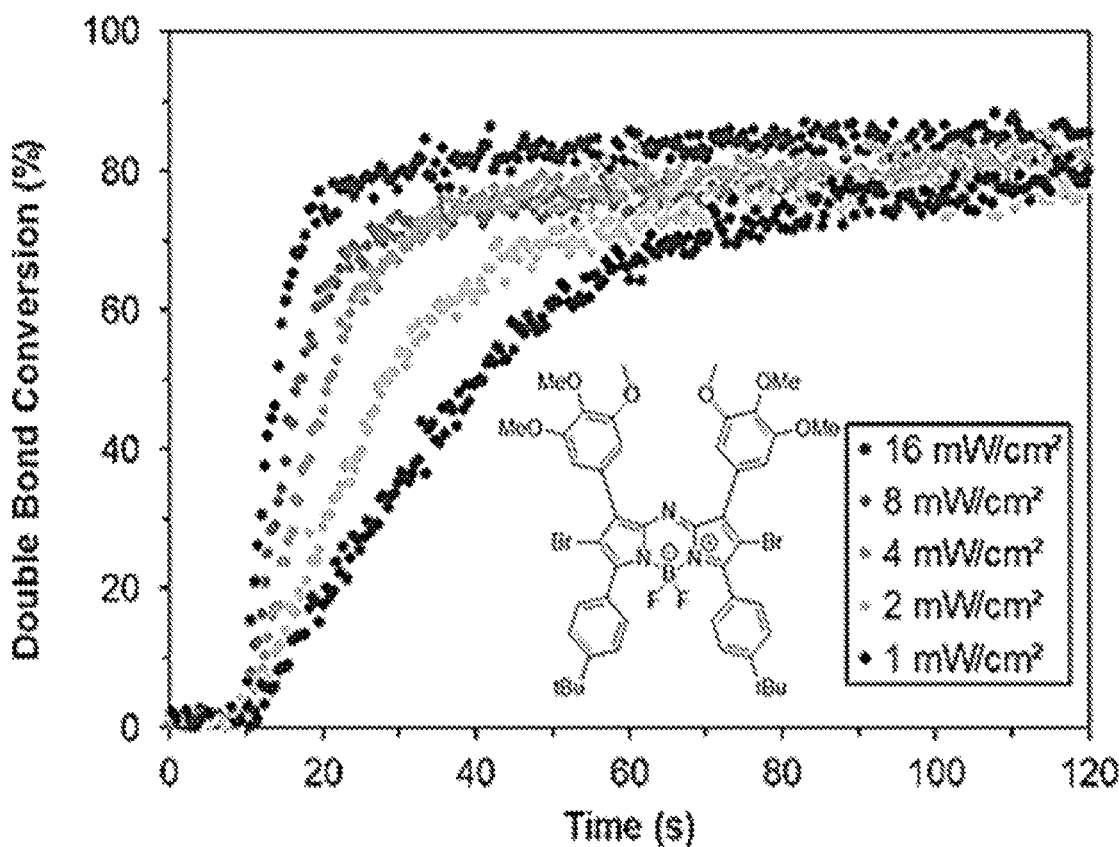
FIG. 59. Double bond conversion vs time ATR-FTIR data using various intensities of the 740 nm LED for photopolymerization with aza-Br.
Figure 60:
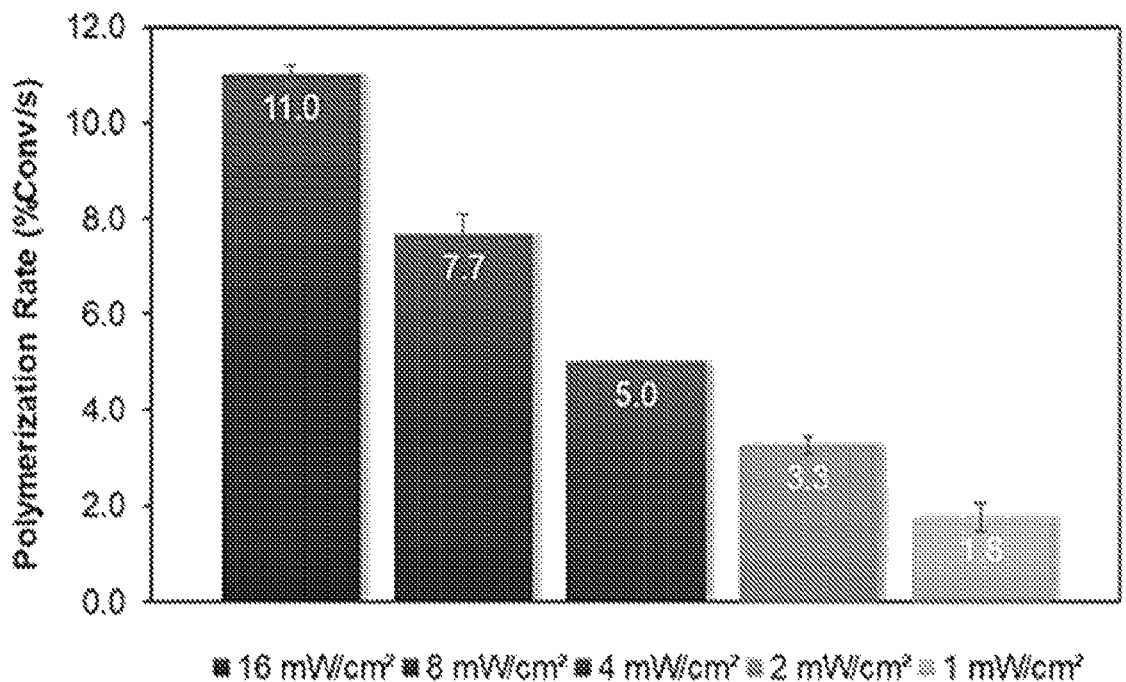
FIG. 60. Plot of data from FIG. 59 as rate of photopolymerization in % conversion/second for aza-Br using various intensities of the 740 nm LED.

Given the demonstrated significance of the heavy atom effect, the next aim was to develop BODIPY photocatalysts that operate effectively under irradiation from a NIR LED. To this end, the mesityl group at the meso bridgehead position was replaced with a nitrogen and the methyl substituents off the pyrrole units were replaced with phenyl rings. This substitution provides an aza-BODIPY core known to red shift absorbance by >100 nm (Sheng W et al. *Org. Lett.* 2018, 20 (9), 2620-2623; Adarsh N et al. *Org. Lett.* 2010, 12 (24), 5720-5723). Analogous to the modular Mes-BODIPY syntheses, acetophenone and benzaldehyde derivatives, as well as N-bromosuccinimide, were employed to provide both the hydrogen, aza-H, and bromine, aza-Br, functionalized dyes (Scheme 2). UV-vis absorption spectroscopy in dilute solution of the aza-H and aza-Br are shown in FIG. 50 and FIG. 51, respectively. As shown in FIG. 52, electron rich phenyl substituents were incorporated onto the aza-BODIPY scaffold to further red shift the absorption. In combination the phenyl and nitrogen functionality resulted in a ~135 nm $\lambda_{max}$ red shift compared to the mesityl BODIPY dyes; from ~525 nm (Mes-Br) to ~660 nm (aza-Br). Interestingly, halogenation of the aza-BODIPY resulted in a slight blue shift (~15 nm), in contrast to that observed for the Mes-BODIPY dyes (vide supra). This blue shift requires a higher photon flux to be used in order to normalize the number of photons absorbed when exciting with a NIR LED.

Figure 61:
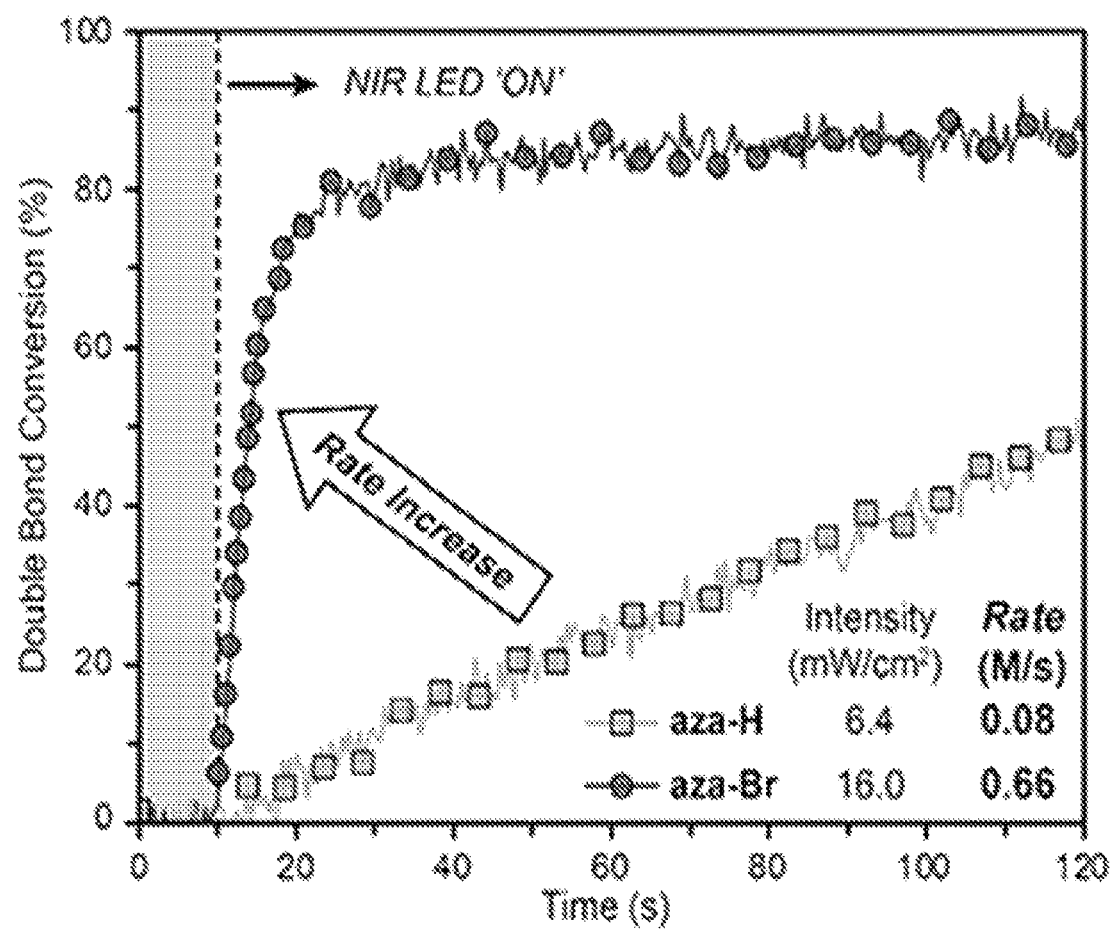
FIG. 61. Photopolymerization with aza-BODIPY under a 740 nm NIR LED. Plot of conversion vs time using an intensity that normalizes photons absorbed between the two aza-BODIPY derivatives. No polymerization is observed in the dark and upon irradiation aza-Br polymerizes at a rate ~8× faster than aza-H.
Figure 62:
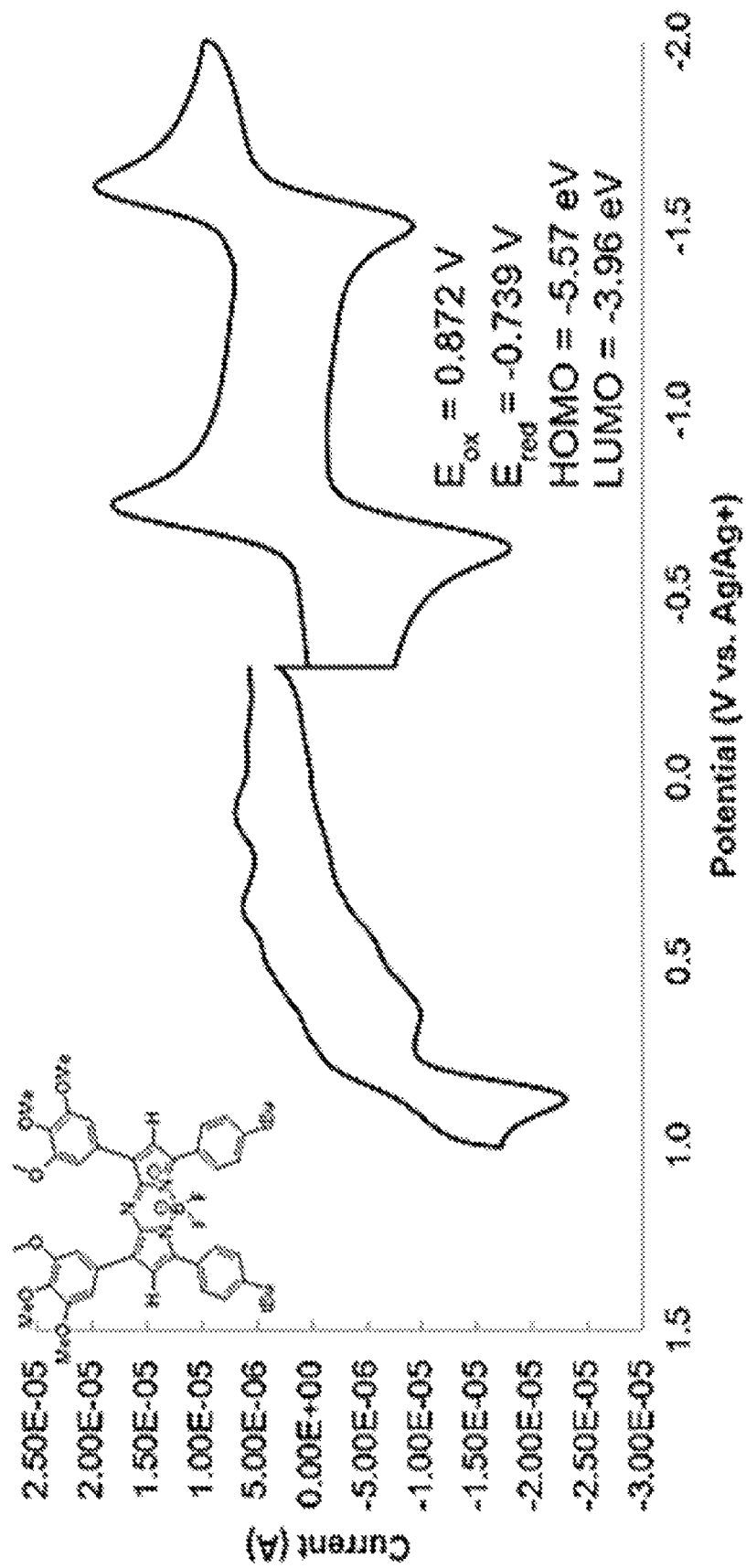
FIG. 62. Cyclic voltammogram of aza-H in acetonitrile.
Figure 63:
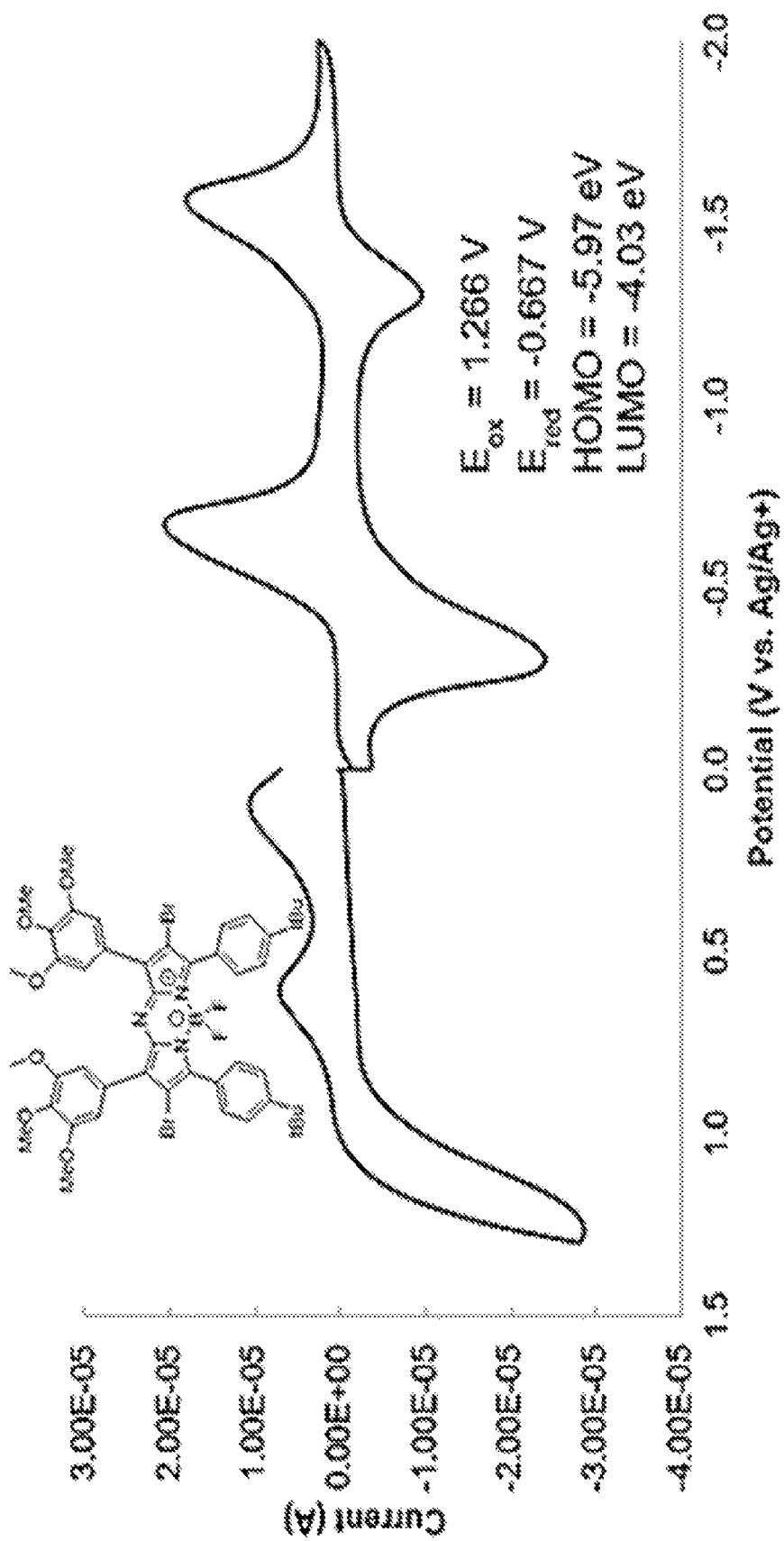
FIG. 63. Cyclic voltammogram of aza-Br in acetonitrile.

Using an analogous tricomponent photosystem with aza-BODIPY as the photosensitizer in place of mesityl-BODIPY, the polymerization of isobornyl acrylate was carried out under 656 nm (red) and 740 nm (NIR) LEDs at varying intensities (FIG. 53-FIG. 60). The overlap between aza-BODIPY absorbance and LED emission was again used to normalize the number of photons absorbed by tuning LED intensity, providing a means to directly compare photopolymerization efficiency. Monitoring the kinetics using the custom ATR-FTIR setup revealed a dramatic enhancement in polymerization rate when using aza-Br compared to aza-H, under both red and NIR irradiation (FIG. 61). Under NIR light aza-Br resulted in polymerizations that were ~8× faster than aza-H (0.66±0.03 M/s vs. 0.08±0.02 M/s), which corresponded to reaching maximum conversion in 11.4±0.9 seconds. Such rapid NIR photopolymerization is unprecedented. Cyclic voltammetry data was collected in acetonitrile (FIG. 62, FIG. 63) to determine the highest occupied molecular orbital (HOMO) and lowest unoccupied molecular orbital (LUMO) energy levels, as provided in Table 1. Similar to Mes-BODIPY dyes, transient absorption spectra of aza-Br and aza-H indicate that bromination leads to triplet formation via intersystem crossing that is competitive with the decay of the BODIPY S$_1$ state to its ground state. This leads to a longer-lived triplet population upon photoexcitation of aza-Br that can initiate polymerization, while it remains absent for aza-H. Thus, halogenation can enhance triplet formation via intersystem crossing and therefore halogenation can be a general method that can improve photopolymerization efficiency.

Figure 64:
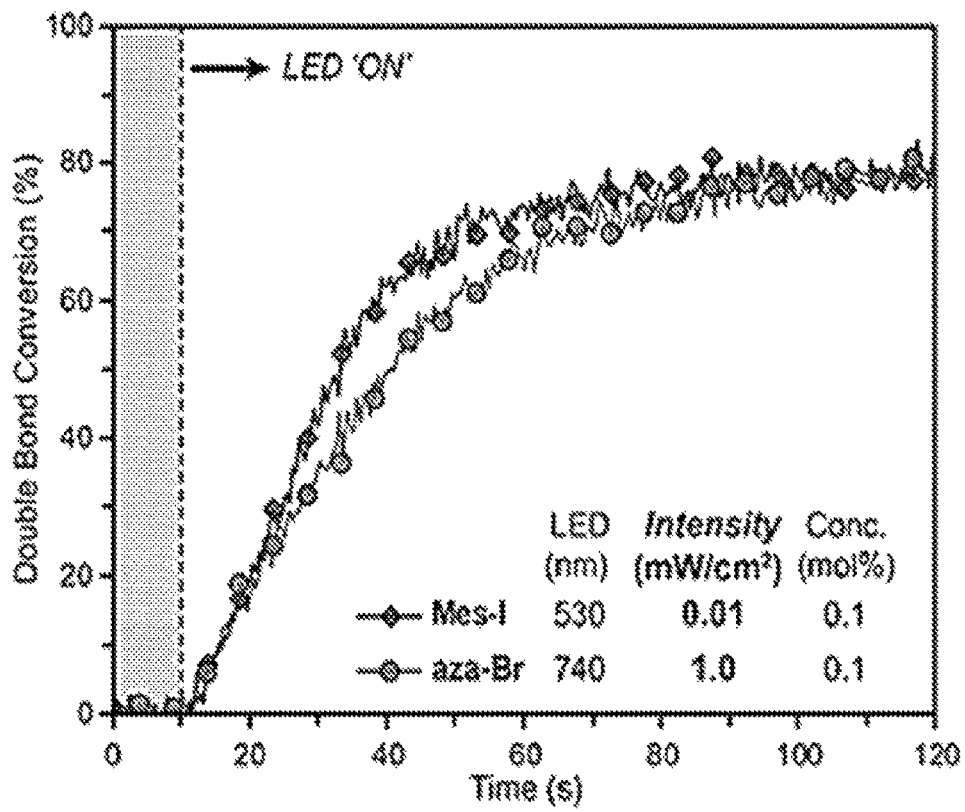
FIG. 64. Photopolymerization limits of exposure intensity for Mes-I and aza-Br under green (530 nm) and NIR (740 nm) irradiation, while maintaining near complete conversion within ~60 seconds.
Figure 65:
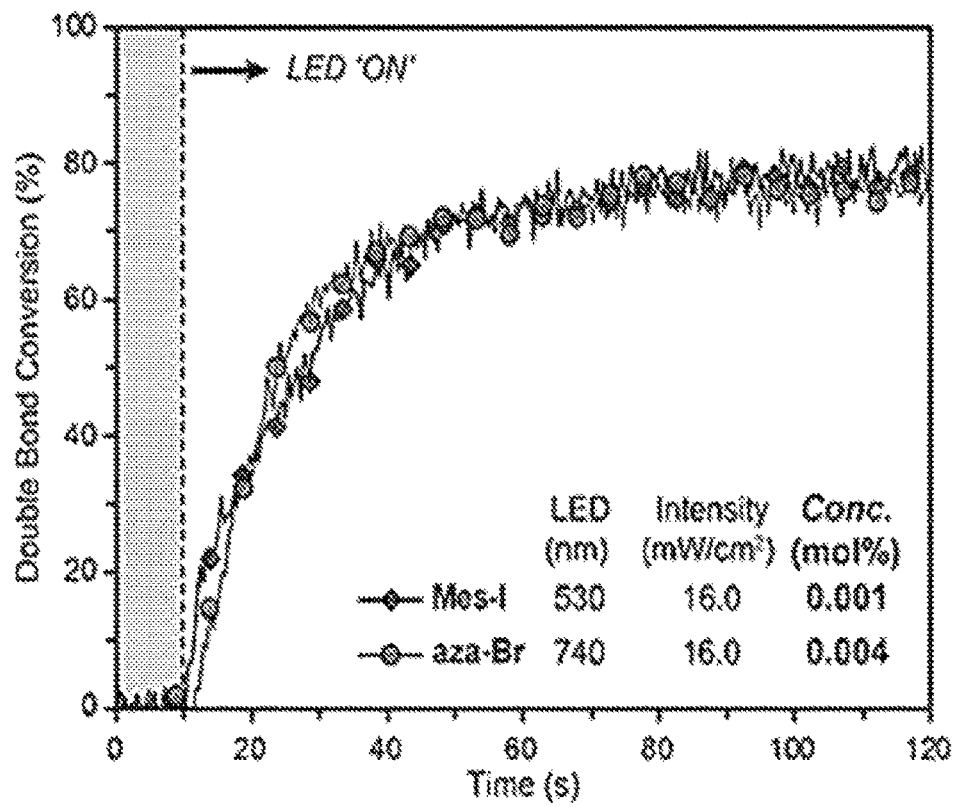
FIG. 65. Photopolymerization limits of photosensitizer concentrations for Mes-I and aza-Br under green (530 nm) and NIR (740 nm) irradiation, while maintaining near complete conversion within ~60 seconds.

To test the limits of photopolymerization, light intensity and catalyst loading were independently decreased for both Mes-I under green light and aza-Br under NIR light until it took ~60 s to reach maximum conversion. Using the optimized formulations a light intensity of 0.01 mW/cm$^2$ and 1 mW/cm$^2$ were found to be the lower bounds for green and NIR irradiation, respectively (FIG. 64). For context, the light intensity emitted by the screen of an iPhone 8 was measured to be ~0.1 mW/cm$^2$ at full brightness. Using an intensity of 16 mW/cm$^2$ for green and NIR light, a lower limit of 0.001 mol % catalyst loading (=47 µM) and 0.004 mol % (=188 µM) was found for Mes-I and aza-Br, respectively FIG. 65). Therefore, rapid photopolymerization can be achieved with low irradiation intensity and/or catalyst loading, which is conducive to a variety of applications and ultimately will save on energy and/or material costs.

As a further demonstration, rapid high resolution digital light processing 3D printing with visible light was performed using Mes-Br at 530 nm (~1.8 mW/cm$^2$). The selected photocurable resin comprised the optimized photosystem described above, and replaced isobornyl acrylate with N,N-dimethyl acrylamide and trimethylolpropane triacrylate as the monomer and crosslinker in a 4:1 ratio, respectively. Complex 3D printed structures were successfully 3D printed. The exposure time correlates to a fast build rate that was comparable to state-of-the-art digital light processing 3D printers on the market that rely on high energy UV to violet light (~385-405 nm) for photopolymerization (Wallin T J et al. *Nat. Rev. Mater.* 2018, 3 (6), 84-100).

Concluding remarks. Halogenation of BODIPY dyes was demonstrated to be an effective strategy to improve the efficiency of light driven polymerizations. Systematic kinetic and optoelectronic characterization of a series of halogenated BODIPY derivatives unveiled structure property insight to explain the observable efficiency enhancement. Real time ATR-FTIR with custom bottom-up irradiation was used to quantitatively characterize polymerization rate, showing that halogenation of BODIPY dyes with either mesityl or nitrogen functionality at the meso bridgehead position resulted in a 5-8× higher polymerization rate upon exposure to green, red, or NIR light. Fluorescence quenching studies suggested that electron donation into the photoexcited BODIPY dyes (i.e., reductive quenching) was the primary mechanistic pathway for radical generation. This mechanism was also supported by a larger energetic driving force identified from cyclic voltammetry and density functional theory. Transient absorption spectroscopy confirmed that the presence of "heavy atoms" (e.g., halogens) results in faster intersystem crossing rates, which corresponds to higher triplet yields and longer excited state lifetimes. In turn, the longer lifetimes improve photocatalytic efficiency by increasing the number of collisions that occur per photon absorbed between BODIPY in the excited state and an initiator. Furthermore, the halogenated BODIPY derivatives were shown to provide unprecedented photopolymerization rates (complete conversion within ~60 s) given low catalyst loadings (~0.001 mol %) and/or low light intensities (~0.01 mW/cm$^2$ green light or ~1 mW/cm$^2$ NIR light). The rapid kinetics were exploited for high resolution digital light processing 3D printing using a low energy green LED. These results are particularly exciting to inform the development of more efficient NIR photocatalysts that absorb beyond 750 nm, which can extend the utility of photopolymers to include the formation of strong and lightweight hybrid composites and biocompatible tissue scaffolds.

Abbreviations: LED, light emitting diode; PI, photoinitiator; PS, photosensitizer; NIR, near infrared; UV, ultraviolet; FTIR, Fourier transform infrared; ATR, attenuated total reflectance; BODIPY, boron-dipyrromethene; Mes, mesityl; ISC, intersystem crossing; QY, quantum yield; CV, cyclic voltammetry; HOMO, highest occupied molecular orbital; LUMO, lowest unoccupied molecular orbital; DLP, digital light processing Example 2—Rapid High Resolution Visible Light 3D Printing Abstract. The design and formulation of panchromatic photopolymer resins is reported herein and applied to rapid high resolution visible light 3D printing. Resin optimization revealed the combination of electron deficient iodonium and electron rich borate co-initiators facilitated efficient acrylic photocuring via sensitization by blue to red light absorbing chromophores. To confine curing to irradiation zones and improve spatial resolution in the x,y, and in particular, z-dimensions, three different azo-dyes were incorporated in the resins as opaquing agent (OA) compounds that attenuate light otherwise absorbed by the corresponding photosensitizer. A custom digital light processing 3D printer with exchangeable low energy visible LEDs was designed, along with a screening method to quickly identify best manufacturing conditions (e.g., exposure time and opaquing agent concentration). These conditions were systematically correlated to x,y,z-resolution, curing kinetics, and mechanical performance to optimize build speed and resolution and provide nearly isotropic mechanical properties. The versatility of this system was demonstrated using red light to print both stiff and elastic materials, as well as high resolution customized 3D objects.

Introduction. 3D printing has revolutionized the way the world creates, influencing nearly every aspect of modern society—from the consumer market to aerospace and medical technologies (Narupai B et al. ACS Macro Lett. 2020, 627-638; Wallin T J et al. Nat. Rev. Mater. 2018, 3 (6), 84-100; Ligon S C et al. Chem. Rev. 2017, 117 (15), 10212-10290; Truby R L et al. Nature 2016, 540 (7633), 371-378). With the help of computer-aided design, digital objects with customized form factors are generated and realized through successive layering of material (i.e., additive manufacturing). The technology has gained traction in-part by overcoming efficiency issues and intermediary processes, such as milling, carving, and machining, affiliated with conventional manufacturing. To date, there exists a number of elegant 3D printing methods including extrusion (e.g., fused deposition modeling), vat photopolymerization (e.g., stereolithography, SLA, and digital light processing, DLP), powder bed fusion (e.g., selective laser sintering), and material and binder jetting (e.g., inkjet and aerosol) (Narupai B et al. ACS Macro Lett. 2020, 627-638; Wallin T J et al. Nat. Rev. Mater. 2018, 3 (6), 84-100; Ligon S C et al. Chem. Rev. 2017, 117 (15), 10212-10290; Truby R L et al. Nature 2016, 540 (7633), 371-378). Each method has unique advantages and challenges that present opportunities, such as shorter build times, milder operating conditions, and better resolution. Among them, stereolithography and digital light processing (and often material jetting) utilize light to transform matter from liquid resins to solid objects (i.e., photocuring) (Tumbleston J R et al. Science (80-.). 2015, 347 (6228), 1349-1352; Kelly B E et al. Science (80-.). 2019, 363 (6431), 1075-1079; Walker D A et al. Science (80-.). 2019, 366 (6463), 360-364; Jung K et al. Adv. Mater. 2019, 1903850; del Barrio J et al. Adv. Opt. Mater. 2019, 7 (16), 1900598; Bagheri A et al. ACS Appl. Polym. Mater. 2019, 1(4), 593-611; Zhang J et al. Polym. Chem. 2018, 9 (13), 1530-1540; Chatani S et al. Polym. Chem. 2014, 5 (7), 2187-2201). Digital light processing in particular has drawn wide attention owing to several attractive features, namely some of the fastest build rates (>100 mm/h and <5 s/layer), highest feature resolutions (<100 μm features), wide ink viscosity tolerances (up to ~5,000 cP), small footprint (benchtop compatible), and low cost (starting at ~$300) (Wallin T J et al. Nat. Rev. Mater. 2018, 3 (6), 84-100; Tumbleston J R et al. Science (80-.). 2015, 347 (6228), 1349-1352; Kelly B E et al. Science (80-.). 2019, 363 (6431), 1075-1079).

Figure 66:
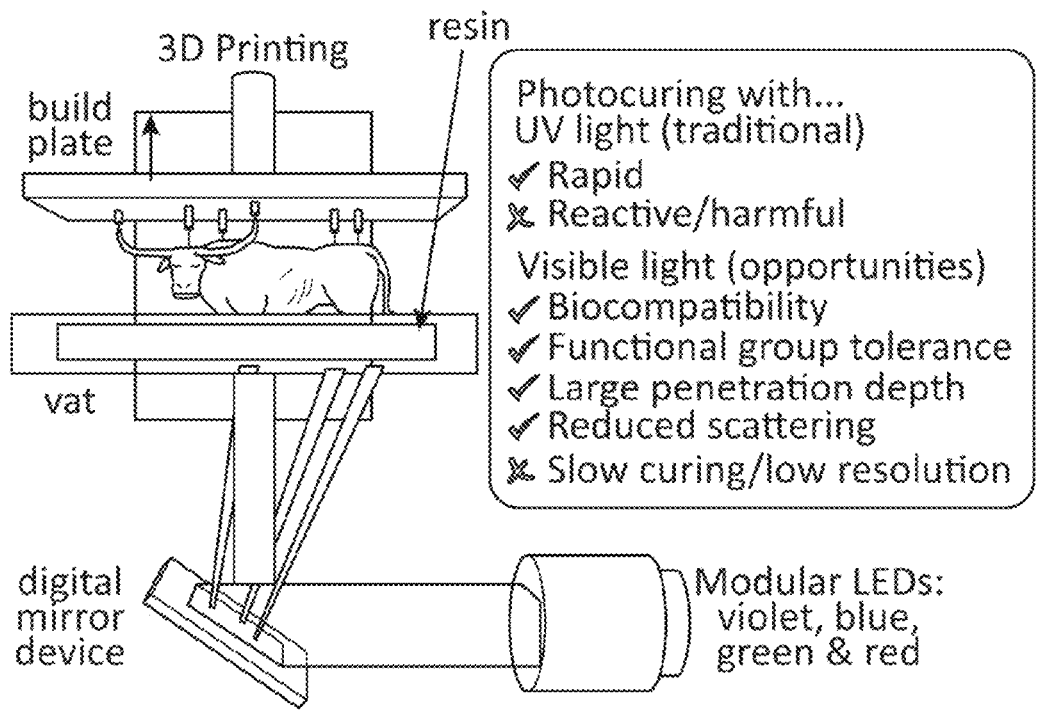
FIG. 66. Presented method and opportunities offered by high resolution visible light 3D printing. Illustration shows the general working mechanism for digital light processing (DLP), with custom exchangeable light emitting diodes (LEDs).

Contemporary photocuring processes in 3D printing are initiated by high energy ultraviolet (UV) light, which provides rapid polymerization and correspondingly short build times (~seconds). As an alternative, visible light offers numerous benefits, including reduced cost and energy of irradiation from readily available and modular light emitting diodes (LEDs), improved biocompatibility and functional group tolerance, greater depth of penetration, and reduced scattering (FIG. 66) (Bagheri A et al. ACS Appl. Polym. Mater. 2019, 1 (4), 593-611; Chatani S et al. Polym. Chem. 2014, 5 (7), 2187-2201; Xiao P et al. Prog. Polym. Sci. 2015, 41 (C), 32-66; Bagheri A et al. ACS Appl. Polym. Mater. 2019, 1 (7), 1896-1904; Dumur F. Catalysts 2019, 9 (9), 736; Strehmel B et al. Chem.—A Eur. J. 2019, 25 (56), 12855-12864). As such, visible light photocuring has the potential to enable next generation designer material fabrication, including, inter alia, hydrogels containing live cells (Lim K S et al. Chem. Rev. 2020, 120(19), 10662-10694), opaque composites (Strehmel B et al. Chem.—A Eur. J. 2019, 25 (56), 12855-12864), and wavelength-selective multi-material structures (Schwartz J J et al. Nat. Commun. 2019, 10 (1), 791; Bialas S et al. Adv. Mater. 2019, 31(8), 1807288; Dolinski N D et al. Adv. Mater. 2018, 30 (31), 1800364; Zhang X et al. Macromolecules 2017, 50 (15), 5652-5660; Kottisch V et al. J. Am. Chem. Soc. 2017, 139 (31), 10665-10668; Peterson B M et al. ACS Cent. Sci. 2018, 4 (9), 1228-1234) that promise to advance a range of applications, from structural plastics to tissue engineering and soft robotics.

Nonetheless, the utility of low energy visible LEDs (>420 nm) has never been demonstrated for stereolithography- or digital light processing-based 3D printing. The following challenges have precluded the development of visible light 3D printing for practical implementation: (i) inefficient photocuring required to facilitate rapid (>10 mm/h or <30 s/layer) and high resolution (<100 μm features) printing and (ii) commercial availability of a modular visible-light based 3D printer. To the first point, improving visible light photocuring efficiency requires a mechanistic understanding of how the reactive curing agents (e.g., radicals) are generated.

Following absorption of light by a chromophore, photocuring can occur by one of two mechanisms: (i) direct photolysis of a photoinitiator (PI) or (ii) electron/energy transfer from a photosensitizer (PS) to an initiator followed by bond scission to generate radicals or ions (Garra P et al. Prog. Polym. Sci. 2019, 94, 33-56; Blasco E et al. Adv. Mater. 2017, 29 (15), 1604005; Matsui J K et al. ACS Catal. 2017, 7 (4), 2563-2575; Dadashi-Silab S et al. Chem. Rev. 2016, 116 (17), 10212-10275; Chen M et al. Chem. Rev. 2016, 116 (17), 10167-10211). Although the use of a photoinitiator provides rapid photocuring, it relies on a "forbidden" $n \rightarrow \pi^*$ transition, which generally results in low molar absorptivity and is restricted to short wavelengths of light (<420 nm, violet)—exceptions being titanocenes (Bagheri A et al. ACS Appl. Polym. Mater. 2019, 1(4), 593-611) and acylgermanes (Haas M et al. Chem.—A Eur. J. 2018, 24 (33), 8258-8267) that extend to slightly longer wavelengths (~500 nm, blue/green). In contrast, the use of a photosensitizer allows for excitation via a $\pi \rightarrow \pi^*$ transition, providing strong absorption that can extend to longer wavelengths (>500 nm, green to NIR). Leaders in the field of visible photoredox catalysis have demonstrated visible-NIR photocuring of a variety of resins, primarily comprising acrylic and epoxy monomers and crosslinkers (Bagheri A et al. ACS Appl. Polym. Mater. 2019, 1(4), 593-611; Bagheri A et al. ACS Appl. Polym. Mater. 2020, 2 (2), 782-790; Zhang Z et al. Angew. Chemie—Int. Ed. 2019, 58 (50), 17954-17963). However, due to the two step mechanism the cure times are typically slow (>60 s) and require relatively high irradiation intensities (>20 mW/cm$^2$) that are impractical for standard digital light processing technology.

Herein, visible light photoinitiating systems for 3D printing are discussed. Resin optimization was facilitated by real time Fourier transform infrared (RT-FTIR) spectroscopy and photorheology, and printing enabled by a custom digital light processing system containing modular visible LEDs, as depicted schematically in FIG. 66. Comprehensive studies on curing kinetics, resolution, and mechanical properties were conducted and versatility was established through printing both stiff and soft resins. The present approach demonstrates a broad and effective strategy for rapid high resolution digital light processing 3D printing across the visible spectrum.

Experimental Details

Materials/Chemicals. All chemicals were used as received unless otherwise noted. Phenylbis(2,4,6-trimethylbenzoyl) phosphine oxide (BAPO, Sigma-Aldrich), camphorquinone (CQ, Chem-Impex), H-Nu470 (Spectra Group Limited), Rose Bengal lactone (Sigma-Aldrich), Zinc tetraphenylporphyrin (ZnTPP, TCI Chemicals), 2-(butyryloxy)-N,N,N-trimethylethan-1-aminium butyltriphenylborate (Borate V, Spectra Group Limited), and [4-(octyloxy)phenyl](phenyl) iodonium hexafluoroantimonate diphenyliodonium (H-Nu254, Spectra Group Limited) were used as photoinitiators or photosensitizers.

Sudan I (Sigma-Aldrich), Sudan IV (Chem-Impex), and Sudan black B (Chem-Impex) were used as opaquing agents (OAs).

N,N-Dimethylacrylamide (DMA, Sigma-Aldrich), trimethylolpropane triacrylate (TMPTA, Alfa aesar), 2-hydroxyethyl acrylate (HEA, TCI Chemicals), tetraethylene glycol diacrylate (TEGDA, TCI Chemicals) were used as monomers/crosslinkers and inhibitors were removed prior to experiment by running through a plug of aluminum oxide activated (basic, Brockmann I) for all monomers.

Sample Preparation. Resin formulations used in this study are summarized in Table 4. Samples were formulated in the dark to avoid unnecessary onset of polymerization and carefully bubbled with nitrogen gas to remove dissolved oxygen in the resin.

TABLE 4

Resin formulations used in this study.

| Formulation | Photoinitiator or Photosensitizer (wt %)$^a$ | Donor (wt %)$^a$ | Acceptor (wt %)$^a$ | Opaquing agent (wt %)$^a$ | Resin (wt %) | crosslinker (wt %) |
|---|---|---|---|---|---|---|
| Stiff violet | TPO* (0.5) | N/A | N/A | Sudan I (0.04) | DMA (80) | TMPTA (20) |
| Stiff blue | H-Nu470 (0.1) | Borate | Iodonium | N/A | | |
| Stiff blue (camphorquinone) | Camphorquinone (1) | (0.2) | (2) | Sudan I (0.01) | | |
| Stiff green | Rose Bengal lactone (0.1) | | | Sudan IV (0.01) | | |
| Stiff red | ZnTPP (0.3) | | | Sudan black (0.002) | | |
| Soft violet | TPO* (0.5) | N/A | N/A | Sudan I (0.04) | HEA (99.9) | TEGDA (0.1) |
| Soft blue | H-Nu470 (0.1) | Borate V | Iodonium | Sudan I (0.01) | | |
| | | (0.2) | (2) | | | |
| Soft green | Rose Bengal lactone (0.1) | | | Sudan IV (0.01) | | |
| Soft red | ZnTPP (0.3) | | | Sudan black (0.002) | | |

$^a$Percent by weight of total monomers (resins and crosslinkers)
*TPO = Phenylbis(2,4,6-trimethylbenzoyl)phosphine oxideoxide Light source and intensity measurement. For the MTR spectroscopy and photorheology experiments, violet, blue, green, and red light was provided by a collimated, LED-based illumination source with an emittance centered at 405 nm, 460 nm, 530 nm, and 617 nm, respectively, used in combination with a current-adjustable LED driver for intensity control. Light was delivered via a liquid light guide. Irradiation intensities were measured with Thorlabs PM100D photometer equipped with silicon-based photodiode power sensor (S120VC, Thorlabs).

Figure 67:
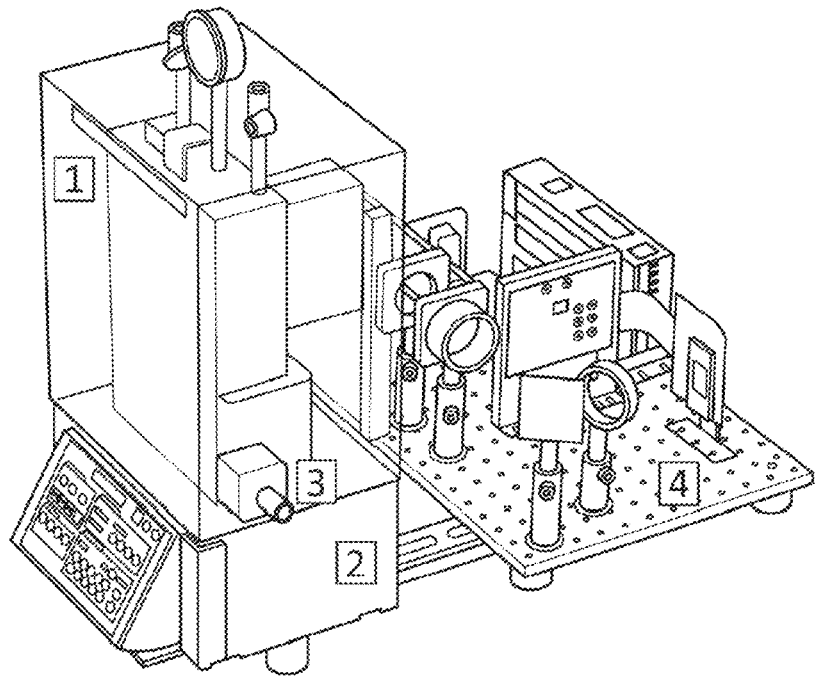
FIG. 67. Labelled 3D rendered images of custom-made digital light processing-based visible light 3D printer setup. 3D printer with $N_2$ chamber—1: $N_2$ chamber, 2: DLD 3D printer, 3: $N_2$ inlet, 4: visible LEDs projector.
Figure 68:
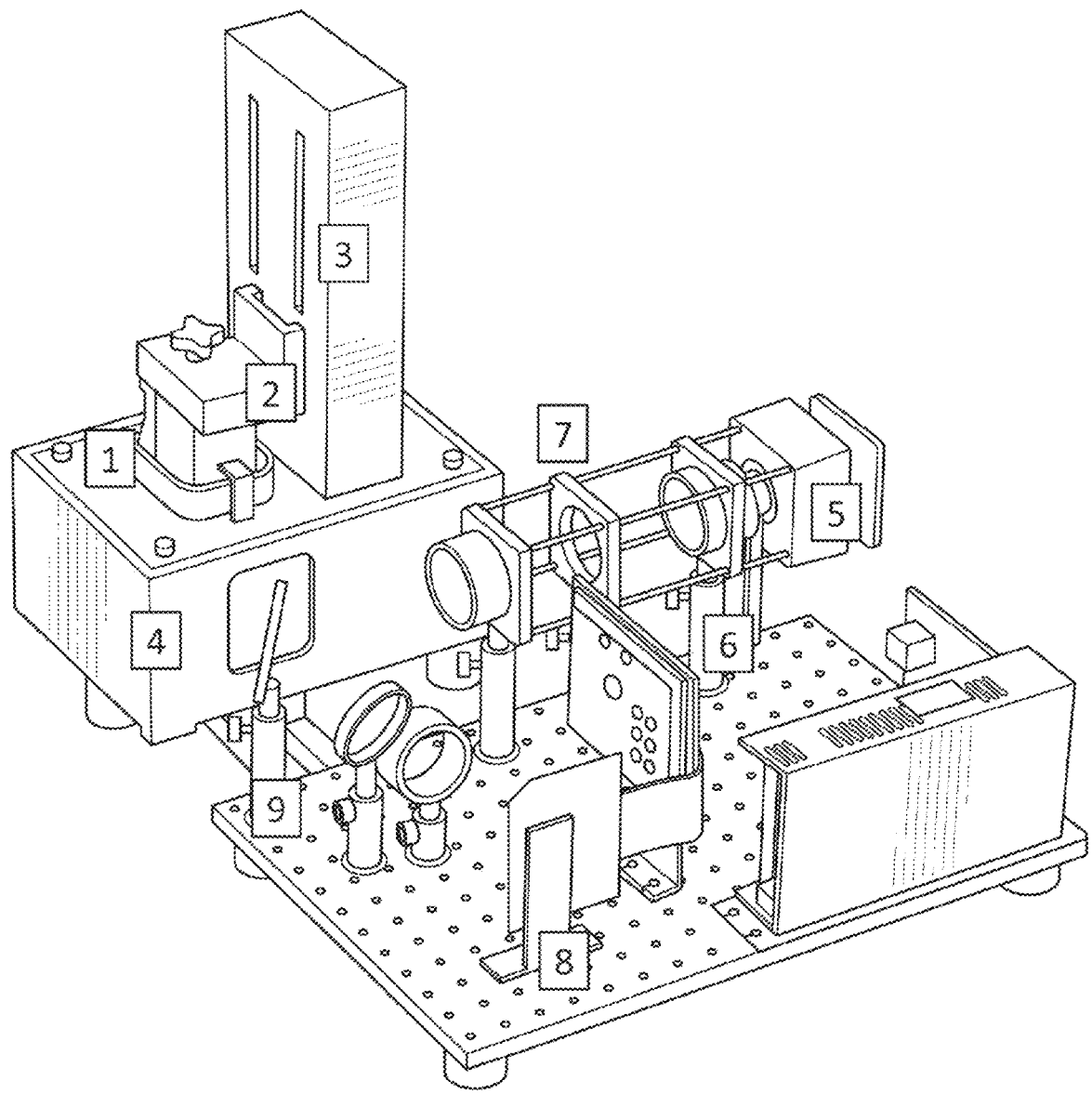
FIG. 68. Labelled 3D rendered images of custom-made digital light processing-based visible light 3D printer setup. Labelled diagram of printer parts (1: Vat, 2: Build platform, 3: Arduino, 4: Mirror) and projector parts (5: Modular visible LEDs, 6: collimation lens, 7: diffuser, 8: digital mirror device (DMD) chip, 9: mirror).

3D printing. Visible LEDs. 3D printing was performed using custom-made, digital light processing-based 3D printer (Monoprinter, MA, USA), as depicted in FIG. 67 and FIG. 68. The printer includes modular visible LEDs, which provides different wavelengths of light—emission centered at 405 nm (violet, Luminus CBT-120-UV), 460 nm (blue, Luminus PT-120-B), 525 nm (green, Luminus PT-120-G), and 613 nm (red, Luminus PT-120-RA). The surface emitting area of the LEDs is 12 mm². Variable currents up to 30 A can be applied to the LEDs. Full width at half maximum (FWHM) of each LED was 16, 20, 34, and 19 for violet, blue, green, and red light, respectively.

Specification. The projector resolution was 1920×1080 pixels, and a single pixel has dimensions of 20 μm×20 μm. The minimum achievable layer thickness is 25 μm; however, 100 μm was chosen throughout this study to keep consistent experimental parameters with other experiments including RT-FTR, UV-vis spectroscopy, tensile tests, and photorheology. The build size is 38.4 mm×21.6 mm and the vat has dimensions of 56 mm×35 mm (length and width of area containing resin) with a height of 25 mm. A transparent fluorinated polymer film (Teflon FEP film, DuPont) was attached to the bottom of the resin tank to prevent resin from sticking to the vat and to deliver the emission of LED light for resin curing. Custom-made software (MonoWare) was used to import a STL design file and digitally slice it into a sequence of 2D image files. Detailed experimental parameters for 3D printing of visible light curable resin formulations are summarized in Table 5.

the opaquing agent used in each resin. Resin formulations (stiff violet to stiff red) used in study are summarized in Table 4.

Digital Microscope. Height profiles. A digital microscope (VHX-5000, Keyence) was used to create a 3D map of the corners on each square, which was placed in the top half of the resolution print. Both thickness and side-wall angle (SWA) were measured. The digital microscope was elevated along the z-axis at vertical pitch of 5 μm while continuously capturing images, which were combined to construct a 3D image.

Surface area. Top surface area of 1, 2, 4, 8, 16 pixel-wide patterns (bottom half of each square on resolution print) was measured to determine the optimal opaquing agent concentrations and slice exposure times. Based on the brightness of the optical images collected from the digital microscope, the areas of the top surface of the pillars were recorded for each resin with varying opaquing agent concentrations.

RT-FIR. Resin formulations were introduced between two glass slides separated by spacers (either 100 μm or 250 μm) to maintain the constant sample thickness over the course of photopolymerization. Each sample was placed in a horizontal transmission accessory (A043-N/Q, Bruker) equipped

TABLE 5

Experimental parameters for 3D printing of visible light curable resin formulations.

| Formulation | Light intensities at vat surface (mW/cm²) | Slice exposure time (sec) Base layer | Slice exposure time (sec) Normal layer | Maximum rate of polymerization at the printer intensity (mol %/sec) | Build rate (mm/hr) Including re-positioning & re-coating process | Build rate (mm/hr) Without re-positioning & re-coating process |
|---|---|---|---|---|---|---|
| Violet | 3.3 | 12 | 8 | 9.3 | 29.5 | 45.0 |
| Blue | 3.4 | 12 | 8 | 5.7 | 29.5 | 45.0 |
| Green | 1.8 | 12 | 8 | 11.1 | 29.5 | 45.0 |
| Red | 2.1 | 12 | 11 | 7.4 | 23.7 | 32.7 |

Figure 69:
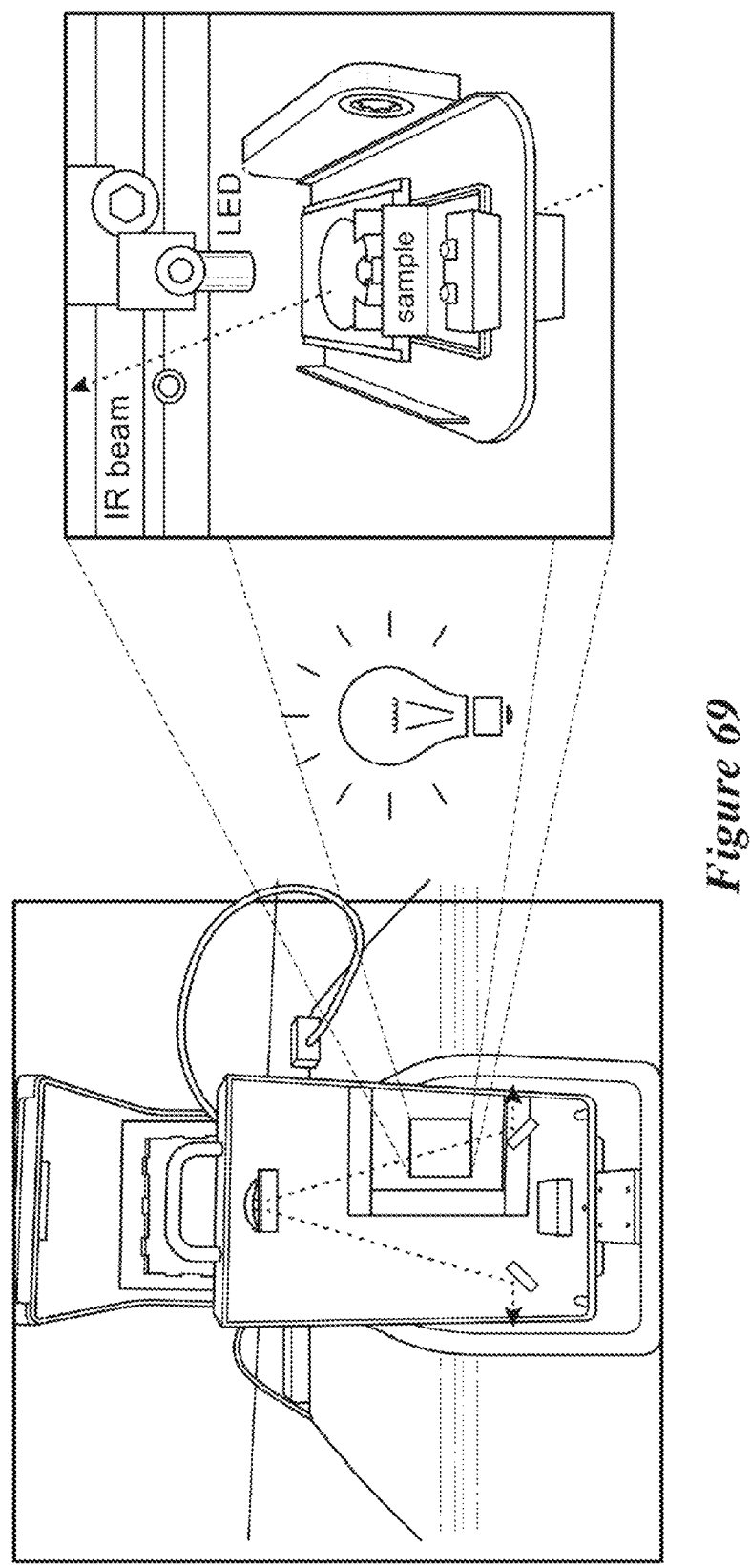
FIG. 69. FTIR setup with horizontal transmission accessory for real time monitoring of photopolymerization.

UV-visible spectroscopy. Resin formulations (with no dye and optimized dye concentration) were injected between two glass slides separated by 100 μm thick spacer. Each sample was then placed on a transmission horizontal accessory (Stage RTL-T, Ocean Optics) equipped with UV-vis spectroscopy (Ocean Optics). Spectra were collected from 200 to 800 nm. The extinction coefficient of the photoinitiator or photosensitizer used was calculated based on the absorptivity of resin formulations. Spectra of resin formulation with no dye were subtracted from spectra of optimized dye-containing resin formulation to investigate the absorption of with MTR spectroscopy (Bruker). Spectra were collected from 2000 cm$^{-1}$ to 7000 cm$^{-1}$ at a rate of 11 every 4 sec. The functional group conversion upon light exposure was determined by monitoring the disappearance of the peak area centered at 6161 cm$^{-1}$ corresponding to the acrylate group stretch. FIG. 69 shows the MTR setup with horizontal transmission accessory used for real time monitoring of photopolymerization. Table 6 summarizes resin formulations and experimental parameters for MR tests, aiming to screen for the best combinations for 3D printing.

TABLE 6

Resin formulations and experimental parameters for FTIR tests.

| λ (nm) | Light intensity (mW/cm²) | photoinitiator or photosensitizer (wt %) | Co-initiator 1 (wt %) | Co-initiator 2 (wt %) | Photo-polymerization rate (mol/s) |
|---|---|---|---|---|---|
| 530 | 10 | (0.1) Eosin Y | (0.2) Borate V | (2) H-Nu254 | 0.97 |
|  |  | (0.1) Rose Bengal | (0.2) Borate V | (2) H-Nu254 |  |
| 617 | 10 | (0.05) H-Nu640 | (0.2) Borate V | (2) H-Nu254 | 0.09 |
|  |  | (0.1) H-Nu640 | (0.2) Borate V | (2) H-Nu254 | 0.07 |
|  |  | (0.05) H-Nu640MP | (0.2) Borate V | (2) H-Nu254 | 0.10 |
|  |  | (0.1) H-Nu640MP | (1) Borate V | (2) H-Nu254 | 0.10 |
|  |  | (0.1) H-Nu640MP | (1) TEOA | (2) H-Nu254 | 0.03 |
|  |  | (0.1) H-Nu640MP | (1) EDMAB | (2) H-Nu254 | 0.03 |
|  |  | (0.1) H-Nu640MP | (1) 4-dppba | (2) H-Nu254 | 0.05 |

TABLE 6-continued

Resin formulations and experimental parameters for FTIR tests.

| λ (nm) | Light intensity (mW/cm$^2$) | photoinitiator or photosensitizer (wt %) | Co-initiator 1 (wt %) | Co-initiator 2 (wt %) | Photo-polymerization rate (mol/s) |
|---|---|---|---|---|---|
| | | (0.1) H-Nu640MP | (1) TTMSS | (2) H-Nu254 | 0.03 |
| | | (0.1) H-Nu640MP | (1) Phenylglycine | (2) H-Nu254 | 0.03 |
| | | (0.1) H-Nu640MP | (1) Methyl-thiadiazole-thiol | (2) H-Nu254 | 0.09 |
| | | (0.1) Rose Bengal | (0.2) Borate V | (2) H-Nu254 | No rxn |
| | | (0.1) Naphthofluorescein | (0.2) Borate V | (2) H-Nu254 | No rxn |
| | | (0.1) H-Nu640MP | (0.2) TEOA | (2) H-Nu254 | No rxn |
| | | (0.1) ZnTPP | (1) Borate V | (2) H-Nu254 | 1.90 |
| | | (0.1) ZnTPP | (0.2) Borate V | (2) H-Nu254 | 2.68 |
| | 5 | (0.1) ZnTPP | (0.2) Borate V | (2) H-Nu254 | 2.33 |
| | 2 | (0.1) ZnTPP | (0.2) Borate V | (2) H-Nu254 | 0.71 |
| | | (0.3) ZnTPP | (0.2) Borate V | (2) H-Nu254 | 1.74 |
| | | (0.5) ZnTPP | (0.2) Borate V | (2) H-Nu254 | 0.95 |
| | 1.85 | (0.1) ZnTPP | (0.2) Borate V | (2) H-Nu254 | 0.43 |
| | | (0.2) ZnTPP | (0.2) Borate V | (2) H-Nu254 | 0.77 |
| | | (0.3) ZnTPP | (0.2) Borate V | (2) H-Nu254 | 1.11 |
| | | (0.4) ZnTPP | (0.2) Borate V | (2) H-Nu254 | 0.85 |
| | | (0.5) ZnTPP | (0.2) Borate V | (2) H-Nu254 | 1.02 | cf) Sample thickness was identical (250 μm)

Photo-rheology. Photorheology experiments were completed using a Discovery Hybrid Rheometer manufactured by TA Instruments (TA Instruments, DE, USA). The rheometer was equipped with a "UV Light Guide" accessory, disposable 20 mm diameter acrylic bottom plate, and 20 mm diameter geometry upper aluminum parallel plate. A liquid light guide was used to illuminate the UV attachment. The light guide was attached to an LED lamp (405 nm, 460 nm, 530 nm, or 617 nm), which was hooked up to an LED Driver from which light intensity could be controlled via computerized LED driver program. Each sample was tested in triplicate at printer light intensity (3.3 mW/cm$^2$ for 405 nm, 3.4 mW/cm$^2$ for 460 nm, 1.8 mW/cm$^2$ for 530 nm, and 2.1 mW/cm$^2$ for 617 nm). The rheometer was set to run for two data acquisition cycles with the following experimental parameters: 1. Conditioning (Axial Force=0 N), 2. Dynamic Time Sweep at 1% strain (60 s), 3. Fast Oscillation Step at 1% strain (50 s), and 4. Dynamic Time Sweep at 1% strain (60 s). The gap height was set to 100 μm for each experiment. The resin samples were degassed immediately before each experiment and the experimental setup was flooded with N$_2$ gas to try and maintain similar conditions to those of the 3D printer. Additionally, the light was not turned on during the experiment until 10 s into the fast oscillation step. Storage modulus (G') and loss modulus (G") were monitored in real time and the light was turned off following visible inflection of the data points. To determine the gel point (where storage and loss modulus cross), first G' was normalized by taking its average from the first dynamic time sweep and subtracting this number from the G' values recorded in the fast oscillation step. Next, the fast oscillation step G' and G" were plotted as a function of time and the observed time point at which the moduli crossed or changed in concavity was taken to be the point of gelation minus 10 seconds from the light being off.

Tensile test. 3D printed dog bones were post-cured with UV lamp for 20 min. 3D printed dog bones were pulled on under air at room temperature using tensile tester (AGS-500NXD, SHIMADZU) equipped with load cell (500 N load cell capacity) at a crosshead speed of 0.05 mm/sec. 3D printed dog bones have dimensions of 1.11 mm (thickness), 1.76 mm (gauge width), and 22.8 mm (gauge length). Experiments were repeated more than 5 times for each sample and all of obtained results were averaged and displayed.

Figure 70:
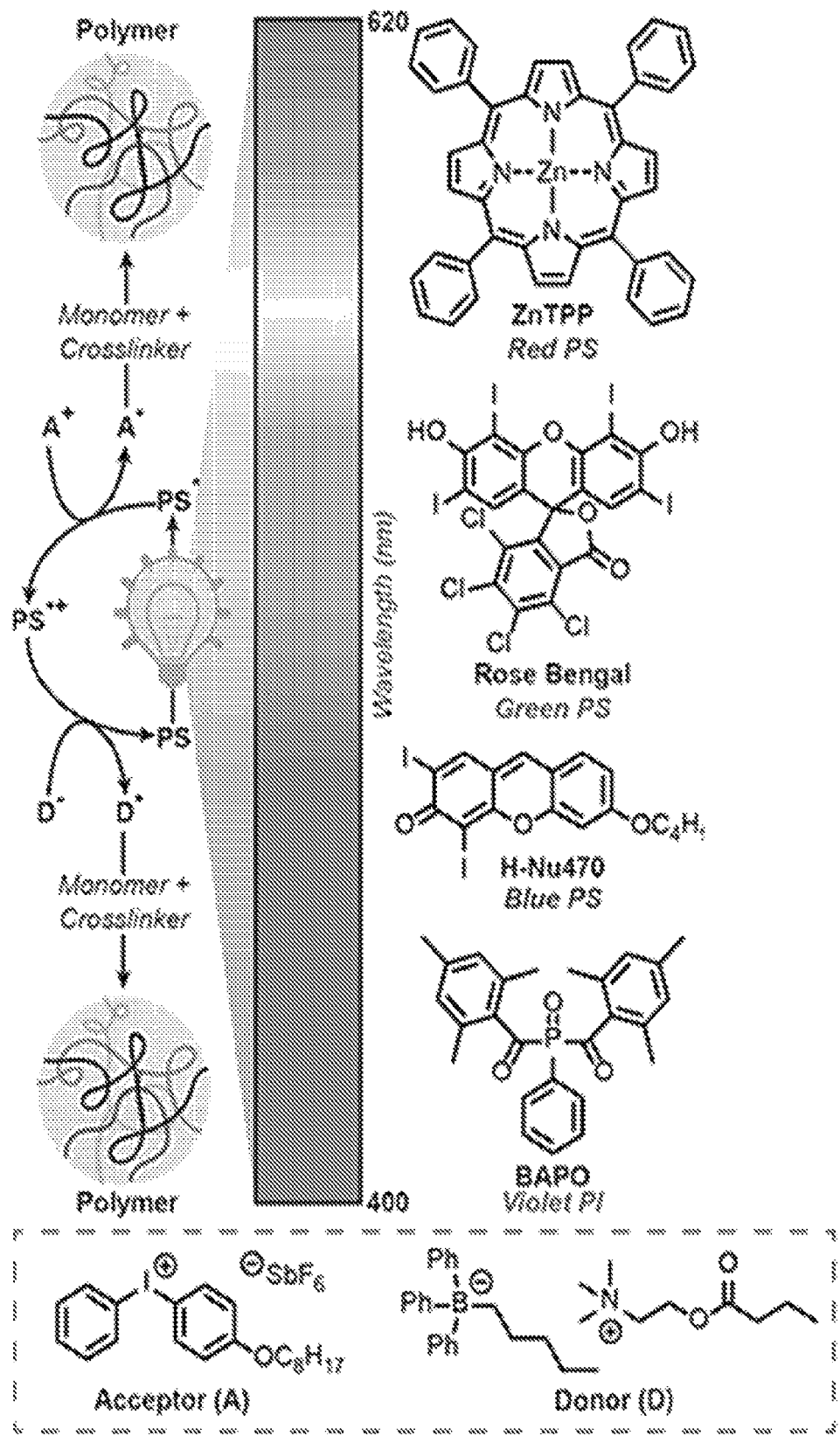
FIG. 70. Visible light curing chemistry employed. General photoredox catalytic cycle (oxidative quenching) for a three component curing system (left). Chemical structures for selected photoinitiator (PI) and photosensitizer (PS) compounds that react under violet, blue, green, or red light (right). Chemical structures for iodonium acceptor (A) and borate donor (D) initiators that enable rapid photocuring (bottom).
Figure 71:
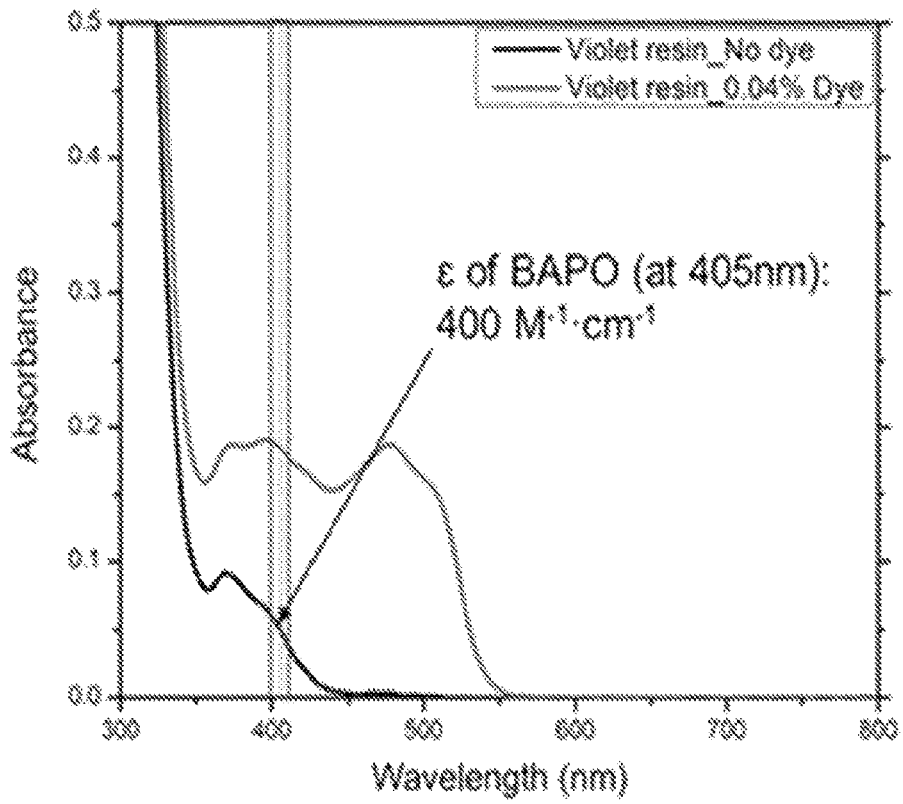
FIG. 71. UV-vis absorption spectra and calculated molar absorptivity of violet resin (with no dye and optimized dye).
Figure 72:
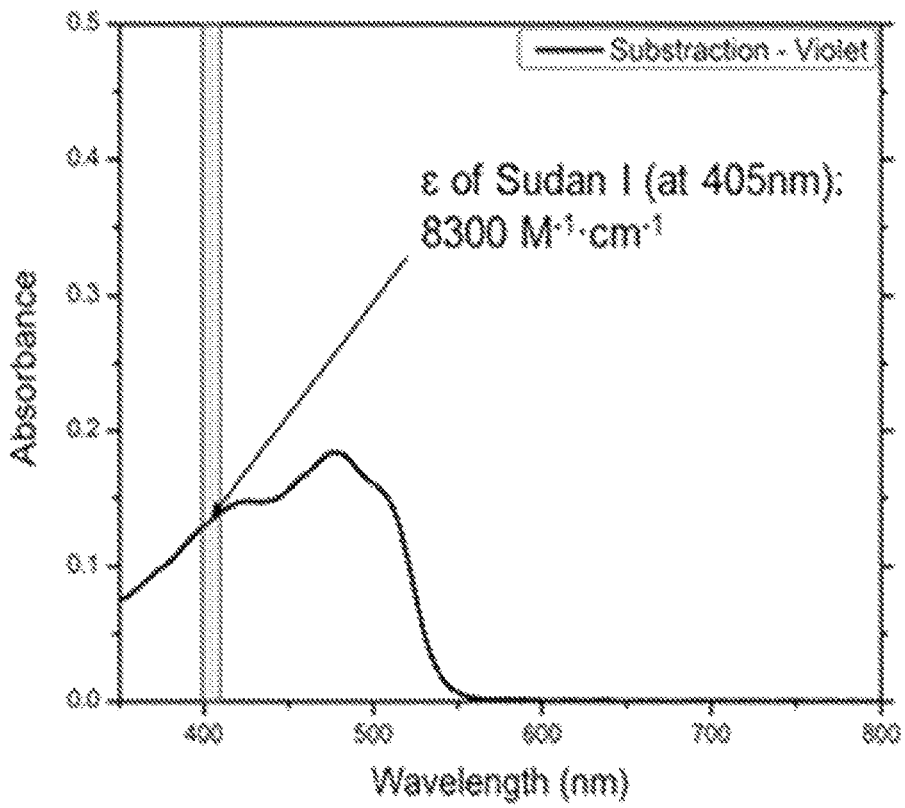
FIG. 72. UV-vis absorption spectra and calculated molar absorptivity of violet resin with no dye subtracted from violet resin with optimized dye.
Figure 73:
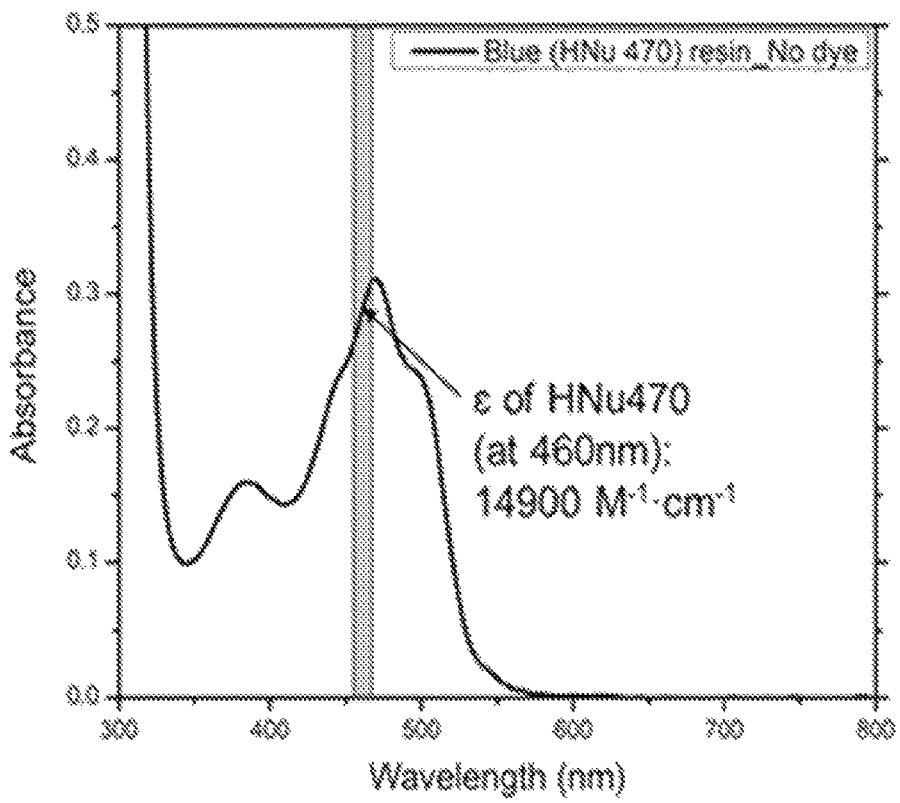
FIG. 73. UV-vis absorption spectra and calculated molar absorptivity of H-Nu470-containing blue resin.
Figure 74:
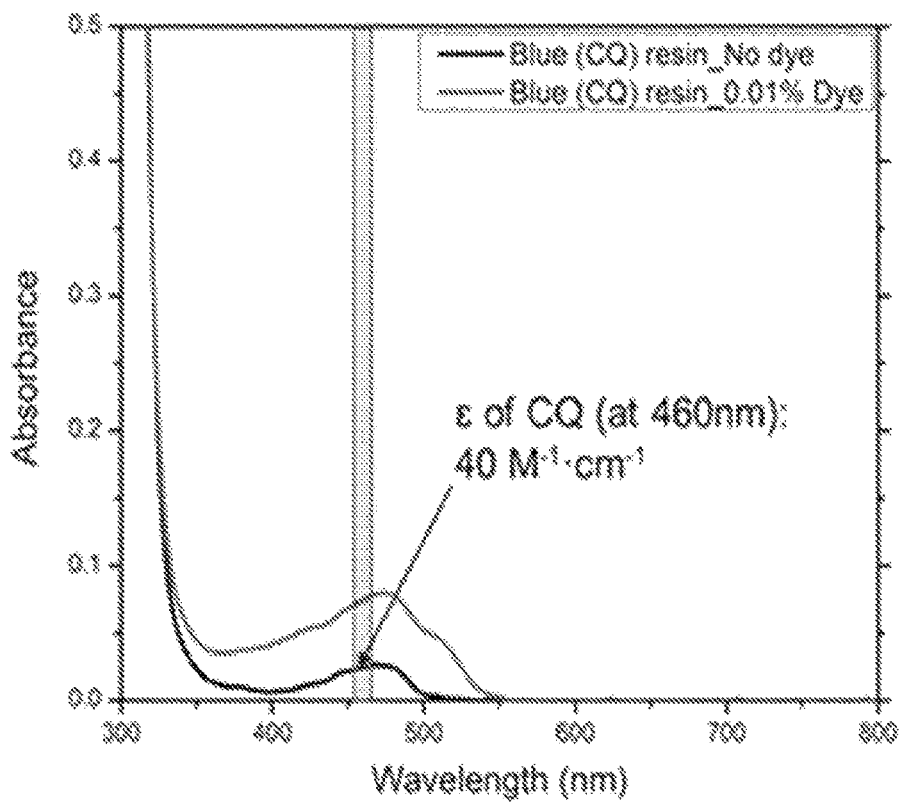
FIG. 74. UV-vis absorption spectra and calculated molar absorptivity of camphorquinone-containing blue resin (with no dye and optimized dye).
Figure 75:
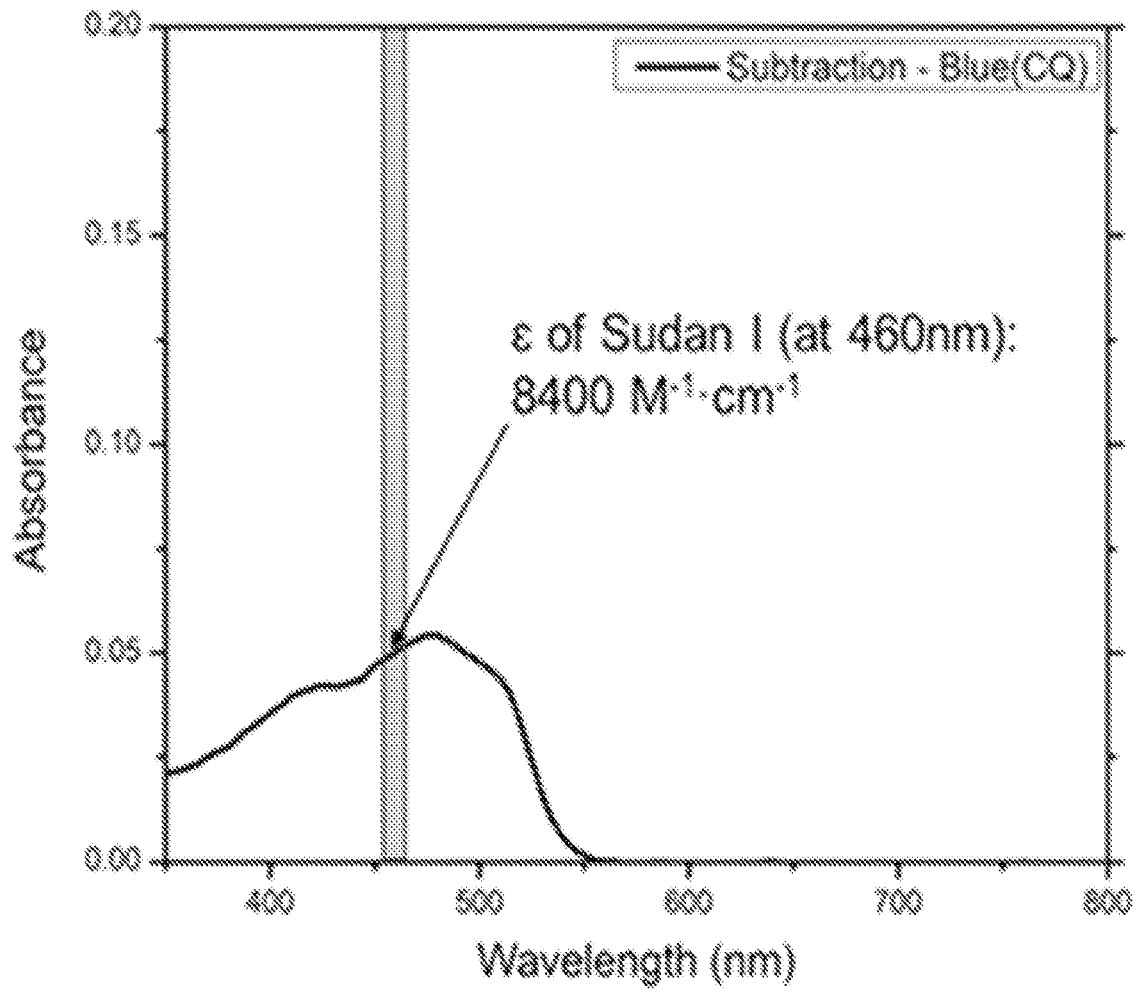
FIG. 75. UV-vis absorption spectra and calculated molar absorptivity of camphorquinone-containing blue resin with no dye subtracted from that with optimized dye.
Figure 76:
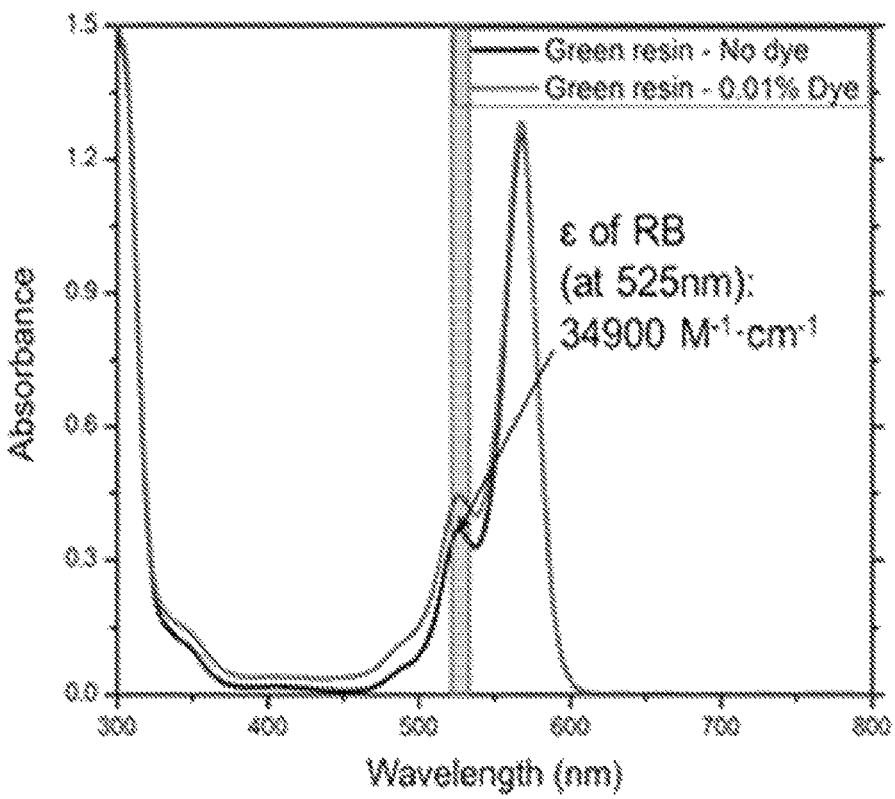
FIG. 76. UV-vis absorption spectra and calculated molar absorptivity of green resin (with no dye and optimized dye).
Figure 77:
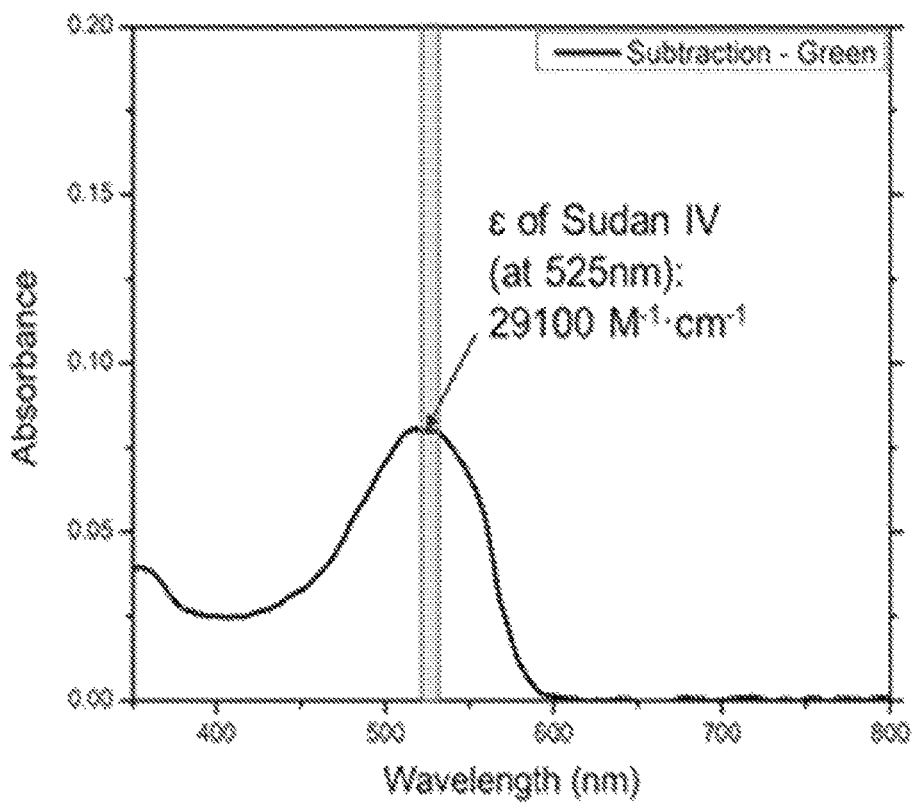
FIG. 77. UV-vis absorption spectra and calculated molar absorptivity of green resin with no dye subtracted from that with optimized dye.
Figure 78:
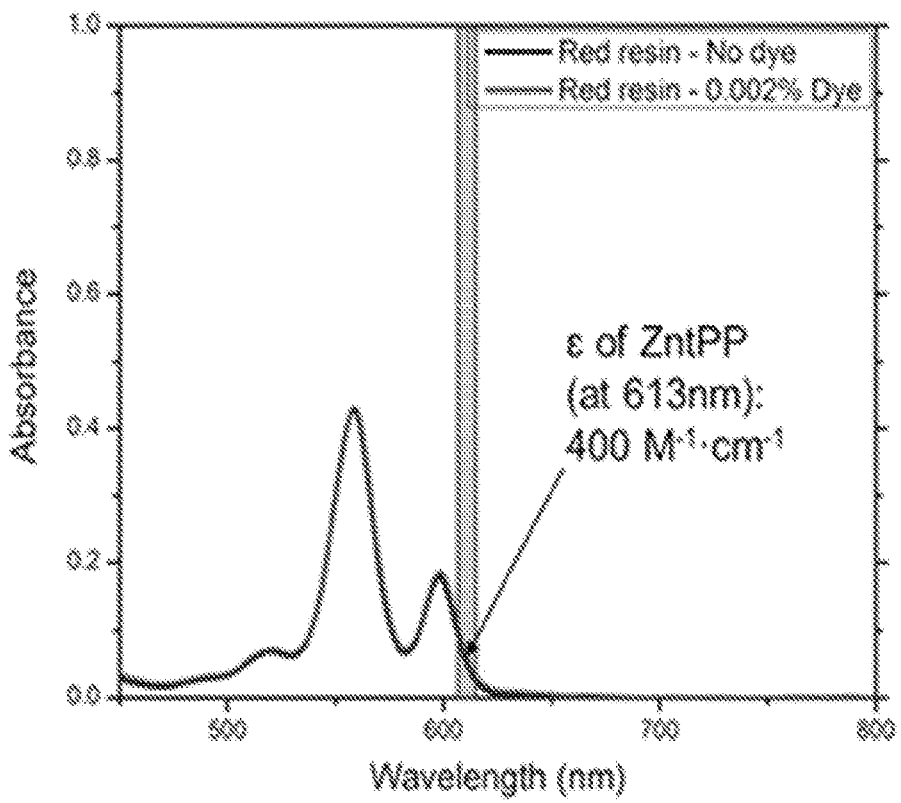
FIG. 78. UV-vis absorption spectra and calculated molar absorptivity of red resin (with no dye and optimized dye).
Figure 79:
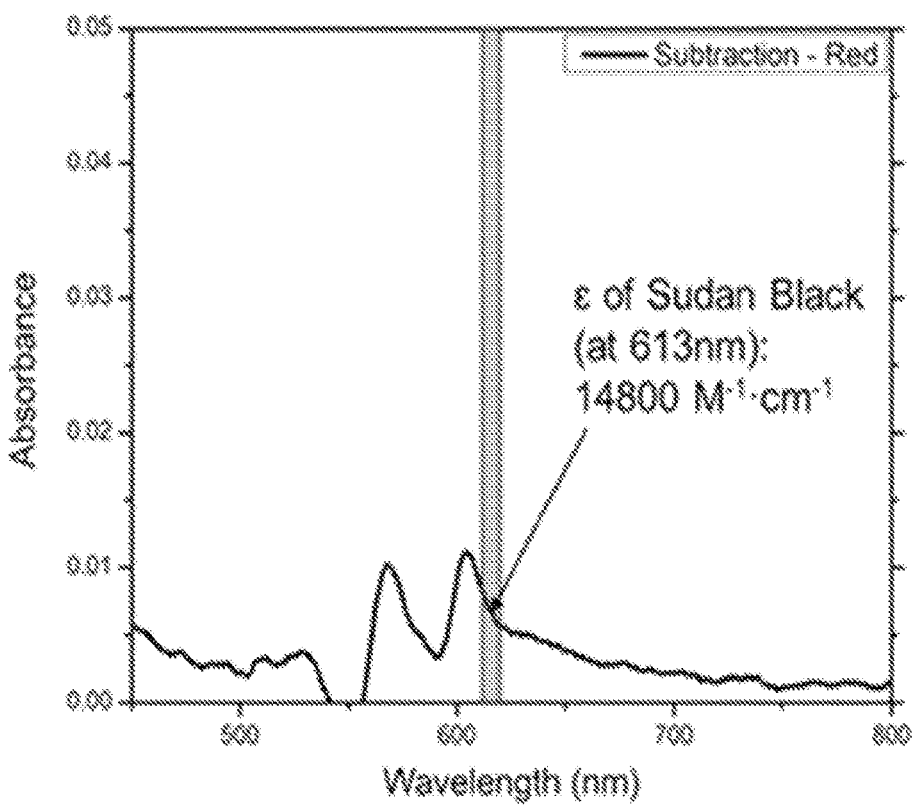
FIG. 79. UV-vis absorption spectra and calculated molar absorptivity of red resin with no dye subtracted from that with optimized dye.

Results and Discussion. To replicate traditional UV-based rapid high resolution digital light processing 3D printing with visible LEDs, reactive panchromatic photopolymer resins and a modular digital light processing system were developed. First, acrylic resins cured with either blue (~460 nm), green (~525 nm), or red (~615 nm) light were each formulated and optimized with a monomer, crosslinker, photosensitizer, and donor and acceptor initiators (FIG. 70). Specifically, N,N-dimethyl acrylamide and trimethylolpropane triacrylate were implemented as the monomer and crosslinker in a 4:1 ratio, respectively. This combination of N,N-Dimethylacrylamide and trimethylolpropane triacrylate was identified for its fast curing kinetics with bis-acylphosphine oxide (BAPO), a potent photoinitiator used here as a control for curing with violet light (405 nm). It also showed good solubility for a range of initiator and photosensitizer compounds. All resins contained the same electron deficient acceptor (A), [4-(octyloxy)phenyl](phenyl)iodonium hexafluoroantimonate diphenyliodonium, which served as a radical initiator. Different electron rich donor (D) initiators (e.g., amine, silane, and organoborate derivatives) and photosensitizers (e.g., camphorquinone, xanthene, cyanine, and porphyrin derivatives) were screened. Initially, visible light curing (e.g., blue, green, or red) was assessed qualitatively by simply irradiating nitrogen degassed solutions in glass vials with low intensity light (5 mW/cm$^2$) and inverting every 5 s until gelation was observed. Subsequently, RT-FTIR spectroscopy (vide infra) was used to more closely analyze a subset of samples that showed rapid curing. Ultimately, the most efficient resins contained 2-(butyryloxy)-N,N,N-trimethylethan-1-aminium butyltriphenylborate (Polykarpov A Y et al. Tetrahedron Lett. 1995, 36 (31), 5483-5486; Kabatc J et al. J. Polym. Sci. Part A Polym. Chem. 2003, 41(19), 3017-3026) as D initiator (0.2 wt % relative to monomer/crosslinker) and either H-Nu470 (0.1 wt %), Rose Bengal (0.1 wt %), or zinc tetraphenylporphyrin (ZnTPP, 0.3 wt %) as the photosensitizer compounds with blue, green, or red light irradiation, respectively (FIG. 70).

These components serve as the "active" ingredients in all subsequent resins for photocuring.

An additional ingredient that is often present in photopolymer resins is an opaquing agent (OA), which is a "passive" absorber (i.e., does not elicit a chemical reaction) used to control the optical path length of incident light and, in turn, improve resolution and homogeneity of curing (particularly in the z-dimension) (Pritchard Z D et al. *Adv. Mater. Technol.* 2019, 1900700). Ideally opaquing agents (e.g., dyes and pigments) operate by absorbing light in the same region as the photoinitiator or photosensitizer, followed by rapid excited state relaxation prior to electron/energy transfer, thereby reducing the penetration depth of light and mitigating cure through (i.e., curing unwanted regions within previous layers of a print). A series of azo-dyes were selected as opaquing agents given that cis/trans isomerization and intramolecular proton transfer (when phenol functionality is present ortho to the azo group) provide the desired rapid relaxation (Cui G et al. *J. Phys. Chem. A* 2014, 118 (26), 4732-4739). Specifically, Sudan I, Sudan IV, and Sudan black were chosen for their excellent absorption overlap with both photosensitizer absorption and LED emission profiles. While the extinction coefficient (E) values at the corresponding peak LED emission wavelength ($\lambda_{ex}^{max}$) were within the same order of magnitude for each Sudan dye ($\varepsilon \approx 8{,}300\text{-}29{,}100$ M$^{-1}$ cm$^{-1}$), they varied by an order of magnitude between the photosensitizers, from green ($\varepsilon_{RB} \approx 34{,}900$ M$^{-1}$·cm$^{-1}$) to blue ($\varepsilon_{H\text{-}Nu470} \approx 14{,}900$ M$^{-1}$·cm$^{-1}$) to red ($\varepsilon_{ZnTPP} \approx 400$ M$^{-1}$·cm$^{-1}$) (FIG. 71-FIG. 79). The $\varepsilon_{OA}:\varepsilon_{PS}$ ratios increased from 0.6 (blue) to 0.8 (green) to 34 (red). In comparison the $\varepsilon_{OA}:\varepsilon_{PI}$ ratio for Sudan I with BAPO at 405 nm ($\varepsilon_{PI} \approx 400$ M$^{-1}$·cm$^{-1}$) was 20 (violet). Based on these ratios, it was hypothesized that changes in the concentration of the opaquing agent would have the largest effect on mitigating cure-through on violet and red photocurable resins, compared to blue and green.

Figure 80:
FIG. 80. 2D illustration of new printing file used in this study for rapid resin optimization.
Figure 81:
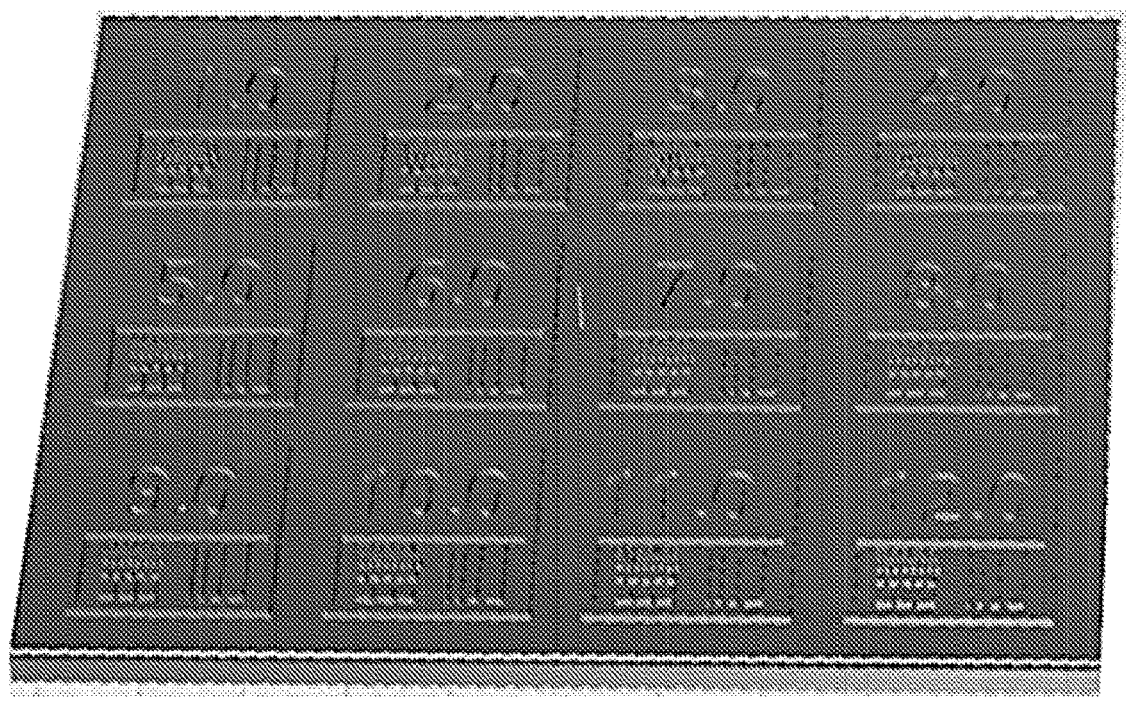
FIG. 81. 3D illustration of new printing file used in this study for rapid resin optimization.
Figure 82:
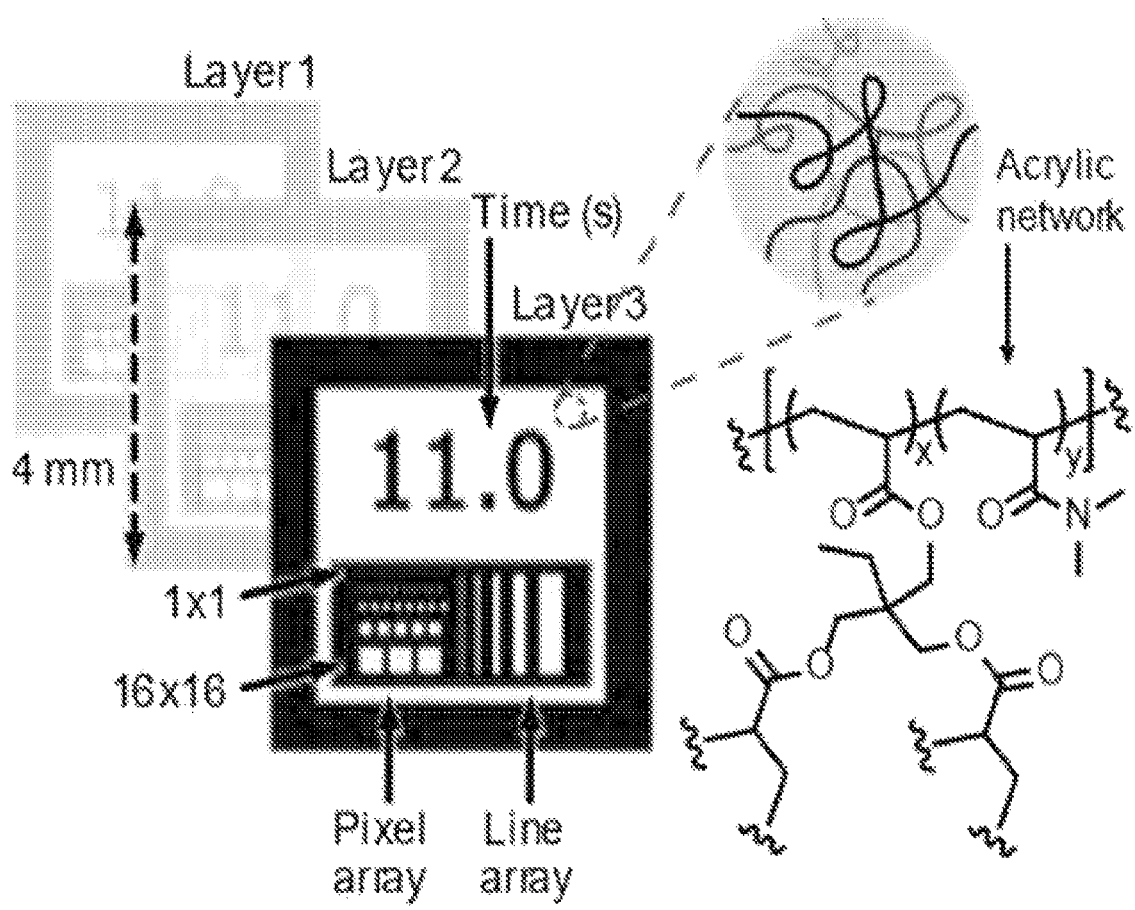
FIG. 82. Qualifying resolution for each resin. Schematic displays a composition of 'resolution print'. Hard resin chemistry (N,N-Dimethylacrylamide/trimethylolpropane triacrylate (4/1, w/w %) used as monomer and crosslinker.
Figure 83:
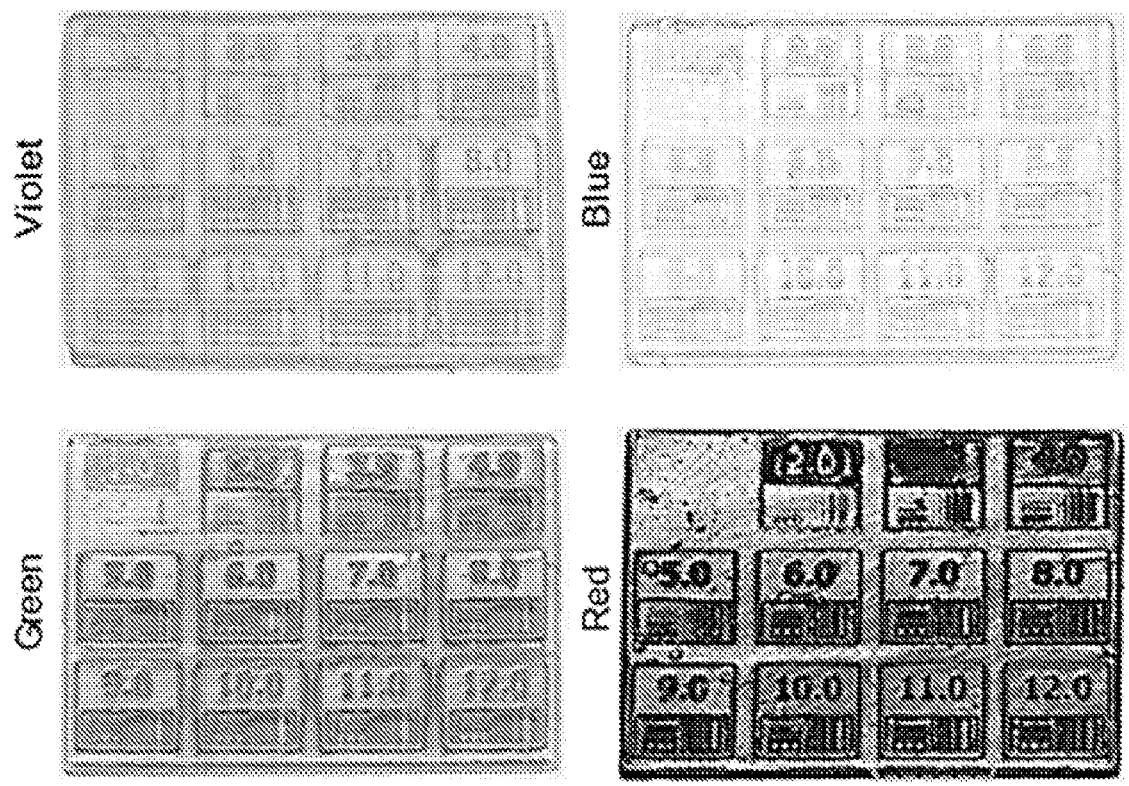
FIG. 83. Qualifying resolution for each resin using resolution prints formed upon 4 different colors of light irradiation. Hard resin chemistry (N,N-Dimethylacrylamide/trimethylolpropane triacrylate (4/1, w/w %) used as monomer and crosslinker, 0.5 wt % BAPO and 0.04 wt % Sudan I (for violet); 0.1 wt % H-Nu470, 0.2 wt % Borate V, 2 wt % H-Nu254 (for blue); 0.1 wt % Rose Bengal lactone, 0.2 wt % Borate V, 2 wt % H-Nu254, and 0.01 wt % Sudan IV (for green); and 0.3 wt % ZnTPP, 0.2 wt % Borate V, 2 wt % H-Nu254, and 0.002 wt % Sudan black (for red) used as photoinitiator or photosensitizer and opaquing agent.

A custom digital light processing 3D printer (FIG. 67 and FIG. 68) with modular visible LEDs (405 nm, 460 nm, 525 nm, 613 nm) was built and used to examine the aforementioned resins for rapid high resolution additive manufacturing. The minimum pixel size on the printer has a lateral resolution of 20×20 µm$^2$ and a layer thickness of 25 µm. To examine resolution and mechanical properties of prints in conjunction with curing kinetics a 100 µm layer thickness was selected, which enabled RT-FTIR and photorheology monitoring where ≥100 µm sample thickness is required for adequate signal. A printing method, referred to herein as "resolution print", was developed to efficiently identify printing conditions—opaquing agent concentration ([OA]) and exposure time/layer—to optimize both resolution and build speed. A 2D and 3D image of the new test printing file is illustrated in FIG. 80 and FIG. 81, respectively. Unique to this printing method is the ability to control exposure time within different locations of a single layer (FIG. 82). In this assessment, each object contained a set of squares that were simultaneously printed with varying exposure time/layer, and in the bottom half of each square was an array of smaller patterns that were 1 to 16 pixels wide (FIG. 80 and FIG. 81). For ease of handling the patterns are printed on a rectangular base (12 layers at 12 s/layer). As shown in FIG. 83, 12 squares were printed (4×4 mm$^2$) containing 4×100 µm layers each, and exposure times were increased from 1 to 12 s/layer in equal increments (time in seconds engraved in the top half of each square). Thus, a single print contains information about 12 exposure times, streamlining optimization.

The effect of opaquing agent concentration on printing speed was initially assessed using conventional light microscopy, by visually identifying the first appearance of a square pattern. Resolution prints were obtained using previously optimized violet, blue, green, and red resins (no opaquing agent) while gradually increasing the corresponding opaquing agent concentration up to 0.05 wt %. As the opaquing agent concentration increased, the first square pattern to appear occurred at longer exposure times, indicating an inverse relationship between build speed and opaquing agent concentration. This suggests that the opaquing agent is effectively competing for photons with that of the photoinitiator or photosensitizer present (i.e., passive absorption). Consistent with the above hypothesis, the violet and red resins were found to be more affected by small changes in opaquing agent concentration, likely due to their larger $\varepsilon_{OA}:\varepsilon_{PS/PI}$ ratio at the peak LED emission compared to blue and green resins. However, even with optimized opaquing agent concentration present, patterns appear after only 2 s, demonstrating the ability to perform rapid visible light curing (FIG. 83). For green and red light sensitive samples, a blanket of nitrogen over the resin vat was used to achieve these speeds. The observed rate enhancement with the nitrogen purge (~2-3× faster) is hypothesized to arise from a reduced oxygen environment that minimizes quenching of triplet excited states found for both Rose Bengal (green light photosensitizer) (Lambert C R et al. *Photochem. Photobiol.* 1997, 66 (1), 15-25) and ZnTPP (red light photosensitizer) (Shanmugam S et al. *J. Am. Chem. Soc.* 2015, 137 (28), 9174-9185).

Figure 84:
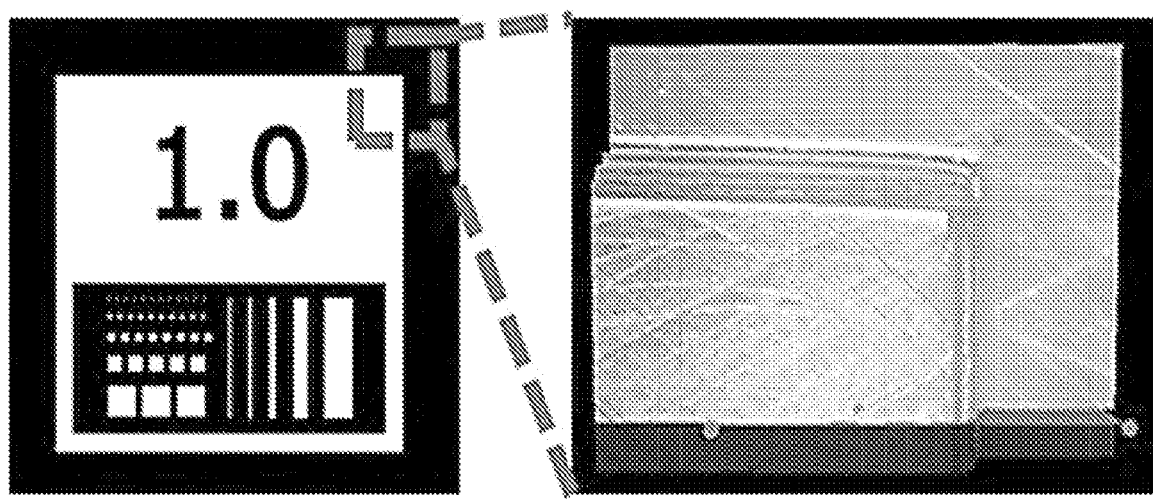
FIG. 84. Quantification of resolution. The corner of each square was captured as 3D images using digital microscope.
Figure 85:
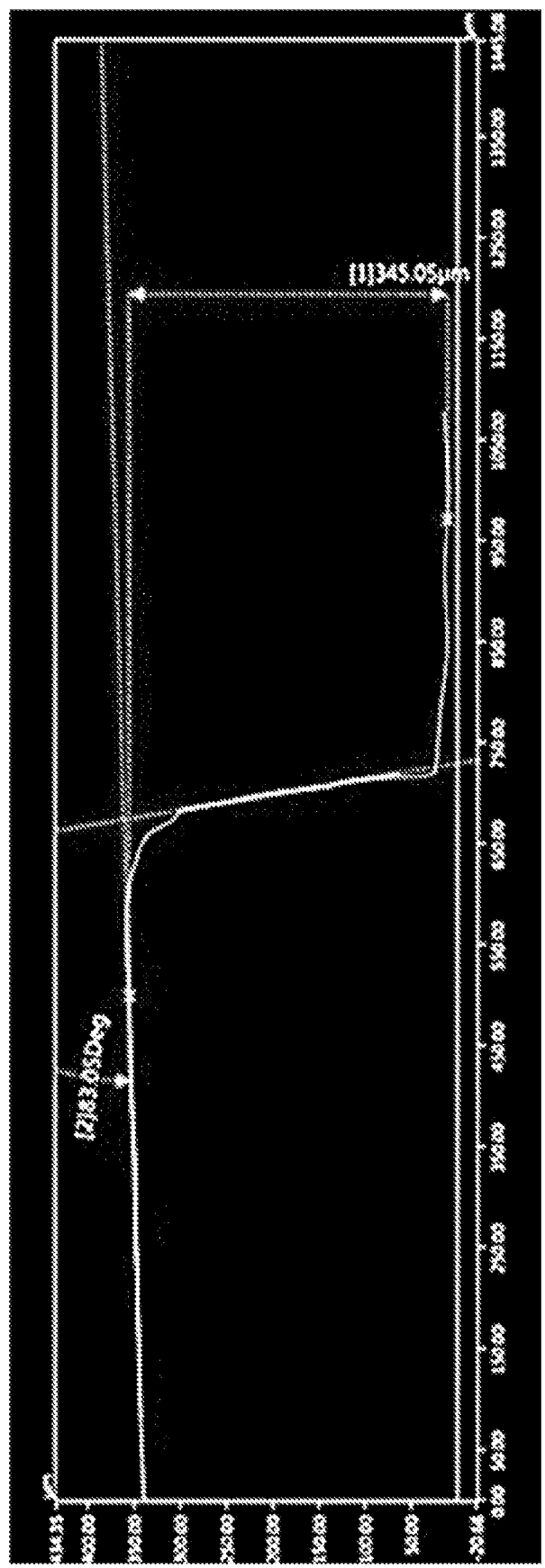
FIG. 85. Quantification of resolution. Height and slope were measured and collected for further analysis.
Figure 86:
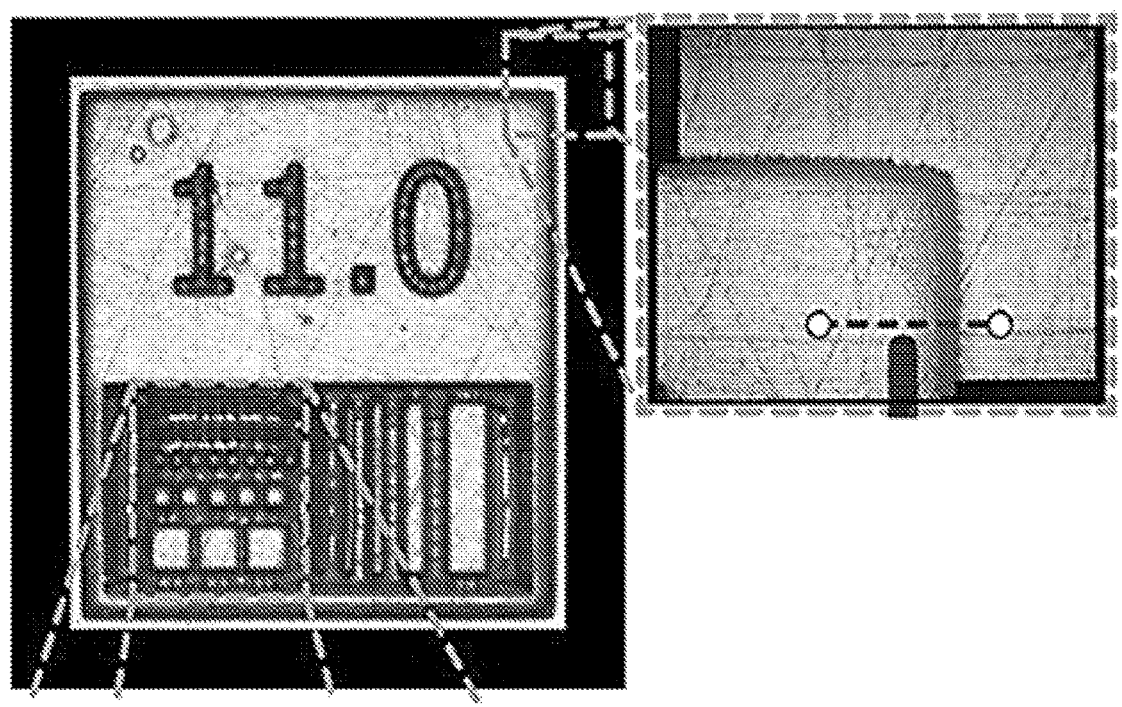
FIG. 86. Close-up image of representative red sample.
Figure 87:
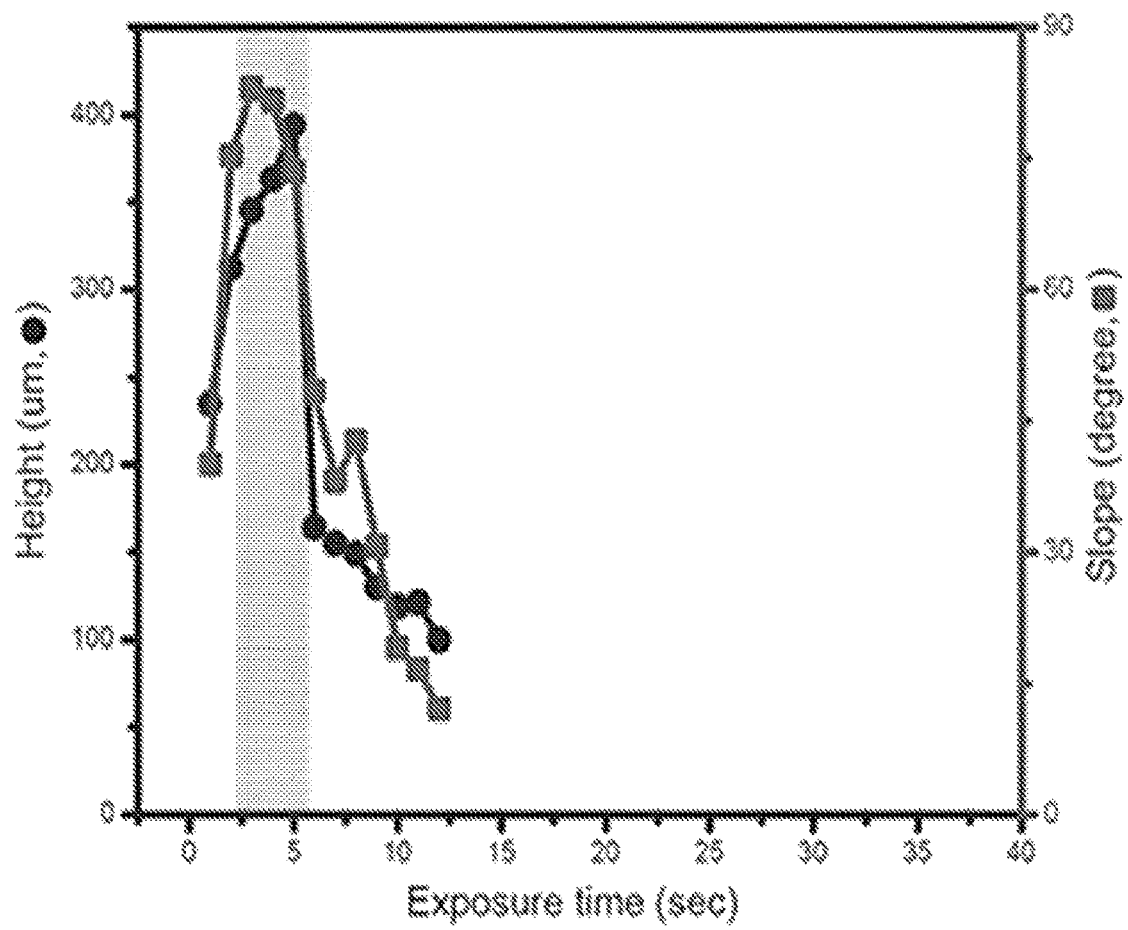
FIG. 87. Plot of thickness and side-wall angle as a function of exposure time for violet resin containing no dye. Optimal cure times are highlighted.
Figure 88:
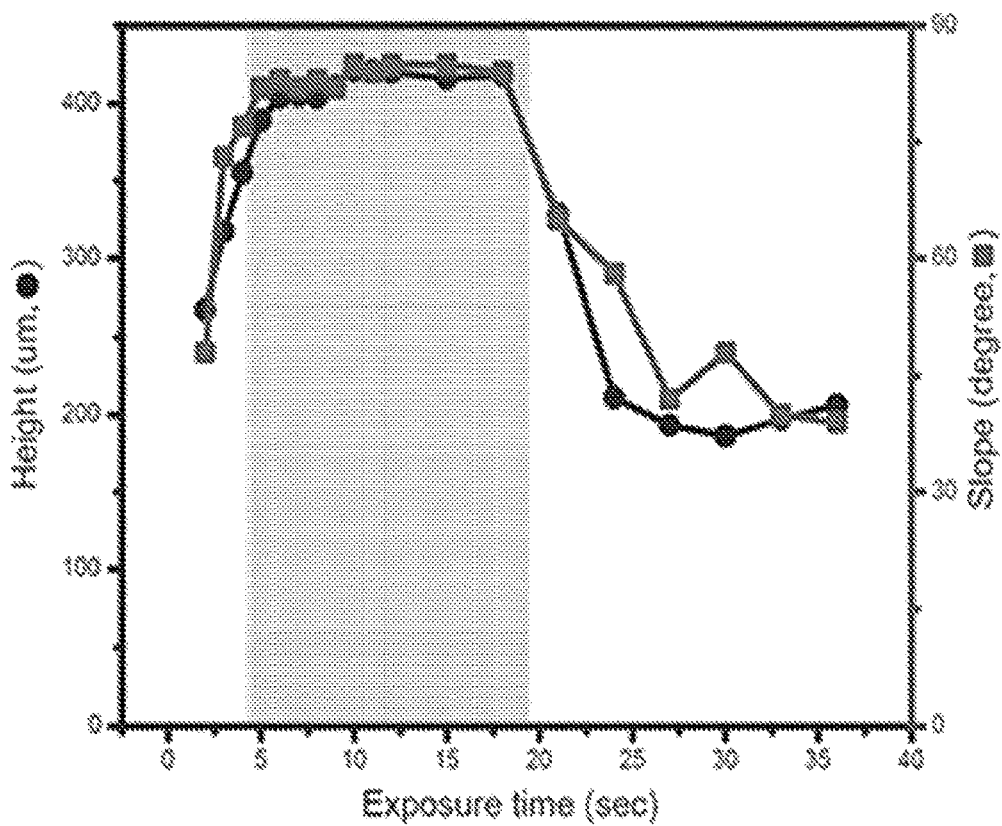
FIG. 88. Plot of thickness and side-wall angle as a function of exposure time for violet resin containing optimized dye concentration (0.04 wt %). Optimal cure times are highlighted.
Figure 89:
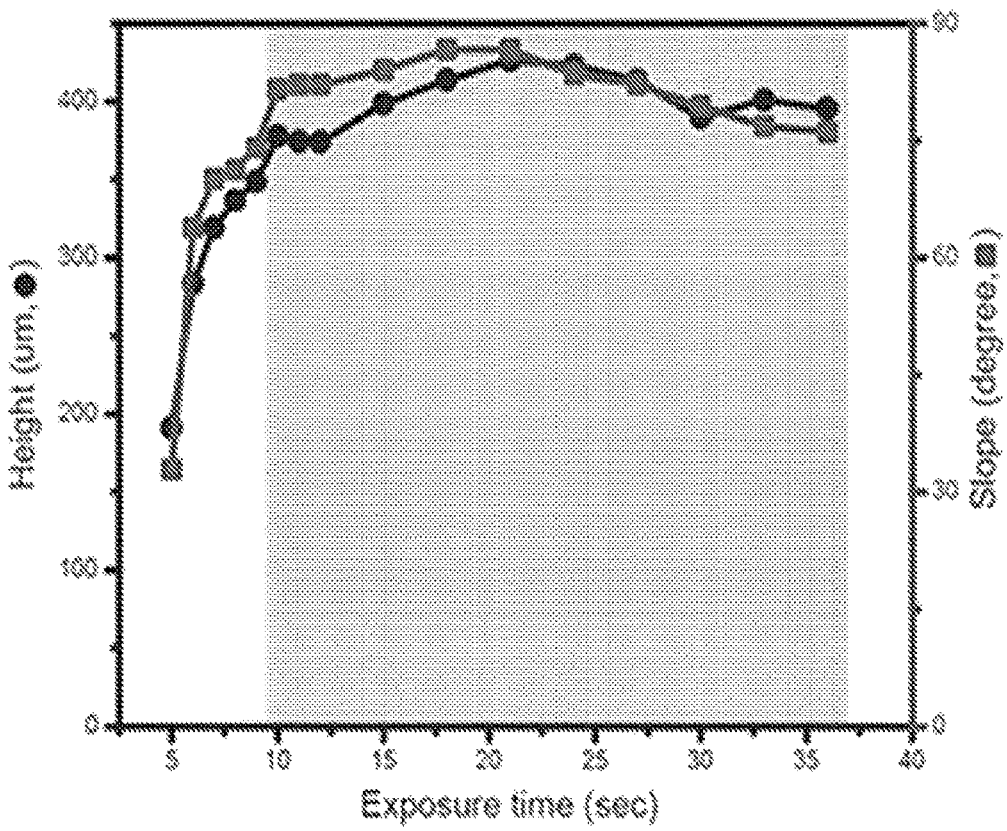
FIG. 89. Plot of thickness and side-wall angle as a function of exposure time for blue resin without dye loading. Optimal cure times are highlighted.
Figure 90:
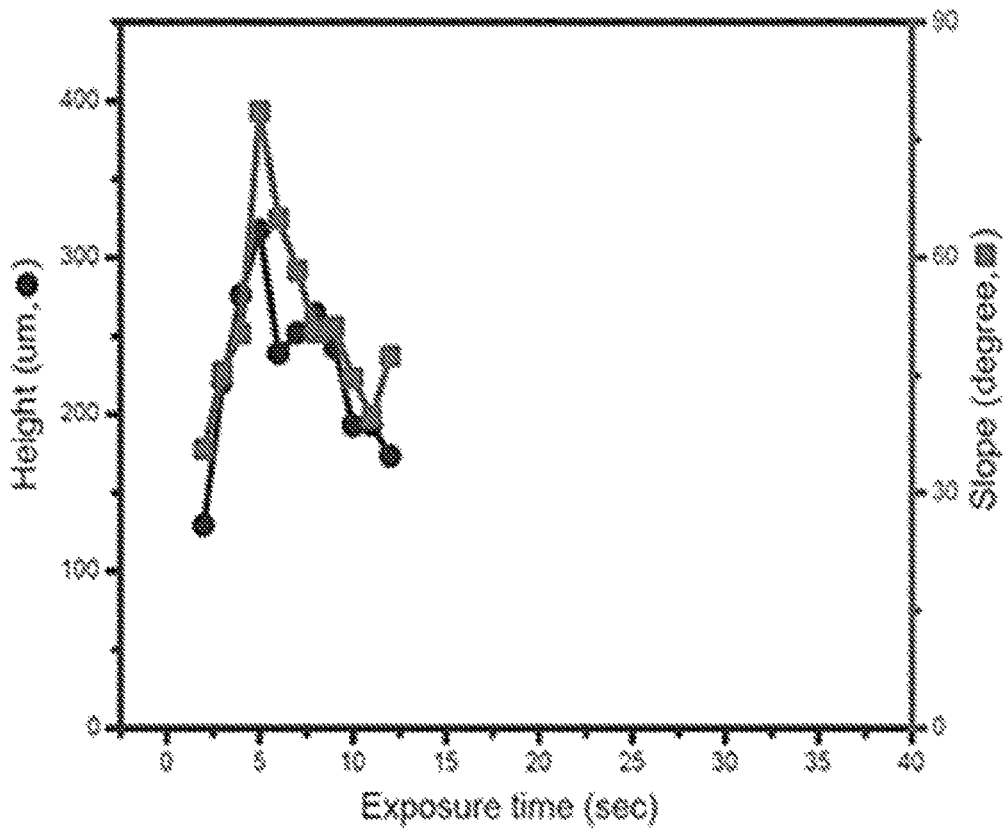
FIG. 90. Plot of thickness and side-wall angle as a function of exposure time for camphorquinone-containing blue resin with no dye Without incorporation of opaquing agent, camphorquinone-containing blue resin doesn't show optimal cure time for achieving good resolution of print.
Figure 91:
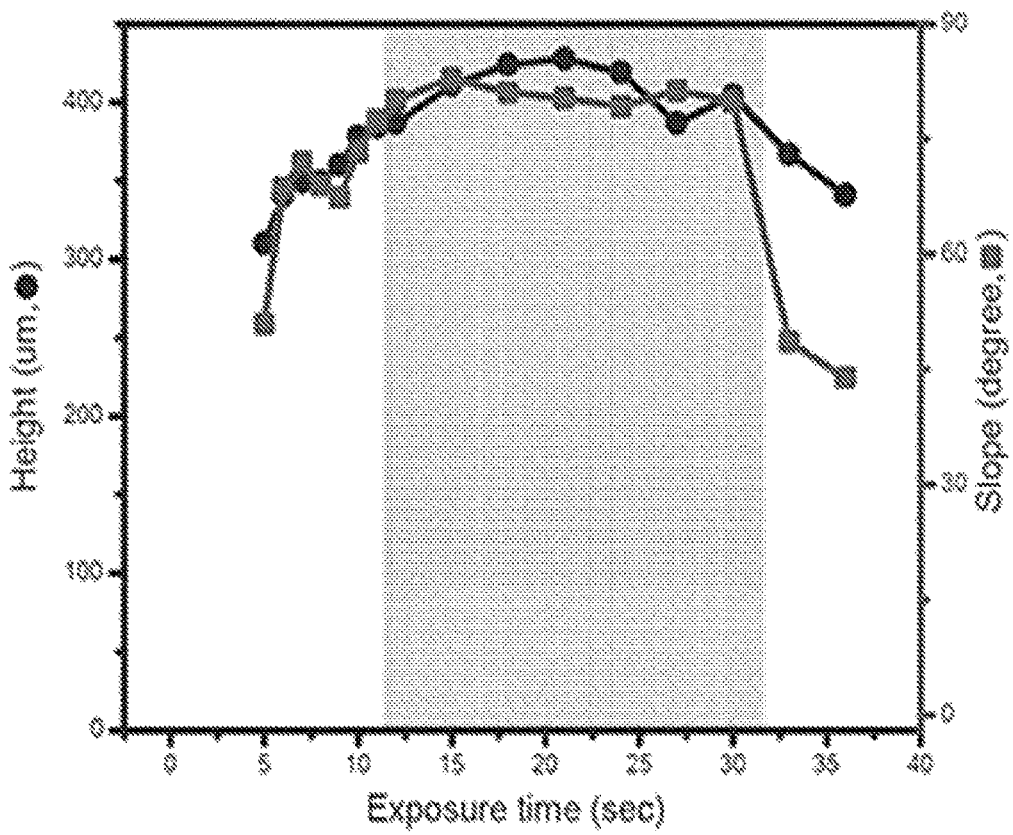
FIG. 91. Plot of thickness and side-wall angle as a function of exposure time for camphorquinone-containing blue resin with optimized dye concentration (0.01 wt %). Optimal cure times are highlighted.
Figure 92:
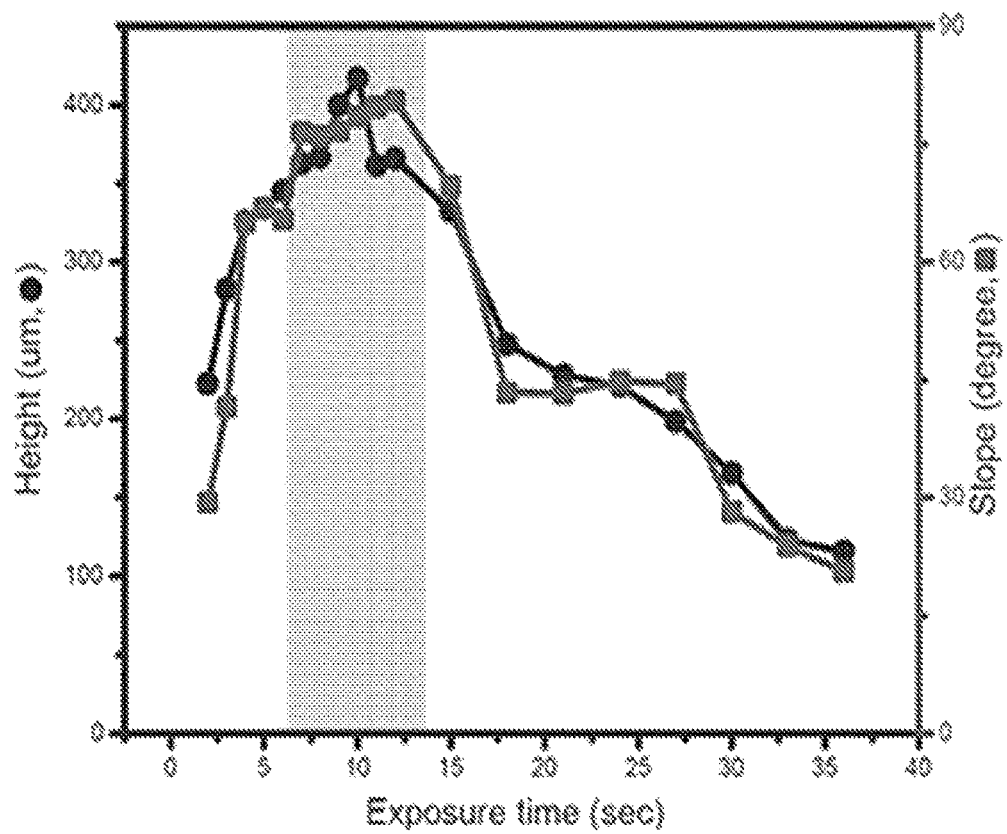
FIG. 92. Plot of thickness and side-wall angle as a function of exposure time for green resin containing no dye.
Figure 93:
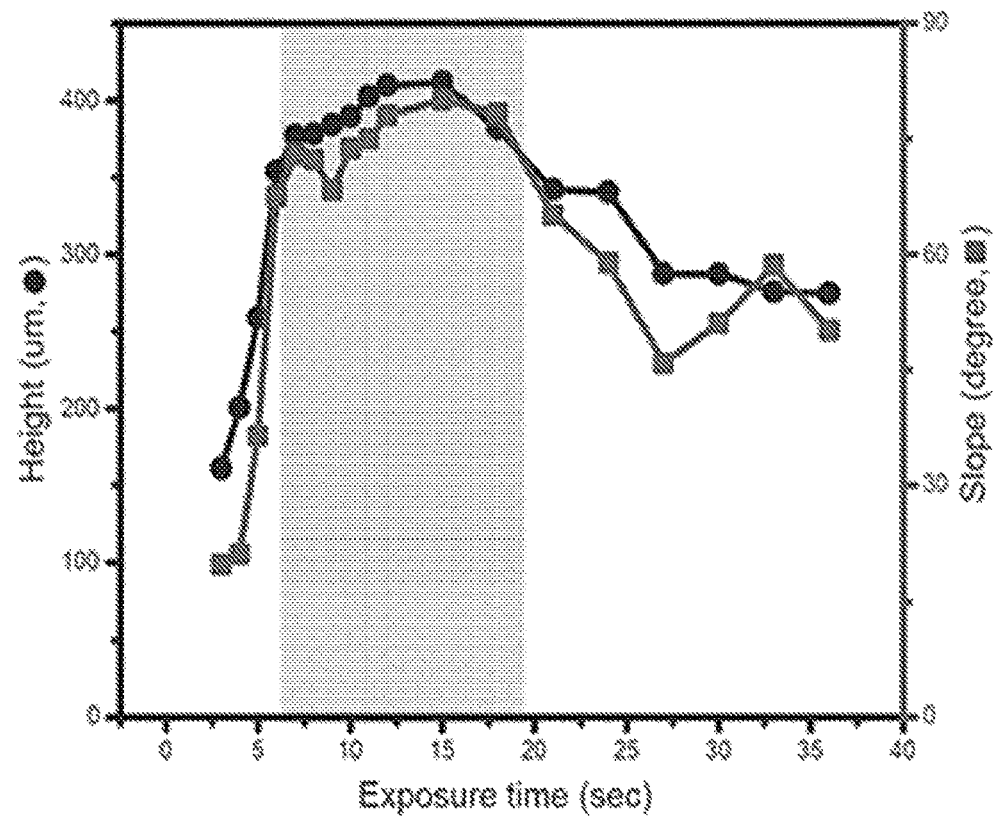
FIG. 93. Plot of thickness and side-wall angle as a function of exposure time for green resin containing optimized dye concentration (0.01 wt %).
Figure 94:
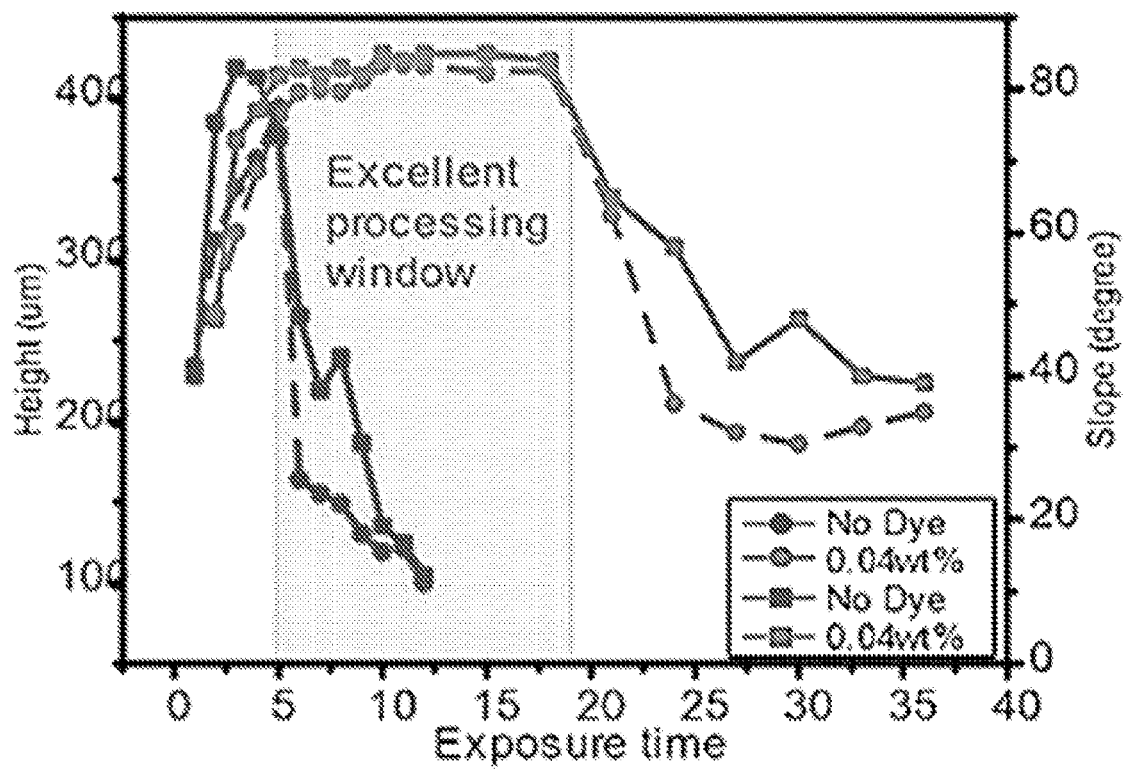
FIG. 94. Plot of heights and slopes versus exposure time.

While increasing opaquing agent concentration decreased print speed, z-resolution improved as a result. This was determined using optical profilometry and digital microscopy to create a 3D map of the corners on each square, from which both thickness and side-wall angle (SWA) were measured (FIG. 84, FIG. 85, FIG. 86). Ideally these values reflect the imported digital image, which in this case was 400 µm thick and a 90° side-wall angle. Without opaquing agent the maximum thickness and side-wall angle did not always occur at the same exposure time/layer (FIG. 87-FIG. 93). Additionally, at shorter and longer exposure times both thickness and side-wall angle rapidly decrease, providing a narrow processing window (<1 s) (FIG. 94). These unwanted attributes likely arise from cure through, necessitating the use of opaquing agents. Accordingly, it was found that increasing opaquing agent concentration resulted in a convergence in exposure time for the max thickness and side-wall angle, along with a much wider processing window (~10 s). The optimal opaquing agent concentration was therefore selected by balancing print speed and z-resolution for each resin, finding optimal exposure times/layer of 8 s for violet, blue, and green resins and 11 s for red. This corresponds to a build rate of 32.7-45.0 mm/h (not including recoating process), which rivals contemporary UV-based digital light processing 3D printers (Wallin T J et al. *Nat. Rev. Mater.* 2018, 3 (6), 84-100). For example, the optimal opaquing agent concentration for the red resin was found to be 0.002 wt % (rel. to monomer+crosslinker).

Figure 95:
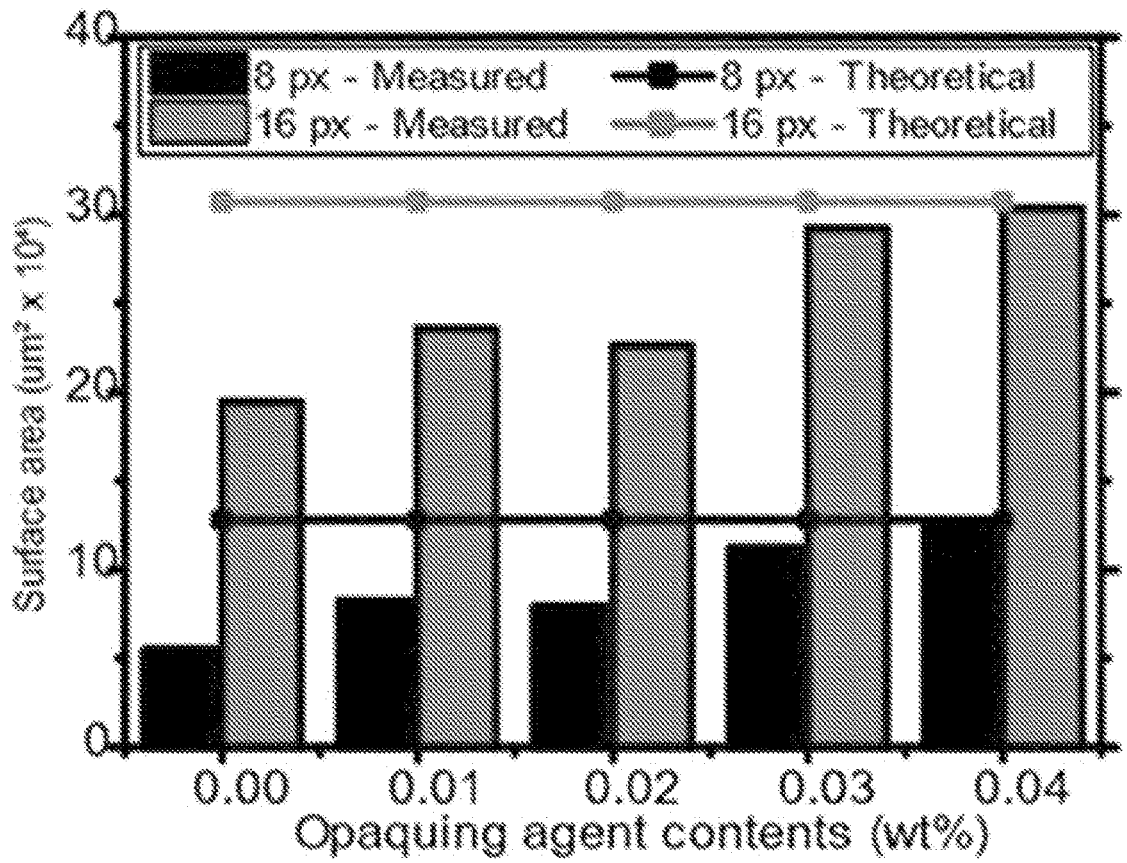
FIG. 95. Plot of surface area measured versus opaquing agent concentrations.

To assess x,y-resolution and reproducibility of printing small features as a function of opaquing agent concentration, the top surface area of the square pillars embedded within the bottom half of each of the larger 12 squares was measured. Specifically, 16, 8, 4, 2, 1 pixel wide square pillar arrays were characterized by imaging the surfaces for both red and violet resolution prints using either digital microscopy or optical profilometry. Samples with no opaquing agent were compared to those with optimized opaquing agent concentration at their respective optimized exposure times. Surface area analysis revealed that the presence of opaquing agent results in a better match with theoretical values for each of the square pillars, as represented by dashed lines in FIG. 95 (theoretical=$320^2$, $160^2$, $80^2$, $40^2$, and $20^2$ µm$^2$). The improved x,y-resolution is hypothesized to result from attenuating light outside of predefined irradiation zones (e.g., scattered light) mitigating unwanted curing. Additionally, the deviation of surface area from theoretical values increased as feature size decreased. The diminished feature fidelity for smaller pillars may be due to incomplete curing in comparison to larger pillars where increased local heat generation can result in auto-acceleration of curing. However, irrespective of the feature size, reproducibility was excellent, as evidenced by small standard deviations in surface area values between the same square pillars. The present study illustrates the effect opaquing agent concentration has on resolution for rapid visible light 3D printing.

Figure 96:
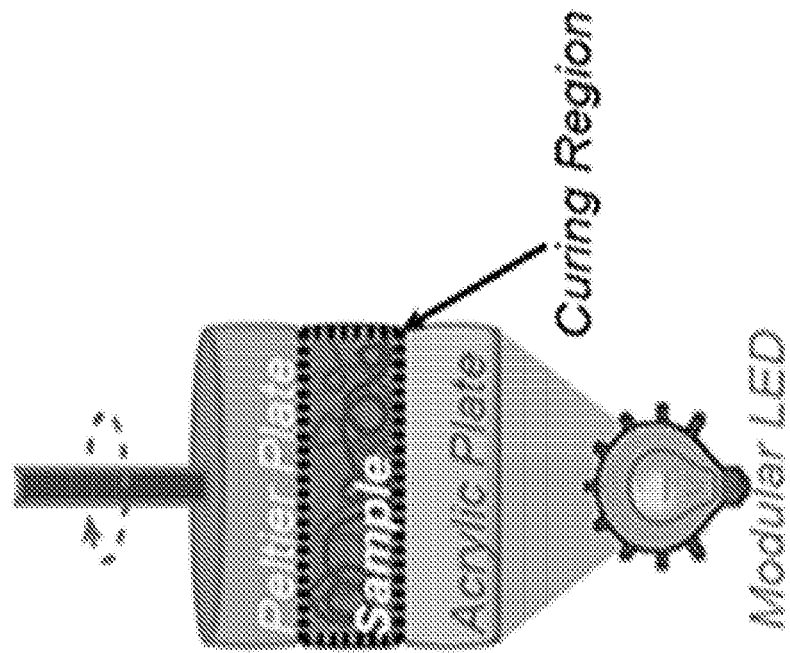
FIG. 96. Schematics of FTIR and Photorheology measurement.
Figure 96:
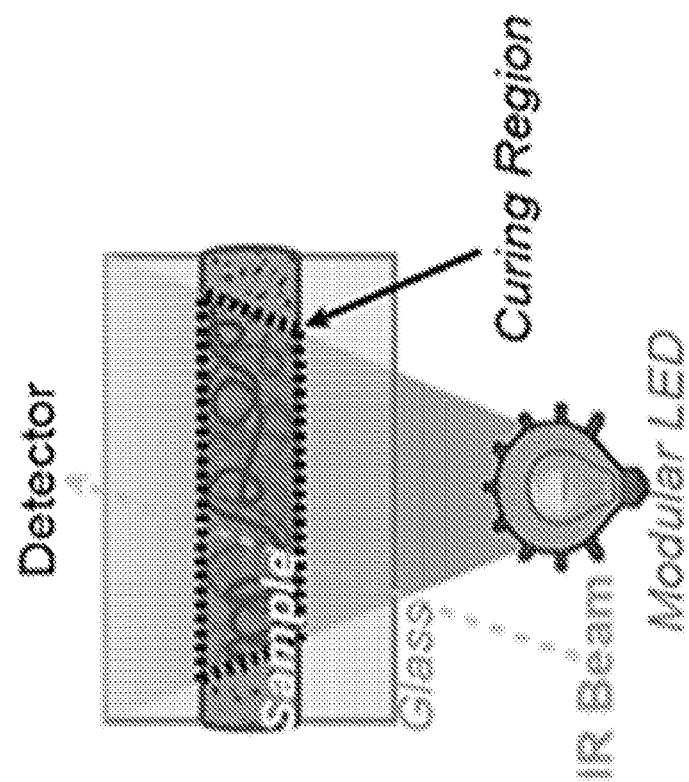

Photocuring kinetics can determine whether a particular resin is applicable for 3D printing, among other applications that require well defined reactivity, including imaging, lithography, coatings, and adhesives (del Barrio J et al. *Adv. Opt. Mater.* 2019, 7 (16), 1900598). Thus, the apparent rates of polymerization and times to gelation were characterized to inform future resin development and enable rapid, low energy visible light curing to supplant current UV sources in these applications. The present studies were accomplished using RT-FTIR spectroscopy and photorheology at the aforementioned 3D printing conditions (FIG. 96). Specifically, the samples were 100 µm thick, under an inert environment (e.g., degassed and/or N$_2$ blanket), and LED intensities were carefully tuned to match the printer (3.3 mW/cm$^2$, 3.4 mW/cm$^2$, 1.8 mW/cm$^2$, and 2.1 mW/cm$^2$ for violet, blue, green, and red, respectively). Additionally, as a negative control confirming the need for light exposure, data was collected for 10 s in the dark prior to turning on the LED.

Figure 97:
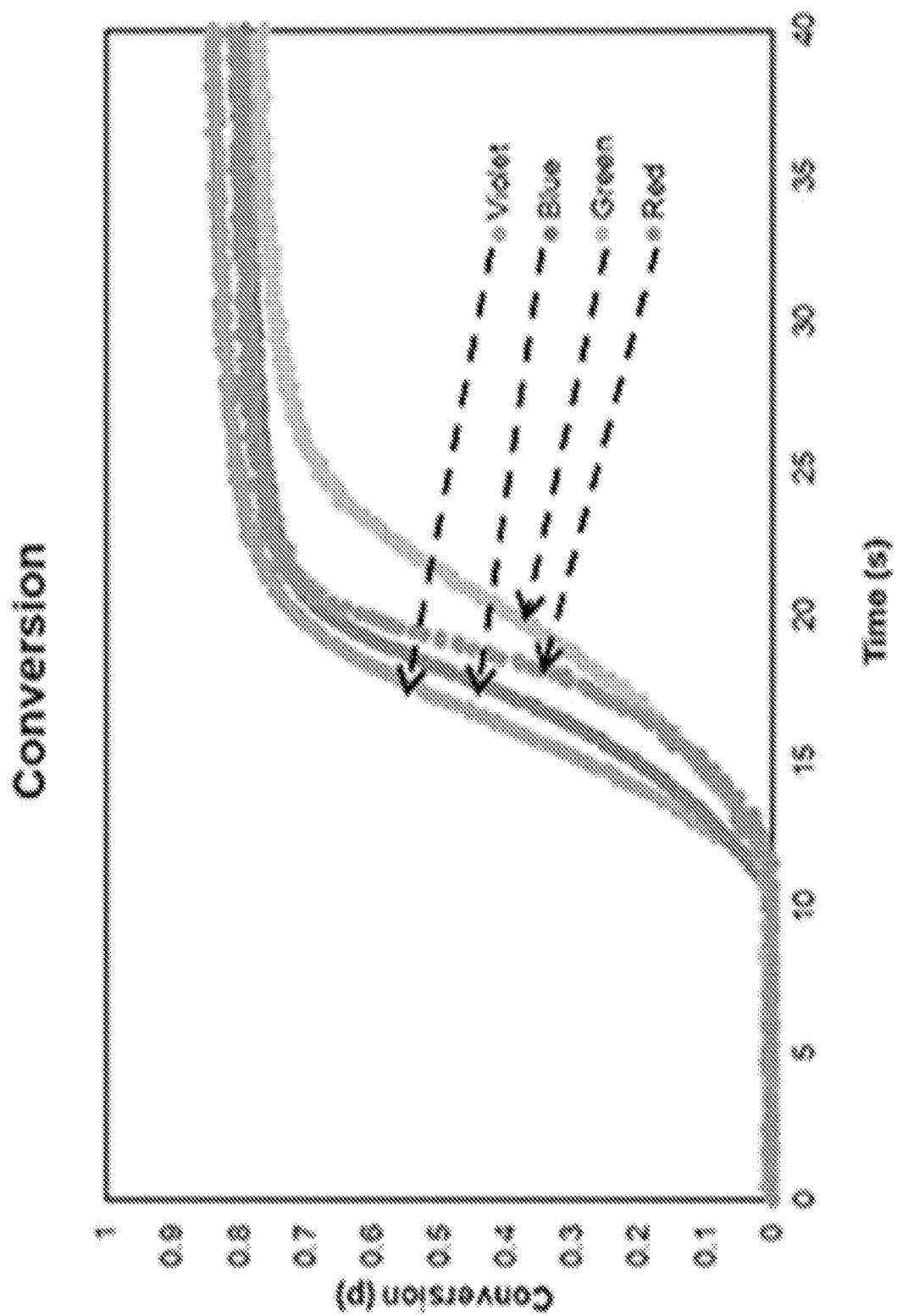
FIG. 97. Real time monitoring of visible curing using FTIR.

The NIR absorption region (8,000-4,000 cm$^{-1}$) was examined using RT-FTIR to determine monomer/crosslinker conversion over time by monitoring the disappearance of C=C vinylic stretches found at ~6,160 cm$^{-1}$ (Park H Y et al. *Dent. Mater.* 2012, 28 (8), 888-893). The inherently weak absorption signals in the NIR (e.g., overtones) enabled thick samples to be probed, and transparency to NIR light facilitated the use of disposable glass slides for easy preparation and measurement. Under the optimized printing conditions each resin rapidly polymerized, reaching a maximum monomer conversion within 20 s of turning the light on (FIG. 97). Notably, the C=C conversion peaks at ~80%, which is likely due to a reduction in molecular motion post gelation. Moreover, in the presence of air a distinct induction period was observed (i.e., time prior to the start of reaction after light was turned on), particularly for green and red resins. Interestingly, irrespective of an induction period, the maximum rate of polymerization remained nearly constant. The induction is presumed to result from oxygen reacting with triplet excited states and radicals, inhibiting polymerization, yet it does not decrease the amount of photoinitiator or photosensitizer to a degree that appreciably alters the maximum achievable rate once oxygen is consumed (Ligon S C et al. *Chem. Rev.* 2014, 114 (1), 577-589). These findings were consistent with slower printing speeds observed previously in the absence of an inert environment, and reinforces oxygen removal as an effective strategy to increase photocuring rate. Although rapid under current print conditions, it was evident that the reaction rate is heavily dependent on light intensity, showing an increase in rate when going from 1 to 10 mW/cm$^2$. Furthermore, increasing the opaquing agent concentration results in a decrease of polymerization rate, consistent with 3D printing results (Table 6). The same trend was found for gel times, identified as the intercept of the storage modulus (G') and loss modulus (G") using photorheology: violet (3.8±0.2 s), blue (2.7±1.0 s), green (3.3±0.2 s), and red (4.5±0.1 s). The measured conversions at the gel points were similar for all resins (~20-30%), as anticipated given the same monomer and crosslinker composition and ratio for each. Interestingly, the C=C conversions for each resin at the optimized 3D printing exposure times/layer were found to occur between ~70-75%. Therefore, polymerizable vinylic residues are present at the interface of each layer during the 3D printing process, which enables covalent bonding between layers and correspondingly strong connectivity. Both RT-FTIR and photorheology revealed rapid kinetics and consistent C=C conversions at the gel points for each resin formulation, which was used to inform the analysis of polymer mechanical properties.

Figure 98:
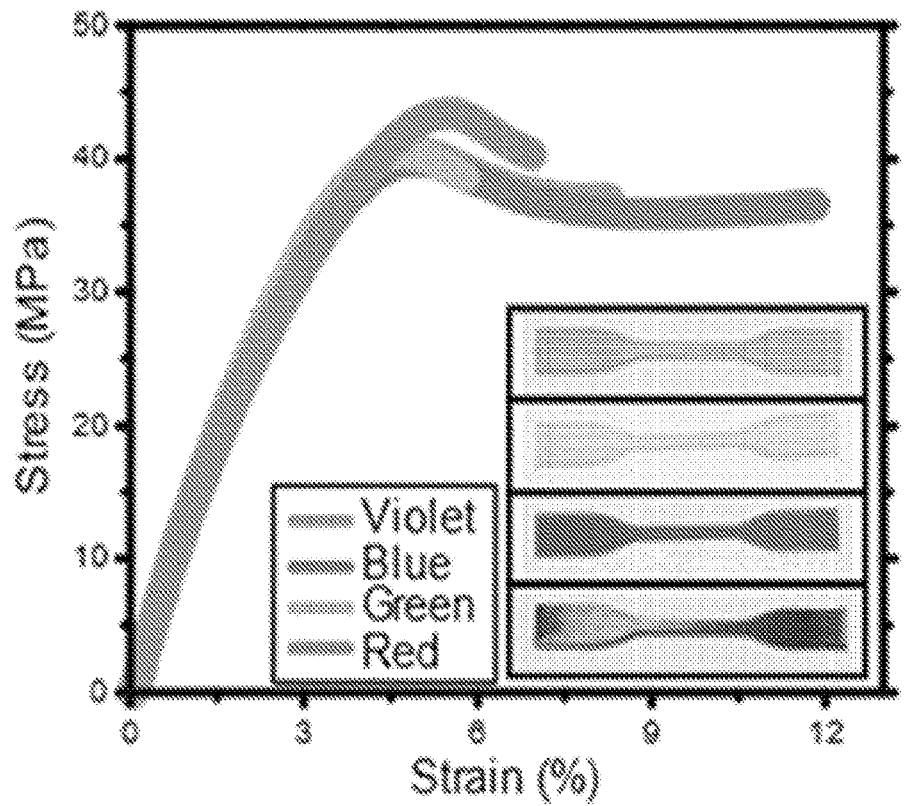
FIG. 98. Mechanical testing of 3D printed dog bones. Stress-strain curves of violet, blue, green, and red dog bones.

To push the boundaries of additive manufacturing from traditional hobbyist printing and models to applications that require both structural integrity and precision requires a thorough understanding of mechanical performance. To this end, dog bones (ASTM D638) from each resin formulation were 3D printed under optimized conditions and subjected to tensile testing to characterize mechanical properties, namely stiffness (E, Young's modulus), yield strength ($\sigma_y$), and strain at fracture ($\varepsilon_f$). Following standard protocols, all objects were post-cured with UV light (20 min.) prior to tensile testing. As a control, post-curing with the corresponding visible light provided no significant difference in mechanical performance. Both E and $\sigma_y$ were nearly identical for all resins (FIG. 98). However, small deviations in of were observed between samples, yet the lack of an observable trend suggests that it may arise from minor sample defects.

Figure 99:
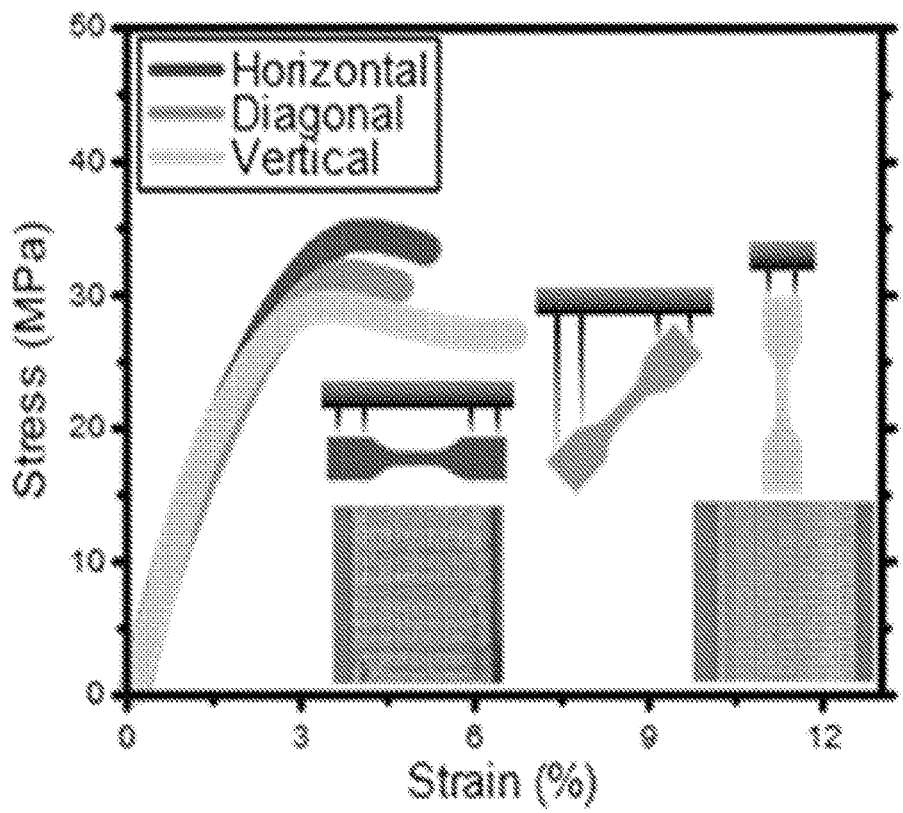
FIG. 99. Mechanical testing of 3D printed dog bones. Red dog bones printed along 3 different angles (horizontal, diagonal, and vertical). Insets show the close up images of dogbones.

As a next step, the mechanical uniformity was characterized, as objects printed using conventional vat photopolymerization (e.g., stereolithography and digital light processing) with a layered production process are often challenged for having an undesirable anisotropic response, with weakness at the boundaries between adjacent layers (Monzón M et al. *Materials (Basel)*. 2017, 10 (1), 64; Dizon J R C et al. *Addit. Manuf* 2018, 20, 44-67; Anastasio R et al. *Macromolecules* 2019, 52 (23), 9220-9231). To assess the uniformity, dog bones from optimized red resin were printed at three different edge-on angles—horizontal (0°), vertical (90°), and diagonal (45°) (FIG. 99). Optical profilometry images of the dog bones printed at different angles clearly shows the layers and demonstrates excellent thickness accuracy (FIG. 99, inset). E values were unperturbed by changing print angle, and only small fluctuations in $\sigma_y$ and of were observed (FIG. 99). These minor differences are in accord with other objects printed via UV-based vat photopolymerization (Monzón M et al. *Materials (Basel)*. 2017, 10 (1), 64; Dizon J R C et al. *Addit. Manuf* 2018, 20, 44-67; Anastasio R et al. *Macromolecules* 2019, 52 (23), 9220-9231). The desirable near isotropic mechanical properties are attributed to covalent bonding between layers. Thus, visible light 3D printing was demonstrated as an effective method to provide mechanically uniform and robust objects.

Figure 100:
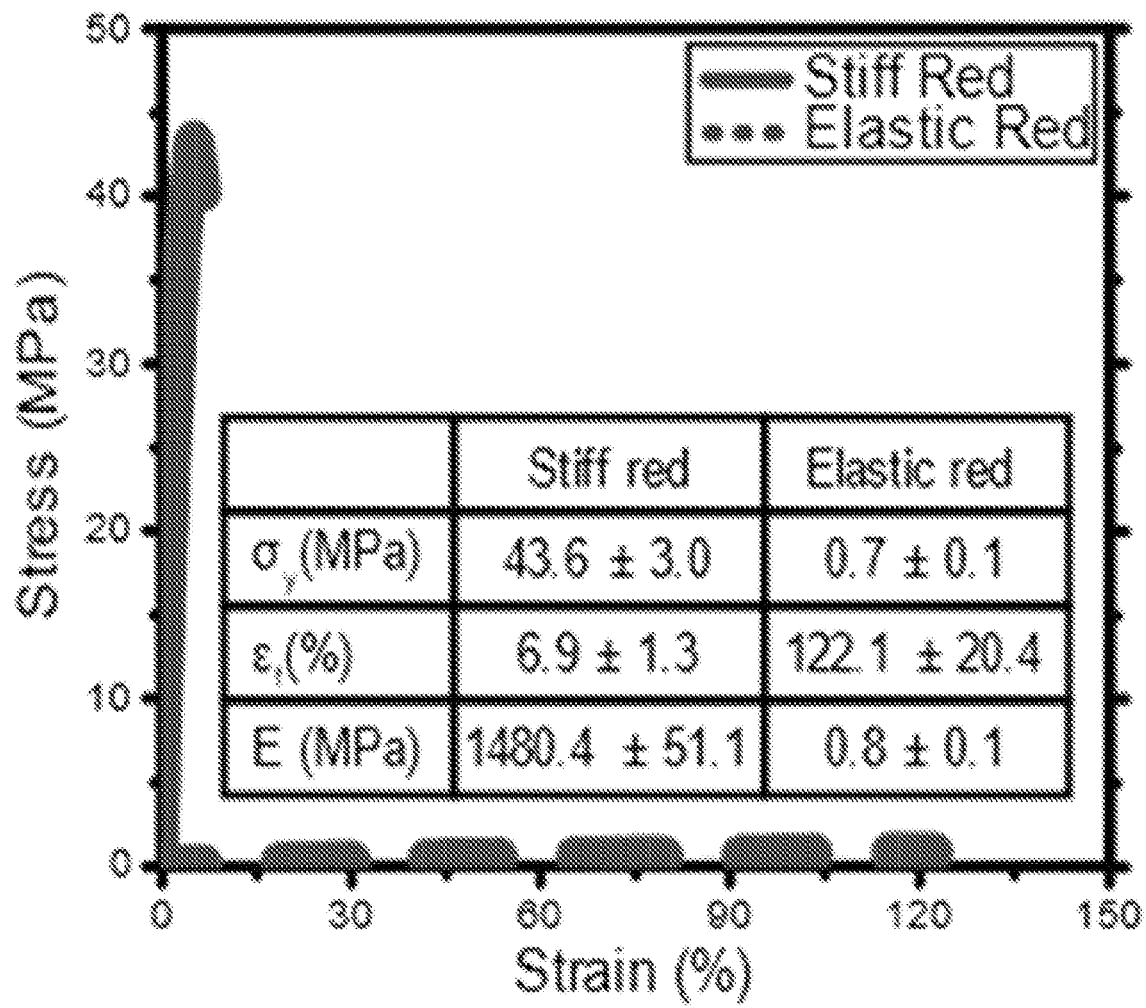
FIG. 100. Mechanical testing of 3D printed dog bones. Stress-strain curves of stiff and elastic red resin. Same PIS and experimental parameters used to print dog bones.

To demonstrate the versatility of visible light 3D printing, mechanically and chemically disparate objects were prepared (e.g., stiff vs soft and hydrophobic vs hydrophilic). The previous resin provided a stiff and brittle object, which was attributed to the use of poly(dimethyl acrylamide) with a high glass transition temperature ($T_g \approx 90°$ C.) in conjugation with a large degree of crosslinking (i.e., 20 wt % triacrylate relative to monomer). However, 3D printing soft and extensible objects remains an active area of research due to the challenges that arise from their natural tendency to deform (Patel D K et al. *Adv. Mater.* 2017, 29 (15); Herzberger J et al. *Prog. Polym. Sci.* 2019, 97; Thrasher C J et al. *ACS Appl. Mater. Interfaces* 2017, 9 (45), 39708-39716). Using rational design, a resin comprising 2-hydroxyethyl acrylate monomer with a correspondingly low polymer $T_g$ (≈−15° C.) and a small amount of crosslinker, tetra(ethylene glycol) diacrylate (0.1 wt % rel. to monomer) was formulated. With the optimized red light photosystem, dog bones were 3D printed with the new resin and subjected to tensile-testing. The resulting objects had a E=0.8±0.1 MPa, which is 3 orders of magnitude lower than those from the previous resin (FIG. 100). Reversible loading and unloading of tension showed little hysteresis as evidence of elasticity. Moreover, simple swelling tests in water qualitatively highlights the difference in chemical makeup of the two objects. While those from the stiff resin provide a non-swellable, relatively hydrophobic object, those from the elastic resin instantly sorb water to become a hydrogel. The contrasting mechanical and chemical properties of objects printed with the same visible light photosystem demonstrates the versatility of the present method, which will provide access to a plethora of materials without the need for UV light.

Figure 101:
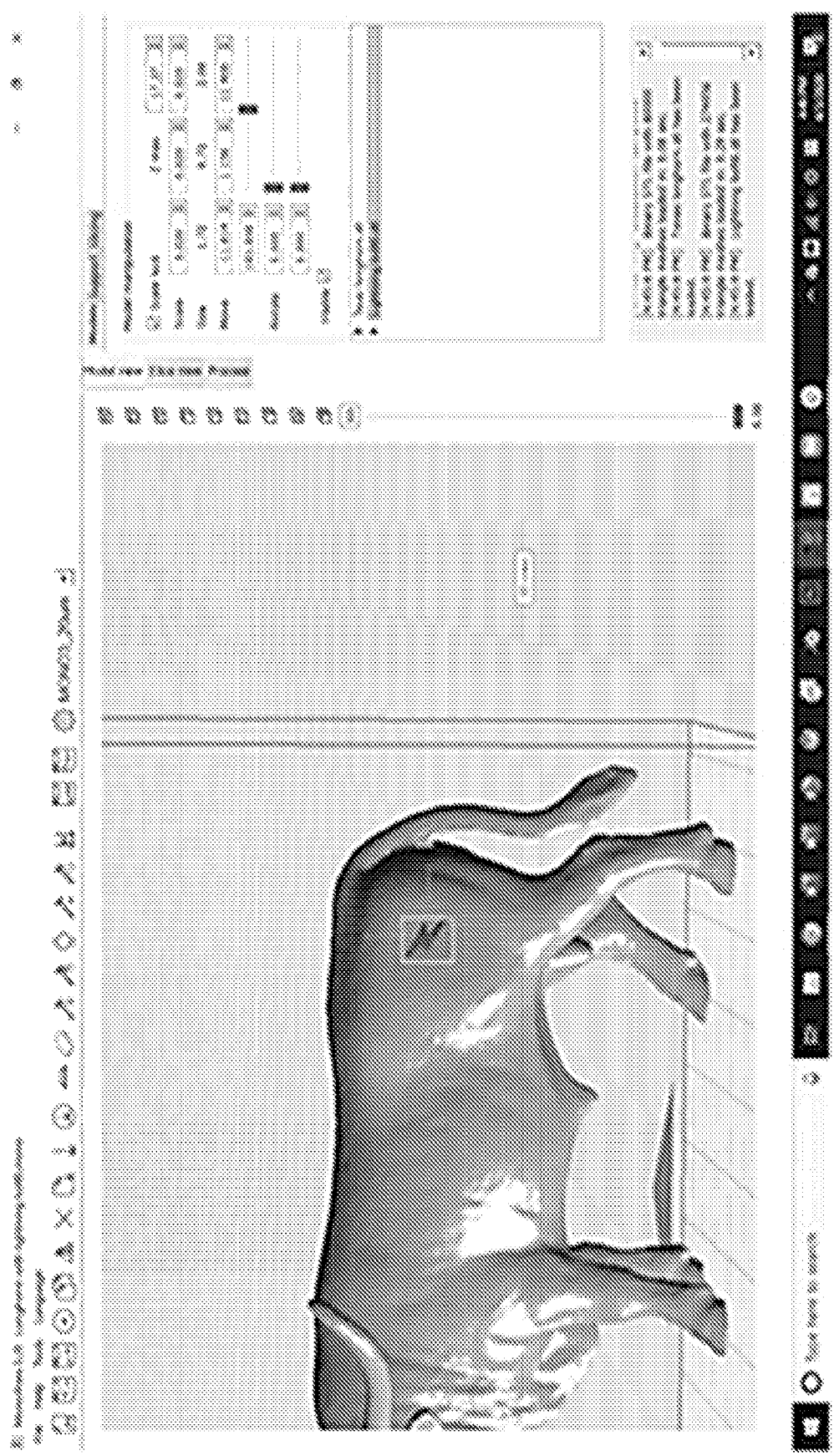
FIG. 101. Optical image of longhorn with lightning bolt.
Figure 102:
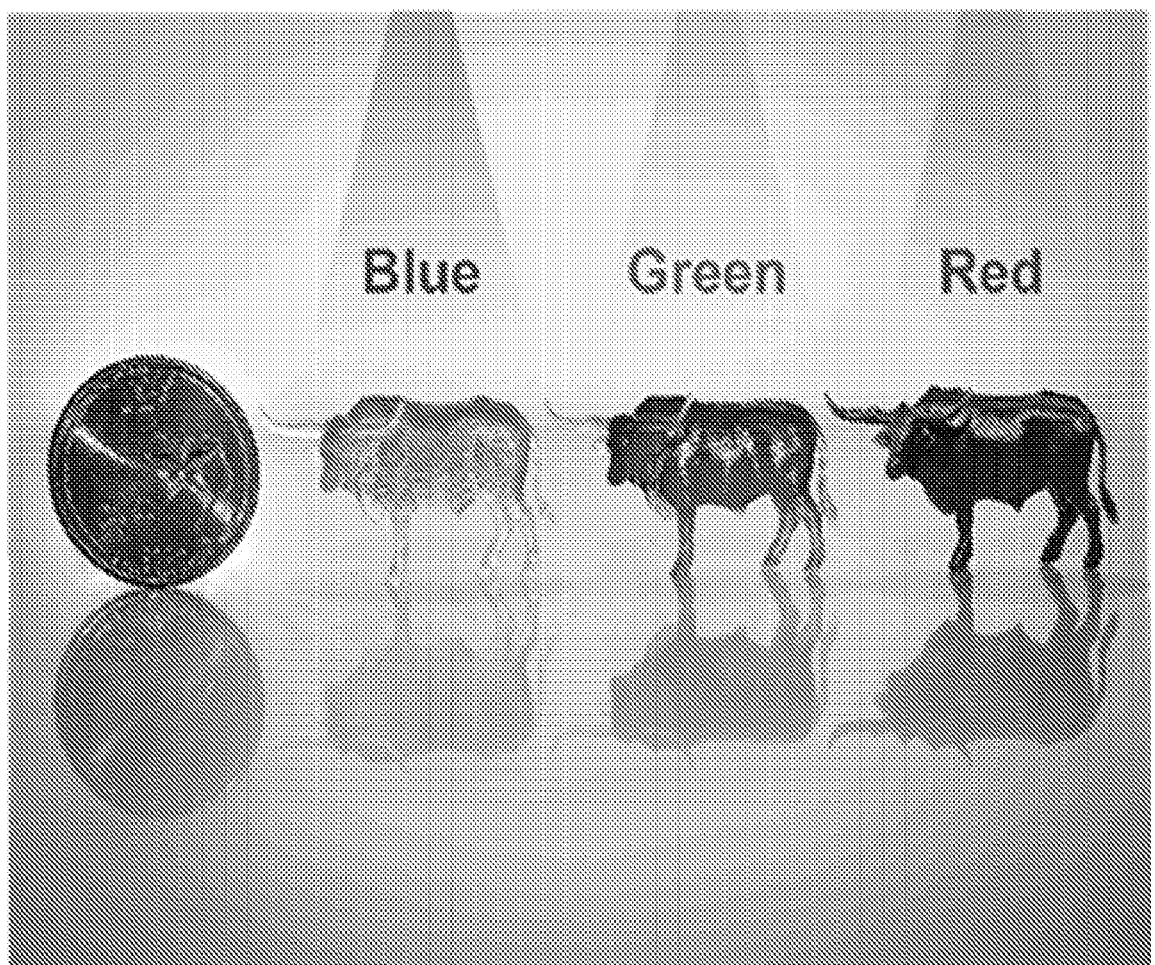
FIG. 102. Images of longhorns printed under various conditions.

An octet truss and longhorn were printed as a further demonstration of how visible light additive manufacturing can be used to rapidly provide high resolution 3D objects with custom form factors. Both objects were printed with the original stiff red resin using both 100 μm and 25 μm layer thickness. Decreasing the layer thickness facilitated reduced exposure times/layer. Furthermore, the longhorn was "branded" with a lightning bolt (FIG. 101) and scanning electron microscopy (SEM) images show individual pixels at the edges of the lightning bolt feature. These structures emphasize the capability of visible light 3D printing to produce sophisticated objects while maintaining high feature fidelity (FIG. 102).

Concluding remarks. Photopolymer resins that rapidly react upon irradiation with visible light across the spectrum were described and systematically examined for use in high resolution digital light processing 3D printing. Key discoveries and developments include rapid photocuring from combined iodonium (donor) and borate (acceptor) initiators, resolution enhancements from visible light absorbing azo-dyes (opaquing agent), and optimization using a method with variable exposure times within a single layer. RT-FTIR and photorheology were used to judiciously correlate photocuring kinetics with x,y,z-resolution, build speed, and mechanical properties to find that optimal resolution can be achieved with a wide processing window (~10 s) when opaquing agents are used. A custom digital light processing 3D printer with exchangeable LEDs provided rapid build speeds from 32.7 to 45.0 mm/h for violet, blue, green, and red light excitation at low intensity (~2-3 mW/cm$^2$). Based on kinetic measurements, increasing the light intensity by ~2-3× will increase the cure rate by a similar amount, thus providing an avenue to even faster printing. In addition to rapid builds, high resolution features were demonstrated. Furthermore, versatility of the presented platform was shown by producing both stiff and soft objects with nearly isotropic mechanical properties and Young's moduli ranging from ~1480 to 0.8 MPa. Finally, objects with intricate form factors were printed as a testament to the 3D capabilities offered with this technique. The methodical studies provided herein will serve as a roadmap for the future development of visible and NIR photocuring with excellent spatial control, scope, and utility that extends beyond 3D printing (e.g., coatings, adhesives, imaging, and lithography). As a result, numerous exciting and transformative interdisciplinary research opportunities in academic, industrial, and medical sectors that await, including hierarchical multimaterial fabrication, fiber reinforced composites, and cell-laden hydrogels.

Abbreviations: SLA, Stereolithography; DLP, Digital light processing; UV, ultraviolet; LED, light emitting diode; PI, photoinitiator; PS, photosensitizer; RT-FTIR, real time Fourier transform infrared; OA, opaquing agent; ASTM, American Society for Testing and Materials Example 3—Visible to Near Infrared Light Activated Photopolymer Resins Rapid high resolution visible light photocurable resin compositions are presented. First, acrylic resins cured with either blue (~460 nm), green (~530 nm), or red (~616 nm) light were each formulated and optimized with a monomer, crosslinker, photosensitizer, and donor and acceptor co-initiators. Specifically, photocuring was demonstrated with dimethyl acrylamide and 2-hydroxyethyl acrylate as the monomers, trimethylolpropane triacrylate and tetra(ethylene glycol) diacrylate as the crosslinkers, [4-(octyloxy)phenyl] (phenyl)iodonium hexafluoroantimonate diphenyliodonium as the acceptor co-initiator, 2-(butyryloxy)-N,N,N-trimethylethan-1-aminium butyltriphenylborate as the donor co-initiator, and various commercial dyes (e.g., camphorquinone, xanthene, cyanine, and porphyrin derivatives) as the photosensitizers. Visible light curing (e.g., blue, green, or red) was assessed using real time Fourier transform infrared spectroscopy revealed rapid polymerization (polymerization complete within ~20 seconds) when using 2 wt % acceptor (relative to monomer+crosslinker), 0.2 wt % donor, and either 6-butoxy-2,4-diiodo-3H-xanthen-3-one (0.1 wt %), Rose Bengal (0.1 wt %), or zinc tetraphenylporphyrin (ZnTPP, 0.3 wt %) as the photosensitizer compounds with blue, green, or red light irradiation, respectively.

Photosensitizers have been used for visible-near infrared photocuring for a variety of resins, but they are inherently slower than classic photoinitiators that absorb UV light. This is because the active curing ingredient is generated in a two-step process when using photosensitizers, as compared to a one-step process with photoinitiators. Thus, the reaction must be very efficient in order to obtain speeds that rival UV curing and are applicable to the same breadth of applications that have had transformative advances in inter alia coatings, adhesives, microelectronics, imaging, and 3D printing. The proper combination of three components in the compositions described herein rapidly generates reactive curing agents and recycles the photosensitizer. This enables photocuring on application relevant time-scales (<1 minute).

To replicate traditional UV-based high resolution photocuring that has led to transformative advances in the areas of inter alia 3D printing, imaging, coatings, adhesives, and microelectronics using visible LEDs requires rapid curing (<1 min) and low light intensity (<10 mW/cm2) that can be easily achieved on an inexpensive system.

As an alternative to high energy UV light that is used in contemporary photocuring applications, visible light offers numerous benefits, including reduced cost and energy of irradiation from readily available and modular light emitting diodes (LEDs), improved biocompatibility and functional group tolerance, greater depth of penetration, and reduced scattering. As such, visible light photocuring has the potential to enable next generation designer material fabrication, including, inter alia, hydrogels containing live cells, opaque composites, and wavelength-selective multi-material structures that promise to advance a range of applications, from structural plastics to tissue engineering and soft robotics.

A possible disadvantage to some of the compositions discussed herein is that the resultant cured objects are colored based on the intrinsic color of the photosensitizer used. However, if a colorless compound is required, then the color can be removed through the use of higher intensity light irradiation in the presence of oxygen to photobleach the sensitizer or by washing the post-cured parts with a compatible solvent to extract the colored compounds.

Further, oxygen is partially removed from the current composition to increase the curing rate, which is not practical in all applications. Various oxygen quenching additives can be added instead to provide the same outcome.

Example 4—Additives for Ambient 3D Printing with Visible Light

Abstract. With 3D printing the desire is to be "limited only by imagination", and, although remarkable advancements have been made in recent years, the scope of printable materials remains narrow compared to other forms of manufacturing. Light-driven polymerization methods for 3D printing are particularly attractive due to unparalleled speed and resolution, yet the reliance on high energy UV/violet light in contemporary processes limits the number of compatible materials due to pervasive absorption, scattering, and degradation at these short wavelengths. Such issues can be addressed with visible light photopolymerizations. However, these lower-energy methods often suffer from slow reaction times and sensitivity to oxygen, precluding their utility in 3D printing processes that require rapid hardening (curing) to maximize build speed and resolution. Herein, multifunctional thiols (1-10 wt %) are identified as simple additives to enable rapid (~10 s/layer) high resolution (<50 µm) visible light (red, ~620 nm) 3D printing under ambient (atmospheric O2) conditions that rival modern UV/violet-based technology. The present process is universal, providing access to commercially relevant acrylic resins with a range of disparate mechanical responses from strong and stiff to soft and extensible. Pushing forward, the insight presented within this study can inform the development of next generation 3D printing materials, such as multicomponent hydrogels and composites.

Introduction. Additive manufacturing is a rapidly expanding field that enables the production of complex 3D objects with unmatched speed and precision. Unlike traditional "subtractive" manufacturing processes, which require excessive time, energy, material, and equipment (for milling, carving, and machining), 3D printing operates in a simple "additive" fashion to create objects via successive growth (Truby R L et al. *Nature* 2016, 540, 371; Bagheri A et al. *ACS Appl. Polym. Mater.* 2019, 1, 593; Wallin T J et al. *Nat. Rev. Mater.* 2018, 3, 84). However, progress from prototyping to industrial manufacturing necessitates continued research efforts in the fundamental science and engineering of 3D printing to simultaneously decrease production time (Tumbleston J R et al. *Science* (80-.). 2015, 347, 1349; De Beer M P et al. *Sci. Adv.* 2019, 5, eaau8723), broaden material scope (Moore D G et al. *Nat. Mater.* 2020, 19, 212-217; Schwartz J J et al. *Nat. Commun.* 2019, 10, 791), demonstrate energy efficient scalability (Walker D A et al. *Science* (80-.). 2019, 366, 360), and enhance resolution (Saha S K et al. *Science* (80-.). 2019, 366, 105; Vyatskikh A et al. *Nat. Commun.* 2018, 9, 593), all with facile user-friendly operation.

Numerous additive methods that bring materials together with spatial control have been demonstrated, from deposition and heating to light exposure. The utility of light is particularly attractive given the ability to create micron-sized features at low cost using inexpensive existing projection-based digital light processing (DLP) and light emitting diode liquid crystal display (LED/LCD) technologies. Both digital light processing and light emitting diode liquid crystal display methods use vat photopolymerization 3D printing, which employs light to convert liquid resins into solid objects. Although conventional light-based 3D printing relies on high energy ultraviolet (UV) light to achieve rapid polymerization rates and correspondingly short build times (~seconds/layer), visible light is emerging as an attractive alternative (Ahn D et al. *ACS Cent. Sci.* 2020, 6, 1555; Bagheri A et al. *ACS Appl. Polym. Mater.* 2020, 2, 782; Boyer C A J M et al. *Angew. Chemie* 2021, 133(10), 5549-5556). Relative to UV light, visible light is naturally abundant, less expensive, and benign (generally reduced absorption and scattering), which gives it the potential to advance 3D printing of polymeric materials by enabling economical preparation of, for example, cell-laden hydrogels (Lim K S et al. *Chem. Rev.* 2020, 120(19), 10662-10694), opaque composites (Strehmel B et al. *Chem.—A Eur. J.* 2019, 25, 12855), or multi-material structures (via wavelength selective reactions) (Schwartz J J et al. *Nat. Commun.* 2019, 10, 791; Dolinski N D et al. *Adv. Mater.* 2018, 30, 1800364; Bialas S et al. *Adv. Mater.* 2019, 31, 1807288; Hahn V et al. *Adv. Funct. Mater.* 2020, 1907795; Michalek L et al. Adv. *Funct. Mater.* 2020, 2005328).

Figure 103:
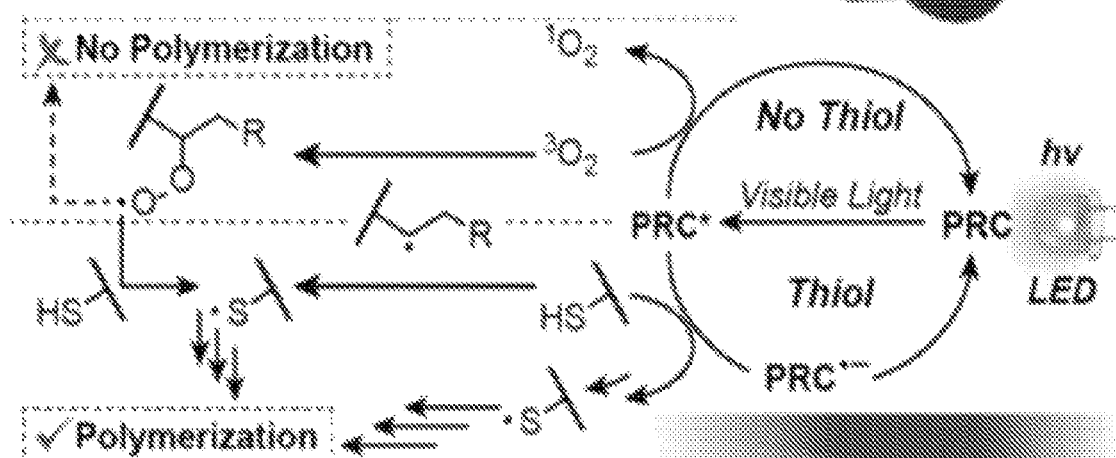
FIG. 103. Challenges, prior work, and presented advancements in visible digital light processing (DLP) 3D printing. The central reaction mechanisms show how oxygen inhibits polymerization/curing (top, prior work) and how the addition of thiols bypasses inhibition to generate reactive thiyl radicals that induce polymerization/curing (bottom, present work). The digital 3D renditions of the tadpole and frog relate to prior and present work, respectively, as metaphors for a transformative advance that enables "operation" in air.
Figure 104:
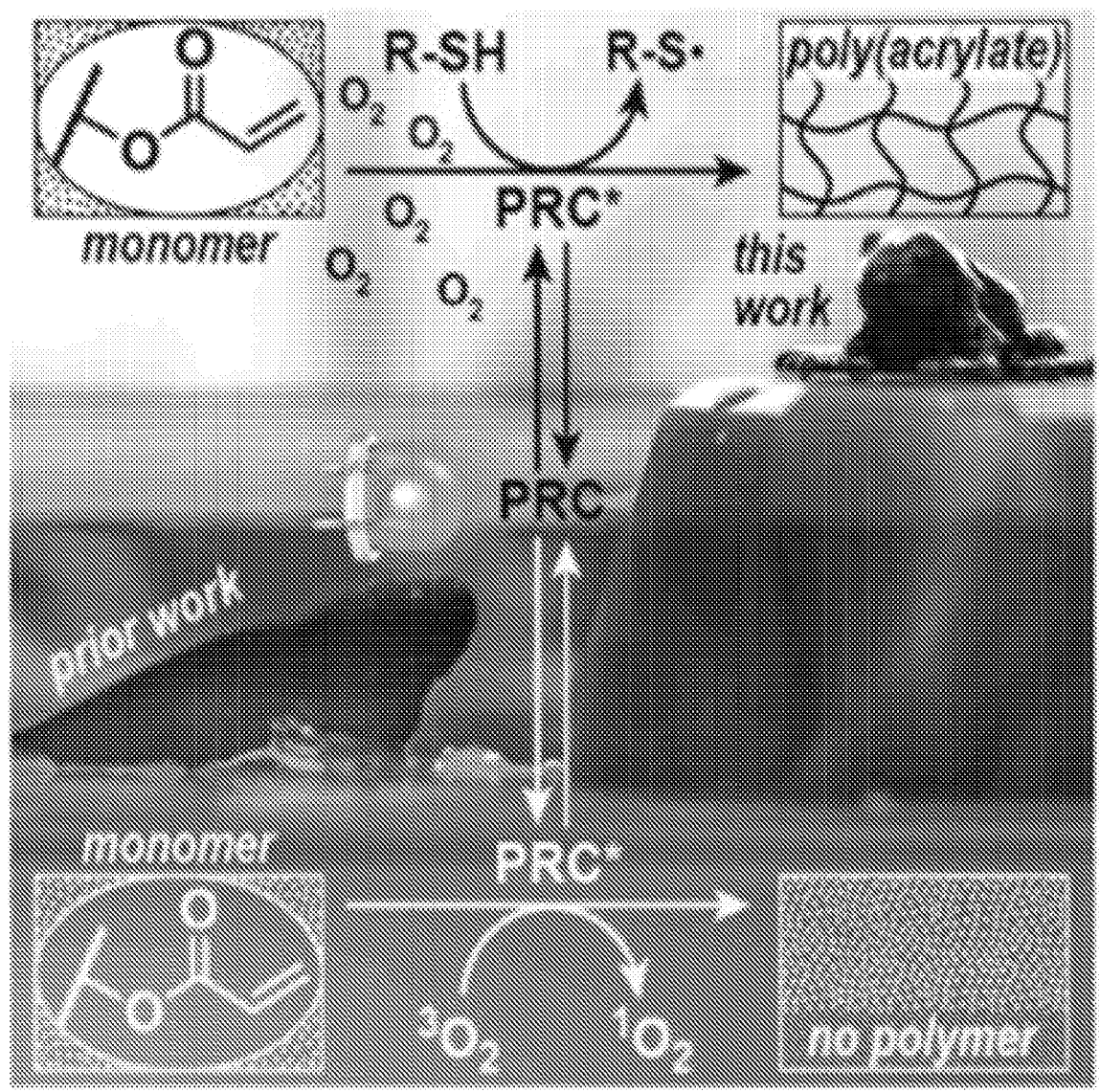
FIG. 104. Rapid visible light induced polymerization of commercially relevant acrylics and concomitant 3D printing under ambient conditions is made possible with thiol additives acting as oxygen scavengers. The tadpole and frog were 3D printed using energy efficient red LEDs, metaphorically representing the transformative advance that allows additive manufacturing (or breathing for the frog) in air.

Recently, it was demonstrated that a three component photosystem comprising a visible light absorbing photoredox catalyst (PRC) with donor (diphenyliodonium) and acceptor (triphenyl (n-butyl) borate) co-initiators could facilitate photocuring of acrylate-based resins on timescales (~seconds) that were competitive with commercial UV light systems (FIG. 103 and FIG. 104) (Ahn D et al. *ACS Cent. Sci.* 2020, 6, 1555). However, the difference in mechanism undergone by UV photoinitiators (Type I) and visible photoredox catalysts (Type II) to generate reactive radicals results in greater oxygen sensitivity for the latter. Thus, a major limitation of highly reactive visible light curable resins for 3D printing is the need for oxygen removal, both from the resin and surrounding atmosphere during printing. To briefly explain the disparity in oxygen sensitivity, UV photoinitiators generate free radicals upon rapid homolytic scission from singlet photoexcited states (Type I mechanism), while efficient visible photoredox catalysts often rely on triplet photoexcited states to minimize the impact of rate-limiting electron transfer to a co-initiator for radical formation (Type II mechanism) (Allen N S. *J. Photochem. Photobiol. A Chem.* 1996, 100, 101; Lu P et al. *Polym. Chem.* 2021, 12, 327; Stafford A et al. *J. Am. Chem. Soc.* 2020, 142, 14733). Given that molecular oxygen resides in a triplet ground state, it rapidly reacts with photoredox catalysts in their triplet-excited states, which results in a delayed onset of curing, called the oxygen inhibition period (Arias-Rotondo D M et al. *Chem. Soc. Rev.* 2016, 45, 5803). Furthermore, oxygen will quench propagating carbon centered radicals to form more stable peroxy radicals that do not reinitiate acrylate polymerizations. Thus, oxygen limits curing speed and monomer-to-polymer conversion, which necessitates its removal (Husár B et al. *Prog. Org. Coatings* 2014, 77, 1789; Ligon S C et al. *Chem. Rev.* 2014, 114, 577).

Oxygen inhibition time has previously been decreased for photocurable coatings by increasing photo-catalyst/-initiator concentrations (≥5 wt %), which causes a rapid reaction with ambient oxygen (Ligon S C et al. *Chem. Rev.* 2014, 114, 577). However, increased loadings bear a number of limitations, including associated costs, requirements for resin solubility, reduced penetration depths due to optical attenuation, increased toxicity, and plasticization (softening) of cured parts. Alternatively, several physical strategies for eliminating oxygen inhibition have been developed for industrial coatings, such as photocuring under inert gas (e.g., $N_2$ or Ar), introducing physical barriers (e.g., in-laminate), employing resins with low oxygen solubility, and increasing irradiation intensity (Ligon S C et al. *Chem. Rev.* 2014, 114, 577). Despite success in coatings, these approaches limit the general applicability of visible light 3D printing by requiring specialized and costly equipment. Chemical deoxygenation (e.g., oxygen scavengers) presents a low-cost and facile substitute. Apart from decreasing or removing the oxygen inhibition period, ideal chemical additives should not slow the photopolymerization, generate toxic byproducts that can leach out of the final print, nor alter thermomechanical properties of the printed object.

Inspired by oxygen insensitive thiol-ene photopolymerizations (Chen L et al. *J. Mater. Chem. C* 2018, 6, 11561; Cook C C et al. *Adv. Mater.* 2020, 32, 1), the use of thiols as additives to enable ambient 3D printing of acrylic resins with red light (~620 nm) was examined. In contrast to pure thiol-ene resins, acrylic resins have a greater commercial presence due to their more tenable odor, improved storage stability, and wider materials scope. As described herein, thiol additives can simultaneously preclude oxygen inhibition and enhance photopolymerization rates under ambient conditions for visible light photocuring. The process is shown to be universal, enabling rapid high-resolution visible light 3D printing for an array of acrylic resins. To emphasize industrial relevance, commercial urethane acrylate resins from Dymax® serve as a representative case study, where objects with <100 μm feature dimensions and elastic moduli spanning more than three orders of magnitude are demonstrated. Furthermore, good storage stability and network uniformity without thiol leaching makes the present method an appealing, simple approach to save both time and money in next generation 3D printing.

Figure 105:
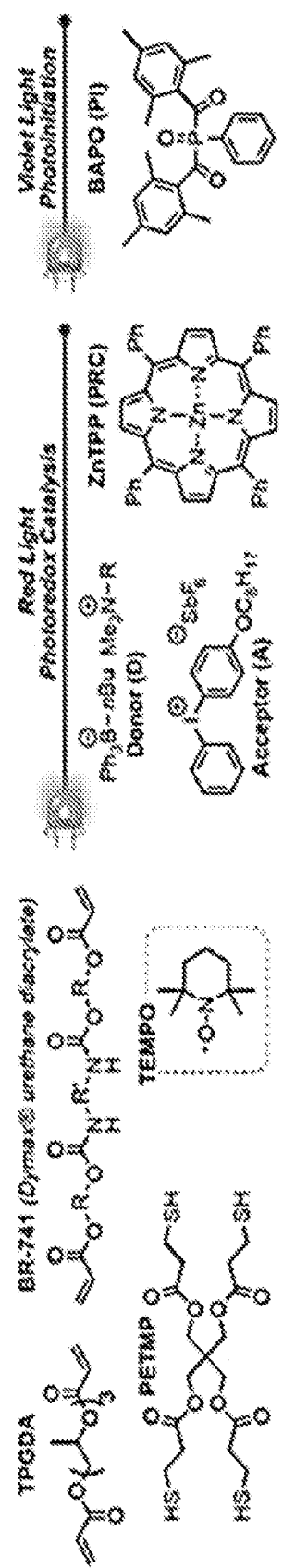
FIG. 105. Chemical structures for polymerizable groups of primary resin components. Red light reactive photosystem: ZnTPP (photoredox catalyst, PRC), borate derivative as electron donor (D) (co-)initiator, and diphenyliodonium derivative as electron acceptor (A) (co-)initiator. Violet light reactive photoinitiator (PI), BAPO.
Figure 114:
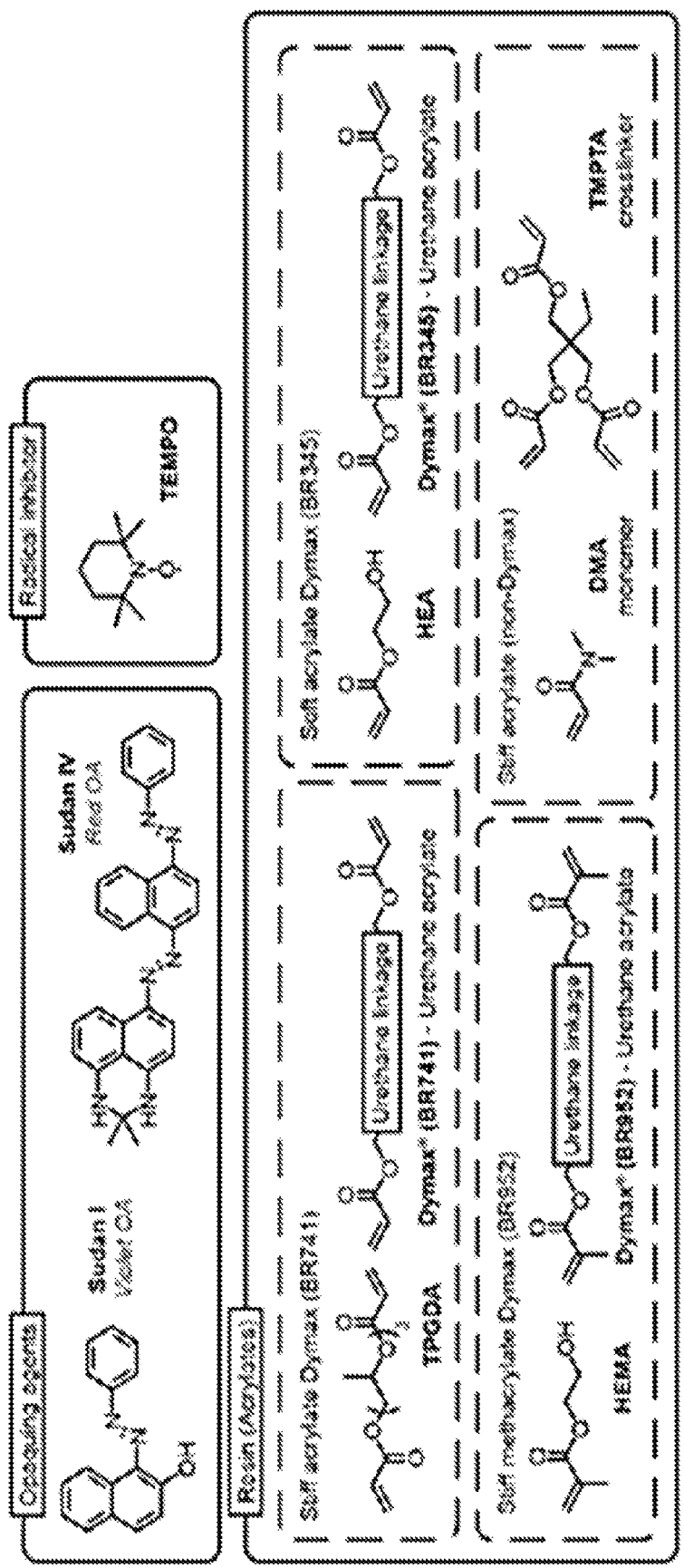
FIG. 114. Chemical structures for all photopolymer resin components tested in the present study.
Figure 114:
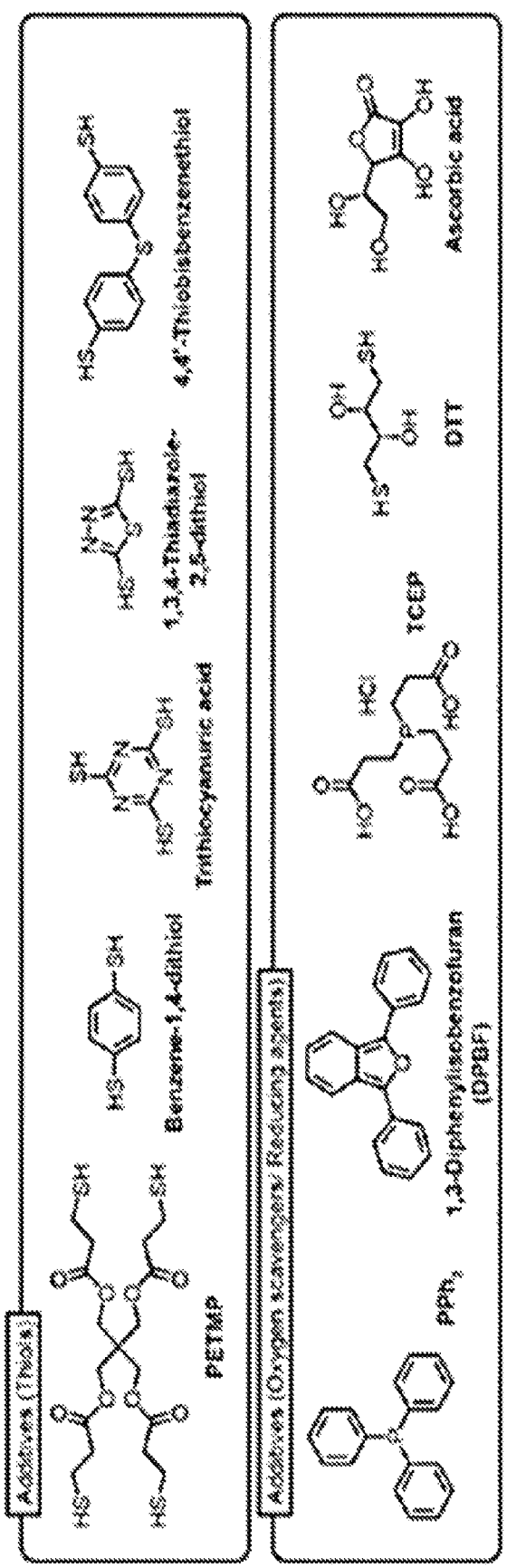

Results and Discussion. Rapid visible light 3D printing under ambient conditions required removal of oxygen to minimize inhibition periods. Initially, photocurable resins that undergo a thiol-ene mechanism were considered given the precedent for oxygen insensitivity enabled by rapid and efficient hydrogen atom abstraction from thiols to generate reactive thiyl radicals (Dénès F et al. *Chem. Rev.* 2014, 114, 2587). For commercial relevance, it was desirable to use industrial (meth)acrylate monomers and crosslinkers as bulk resin constituents. The exemplary resin described below contains an oligourethane diacrylate from Dymax® (BR-741) together with tri(propylene glycol) diacrylate (TPGDA) in a 1:1 ratio, pentaerythritol tetrakis(3-mercaptopropionate) (PETMP) (1-10 wt %, displacing TPGDA), a three component photosystem, 2,2,6,6-Tetramethyl-1-piperidinyloxy (TEMPO), and an opaquing agent (OA) (FIG. 105 and FIG. 114). The versatility of this protocol was demonstrated using a wide range of monomers and crosslinkers supplementing those described above: Dymax® oligourethane-di(meth)acrylates (BR-345 and BR-952), N,N-dimethylacrylamide, trimethylolpropane triacrylate, isobornyl acrylate, and 2-hydroxyethyl (meth)acrylate (described below). Additionally, nine other small molecules were tested as possible oxygen scavengers, including various thiols, 1,3-diphenylisobenzofuran, triphenylphosphine, and ascorbic acid which all underperformed relative to PETMP using equimolar amounts by functionality (details provided below, FIG. 121 and FIG. 122 and Table 20). For clarity, representative experiments are highlighted herein, which emphasize resins containing BR-741 and TPGDA.

Figure 106:
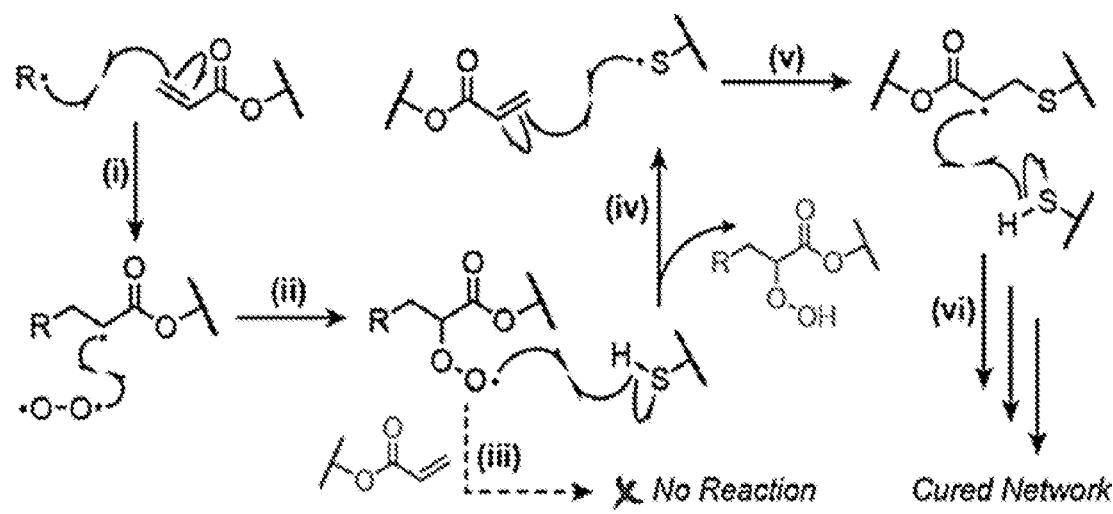
FIG. 106. Proposed mechanisms that can enable polymerization under ambient conditions. Mechanism of radical addition to an acrylate (i) to generate a carbon centered radical that reacts with oxygen to form a peroxy radical (ii). The peroxy radical does not react with (meth)acrylates (iii), but abstracts a hydrogen from thiol to generate a thiyl radical (iv) that adds to (meth)acrylates via thiol-ene (v). Radical propagation results in polymer network formation (vi).
Figure 107:
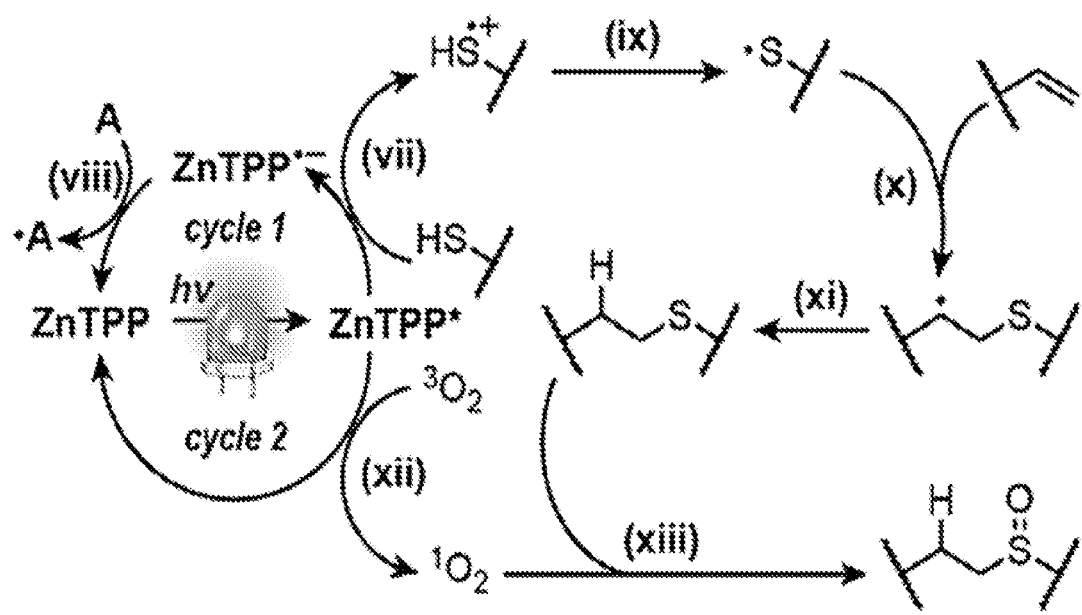
FIG. 107. Proposed mechanisms that can enable polymerization under ambient conditions. Cycle 1 mechanism: reductive quenching of photoexcited photoredox catalyst (ZnTPP*) by thiols (vii) to generate ZnTPP·- (radical anion) that can be oxidized back to ZnTPP by the diphenyliodonium acceptor, A, (viii) and a thiol radical cation that forms a thiyl radical upon H-atom abstraction (ix). Thiol-ene addition (x), followed by H-atom abstraction (xi). Cycle 2 mechanism: energy transfer from ZnTPP* to molecular oxygen ($^3O_2$) (xii) forming reactive singlet oxygen ($^1O_2$) that can oxidize sulfide to sulfoxide (xiii).
Figure 115:
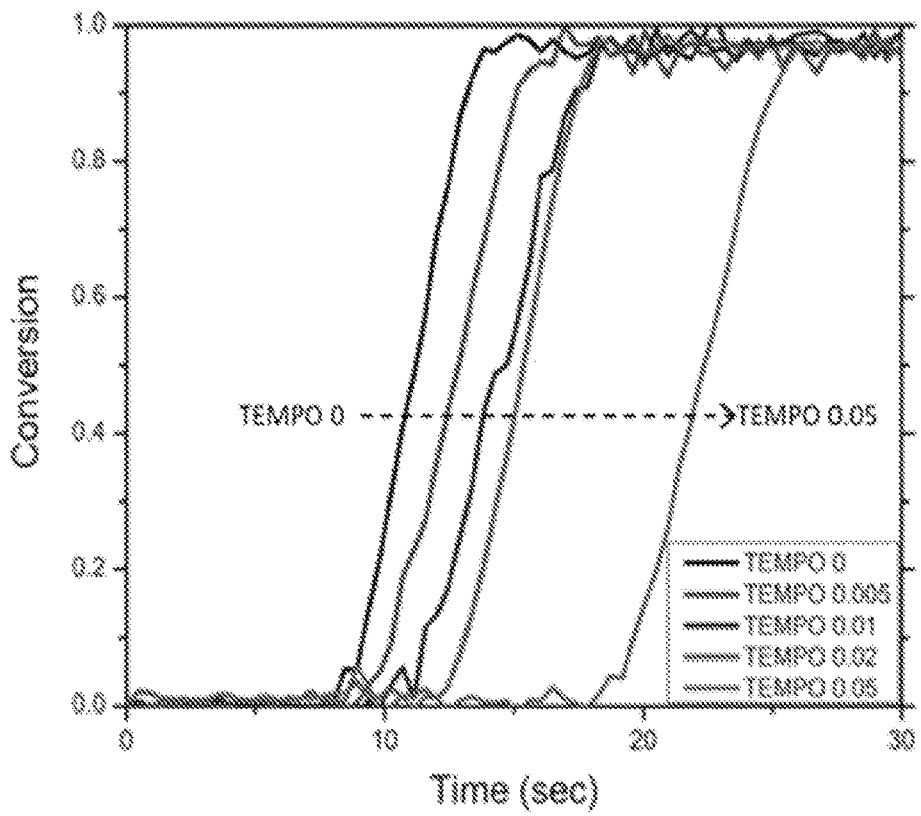
FIG. 115. RT FTIR spectroscopy, varying TEMPO concentration at red LED printer intensity (617 nm, 2.5 mW/cm$^2$), showing vinyl group conversion of resin D50S50 versus time. The LED was not turned on until ~10 seconds.
Figure 116:
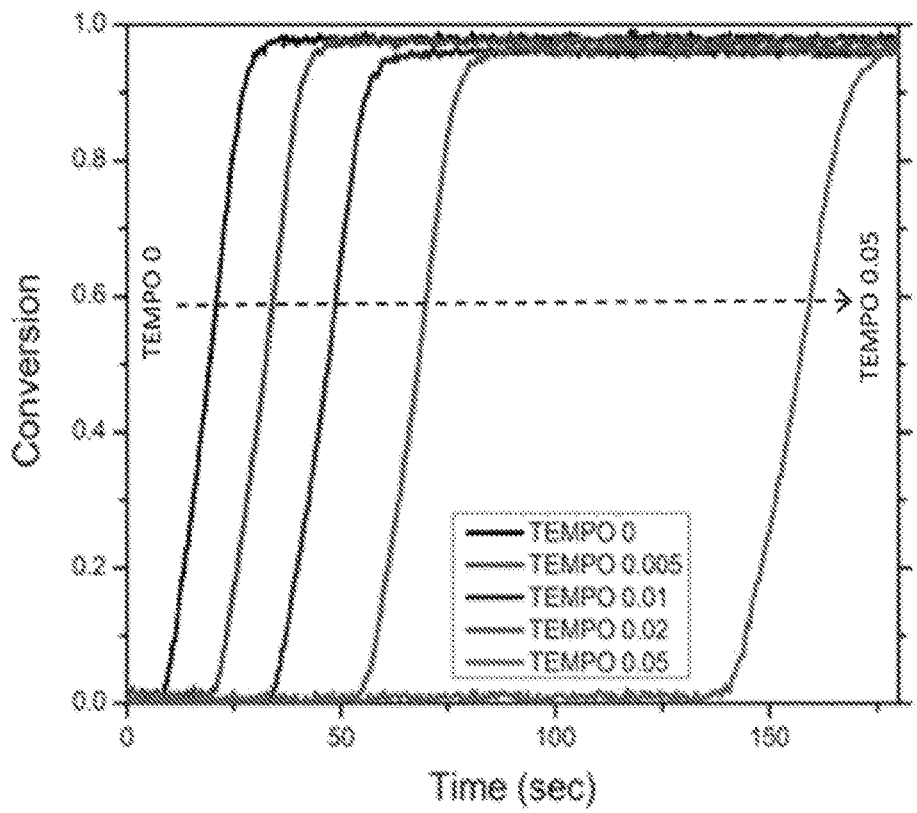
FIG. 116. RT FTIR spectroscopy, varying TEMPO concentration at a reduced red LED intensity (617 nm, 0.2 mW/cm$^2$), showing vinyl group conversion of resin D50S50 versus time. The LED was not turned on until ~10 seconds.

The combination of BR-741 and TPGDA provides a robust hard plastic. The tetrathiol, PETMP, was selected in an attempt to maintain a similar crosslink density given that thiol-ene addition reactions occur through a step-growth mechanism in contrast to free radical acrylate polymerizations that operate by chain-growth (i.e., the functionality of a diacrylate can be equated to that of a tetrathiol) (FIG. 105-FIG. 107). The three component photosystem comprised zinc tetraphenylporphyrin (ZnTPP) as the red light absorbing photoredox catalyst (PRC), 2-(butyryloxy)-N,N,N-trimethylethan-1-aminium butyltriphenylborate as the electron donor (D) (co-)initiator, and [4-(octyloxy)phenyl] (phenyl)iodonium hexafluoroantimonate as the electron acceptor (A) (co-)initiator. This photosystem efficiently generates radicals that can (in the absence of oxygen) result in rapid curing (<10 s) of acrylate-based resins upon exposure to red light (~620 nm) (Ahn D et al. *ACS Cent. Sci.* 2020, 6, 1555). A red light system was chosen, as opposed to green or blue, to emphasize the magnitude of the present results, given that rapid photocuring with longer wavelengths of light is inherently more challenging due to the utility of lower energy photons. Inclusion of small amounts of TEMPO (0.01 wt %) as a radical scavenger was found to effectively stabilize the resins and prevent unwanted background (or "dark") curing (FIG. 115 and FIG. 116 and Table 15). The opaquing agent selected was Sudan Black, a biological azo-stain that can passively absorb red light to induce cis/trans isomerization and limit the penetration depth of photons to cure only within the layer of interest (Penney D P et al. *Biotech. Histochem.* 2002, 77, 237). Thus, the presence of an opaquing agent optimizes 3D printing resolution, particularly in the z-dimension (layer thickness), by preventing cure-through. As a control, bis-acylphosphine oxide (BAPO) was employed as a Type I photoinitiator (PI) operable under 405 nm (violet) light exposure, which replaced the three-component photosystem (FIG. 105).

The addition of PETMP was anticipated to reduce oxygen inhibition through two mechanisms: 1) hydrogen abstraction from thiols by peroxy radicals formed when propagating carbon centered radicals react with molecular oxygen (FIG. 106) (Hoyle C E et al. *J. Polym. Sci. Part A Polym. Chem.* 2004, 42, 5301); and 2) reductive quenching of ZnTPP* (excited ZnTPP) by thiols (FIG. 107) (Guerrero-Corella A et al. *Chem. Commun.* 2017, 53, 10463). While the first mechanism (peroxy radical quenching) has been the predominant rationalization for oxygen tolerance of thiol-ene reactions that are activated through a Type I UV/violet mechanism, it was hypothesized that the second mechanism (reductive quenching) can play a more important role in the present Type II visible light photosystem. This is attributed to long-lived, oxygen reactive photoredox catalyst triplet states, which are needed to facilitate rapid curing with visible light (Stafford A et al. *J. Am. Chem. Soc.* 2020, 142, 14733). Thus, it is proposed that reductive quenching of ZnTPP* (FIG. 107, cycle 1) competes with energy transfer to molecular oxygen ($^3O_2$) (FIG. 107, cycle 2), which forms reactive singlet oxygen ($^1O_2$). Upon reductive quenching, thiol oxidation followed by hydrogen atom transfer results in the formation of thiyl radicals, which rapidly react with prevalent (meth)acrylate functionality through an anti- Markovnikov thiol-ene addition mechanism (Capaldo L et al. *European J. Org. Chem.* 2017, 2017, 2056). Furthermore, the resultant sulfides (thioethers) may react with $^1O_2$ to form sulfoxides, precluding deleterious pathways (e.g., $^1O_2$ reacting with the photoredox catalyst) that could hamper curing (Guerrero-Corella A et al. *Chem. Commun.* 2017, 53, 10463). In this manner, the benefit of thiols for visible light photocuring (via a Type II mechanism) was proposed to have an unprecedented impact on minimizing the oxygen inhibition period and concomitant build times for emergent 3D printing applications.

Figure 108:
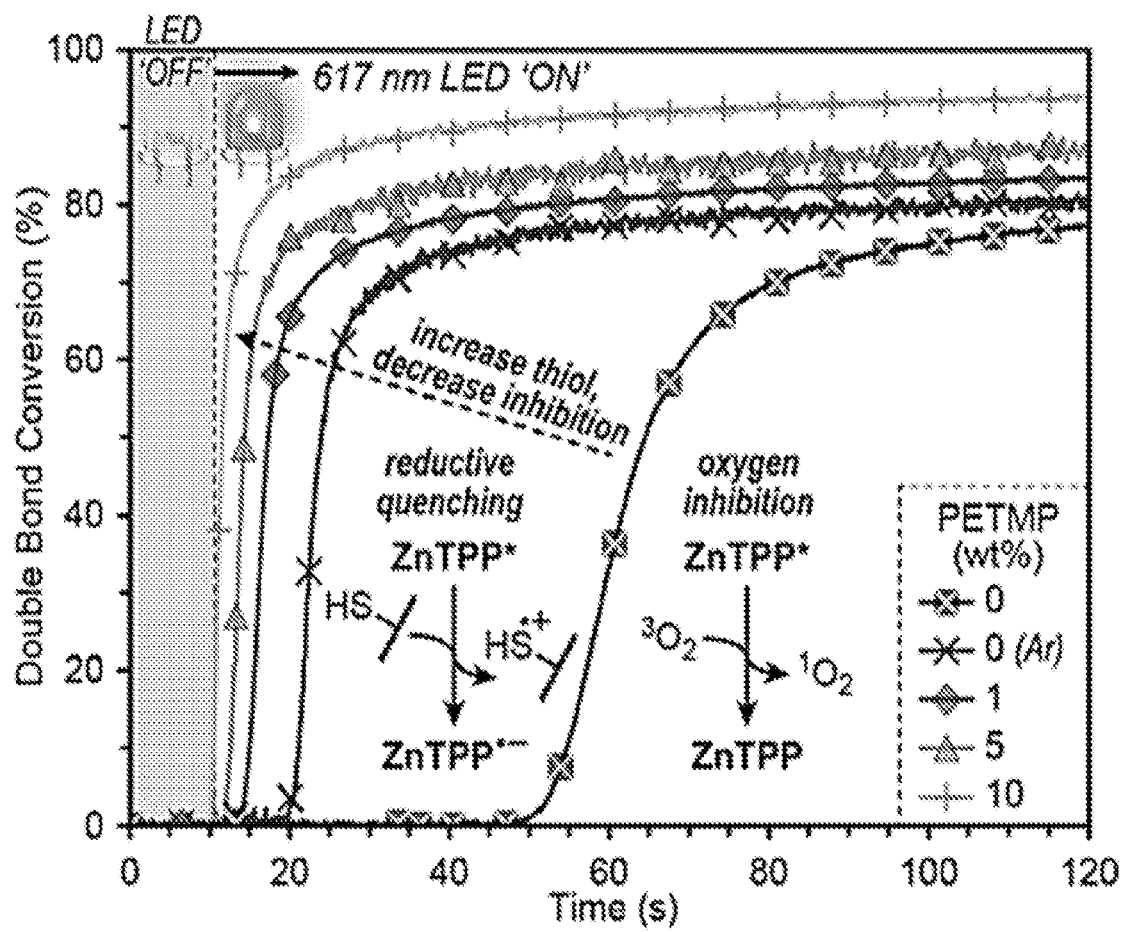
FIG. 108. Influence of PETMP (tetrathiol) on oxygen inhibition and rate of BR-741:TPGDA (1:1) polymerization (where PETMP displaces TPGDA), monitored using real time Fourier transform infrared (RT FTIR) spectroscopy. Red light photocuring (617 nm, 2.5 mW/cm$^2$) of resins without PETMP under an ambient (oxygen-containing) and inert (argon) atmosphere, and with 1, 5, and 10 wt % PETMP. A decrease in oxygen inhibition occurs with both red and violet light curing (FIG. 109), but is more substantial for red light given the combination of reductive quenching and hydrogen atom abstraction by peroxy radicals.
Figure 119:
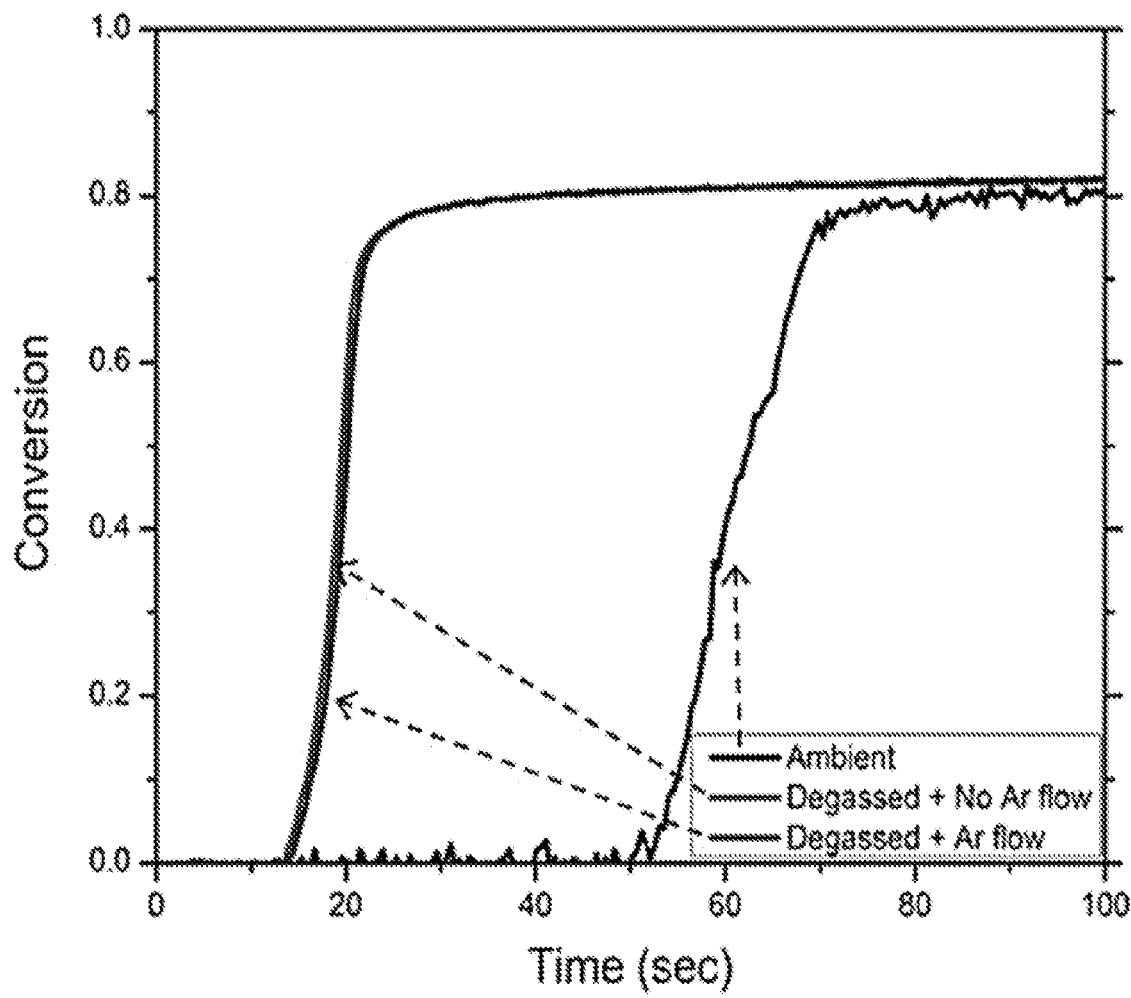
FIG. 119. RT FTIR spectroscopy, monitoring photopolymerizations for resins comprising DMA/TMPTA (4/1, w/w %), 0.05 mol % ZnTPP, 0.05 mol % Borate V, 0.35 mol % HNu-254, and 0.01 mol % TEMPO. Resins were photopolymerized under i) ambient conditions, ii) degassed+no inert gas flow, iii) degassed+inert gas flow over the sample during the measurement.

To determine the impact of thiol additives on the rate of ambient visible light photopolymerization, real time Fourier transform infrared spectroscopy (RT FTIR) was used to quantitatively determine monomer-to-polymer conversion during irradiation. Specifically, the disappearance of the signal corresponding to carbon-carbon double bond (C=C) stretches at ~3,100 cm$^{-1}$ was monitored using a transmission configuration with the resin sample residing in a ~100 µm gap between glass slides (additional experimental details found below) (Chatani S et al. *ACS Macro Lett.* 2014, 3, 315). All samples showed an excellent temporal response, with no identifiable reactions occurring in the absence of light during the first 10 seconds of each measurement. Initially, samples without PETMP (tetrathiol) were irradiated under ambient conditions with a red LED centered at 617 nm (FWHM≈19 nm) having an intensity of 2.5 mW/cm$^2$ (matching the digital light processing 3D printer intensity). The result was an inhibition period of 49.4±0.4 s and an initial rate of polymerization of 7.5±5.3%/s (immediately following inhibition) (FIG. 108 and Table 7). Degassing the same resin (no PETMP) with argon for ~1 minute resulted in a significant decrease in the inhibition period, down to ~10 s, analogous to prior observations (Ahn D et al. *ACS Cent. Sci.* 2020, 6, 1555). However, due to the high viscosity of the Dymax® BR-741 containing resin, removal of oxygen by sparging with an inert gas was more challenging than in previous systems (Ahn D et al. *ACS Cent. Sci.* 2020, 6, 1555), resulting in less reproducible inhibition periods. Furthermore, the presence of TEMPO supplements the inhibition period, particularly in the absence of an oxygen scavenger such as thiol (FIG. 119). The addition of only 1 wt % PETMP reduced the inhibition period to a greater extent than what was typically observed for degassed samples, down to 5.8±1.7 s, while also increasing the polymerization rate up to 19.6±3.5%/s. Photorheology at equivalent light intensity under ambient conditions was in-line with these results, showing a time to gelation (gel point) of 7.9±0.8 s post-irradiation with 1 wt % PETMP in contrast to a gel point of 64.0±0.6 s without PETMP (FIG. 125-FIG. 129 and Table 8). Increasing the content of PETMP further decreased the inhibition time (and gel point) and increased the rate of polymerization, with a nearly instantaneous reaction occurring upon exposure to light when 10 wt % PETMP was incorporated; for reference 10 wt % PETMP in the present resin is ~10 mol % PETMP (details provided in the "NMR Spectroscopy" section below). Preliminary shelf life tests were performed by leaving the resins at room temperature in the dark and testing the photopolymerization kinetics with RT FTIR over time. After four weeks, it was observed that the rate of polymerization and inhibition period remained nearly unchanged, indicating good shelf stability (FIG. 124 and Table 21).

TABLE 7

Figure 109:
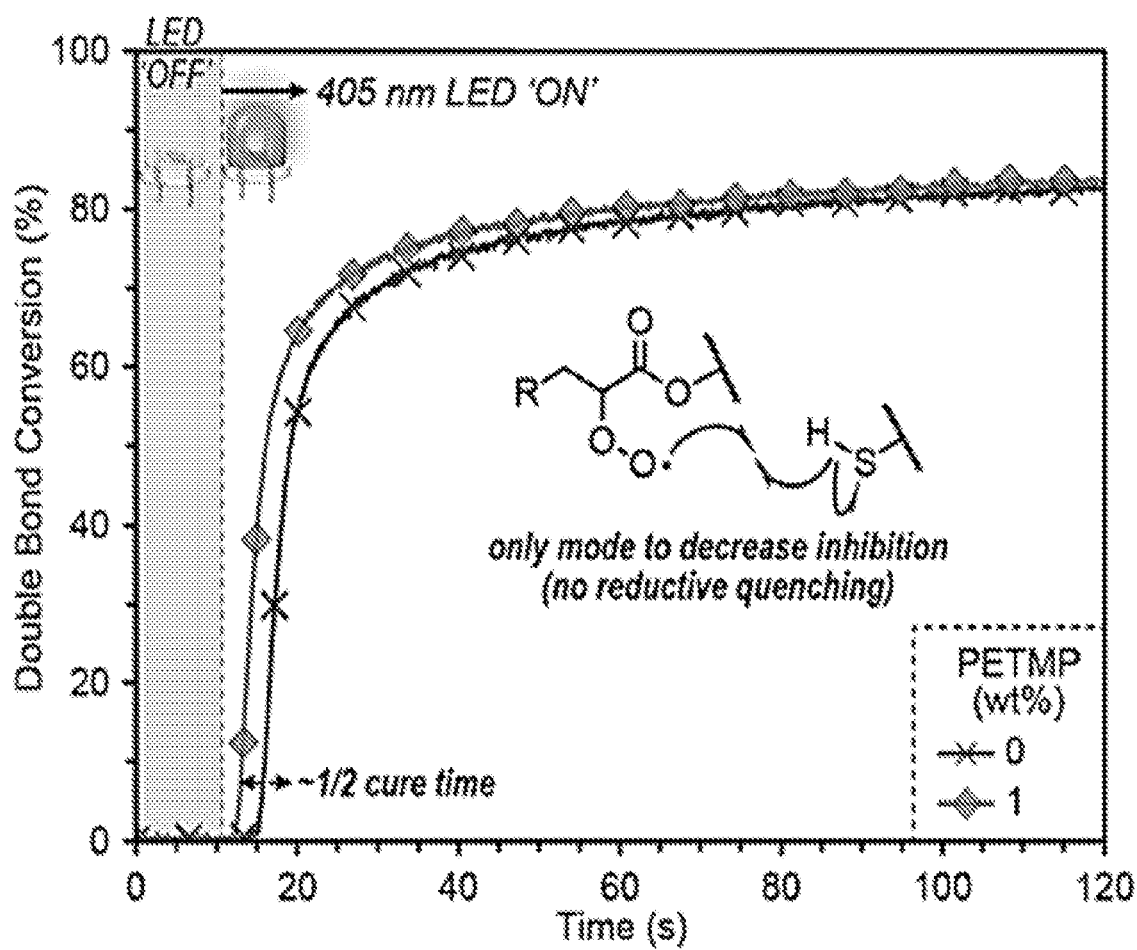
FIG. 109. Influence of PETMP (tetrathiol) on oxygen inhibition and rate of BR-741:TPGDA (1:1) polymerization (where PETMP displaces TPGDA), monitored using real time Fourier transform infrared (RT FTIR) spectroscopy. Violet light photocuring (405 nm, 3.3 mW/cm$^2$) using BAPO as the photoinitiator. A decrease in oxygen inhibition occurs with both red (FIG. 108) and violet light curing, but is more substantial for red light (FIG. 108) given the combination of reductive quenching and hydrogen atom abstraction by peroxy radicals.

Results from RT FTIR measurements shown in FIG. 108-FIG. 109, highlighting the impact of PETMP (tetrathiol) additives on both the oxygen inhibition period and apparent polymerization rate ($R_p$).

| PETMP [wt %] | Irradiation wavelength (nm)[b] | Inhibition Period [s] | $R_p$ [%/s][c] |
|---|---|---|---|
| 0 | 617 | 49.4 ± 0.4 | 7.5 ± 5.3 |
| 0 (Ar)[a] | 617 | 9.8 ± 0.007 | 16.6 ± 1.4 |
| 1 | 617 | 5.8 ± 1.7 | 19.6 ± 3.5 |
| 5 | 617 | 1.9 ± 0.5 | 25.4 ± 2.3 |
| 10 | 617 | 1.0 ± 0.4 | 34.0 ± 3.7 |
| 0 | 405 | 5.2 ± 0.1 | 13.0 ± 1.0 |
| 1 | 405 | 2.4 ± 0.2 | 14.1 ± 0.2 |

[a] The resin was purged with argon for ~1 minute and the measurement was performed under an argon stream;
[b] An intensity of 2.5 mW/cm$^2$ for the 617 nm (red) LED and 3.3 mW/cm$^2$ for the 405 nm (violet) LED was used to match the intensity for digital light processing (DLP) 3D printing described later;
[c] Rate determined using RT FTIR spectroscopy, monitoring the disappearance of the carbon-carbon double bond (C=C) stretch at 3100 cm$^{-1}$ to determine the percent conversion of C=C per second immediately following initiation (post inhibition period).

TABLE 8

Compiled gel points for stiff acrylate Dymax ® resin (0.3 wt % ZnTPP, 0.2 wt % Borate V, 2 wt % HNu-254, 0.002 wt % TEMPO in BR-741:TPGDA:PETMP = 50:49:1, by weight). Each individual trial was measured in triplicate for samples of different thiol (PETMP) weight percent and reported values provide averages ± one standard deviation. Experiments for samples with 0% PETMP were conducted under argon in addition to ambient conditions.

| PETMP | 0% (Ar) | 0% | 1% | 5% | 10% |
|---|---|---|---|---|---|
| Gel Point (s) | 4.4 ± 0.3 | 64.0 ± 0.6 | 7.9 ± 0.8 | 4.5 ± 0.6 | 2.8 ± 0.5 |

In support of the hypothesis that reductive quenching can play an important role in minimizing oxygen inhibition, the three-component red light photosystem was compared to the one component (BAPO) UV/violet photoinitiation, holding everything else constant (FIG. 109 and Table 7). Irradiating the BAPO-containing resin with violet light (405 nm and 3.3 mW/cm$^2$ to match the digital light processing printing intensity) resulted in an inhibition period of 5.2±0.1 s and 2.4±0.2 s for samples containing 0 and 1 wt % PETMP, respectively. Thus, thiol additives provide a general "drop-in" method to significantly decrease cure time of commercial Type I UV/violet light activated resins, and show an even greater impact on Type II visible light activated resins. Overall, inhibition can be essentially removed for red-light activated resins via addition of 10 wt % PETMP, and with only 1 wt % PETMP the resins still cure in under 10 seconds.

Figure 110:
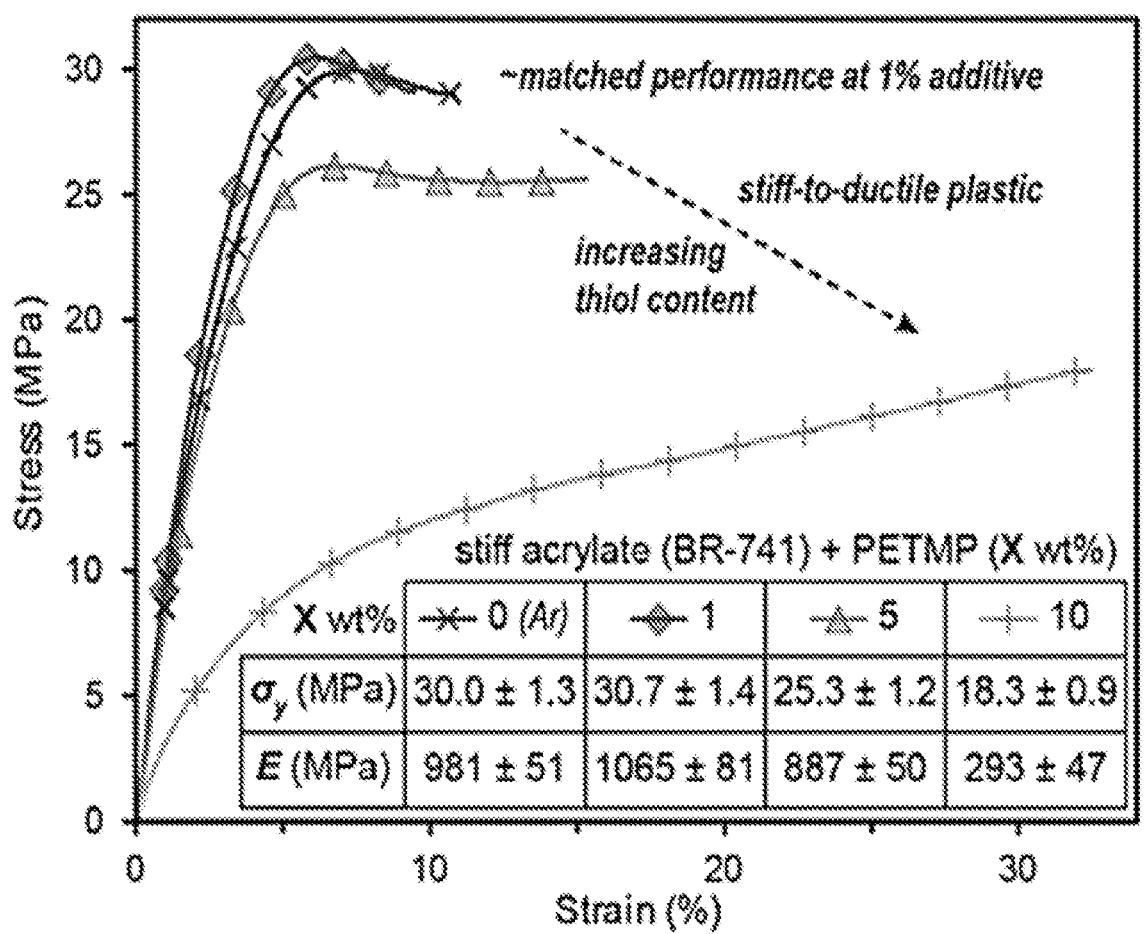
FIG. 110. Stress-strain plots of red light 3D printed dogbones (ASTM D638 standard) under uniaxial tension. Influence of PETMP (tetrathiol) content on yield strength ($\sigma_y$) and stiffness (E, Young's modulus), showing that the high strength and rigidity can be maintained at low PETMP loading and that samples become more ductile at higher PETMP content. Inset shows metrics for $\sigma_y$ and E.

An important parameter for additively manufactured objects is their mechanical performance, as this often dictates the application space. In particular, polysulfide thermosets from thiol-ene based resins often suffer from low stiffness and strength relative to (meth)acrylate-based resins owing to the flexibility of the C—S—C bonds and limited multifunctional thiol starting materials (Song H B et al. *Adv. Funct. Mater.* 2018, 28, 1; Sahin M et al. *Adv. Eng. Mater.* 2017, 19, 1). As such, it was deemed important to characterize the impact of PETMP incorporation on mechanical properties, namely yield strength ($\sigma_y$), stiffness (E, Young's modulus), and strain at fracture ($\varepsilon_f$). Mechanical dogbone samples (ASTM D638 standard) were 3D printed with BR-741:TPGDA (1:1) resins containing 0 wt %, 1 wt %, 5 wt %, and 10 wt % PETMP (where PETMP displaces TPGDA), using red light (~620 nm, 2.5 mW/cm$^2$) at an exposure time of 16 s/layer, 14 s/layer, 12 s/layer, and 8 s/layer for resin containing 0 wt %, 1 wt %, 5 wt %, and 10 wt % PETMP, respectively, followed by uniaxial tensile testing (FIG. 110 and Table 9). Incorporating 1 wt % PETMP into the resin resulted in samples with nearly identical (slightly improved) performance relative to those printed with no PETMP (under argon)–$\sigma_y \approx 30$ MPa and E≈1,000 MPa. Note, all freshly 3D printed (green) samples were post-cured with UV light for ~20 minutes to reach maximum conversion of vinyl functionality, as is standard practice. As the content of PETMP increased to 5 and 10 wt % a drop in $\sigma_y$ and E was observed—25 and 900 MPa (5 wt %) and 18 and 300 MPa (10 wt %), respectively. Printing the samples with 1 wt % PETMP at three different edge-on angles, horizontal (00), diagonal (45°), and vertical (90°) provided very similar (~isotropic) mechanical performance indicating good adhesion between the layers (FIG. 141 and Table 10). Thus, tailorable mechanical properties with multifunctional thiols was demonstrated, showing a strong and stiff plastic that matches the parent commercial acrylic resin at low thiol contents to a soft and ductile material with higher contents of PETMP, all while enabling rapid, low energy visible light 3D printing under ambient conditions.

TABLE 9

Mechanical data of 3D printed dogbones from stiff acrylate Dymax® resins shown in FIG. 110 of the main text. Resin composition was BR-741:TPGDA 1:1 by weight, with PETMP displacing TPGDA. Prints were accomplished using a red LED (617 nm, 2.5 mW/cm²) and an exposure time of 16, 14, 12, and 8 seconds (for resin containing 0, 1, 5, and 10% PETMP, respectively) per 25 μm layer.

|  | 0% SH | 1% SH | 5% SH | 10% SH |
|---|---|---|---|---|
| $\sigma_y$ (MPa) | 30.0 ± 1.3 | 30.7 ± 0.6 | 25.3 ± 1.2 | 18.3 ± 0.9 |
| $\varepsilon_f$ (%) | 10.8 ± 2.2 | 8.5 ± 1.5 | 15.3 ± 3.0 | 33.4 ± 2.1 |
| E (MPa) | 981 ± 51 | 1065 ± 81 | 887 ± 50 | 293 ± 47 |

TABLE 10

Average mechanical data from FIG. 141. Samples were run in triplicate and the averages ± one standard deviation are provided.

|  | Horizontal | Diagonal | Vertical |
|---|---|---|---|
| $\sigma_y$ (MPa) | 30.7 ± 1.4 | 30.9 ± 2.6 | 28.7 ± 0.5 |
| $\varepsilon_f$ (%) | 8.5 ± 1.5 | 16.0 ± 3.4 | 20.6 ± 3.3 |
| E (MPa) | 1065 ± 81 | 1055 ± 70 | 1007 ± 59 |

Figure 111:
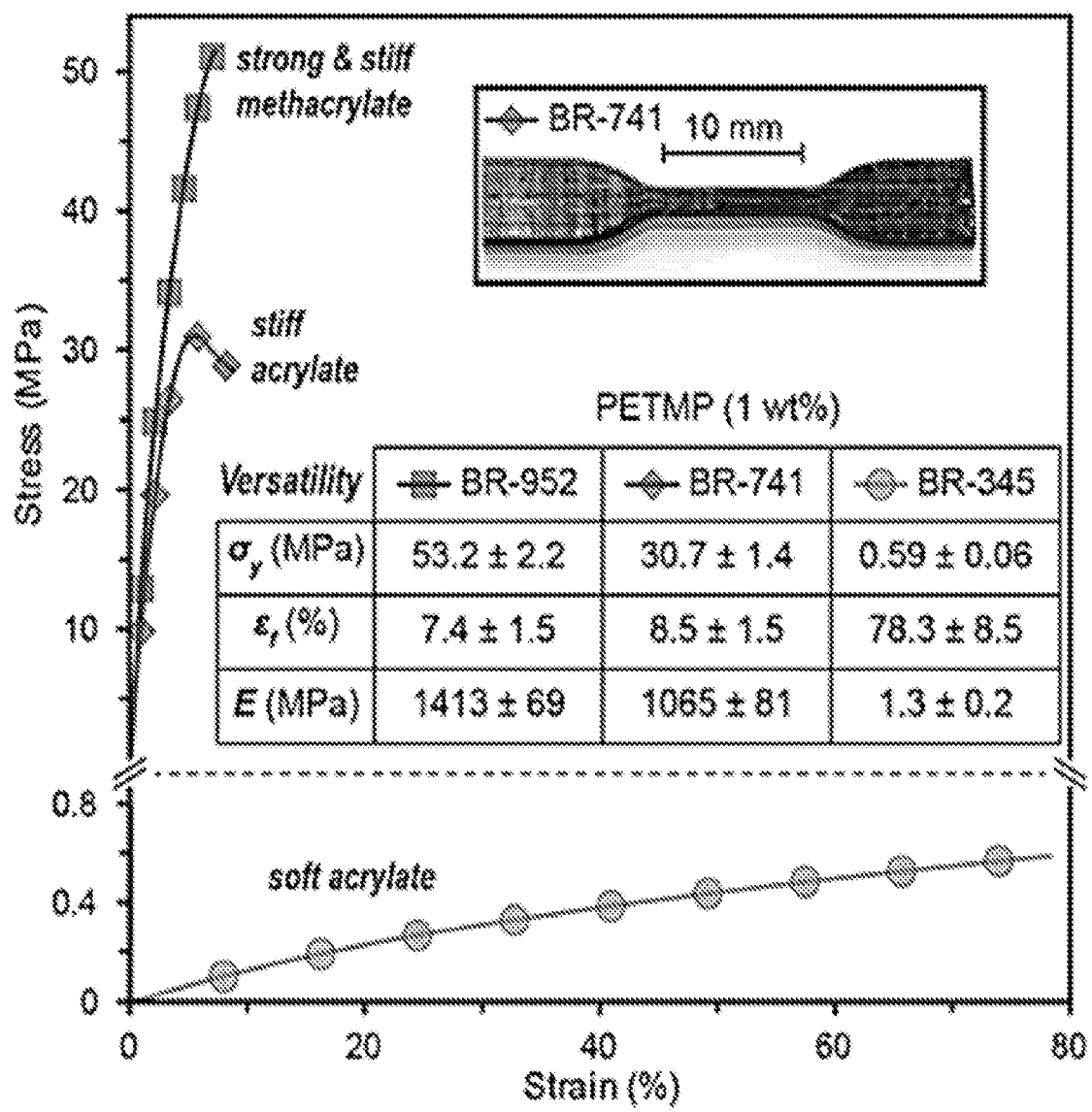
FIG. 111. Stress-strain plots of red light 3D printed dogbones (ASTM D638 standard) under uniaxial tension. Mechanical versatility from ambient visible light 3D printing with thiol additives, from three industrially relevant Dymax®-containing resins. Insets show a representative digital image of the BR-741 dogbone and metrics for yield strength ($\sigma_y$), stiffness (E, Young's modulus), and strain at fracture ($\varepsilon_f$).

To demonstrate the versatility of this platform, two other Dymax® resins capable of providing a stronger and more rigid (BR-952) or softer and more compliant (BR-345) material relative to BR-741 were examined (FIG. 111). Specifically, BR-952, a dimethacrylate, was mixed with hydroxyethyl methacrylate (HEMA) and PETMP in a 70/29/1 wt % ratio, while BR-345, a diacrylate, was mixed with hydroxyethyl acrylate and PETMP in a 50/49/1 wt % ratio. In both cases, reproducibly rapid ambient photopolymerization with red light was demonstrated, revealing inhibition periods of 1.2±0.2 s and 1.3±0.2 s and R, of 6.0±0.3%/s and 24.5±0.9%/s for BR-952 and BR-345, respectively (FIG. 123 and Table 11). Notably, this established for the first time that methacrylate-based resins could be 3D printed with visible light, albeit slower than analogous acrylate-based ones. Tensile testing of dogbones prepared from each resin provided distinct mechanical performance, from very strong and stiff ($\sigma_y \approx 53$ MPa and E≈1,400 MPa) for BR-952, to soft and extensible (E≈1.3 MPa and $\varepsilon_f \approx 80\%$) for BR-345. As an added bonus, the covalent incorporation of the thiols into the polymer network prevents unpleasant odors and leaching of potentially toxic components—as confirmed with gravimetric tests post solvent extraction (FIG. 142 and Table 25) and dynamic mechanical analysis (FIG. 143-FIG. 146 and Table 26). These results indicate that addition of multifunctional thiols into commercially relevant acrylic resins represents a universal strategy to increase the rate of photocuring without compromising mechanical performance.

TABLE 11

Summary of apparent photopolymerization rates and induction periods from FIG. 123. Samples were run in triplicate and the averages ± one standard deviation are provided.

|  | $R_p$ (%/s) | Induction periods (sec) |
|---|---|---|
| BR-952:HEMA:PETMP | 6.0 ± 0.3 | 1.2 ± 0.2 |
| BR-345:HEA:PETMP | 24.5 ± 0.9 | 1.3 ± 0.2 |

Figure 112:
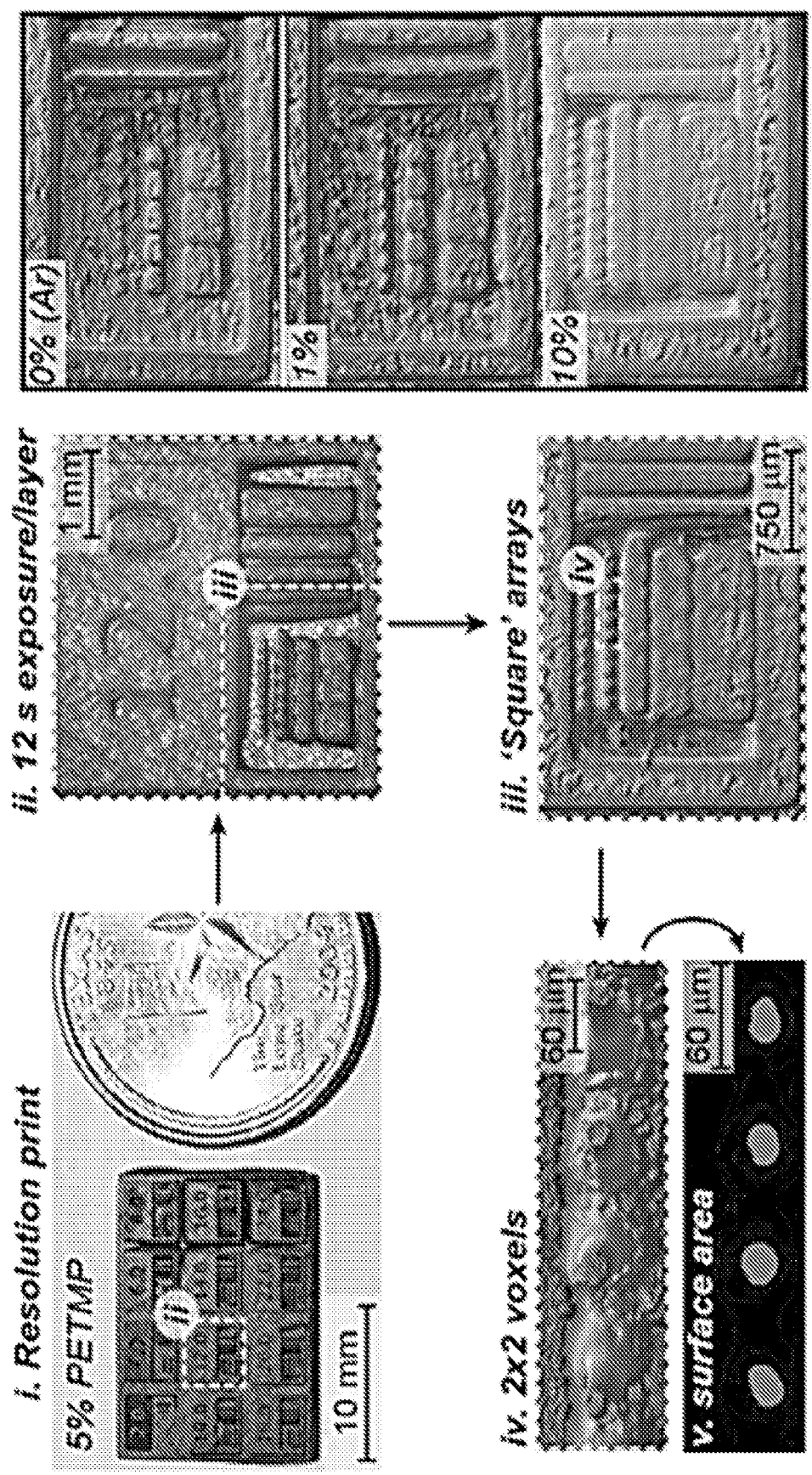
FIG. 112. Resolution prints using red light digital light processing with BR-741:TPGDA based resins (layer thickness=25 μm). Image of a representative resolution print with 5 wt % PETMP (left sequence) and analogous optical profilometry images for 0 wt %, 1 wt %, and 10 wt % PETMP prints (right). Starting from the top left for the representative sequence is (i) a digital photograph of the full print next to a quarter for reference, showing 12 different exposure times/layer, as indicated by the engraved numbers (representing seconds); (ii) Optical micrograph of the 12 s/layer section on the resolution print, which contains arrays of square pillars and lines; (iii) 3D topographic image showing square pillars with lateral dimensions varying from 1-16 voxels-wide (each voxel=20×20×25 μm$^3$); (iv) Optical profilometry of 2 voxel-wide square pillars (lateral dimension) and corresponding image analysis showing good fidelity between digital input (1600 μm$^2$) and printed output (2100±240 μm$^2$). Overall, increasing PETMP content results in faster photocuring that provides access to smaller features, but at longer exposures can result in cure-through (loss in z-resolution).

Another important metric in additive manufacturing is feature resolution. To compete with commercial UV/violet-based digital light processing printing, the proposed system should be capable of providing features with ≤100 μm lateral (x,y) and 25-100 μm vertical (z) resolution. To determine how thiol additives influence the minimum attainable feature size, a custom digital method that gave control over exposure time within different locations of a single layer was used (details provided in the "Optical Profilometry" section below). The method contained 12 different exposure times/layer, and within each time point a set of square pillars were present, with varying lateral dimensions from 1-16 volume elements (voxels) wide. The printer used in this study had a minimum voxel size of 20×20 μm² in the lateral dimension and 25 μm in the vertical dimension (i.e., layer thickness). The resolution as a function of PETMP content, number of layers (from 1 to 16), and exposure time/layer (from 2 to 24 s/25 μm layer at 2 s increments) was characterized using optical profilometry for BR-741:TPGDA resins cured with red light (2.5 mW/cm²) (full digital images and additional optical profilometry images/analyses are provided in FIG. 149-FIG. 174). The 3D topographical images of representative 12 s/layer time points are shown in FIG. 112 and reveal the smallest visible square features as ~160 μm-wide (8 voxels) for no PETMP (argon degassed), ~80 μm-wide (4 voxels) for 1 wt % PETMP, and ~20 μm-wide (single voxel) for 5 and 10 wt % PETMP. Impressively, surface area analysis of the 40 μm-wide squares (2×2 voxels) for the 5 wt % PETMP samples revealed an excellent match with the digital input file, while the surface area of 20 μm-wide squares was in experiment below theoretical values, indicating incomplete curing (FIG. 168). Notably, the square features in the 1 and 5 wt % PETMP prints appear more well defined than those in the 10 wt % prints, which is attributed to a combination of the viscous resin getting trapped in the narrow 20 μm-wide cavities separating the squares and cure-through, particularly in the more reactive 10 wt % samples. This was corroborated by measuring the thickness and sidewall angle (SWA) at the corner of each time point to assess z-resolution (FIG. 159-FIG. 167). For all samples, the thickness and sidewall angle values nearly matched the digital file, measuring heights of ~350-400 µm (16 layers at ~25 µm/layer) and sidewall angles from ~75-85° (theoretical=90°). Additionally, the maximum height was reached by 4 s/layer and 2 s/layer when incorporating 1 wt % PETMP and 10 wt % PETMP, respectively, and maintained until the longest time point generated at 24 s/layer. The stability in z-height over a wide range of exposure times/layer gave a large operating time window that enhanced reproducibility. This window is attributed to the combined absorption by the photoredox catalyst (ZnTPP, 0.03 wt %) and opaquing agent (OA, 0.002 wt % Sudan black) (FIG. 175-FIG. 177). Altogether, resolution analysis of unoptimized 3D prints using the present ambient visible light method revealed that small features (<100 µm) with high x,y,z fidelity (matching the digital input) were easily and reproducibly attainable, rivaling modern UV/violet-based digital light processing 3D printing technology (Truby R L et al. Nature 2016, 540, 371).

Figure 113:
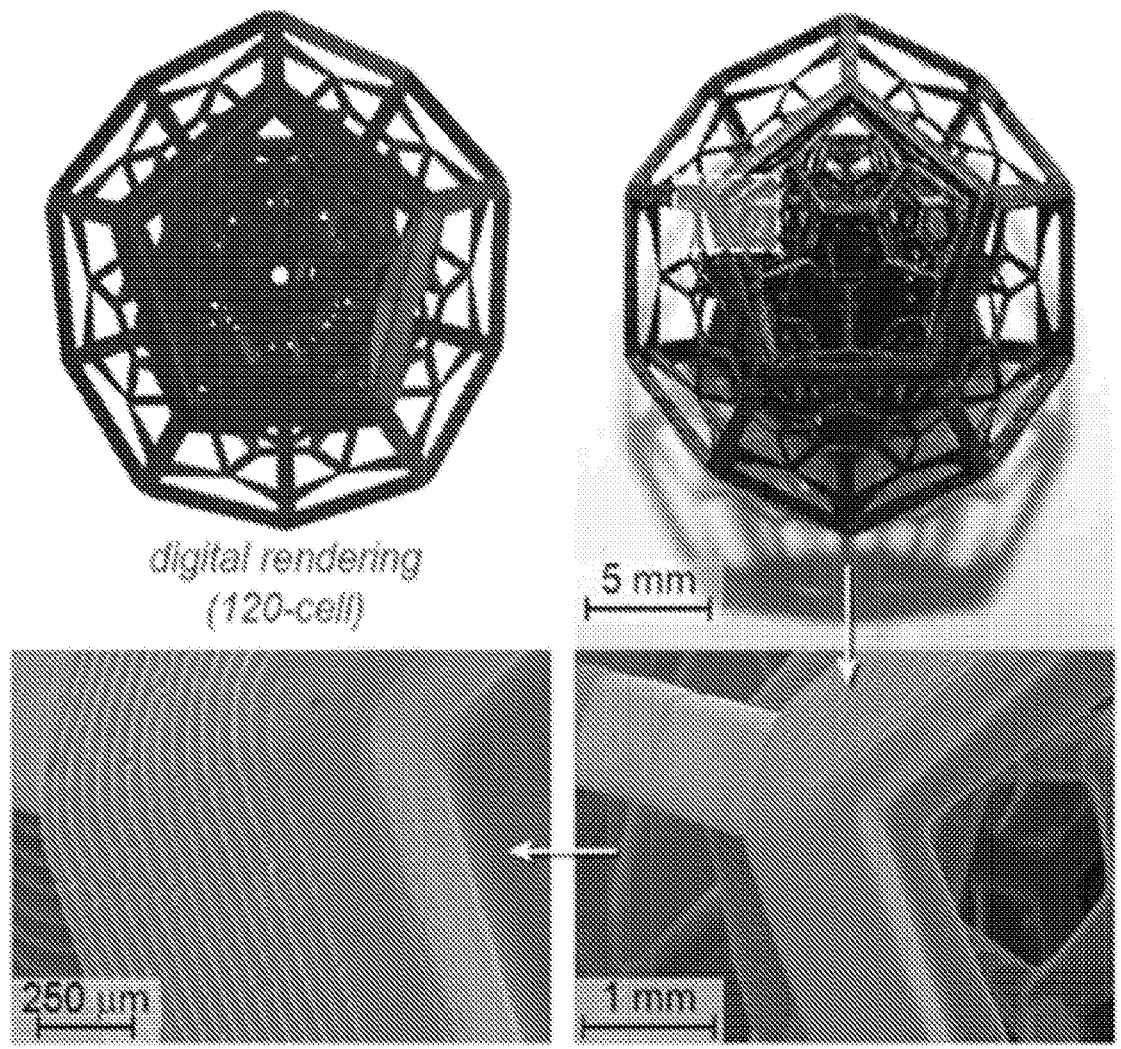
FIG. 113. 3D printed complex object using red light digital light processing with BR-741:TPGDA based resins (layer thickness=25 μm). Representative hierarchical 3D printed 120-cell with the digital rendering (top left), photograph (top right) and SEM images (bottom).

To underscore the capabilities of ambient visible light additive manufacturing, a complex hierarchical object was printed, specifically a 120-cell polytope (or dodecaplex), which is challenging or impossible to produce using traditional manufacturing processes (FIG. 113). The optimized red light conditions were 14 s/25 µm layer, which correlates to a build rate of ~6.4 mm/h. Impressively, the object contains 120 dodecahedral cells with the smallest feature size of ~200 µm. Scanning electron microscopy (SEM) images show the individual ~25 µm layers from the additive process and emphasize the high feature fidelity. Images of additional complex 3D printed objects can be found in FIG. 178-FIG. 186. Uniquely, under UV excitation (365 nm) the objects emit red light, indicating that ZnTPP remains intact during the ambient printing, which provides an avenue towards high resolution 3D printing of "smart" functional plastics.

Conclusion. Energy efficient visible light 3D printing under mild ambient conditions was described. A tetrathiol additive (PETMP) as low as 1 wt % in commercially relevant acrylic resins was shown to enable rapid high resolution 3D printing with low intensity red light (2.5 mW/cm$^2$) in the presence of atmospheric oxygen. Monomer to polymer conversion was monitored using RT FTIR spectroscopy, revealing an excellent temporal response to light exposure in the presence of PETMP, with curing in less than 3 seconds. The dramatic reduction in oxygen inhibition time from ~64 s to ~8 s in adding 1 wt % PETMP, to essentially complete removal of oxygen sensitivity with 10 wt % PETMP, was attributed to a dual reaction of thiols to form thiyl radicals via hydrogen atom transfer to peroxy radicals and photooxidation by ZnTPP*. Furthermore, direct incorporation of PETMP into the acrylic network via a thiol-ene mechanism mitigates unfavorable odors and leaching of potentially toxic additives. The described method appears to be universal as it worked with a range of acrylates, acrylamides, and methacrylates, providing access to a diverse array of 3D objects with distinct chemical makeup and mechanical properties, from strong and stiff plastics ($\sigma_y \approx 53$ MPa and E$\approx$1,400 MPa) to soft and extensible elastomers (E$\approx$1.3 MPa and $\varepsilon_f \approx$80%). Additionally, the inclusion of PETMP facilitated the formation of fine features with lateral dimensions <50 µm and a layer thickness of 25 µm, all while maintaining a wide processing window (~6-24 s/layer) where little-to-no cure-through was observed. Finally, 3D printing of a hierarchical 120-cell polytope highlighted the capabilities offered by the present technique to harness custom objects with digitally defined form factors. This simple approach presents numerous opportunities to create next generation advanced materials in a mild additive fashion using visible-to-near infrared light, which will positively impact many arenas beyond 3D printing, from coatings and adhesives to imaging. Moreover, a number of fundamental scientific questions are now available to be examined, such as how various metrics (e.g., light dosage and wavelength) and resin compositions influence the speed, resolution, and material properties of thiol-containing visible light reactive resins. This knowledge can, for example, be leveraged for 3D printing of hydrogels and multifunctional designer materials with applications in tissue engineering and soft robotics.

Experimental Details

Materials. Chemicals. All chemicals were used as received unless otherwise noted. Phenylbis(2,4,6-trimethylbenzoyl)phosphine oxide (BAPO), Sudan I, pentaerythritol tetrakis(3-mercaptopropionate) (PETMP), benzene-1,4-dithiol, trithiocyanuric acid, 1,3,4-thiadiazole-2,5-dithiol, 4,4'-thiobisbenzenethiol, triphenylphosphine (PPh$_3$), 1,3-diphenylisobenzofuran (DPBF), (2,2,6,6-tetramethylpiperidin-1-yl)oxyl (TEMPO), 1,4-dithiothreitol (DTT), and ascorbic acid were purchased from Sigma-Aldrich. Sudan black B was purchased from Chem-Impex. 2-(butyryloxy)-N,N,N-trimethylethan-1-aminium butyltriphenylborate (Borate V), and [4-(octyloxy)phenyl](phenyl)iodonium hexafluoroantimonate diphenyliodonium (H-Nu254) were purchased from Spectra Group Limited. Zinc tetraphenylporphyrin (ZnTPP) was purchased from TCI-America. N,N-Dimethylacrylamide (DMA, Sigma-Aldrich), trimethylolpropane triacrylate (TMPTA, Alfa Aesar), 2-hydroxyethyl acrylate (HEA, TCI-America), 2-hydroxyethyl methacrylate (HEMA, TCI-America), isobornyl acrylate (iBoA, TCI-America), tri(propylene glycol) diacrylate (TPGDA, TCI-America), and oligourethane di(meth)acrylate (BR-741, BR-345, BR-952 from Dymax®) were used as monomers/crosslinkers. Note that monomers and crosslinkers were not purified prior to use, and, as such, any inhibitor present (e.g., phenolics) from the commercial source remained. Chemical structures are provided in FIG. 114.

Sample Preparation. Resin formulation. Representative resin formulations are summarized in Table 12. Samples were formulated in the dark to avoid unnecessary onset of polymerization. Samples that did not contain thiols (or other oxygen scavenging additives) were sparged with nitrogen gas to remove dissolved oxygen in the resin prior to use. Dymax® resins were warmed at 70° C. for at least an hour prior to use for better handling (lower viscosity). Reactive diluents, TEMPO stabilizer, and all photoinitiating components were mixed with the Dymax® resin at 60° C. for 3 hours. Finally, additives (i.e., thiols and oxygen scavengers) were incorporated into the solutions and mixed for 30 mins at room temperature.

TABLE 12

Resin formulations (all contain 0.01 wt % TEMPO unless otherwise noted).

| Formulation | PI/PRC (wt %) | Donor (wt %) | Acceptor (wt %) | OA (wt %) | Reactive diluent (wt %) | Resin-Dymax ® (wt %) | Thiol (wt %) |
|---|---|---|---|---|---|---|---|
| Stiff acrylate Dymax | ZnTPP (0.3) | Borate V (0.2) | HNu254 (2) | Sudan IV (0.002) | TPGDA (50) | BR-741 (50-X$^a$) | Y$^d$ |
| Soft acrylate Dymax | | | | | | BR-345 (50-X$^b$) | |
| Stiff methacrylate Dymax | | | | | | BR-952 (50-X$^c$) | |
| Stiff acrylate Dymax (Violet) | BAPO (0.5) | — | — | Sudan I (0.04) | | BR-741 (50-X$^a$) | |

PI = photoinitiator;
PRC = photoredox catalyst;
OA = opaquing agent;
$^a$X represents TPGDA
$^b$X represents HEA;
$^c$X represents HEMA;
$^d$Y = 50 − X. Y was primarily 1 wt %, replacing the non-Dymax ® component (e.g., 49 wt % TPGDA and 50 wt % of BR-741). Other thiol additive contents examined here include 0 wt %, 1 wt %, 5 wt %, and 10 wt %.

Light Sources. For FTIR spectroscopy and photorheology experiments, violet and red light was provided by collimated LEDs (LCS series, Mightex Systems) with an emission centered at 405 nm and 617 nm. These LEDs were used in combination with a current-adjustable driver (SLC-MA02-U, Mightex Systems) for intensity control, such that all intensities between experiments (printing, FTIR, and photorheology) could be matched. Irradiation intensities were measured with a Thorlabs PM100D photometer equipped with silicon-based photodiode power sensor (S120VC, Thorlabs). Emission profiles were recorded with a QE pro spectrometer, in which the LED was connected to the fiber optic system using a 3 mm liquid lightguide from Mightex Systems (serial #: LLG-03-59-340-0800-1). See the 3D printing section below for additional details, including light intensity.

3D Printing

Visible LEDs. 3D printing was performed using a custom-made, digital light processing—based 3D printer (Monoprinter, MA, USA). Detailed information about the 3D printer can be found in a previous report (Ahn D et al. *ACS Cent. Sci.* 2020, 6, 1555). Two different exchangeable visible LEDs centered at 405 nm (violet, Luminus CBT-120-UV) and 615 nm (red, Luminus PT-120-RA) were used as the light sources for projection in the present work. The full width at half maximum (FWHM) of each LED is 16 nm and 19 nm for violet and red light, respectively.

Specifications. The projector resolution was 1920×1080 pixels, with each pixel being 20 μm×20 μm at the image plane. The minimum achievable layer thickness is 25 μm. Here, prints were primarily performed using a layer thickness of 25 μm. Detailed experimental parameters for 3D printing of visible light curable resin formulations are summarized in Table 13.

Upon completion of each print, the resultant objects were rinsed with acetone, air dried, and post-cured with UV light centered at 370 nm (XICHEN Professional 36 Watt UV Beauty Salon Nail Dryer) for 20 min. unless otherwise noted.

TABLE 13

Experimental parameters for 3D printing of visible light curable resin formulations.

| Formulation | PETMP content (wt %) | Light intensities at vat surface (mW/cm$^2$) | Slice exposure time (sec) Base layer | Slice exposure time (sec) Normal layer | Build rate (mm/hr) Including repositioning & recoating process | Build rate (mm/hr) Without repositioning & recoating process |
|---|---|---|---|---|---|---|
| Stiff violet | 1 | 3.3 | 20 | 14 | 4.9 | 6.4 |
| Stiff red | 1 | 2.5 | 16 | 12 | 5.5 | 7.5 |

Characterization

Real Time Fourier Transform Infrared (RT FTIR) Spectroscopy.

Sample preparation and measurement. Resin formulations were introduced between two 1 mm thick glass microscope slides (Fisher Scientific, cat #12-550-A3) separated by ~100 μm plastic shims (McMaster-Carr, cat #9513K66) to maintain a constant sample thickness over the course of the photopolymerization. Each sample was placed in a horizontal transmission accessory (A043-N/Q, Bruker) equipped on the FTIR spectrometer (INVENIO-R, Bruker), which was controlled using OPUS spectroscopy software. Spectra were collected from 2000 cm$^{-1}$ to 7000 cm$^{-1}$ at a rate of 1 scan every 0.36 seconds. Most samples were monitored under ambient conditions (atmospheric and room temperature and pressure). For samples without thiols, argon was passed over the sample for the duration of the experiment to minimize oxygen dissolving into the samples. The functional group conversion upon light exposure was determined by monitoring the disappearance of the peak area centered at 3100 cm$^{-1}$ corresponding to the C=C stretch (Chatani S et al. *ACS Macro Lett.* 2014, 3, 315).

Figure 117:
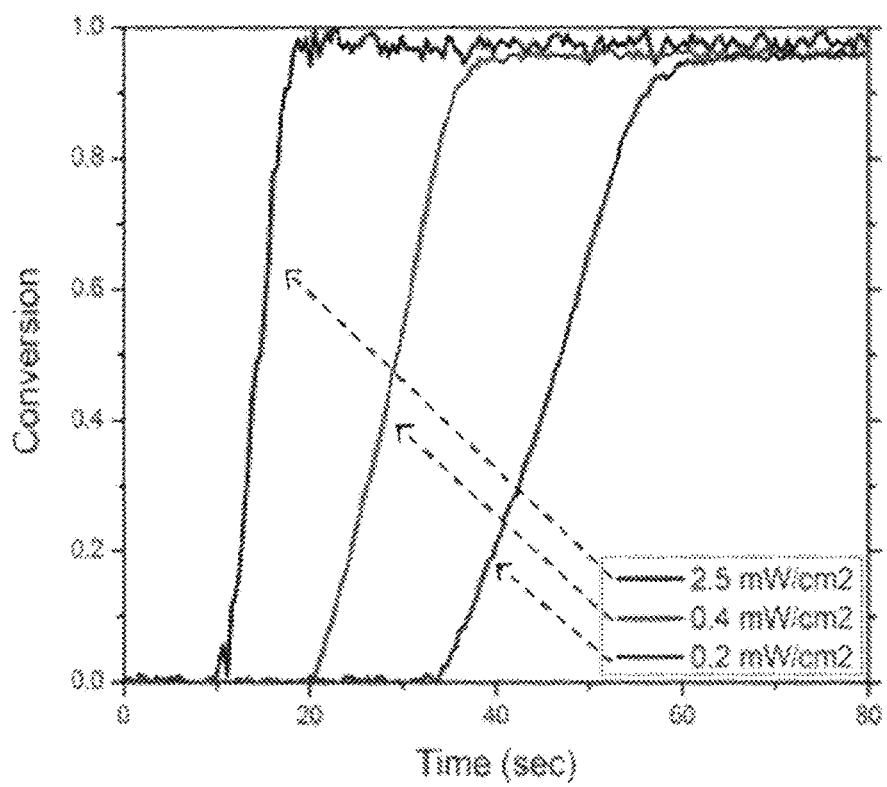
FIG. 117. RT FTIR spectroscopy, varying red LED (617 nm) light intensity at a constant TEMPO concentration of 0.01 mol, showing vinyl group conversion of resin D50S50 versus time. The LED was not turned on until ~10 seconds.
Figure 118:
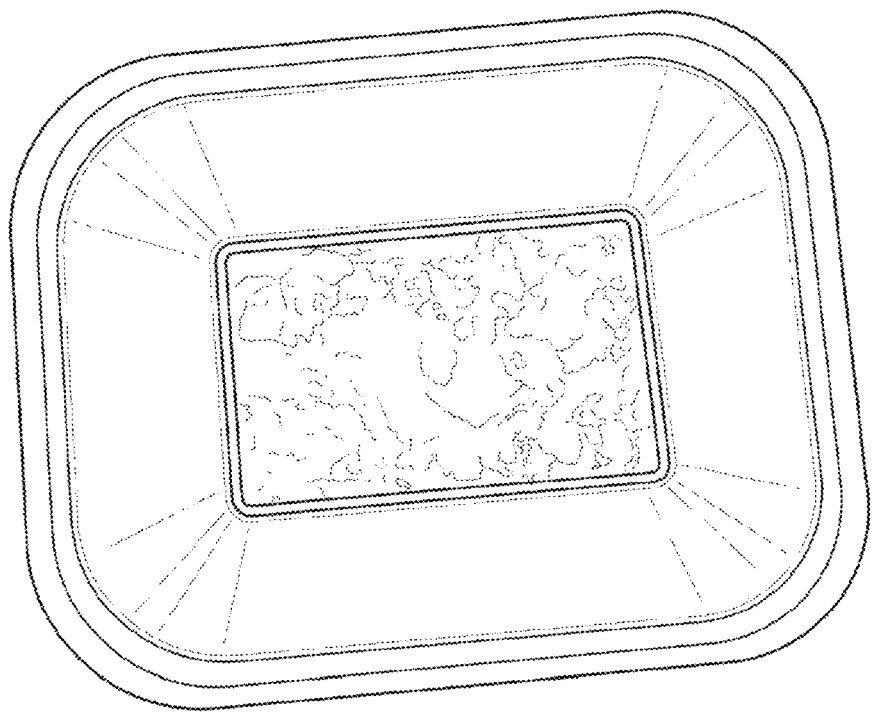
FIG. 118. Photograph of residual polymer in the resin vat after printing when no additional radical inhibitor (e.g., TEMPO) was added to the resin. Note that commercial monomers/crosslinkers were not de-inhibited prior to use, and many contained phenolic inhibitors that were not as effective as TEMPO at preventing polymerization outside of irradiated zones.

Effect of radical inhibitor on photopolymerization rate and induction period. Photopolymerizations were performed with varying amounts of radical inhibitor, (2,2,6,6-tetramethylpiperidin-1-yl)oxy (TEMPO), to examine the effect on photopolymerization rate and induction period. The tabulated resin composition is shown in Table 14. All samples had a thickness of 100 μm and were irradiated at printer intensities (Table 13). Monomer-to-polymer conversion data is provided in FIG. 115 at the printer intensity and FIG. 116 at a reduced light intensity, showing the distinct effect of TEMPO concentration on photopolymerization. The corresponding apparent initial rates of polymerization and inhibition times are provided in Table 15. Light intensity was further examined for samples containing 0.01 mol % TEMPO, clearly showing the influence of light intensity on polymerization rate and inhibition time (FIG. 117 and Table 16). Without any radical inhibitor added it was noted that uncontrolled polymerization outside irradiated areas would occur, leaving a residue in the polymerization vat, as shown in FIG. 118.

TABLE 14

Resin formulation for DMA:PETMP

| | Photoinitiating systems and additive | | | | Resin[b] | |
|---|---|---|---|---|---|---|
| | Photoredox | | | | | |
| Name | Catalyst (mol %) | Donor (mol %) | Acceptor (mol %) | Inhibitor (mol %) | Monomer (DMA) | Thiol (PETMP) |
| D50S50 | ZnTPP (0.05) | Borate V (0.05) | HNu254 (0.35) | TEMPO[a] | 50 | 50 |

[a]Different concentrations of TEMPO were tested (0, 0.005, 0.01, 0.02, 0.05 mol %)
[b]A 1:1 stoichiometric molar ratio between vinyl and thiol groups was used

TABLE 15

Photopolymerization rates and induction periods extracted from FIG. 115 and FIG. 116.

| Light intensity (mW/cm$^2$) | TEMPO (mol %) | $R_p$ (%/s) | Induction periods (sec) |
|---|---|---|---|
| 2.5 | 0 | 20.1 | 0 |
| | 0.005 | 17.9 | 0 |
| | 0.01 | 15.6 | 0.7 |
| | 0.02 | 20.2 | 2.5 |
| | 0.05 | 16.7 | 8.7 |
| 0.2 | 0 | 5.8 | 0 |
| | 0.005 | 5.2 | 10.9 |
| | 0.01 | 5.0 | 24.3 |
| | 0.02 | 4.6 | 45.2 |
| | 0.05 | 4.4 | 131.2 |

TABLE 16

Photopolymerization rates and induction periods extracted from FIG. 117.

| Light intensity (m W/cm$^2$) | $R_p$ (%/s) | Induction periods (sec) |
|---|---|---|
| 2.5 | 15.6 | 0.7 |
| 0.4 | 7.1 | 10.9 |
| 0.2 | 5.0 | 24.3 |

Figure 120:
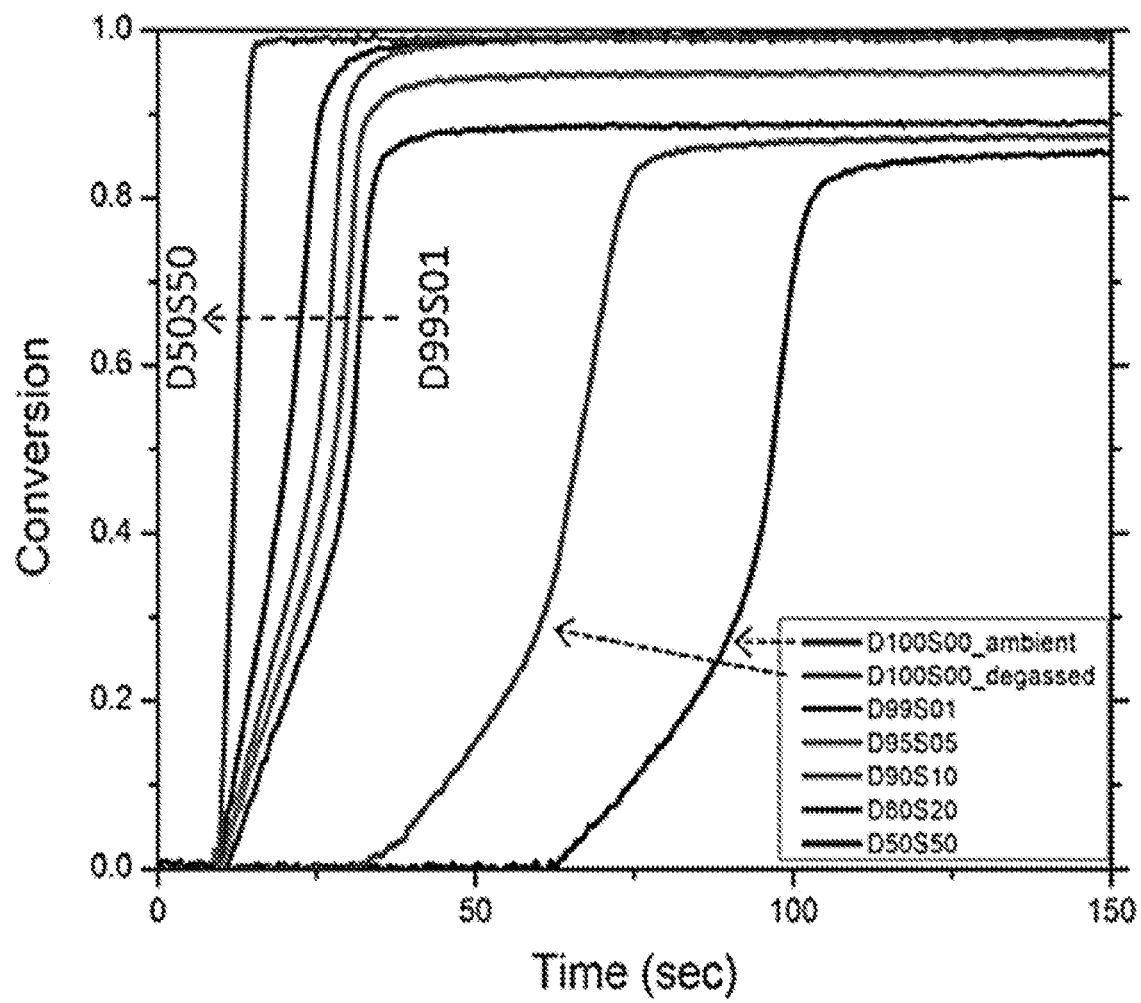
FIG. 120. RT FTIR spectroscopy, varying the amount of PETMP in the resin for red light curing (617 nm, 2.5 mW/cm$^2$) (formulations shown in Table 18). Two apparent rates of polymerization were observed with this formulation, more notable when little or no PETMP was used. This may arise from the polymerization starting prior to all oxygen being quenched and/or thermal self-propagation, as is observed with frontal polymerizations where heat from the initial exothermic polymerization results in an auto-catalyzed rate enhancement.

Effect of thiol concentration on photopolymerization rate and induction period. Photopolymerizations were monitored using RT MTR and performed in triplicate with varying amounts of thiol (PETMP) to examine the effect of thiol concentration on photopolymerization rate and induction period. As a control, photopolymerizations without PETMP under ambient and inert conditions were first accomplished (FIG. 119 and Table 17). Subsequently, the amount of PETMP was varied and all photopolymerizations were performed under ambient conditions (FIG. 120, Table 18, and Table 19). All samples were run using a red LED at printer intensity (617 nm, 2.5 mW/cm$^2$).

TABLE 17

Photopolymerization rates and induction periods for FIG. 119. Samples were run in triplicate and the averages ± one standard deviation are provided.

|  | $R_p$ (%/s) | Induction periods (sec) |
|---|---|---|
| Ambient | 11.3 ± 0.9 | 44.7 ± 4.3 |
| Degassed + No inert gas flow | 14.0 ± 0.2 | 4.6 ± 0.2 |
| Degassed + Inert gas flow | 14.2 ± 0.2 | 4.9 ± 0.4 |

TABLE 18

Resin formulations with different concentrations of PETMP.

| | Photoinitiating systems and additive | | | | Resin[a] | |
|---|---|---|---|---|---|---|
| | Photoredox | | | | | |
| | Catalyst (mol %) | Donor (mol %) | Acceptor (mol %) | Inhibitor (mol %) | Monomer (DMA) | Thiol (PETMP) |
| D100S00 | ZnTPP (0.05) | Borate V (0.05) | HNu254 (0.35) | TEMPO (0.01) | 100 | 0 |
| D99S01 | | | | | 99 | 1 |
| D95S05 | | | | | 95 | 5 |
| D90S10 | | | | | 90 | 10 |
| D80S20 | | | | | 80 | 20 |
| D50S50 | | | | | 50 | 50 |

[a]Molar ratio between vinyl and thiol groups used

TABLE 19

Summary of apparent photopolymerization rates (both initial and maximum) and induction periods from FIG. 120.

| | Initial $R_p$ (%/s) | Maximum $R_p$ (%/s) | Induction periods (sec) |
|---|---|---|---|
| D100S00_ambient | 0.9 | 6.7 | 54.4 |
| D100S00_degassed | 1.0 | 4.7 | 25.9 |
| D99S01 | 2.3 | 9.4 | 1.5 |
| D95S05 | 2.4 | 10.2 | 1.0 |
| D90S10 | 2.9 | 9.9 | ~0 |
| D80S20 | 4.4 | 9.2 | ~0 |
| D50S50 | 20.2 | 20.9 | ~0 |

Figure 121:
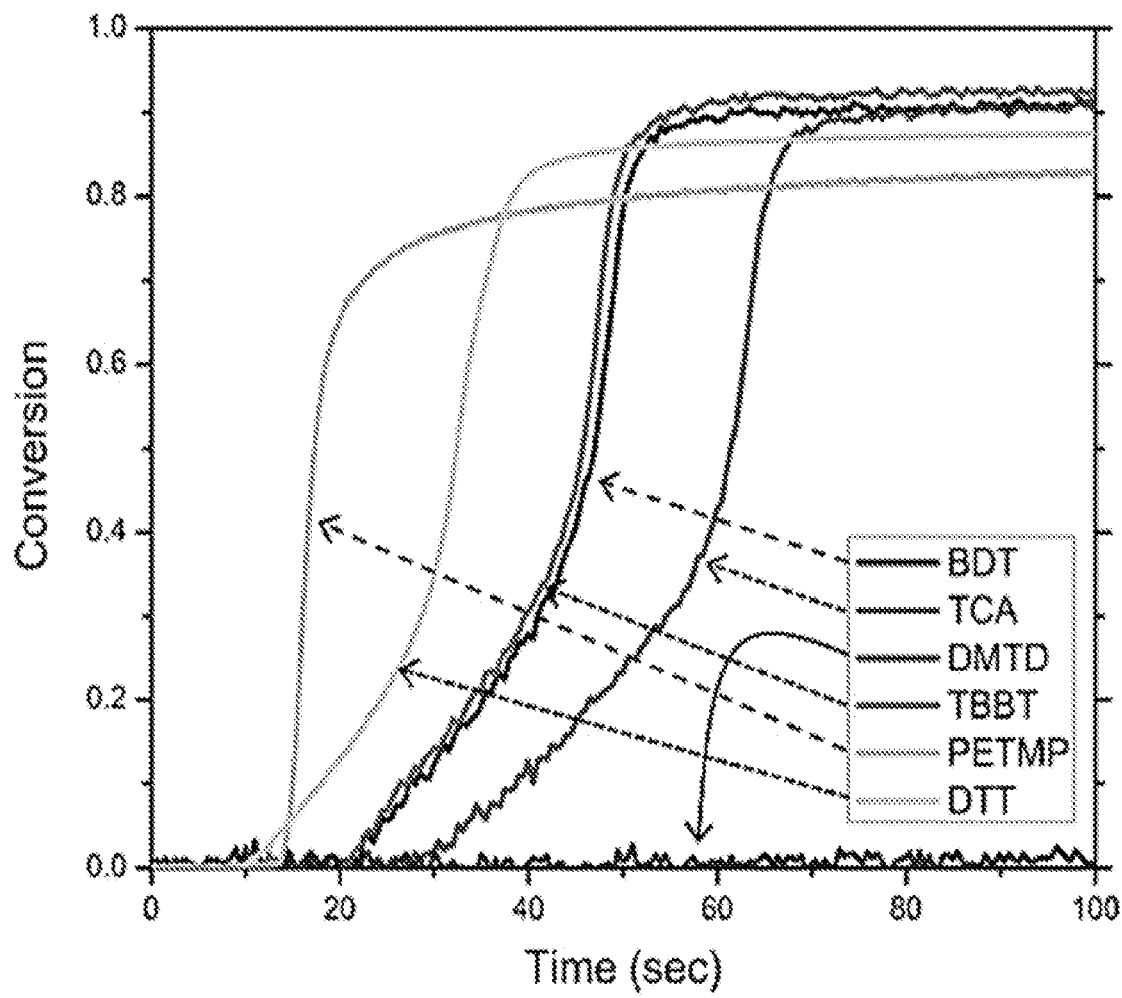
FIG. 121. RT FTIR spectroscopy, varying the thiol-based oxygen scavenger additive (1 mol % by functionality). Vinyl group conversion of red resin (0.05 mol % ZnTPP, 0.05 mol % Borate V, 0.35 mol % HNu-254, 0.01 mol % TEMPO in DMA). BDT, 1,4-benzenedithiol; TCA, thiocyanuric acid; DMTD-2,5-dimercapto-1,3,4-thiadiazole; TBBT, 4,4'-thiobisbenzenethiol. Chemical structures for additives are provided in FIG. 114.
Figure 122:
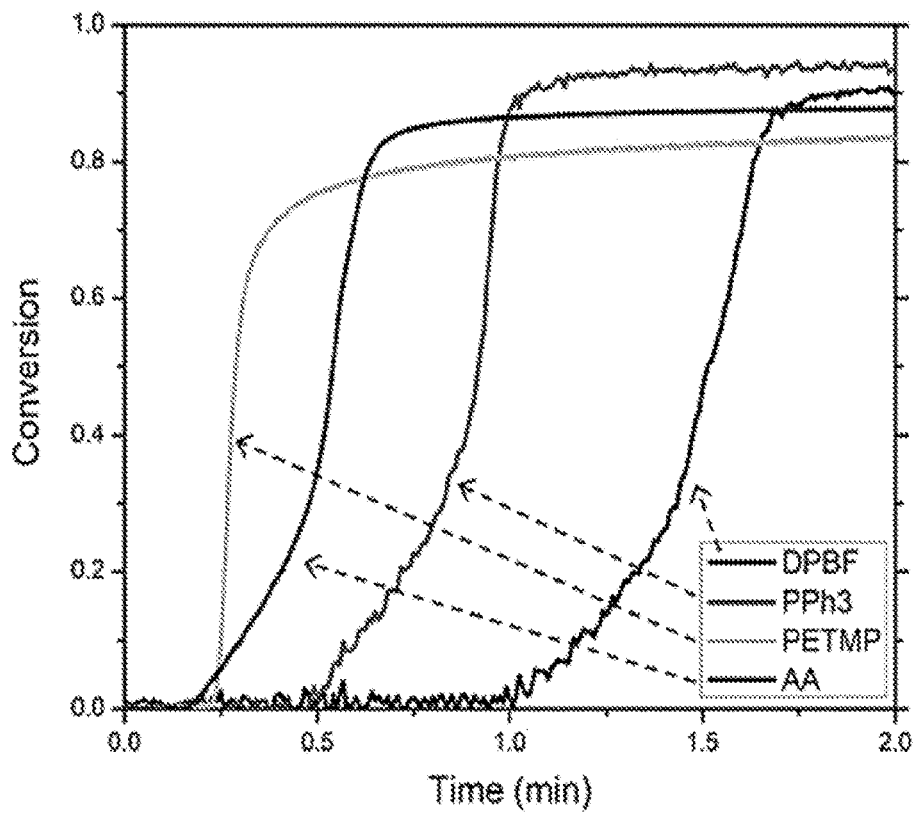
FIG. 122. RT FTIR spectroscopy varying the non-thiol-based oxygen scavenger additive relative to PETMP (1 mol % by functionality). Vinyl group conversion of red resin (0.05 mol % ZnTPP, 0.05 mol % Borate V, 0.35 mol % HNu-254, 0.01 mol % TEMPO in DMA). DPBF, 1,3- diphenylisobenzofuran; PPh3, triphenylphosphine. Chemical structures for additives are provided in FIG. 114.

Kinetic comparison—Effect of thiols/oxygen scavengers on photopolymerization behavior. Different thiol compounds and oxygen scavengers were tested to compare their effect on photopolymerization rates and induction periods (FIG. 121 and FIG. 122 and Table 20). Compounds tested are described in each figure caption. PETMP was shown to be the most effective additive in reducing inhibition time relative to all others tested.

TABLE 20

Summary of apparent photopolymerization rates (both initial and maximum) and induction periods from FIG. 121 and FIG. 122.

| | Initial $R_p$ (%/s) | Maximum $R_p$ (%/s) | Induction periods (sec) |
|---|---|---|---|
| PETMP | 19.2 | 19.2 | 3.7 |
| BDT | 1.2 | 8.6 | 12.5 |
| TCA | 1.1 | 7.7 | 17.0 |
| DMTD | 0.02 | 0.02 | N/A |
| TBBT | 1.3 | 8.8 | 10.5 |
| DTT | 1.7 | 6.5 | 1.8 |
| DPBF | 1.0 | 4.5 | 51.0 |
| PPh$_3$ | 1.5 | 9.1 | 19.0 |
| AA | 0.5 | 2.6 | 4.8 |

Long-term stability test. Long-term storage stability of resins was examined by monitoring changes in photopolymerization rate and induction period using RT FTIR spectroscopy (FIG. 124 and Table 21). Samples were kept at room temperature in the dark and measured once per week for two weeks and again at week four. Photopolymerizations were performed more than five times, with the averaged data provided below. Overall, no statistically significant increase in induction period or apparent polymerization rate were noted in comparing the as prepared resin to after shelf storage for four weeks.

TABLE 21

Average photopolymerization rates and induction periods from FIG. 124. Samples were run in triplicate and the averages ± one standard deviation are provided.

| C=C conversion | $R_p$ %/s | Induction period sec |
|---|---|---|
| Week 0 | 14.8 ± 0.2 | 4.5 ± 0.1 |
| Week 1 | 22.4 ± 1.0 | 4.8 ± 0.4 |
| Week 2 | 22.1 ± 2.2 | 3.9 ± 0.5 |
| Week 4 | 19.2 ± 1.6 | 3.0 ± 0.5 |

Photorheology. Sample preparation and measurement. Photorheology experiments were completed using a Discovery Hybrid Rheometer from TA Instruments (TA Instruments, DE, USA). The rheometer was equipped with a "UV Light Guide" accessory, a disposable 20 mm diameter acrylic bottom plate, and a 20 mm diameter geometry upper aluminum parallel plate. A liquid light guide was used to illuminate the samples with the corresponding visible light using a 617 nm LED connected to a driver from which light intensity could be controlled remotely through software. Each sample was tested in triplicate at the printer light intensity (2.5 mW/cm$^2$ for 617 nm). The rheometer was set to run for two data acquisition cycles with the following experimental parameters:
1. Conditioning (Axial Force=0 N)
2. Dynamic Time Sweep at 1% strain (60 s)
3. Fast Oscillation Step at 1% strain (50 s)
4. Dynamic Time Sweep at 1% strain (60 s)

The gap height was set to 100 µm for each experiment to best match the RT FTIR spectroscopy experiments. The 0% PETMP resin sample was degassed with argon prior to each experiment and argon was passed over the sample during the duration of the experiment to best match 3D printing conditions. Photorheology was performed under ambient conditions (no argon degassing and open to air) for all other samples (0%, 1%, 5%, and 10% PETMP). The light was not turned on until 10 seconds into the fast oscillation step (step 3). Storage modulus (G') and loss modulus (G") were monitored in real time and the light was turned off following inflection of the data, as noted by eye. To determine the gel point (where storage and loss modulus cross) the fast oscillation step G' and G" were averaged for each trial and plotted as a function of time. The observed time point at which the moduli crossed or changed in concavity was taken to be the point of gelation from when the light was turned.

Nuclear Magnetic Resonance (NMR) Spectroscopy

Sample preparation and measurement. NMR spectroscopy using a 400 MHz Varian MR-400 NMR spectrometer was conducted to determine the molecular weight of the oligourethane-diacrylates from Dymax®. First, samples of each Dymax® resin with differing ratios of PETMP were prepared. Next, a 15-20 mg (50 mg for Br-345 samples) aliquot was taken from each sample and 1 mL of $CDCl_3$ was added. The solutions were vortexed to ensure that the PETMP and Dymax® were fully dissolved. The samples with BR-345 were stirred in $CDCl_3$ overnight before PETMP was added to overcome issues with solubility due to the large size of this specific oligourethane-diacrylate.

To calculate the molecular weight of each oligourethane-diacrylates from Dymax®, signals corresponding to the acrylate double bond or methacrylate were integrated and set as the reference peak (2H at 6.42 ppm for BR-741, 2H total (1H at 6.41 ppm and 1H at 5.84 ppm) for BR-345 (for mixed acrylate methacrylate polymer), and 2H at 6.11 ppm for BR-952). Next, the singlet for PETMP at 4.16 ppm was integrated with respect to the referenced Dymax® peak. PETMP is a known structure with a known molecular weight and the signal at 4.16 ppm corresponds to the 8H from the $CH_2$'s adjacent to the 4 ester groups on the molecule. With this information along with the known ratios of Dymax® and PETMP in each sample, an approximate molecular weight of each oligourethane-diacrylate was able to be calculated. The signal for PETMP in each mixture was corrected for 8H by dividing the integral value by 8, and the signal for each Dymax® was corrected for 1H by dividing the integral value by 2. Next, the Dymax® mol % was calculated by taking the value of the corrected Dymax® signal divided by the sum of the corrected Dymax® signal and corrected PETMP signal. After this, the PETMP mol % could be determined by subtracting the previous value from 1. Finally, the mol % ratio was divided by the ratio of the wt % for each sample. This value was multiplied by the molecular weight of PETMP (488.66 g/mol) to determine the approximate molecular weight for each Dymax® resin.

The $^1H$ NMR spectra ($CDCl_3$, 400 MHz) of various samples are shown in FIG. 130-FIG. 140.

The molecular weight determination of BR-741, BR-345, and BR-952 are shown in Table 22, Table 23, and Table 24, respectively.

TABLE 22

Molecular weight determination of BR-741.

| Dymax wt % | PETMP wt % | Signal from Dymax | Signal from PETMP | Dymax mol % | PETMP mol % | Ratio wt %/ Ratio mol % | MW Dymax |
|---|---|---|---|---|---|---|---|
| 0.2 | 0.8 | 1 | 7.77875 | 0.1139114 | 0.8860885 | 1.94469 | 950.291 |
| 0.5 | 0.5 | 1 | 1.97375 | 0.3362757 | 0.6637242 | 1.97375 | 964.493 |
| 0.8 | 0.2 | 1 | 0.4875 | 0.6722689 | 0.3277310 | 1.95 | 952.887 |
| | | | | | | Avg | 956 |
| | | | | | | St. Dev. | 8 |

TABLE 23

Molecular weight determination of BR-345.

| Dymax wt % | PETMP wt % | Signal from Dymax | Signal from PETMP | Dymax mol % | PETMP mol % | MW Dymax | |
|---|---|---|---|---|---|---|---|
| 0.941176 | 0.058823 | 1 | 1.33625 | 0.428036 | 0.571964 | 21.38 | 10447.55 |
| 0.941177 | 0.058824 | 1 | 1.3175 | 0.431499 | 0.568501 | 21.08 | 10300.95 |
| 0.941176 | 0.058824 | 1 | 1.3325 | 0.428724 | 0.571275 | 21.32 | 10418.23 |
| 0.888888 | 0.111111 | 1 | 2.44875 | 0.289960 | 0.710040 | 19.59 | 9572.849 |
| 0.888888 | 0.111111 | 1 | 2.4275 | 0.291757 | 0.708242 | 19.42 | 9489.777 |
| 0.888888 | 0.111111 | 1 | 2.43875 | 0.290803 | 0.709197 | 19.51 | 9533.757 |
| | | | | | | Avg | 9961 |
| | | | | | | St. Dev. | 473 |

TABLE 24

Molecular weight determination of BR-952.

| Dymax wt % | PETMP wt % | Signal from Dymax | Signal from PETMP | Dymax mol % | PETMP mol % | | MW Dymax |
|---|---|---|---|---|---|---|---|
| 0.8 | 0.2 | 1 | 0.345 | 0.743494 | 0.256505 | 1.38 | 674.3508 |
| 0.666666 | 0.333333 | 1 | 0.71375 | 0.583515 | 0.416484 | 1.4275 | 697.5621 |

TABLE 24-continued

Molecular weight determination of BR-952.

| Dymax wt % | PETMP wt % | Signal from Dymax | Signal from PETMP | Dymax mol % | PETMP mol % | MW Dymax |
|---|---|---|---|---|---|---|
| | | | | | Avg | 686 |
| | | | | | St. Dev. | 16 |

Tensile Testing. Sample preparation and measurement. Mechanical samples were printed as dogbones using an ASTM D638 standard shape having the following dimensions: 1.11 mm (thickness), 1.76 mm (gauge width), and 18.5 mm (gauge length). Prints were accomplished with various Dymax® resins as noted in the text, and post-cured for 20 minutes with UV light. Uniaxial tension was applied to each sample under ambient conditions using a tensile tester (AGS-500NXD, SHIMADZU) equipped with a load cell (500 N capacity) at a crosshead speed of 0.05 mm/sec. Experiments were repeated at least 5 times for each sample and all of displayed results represent an average t one standard deviation of all runs.

Gravimetric Analysis. Sample preparation and measurement. Stiff acrylate Dymax® resin (BR-741:TPGDA) was used to fabricate samples via red light printing (617 nm, 2.5 mW/cm$^2$). Six samples were printed simultaneously, each with the dimensions of 9 mm×9 mm×1.5 mm (FIG. 142 and Table 25). Slice thickness was 25 µm, at an exposure time of 16 s and 8 s for 0 wt % PETMP and 10 wt % PETMP-containing sample, respectively. The 0 wt % PETMP samples were printed with a relatively airtight acrylic housing that was purged with argon during the course of printing. All samples were post-cured with UV light for 20 min. Each individual sample was first weighed and then added to an individual scintillation vial filled with 40 mL of acetone. The vials were stirred with a magnetic stir bar over the course of one day. Samples were then removed from the vials, dried under a stream of air and then under reduced pressure at 60° C. prior to measuring a final weight.

TABLE 25

Mass change of printed samples after swelling in a good solvent, as pictured in FIG. 142. Shows little-to-no change, consistent with PETMP being incorporated into the polymer network. Average sample mass ± one standard deviation is provided.

| PETMP content | Mass change (%) |
|---|---|
| 0% | −2.1 ± 1.8 |
| 10% | 0.5 ± 0.9 |

Dynamic Mechanical Analysis. 3D printed objects were prepared from the resin with varying PETMP concentrations (0 wt %, 1 wt %, 5 wt %, and 10 wt %). The dimension of the 3D printed objects were 11 mm×6.5 mm×1.3 mm. Samples were mounted in a TA instruments Q800 dynamic mechanical analyzer equipped with a film tension clamp. Experiments were performed at an oscillation amplitude and frequency of 15 µm and 1 Hz, respectively, scanning the temperature from −30° C. to 200° C. at 3° C./min. The elastic moduli (E') and tan δ curves were recorded. The temperatures at which tan δ peaked were assigned as the glass transition temperatures (FIG. 143-FIG. 146 and Table 26).

TABLE 26

Glass transition temperature of thiol-containing acrylic networks

| | 0% PETMP | 1% PETMP | 5% PETMP | 10% PETMP |
|---|---|---|---|---|
| Tg | 59.5° C. | 58.5° C. | 47.7° C. | 45.3 |

Optical Profilometry

Overview of the "resolution print" method. The 'resolution print' method at a layer thickness of 25 µm was used with the corresponding violet and red LED digital light processing printing. This printing method was used to optimize the [SH] and exposure time/layer. Each resolution print contains a set of squares (2-24 sec, 2 s increments) that were simultaneously printed, varying exposure time/layer, to streamline the resin optimization (FIG. 147-FIG. 148). In the bottom half of each square, an array of smaller squares (1-16 pixel wide) exists to facilitate the optimization of lateral resolution.

Effect of thiol concentration on "resolution prints". To examine the influence of thiol compounds on 3D printing, the content of thiol (PETMP) was varied in the resin formulations and 3D objects were printed from each formulation under ambient conditions. 3D objects from resins without thiol were printed under an inert atmosphere as controls.

Height analysis (vertical resolution). A laser scanning optical 3D microscope (VK-X1100, Keyence) was used to map the topography of each square in the resolution prints. Both thickness and side-wall angle (SWA) were measured and Multifile analyzer software (Keyence) was used to determine the dimensions of observed objects. Heights and sidewall angle values were determined from an average of 10 lines with 2.7 µm intervals. The number of base layers was maintained constant at 48 layers and varied for each square pattern from 1 to 16 as noted, using a layer thickness of 25 µm Surface area analysis (lateral resolution). Top surface area of 1, 2, 4, 8, 16 pixel-wide patterns (bottom half of each square on resolution print) was measured to determine the optimal opaquing agent concentrations, thiol concentrations, and slice exposure times. Based on the height of the optical images collected from the optical profilometer, the areas of the top surface of the pillars were recorded for each resin with varying opaquing agent concentrations (FIG. 112). Multifile analyzer software (Keyence) was used to calculate the surface area directly from the images obtained using the optical profilometer. For clarity, images were post-processed using Adobe Illustrator. This post-processing directly takes pixels identified to be above a certain height threshold in the optical profilometry image and converts them to a monochromatic rendering. Additional details about this process can be found in a previous report (Ahn D et al. *ACS Cent. Sci.* 2020, 6, 1555).

Layer thickness analysis. To examine the layer thickness of 3D printed dogbones and its consistency, the layer thickness was measured using optical profilometry. Average thickness was calculated from Multifile analyzer software (Keyence). The thickness of dogbone samples printed at 3 different edge-on angles is summarized in Table 27.

TABLE 27

Thickness of dogbone samples printed at 3 different edge-on angles. Averages ± one standard deviation are provided

| | Average Thickness (µm) |
|---|---|
| Vertical | 25.0 ± 1.7 |
| Diagonal | 25.1 ± 1.2 |
| Horizontal | 25.0 ± 1.4 |

UV-vis Absorption Spectroscopy. Thin resin samples. Light attenuation was measured using UV-visible absorption spectroscopy for stiff resin formulations sandwiched between two glass slides separated by spacers with various thicknesses (from 76 µm to 1270 µm). Each sample was placed on a horizontal transmission accessory (Stage RTL-T, Ocean Optics) connected to a spectrometer (QE PRO-ABS, Ocean Optics) through QP-600-025-SR optical fibers. A deuterium-tungsten halogen light sources (DH-2000-BAL) was used as the probe light. Spectra were collected from 200 to 800 nm. Extinction coefficients for PI and PS were calculated using Beer's Law.

Scanning Electron Microscopy. SEM (Fei Quanta 650, ThermoFisher) was used to examine the surface characteristics of the 3D printed object (120-cell and dogbones). For improved imaging, the sample was sputtered with Au using an EMS sputter coater (Electron Microscopy Science). Sputtering was conducted for 1.5 min at 40 mA. 3D Prints. High resolution complex structures were printed using the red stiff Dymax resin. Slice thickness of 25 µm was used, and either 1 wt % or 5 wt % PETMP were added in the resin formulation. For 1 wt % thiol-containing samples, an exposure time of 20 s for the first layer and 14 s for all subsequent layers was used. For 5 wt % thiol-containing samples, an exposure time of 12 s for the first layer and 8 s for all subsequent layers was used.

Example 5—Oxygen Tolerant Visible to Near Infrared Light Activated Photopolymer Resins Oxygen tolerant, rapid high resolution visible light photocurable resin compositions are presented. The constituents identified in this disclosure are those that react rapidly with oxygen, including singlet oxygen that is generated during the visible light photocuring process. These represent thiols/mercaptams as hydrogen donors, experimentally validated, but can be extended to other anti-oxygen inhibition additives, including other hydrogen donors (e.g., amines, hydrogen phosphites, silanes, stannanes, and benzaldehydes), N-vinyl amides, reducing agents (e.g., phosphines, phosphites, sulphites, and borane-amine complexes), and singlet oxygen scavengers (e.g., diphenyl furan and anthracene derivatives).

These additives have been used in other UV sensitive photopolymer formulations to reduce oxygen inhibition; however they are particularly attractive for rapid photocuring systems with longer wavelengths of light (visible to near infrared) as these often go through a photoexcited triplet state that rapidly reacts with oxygen to generate singlet oxygen, resulting in reduced cure speeds and potentially decreasing the mechanical performance of the final part by capping growing chains.

A formulation that enables acrylic resins to be cured with either blue (~460 nm), green (~530 nm), or red (~616 nm) light is disclosed herein above. These resins contain a monomer, crosslinker, photoredox catalyst, and donor and acceptor co-initiators. Such formulations that did not include an oxygen scavenger required careful removal of oxygen through degassing/sparging with an inert gas (such as nitrogen or argon). Herein, it is shown that the inclusion of a thiol (e.g., even in small amounts, such as ~1 wt %) in a resin can dramatically reduce the cure time (from minutes to seconds) without the need for any prior oxygen removal. This combined with the fact that the final printed objects maintain an equivalent mechanical performance was an unexpected result. The initial hypothesis was to completely alter the resin composition from acrylic to thiol+vinylic (50:50 mol %), but these resin systems are known to have a reduced mechanical performance compared to their acrylic counterparts and often have an associated unwanted odor due to residual unreacted thiol. Using much smaller quantities of thiol enables excellent mechanical properties without any noticeable unwanted smell.

Specifically, photocuring is demonstrated with dimethyl acrylamide, trimethylolpropane triacrylate, tri(propylene glycol) diacrylate, and oligo-urethane (meth)acrylates (Dymax) as the monomers/crosslinkers, [4-(octyloxy)phenyl](phenyl)iodonium hexafluoroantimonate diphenyliodonium as the acceptor co-initiator, 2-(butyryloxy)-N,N,N-trimethylethan-1-aminium butyltriphenylborate as the donor co-initiator, and zinc tetraphenylporphyrin as the photoredox catalyst for curing with red light. A reduction in oxygen inhibition was assessed using real time Fourier transform infrared spectroscopy revealing rapid polymerization (polymerization complete within ~20 seconds) without degassing.

The composition of matter is not restricted to the specific components mentioned above. Rather, they provide specific evidence for the invention disclosed herein.

As an alternative to high energy UV light that is used in contemporary photocuring applications, visible light offers numerous benefits, including reduced cost and energy of irradiation from readily available and modular light emitting diodes (LEDs), improved biocompatibility and functional group tolerance, greater depth of penetration, and reduced scattering. As such, visible light photocuring has the potential to enable next generation designer material fabrication, including, inter alia, hydrogels containing live cells, opaque composites, and wavelength-selective multi-material structures that promise to advance a range of applications, from structural plastics to tissue engineering and soft robotics. Precluding the need for removing oxygen is particularly beneficial from a time, cost, and biocompatibility perspective. Traditionally, without removal of oxygen, photopolymerizable compositions photocure at slow speeds when using low energy visible light irradiation from commercial inexpensive LEDs. The compositions disclosed herein address this limitation.

The resultant cured objects are colored based on the intrinsic color of the photoredox catalyst used. If a colorless compound is required then color may be removed through the use of higher intensity light irradiation in the presence of oxygen to photobleach the sensitizer or washing the post-cured parts with a compatible solvent to extract the colored compounds.

The compositions, devices, and methods of the appended claims are not limited in scope by the specific devices and methods described herein, which are intended as illustrations of a few aspects of the claims and any devices and methods that are functionally equivalent are within the scope of this disclosure. Various modifications of the compositions, devices, and methods in addition to those shown and described herein are intended to fall within the scope of the appended claims. Further, while only certain representative compositions, devices, and methods, and aspects of these compositions, devices, and methods are specifically described, other compositions, devices, and methods and combinations of various features of the compositions, devices, and methods are intended to fall within the scope of the appended claims, even if not specifically recited. Thus a combination of steps, elements, components, or constituents can be explicitly mentioned herein; however, all other combinations of steps, elements, components, and constituents are included, even though not explicitly stated.

What is claimed is:

1. A photocurable composition comprising:
   a (co)monomer;
   a photosensitizer having an absorption band, wherein at least a portion of the absorption band is located at one or more wavelength from 400 nm to 1400 nm, and wherein the photosensitizer comprises a xanthene of Formula III, a squaraine, a boron-dipyrromethene, a cyanine, a porphyrin, or a combination thereof;
   wherein Formula III is:

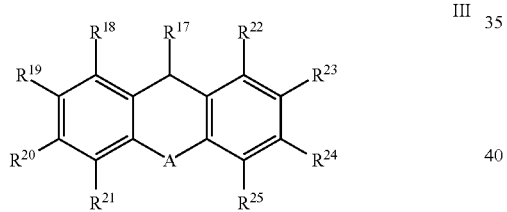

III wherein
A is O, S, Se, Te, $NR^x$, $CR^xR^y$, $SiR^xR^y$, or $GeR^xR^y$;
$R^{17}$, $R^{18}$, $R^{19}$, $R^{20}$, $R^{21}$, $R^{22}$, $R^{23}$, $R^{24}$, and $R^{25}$ are each independently H, OH, halogen, alkyl, alkenyl, alkynyl, cycloalkyl, aryl, alkylaryl, or heteroaryl, any of which is optionally substituted with halide, hydroxy, thiol, carbonyl, alkoxy, alkylhydroxy, carboxyl, amino, amido, alkyl, alkenyl, alkynyl, cycloalkyl, aryl, —$NR^xR^y$, —$C(O)NR^xR^y$, or a combination thereof, or wherein, as valence permits, two or more of $R^{17}$-$R^{25}$, together with the atoms to which they are attached, form a 3-10 membered cyclic moiety, wherein any of the additional atoms are optionally heteroatoms and the 3-10 membered cyclic moiety is optionally substituted with halide, hydroxy, thioether, carbonyl, alkoxy, alkylhydroxy, carboxyl, amino, amido, alkyl, alkenyl, alkynyl, aryl, —$NR^xR^y$, —$C(O)NR^xR^y$, or a combination thereof; and
$R^x$ and $R^y$ are independently H, OH, alkyl, alkenyl, alkynyl, cycloalkyl, aryl, alkylaryl, or heteroaryl;
an acceptor co-initiator comprising a diphenyliodonium salt of Formula I:

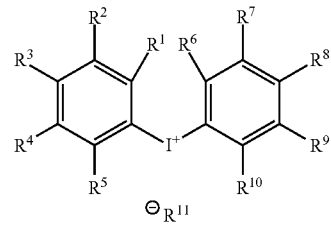

I wherein
$R^1$, $R^2$, $R^3$, $R^4$, $R^5$, $R^6$, $R^7$, $R^8$, $R^9$, and $R^{10}$ are each independently H, OH, halogen, alkyl, alkenyl, alkynyl, cycloalkyl, aryl, alkylaryl, or heteroaryl, any of which is optionally substituted with halide, hydroxy, thiol, carbonyl, alkoxy, alkylhydroxy, carboxyl, amino, amido, alkyl, alkenyl, alkynyl, cycloalkyl, aryl, —$NR^xR^y$, —$C(O)NR^xR^y$, or a combination thereof, or wherein, as valence permits, two or more of $R^1$-$R^{10}$, together with the atoms to which they are attached, form a 3-10 membered cyclic moiety, wherein any of the additional atoms are optionally heteroatoms and the 3-10 membered cyclic moiety is optionally substituted with halide, hydroxy, thioether, carbonyl, alkoxy, alkylhydroxy, carboxyl, amino, amido, alkyl, alkenyl, alkynyl, aryl, —$NR^xR^y$, —$C(O)NR^xR^y$, or a combination thereof;
$R^x$ and $R^y$ are independently H, OH, alkyl, alkenyl, alkynyl, cycloalkyl, aryl, alkylaryl, or heteroaryl; and
$R^{11}$ is a hydroxyl anion, halide anion, nitrate anion, carboxylate anion, sulfonate anion, phosphate anion, borate anion, tetrafluoride anion, or hexafluoride anion, any of which is optionally substituted; and
a donor co-initiator comprising a borate salt of Formula II:

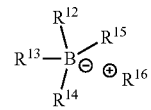

II wherein
$R^{12}$, $R^{13}$, $R^{14}$, and $R^{15}$ are each independently H, OH, halogen, alkyl, alkenyl, alkynyl, cycloalkyl, aryl, alkylaryl, or heteroaryl, any of which is optionally substituted with halide, hydroxy, thiol, carbonyl, alkoxy, alkylhydroxy, carboxyl, amino, amido, alkyl, alkenyl, alkynyl, cycloalkyl, aryl, —$NR^xR^y$, —$C(O)NR^xR^y$, or a combination thereof;
$R^{16}$ is an ammonium cation, a phosphonium cation, a sulphonium cation, or a heteroaryl cation, any of which is optionally substituted with halide, hydroxy, thiol, carbonyl, alkoxy, alkylhydroxy, carboxyl, amino, amido, alkyl, alkenyl, alkynyl, cycloalkyl, aryl, —$NR^xR^y$, —$C(O)NR^xR^y$, or a combination thereof; and
$R^x$ and $R^y$ are independently H, OH, alkyl, alkenyl, alkynyl, cycloalkyl, aryl, alkylaryl, or heteroaryl.

2. The photocurable composition of claim 1, wherein the (co)monomer comprises a (meth)acrylate monomer, a (meth)acrylamide monomer, a vinyl acetate monomer, a styrenic monomer, or a combination thereof.

3. The photocurable composition of claim 1, wherein the (co)monomer comprises N,N-Dimethylacrylamide (DMA); trimethylolpropane triacrylate (TMPTA); 2-hydroxyethyl acrylate (HEA); 2-hydroxyethyl methacrylate (HEMA); isobornyl acrylate (iBoA); tri(propylene glycol) diacrylate (TPGDA); an oligourethane di(meth)acrylate; or a combination thereof.

4. The photocurable composition of claim 1, wherein the photosensitizer comprises a xanthene of Formula III:

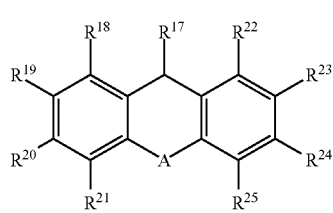

III wherein A is O, S, Se, Te, NR$^x$, CR$^x$R$^y$, SiR$^x$R$^y$, or GeR$^x$R$^y$;

R$^{17}$, R$^{18}$, R$^{19}$, R$^{20}$, R$^{21}$, R$^{22}$, R$^{23}$, R$^{24}$, and R$^{25}$ are each independently H, OH, halogen, alkyl, alkenyl, alkynyl, cycloalkyl, aryl, alkylaryl, or heteroaryl, any of which is optionally substituted with halide, hydroxy, thiol, carbonyl, alkoxy, alkylhydroxy, carboxyl, amino, amido, alkyl, alkenyl, alkynyl, cycloalkyl, aryl, —NR$^x$R$^y$, —C(O)NR$^x$R$^y$, or a combination thereof, or wherein, as valence permits, two or more of R$^{17}$-R$^{25}$, together with the atoms to which they are attached, form a 3-10 membered cyclic moiety, wherein any of the additional atoms are optionally heteroatoms and the 3-10 membered cyclic moiety is optionally substituted with halide, hydroxy, thioether, carbonyl, alkoxy, alkylhydroxy, carboxyl, amino, amido, alkyl, alkenyl, alkynyl, aryl, —NR$^x$R$^y$, —C(O)NR$^x$R$^y$, or a combination thereof; and R$^x$ and R$^y$ are independently H, OH, alkyl, alkenyl, alkynyl, cycloalkyl, aryl, alkylaryl, or heteroaryl.

5. The photocurable composition of claim 1, wherein the photosensitizer comprises a boron-dipyrromethene of Formula IV:

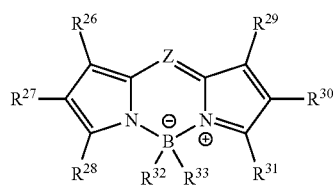

IV wherein
Z is N, SiR$^x$, or CR$^x$;
R$^{26}$, R$^{27}$, R$^{28}$, R$^{29}$, R$^{30}$, R$^{31}$, R$^{32}$, and R$^{33}$ are each independently H, OH, halogen, alkyl, alkenyl, alkynyl, cycloalkyl, aryl, alkylaryl, or heteroaryl, any of which is optionally substituted with halide, hydroxy, thiol, carbonyl, alkoxy, alkylhydroxy, carboxyl, amino, amido, alkyl, alkenyl, alkynyl, cycloalkyl, aryl, —NR$^x$R$^y$, —C(O)NR$^x$R$^y$, or a combination thereof, or wherein, as valence permits, two or more of R$^{26}$-R$^{33}$, together with the atoms to which they are attached, form a 3-10 membered cyclic moiety, wherein any of the additional atoms are optionally heteroatoms and the 3-10 membered cyclic moiety is optionally substituted with halide, hydroxy, thioether, carbonyl, alkoxy, alkylhydroxy, carboxyl, amino, amido, alkyl, alkenyl, alkynyl, aryl, —NR$^x$R$^y$, —C(O)NR$^x$R$^y$, or a combination thereof; and R$^x$ and R$^y$ are independently H, OH, alkyl, alkenyl, alkynyl, cycloalkyl, aryl, alkylaryl, or heteroaryl.

6. The photocurable composition of claim 1, wherein the photosensitizer comprises a boron-dipyrromethene of Formula IVa or Formula IVb:

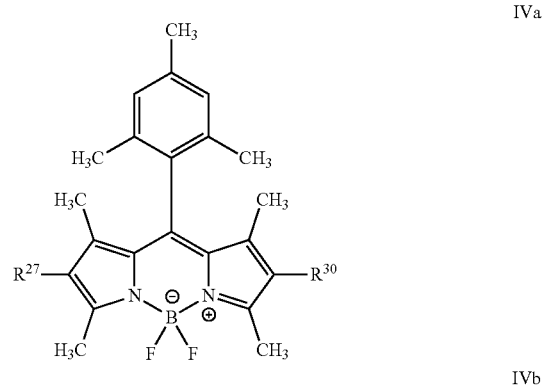

IVa

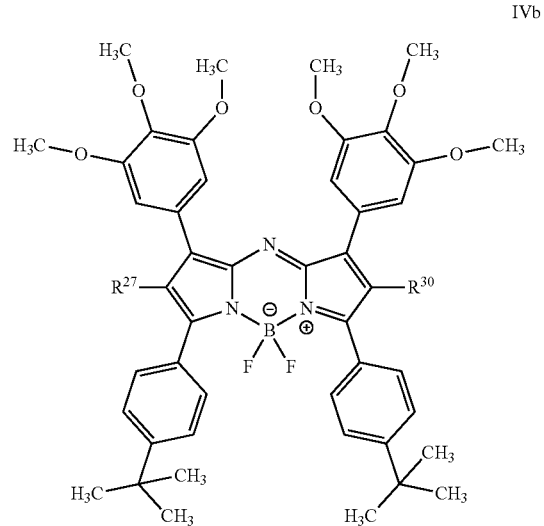

IVb wherein R$^{27}$ and R$^{30}$ are each independently H, Cl, Br, or I.

7. The photocurable composition of claim 1, wherein the photosensitizer is selected from the group consisting of:

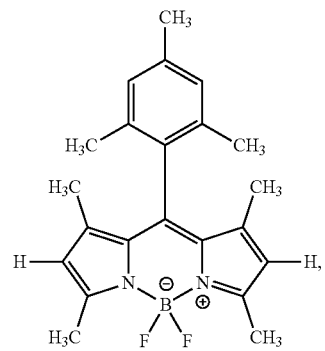

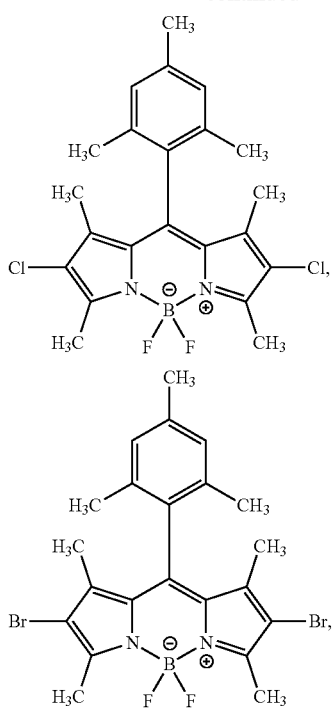
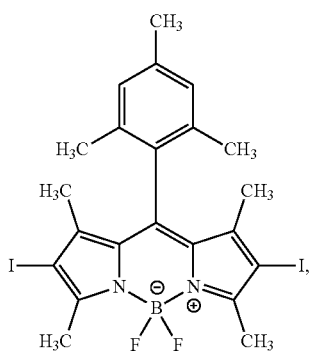
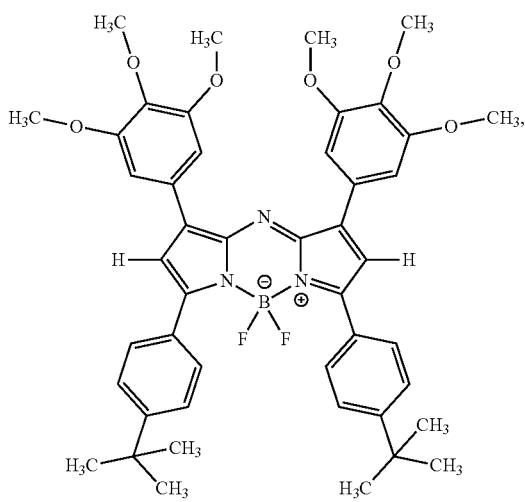
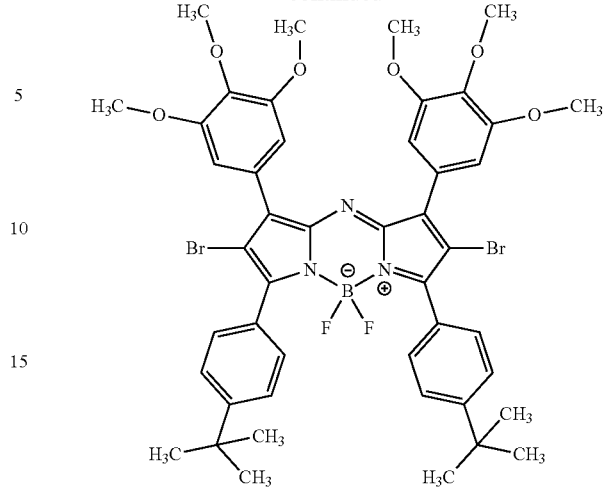

and combinations thereof.

8. The photocurable composition of claim 1, wherein the photosensitizer comprises a porphyrin of Formula V:

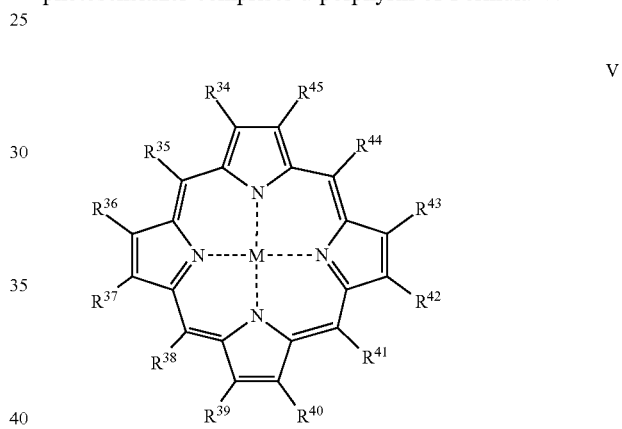

wherein
M is null, Zn, Mn, Fe, Co, Ti, Cr, Ni, or Cu;
$R^{34}$, $R^{35}$, $R^{36}$, $R^{37}$, $R^{38}$, $R^{39}$, $R^{40}$, $R^{41}$, $R^{42}$, $R^{43}$, $R^{44}$, and $R^{45}$ are each independently H, OH, halogen, alkyl, alkenyl, alkynyl, cycloalkyl, aryl, alkylaryl, or heteroaryl, any of which is optionally substituted with halide, hydroxy, thiol, carbonyl, alkoxy, alkylhydroxy, carboxyl, amino, amido, alkyl, alkenyl, alkynyl, cycloalkyl, aryl, —$NR^xR^y$, —$C(O)NR^xR^y$, or a combination thereof, or wherein, as valence permits, two or more of $R^{34}$-$R^{45}$, together with the atoms to which they are attached, form a 3-10 membered cyclic moiety, wherein any of the additional atoms are optionally heteroatoms and the 3-10 membered cyclic moiety is optionally substituted with halide, hydroxy, thioether, carbonyl, alkoxy, alkylhydroxy, carboxyl, amino, amido, alkyl, alkenyl, alkynyl, aryl, —$NR^xR^y$, —$C(O)NR^xR^y$, or a combination thereof; and
$R^x$ and $R^y$ are independently H, OH, alkyl, alkenyl, alkynyl, cycloalkyl, aryl, alkylaryl, or heteroaryl.

9. The photocurable composition of claim 1, wherein the photosensitizer comprises a xanthene, a boron-dipyrromethene, a porphyrin, or a combination thereof.

10. The photocurable composition of claim 1, wherein the photosensitizer comprises a squaraine of Formula VI:

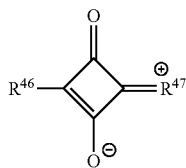

wherein
$R^{46}$ and $R^{47}$ are each independently H, OH, halogen, alkyl, alkenyl, alkynyl, cycloalkyl, aryl, alkylaryl, or heteroaryl, any of which is optionally substituted with halide, hydroxy, thiol, carbonyl, alkoxy, alkylhydroxy, carboxyl, amino, amido, alkyl, alkenyl, alkynyl, cycloalkyl, aryl, —NR$^x$R$^y$, —C(O)NR$^x$R$^y$, or a combination thereof; and
$R^x$ and $R^y$ are independently H, OH, alkyl, alkenyl, alkynyl, cycloalkyl, aryl, alkylaryl, or heteroaryl.

11. The photocurable composition of claim 1, wherein the photosensitizer comprises a xanthene, a squaraine, a borondipyrromethene, a porphyrin, or a combination thereof.

12. The photocurable composition of claim 1, wherein the photosensitizer comprises a cyanine of Formula VII:

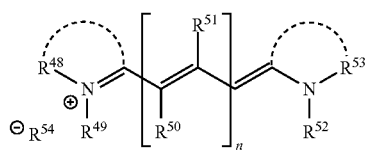

wherein
n is from 0 to 10;
$R^{48}$, $R^{49}$, $R^{50}$, $R^{51}$, $R^{52}$, $R^{53}$ each independently H, OH, halogen, alkyl, alkenyl, alkynyl, cycloalkyl, aryl, alkylaryl, or heteroaryl, any of which is optionally substituted with halide, hydroxy, thiol, carbonyl, alkoxy, alkylhydroxy, carboxyl, amino, amido, alkyl, alkenyl, alkynyl, cycloalkyl, aryl, —NR$^x$R$^y$, —C(O)NR$^x$R$^y$, or a combination thereof;
the dotted line to $R^{48}$ indicates that, as valence permits, $R^{48}$, together with the atoms to which it is attached, can optionally form a 3-10 membered cyclic moiety with the backbone of the cyanine, wherein any of the additional atoms are optionally heteroatoms and the 3-10 membered cyclic moiety is optionally substituted with halide, hydroxy, thioether, carbonyl, alkoxy, alkylhydroxy, carboxyl, amino, amido, alkyl, alkenyl, alkynyl, aryl, —NR$^x$R$^y$, —C(O)NR$^x$R$^y$, or a combination thereof;
the dotted line to $R^{53}$ indicates that, as valence permits, $R^{53}$, together with the atoms to which it is attached, can optionally form a 3-10 membered cyclic moiety with the backbone of the cyanine, wherein any of the additional atoms are optionally heteroatoms and the 3-10 membered cyclic moiety is optionally substituted with halide, hydroxy, thioether, carbonyl, alkoxy, alkylhydroxy, carboxyl, amino, amido, alkyl, alkenyl, alkynyl, aryl, —NR$^x$R$^y$, —C(O)NR$^x$R$^y$, or a combination thereof;
$R^x$ and $R^y$ are independently H, OH, alkyl, alkenyl, alkynyl, cycloalkyl, aryl, alkylaryl, or heteroaryl; and
$R^{54}$ a hydroxyl anion, halide anion, nitrate anion, carboxylate anion, sulfonate anion, phosphate anion, borate anion, tetrafluoride anion, or hexafluoride anion, any of which is optionally substituted.

13. The photocurable composition of claim 1, wherein:
the donor co-initiator comprises a borate salt of Formula II and $R^{12}$, $R^{13}$, $R^{14}$, and $R^{15}$ are each independently alkyl, cycloalkyl, aryl, or alkylaryl, any of which is optionally substituted;
$R^{16}$ is a quaternary ammonium cation having a formula of NR$^a$R$^b$R$^c$R$^d$ wherein R$^a$, R$^b$, R$^c$, and R$^d$ are each independently alkyl, alkenyl, alkynyl, cycloalkyl, aryl, or alkylaryl, any of which is optionally substituted with halide, hydroxy, thiol, carbonyl, alkoxy, alkylhydroxy, carboxyl, amino, amido, alkyl, alkenyl, alkynyl, cycloalkyl, aryl, —NR$^x$R$^y$, —C(O)NR$^x$R$^y$, or a combination thereof; and R$^x$ and R$^y$ are independently H, OH, alkyl, alkenyl, alkynyl, cycloalkyl, aryl, alkylaryl, or heteroaryl;
or a combination thereof.

14. The photocurable composition of claim 1, wherein:
the acceptor co-initiator comprises a diphenyliodonium salt of Formula I; and
$R^1$-$R^{10}$ are each independently H, OH, halogen, or alkyl, any of which is optionally substituted; $R^{11}$ is a hexafluoride; or a combination thereof.

15. The photocurable composition of claim 1, wherein:
the photosensitizer is present in an amount of from 0.00001 to 5 wt % relative to the total amount of (co)monomer in the photocurable composition;
the donor co-initiator is present in an amount of from 0.001 to 5 wt % relative to the total amount of (co)monomer in the photocurable composition;
the acceptor co-initiator is present in an amount of from 0.001 to 5 wt % relative to the total amount of (co)monomer in the photocurable composition;
or a combination thereof.

16. The photocurable composition of claim 1, further comprising a crosslinker, an opacifier, a solvent, a radical scavenger, or a combination thereof.

17. The photocurable composition of claim 1, further comprising an oxygen scavenger, wherein the oxygen scavenger is present in an amount of from 0.001 to 10 wt % relative to the total amount of (co)monomer in the photocurable composition.

18. The photocurable composition of claim 17, wherein the oxygen scavenger comprises a hydrogen donor, an n-vinyl amide, a reducing agent, a singlet oxygen scavenger, a multifunctional thiol, or a combination thereof.

19. The photocurable composition of claim 17, wherein the oxygen scavenger comprises pentaerythritol tetrakis(3-mercaptopropionate) (PETMP); benzene-1,4-dithiol; trithiocyanuric acid; 1,3,4-thiadiazole-2,5-dithiol; 4,4'-thiobisbenzenethiol; triphenylphosphine (PPh$_3$); 1,3-diphenylisobenzofuran (DPBF); (2,2,6,6-1,4-dithiothreitol (DTT); ascorbic acid (AA); or a combination thereof.

20. A method of forming a (co)polymer from the photocurable composition of claim 1, the method comprising:
irradiating the photocurable composition with light, wherein the light irradiating the photocurable composition has an energy that at least partially overlaps with the absorption band of the photosensitizer, thereby inducing polymerization of the (co)monomer.

* * * * *